US011175099B2

(12) United States Patent
Rajagopalan et al.

(10) Patent No.: US 11,175,099 B2
(45) Date of Patent: Nov. 16, 2021

(54) SYSTEMS AND METHODS FOR USE IN WELDING PIPE SEGMENTS OF A PIPELINE

(71) Applicant: CRC-EVANS PIPELINE INTERNATIONAL, INC., Houston, TX (US)

(72) Inventors: Shankar T. Rajagopalan, Cypress, TX (US); Siddharth Mallick, Houston, TX (US); Brian L. Kirk, Kingwood, TX (US); Jose C. Bouche, Houston, TX (US); Jason W. Curbo, League City, TX (US); Jonathan B. Kettelkamp, Tomball, TX (US); Lawrence Sniderman, Dallas, TX (US); Shailesh Radhakrishnan, Spring, TX (US)

(73) Assignee: CRC-EVANS PIPELINE INTERNATIONAL, INC., Houston, TX (US)

( * ) Notice: Subject to any disclaimer, the term of this patent is extended or adjusted under 35 U.S.C. 154(b) by 83 days.

(21) Appl. No.: 16/589,637

(22) Filed: Oct. 1, 2019

(65) Prior Publication Data

US 2020/0033063 A1 Jan. 30, 2020

Related U.S. Application Data

(60) Division of application No. 15/441,804, filed on Feb. 24, 2017, now Pat. No. 10,480,862, which is a (Continued)

(51) Int. Cl.

*B23K 31/00* (2006.01)
*F28D 7/00* (2006.01)

(Continued)

(52) U.S. Cl.

CPC .......... *F28D 7/0008* (2013.01); *B23K 9/0282* (2013.01); *B23K 9/32* (2013.01);

(Continued)

(58) Field of Classification Search

CPC ....... F28D 7/0008; B23K 9/32; B23K 37/003; B23K 2103/04; B23K 9/0052;

(Continued)

(56) References Cited

U.S. PATENT DOCUMENTS 1,693,064 A 11/1928 Tipton
1,846,470 A 2/1932 Burnish (Continued)

FOREIGN PATENT DOCUMENTS

CA 1051979 4/1979
CA 1239448 7/1988

(Continued)

OTHER PUBLICATIONS

Non-Final Office Action issued in corresponding U.S. Appl. No. 15/632,061, dated Jan. 27, 2020.

(Continued)

*Primary Examiner* — Kiley S Stoner

(74) *Attorney, Agent, or Firm* — Pillsbury Winthrop Shaw Pittman LLP

(57) ABSTRACT

The present application relates to a field system and methods that can be deployed in the application of pipe welding. The field system provides many embodiments relating to pipe welding systems and methods, that can be used in combination with one another, or individually. Such welding systems and methods, include, for example, internal welding systems and methods, tie-in welding system and methods, pipe inspection systems and methods, pipe handling systems and methods, internal pipe cooling systems and methods, non-destructive testing systems and methods, as well as (Continued)

remote interface and database systems and methods (uLog), to name a few. The application further relates to welded pipes that result from some or all of such processes.

15 Claims, 185 Drawing Sheets

Related U.S. Application Data continuation-in-part of application No. 14/228,708, filed on Mar. 28, 2014, now Pat. No. 9,821,415, and a continuation-in-part of application No. 14/272,914, filed on May 8, 2014, now Pat. No. 10,040,141, and a continuation-in-part of application No. PCT/US2015/022665, filed on Mar. 26, 2015, which is a continuation of application No. 14/228,708, filed on Mar. 28, 2014, now Pat. No. 9,821,415, said application No. 15/441,804 is a continuation-in-part of application No. PCT/US2015/047603, filed on Aug. 28, 2015, and a continuation of application No. PCT/US2015/062558, filed on Nov. 24, 2015, which is a continuation-in-part of application No. 14/228,708, filed on Mar. 28, 2014, now Pat. No. 9,821,415, and a continuation-in-part of application No. 14/272,914, filed on May 8, 2014, now Pat. No. 10,040,141, and a continuation-in-part of application No. PCT/US2015/047603, filed on Aug. 28, 2015.

(60) Provisional application No. 61/826,628, filed on May 23, 2013, provisional application No. 62/043,757, filed on Aug. 29, 2014, provisional application No. 62/175,201, filed on Jun. 12, 2015, provisional application No. 62/189,716, filed on Jul. 7, 2015.

(51) Int. Cl.

| | |
|---|---|
| ***B23K 37/00*** | (2006.01) |
| ***F28F 3/02*** | (2006.01) |
| ***B23K 9/028*** | (2006.01) |
| ***B23K 9/32*** | (2006.01) |
| *B23K 101/10* | (2006.01) |
| *B23K 103/04* | (2006.01) |

(52) U.S. Cl.
CPC .............. *B23K 37/003* (2013.01); *F28F 3/02* (2013.01); *B23K 2101/10* (2018.08); *B23K 2103/04* (2018.08)

(58) Field of Classification Search
CPC ......... B23K 9/325–326; B23K 37/0531–0533; B23K 9/028–0288; B23K 11/062; B23K 11/066; B23K 11/0873; B23K 11/0935; B23K 13/025; B23K 13/046; B23K 25/262–282; B23K 31/027; B23K 2101/04–125; F28F 3/02
See application file for complete search history.

(56) References Cited

U.S. PATENT DOCUMENTS 2,037,962 A 4/1936 Brown
2,259,367 A 10/1941 Ely
2,308,340 A 1/1943 Newlon
2,400,737 A 5/1946 Brown, Jr.
2,417,881 A * 3/1947 Munger .................. B29C 63/48 156/153
2,780,194 A 2/1957 Croswell
2,816,208 A 12/1957 Mcdowall
2,833,910 A 5/1958 Stanton
2,887,972 A 5/1959 Handley
2,936,517 A 5/1960 Brown, Jr.
3,008,037 A 11/1961 Harmes
3,009,048 A 11/1961 Carl
3,009,049 A 11/1961 Stanley
3,016,856 A 1/1962 Cummings
3,044,431 A 7/1962 Cummings
3,080,269 A * 3/1963 Pollock .................. B29C 49/26 156/87
3,110,277 A 11/1963 Dixon
3,164,712 A 1/1965 Evguenievich
3,194,466 A 7/1965 Davis
3,209,115 A 9/1965 Van Iperen
3,261,529 A 7/1966 Pagan
3,369,725 A 2/1968 Thomas
3,379,853 A 4/1968 Domizi
3,424,887 A 1/1969 Fehlman
3,425,455 A * 2/1969 Bauer .................. F16L 59/141 138/143
3,461,264 A 8/1969 Nelson
3,508,433 A 4/1970 Bustin
3,534,199 A 10/1970 Downey
3,539,915 A 11/1970 Walters
3,551,636 A 12/1970 Nelson
3,561,320 A 2/1971 Nelson
3,581,049 A 5/1971 Creith
3,611,541 A 10/1971 Garrett
3,612,808 A 10/1971 Nelson
3,633,813 A 1/1972 Looney
3,645,105 A 2/1972 Nolan, Jr.
3,646,309 A 2/1972 Smith, Jr.
3,668,359 A 6/1972 Emmerson
3,681,560 A 8/1972 Stanley
3,727,025 A 4/1973 Dibenedetto
3,741,457 A 6/1973 Gwin
3,748,426 A 7/1973 Stanley
3,750,451 A 8/1973 Nolan
3,761,005 A 9/1973 Baxter
3,764,056 A 10/1973 Edwards
3,765,665 A 10/1973 Work
3,806,694 A 4/1974 Randolph
3,841,547 A 10/1974 Bartley
3,857,162 A 12/1974 Hoffmann
3,895,209 A 7/1975 Moriki
3,904,845 A 9/1975 Minkiewicz
3,920,171 A 11/1975 Clavin
3,922,517 A 11/1975 Nelson
3,961,741 A 6/1976 Klein
3,974,356 A 8/1976 Nelson
3,979,041 A 9/1976 Kaneyama
3,992,818 A 11/1976 Clausen
4,019,016 A 4/1977 Friedman
4,039,115 A 8/1977 Randolph
4,084,739 A 4/1978 Koltz
4,092,950 A 6/1978 Hart
4,101,067 A 7/1978 Sloan
4,144,992 A 3/1979 Omae
4,145,593 A 3/1979 Merrick
4,145,594 A 3/1979 Koshiga
4,152,568 A 5/1979 Kiyoteru
4,213,345 A 7/1980 Dufour
4,215,809 A 8/1980 Davis
4,218,604 A 8/1980 Imai
4,223,197 A 9/1980 Imai
4,253,599 A 3/1981 Slavens
4,273,985 A 6/1981 Paton
4,283,617 A 8/1981 Merrick
4,285,460 A 8/1981 Clavin
4,306,134 A 12/1981 Slavens
4,310,737 A 1/1982 Paton
4,340,163 A 7/1982 Romashov
4,360,961 A 11/1982 Chlebowski
4,380,696 A 4/1983 Masaki
4,416,409 A * 11/1983 Muller ..................... B21K 1/24 228/104
4,436,974 A 3/1984 Lebedev
4,436,987 A * 3/1984 Thalmann ............. B29C 65/348 219/535
4,443,677 A 4/1984 Desaw

(56) References Cited

U.S. PATENT DOCUMENTS 4,483,106 A 11/1984 Wachs
4,491,718 A 1/1985 Cook
4,500,764 A 2/1985 Girodi
4,504,047 A 3/1985 Jantzen
4,531,192 A 7/1985 Cook
4,565,003 A 1/1986 McLeod
4,573,666 A 3/1986 Nomura
4,575,611 A 3/1986 Bertossa
4,582,241 A 4/1986 Johnson
4,634,040 A * 1/1987 Savard .................... F16L 13/02 228/119
4,638,984 A 1/1987 Puisais
4,666,138 A 5/1987 Dearman
4,667,936 A 5/1987 Hale, Jr.
4,712,720 A 12/1987 Tesch
4,715,809 A 12/1987 Langhoff
4,716,271 A 12/1987 Hulsizer
4,750,662 A 6/1988 Kagimoto
4,831,233 A 5/1989 Gordon
4,838,477 A 6/1989 Roach
4,839,495 A 6/1989 Kitera
4,851,639 A 7/1989 Sugitani
4,927,091 A 5/1990 Weiss
4,959,523 A 9/1990 Fihey
5,097,110 A 3/1992 Hamada
5,107,387 A 4/1992 Orton
5,136,452 A 8/1992 Orton
5,148,000 A 9/1992 Tews
5,165,160 A 11/1992 Poncelet
5,227,601 A 7/1993 Black
5,235,152 A 8/1993 Jankus
5,288,005 A 2/1994 Beakley
5,288,963 A 2/1994 Jusionis
5,343,016 A 8/1994 Davis
5,435,478 A 7/1995 Wood
5,435,479 A 7/1995 Puzey
5,474,225 A 12/1995 Geier
5,481,085 A 1/1996 Kovacevic
5,593,605 A 1/1997 Jones
5,601,225 A 2/1997 Wood
5,667,706 A 9/1997 Pirl
5,669,547 A 9/1997 Spring
5,685,996 A 11/1997 Ricci
5,685,999 A 11/1997 Wiedemann
5,706,863 A 1/1998 Matherne
5,728,992 A 3/1998 Swidwa
5,738,725 A 4/1998 Bernstein, Jr.
5,796,069 A 8/1998 Jones
5,816,479 A 10/1998 Matherne
5,837,966 A 11/1998 Timmons, Jr.
5,865,430 A 2/1999 Conover
5,925,268 A 7/1999 Britnell
6,022,506 A 2/2000 Simmons
6,027,007 A 2/2000 Bosio
6,044,769 A 4/2000 Oka
6,051,803 A 4/2000 Hale, Jr.
6,075,220 A 6/2000 Essien
6,084,203 A 7/2000 Bonigen
6,098,866 A 8/2000 Tsuchiya
6,109,503 A 8/2000 Parker
6,188,041 B1 2/2001 Kim
6,220,498 B1 4/2001 Gordon
6,230,072 B1 5/2001 Powell
6,290,786 B1 9/2001 Brown
6,325,277 B1 12/2001 Collie
6,333,699 B1 12/2001 Zierolf
6,417,488 B1 7/2002 Takeuchi
6,450,392 B1 * 9/2002 Nakamura ............. B23K 31/12 228/104
6,515,251 B1 2/2003 Wind
6,583,386 B1 6/2003 Ivkovich
6,596,961 B2 7/2003 Ehlers
6,605,800 B1 8/2003 Schick
6,752,175 B1 6/2004 Willschuetz
6,759,968 B2 7/2004 Zierolf
6,840,433 B2 1/2005 Vermaat
6,850,161 B1 2/2005 Elliott
6,909,066 B2 6/2005 Zheng
6,917,176 B2 7/2005 Schempf
6,924,452 B2 8/2005 Kimura
6,926,069 B1 8/2005 Roffelsen
7,014,100 B2 3/2006 Zierolf
7,032,809 B1 4/2006 Hopkins
7,091,447 B2 8/2006 Kim
7,114,881 B2 10/2006 Belloni
7,159,654 B2 1/2007 Ellison
7,182,025 B2 2/2007 Ghorbel
7,205,503 B2 4/2007 Reynolds
7,277,014 B1 10/2007 Waterhouse
7,282,663 B2 10/2007 Alford
7,474,221 B2 1/2009 Den Boer
7,484,625 B2 2/2009 Scott
7,510,218 B2 3/2009 Holdren
7,540,401 B2 6/2009 Vermaat
7,577,285 B2 8/2009 Schwarz
7,657,082 B2 2/2010 Kubo
7,661,574 B1 2/2010 McGushion
7,675,422 B2 3/2010 Stevens
7,677,439 B2 3/2010 Zierolf
7,688,210 B2 3/2010 Staff
7,713,000 B2 5/2010 Verkuijl
7,774,917 B2 8/2010 Anderson
7,780,065 B2 8/2010 Vermaat
7,798,023 B1 9/2010 Hoyt
7,802,714 B1 9/2010 Kuchuk-Yatsenko
7,915,561 B2 3/2011 Kossowan
7,966,860 B2 6/2011 Dijkstra
8,016,037 B2 9/2011 Bloom
8,091,775 B2 1/2012 Zierolf
8,115,138 B2 2/2012 Jacovetty
8,205,503 B2 6/2012 Cox
8,313,016 B2 11/2012 Dagenais
8,328,071 B2 12/2012 Lavalley
8,350,184 B2 1/2013 Behr
8,353,443 B2 1/2013 Sugiyama
8,378,841 B2 2/2013 Stevens
8,389,902 B2 3/2013 Mckinley
8,534,530 B2 9/2013 Biggs
8,590,769 B2 11/2013 Lavalley
8,658,941 B2 2/2014 Albrecht
8,689,836 B2 4/2014 Hudson
8,695,198 B2 4/2014 Dagenais
8,714,433 B1 5/2014 Snead
8,777,201 B2 7/2014 Dagenais
8,777,482 B2 7/2014 Pfitzner
8,782,863 B2 7/2014 Pfeiffer
8,800,575 B2 8/2014 Angel
8,857,700 B2 * 10/2014 Jackson ................ F16L 58/181 228/199
8,864,012 B2 10/2014 Bonelli
8,955,733 B2 2/2015 Vanderpol
8,973,244 B2 3/2015 Lavalley
9,030,324 B2 5/2015 Christiansen
9,038,670 B2 5/2015 Vinoy
9,183,222 B2 11/2015 Gale
9,304,204 B2 4/2016 Krauhausen
9,821,415 B2 11/2017 Rajagopalan
2001/0015349 A1 8/2001 Belloni
2001/0017292 A1 8/2001 Belloni
2002/0125295 A1 * 9/2002 Mudge, Jr. ............. B23K 37/06 228/50
2003/0188589 A1 * 10/2003 Harthorn .............. G01N 29/069 73/865.8
2004/0009042 A1 1/2004 Belloni
2004/0032597 A1 2/2004 Esmiller
2004/0099713 A1 5/2004 Laing
2004/0134970 A1 * 7/2004 Den Boer .............. B23K 31/12 228/104
2005/0087586 A1 4/2005 Vermaat
2005/0103766 A1 5/2005 Iizuka
2005/0247686 A1 11/2005 Child
2006/0070987 A1 4/2006 Daniel
2007/0000972 A1 1/2007 Koga
2007/0023185 A1 2/2007 Hall

(56) References Cited

U.S. PATENT DOCUMENTS

2007/0023479 A1 2/2007 Koppert
2007/0145129 A1 6/2007 Perkin
2007/0210047 A1 9/2007 Child
2007/0256288 A1 11/2007 Vermaat
2008/0237308 A1* 10/2008 Den Boer ............. B23K 20/14 228/164
2009/0019783 A1 1/2009 Amano
2009/0078742 A1 3/2009 Pasquali
2009/0212024 A1 8/2009 Mueller
2009/0230120 A1 9/2009 Yang
2009/0307891 A1 12/2009 Offer
2010/0051672 A1 3/2010 Nunnery
2010/0065614 A1* 3/2010 Cittadini Bellini .......................... B29C 66/12821 228/176
2010/0126968 A1 5/2010 Page
2010/0143041 A1* 6/2010 Bregonzio ........... B23K 9/0286 405/154.1
2010/0230953 A1 9/2010 Baylot
2010/0254687 A1* 10/2010 George ................ F16L 58/181 392/407
2011/0107571 A1 5/2011 Kerdiles
2011/0192569 A1 8/2011 Mckinley
2011/0198316 A1 8/2011 Legori
2011/0248072 A1* 10/2011 Leiden .................. B05D 7/148 228/199
2011/0296923 A1* 12/2011 Cataldo ................ G01N 29/043 73/632
2011/0297316 A1 12/2011 Jackson
2012/0031878 A1* 2/2012 Rukavina Mikusic ..................... B29C 66/71 219/59.1
2012/0061452 A1 3/2012 Wolstenholme
2012/0074631 A1 3/2012 Dagenais
2012/0126008 A1 5/2012 Binmore
2012/0174372 A1 7/2012 Dagenais
2012/0177165 A1* 7/2012 Kawase ................. G21C 21/00 376/249
2012/0187096 A1 7/2012 Schmid
2012/0201348 A1 8/2012 Knight
2012/0213937 A1 8/2012 Lavalley
2012/0215354 A1 8/2012 Krasny
2012/0231168 A1* 9/2012 Leiden ................. B29C 48/157 427/359
2012/0257042 A1 10/2012 Mckaigue
2012/0297652 A1 11/2012 Halvorsen
2013/0008548 A1 1/2013 Bowers
2013/0026148 A1 1/2013 Aoyama
2013/0048619 A1 2/2013 Doyle
2013/0075380 A1 3/2013 Albrech
2013/0112677 A1 5/2013 Christopher
2013/0119037 A1 5/2013 Daniel
2013/0126497 A1 5/2013 Miller
2013/0126503 A1 5/2013 Mckinley
2013/0200057 A1 8/2013 Miller
2013/0306710 A1 11/2013 Kim
2014/0001166 A1 1/2014 Peters
2014/0006227 A1 1/2014 Griggs
2014/0042207 A1 2/2014 Lavalley
2014/0091129 A1 4/2014 Peters
2014/0107947 A1 4/2014 Papadimitriou
2014/0131333 A1 5/2014 Zhang
2014/0137389 A1 5/2014 Dagenais
2014/0191904 A1 7/2014 Illerhaus
2014/0217154 A1 8/2014 Obaditch
2014/0253263 A1* 9/2014 Federmann ............ H01P 1/266 333/81 B
2014/0266009 A1 9/2014 Comello
2014/0294285 A1 10/2014 Duckworth
2014/0306445 A1* 10/2014 Boyd ................. F16L 13/0272 285/55
2014/0346163 A1 11/2014 Rajagopalan
2015/0034629 A1 2/2015 Sherrill
2015/0044320 A1* 2/2015 George ............... B29C 45/1744 425/186
2015/0083785 A1 3/2015 Park
2015/0108223 A1 4/2015 Weitzhandler
2015/0114507 A1 4/2015 Warren
2015/0129579 A1 5/2015 Traver
2015/0146216 A1 5/2015 Krauhausen
2015/0226872 A1 8/2015 Doany
2015/0248569 A1 9/2015 Rushing
2015/0273636 A1* 10/2015 Rajagopalan ...... B23K 37/0531 165/200
2015/0298238 A1 10/2015 Van Rensburg
2015/0330551 A1 11/2015 Van Nie
2015/0352653 A1 12/2015 Albrecht
2015/0360332 A1 12/2015 Singh
2016/0032707 A1 2/2016 Bowman
2016/0032713 A1 2/2016 Hallundbæk
2016/0114418 A1 4/2016 Jones
2016/0114436 A1* 4/2016 Lacome ............ B23K 37/0531 29/559
2016/0221107 A1 8/2016 Kadlec
2016/0256961 A1 9/2016 Clemmons
2017/0080518 A1* 3/2017 Toguyeni ............ B23K 20/126
2017/0080519 A1* 3/2017 Atin .................. B23K 37/0276
2017/0144256 A1 5/2017 Tao
2017/0182605 A1* 6/2017 Rajagopalan ........ B23K 9/0282
2017/0274467 A1 9/2017 Rajagopalan
2018/0001422 A1 1/2018 Rajagopalan
2018/0029154 A1* 2/2018 Rajagopalan ........ B23K 9/0286
2018/0031152 A1* 2/2018 Rajagopalan ........ B23K 31/125
2018/0043452 A1* 2/2018 Daney ................. B23K 9/0286
2018/0117718 A1* 5/2018 Rajagopalan ...... B23K 37/0531
2018/0185951 A1 7/2018 Lanz
2018/0221984 A1* 8/2018 Toguyeni ................. B23P 6/04
2018/0363809 A1* 12/2018 Bang ...................... B05D 1/265
2019/0009354 A1* 1/2019 Atin .................. B23K 37/0217
2019/0176260 A1 6/2019 Kadlec

FOREIGN PATENT DOCUMENTS

CA 2141524 8/1995
CA 2721167 10/2009
CA 2838608 12/2012
CN 1069213 2/1993
CN 1468160 1/2004
CN 2825214 10/2006
CN 101332550 12/2008
CN 201273837 7/2009
CN 202188887 4/2012
CN 103495795 1/2014
CN 103826788 5/2014
CN 104010756 8/2014
CN 104209626 12/2014
CN 104602851 5/2015
CN 105675097 6/2016
CN 106425045 2/2017
DE 202006004122 5/2006
EP 0119636 9/1984
EP 0193812 9/1986
EP 0300458 1/1989
EP 1100290 A2 * 5/2001 ............. F16L 59/20
EP 1985405 10/2008
EP 2340908 7/2011
EP 3106951 12/2016
GB 1261814 1/1972
GB 1283922 8/1972
GB 1386926 3/1975
GB 2214118 8/1989
JP 53113736 10/1978
JP 55027422 2/1980
JP 55040040 3/1980
JP 55156695 12/1980
JP 56148475 11/1981
JP 58145394 8/1983
JP 58212890 12/1983
JP 5930495 2/1984
JP 59110476 6/1984
JP 60072673 4/1985
JP S6071145 4/1985

(56) References Cited

FOREIGN PATENT DOCUMENTS

| | | | |
|---|---|---|---|
| JP | 60082284 | 5/1985 | |
| JP | S61159275 | 7/1986 | |
| JP | 01224167 | 9/1989 | |
| JP | 02104474 | 4/1990 | |
| JP | 2127976 | 5/1990 | |
| JP | 03013270 | 1/1991 | |
| JP | 03090282 | 4/1991 | |
| JP | 03090283 | 4/1991 | |
| JP | 05000374 | 1/1993 | |
| JP | 05069131 | 3/1993 | |
| JP | H0740216 | 2/1995 | |
| JP | 07116842 | 5/1995 | |
| JP | 07155949 | 6/1995 | |
| JP | 10244367 | 9/1998 | |
| JP | 1110486 | 1/1999 | |
| JP | 2001170784 | 6/2001 | |
| JP | 2007205941 | 8/2007 | |
| JP | 2008212994 | 9/2008 | |
| JP | 2011177016 | 9/2011 | |
| JP | 2012218031 | 11/2012 | |
| JP | 5313025 B2 * | 10/2013 | |
| JP | 59092194 | 10/2013 | |
| KR | 20050040883 | 5/2005 | |
| KR | 100598523 | 7/2006 | |
| KR | 101143532 | 5/2012 | |
| KR | 20120044131 | 5/2012 | |
| KR | 101308526 B1 * | 9/2013 | |
| RU | 2218251 | 12/2003 | |
| RU | 2420686 | 6/2011 | |
| SU | 1199544 | 12/1985 | |
| SU | 1741999 | 6/1992 | |
| WO | 8705840 | 10/1987 | |
| WO | 9006205 | 6/1990 | |
| WO | 9705983 | 2/1997 | |
| WO | 0041488 | 7/2000 | |
| WO | 0041843 | 7/2000 | |
| WO | 0041845 | 7/2000 | |
| WO | 0170446 | 9/2001 | |
| WO | 0200385 | 1/2002 | |
| WO | 0249799 | 6/2002 | |
| WO | 2007097589 | 8/2007 | |
| WO | 2009059776 | 5/2009 | |
| WO | 2010002269 | 1/2010 | |
| WO | 2010046390 | 4/2010 | |
| WO | 2011012998 | 2/2011 | |
| WO | 2013171589 | 11/2013 | |
| WO | 2013172244 | 11/2013 | |
| WO | 2014190156 | 11/2014 | |
| WO | WO-2015017938 A1 * | 2/2015 | .......... F16L 58/1054 |
| WO | 2015148765 | 10/2015 | |
| WO | 2016033568 | 3/2016 | |
| WO | 2016153562 | 9/2016 | |

OTHER PUBLICATIONS

Preliminary Office Action issued in corresponding Brazilian Patent Application No. 112016022229-6, dated Jan. 14, 2020.
Notice of Allowance issued in corresponding U.S. Appl. No. 15/560,954, dated Feb. 13, 2020.
Third Office Action issued in corresponding Chinese Patent Application No. 201580080511.1, dated Mar. 3, 2020.
Office Action issued in corresponding Canadian Patent Application No. 2,942,368, dated Apr. 2, 2020.
Non-Final Office Action issued in corresponding U.S. Appl. No. 15/506,818, dated Feb. 27, 2020.
Office Action issued in corresponding Canadian Patent Application No. 2,912,600, dated May 1, 2020.
Fourth Office Action issued in corresponding Chinese Patent Application No. 2015800453907.7, dated May 26, 2020.
Preliminary Office Action issued in corresponding Brazilian Patent Application No. BR112017003933-8, dated Jun. 2, 2020.
Examination Report issued in corresponding Australian Patent Application No. 2015387441, dated Jun. 9, 2020.
Final Office Action issued in corresponding U.S. Appl. No. 15/632,061, dated Jun. 12, 2020.
Notice of Allowance issued in corresponding U.S. Appl. No. 15/506,818, dated Jul. 6, 2020.
Examination Report issued in corresponding Australian Patent Application No. 2015308646, dated Jul. 21, 2020.
"Explorer II—Wireless Self-powered Visual and NDE Robotic Inspection System for Live Gas Pipelines", National Energy Technology Laboratory, DE-FC26-04NT42264, downloaded from URL: http://www.netl.doe.gov/research/oil-and-gas/project-summaries/completed-td/de-fc26-04nt42264 (4 pages).
"Final Report: Explorer-II: Wireless Self-powered Visual and NDE Robotic Inspection System for Live Gas Distribution Mains", Oil & Natrural Gas Technology, DE-FC26-04NT-42264, downloaded from URL: https://www.netl.doe.gov/File%20Library/Research/Oil-Gas/NT42264_FinalReport.pdf (120 pages).
Non-Final Office Action dated Aug. 11, 2016 in corresponding U.S. Appl. No. 14/272,914.
International Search Report dated Jul. 23, 2015 in corresponding International Patent Application No. PCT/US2015/022665.
Final Office Action issued in corresponding U.S. Appl. No. 14/272,914 dated Jan. 26, 2017.
International Search Report and the Written Opinion of the International Searching Authority dated Mar. 29, 2016 in corresponding International Application No. PCT/US2015/062558 (46 pages).
Non-Final Office Action issued in corresponding U.S. Appl. No. 14/228,708, dated Mar. 1, 2017.
Extended European Search Report, including Search Opinion, issued in corresponding European Patent Application No. 14800710.7, dated Jan. 23, 2017.
Non-Final Office Action dated Jun. 20, 2016 in corresponding U.S. Appl. No. 14/228,708 (12 pages).
International Preliminary Report on Patentability issued in corresponding International Patent Application No. PCT/US2015/047603, dated Mar. 9, 2017.
International Search Report and Written Opinion issued for corresponding International Patent Application No. PCT/US2015/047603, dated Jan. 5, 2016 (16 pages).
International Search Report and Written Opinion issued for corresponding International Patent Application No. PCT/US2015/022665, dated Jul. 23, 2015 (11 pages).
International Preliminary Report on Patentability issued for corresponding International Patent Application No. PCT/US2015/022665, dated Oct. 13, 2016 (10 pages).
Examination Report issued for corresponding Australian Patent Application No. 2014268528, dated Apr. 28, 2017.
Examination Report issued for corresponding Chinese Patent Application No. 201480029722.8, dated May 15, 2017.
Examination Report issued for corresponding Chinese Patent Application No. 201480029722.8, dated Jul. 18, 2016.
Search Report and Written Opinion issued for corresponding International Application No. PCT/US2014/039148, dated Oct. 1, 2014.
International Preliminary Report on Patentability issued for corresponding International Application No. PCT/US2014/039148, dated Dec. 3, 2015.
Non-Final Office Action issued in corresponding U.S. Appl. No. 14/272,914, dated Aug. 24, 2017.
Notice of Allowance issued in corresponding U.S. Appl. No. 14/228,708, dated Jul. 17, 2017.
Office Action issued in corresponding Chinese Patent Application No. 201580016820.2, dated Jul. 19, 2017.
International Preliminary Report on Patentability issued for corresponding International Patent Application No. PCT/US2015/062558, dated Oct. 5, 2017.
Extended European Search Report, including Search Opinion, issued in corresponding European Patent Application No. 15768987.8, dated Oct. 20, 2017.
Search Report and Written Opinion issued for corresponding International Application No. PCT/US2017/042612, dated Nov. 13, 2017.
Search Report and Written Opinion issued for corresponding International Application No. PCT/IB2017/055221, dated Nov. 30, 2017.

(56) References Cited

OTHER PUBLICATIONS

Final Office Action issued in corresponding U.S. Appl. No. 14/272,914 dated Jan. 25, 2018.
Notice of Allowance issued in corresponding U.S. Appl. No. 14/272,914, dated Apr. 6, 2018.
Office Action issued in corresponding Chinese Patent Application No. 201580016820.2, dated Apr. 4, 2018.
Office Action issued in corresponding Chinese Patent Application No. 201580045390.7, dated Apr. 10, 2018.
Office Action and Search Report issued in corresponding Russian Patent Application No. 2015154971, dated Apr. 27, 2018.
Examination Report issued for corresponding Chinese Patent Application No. 201480029722.8, dated Apr. 4, 2018.
European Search Report issued for corresponding European Patent Application No. 15836899.3, dated May 24, 2018.
Non-Final Office Action issued in corresponding U.S. Appl. No. 15/441,804, dated Jul. 30, 2018.
Non-Final Office Action issued in corresponding U.S. Appl. No. 15/714,117, dated Sep. 17, 2018.
Final Office Action issued in corresponding U.S. Appl. No. 15/441,804, dated Jan. 23, 2019.
Extended Search Report issued for corresponding European Patent Application No. 15886707.7, dated Nov. 13, 2018.
Office Action issued in corresponding Russian Patent Application No. 2016142270/06(067667), dated Nov. 15, 2018.
Office Action issued in corresponding Chinese Patent Application No. 201580080511.1, dated Dec. 3, 2018.
Examination Report issued for corresponding Australian Patent Application No. 2015236037, dated Jan. 4, 2019.
Decision to Grant issued in corresponding Russian Patent Application No. 2016142270, dated Feb. 12, 2019.
Official Action issued in corresponding Russian Patent Application No. 2017110223, dated Jan. 31, 2019.
Official Action issued in corresponding Malaysian Patent Application No. PI2015704216, dated Mar. 29, 2019.
Second Office Action issued in corresponding Chinese Patent Application No. 201580045390.7, dated Mar. 4, 2019.
Final Office Action issued in corresponding U.S. Appl. No. 15/714,117, dated Feb. 15, 2019.
Examination Report issued for corresponding European Patent Application No. 14800710.7, dated Feb. 7, 2019.
Notice of Allowance issued in corresponding U.S. Appl. No. 15/441,804, dated Jul. 3, 2019.
Non-Final Office Action issued in corresponding U.S. Appl. No. 15/714,117, dated Jun. 19, 2019.
Official Action issued in corresponding Mexican Patent Application No. MX/a/2017/002690, dated May 7, 2019.
Decision to Grant issued in corresponding Russian Patent Application No. 2015154971, dated Apr. 22, 2019.
Office Action issued for corresponding Russian Patent Application No. 2017134991/02(061281), dated May 29, 2019.
Fourth Office Action issued in corresponding Chinese Patent Application No. 201580080511.1, dated Aug. 19, 2020.
Second Office Action issued in corresponding Canadian Patent Application No. 2,912,600, dated Sep. 23, 2020.
Office Action issued in corresponding Russian Patent Application No. 2018120317, dated Oct. 5, 2020.
First Office Action issued in corresponding Chinese Patent Application No. 201910006036.3, dated Nov. 3, 2020.
English Translation of the Official Action issued in corresponding Brazilian Patent Application No. 112016022229-6, dated Dec. 1, 2020.
Second Examination Report issued in corresponding Australian Patent Application No. 2015387441, dated Dec. 21, 2020.
Examination Report issued in corresponding Malaysian Patent Application No. PI 2017700232, dated Dec. 26, 2020.
Decision to Grant issued in corresponding Russian Patent Application No. 2017134991, dated Aug. 29, 2019.
Third Office Action issued in corresponding Chinese Patent Application No. 201580045390.7, dated Sep. 20, 2019.
Preliminary Office Action Report issued in corresponding Brazilian Patent Application No. BR112017020431-2, dated Oct. 1, 2019.
Notice of Allowance issued in corresponding U.S. Appl. No. 15/714,117, dated Oct. 28, 2019.
"Quick Start of Carbon Dioxide Gas Shielded Welding Technology", Qiu Yanlong, et al, Shanghai Science and Technology Press, pp. 170-174, Jun. 2011.
Extended European Search Report, including Search Opinion, issued in corresponding European Patent Application No. 17914653.5, dated Feb. 25, 2021.
Examination Report issued in corresponding Australian Patent Application No. 2015308646, dated Mar. 4, 2021.
Office Action issued in corresponding Brazilian Patent Application No. 11 2017 020431 2, dated Mar. 30, 2021.
First Office Action issued in corresponding Chinese Patent Application No. 201780003163.7, dated Apr. 27, 2021.
Technical Examination Report issued for corresponding Brazilian Patent Application No. BR112015029273-9, dated Jun. 20, 2019.
Notice of Acceptance issued for corresponding Australian Patent Application No. 2015236037, dated Jul. 19, 2019.
International Preliminary Report on Patentability issued for corresponding International Application No. PCT/US2017/042612, dated Jul. 30, 2019.
Examination Report issued for corresponding European Patent Application No. 15836899.3, dated Aug. 8, 2019.
Second Office Action issued in corresponding Chinese Patent Application No. 201580080511.1, dated Aug. 26, 2019.
Office Action issued in corresponding Canadian Patent Application No. 2,956,318, dated Jun. 29, 2021.
Preliminary Office Action issued in corresponding Brazilian Patent Application No. BR11201718006177-8, dated Jul. 20, 2021.
Non-Final Office Action issued in corresponding U.S. Appl. No. 15/632,061, dated Aug. 9, 2021.

* cited by examiner

| | | Manual Down | Manual Up |
|---|---|---|---|
| **Pipe** | | | |
| Pipe | | Enabled | |
| PQR Number | | DEMO ONLY | |
| Pipe Diameter | in | 22.0 | |
| **Pass** | | | |
| Pass | | Enabled | |
| Pendulum Length | in | 5.000 | |
| Wire Protrusion Length | in | 1.000 | |
| Spool Weight | lb | 6.0 | |
| Wire Diameter | in | 0.035 | |
| Band Diameter | in | 1.0 | |
| Diameter at Welding Surface | in | 20.0 | |
| Tilt Based Welding | | Enabled | |
| Weld Direction | | Downhill | |
| Welding Power Supply | | Lincoln S350 | |
| Cable Resistance | Ohm | 0.1000 | |
| Power Supply Regulated By | | Power Supply | |
| Electrode Polarity | | Positive | |
| Detect Current Before Oscillating | | No | |
| Gas Valve | | Two | |
| Pre Purge Time | s | 0.200 | |
| Post Purge Time | s | 0.200 | |
| Blow Wire In Puddle Delay | s | 0.200 | |
| Blow Wire In Puddle Period | s | 0.200 | |
| **Zone** | | | |
| Zone | | Enabled | Enabled |
| Pendant Zone Name | | Down | Up |
| Pot Function | | TrvSpd | TrvSpd |
| Stop Weld If Out of Limits | | No | No |
| Stop Weld On Sensing Error | | No | No |
| Adjust Trim With Target | | No | No |
| Zone Ending Angle | deg | 180 | 359 |
| Weld Start Travel Delay | s | 0.100 | 0.100 |
| **Travel Setup** | | | |
| Travel Speed | in/min | 13.5 | 10.00 |
| Travel Ramp Up Time | s | 0.100 | 0.100 |
| Travel Ramp Down Time | s | 0.100 | 0.100 |
| Travel Speed High Limit | in/min | 15.0 | 15.0 |
| Travel Speed Low Limit | in/min | 5.0 | 5.0 |
| **Oscillation Setup** | | | |
| Oscillation Width | in | 0.090 | 0.150 |
| Beats/Minute | Cyc/min | 160 | 130 |
| Left Dwell | s | 0.050 | 0.100 |
| Right Dwell | s | 0.050 | 0.100 |
| Width Increment | in | 0.010 | 0.010 |
| Oscillation Center Increment | in | 0.010 | 0.010 |
| Oscillation Width High Limit | in | 2.000 | 0.250 |
| Oscillation Width Low Limit | Cyc/min | 0.045 | 0.045 |
| Oscillation Frequency High Limit | Cyc/min | 300 | 300 |
| Oscillation Frequency Low Limit | Cyc/min | 1 | 1 |
| Oscillation Frequency Increment | Cyc/min | 10 | 10 |
| Dwell High Limit | s | 1.000 | 1.000 |
| Dwell Low Limit | s | 0.000 | 0.000 |
| Dwell Increment | s | 0.020 | 0.020 |
| **Wire Setup** | | | |
| Wire Speed | in/min | 180.0 | 180.0 |
| Wire Speed Ramp Up Time | s | 0.100 | 0.100 |
| Wire Speed Ramp Down Time | s | 0.100 | 0.100 |
| Wire Speed High Limit | in/min | 225.0 | 225.0 |
| Wire Speed Low Limit | in/min | 90.0 | 90.0 |
| **Arc Start Setup** | | | |
| Arc Start Period | s | 0.000 | 0.000 |
| Arc Start Process | | Short | Short |
| Arc Start Program/Mode | | 308 | 308 |
| Arc Start Work Point Type | | WireSp | WireSp |
| Arc Start Voltage | V | 20.50 | 19.00 |
| Arc Start Work Point Speed | in/min | 90.0 | 90.0 |
| Arc Start Work Point Amps | Amp | 0.0 | 0.0 |
| Arc Start Work Point Power | W | 0 | 0 |

| | | | |
|---|---|---|---|
| **Arc Synergic Setup** | | | |
| Arc Process | | Short | Short |
| Arc Program/Mode | | 308 | 308 |
| Trim | | 0.00 | 0.00 |
| Trim High Limit | | 0.00 | 0.00 |
| Trim Low Limit | | 0.00 | 0.00 |
| Trim Range High | | 0.00 | 0.00 |
| Trim Range Low | | 0.00 | 0.00 |
| Work Point Type | | WireSp | WireSp |
| Work Point Speed Offset | in/min | 0.0 | 0.0 |
| Work Point Speed High Limit | in/min | 225.0 | 225.0 |
| Work Point Speed Low Limit | in/min | 90.0 | 90.0 |
| Work Point Speed Range High | in/min | 225.0 | 225.0 |
| Work Point Speed Range Low | in/min | 90.0 | 90.0 |
| **Lincoln S350 Setup** | | | |
| Work Point Amps | Amp | 0.0 | 0.0 |
| Work Point Power | W | 0 | 0 |
| Wave Control 1 | | 400.00 | 370.00 |
| Wave Control 2 | | 60.00 | 65.00 |
| Wave Control 3 | | 0.00 | 0.00 |
| Wave Control 4 | | 0.00 | 0.00 |
| Work Point Amps High Limit | Amp | 0.0 | 0.0 |
| Work Point Amps Low Limit | Amp | 0.0 | 0.0 |
| Work Point Power High Limit | W | 0 | 0 |
| Work Point Power Low Limit | W | 0 | 0 |
| Wave Control 1 High Limit | | 546.00 | 546.00 |
| Wave Control 1 Low Limit | | 14.00 | 14.00 |
| Wave Control 2 High Limit | | 190.00 | 190.00 |
| Wave Control 2 Low Limit | | 10.00 | 10.00 |
| Wave Control 3 High Limit | | 10.00 | 10.00 |
| Wave Control 3 Low Limit | | 0.00 | 0.00 |
| Wave Control 4 High Limit | | 10.00 | 10.00 |
| Wave Control 4 Low Limit | | -10.00 | -10.00 |
| **Short Arc Control Setup** | | | |
| Arc Voltage | V | 20.00 | 18.50 |
| Arc Voltage High Limit | V | 22.00 | 22.00 |
| Arc Voltage Low Limit | V | 19.00 | 16.00 |
| Arc Voltage Range High | V | 38.00 | 38.00 |
| Arc Voltage Range Low | V | 10.00 | 10.00 |
| Proportional Gain | V/V | 0.000 | 0.000 |
| Integral Gain | V/(V*s) | 0.000 | 0.000 |
| Differential Gain | V/(V/s) | 0.000 | 0.000 |
| Integral Limit | V*s | 2.000 | 2.000 |
| Bias | V | 0.000 | 0.000 |
| **Arc Termination Setup** | | | |
| Work Point Ramp Down Time | s | 0.050 | 0.050 |
| Ending Work Point Speed | in/min | 90.0 | 90.0 |
| Ending Arc Voltage | V | 19.00 | 17.00 |
| Ending Work Point Amps | Amp | 0.0 | 0.0 |
| Ending Work Point Power | W | 0 | 0 |
| Crater Fill Time | s | 0.030 | 0.030 |
| Burn Back Time | s | 0.030 | 0.030 |
| Torch Pullback Didstance | in | 0.200 | 0.200 |
| Wire Pullback Distance | in | 0.000 | 0.000 |
| **Stick Out Setup** | | | |
| Tracking With | | Volts | Volts |
| Vertical Target Volts | V | 16.50 | 16.50 |
| Vertical Target Amps | Amp | 200.0 | 180.0 |
| Vertical Target Resistance | Ohm | 0.1550 | 0.1550 |
| Vertical Target Volts Increment | V | 0.50 | 0.50 |
| Vertical Target Amps Increment | Amp | 5.0 | 5.0 |
| Vertical Target Resistance Increment | Ohm | 0.0050 | 0.0050 |
| Vertical Tracking Speed | in/min | 50.0 | 50.0 |
| Vertical Tracking Gain Volts | mil/V | 10.0 | 10.0 |
| Vertical Tracking Gain Amps | mil/A | 0.01 | 0.01 |
| Vertical Tracking Gain Resistance | in/Ohm | 1.00 | 1.00 |
| Vertical Target Volts High Limit | V | 25.00 | 25.00 |
| Vertical Target Volts Low Limit | V | 5.00 | 5.00 |
| Vertical Target Amps High Limit | Amp | 260.0 | 260.0 |
| Vertical Target Amps Low Limit | Amp | 100.0 | 100.0 |
| Vertical Target Resistance High Limit | Ohm | 0.5000 | 0.5000 |
| Vertical Target Resistance Low Limit | Ohm | 0.0500 | 0.0500 |
| Tracking Threshold Volts | V | 5.0 | 5.0 |
| Tracking Threshold Amps | Amp | 25.0 | 25.0 |

FIG. 72D

CLOUD BASED DATA LOGGING (ULOG)

CLOUD BASED DATA LOGGING (ULOG)

Get Log

| Weld | Event | Time | Zone | Tilt [deg] | Travel Speed [in] | Lead Volts [V] | Lead Amps [A] | Lead Wire Speed [in |
|---|---|---|---|---|---|---|---|---|
| 2101-R | 720637100 | 00:51:38:661 | 1T2T | 0 | 19.9 | 11.8 | 250 | 300 |
| 2101-R | 720637103 | 00:51:38:674 | 1T2T | 20 | 19.9 | 22.0 | 250 | 305 |
| 2101-R | 720637106 | 00:51:38:685 | 1T2T | 40 | 19.9 | 22.5 | 255 | 305 |
| 2101-R | 720637109 | 00:51:38:695 | 1T2T | 60 | 19.9 | 22.4 | 245 | 295 |
| 2101-R | 720637112 | 00:51:38:706 | 1M2M | 80 | 18.9 | 20.0 | 230 | 300 |
| 2101-R | 720637115 | 00:51:38:716 | 1M2M | 100 | 18.9 | 20.5 | 235 | 255 |
| 2101-R | 720637118 | 00:51:38:726 | 1M2M | 120 | 18.9 | 20.1 | 232 | 253 |
| 2101-R | 720637121 | 00:51:38:737 | 1M2M | 140 | 18.9 | 20.8 | 238 | 258 |
| 2101-R | 720637124 | 00:51:38:747 | 1B2B | 160 | 17.9 | 18.0 | 210 | 200 |
| 2101-R | 720637127 | 00:51:38:757 | 1B2B | 180 | 17.9 | 18.5 | 215 | 205 |
| 2101-R | 720637130 | 00:51:38:767 | 1B2B | 190 | 17.9 | 17.5 | 205 | 195 |
| 2101-R | 720637133 | 00:51:38:778 | 1B2B | 200 | 17.9 | 18.8 | 217 | 206 |
| 2201-R | 720637100 | 00:51:38:661 | 1T2T | 0 | 19.9 | 11.8 | 250 | 300 |
| 2201-R | 720637103 | 00:51:38:674 | 1T2T | 20 | 19.9 | 20.5 | 250 | 305 |
| 2201-R | 720637106 | 00:51:38:685 | 1T2T | 40 | 19.9 | 22.5 | 255 | 305 |
| 2201-R | 720637109 | 00:51:38:695 | 1T2T | 60 | 19.9 | 22.4 | 245 | 295 |

Next | View By Bugtype | View By Station | View By Joint ID

FIG. 156

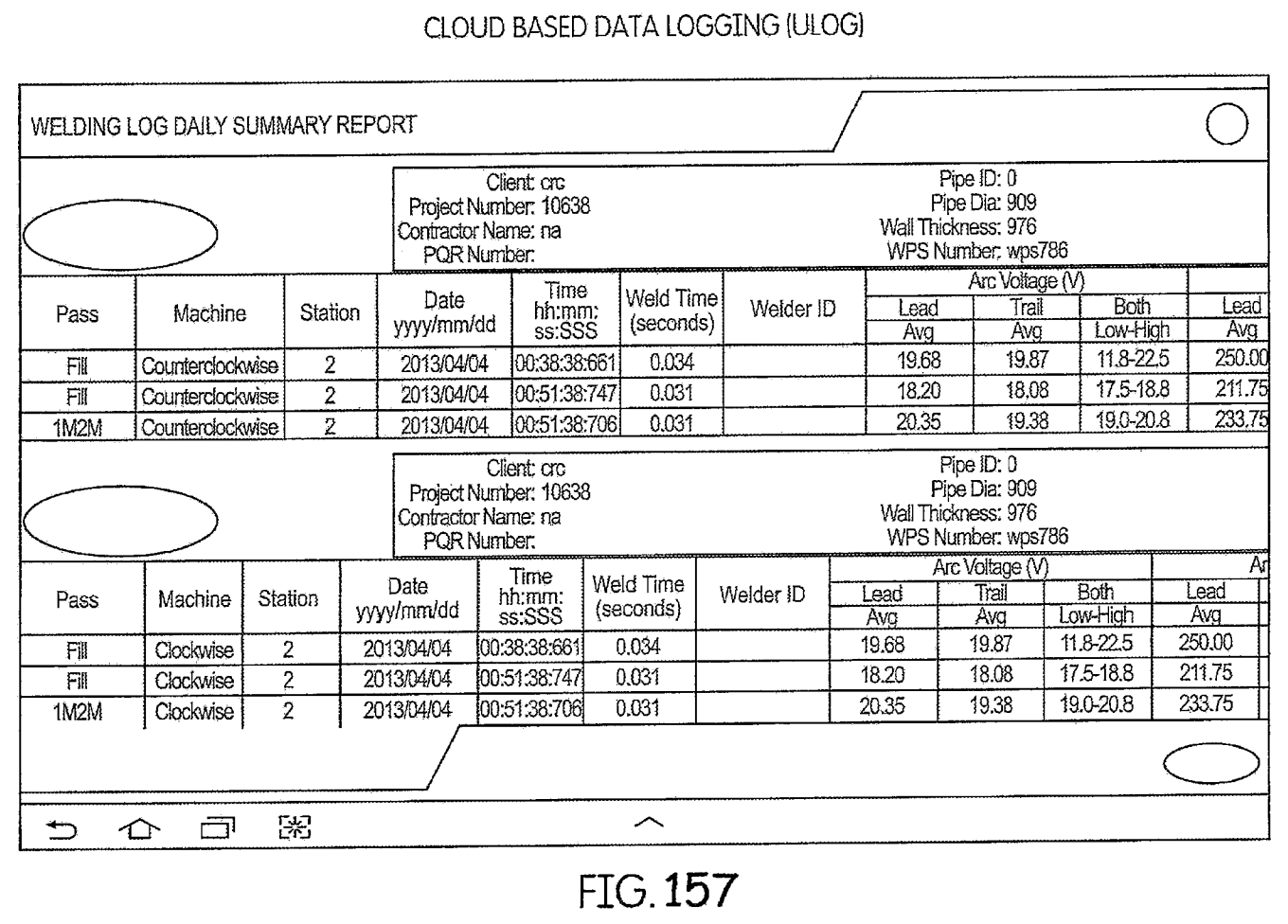

CLOUD BASED DATA LOGGING (ULOG)

WELDING LOG DAILY SUMMARY REPORT

Client: crc
Project Number: 10638
Contractor Name: na
PQR Number:

Pipe ID: 0
Pipe Dia: 909
Wall Thickness: 976
WPS Number: wps786

| Pass | Machine | Station | Date yyyy/mm/dd | Time hh:mm: ss:SSS | Weld Time (seconds) | Welder ID | Arc Voltage (V) | | | |
|---|---|---|---|---|---|---|---|---|---|---|
| | | | | | | | Lead Avg | Trail Avg | Both Low-High | Lead Avg |
| Fill | Counterclockwise | 2 | 2013/04/04 | 00:38:38:661 | 0.034 | | 19.68 | 19.87 | 11.8-22.5 | 250.00 |
| Fill | Counterclockwise | 2 | 2013/04/04 | 00:51:38:747 | 0.031 | | 18.20 | 18.08 | 17.5-18.8 | 211.75 |
| 1M2M | Counterclockwise | 2 | 2013/04/04 | 00:51:38:706 | 0.031 | | 20.35 | 19.38 | 19.0-20.8 | 233.75 |

Client: crc
Project Number: 10638
Contractor Name: na
PQR Number:

Pipe ID: 0
Pipe Dia: 909
Wall Thickness: 976
WPS Number: wps786

| Pass | Machine | Station | Date yyyy/mm/dd | Time hh:mm: ss:SSS | Weld Time (seconds) | Welder ID | Arc Voltage (V) | | | Ar |
|---|---|---|---|---|---|---|---|---|---|---|
| | | | | | | | Lead Avg | Trail Avg | Both Low-High | Lead Avg |
| Fill | Clockwise | 2 | 2013/04/04 | 00:38:38:661 | 0.034 | | 19.68 | 19.87 | 11.8-22.5 | 250.00 |
| Fill | Clockwise | 2 | 2013/04/04 | 00:51:38:747 | 0.031 | | 18.20 | 18.08 | 17.5-18.8 | 211.75 |
| 1M2M | Clockwise | 2 | 2013/04/04 | 00:51:38:706 | 0.031 | | 20.35 | 19.38 | 19.0-20.8 | 233.75 |

FIG. 157

CLOUD BASED DATA LOGGING (ULOG)

CLOUD BASED DATA LOGGING (ULOG)

SECTION A-A

DATA FLOW DIAGRAM (ULTRASONIC)

DATA FLOW DIAGRAM (RADIOGRAPHY)

SYSTEMS AND METHODS FOR USE IN WELDING PIPE SEGMENTS OF A PIPELINE

CROSS-REFERENCE TO RELATED APPLICATIONS

This application is a divisional of U.S. patent application Ser. No. 15/441,804, filed Feb. 24, 2017, now allowed, which is a continuation-in-part of U.S. patent application Ser. No. 14/228,708, filed Mar. 28, 2014, now U.S. Pat. No. 9,821,415. U.S. patent application Ser. No. 15/441,804 is also a continuation-in-part of U.S. patent application Ser. No. 14/272,914, filed May 8, 2014, now U.S. Pat. No. 10,040,141, which claims priority to U.S. Provisional Application No. 61/826,628, filed May 23, 2013. U.S. patent application Ser. No. 15/441,804 is also a continuation-in-part of International Patent Application No. PCT/US2015/022665, filed Mar. 26, 2015, which claims priority to U.S. patent application Ser. No. 14/228,708, filed Mar. 28, 2014, now U.S. Pat. No. 9,821,415. U.S. patent application Ser. No. 15/441,804 is also a continuation-in-part of International Patent Application No. PCT/US2015/047603, filed Aug. 28, 2015. U.S. patent application Ser. No. 15/441,804 is also a continuation of International Patent Application No. PCT/US2015/062558, filed Nov. 24, 2015, which is a continuation-in-part of U.S. patent application Ser. No. 14/228,708, filed Mar. 28, 2014, now U.S. Pat. No. 9,821,415; is a continuation-in-part of U.S. patent application Ser. No. 14/272,914, filed May 8, 2014, now U.S. Pat. No. 10,040,141, which claims priority to U.S. Provisional Application No. 61/826,628, filed May 23, 2013; which is a continuation-in-part of International Patent Application No. PCT/US2015/047603, filed Aug. 28, 2015, which claims priority to U.S. Provisional Application No. 62/043,757, filed Aug. 29, 2014; and which claims priority to U.S. Provisional Application No. 62/175,201, filed Jun. 12, 2015 and U.S. Provisional Application No. 62/189,716, filed Jul. 7, 2015. The contents of all of these applications are incorporated herein by reference in their entirety.

BACKGROUND

Each of the patents and patent applications listed above is incorporated by reference in its entirety into the present patent application. Such incorporation by reference should be understood to include, but not be limited to, each of the claims as originally filed in each of those patents and patent applications. The inventions specifically contemplated by this patent application include those disclosed herein, as well as those specifically claimed in the aforesaid applications that have been incorporated by reference herein.

FIELD

The present patent application relates to various field systems and methods that are used for the purpose of welding pipe segments of a pipeline.

Pipeline systems, which can include long stretches of pipe sections or segments (e.g., miles of pipe segments) comprising steel, stainless steel or other types of metal, are used to transport fluids such as water, oil, and natural gas between two locations (e.g., from a source of origin that may be land or water based to a suitable storage location). Construction of pipeline systems typically involves connection of pipe segments of suitable diameter and lengthwise dimensions together via weld joints, for example, capable of providing a liquid tight seal for the connected pipe segments.

During formation of a weld joint between two pipe segments (e.g., two pipe segments having the same or similar transverse cross-sectional dimensions), an end of one pipe section or segment is brought into close proximity or contact with an end of a second pipe section or segment. The pipe segments are held in relation to each other and a weld joint is formed to connect the two ends of the pipe segments using a suitable welding process. After the weld is complete and cleaned, the weld may be inspected. After inspection, it may be desirable to apply external protective coatings to the weld joint.

Conventional internal welders frequently include internal alignment mechanisms that expand radially outward to contact the interior of the pipe. Alignment of the two pipe segments is accomplished from inside when extension members of a central member contact the interior of the pipe relatively close to the pipe segment joint faces on either side of the joint as shown in U.S. Pat. Nos. 3,461,264; 3,009,048; 3,551,636; 3,612,808 and GB 1261814 (which is each incorporated herein by reference in its entirety). In order to weld the joint, the structure of the expander should be configured to allow sufficient space to accommodate a rotating torch. It would therefore be advantageous to provide internal alignment that allows sufficient space for a rotating or articulating torch or to align the pipe segments externally so as to eliminate the need for an internal expander which may create significant internal clutter.

In addition, the conventional process of internal welding usually involves internal or external alignment and an insertion of the internal welder so that torches align with the face joint. In this process it is sometimes difficult to assess the accuracy of positioning of the internal welder in general and the torch in particular. It is even more difficult to assess the accuracy of the position of the torch as the torch traverses the inside of the pipe along its orbital path during welding. It would therefore be advantageous to provide a system of tracking the structure of or positioning of pipe edges at the pipe interface in order to control the torch by use of the tracked condition of the interface. Specifically, it would be advantageous to first track a profile of the interface with a laser before sending a signal to an electronic controller to direct the position and orientation of the welding torch relative to the tracked pipe interface profile.

Furthermore, conventional pipeline welding systems that employ external alignment mechanisms typically support two segments on rollers and manipulate the position and orientation of the segments until alignment is satisfactory. Whether an alignment is satisfactory typically will depend, for example, on industry acceptable high-low gauges that are fairly accurate but are manually operated and positioned at discrete locations and not over the entire pipe interface. In any case, the profile or structure of the interface as observed from the inside of the pipe is not typically a consideration for quality of alignment. It would therefore be advantageous to provide an alignment system in which information about the interface profile as read by the laser is used as an input parameter during the external alignment process. Specifically, it would be advantageous to provide the information from the torch controlling laser to the controller which would utilize the information in controlling external alignment mechanisms.

Moreover, conventional pipeline systems for welding pipe segments will typically lack a capability to visually inspect the weld applied by the torch. It therefore would be advantageous to provide a camera that followed the torch weld application and a display for showing an image of the weld in order for an operator to visually inspect the quality of the weld. Other advantages of the present disclosure will be apparent by review of this disclosure. Patentable advantages are not limited to those highlighted in this section. In addition, the advantages addressed herein should be considered independent of one another and not reliant on one another unless specifically noted herein. Additional advantages are also described in the claims provided in this application.

In a welding operation, the pipes are typically preheated to a suitable temperature prior to welding, and a significant amount of heat is also generated during the welding process.

Sometime after the weld is complete and cleaned, the weld may be inspected. It is desirable to inspect the weld at a temperature closer to the pipe operating temperature than to the raised weld temperature. Therefore, cooling after the welding process may be desired before inspection. After inspection, it may be desirable to apply external protective coatings to the joint. To facilitate this coating, heat may be added to the pipe in order to raise the pipe temperature required for application of certain external coatings (e.g., polypropylene).

After such heating, the pipe connection is ideally be allowed to cool to a suitable temperature before further processing steps are performed occur (e.g., before spooling of the connected piping sections or handling/placement of the piping sections in water or at some other suitable location on land).

During some pipe fabrication steps (e.g., after welding and before inspection), external portions of the joined pipe are readily accessible and cooling at the external surface is an option. However, during some portions in the process (e.g., after certain materials have been externally applied to the outside surface of the pipe) the external surface is not available on which to conduct a pipe cooling process.

Internal cooling could be useful during certain portions of the fabrication process (i.e., even when external cooling is available). Internal cooling within the pipes can be challenging due to the size of the pipes and the difficulty of accessibility to the interior portion of the piping section that is located at or near the weld joint. It would therefore be especially desirable to provide internal cooling so that during portions of the process where external surfaces of the pipe are inaccessible, cooling can be implemented to more quickly condition the pipe for future steps that require lower temperatures (e.g., spooling).

Existing pipeline weld inspection processes such as ultrasonic testing and x-ray radiography can be challenging. For example, some processes may require a large team (e.g. 4, or more personnel) of highly trained personnel to travel to remote locations where the pipeline is being constructed; may require a ruggedized computer to be transported by dedicated truck to and used in remote locations with harsh environments; provide; use inspection equipment which is tethered by network wires ("tethered") to a dedicated ruggedized computer equipment and truck; may be inefficient because each member of the team may only be needed for certain steps of the process; require a highly trained technician on site to interpret the results of the test; and require that desired analysis be completed and the results written on the pipe before the team can move to inspect a next weld. Of course these are generalities, and not all of these issues are present in all systems.

Currently pipe joining technology remains an art relying on the avoidance of error by a worker applying a weld. Some welding technologies require adequate data management, work control and supervision of activities. As a result of such challenges, welding quality, completion time, and economics can also be challenging The present patent application provides improvements over prior art field systems and methods.

SUMMARY

The present application relates to a field system and methods that can be deployed in the application of pipe welding. The field system provides many embodiments relating to pipe welding systems and methods, that can be used in combination with one another, or individually. Such welding systems and methods, include, for example, internal welding systems and methods, tie-in welding system and methods, pipe inspection systems and methods, pipe handling systems and methods, internal pipe cooling systems and methods, non-destructive testing systems and methods, as well as remote interface and database systems and methods (uLog), to name a few. The application further relates to welded pipes that result from some or all of such processes.

One aspect of the present patent application provides a field system for welding two pipes. The field system includes a first pipe engagement structure; a second pipe engagement structure; an inspection detector; a motor; one or more processors; and a weld torch. The first pipe engagement structure is configured to engage the interior surface of a first pipe to enable the first pipe engagement structure to be fixed relative to the first pipe. The second pipe engagement structure is configured to engage the interior surface of a second pipe to enable the second pipe engagement structure to be fixed relative to the second pipe. The inspection detector is positioned between the first pipe engagement structure and the second pipe engagement structure, the inspection detector configured to emit an inspection beam of radiation. The motor is operatively associated with the inspection detector to direct the inspection beam of radiation along an interface region between the pipes. The one or more processors are operatively associated with the inspection detector to determine a profile of the interface region between the pipes. The weld torch is configured to create a weld between the pipes based on the profile of the interface region between the pipes.

Another aspect of the present patent application provides a field system for welding two pipes. The field system includes a first pipe engagement structure; a second pipe engagement structure; an inspection detector; one or more orientation motors; one or more processors; and a weld torch assembly. The first pipe engagement structure is configured to engage the interior surface of a first pipe to enable the first pipe engagement structure to be fixed relative to the first pipe. The second pipe engagement structure is configured to engage the interior surface of a second pipe to enable the second pipe engagement structure to be fixed relative to the second pipe. The inspection detector is positioned axially between the first pipe engagement structure and the second pipe engagement structure, the inspection detector configured to inspect an interface region between the pipes and generate profile data based thereon. The one or more orientation motors are operatively associated with the inspection detector to direct the inspection beam of radiation along the interface region between the pipes. The one or more processors are operatively associated with the inspection detector and configured to receive the profile data from the inspection detector to determine one or more characteristics of the interface region between the pipes. The weld torch assembly includes a weld torch and at least one weld torch motor, the weld torch and the at least one weld torch motor being actuated by the one or more processors to create a weld between the pipes based on the one or more characteristics of the interface region between the pipes.

Yet another aspect of the present patent application provides a field system for welding two pipes is provided. The field system includes a frame configured to be placed within the pipes; a plurality of rollers configured to rotatably support the frame; a drive motor that drives the rollers to move the frame within the pipes; a brake system that secures the frame from movement at a desired location within the pipes; an inspection detector carried by the frame, the inspection detector configured to detect a characteristic of an interface region between the pipes; a weld torch carried by the frame; one or more battery cells carried by the frame, the one or more battery cells configured to power the drive motor, the inspection detector and the weld torch; and one or more processors operatively connected with the drive motor, the inspection detector and the weld torch.

Yet another aspect of the present patent application provides a method for welding a pair of insulated pipes to one another. Each pipe includes a metal pipe interior surrounded by an insulator material. End portions of the pipes to be welded have the metal pipe interior exposed. The method includes aligning the exposed metal pipe ends to be welded, welding the exposed metal pipe ends to one another, heating the exposed end portions of the welded pipes, applying an insulator to the heated exposed end portions of the welded pipes such that the insulator is adhered to an exterior surface of the metal pipe interior, thus insulating the formerly exposed end portions of the pipes, and applying cooling energy from within the pipes to an interior surface of the metal pipes.

Yet another aspect of the present patent application provides a system for welding a pair of insulated pipes to one another. Each pipe comprises a metal pipe interior surrounded by an insulator material. End portions of the pipes to be welded have the metal pipe interior exposed. The system includes a weld torch configured to weld the exposed metal pipe ends to one another; a heater configured to heat the exposed end portions of the welded pipes; an insulator supply configured to apply insulator material to the heated exposed end portions of the welded pipes such that the insulator is adhered to an exterior surface of the metal pipe interior, thus insulating the formerly exposed end portions of the pipes; and a cooler system configured to be positioned within the pipes, the cooler system applying cooling energy to an interior surface of the metal pipes to facilitate cooling of the metal pipes after the insulator material is applied.

Yet another aspect of the present patent application provides a method for welding a pair of insulated pipes to one another. Each pipe includes a metal pipe interior surrounded by an insulator material. End portions of the pipes to be welded have the metal pipe interior exposed. The method includes aligning the exposed metal pipe ends to be welded, welding the exposed metal pipe ends to one another, heating the exposed end portions of the welded pipes, applying an insulator to the heated exposed end portions of the welded pipes such that the insulator is adhered to an exterior surface of the metal pipe interior, thus insulating the formerly exposed end portions of the pipes, and applying cooling energy from within the pipes to an interior surface of the metal pipes after applying the insulator; and performing a pipeline deployment procedure. Applying the cooling energy reduces a wait time between applying the insulator and performing the pipeline deployment procedure.

Yet another aspect of the present patent application provides a welded pipe assembly. The welded pipe assembly includes a first metal pipe having a length of at least 30' and an exterior diameter of less than 24"; a second metal pipe having a length of at least 30' and an exterior diameter of less than 24"; weld material connecting the first pipe with the second pipe, the weld material comprising a plurality of weld pass layers, the plurality of weld pass layers including a root pass layer and a hot pass layer disposed on top of the root pass layer, wherein the hot pass layer is positioned closer to an interior longitudinal axis of the welded first and second pipes than the root pass layer.

Yet another aspect of the present patent application provides a welded pipe assembly. The assembly includes a first metal pipe having a length of at least 30' and an exterior diameter of less than 24"; a second metal pipe having a length of at least 30' and an exterior diameter of less than 24"; a welded joint connecting the first metal pipe and the second metal pipe, the welded joint comprising a first internal bevel formed in the first metal pipe and a second internal bevel formed in the second metal pipe, and a root pass layer of weld material disposed in a region defined by the first internal bevel and the second internal bevel.

Yet another aspect of the present patent application provides a pipe cooling system. The pipe cooling system includes a frame, a plurality of rollers, a drive motor, a brake system, a cooler, and one or more processors. The frame is configured to be placed within welded pipes. The plurality of rollers is configured to rotatably support the frame. The drive motor drives the rollers to move the frame within the pipes. The brake system secures the frame from movement at a desired location within the pipes. The cooler is cooler carried by the frame, the cooler applying cooling energy to an interior surface of the metal pipes to facilitate cooling of the welded metal pipes. The one or more processors are operatively connected with the drive motor, the brake system and the cooler. The one or more processors operating the cooler to reduce the temperature of the welded pipes to a predetermined level.

Yet another aspect of the present patent application provides a welded pipe assembly. The welded pipe assembly includes a first metal pipe; a second metal pipe and weld material connecting the first metal pipe with the second metal pipe. The first metal pipe has a length of at least 30 feet and an exterior diameter of less than 24 inches. The second metal pipe has a length of at least 30 feet and an exterior diameter of less than 24 inches. The weld material includes a plurality of weld pass layers. The plurality of weld pass layers including a root pass layer and a hot pass layer disposed on top of the root pass layer. The hot pass layer is positioned closer to an interior longitudinal axis of the welded first and second pipes than the root pass layer.

Yet another aspect of the present patent application provides a welded pipe assembly. The welded pipe assembly includes a first metal pipe, a second metal pipe and a welded joint connecting the first metal pipe and the second metal pipe. The first metal pipe has a length of at least 30 feet and an exterior diameter of less than 24 inches. The second metal pipe has a length of at least 30 feet and an exterior diameter of less than 24 inches. The welded joint includes a first internal bevel formed in the first metal pipe and a second internal bevel formed in the second metal pipe, and a root pass layer of weld material disposed in a region defined by the first internal bevel and the second internal bevel.

Yet another aspect of the present patent application provides a field system for welding two pipes. The field system includes a first pipe engagement structure configured to engage the interior surface of a first pipe to enable the first pipe engagement structure to be fixed relative to the first pipe; a second pipe engagement structure configured to engage the interior surface of a second pipe to enable the second pipe engagement structure to be fixed relative to the second pipe; one or more weld torches configured to be positioned within the pipes to create an internal weld at an interface region between the pipes; a motor operatively associated with the one or more weld torches to rotate the one or more weld torch along the interface region between the pipes; and one or more processors that control the motor and the one or more weld torches, the one or more processors operating the motor and the one or more weld torches to generate a complete circumferential weld along the interface region by rotating the one or more weld torches along the interface region in a single rotational direction until the complete circumferential weld is completed.

Yet another aspect of the present patent application provides an inspection system for pre-inspecting an interface region between two pipes to be welded end-to-end. The system includes a frame configured to be placed within the pipes; a plurality of rollers configured to rotatably support the frame; a drive motor that drives the rollers to move the frame within the pipes; a brake system that secures the frame from movement at a desired location within the pipes; a sensor movable with the frame that detects the interface region between the pipes; an inspection detector configured to generate signals based upon a profile of the interface region between the pipes; a motor that rotationally moves the inspection detector along the interface region; and one or more processors operatively associated with the drive motor, the sensor, the inspection detector and the motor, the one or more processors operating the drive motor to move the frame through at least one of the pipes until the sensor detects the interface region, the one or more processors operating the brake system to secure the frame from movement at a location within the pipes that positions the inspection detector in relation to the interface region to enable the inspection detector to detect the profile of the interface region between the pipes; the one or more processors operating the inspection detector and the motor to scan the interface region between the pipes, and in response to detecting one or more undesirable characteristics of the interface region, the one or more processors sending instructions based thereon.

Yet another aspect of the present patent application provides a field system for pre-inspecting an interface region between two pipes to be welded end-to-end. The system includes a frame configured to be placed within the pipes; a plurality of rollers configured to rotatably support the frame; a drive motor that drives the rollers to move the frame within the pipes; a brake system that secures the frame from movement at a desired location within the pipes; an inspection detector configured to generate signals based upon a profile of the interface region between the pipes; one or more orientation motors that rotationally moves the inspection detector along the interface region; and one or more processors operatively associated with the drive motor, the inspection detector and the motor, the one or more processors operating the brake system to secure the frame from movement at a location within the pipes that positions the inspection detector in relation to the interface region to enable the inspection detector to detect the profile of the interface region between the pipes; the one or more processors operating the inspection detector and the motor to scan the interface region between the pipes to generate pre-weld profile data, and in response to detecting one or more undesirable characteristics of the pre-weld profile data, the one or more processors sending instructions based thereon.

Yet another aspect of the present patent application provides a method for pre-inspecting an interface region between two pipes to be welded end-to-end. The method includes moving a frame within at least one of the pipes to be welded; detecting the interface region between the pipes; securing the frame from movement at the interface region between the pipes; detecting a profile of the interface region between the pipes; and in response to detecting one or more undesirable characteristics of the interface region between the pipes, generating instructions based thereon.

Yet another aspect of the present patent application provides a pipe cooling system. The pipe cooling system includes a frame configured to be placed within welded pipes; a plurality of rollers configured to rotatably support the frame; a drive motor that drives the rollers to move the frame within the pipes; a brake system that secures the frame from movement at a desired location within the pipes; a cooler carried by the frame, the cooler applying cooling energy to an interior surface of the metal pipes to facilitate cooling of the welded metal pipes; and one or more processors operatively connected with the drive motor, the brake system and the cooler, the one or more processors operating the cooler to reduce the temperature of the welded pipes to a predetermined level.

One aspect of the present patent application provides a method of welding two pipes. The method includes internally clamping a first pipe with a first clamp; internally clamping a second pipe with a second clamp, the first and second pipes being clamped so that they are disposed in end-to-end adjacent relationship, with an interface region therebetween; scanning the interface region from a location within the pipes and between the clamps to obtain profile data from the interface region; welding the two pipes in end-to-end relationship based on the profile data; and internally inspecting the welded pipes from a location within the pipes and between the clamps One aspect of the present patent application provides a welding processing system for facilitating pipe welding remote from a field system for performing pipe weld operations between a first pipe and a second pipe. As an example, the remote field system comprises an inspection detector configured to emit an inspection beam of radiation to scan a profile of an interface region between the first and second pipes and a weld torch configured to create a weld between the first and second pipes based on the profile of the interface region between the first and second pipes. The welding processing system comprises: a receiver configured to receive, from the remote weld system, profile data determined from the scan of the interface region between the pipes by the inspection detector; one or more processors configured to compare one or more characteristics of the profile data of the scan of the interface region with one or more characteristics of predefined profile data of predetermined interface regions and configured to determine control operation data for the remote field system based on the comparison; and a transmitter configured to transmit the control operation data to the remote field system. The control operation data is configured to cause the weld torch to perform one or more welding operations on the interface region between the pipes.

One aspect of the present application provides a method for welding pipes. The method comprises: aligning ends of the two pipes to be welded, the pipes comprising a metal pipe interior surrounded by an insulator material, the metal pipe interior being exposed at portions of the pipes adjacent the ends of the pipes to be welded; welding the aligned ends of the pipes to one another from within the pipes to form a weld joint; generating weld data during the welding of the aligned ends, the weld data corresponding to welding parameters associated with the welding; inspecting the welded joint with an inspection laser from within the welded pipes to derive internal weld inspection data; inspecting the welded joint with an inspection radiation source to derive radiation inspection data; transmitting the weld data, the internal weld inspection data, and the radiation inspection data to a remote computer system to derive additional weld data; and receiving the derived additional weld data. The additional weld data is derived from the transmitted data and additional inspection data received by the remote system from inspection of other pipes.

One aspect of the present patent application provides a field system for facilitating field testing and physical operations based thereon. The field system comprises: a field device configured to perform an operation that physically affects an object; an inspection device configured to scan the object; and one or more processors communicatively connected to the inspection device and configured to receive inspection data associated with the scan of the object from the inspection device. The one or more processors are communicatively connected to a remote computer system and configured to transmit the inspection data to the remote computer system. The one or more processors are configured to receive data related to performing the operation from the remote computer system responsive to transmitting the inspection data, and cause, based on the operation-related data, the field device to perform the operation that physically affects the object. The operation-related data is derived from the inspection data and other inspection data associated with a separate scan of another object.

One aspect of the present patent application provides a method for facilitating field testing and physical operations based thereon. The method comprises: scanning, by an inspection device of a field system, an object to provide inspection data associated with the scan of the object to one or more processors; transmitting, by one or more processors of the field system, the inspection data to a remote computer system; receiving, by the one or more processors, data related to performing an operation that physically affects an object from the remote computer system responsive to transmitting the inspection data; and causing, by the one or more processors, based on the operation-related data, a field device of the field system to perform the operation that physically affects the object. The operation-related data is derived from the inspection data and other inspection data associated with a separate scan of another object.

One aspect of the present patent application provides a computer system for facilitating field testing and physical operations based thereon remotely from a field system at which the field testing and physical operations occurs. The remote field system comprises an inspection device configured to scan the object and a field device configured to perform an operation that physically affects the object. The computer system comprises: a receiver configured to receive, from the remote field system, inspection data associated with the scan of the object by the inspection device; one or more processors configured to process the inspection data to generate data related to performing the operation that physically affects the object; and a transmitter configured to transmit the operation-related data to the remote field system to cause the remote field system to perform the operation that physically affects the object, wherein the operation is performed based on the operation-related data.

One aspect of the present patent application provides a method for facilitating field testing and physical operations based thereon remotely from a field system at which the field testing and physical operations occurs. The remote field system comprises an inspection device configured to scan the object and a field device configured to perform an operation that physically affects the object. The method comprises: receiving, by a receiver, from the remote field system, inspection data associated with the scan of the object by the inspection device; processing, by one or more processors, the inspection data to generate data related to performing the operation that physically affects the object; and transmitting, by a transmitter, the operation-related data to the remote field system to cause the remote field system to perform the operation that physically affects the object, wherein the operation is performed based on the operation-related data.

One aspect of the present patent application provides a computer system for facilitating field testing at a field system and physical operations based thereon. The field system comprises an inspection device configured to scan the object and one or more field devices configured to perform one or more operations that physically affect an object. The computer system comprises a receiver configured to receive, from the field system, inspection data associated with the scan of the object by the inspection device. The scan of the object by the inspection device is subsequent to a performance of the one or more operations by the one or more field devices that physically affected the object. The one or more operations are performed using a first set of input parameters. The computer system also comprises one or more processors configured to: detect, based on the inspection data, a defect related to the object; generate, an operation protocol associated with at least one operation type of the one or more operations responsive to the defect detection, wherein the operation protocol comprises a second set of input parameters having at least one input parameter different from the first set of input parameters; select the operation protocol for performing a subsequent operation similar to at least one of the one or more operations; and generate, based on at least one input parameter of the operation protocol, data related to performing the subsequent operation. The computer system further comprises a transmitter configured to transmit the operation-related data to one or more field systems to cause the one or more field systems to perform the subsequent operation. The subsequent operation is performed based on the operation-related data.

One aspect of the present patent application provides method for facilitating field testing at a field system and physical operations based thereon. The field system comprises an inspection device configured to scan the object and one or more field devices configured to perform one or more operations that physically affects an object. The method comprises receiving, by a receiver, from the field system, inspection data associated with the scan of the object by the inspection device. The scan of the object by the inspection device is subsequent to a performance of the one or more operations by the one or more field devices that physically affected the object. The one or more operations are performed using a first set of input parameters. The method also comprises: detecting, by one or more processors, based on the inspection data, a defect related to the object; generating, by the one or more processors, an operation protocol associated with at least one operation type of the one or more operations responsive to the defect detection, wherein the operation protocol comprises a second set of input parameters having at least one input parameter different from the first set of input parameters; selecting, by the one or more processors, the operation protocol for performing a subsequent operation similar to at least one of the one or more operations; generating, by the one or more processors, based on at least one input parameter of the operation protocol, data related to performing the subsequent operation; and transmitting, by a transmitter, the operation-related data to one or more field systems to cause the one or more field systems to perform the subsequent operation. The subsequent operation is performed based on the operation-related data.

One aspect of the present patent application provides a computer system for facilitating field testing at a field system and physical operations based thereon. The field system comprises an inspection device configured to scan the object and one or more field devices configured to perform one or more operation that physically affects the object. The computer system comprises a receiver configured to receive, from the field system, inspection data associated with the scan of the object. The scan of the object is subsequent to a performance of the one or more operations that physically affected the object. The one or more operations are performed using a first set of input parameters. The computer system also comprises one or more processors configured to: determine, based on the inspection data, whether a quality of one or more aspects of the object resulting from the one or more operations exceeds a quality standard indicated by a predefined quality profile; generate an operation protocol associated with at least one operation type of the one or more operations, wherein the operation protocol is generated to comprise one or more of the set of input parameters responsive to the quality of the one or more aspects of the object exceeding the quality standard indicated by the predefined quality profile; select the operation protocol for performing a subsequent operation similar to at least one of the one or more operations; and generate, based on at least one input parameter of the operation protocol, data related to performing the subsequent operation. The computer system further comprises a transmitter configured to transmit the operation-related data to one or more field systems to cause the one or more field systems to perform the subsequent operation. The subsequent operation is performed based on the operation-related data.

One aspect of the present patent application provides a method for facilitating field testing at a field system and physical operations based thereon. The field system comprises an inspection device configured to scan the object and one or more field devices configured to perform one or more operation that physically affects the object. The method comprises receiving, by a receiver, from the field system, inspection data associated with the scan of the object. The scan of the object is subsequent to a performance of the one or more operations that physically affected the object. The one or more operations are performed using a first set of input parameters. The method also comprise: determining, by one or more processors, based on the inspection data, whether a quality of one or more aspects of the object resulting from the one or more operations exceeds a quality standard indicated by a predefined quality profile; generating, by the one or more processors, an operation protocol associated with at least one operation type of the one or more operations, wherein the operation protocol is generated to comprise one or more of the set of input parameters responsive to the quality of the one or more aspects of the object exceeding the quality standard indicated by the predefined quality profile; selecting, by the one or more processors, the operation protocol for performing a subsequent operation similar to at least one of the one or more operations; generating, by the one or more processors, based on at least one input parameter of the operation protocol, data related to performing the subsequent operation; and transmitting, by the one or more processors, the operation-related data to one or more field systems to cause the one or more field systems to perform the subsequent operation. The subsequent operation is performed based on the operation-related data.

One aspect of the present patent application provides a computer system for facilitating field testing and physical operations based thereon. The computer system comprises one or more processors configured to: obtain, from one or more field systems, data related to observations of one or more operations performed on a plurality of objects. The plurality of objects comprises (i) one or more objects determined to have a defect resulting from the one or more observed operations and (ii) one or more objects without the defect. The one or more processors are also configured to: compare, based on the observation-related data, a first set of observations of an operation performed on an object determined to have the defect with one or more other sets of observations of the operation performed on one or more other objects without the defect; determine, based on the comparison, a common difference that the first set of observations has with the one or more other sets of observations; and cause, based on the common difference, an operation trigger to be implemented such that a field system is caused to perform an operation associated with the operation trigger when a circumstance corresponding to the common difference occurs during a subsequent operation that physically affects one or more additional objects.

One aspect of the present patent application provides a method for facilitating field testing and physical operations based thereon. The method comprises obtaining, by one or more processors, from one or more field systems, data related to observations of one or more operations performed on a plurality of objects. The plurality of objects comprises (i) one or more objects determined to have a defect resulting from the one or more observed operations and (ii) one or more objects without the defect. The method also comprises: comparing, by the one or more processors, based on the observation-related data, a first set of observations of an operation performed on an object determined to have the defect with one or more other sets of observations of the operation performed on one or more other objects without the defect; determining, by the one or more processors, based on the comparison, a common difference that the first set of observations has with the one or more other sets of observations; and causing, by the one or more processors, based on the common difference, an operation trigger to be implemented such that a field system is caused to perform an operation associated with the operation trigger when a circumstance corresponding to the common difference occurs during a subsequent operation that physically affects one or more additional objects.

One aspect of the present patent application provides a system for aligning and welding together two segments of a pipe. The system includes a welding mechanism for applying a weld to a face joint of the two segments, the welding mechanism including an articulating torch, a laser sensor for reading a profile of the face joint, and an electronic controller for receiving information signals from the laser sensor to control the position and/or orientation of the torch; an alignment mechanism for manipulating the orientation of the longitudinal axis of at least one of the segments relative to the other; and wherein the welding mechanism further includes a carriage for securing a position of the welding mechanism in the pipe and a welding portion capable of rotating relative to the supporting portion within the pipe; and wherein the torch and the laser sensor are rotatably supported by the welding portion such that during welding, the torch follows the laser sensor along the face joint.

One aspect of the present patent application provides a method of aligning and welding together two segments of a pipe. The method includes the steps of: placing a first pipe segment on an alignment device; inserting an internal welding machine having a laser and a weld torch into the first pipe segment; generally aligning a second pipe segment with the first pipe segment and internal welding machine; griping an external portion of the first and second pipe segments to adjusting an axial position of the internal welding machine so as to generally line up with a face joint of the first and second pipe segments; adjusting a relative alignment of the first and second pipe segments via the alignment device based on a signal from the internal welder; beginning a root weld cycle in which the laser scans the face joint, the torch follows the laser, and the output from the laser is used to control the position of articulated torch, where the position and orientation of the torch with respect to the face joint is controlled to produce a quality weld; determining a face joint profile from the laser; releasing the alignment device and removing internal welding machine from an open pipe segment end; and repositioning a next sequential pipe segment on the external alignment mechanism in preparation for welding of a next joint.

One aspect of the present patent application provides an internal heat exchanger (IHEX) for pipeline welding. The internal heat exchanger includes a drive system configured to move the IHEX into a position within at least one pipe section near a weld joint location with another pipe section; a cooling section including cooling structure configured to selectively cool one or more interior surface portions of the at least one pipe section; and a controller in communication with the cooling structure and configured to activate the cooling section when the IHEX is at the position within the at least one pipe section.

One aspect of the present patent application provides a welding system. The welding system includes a plurality of welding stations, each welding station including a weld station computer and weld system in communication with the weld station computer, each welding station including one or more sensors, the one or more sensors configured to measure weld data including lead wire speed data; a plurality of wireless devices in communication with the one or more of the welding station computers to receive the weld data including the measured lead wire speed data; and a cloud server in communication with the wireless devices, the cloud server being configured to process the weld data including the lead wire speed data, and configured to determine an amount of consumable welding material used by the plurality of welding stations for a given period of time, wherein the cloud server is configured to communicate the amount of consumable welding material used to one or more of the wireless devices.

One aspect of the present patent application provides welding system. The welding system includes a welding station, the welding station including a weld station computer and a weld system in communication with the weld station computer, the weld system including a supply of weld material, a welding device, and a weld supply motor assembly that moves the weld material to the welder device; a weighting device operatively connected with the weld station computer and configured to measure a weight of the supply of weld material and to communicate the weight of the supply of weld material to the weld station computer in the form of weight data; and a sensor operatively connected with the weld supply motor assembly and the weld station computer so as to communicate the speed of the weld supply motor assembly to the weld station computer in the form of speed data; wherein the weld station computer is operatively connected to the weld supply motor assembly and is configured to control the speed of the motor assembly based on the weight data.

One aspect of the present patent application provides a method of controlling welding. The method includes measuring, using a weight measuring device, a first weight of a supply of weld material at a first time; measuring, using the weight measuring device, a second weight of the supply of weld material at a second time subsequent to the first time; calculating, using a computer, a difference in measured weight between the first weight and the second weight, the difference in measured weight corresponding to measured used weld material; calculating, using the computer, a theoretical weight of used weld material based on a speed of a motor assembly feeding the weld material to a welding device; comparing, by the computer, the theoretical weight of used weld material to the measured weight of used weld material; and adjusting, by the computer, the speed of the motor assembly so as to correct a slippage of the motor assembly.

One aspect of the present patent application provides a welding system. The welding system includes a plurality of welding stations, each welding station including a weld station computer and weld system in communication with the weld station computer, each welding station including one or more sensors, the one or more sensors configured to measure weld data including lead wire speed data; a plurality of wireless devices in communication with the one or more of the welding station computers to receive the weld data including the measured lead wire speed data; and each weld station computer being configured to process the weld data, including the lead wire speed data, for the weld system in communication therewith, the weld station computer configured to determine an amount of consumable welding material used by the weld system for a given period of time and generating consumption data based thereon.

One aspect of the present patent application provides a system for pipeline testing. The system includes a testing device adapted to generate nondestructive test data regarding at least a portion of a weld; said testing device communicating said nondestructive test data to a second device which is adapted to receive said nondestructive test data; and said testing device adapted to operate remotely from a means of analyzing said nondestructive test data.

One aspect of the present patent application provides a system for nondestructive pipeline testing. The system includes an imaging equipment adapted to generate nondestructive test data regarding a portion of a welded pipe; a remote processing device adapted to receive and process inspection data regarding said portion of said welded pipe.

One aspect of the present patent application provides a method of nondestructive pipeline testing. The method includes the steps of: providing an imaging equipment; generating a nondestructive test data; providing a means to provide said nondestructive test data for analysis; and said nondestructive test data provided for analysis at a location remote from the tested portion of a pipe and the equipment proximate to the tested portion of a pipe.

One aspect of the present patent application provides a system for pipeline construction. The system includes a system for real-time logging of weld data; and said weld data is provided for analysis by computerized means and/or by subject experts.

One aspect of the present patent application provides a computer program product for welding support. The computer program product includes a computer readable program code means which provides to a computer memory a welding data; a computer readable program code means which provides to said memory a data from a data set comprising a pipeline data; a computer readable program code means which processes said welding data and said pipeline data to provide a record output.

One aspect of the present patent application provides a method of data management executed on a computer. The method includes the steps of: communicating a first data from a first device to a second device, said first data which is a data regarding a pipeline construction; processing said first data by a cloud-based network means.

One aspect of the present patent application provides a computer system. The system includes a first device having a processor which processes a pipeline construction data, said first device communicating said pipeline construction data to a cloud-based memory, said pipeline construction data processed by a cloud-based processor.

One aspect of the present patent application provides a heat exchanger for internal cooling of two pipes after the two pipes are secured together via a weld joint. The heat exchanger comprises a drive system configured to move the heat exchanger into a position within at least one of the welded pipes at or near the weld joint between the two welded pipes; a plurality of fin members spaced around a central support member, the plurality of fin members being configured to extend radially outward from the central support member to be in direct thermal contact with interior surface portions of the two welded pipes at or near the weld joint between the two welded pipes to cool the interior surface portions thereof; and a controller operatively connected to the plurality of fin members and configured to selectively control operation of the plurality of fin members. The heat exchanger further comprising: one or more temperature sensors disposed on the heat exchanger and in communication with the controller, wherein the one or more temperature sensors are configured to measure a temperature at one or more locations within the at least one of the welded pipes and provide measured temperature information to the controller. The controller is configured to selectively control operation of the plurality of fin members based on the measured temperature information.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy. Just for example, where a single weld torch head is described, the same configuration can be used for additional weld torch heads provided in the same system (e.g., in an internal welding system), and can also be used in other welding systems (such as the tie-in internal welders) described herein. Similarly, various components such as the clamps, seals, brakes, weld consumption detection systems, or other components described herein, can be used with various embodiments described herein. For example, the braking system, motors, clamps seals, as described in one embodiment can be applied to other embodiments described herein, as will be appreciated by those skilled in the art.

BRIEF DESCRIPTION OF THE DRAWINGS

FIGS. 1A and 1B show block diagrams of a method for welding pipe segments, wherein FIG. 1A shows a high level block diagram of the method and FIG. 1B shows a more detailed block diagram of the method, in accordance with an embodiment of the present patent application;

FIG. 2G shows a weld joint in which root pass and hot pass weld layers are formed by an internal weld system and the fill and cap pass weld layers are formed by an external weld system, FIG. 2H shows a weld joint in which a root pass weld layer is formed by an internal weld system and the hot, fill and cap pass weld layers are formed by an external weld system and FIG. 2I shows a weld joint formed by an external weld system in accordance with an embodiment of the present patent application;

FIGS. 10-2 and 10-3 show the system of FIG. 8 in which the internal weld system is inserted into the first pipe segment and a second pipe segment is being aligned with the first pipe segment in accordance with an embodiment of the present patent application;

FIGS. 10E and 10F show two pipe alignment errors, while FIG. 10E shows an angular pipe alignment error and FIG. 10F shows a position pipe alignment error;

FIG. 72D shows exemplary weld parameters that are used for uphill and downhill weld procedures in accordance with an embodiment of the present patent application;

FIG. 121 shows a heat exchanger of the cooler system positioned in contact with the interior surface of the welded pipes to remove heat from the welded pipes and FIG. 122 shows the heat exchanger is in its retracted position and is not in contact with the interior surface of the welded pipes in accordance with an embodiment of the present patent application;

FIG. 137C shows communication links between the remote computer system and components of the field system without the field computer system in accordance with another embodiment of the present patent application;

FIG. 138 shows a flowchart of a method for facilitating, by a field system, field testing and physical operations based thereon in accordance with another embodiment of the present patent application;

FIG. 139-142 show flowcharts of methods for facilitating, by a computer system, field testing and physical operations based thereon in accordance with other embodiments of the present patent application;

FIG. 143 depict an example of a pipeline in accordance with another embodiment of the present patent application;

FIG. 144 shows a welding station in accordance with another embodiment of the present patent application;

FIG. 145 show a plurality of pipeline welding stations in accordance with another embodiment of the present patent application;

FIG. 146 is a schematic diagram of a system with a plurality of welding stations in communication with a plurality of control and log collection stations in accordance with another embodiment of the present patent application;

FIG. 147 is a schematic diagram of a system with a plurality of welding stations in communication with a plurality of control and log collection stations in accordance with another embodiment of the present patent application;

FIG. 148 is a schematic diagram of welding station in communication with a network via a WiFi connection in accordance with another embodiment of the present patent application;

FIG. 149 is a schematic diagram of a plurality of job sites in communication with a cloud server via a worldwide network (internet) in accordance with another embodiment of the present patent application;

FIG. 150 is a schematic diagram of a plurality of welding stations in communication with intermediate computing devices (lead technicians, inspectors, engineers, etc.) which are in turn in communication with a cloud server through the internet in accordance with another embodiment of the present patent application;

FIG. 151 is a schematic diagram of a plurality of welding stations in communication with an intermediate computer system (Engineer, quality and Tech terminals) through a wireless (e.g., WiFi) communication channel in accordance with another embodiment of the present patent application;

Figure 152:
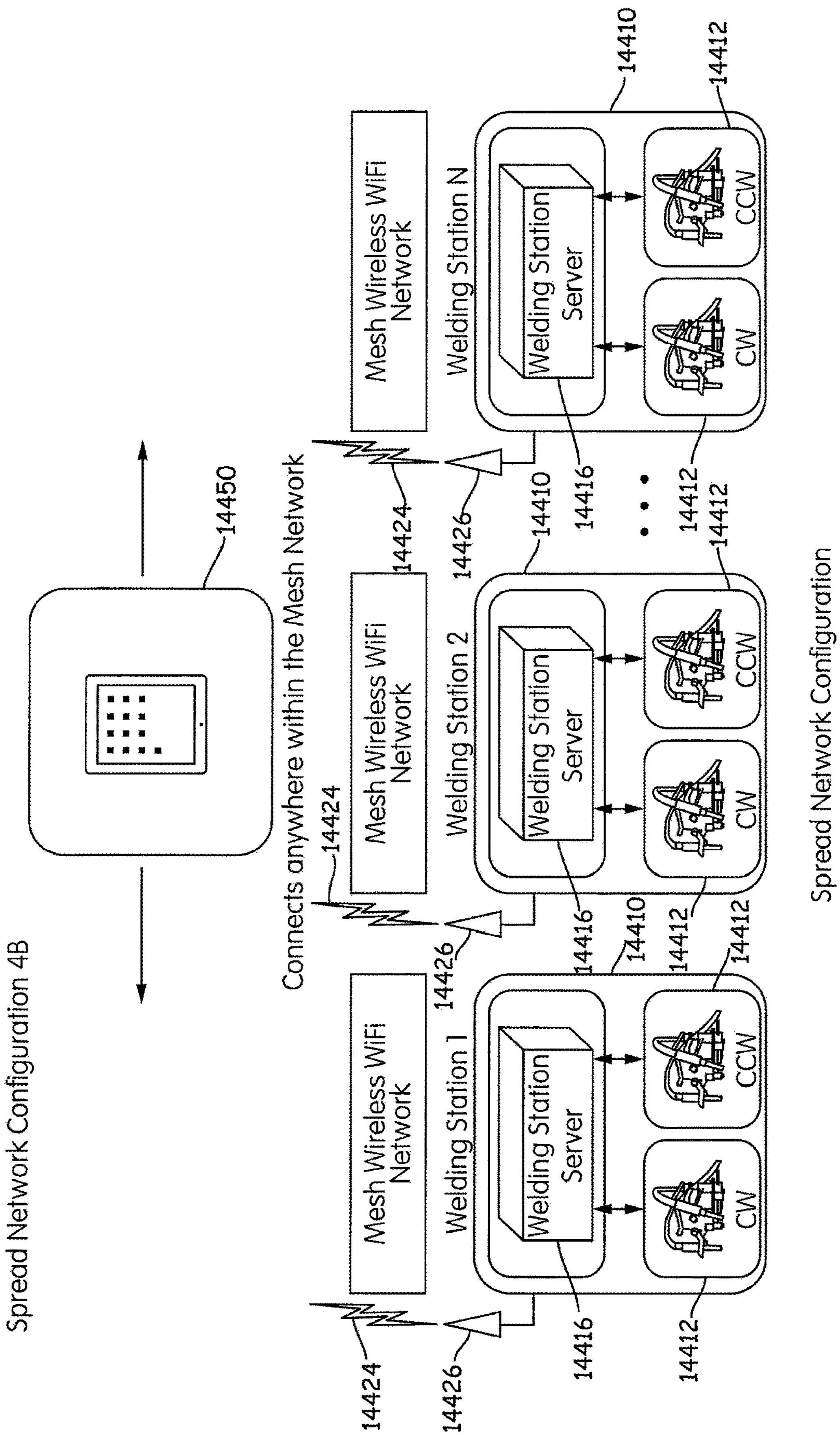
Figure 153:
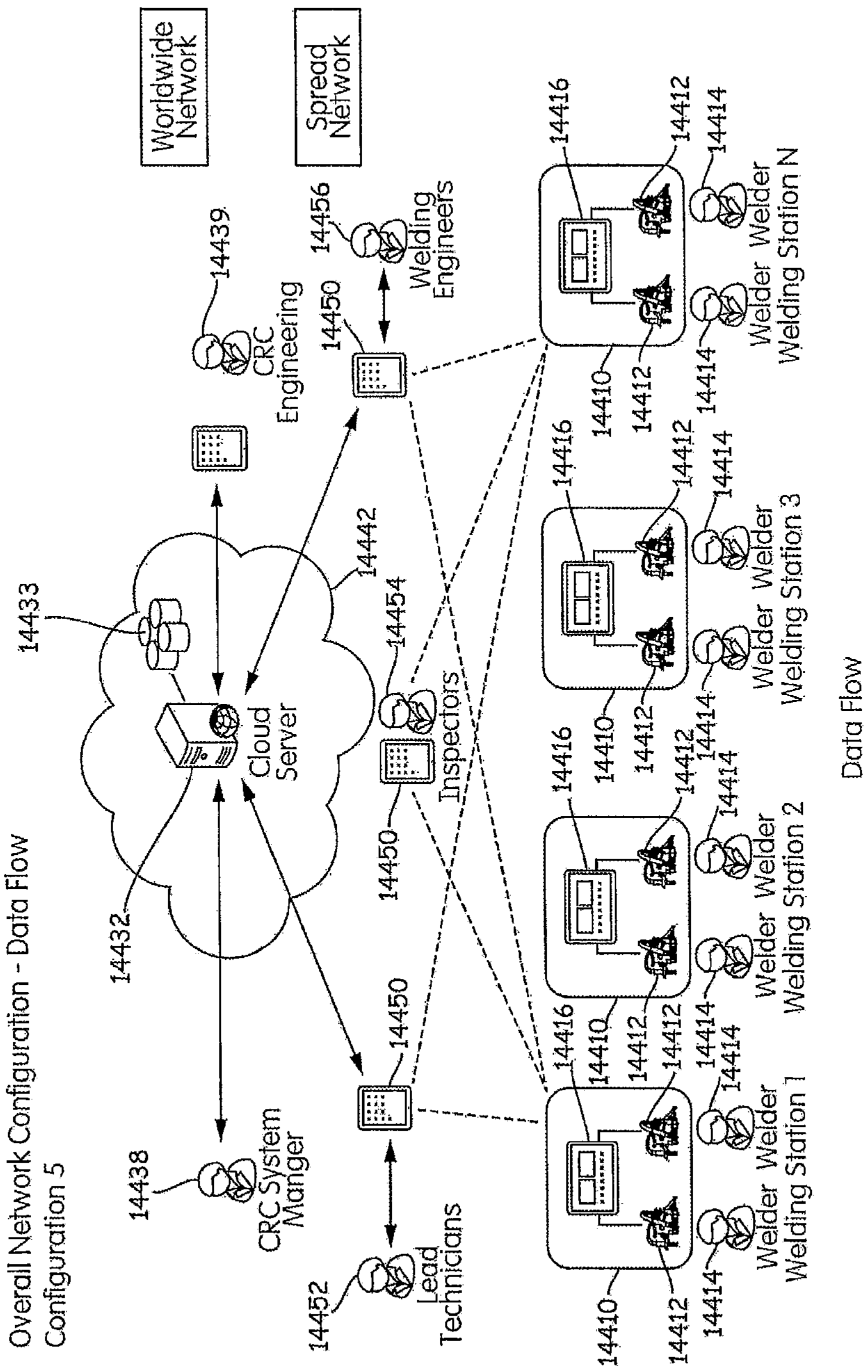
Figure 154:
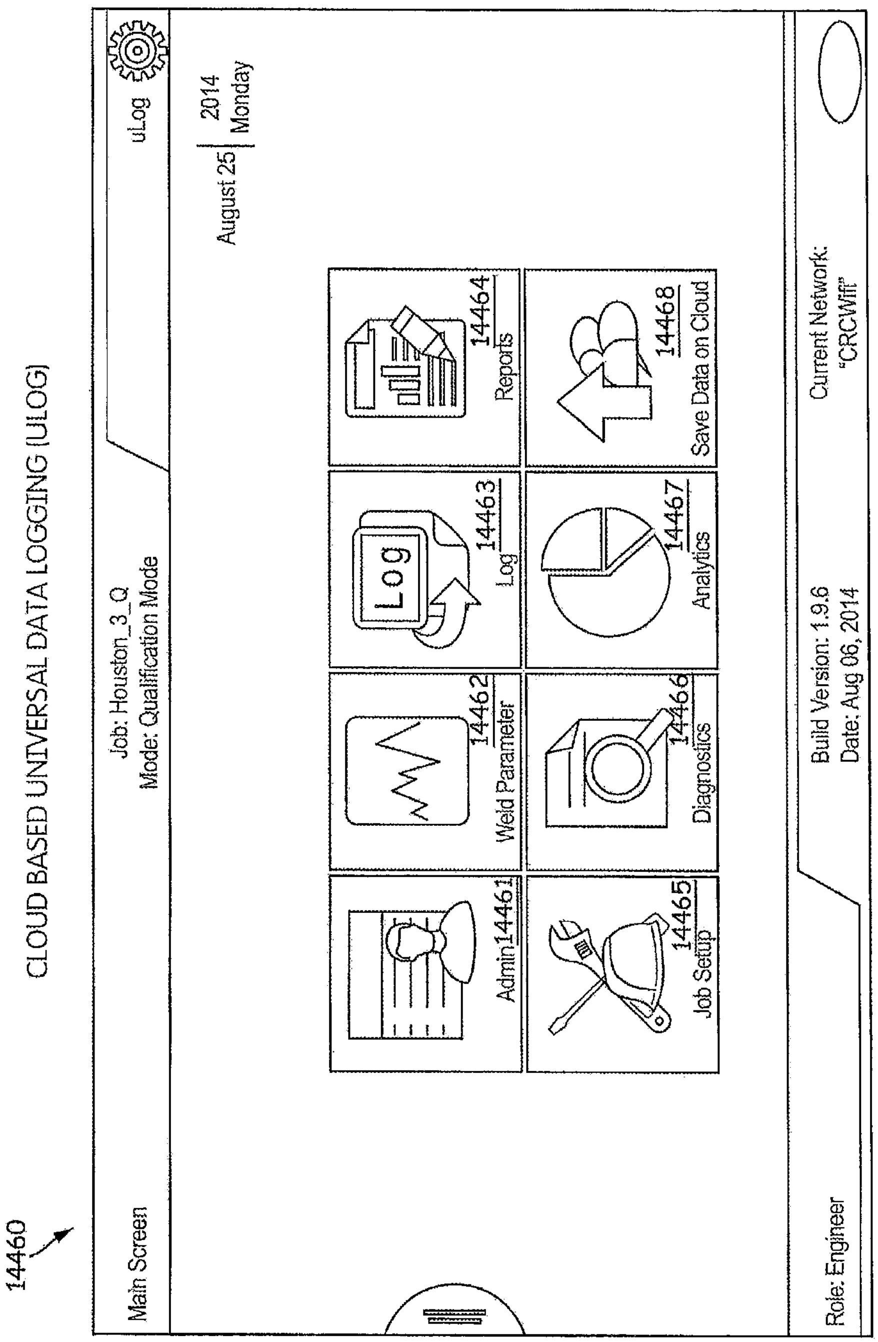
Figure 155:
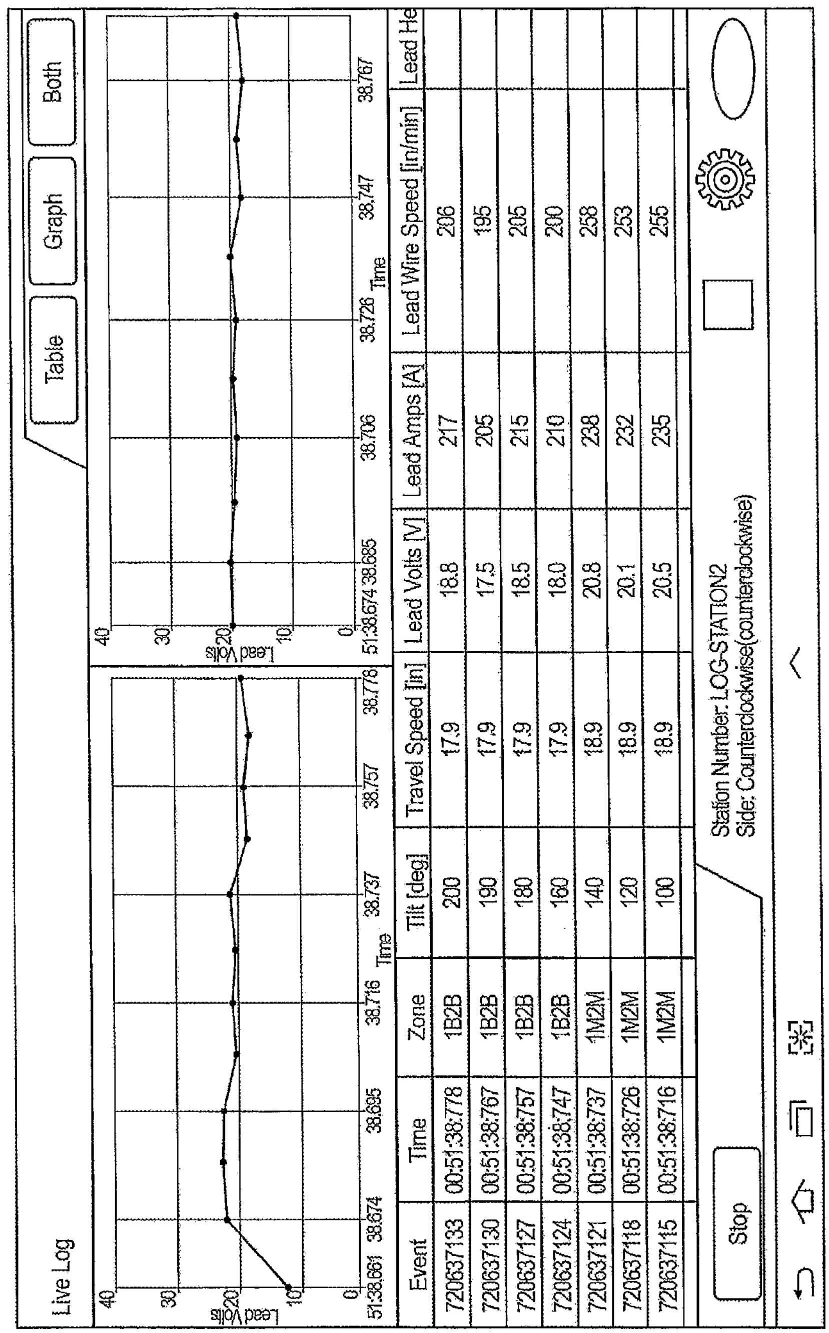
Figure 158:
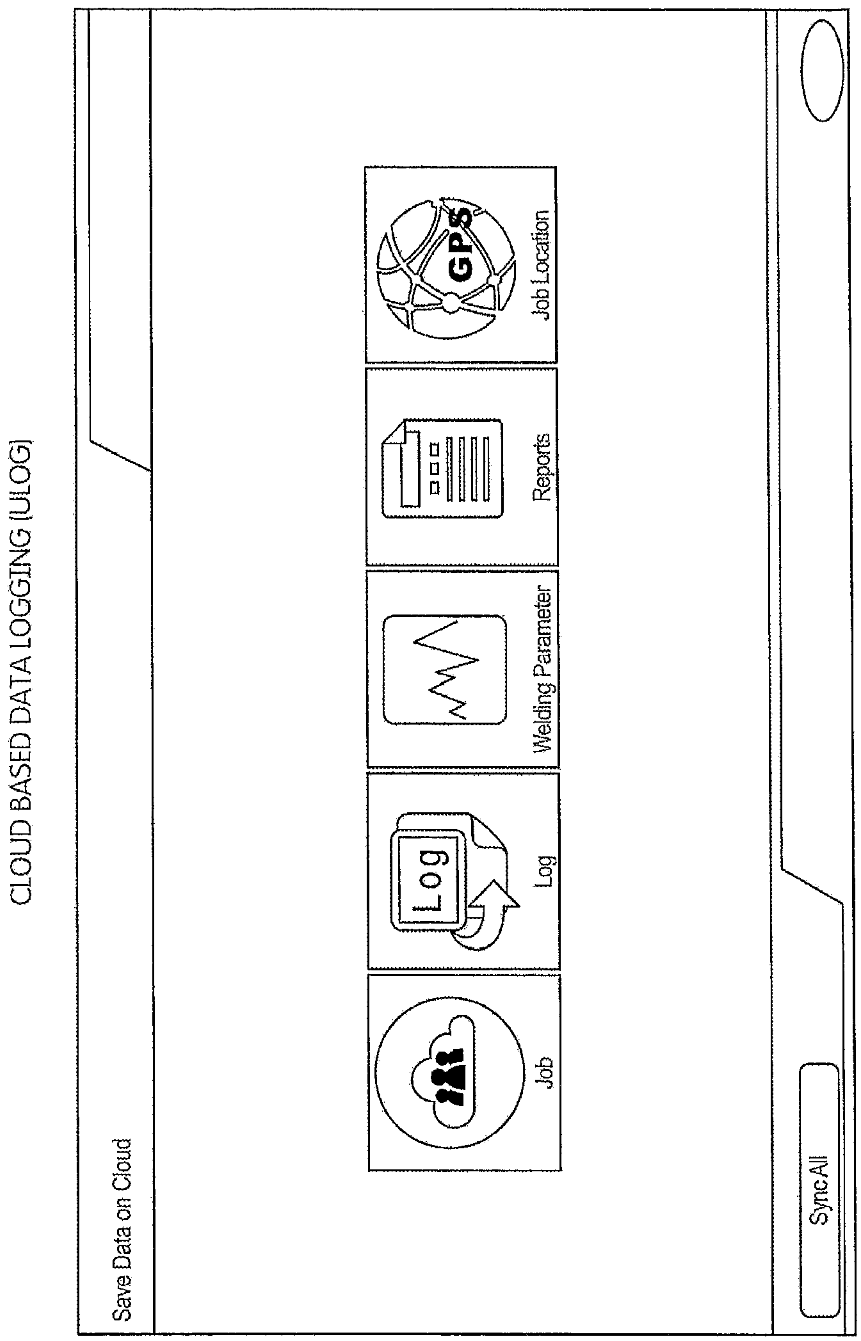
Figure 159:
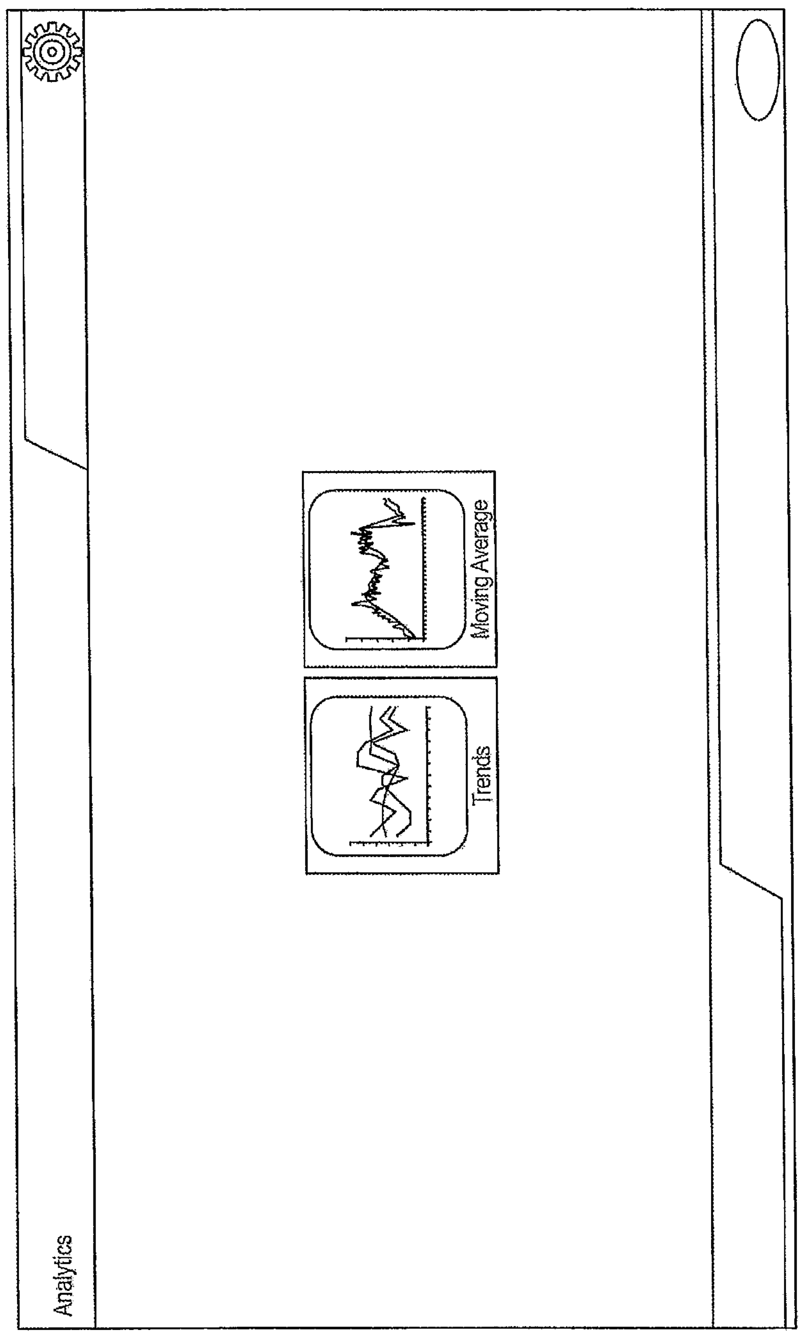
Figure 160:
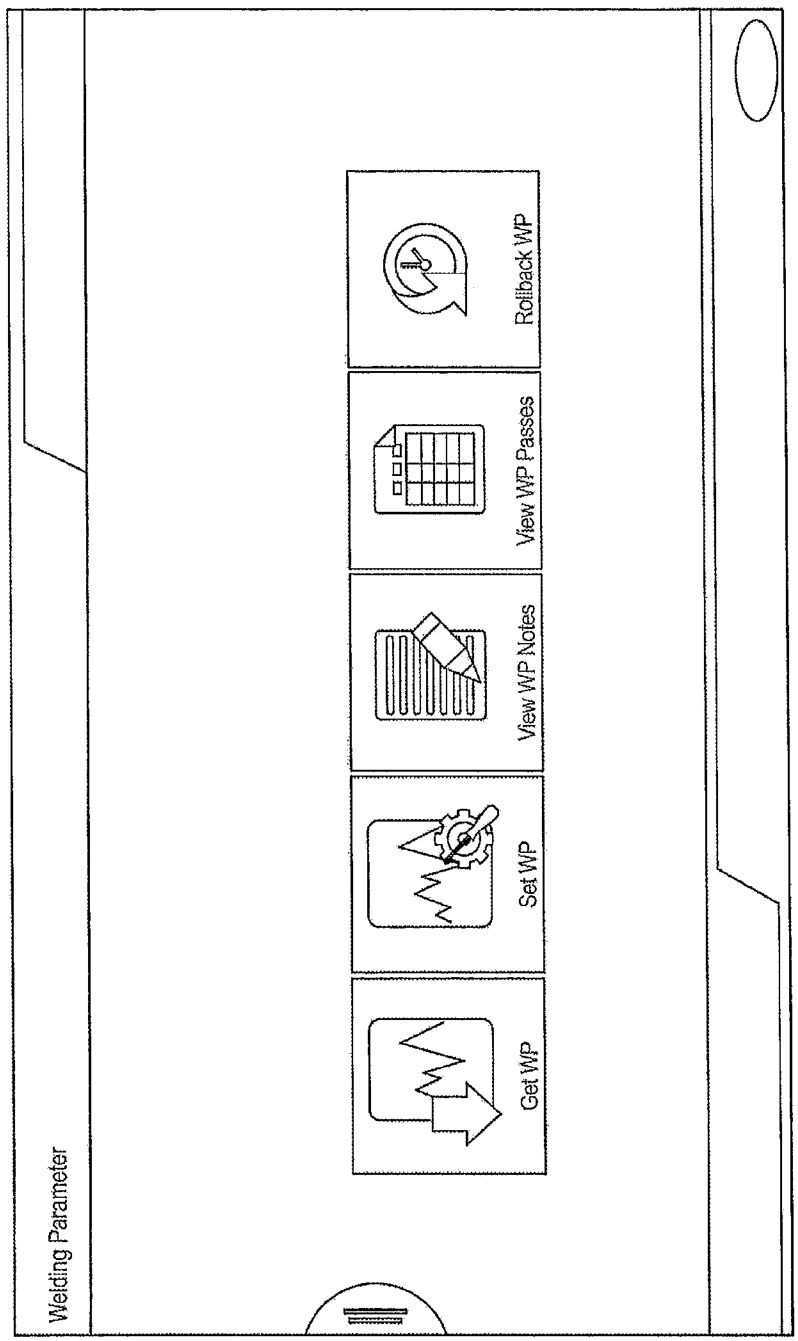
Figure 161A:
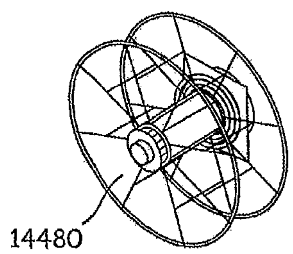
Figure 161B:
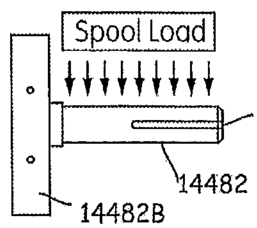
Figure 161C:
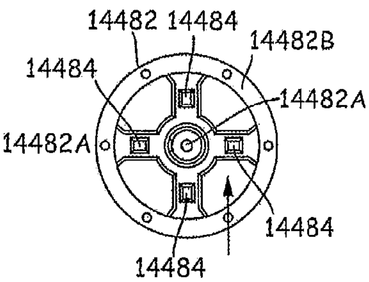
Figure 162:
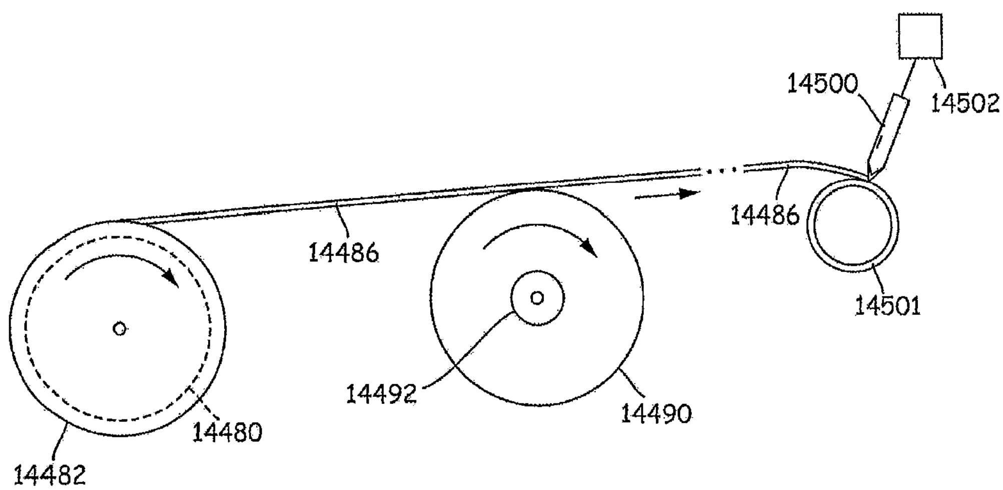
Figure 163:
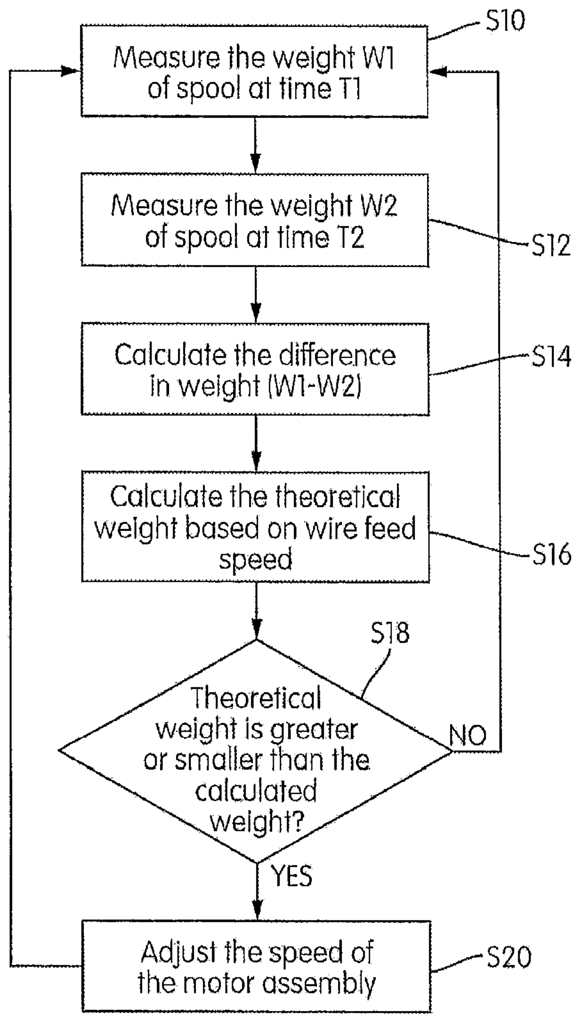
Figure 164A:
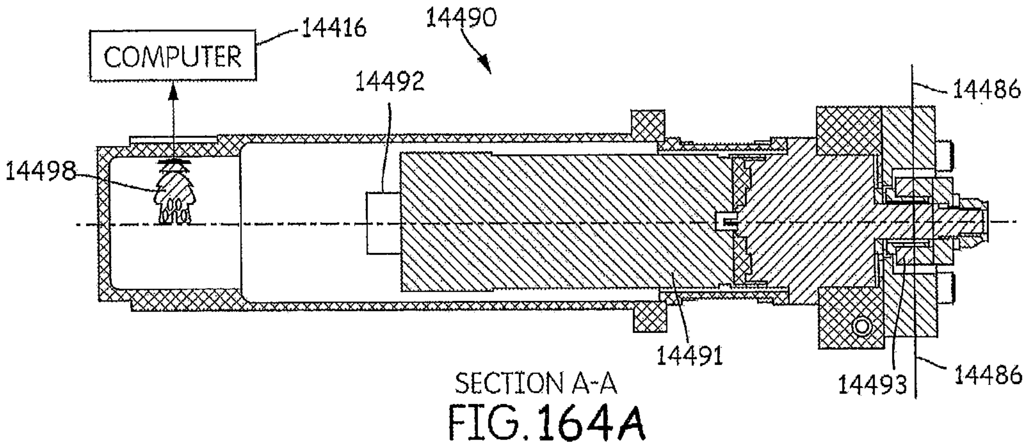
Figure 164B:
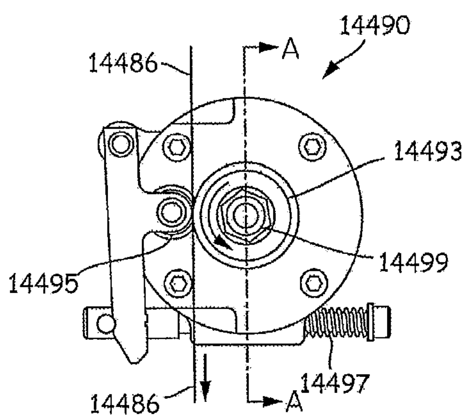
Figure 165:
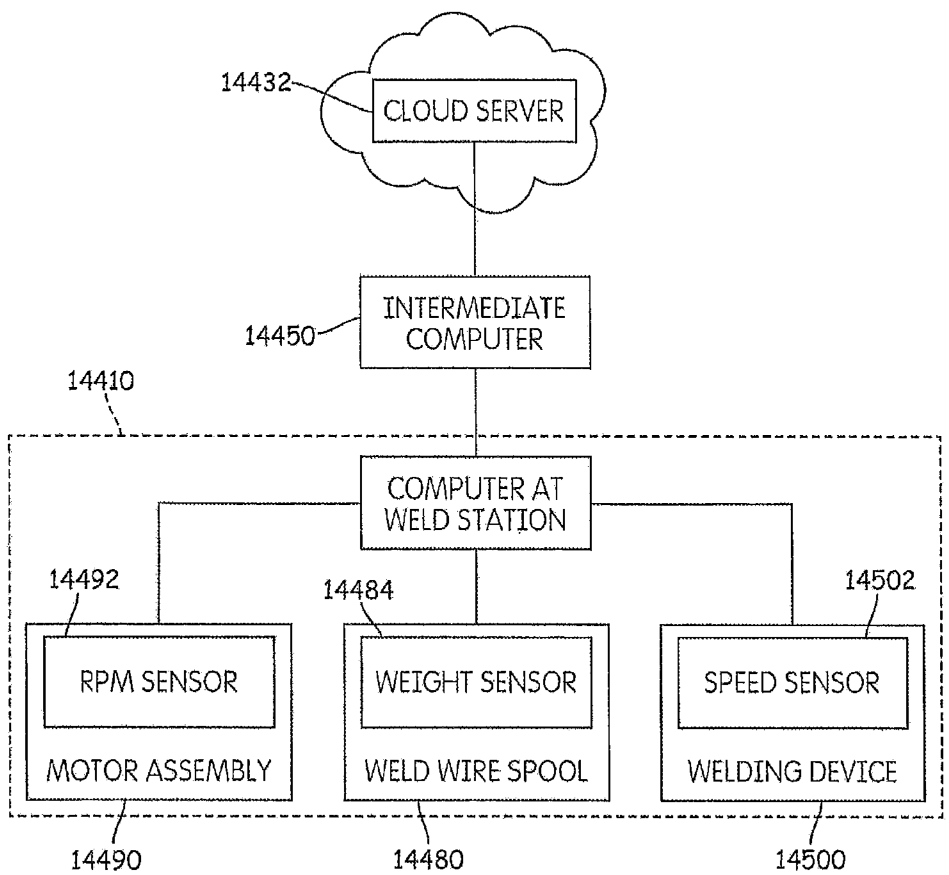
Figure 166:
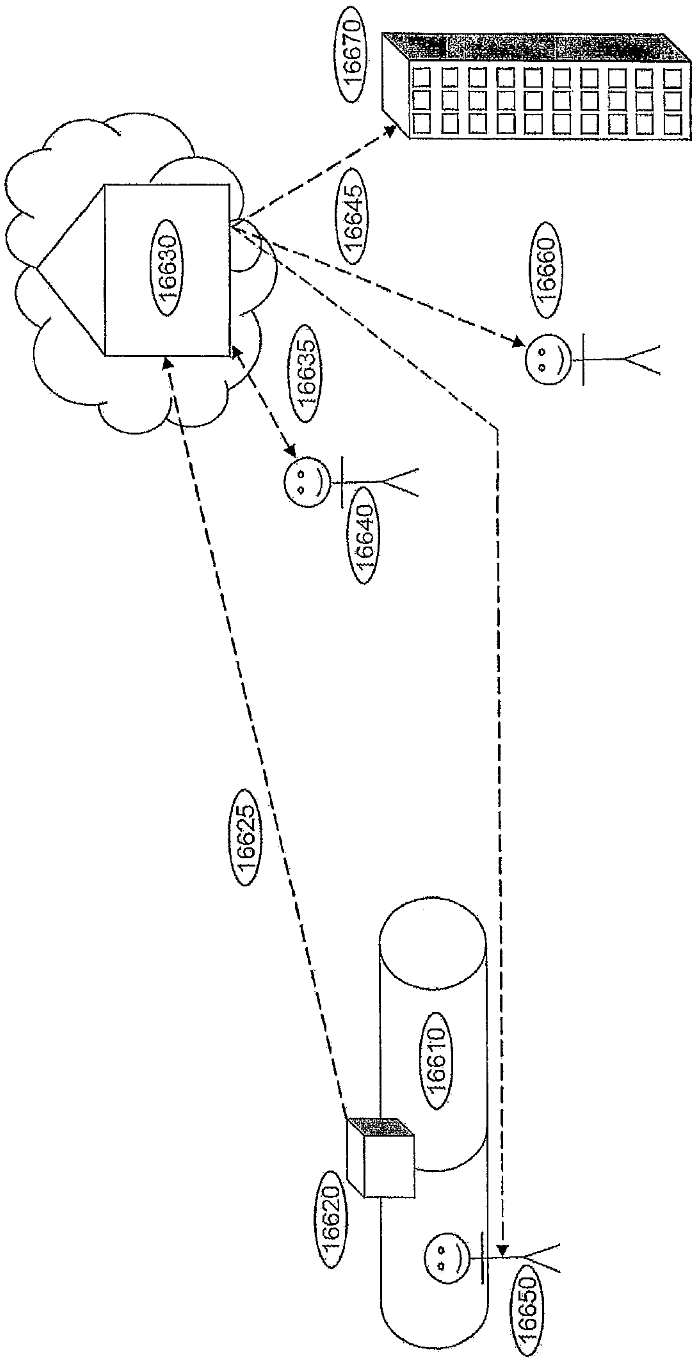
Figure 167:
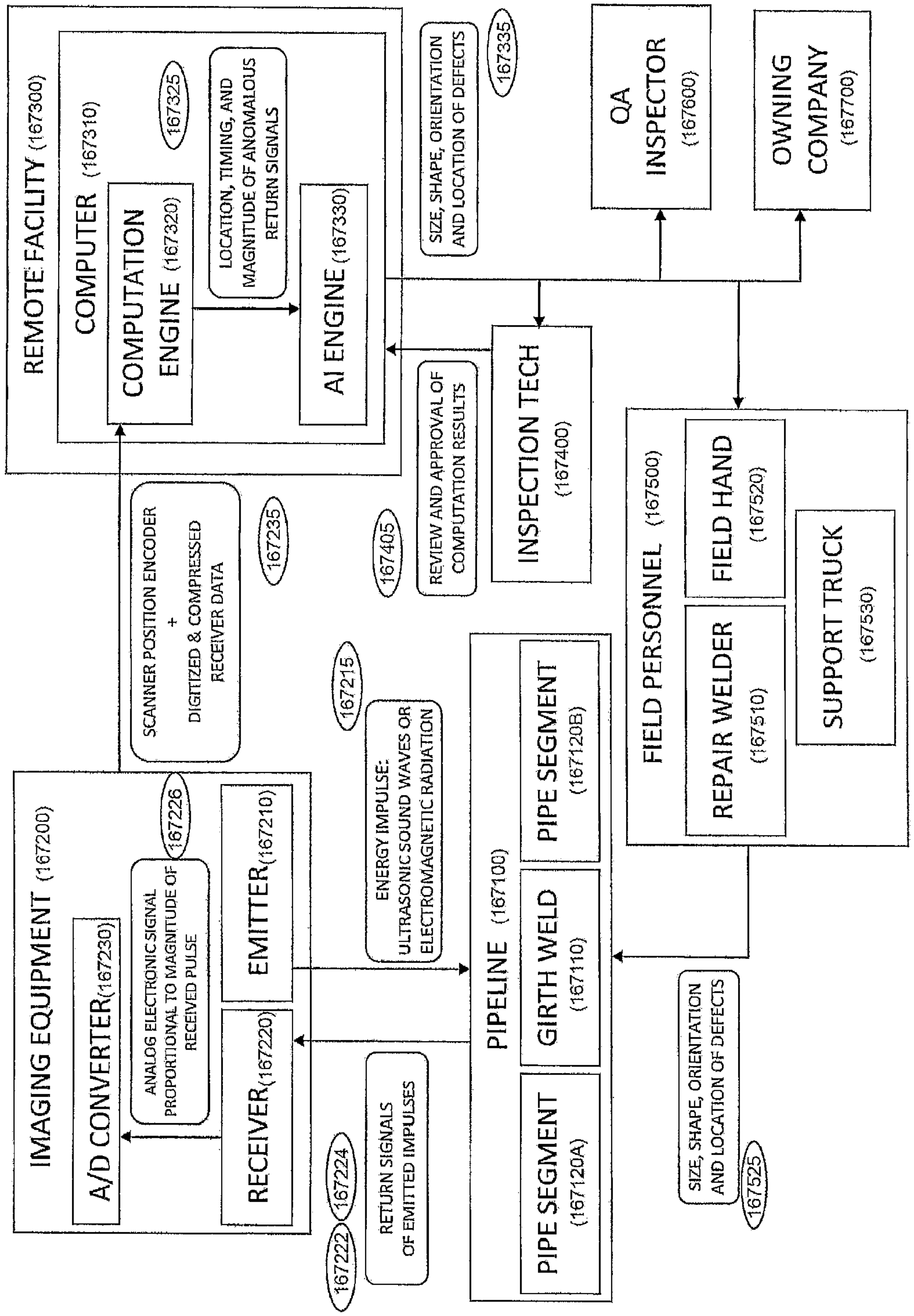
Figure 168:
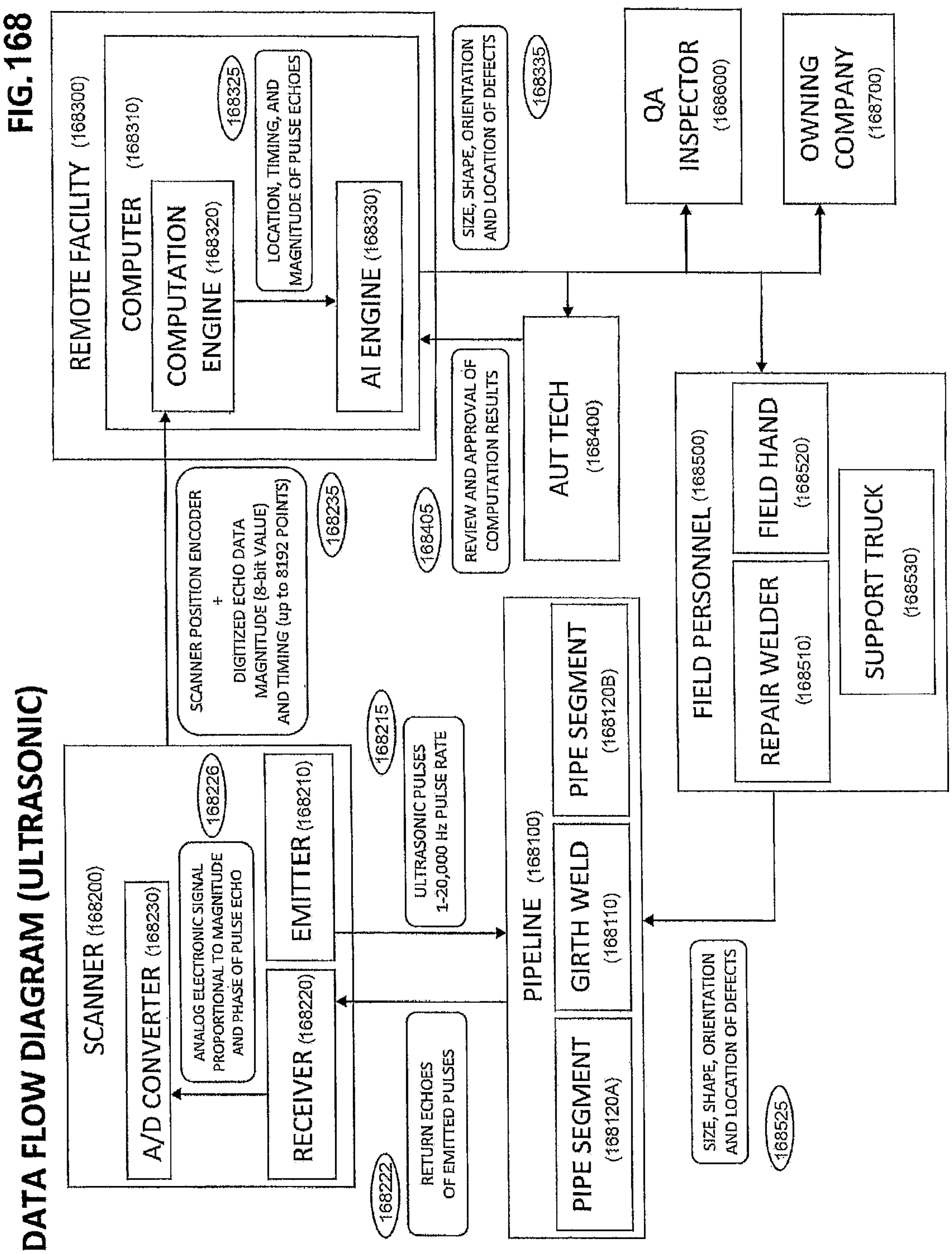
Figure 169:
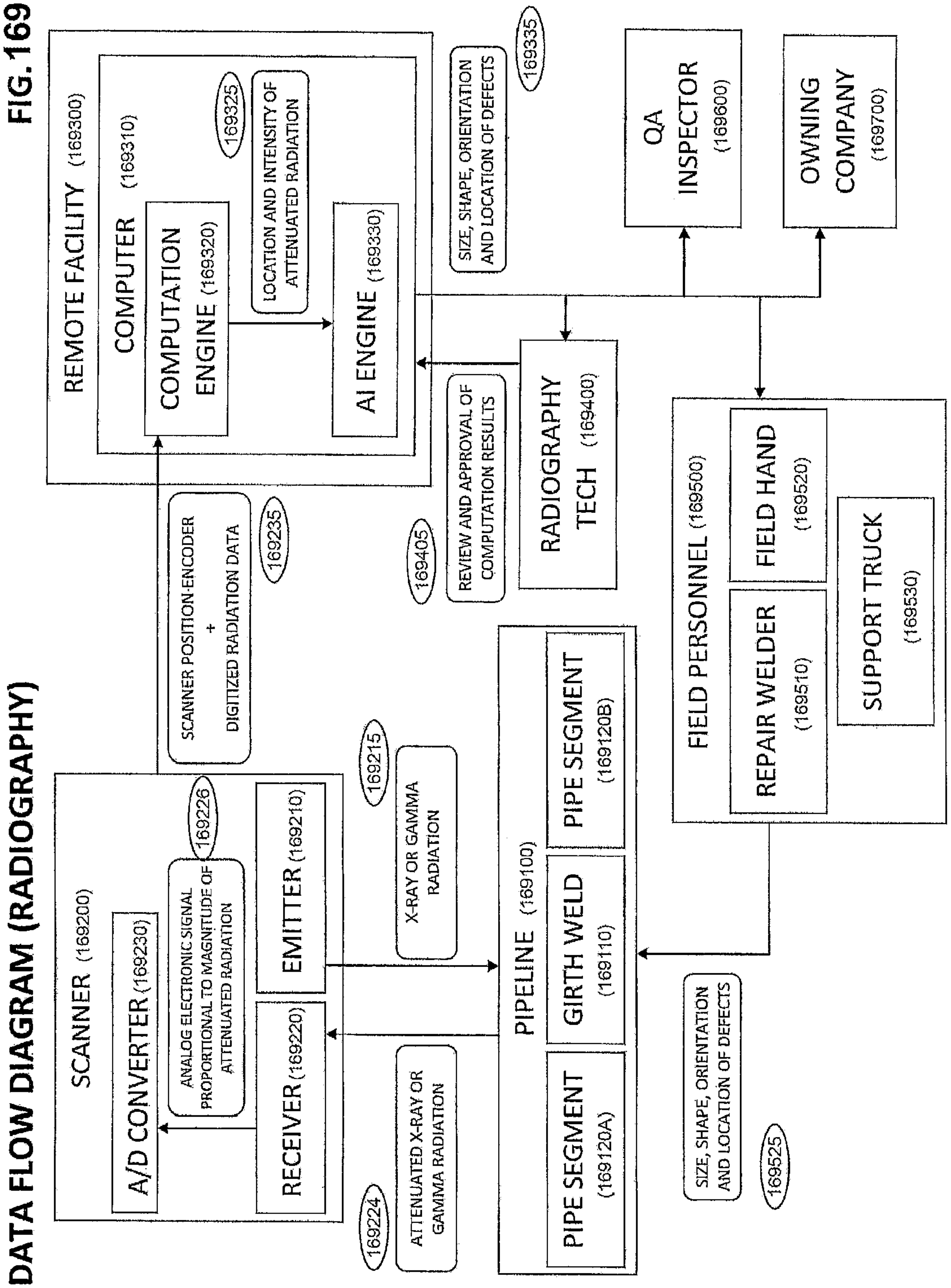

FIG. 152 is a schematic diagram of a plurality of welding stations in communication with a computer system through a wireless (e.g., WiFi) communication channel in accordance with another embodiment of the present patent application;

FIG. 153 is a schematic diagram of a plurality of welding stations in communication with a plurality of intermediate computer systems (Engineer, quality and Tech terminals) which in turn are in communication with a cloud server in accordance with another embodiment of the present patent application;

FIG. 154 shows an example graphical user interface ("GUI") for a "Main Screen" of an application for cloud based universal data logging (uLog) implemented by a computer system at the welding station, at the intermediate computer system or at the cloud server in accordance with another embodiment of the present patent application;

FIG. 155 shows an example GUI for a "Live Log" screen of the application for cloud based universal data logging (uLog) showing voltages versus time at one welding station in accordance with another embodiment of the present patent application;

FIG. 156 shows an example GUI for a "Get Log" screen of the application for cloud based universal data logging (uLog) showing weld data parameters including type of weld event, time, zone, weld travel speed, lead wire travel speed in accordance with another embodiment of the present patent application;

FIG. 157 shows an example GUI for a summary report screen of the application for cloud based universal data logging (uLog) displaying various welding parameters including weld time, weld station identification number, weld arc voltage, etc., in accordance with another embodiment of the present patent application;

FIG. 158 shows an example GUI for a "Save Data on Log" screen of the application for cloud based universal data logging (uLog) displaying various in accordance with another embodiment of the present patent application;

FIG. 159 shows an example GUI for an "Analytics" screen of the application for cloud based universal data logging (uLog) showing two icons for selecting a type of analysis performed (e.g., trends, moving average) in accordance with another embodiment of the present patent application;

FIG. 160 shows an example GUI for a "Welding Parameter" screen of the application for cloud based universal data logging (uLog) showing two various for selecting a type of function to be performed in accordance with another embodiment of the present patent application;

FIG. 161A depicts schematically an example of a spool that is configured to carry a weld wire in accordance with another embodiment of the present patent application;

FIG. 161B depicts schematically a lateral view of a hub-transducer that is configured to measure a weight of the spool in accordance with another embodiment of the present patent application;

FIG. 161C depicts another lateral view of the hub-transducer showing the positioning of transducer elements or strain sensors/gauges for measuring weight strain when the spool is mounted on the hub in accordance with another embodiment of the present patent application;

FIG. 162 depicts schematically an arrangement where a weld wire in spool mounted to hub is pulled by a motor assembly for feeding the wire 82 to the weld device (not shown) in accordance with another embodiment of the present patent application;

FIG. 163 is a flow chart depicting a process of comparing the measured weight and the theoretical weight determined based on the wire feed speed in accordance with another embodiment of the present patent application;

FIGS. 164A and 164B depict enlarged lateral cross-sections of the motor assembly in accordance with another embodiment of the present patent application;

FIG. 165 is a diagram of a configuration of the welding system depicting the interconnections of various components of the system in accordance with another embodiment of the present patent application;

FIG. 166 shows a non-destructive testing system overview in accordance with another embodiment of the present patent application;

FIG. 167 shows a generic embodiment of a non-destructive testing system in accordance with another embodiment of the present patent application;

FIG. 168 shows an ultrasonic testing embodiment of a non-destructive testing system in accordance with another embodiment of the present patent application; and FIG. 169 shows a radiographic testing embodiment of a non-destructive testing system in accordance with another embodiment of the present patent application.

DETAILED DESCRIPTION

Each of the patents and patent applications listed in the "Cross Reference To Related Applications" section of the present patent application is incorporated by reference in its entirety into the present patent application. Such incorporation by reference should be understood to include, but not be limited to, each of the claims as originally filed in each of those patents and patent applications. The inventions specifically contemplated by this patent application include those disclosed herein, as well as those specifically claimed in the aforesaid applications that have been incorporated by reference herein.

Figure 1A:
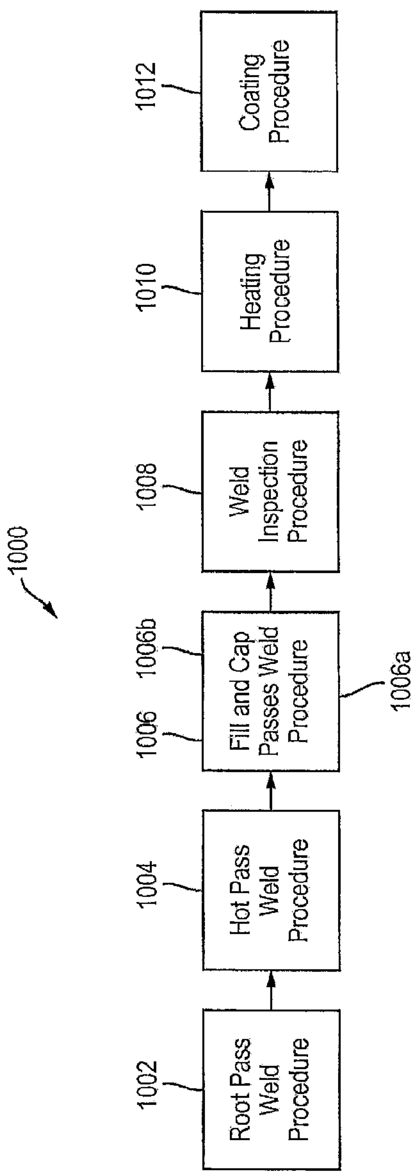
Figure 1B:
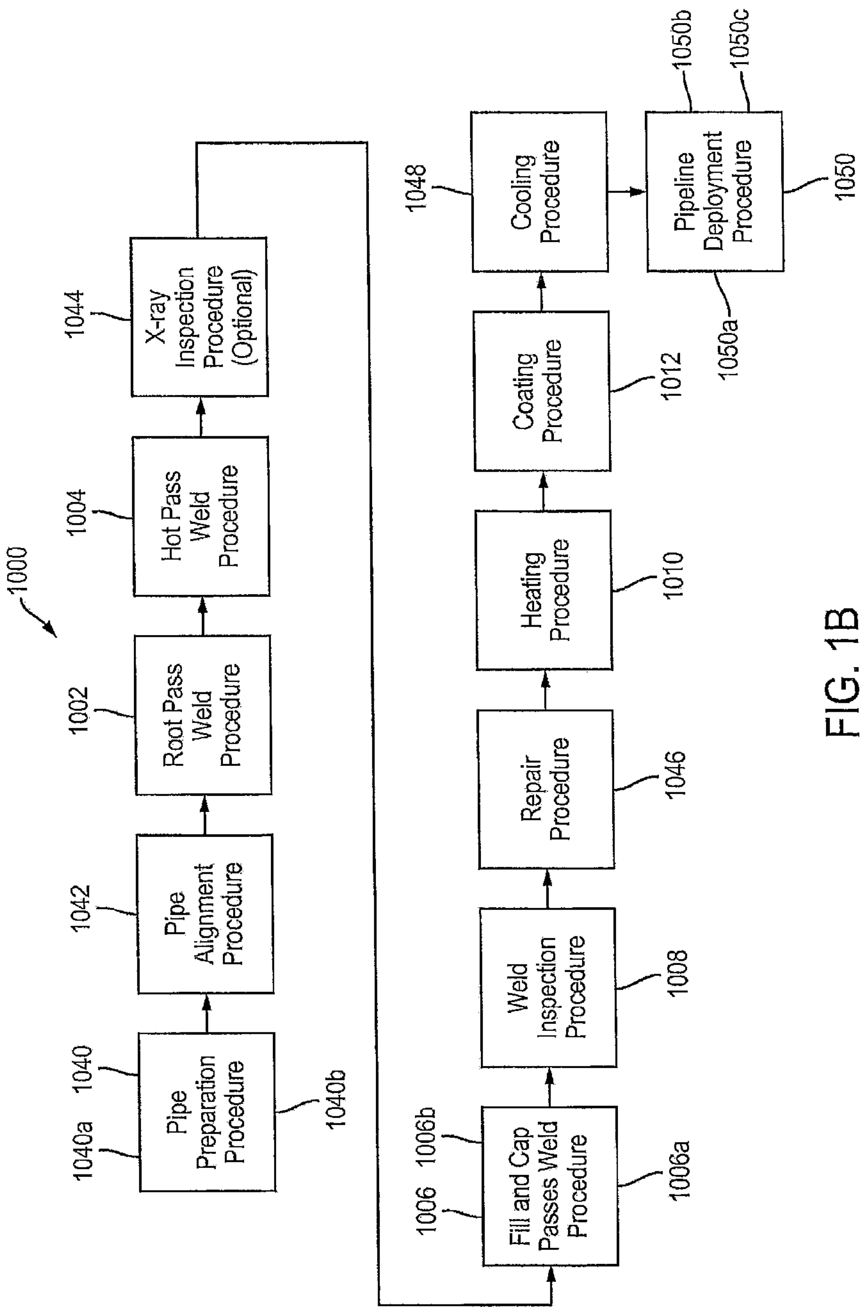
Figure 2:
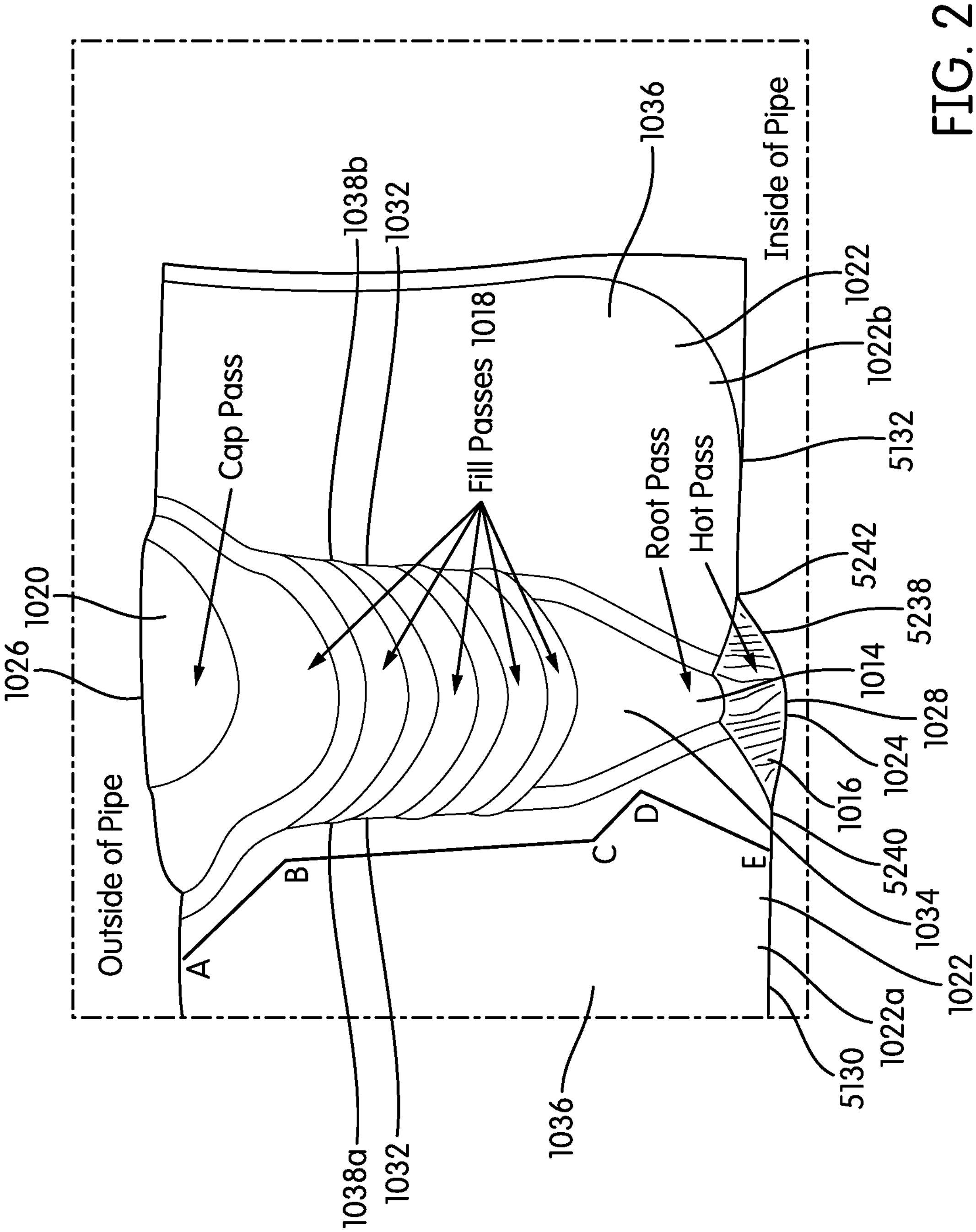
FIG. 2 shows a cross-sectional view of a welded joint connecting a first pipe and a second pipe in accordance with an embodiment of the present patent application.

FIGS. 1A and 1B show block diagrams of a method 1000 for welding pipe sections or segments 1022 (e.g., 1022*a* and 1022*b* as shown in FIG. 2) of a pipeline 1024 (as shown in FIG. 2) together. For example, FIG. 1A shows a high level block diagram of the method 1000, while FIG. 1B shows a more detailed block diagram of the method 1000.

FIG. 2 shows a cross-sectional view of a weld joint 1026 connecting the pipe segments 1022 (e.g., 1022*a* and 1022*b*) of the pipeline 1024. The pipe segments 1022 (e.g., 1022*a* and 1022*b*) may interchangeably be referred to herein as pipes or pipe sections. In one embodiment, the weld joint 1026 is a complete circumferential weld connecting the pipe segments 1022 (e.g., 1022*a* and 1022*b*) end-to-end circumferentially. In one embodiment, the weld joint 1026 may be referred to as a girth weld or a butt weld. In one embodiment, as described in detail below, the pipe segments 1022*a* and 1022*b* are welded together at their beveled end portions.

In one embodiment, the first pipe segment 1022*a* and the second pipe segment 1022*b* have a length of at least 30 feet. In one embodiment, the first pipe segment 1022*a* and the second pipe segment 1022*b* have a length of at least 31.5 feet. In one embodiment, the first pipe segment 1022*a* and the second pipe segment 1022*b* have a length of at least 33 feet. In one embodiment, the first pipe segment 1022*a* and the second pipe segment 1022*b* have a length of at least 34.5 feet. In one embodiment, the first pipe segment 1022*a* and the second pipe segment 1022*b* have a length of at least 36 feet.

In one embodiment, the first pipe segment 1022*a* and the second pipe segment 1022*b* have an exterior diameter of 24 inches or less. In one embodiment, the exterior diameter of the pipe segment may also be referred to as the outer diameter of the pipe segment.

In one embodiment, the first pipe segment 1022*a* and the second pipe segment 1022*b* have a nominal exterior diameter of 24 inches or less. In one embodiment, the first pipe segment 1022*a* and the second pipe segment 1022*b* each have an exterior diameter of 24.1875 inches or less. In one embodiment, the first pipe segment 1022*a* and the second pipe segment 1022*b* each have an exterior diameter of 23.8125 inches or less.

In one embodiment, the first pipe segment 1022*a* and the second pipe segment 1022*b* have an exterior diameter of 22.8 inches or less. In one embodiment, the first pipe segment 1022*a* and the second pipe segment 1022*b* have an exterior diameter of 21.6 inches or less. In one embodiment, the first pipe segment 1022*a* and the second pipe segment 1022*b* each have an exterior diameter of 20.4 inches or less. In one embodiment, the first pipe segment 1022*a* and the second pipe segment 1022*b* each have an exterior diameter of 19.2 inches or less.

In one embodiment, the first pipe segment 1022*a* and the second pipe segment 1022*b* each have an exterior diameter in the range of 26 to 28 inches.

In one embodiment, the first pipe segment 1022*a* and the second pipe segment 1022*b* are made of a metal material. In one embodiment, the first pipe segment 1022*a* and the second pipe segment 1022*b* are made of a carbon steel material. In one embodiment, the first pipe segment 1022*a* and the second pipe segment 1022*b* are made of an alloy steel material. In one embodiment, the first pipe segment 1022*a* and the second pipe segment 1022*b* are made of a low-alloy steel material. In one embodiment, the first pipe segment 1022*a* and the second pipe segment 1022*b* are made of a stainless steel material. In one embodiment, the first pipe segment 1022*a* and the second pipe segment 1022*b* may be made of a American Petroleum Institute specification (API) 5L grade X52 (i.e., 52000 PSI minimum yield strength and 66000 PSI minimum tensile strength) material. In one embodiment, the first pipe segment 1022*a* and the second pipe segment 1022*b* may be made of an API 5L grade X60 (i.e., 60000 PSI minimum yield strength and 75000 PSI minimum tensile strength) material.

In one embodiment, the first pipe segment 1022*a* and the second pipe segment 1022*b* may be made completely or in-part from a Corrosion Resistant Alloy (CRA). In one embodiment, the Corrosion Resistant Alloy may include both iron-based alloys such as various grades of stainless steel or nickel-based alloys (i.e., typically known by the trade name, Inconel).

In one embodiment, some CRA materials may require shield gas on both sides of the weld. In one embodiment, in such an instance, a purge and inspection system 7001 (as will be described in detail with respect to FIGS. 86-100) may be used within the pipes 1022*a*, 1022*b* to provide a purge gas chamber inside (at interface region of) the pipes to be welded and an external weld system 7500 (as shown in FIG. 97) may be used outside the pipes 1022*a*, 1022*b*. In one embodiment, the external weld system 7500 may be configured to provide shield gas outside (e.g., at joint of) the pipes to be welded.

In one embodiment, the first pipe segment 1022*a* and the second pipe segment 1022*b* may be made of the same material. In one embodiment, the first pipe segment 1022*a* and the second pipe segment 1022*b* may be made of the different materials.

In one embodiment, the first pipe segment 1022*a* and the second pipe segment 1022*b* may be made of bi-metallic materials where the inner portion of the pipe segment is a CRA material and the outer portion of the pipe segment may be either carbon steel or a different CRA material than the inner portion.

Figure 2A:
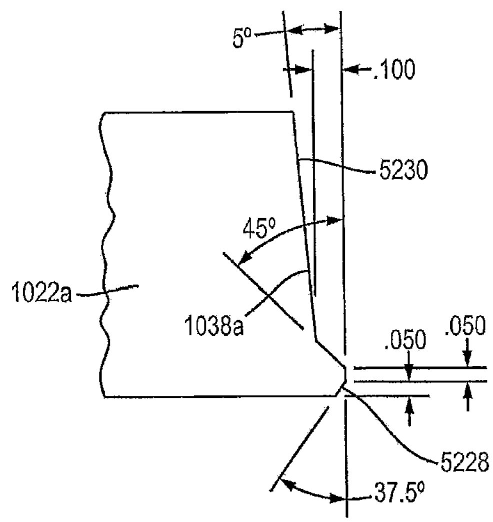
FIGS. 2A and 2B show bevel details for a single pipe segment and for a joint (prior to welding) between two pipe segments in accordance with an embodiment of the present patent application.
Figure 2B:
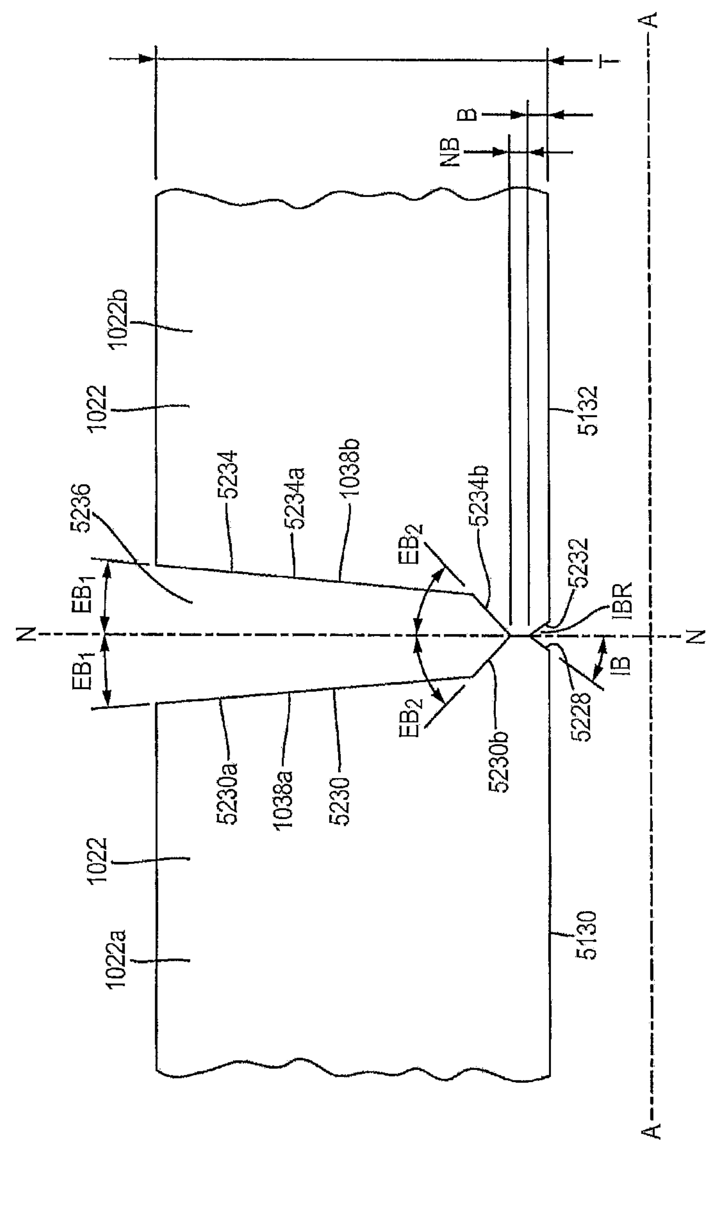
Figure 2C:
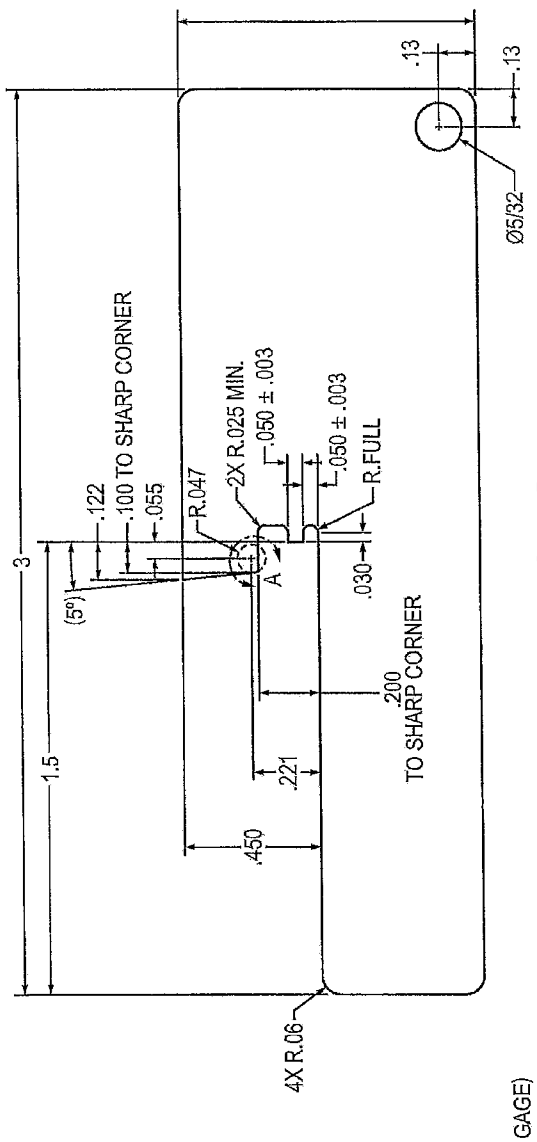
FIGS. 2C-2F show a front view, a perspective view, a side view and a detailed view of a bevel gage used to gage the pipe bevel in accordance with an embodiment of the present patent application.
Figure 2D:
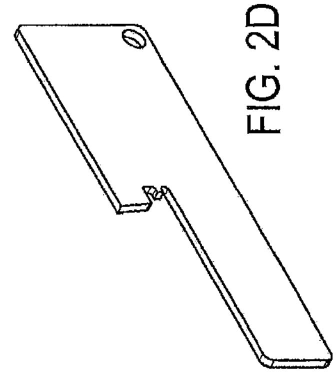
Figure 2F:
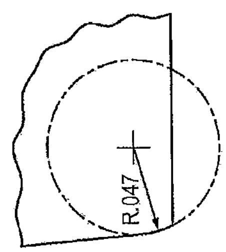
Figure 2E:
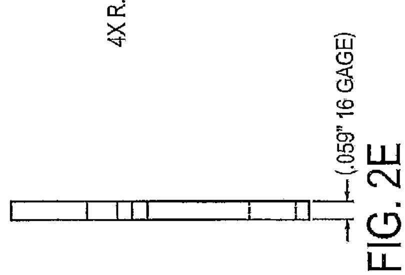
Figure 2G:
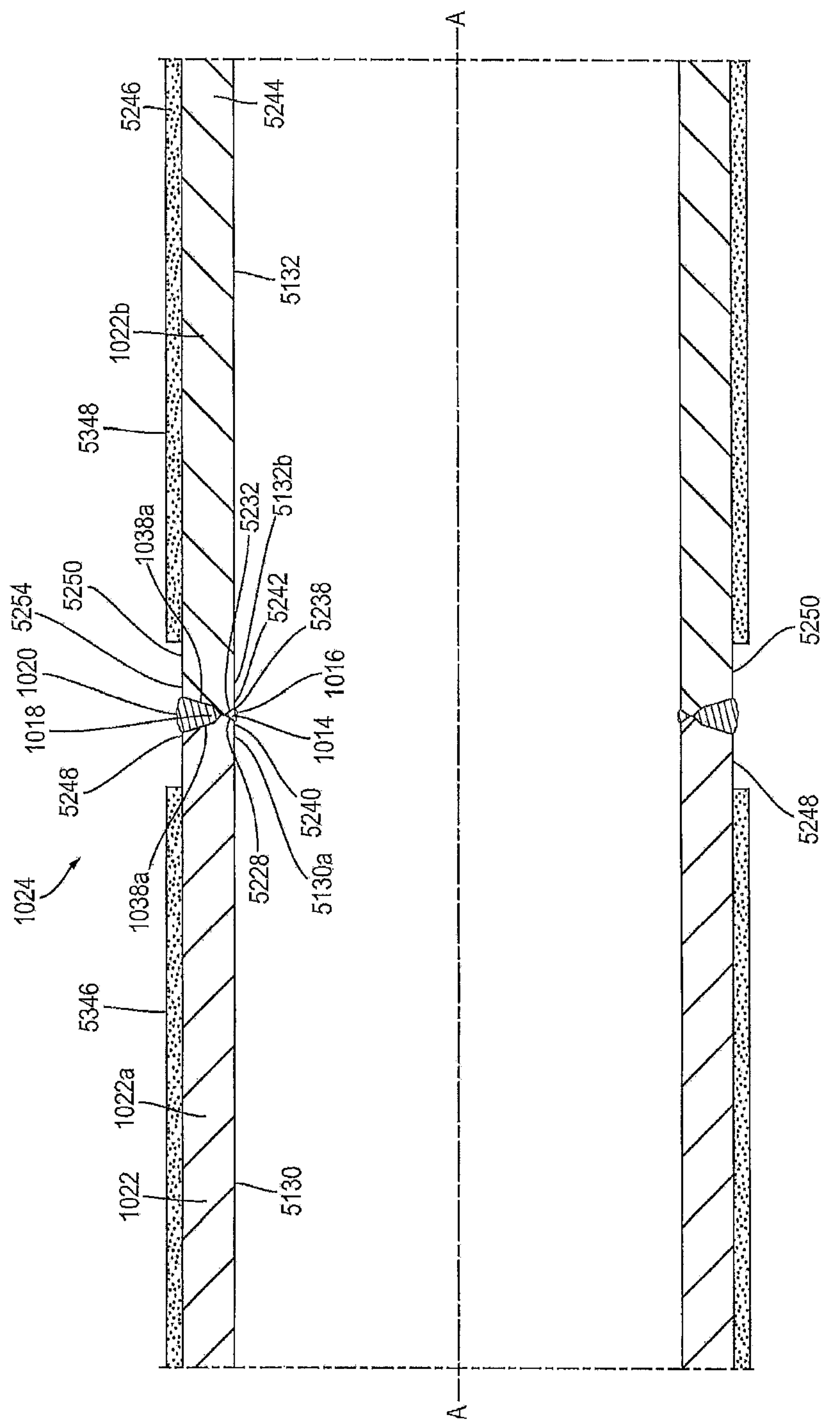
FIGS. 2G-2I show cross-sectional views of pipelines with weld joints formed between their pipes, where

In one embodiment, as shown in FIG. 2G, the first pipe segment 1022*a* and the second pipe segment 1022*b* includes a metal pipe interior 5244 surrounded by an insulator/a coating material 5246. In one embodiment, the end portions of the first pipe segment 1022*a* and the second pipe segment 1022*b* to be welded have the insulator/coating material 5246 removed and the metal pipe interior 5244 exposed.

In one embodiment, the first pipe segment 1022*a* and the second pipe segment 1022*b* may be coated on its external surface with a corrosion resistant material/coating when the first pipe segment 1022*a* and the second pipe segment 1022*b* are used in corrosive environments (e.g., sea/salt water/ocean, chemical, etc.). In one embodiment, the first pipe segment 1022*a* and the second pipe segment 1022*b* may be coated on its external surface with a wear resistant material/coating. In one embodiment, the first pipe segment 1022*a* and the second pipe segment 1022*b* may be coated on its external surface with an insulator material/coating. In one embodiment, the first pipe segment 1022*a* and the second pipe segment 1022*b* may be coated on its interior surface with the corrosion resistant material/coating, the wear resistant material/coating, the insulator coating/material or a combination thereof. In one embodiment, the first pipe segment 1022*a* and the second pipe segment 1022*b* may be coated on both its interior and exterior surfaces with the corrosion resistant material/coating, the wear resistant material/coating, the insulator coating/material or a combination thereof.

In one embodiment, as shown in FIGS. 2A and 2B, an end 1038*a* of the pipe 1022*a* is welded to a second end 1038*b* of the pipe 1022*b*. In one embodiment, the end 1038*a* of the pipe 1022*a* has an internal bevel surface 5228 and an external bevel surface 5230. In one embodiment, the end 1038*b* of the pipe 1022*b* has an internal bevel surface 5232 and an external bevel surface 5234. In one embodiment, as will be clear from the discussions below, a root pass weld layer of weld material is disposed in a region IBR defined by the first internal bevel surface 5228 and the second internal bevel surface 5232 when an internal weld system 5004 is used to deposit the root pass weld layer from within the pipes 1022*a*, 1022*b*.

In one embodiment, the external bevel surfaces 5230 and 5234 each may include first external bevel surfaces 5230*a* and 5234*a* and second bevel surfaces 5230*b* and 5234*b*, respectively. In one embodiment, the first external bevel surfaces 5230*a* and 5234*a* are beveled at an angle $EB_1$ with respect to an axis N-N that is perpendicular to a longitudinal axes A-A of the pipe segments 1022*a*, 1022*b*. In one embodiment, the angle $EB_1$ may be 5°.

In one embodiment, the second external bevel surfaces 5230*b* and 5234*b* are beveled at an angle $EB_2$ with respect to the axis N-N. In one embodiment, the angle $EB_2$ is greater than the angle $EB_1$. In one embodiment, the angle $EB_2$ may be 45°.

In one embodiment, the external bevel surfaces 5230 and 5234 may each include a single bevel surface. In one embodiment, the external bevel surfaces 5230 and 5234 may each include a single continuous surface having a J-shaped configuration.

In one embodiment, the internal bevel surfaces 5228 and 5232 are beveled at an angle IB with respect to the axis N-N. In one embodiment, the angle IB may be 37.5°. In one embodiment, the internal bevel surfaces 5228 and 5232 may have a distance B measured along axis N-N from their respective inner pipe surfaces 5130 and 5132. In one embodiment, the distance B measured along axis N-N from their respective inner pipe surfaces 5130 and 5132 is 0.05 inches.

In one embodiment, the external bevel surfaces 5230 and 5234 and the internal bevel surfaces 5228 and 5232 may be separated from each other by a non-bevel surface. In one embodiment, the non-bevel surface may have a distance NB measured along the axis N-N. In one embodiment, the distance NB measured along axis N-N is 0.05 inches. In one embodiment, the non-bevel surface is optional and the external bevel surfaces 5230 and 5234 and their corresponding internal bevel surfaces 5228 and 5232 may be next to (and touching) each other.

In one embodiment, the internal bevel surfaces 5228 and 5232 of the pipe segments 1022*a*, 1022*b* may have the same bevel angle. In one embodiment, the external bevel surfaces 5230 and 5234 of the pipe segments 1022*a*, 1022*b* may have the same bevel angle(s). In another embodiment, the bevel angle of the internal bevel surfaces 5228 and 5232 of the pipe segments 1022*a*, 1022*b* may vary. In another embodiment, the bevel angle(s) of external bevel surfaces 5230 and 5234 of the pipe segments 1022*a*, 1022*b* may vary.

In one embodiment, the dimensions B of the internal bevel surfaces, the dimension NB of the non-bevel surface, and the bevel angles IB, $EB_1$ and $EB_2$ may vary and depend on the thickness T of the pipe segments 1022*a*, 1022*b*.

In one embodiment, the end 1038*a* of the pipe 1022*a* and the end 1038*b* of the pipe 1022*b* are joined to have a weld groove 5236 formed therebetween. In one embodiment, the weld groove 5236 may have a V-shaped cross-section. In one embodiment, the end 1038*a* of the pipe 1022*a* and the end 1038*b* of the pipe 1022*b* are constructed and arranged to have J-shaped configurations such that the weld groove formed by joining the end 1038*a* of the pipe 1022*a* and the end 1038*b* of the pipe 1022*b* together has a U-shaped configuration. In another embodiment, the shape of the weld groove depends on the welding parameters or conditions.

Referring to FIG. 2, in one embodiment, a weld material 1034 is configured to connect the first pipe segment 1022*a* and the second pipe segment 1022*b*. In one embodiment, the weld material 1034 may include Inconel material or Inconel alloy material. In one embodiment, the weld material 1034 may include a material that has a higher strength than the material of the pipes. In one embodiment, the weld material 1034 may be a different material than the material of the pipes. For example, in one embodiment, the weld material may include Inconel material or Inconel alloy material and the material of the first pipe segment 1022*a* and the second pipe segment 1022*b* may include a stainless steel material.

In one embodiment, the weld material 1034 and/or weld joint 1026 includes a plurality of pass weld layers 1014, 1016, 1018 and 1020. For example, in one embodiment, the plurality of pass weld layers 1014, 1016, 1018 and 1020 may include the root pass weld layer 1014, the hot pass weld layer 1016, one or more fill pass weld layers 1018 and the cap pass weld layer 1020 as will be explained in detail below. The pass weld layer(s) may interchangeably be referred to herein as pass layer(s). In one embodiment, the weld pass (e.g., root pass, hot pass, fill pass(es), cap pass) may be a single advancement of the weld tool or weld system along the weld joint 1026. In one embodiment, a weld bead or a weld layer is formed as a result of each weld pass.

In one embodiment, referring to FIGS. 1A, 1B and 2, the method 1000 for welding pipe sections or segments 1022*a* and 1022*b* together generally includes a root pass weld procedure 1002, a hot pass weld procedure 1004, a fill and cap pass weld procedure 1006, a weld inspection procedure 1008, a heating procedure 1010 and a coating procedure 1012. In one embodiment, the fill and cap pass weld procedure 1006 may include one or more of fill pass weld procedures 1006*a* and a cap pass weld procedure 1006*b*. In one embodiment, the method 1000 is generally a multi-pass weld or multi-layer weld procedure that includes, for example, the root pass weld procedure 1002, the hot pass weld procedure 1004, and the fill and cap weld procedure 1006.

In one embodiment, one or more of the weld passes (e.g., root pass, hot pass, fill pass(es), cap pass) of the multi-pass weld or a multi-layer weld method 1000 may be performed by the same weld system or tool at different times. In one embodiment, the weld passes may be performed sequentially by same weld system or tool. For example, in one embodiment, the root and hot pass weld procedures may be performed sequentially by an internal weld system 5004 (as will be described in detail below) from interior of the pipes. In one embodiment, the fill and cap pass weld procedures may be performed sequentially by an external weld system 7500 from the exterior of the pipes.

In one embodiment, the internal weld system 5004 is generally configured to weld the pipe segments 1022*a* and 1022*b* from inside the pipeline 1024 and the external weld system 7500 is generally configured to weld the pipe segments 1022*a* and 1022*b* from outside the pipeline 1024. In one embodiment, the welding performed by the internal weld system 5004 may result in a K-shaped weld bead or layer and the welding performed by the external weld system 7500 may result in a J-shaped weld bead or layer.

In one embodiment, the hot, fill and cap pass weld procedures may be performed sequentially by the external weld system 7500 from the exterior of the pipes, while only the root pass weld procedure is performed by the internal weld system 5004 (as will be described in detail below) from interior of the pipes.

In one embodiment, one or more of the weld passes (e.g., root pass, hot pass, fill pass(es), cap pass) of the multi-pass or multi-layer weld method 1000 may be performed by different weld systems or tools at same or different times. In one embodiment, the weld passes may be performed sequentially by different weld systems or tools.

In one embodiment, each of the hot, fill and cap pass weld procedures may be performed in its corresponding weld shack from the exterior of the pipes. In one embodiment, the weld shack is a relatively small enclosure, for example, approximately 12 feet wide, 10 feet long and 8 feet high where an external weld system is mounted and carried from one pipe joint to the next by a back end rig. The weld shack typically is a lightweight metal frame covered with thin sheet metal. The weld shack has a special floor designed to pivot up to allow the weld shack to be lowered onto the pipes and then pivot back down to allow easy access to the pipe. In one embodiment, each of the one or more fill pass weld procedures may be performed in different weld shacks each having an external weld system.

In one embodiment, the root pass weld procedure 1002 is the first welding procedure of the multi-pass or multi-layer weld method 1000. In one embodiment, the root pass weld procedure 1002 is performed by the internal weld system 5004. In one embodiment, the root pass weld procedure 1002 may be performed by a tie-in internal weld system 3001 (as will be described in detail below) having on-board weld power.

In one embodiment, the root pass weld procedure 1002, when performed with the internal weld system 5004, may take up to 1.03 minutes. In one embodiment, the cycle time for the root pass weld procedure is 4 minutes (this timing is calculated from when a reach rod or umbilical 5034 is set on an auto travel). In one embodiment, the total cycle time for three cycles of the root pass weld procedure (performed by the internal weld system 5004) is 13.15 minutes (including a 2.30 minutes for the spool/weld wire change procedure), and the average cycle time for the root pass weld procedure (performed by the internal weld system 5004) is 4.42 minutes.

In one embodiment, the root pass weld procedure 1002 may be performed by an external weld system 7500. In one embodiment, the root pass weld procedure 1002 may be performed by the external weld system 7500 with the purge and inspection system 7001. In one embodiment, the root pass weld procedure 1002 may be performed by the external weld system with tie-in clamps. In one embodiment, the root pass weld procedure 1002 may be performed by the external weld system 7500 with internally disposed clamps 7050, 7052. In one embodiment, the internally disposed clamps may be standard clamps or purge clamps (e.g., the purge and inspection system 7001).

In one embodiment, the root pass weld procedure 1002 forms the root pass weld layer 1014. In one embodiment, as shown in FIGS. 1A and 1B, the root pass weld layer 1014 is the first weld bead or layer deposited in the multiple pass or a multi-layer welding method 1000. In one embodiment, the root pass layer may also be referred to as a root sealer bead or layer. In one embodiment, the root pass weld procedure 1002 is performed by Gas Metal Arc Welding (GMAW). In one embodiment, the root pass weld procedure 1002 is performed by Gas Tungsten Arc Welding (GTAW). In one embodiment, the root pass weld procedure 1002 is performed by Short Circuit Gas Metal Arc Welding (GMAW-S). In another embodiment, the root pass weld procedure 1002 is performed by other welding processes as would be appreciated by one skilled in the art.

In one embodiment, the hot pass weld procedure 1004 is the second welding procedure of the multi-pass or multi-layer weld method 1000. In one embodiment, the hot pass weld procedure 1004 is performed by the internal weld system 5004. In one embodiment, the hot pass weld procedure 1004 may be performed by the tie-in internal weld system 3001 having on-board weld power.

In another embodiment, the hot pass weld procedure 1004 is performed by the external weld system 7500. In one embodiment, the hot pass weld procedure 1004 is performed by the external weld system with internally disposed clamps. In one embodiment, the internally disposed clamps may be standard clamps or purge and inspection clamps. In another embodiment, the hot pass weld procedure 1004 may be performed by a manual welder. In such an embodiment, the pipe ends are configured to include a 30° bevel angle.

In one embodiment, the hot pass weld procedure 1004, when performed with the external weld system (in a weld shack) and in a ditch side location, may take up to 1.06 minutes. In one embodiment, the hot pass weld procedure 1004, when performed with the external weld system (in a weld shack) and in a work side location, may take up to 58 seconds. In one embodiment, the cycle time for the hot pass weld procedure is 2.38 minutes (this timing is calculated from when the hot pass weld shack is set on the pipe). In one embodiment, the total cycle time for three cycles the hot pass weld procedure performed by the external weld system in a weld shack is 11.35 minutes, and the average cycle time for the hot pass weld procedure performed by the external weld system in a weld shack is 3.45 minutes.

In one embodiment, the hot pass weld procedure 1004 forms the hot pass weld layer 1016. In one embodiment, as shown in FIG. 2, the hot pass weld layer 1016 is the second weld bead or layer deposited in the multiple pass or a multi-layer weld method 1000. In one embodiment, the hot pass weld procedure 1004 immediately follows the root pass weld procedure 1002. In one embodiment, the hot pass weld procedure 1004 is performed by Gas Metal Arc Welding (GMAW). In one embodiment, the hot pass weld procedure 1004 is performed by Gas Tungsten Arc Welding (GTAW). In one embodiment, the hot pass weld procedure 1004 is performed by Short Circuit Gas Metal Arc Welding (GMAW-S). In another embodiment, the hot pass weld procedure 1004 is performed by other welding processes as would be appreciated by one skilled in the art.

In one embodiment, the one or more of fill pass weld procedures 1006*a* and the cap weld procedure 1006*b* of the fill and cap pass weld procedure 1006 are performed by the external weld system 7500. In one embodiment, the fill and cap pass weld procedure 1006 may be performed at multiple stations. In another embodiment, the fill and cap pass weld procedure 1006 may be performed by a manual welder. In such an embodiment, the pipe ends are configured to include a 30° bevel angle.

In one embodiment, the one or more fill pass weld procedures 1006*a* follow (or are performed after) the hot pass weld procedure 1004. In one embodiment, the one or more fill pass weld procedures 1006*a* form the fill pass weld layer(s) 1018. The fill pass weld layer(s) 1018 are configured to fill the weld groove and be substantially flush with the surfaces of the pipe segments 1022*a* and 1022*b* of the pipeline 1024. In one embodiment, the number of fill pass weld procedures 1006*a* in the multiple pass or multi-layer weld method 1000 may vary. In one embodiment, the number of fill pass weld procedures 1006*a* in the multiple pass or multi-layer weld method 1000 may depend on the thickness of the pipe segments 1022*a* and 1022*b* of the pipeline 1024 being welded together.

In one embodiment, the fill pass weld procedures 1006*a* are performed by Gas Metal Arc Welding (GMAW). In one embodiment, the fill pass weld procedures 1006*a* are performed by Gas Tungsten Arc Welding (GTAW). In one embodiment, the fill pass weld procedures 1006*a* are performed by Pulsed Gas Metal Arc Welding (GMAW-P). In another embodiment, the fill pass weld procedures 1006*a* are performed by other welding processes as would be appreciated by one skilled in the art.

In one embodiment, the cap pass weld procedure 1006*b* is the last or final weld procedure of the multi-pass or multi-layer weld method 1000. In one embodiment, the cap pass weld procedure 1006*b* follows (or is performed after) the fill pass weld procedure(s) 1006*a*. In one embodiment, as shown in FIG. 2, the cap pass weld layer 1020 is the weld bead or layer deposited subsequent the fill pass weld procedures 1006*a*. In one embodiment, the cap pass weld procedure 1006*b* may also be referred to as a cover pass weld procedure. In one embodiment, the cap pass weld procedure 1006*b* forms the cap pass weld layer 1020. In one embodiment, as shown in FIG. 2, the cap pass weld layer 1020 is the last or final weld bead deposited in the multiple pass or a multi-layer weld method 1000. In one embodiment, the cap pass weld layer 1020 is configured to be substantially higher than the surfaces of the pipe segments 1022*a* and 1022*b* of the pipeline 1024.

In one embodiment, the cap pass weld procedure 1006*b* is performed by Gas Metal Art Welding (GMAW). In one embodiment, the cap pass weld procedure 1006*b* is performed by Gas Tungsten Art Welding (GTAW). In one embodiment, the cap pass weld procedure 1006*b* is performed by Pulsed Gas Metal Arc Welding (GMAW-P). In another embodiment, the cap pass weld procedure 1006*b* is performed by other welding processes as would be appreciated by one skilled in the art.

In one embodiment, the root pass weld procedure 1002 may be the only pass weld procedure of the multi-pass or multi-layer weld method 1000 that is performed by the internal weld system 5004, while the hot pass weld procedure 1004 and the fill and cap pass weld procedure 1006 are all performed using the external weld system 7500.

In another embodiment, both the root pass weld procedure 1002 and the hot pass weld procedure 1004 of the multi-pass or multi-layer weld method 1000 are performed by the internal weld system 5004, while the fill and cap pass weld procedure 1006 is performed using the external weld system 7500.

In yet another embodiment, the root pass weld procedure 1002, the hot pass weld procedure 1004 and the fill and cap pass weld procedure 1006 are performed using the external weld system 7500. In one embodiment, the purge and inspection clamps are used inside the pipes 1022*a*, 1022*b*, while the external weld system 7500 performs the root pass weld procedure 1002, the hot pass weld procedure 1004 and the fill and cap pass weld procedure 1006.

Figure 2H:
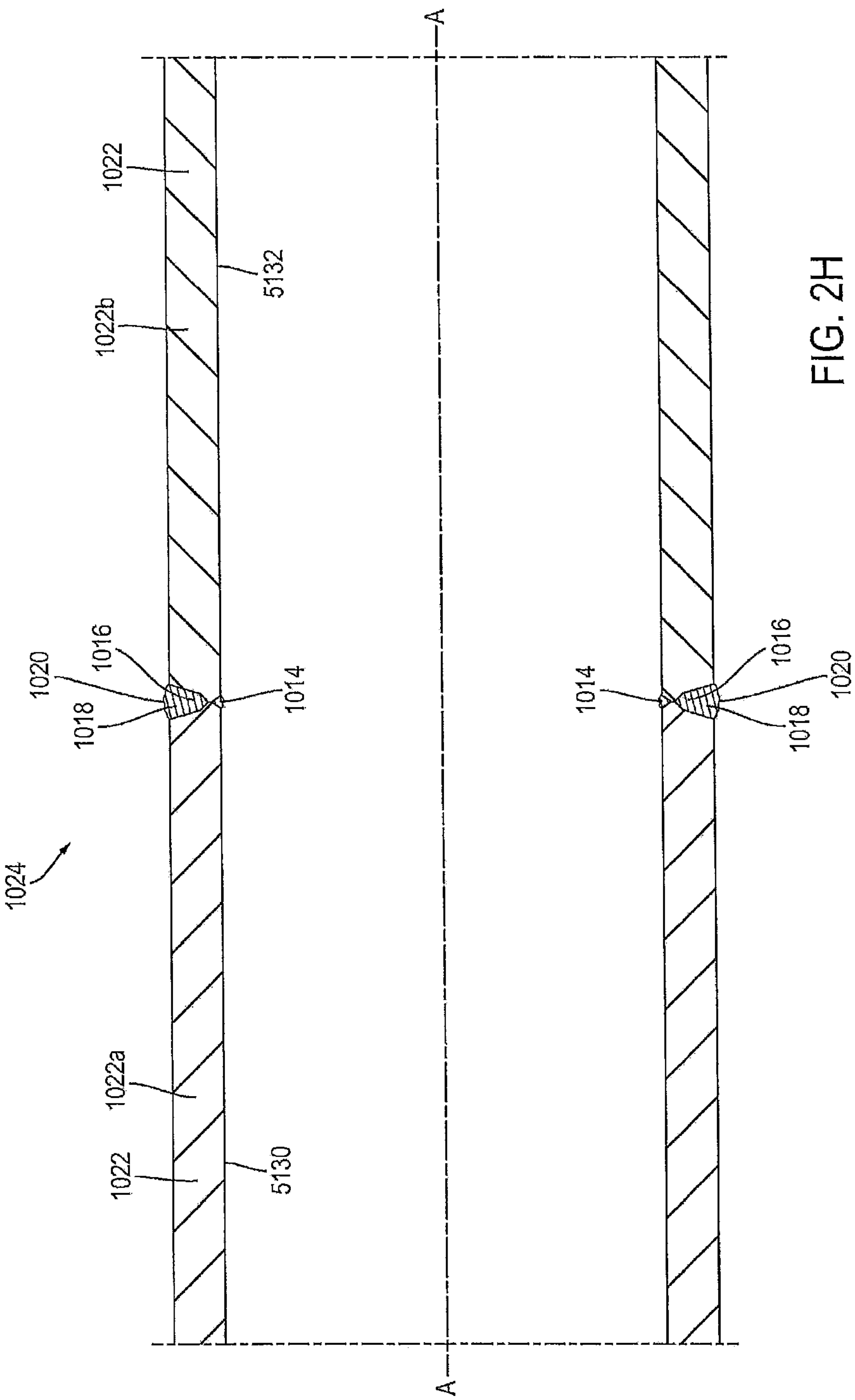
Figure 2I:
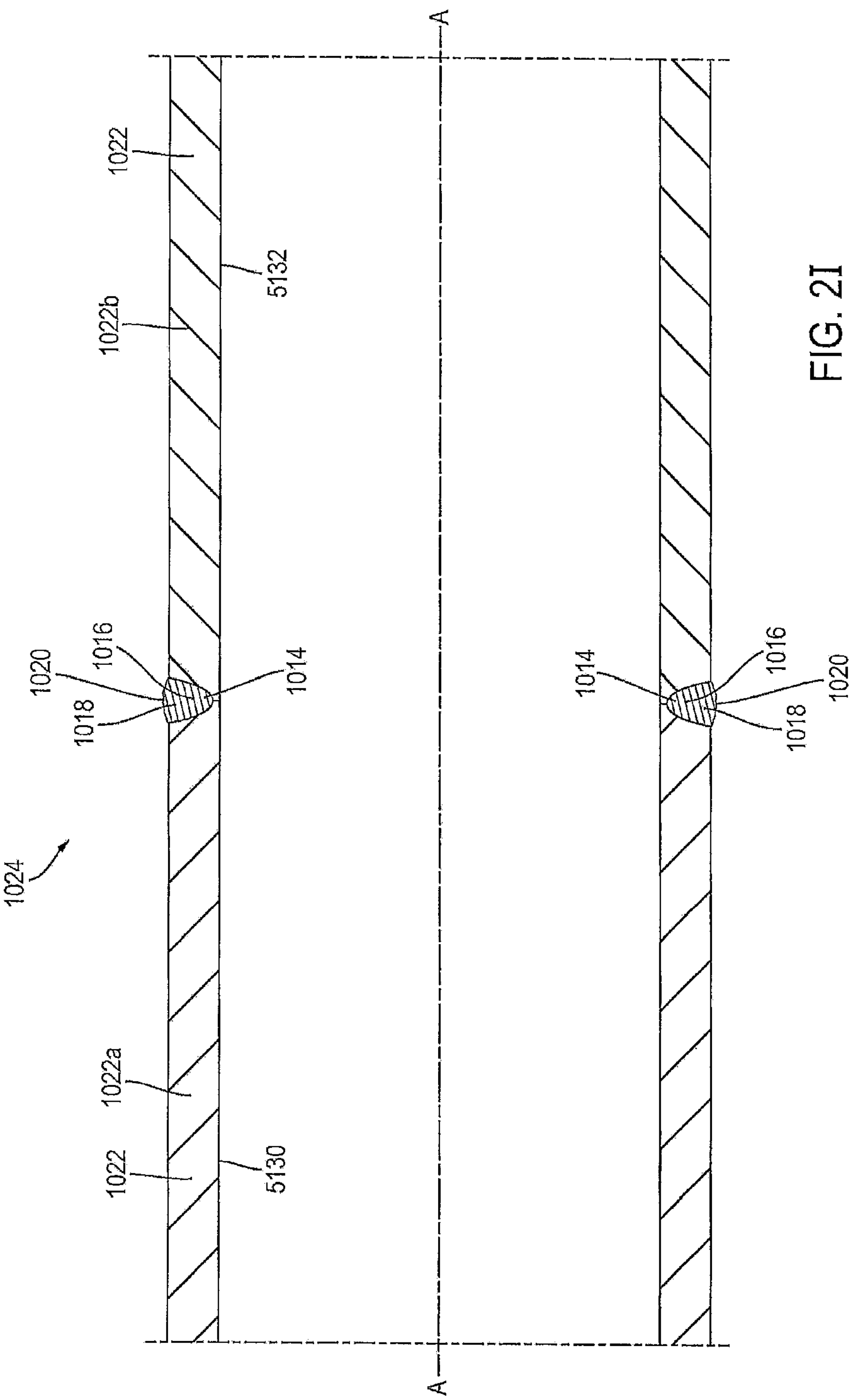

FIGS. 2G-2I show cross-sectional views of pipelines 1024 with weld joints 1026 formed therebetween.

FIG. 2G shows a cross-sectional view of the pipeline 1024 with the weld joint 1026 formed therebetween. For example, the weld joint 1026 of FIG. 2G includes the root pass weld layer 1014 and the hot pass weld layer 1016 formed by the internal weld system 5004 from interior of the pipes 1022*a*, 1022*b*, while the one or more fill pass weld layers 1018 and the cap pass weld layer 1020 are formed by the external weld system 7500 from the exterior of the pipes 1022*a*, 1022*b*.

The individual weld pass layers (e.g., root pass weld layer 1014, hot pass weld layer 1016, fill and cap pass weld layers 1018 and 1020) may also be clearly seen in FIG. 2. The border 1032 between the weld material 1034 and pipe material 1036 may be easily and clearly distinguished in FIG. 2. In one embodiment, the shape of the border 1032 (as illustrated by the line ABCDE) is unique to the pipeline 1024 that is welded (e.g., the root pass weld procedure 1002 and/or the hot pass weld procedure 1004) from the inside the pipeline 1024.

In one embodiment, when both the root pass weld procedure 1002 and the hot pass weld procedure 1004 of the multi-pass or multi-layer weld method 1000 are performed by the internal weld system 5004 from inside the pipeline 1024, the locations of the root pass weld layer 1014 and hot pass weld layer 1016 will swap (e.g., when compared to the weld joint in which the root pass weld procedure is performed by the internal weld system 5004 from inside the pipeline 1024 and the hot pass weld procedure 1004 is performed by the external weld system from outside the pipeline 1024). In one embodiment, as shown in FIGS. 2 and 2G, the hot pass weld layer 1016 is positioned closer to an interior longitudinal axis A-A of the welded first and second pipes 1022*a* and 1022*b* than the root pass weld layer 1014.

In one embodiment, the hot pass weld layer 1016 of the weld material 1034 has at least a portion 5238 thereof disposed closer to the longitudinal axis A-A than interior surfaces 5130, 5132 of the welded pipes 1022*a* and 1022*b* in regions 5240 and 5242 of the welded pipes 1022*a* and 1022*b* immediately adjacent to the weld material 1034 on opposite sides of the weld material 1034. In one embodiment, as shown in FIGS. 2 and 2G, when both the root pass weld procedure 1002 and the hot pass weld procedure 1004 of the multi-pass or multi-layer weld method 1000 are performed by the internal weld system 5004 from inside the pipeline 1024, the necked-down area 1028 of the weld joint 1026 occurs further from the inner walls 5130, 5132 of the pipeline 1024.

In one embodiment, the root pass weld layer 1014 is disposed in the internal bevel surfaces 5228, 5232 of the first and second pipe 1022*a* and 1022*b* and the hot pass weld layer 1016 is disposed on top of the root pass weld layer 1014 (i.e., closer to the interior longitudinal axis A-A). In one embodiment, the internal weld system 5004 is constructed and arranged to perform more than one welding pass from inside the pipeline 1024. In one embodiment, the internal weld system 5004 is constructed and arranged to be actuated in the radial direction so that the internal weld system 5004 can adjust the height of the weld torch 5502 between the two passes (e.g., the root pass weld procedure 1002 and the hot pass weld procedure 1004).

In one embodiment, additional weld pass layer(s) may be disposed on top of the hot pass layer 1016 and positioned closer to the interior longitudinal axis A-A of the welded first and second pipes 1022*a*, 1022*b* than the hot pass layer 1016. For example, in one embodiment, the one or more fill pass weld layers 1018 may be performed by the internal weld system 5004 such that the one or more fill pass weld layers 1018 are disposed on top of the hot pass layer 1016 and positioned closer to the interior longitudinal axis A-A of the welded first and second pipes 1022*a*, 1022*b* than the hot pass layer 1016. For example, in one embodiment, the one or more fill pass weld layers 1018 and the cap pass weld layers 1020 may be performed by the internal weld system 5004 such that the one or more fill pass weld layers 1018 and the cap pass weld layers 1020 are disposed on top of the hot pass layer 1016 and positioned closer to the interior longitudinal axis A-A of the welded first and second pipes 1022*a*, 1022*b* than the hot pass layer 1016.

In another embodiment, the one or more fill pass weld layers 1018 and the cap pass weld layer 1020 are disposed in the external bevel surfaces 5230, 5234 of the first and second pipe 1022*a* and 1022*b* and may be performed by the external weld system 7500 from outside the pipeline 1024.

FIG. 2H shows a cross-sectional view of the pipeline 1024 with the weld joint 1026 formed therebetween. For example, the weld joint 1026 of FIG. 2H includes the root pass weld layer 1014 formed by the internal weld system 5004 from interior of the pipes 1022*a*, 1022*b*, while the hot pass weld layer 1016, the one or more fill pass weld layers 1018, and the cap pass layer 1020 are formed by the external weld system 7500 from the exterior of the pipes 1022*a*, 1022*b*. In one embodiment, the root pass weld layer 1014 is disposed in the internal bevel 5228, 5232 of the first and second pipe 1022*a* and 1022*b*. In one embodiment, the hot pass weld layer 1016, the one or more fill pass weld layers 1018 and the cap pass weld layer 1020 are disposed in the external bevel surfaces 5230, 5234 of the first and second pipe 1022*a* and 1022*b*.

FIG. 2I shows a cross-sectional view of the pipeline 1024 with the weld joint 1026 formed therebetween. For example, the weld joint 1026 of FIG. 2I includes the root pass weld layer 1014, the hot pass weld layer 1016, the one or more fill pass weld layers 1018 and 1020 formed by the external weld system 7500 from the exterior of the pipes 1022*a*, 1022*b*. In one embodiment, the root pass weld layer 1014, the hot pass weld layer 1016, the one or more fill pass weld layers 1018 and the cap pass weld layer 1020 are all disposed in the external bevel surfaces 5230, 5234 of the first and second pipe 1022*a* and 1022*b*.

In one embodiment, after the weld joint 1026 is completed, the weld joint 1026 may be inspected during the weld inspection procedure 1008. In one embodiment, the weld inspection procedure 1008 is performed after the fill and cap pass weld procedure 1006. In one embodiment, the weld joint 1026 may be cleaned before the weld inspection procedure 1008. In one embodiment, a significant amount of heat may be generated during the welding procedures (e.g., procedures 1002, 1004, and 1006). In one embodiment, the weld inspection procedure 1008 is carried out at an operating temperature that is less than at the higher weld temperature. In one embodiment, the weld joint 1026 may be cooled before the weld inspection procedure 1008 by an internal cooling system 2010 or 6500 (as described in detail below). In one embodiment, the weld inspection procedure 1008 may include any type of nondestructive testing/inspection of the weld joint 1026.

In one embodiment, the weld inspection procedure 1008 may include an Automated Ultrasound Testing (AUT). In one embodiment, the Automated Ultrasound Testing of the weld joint 1026 may be used for both onshore and offshore pipeline weld applications. In one embodiment, the AUT is configured to be used in high-production environments. In one embodiment, the AUT is configured to be used for detecting and sizing weld flaws.

Figure 136:
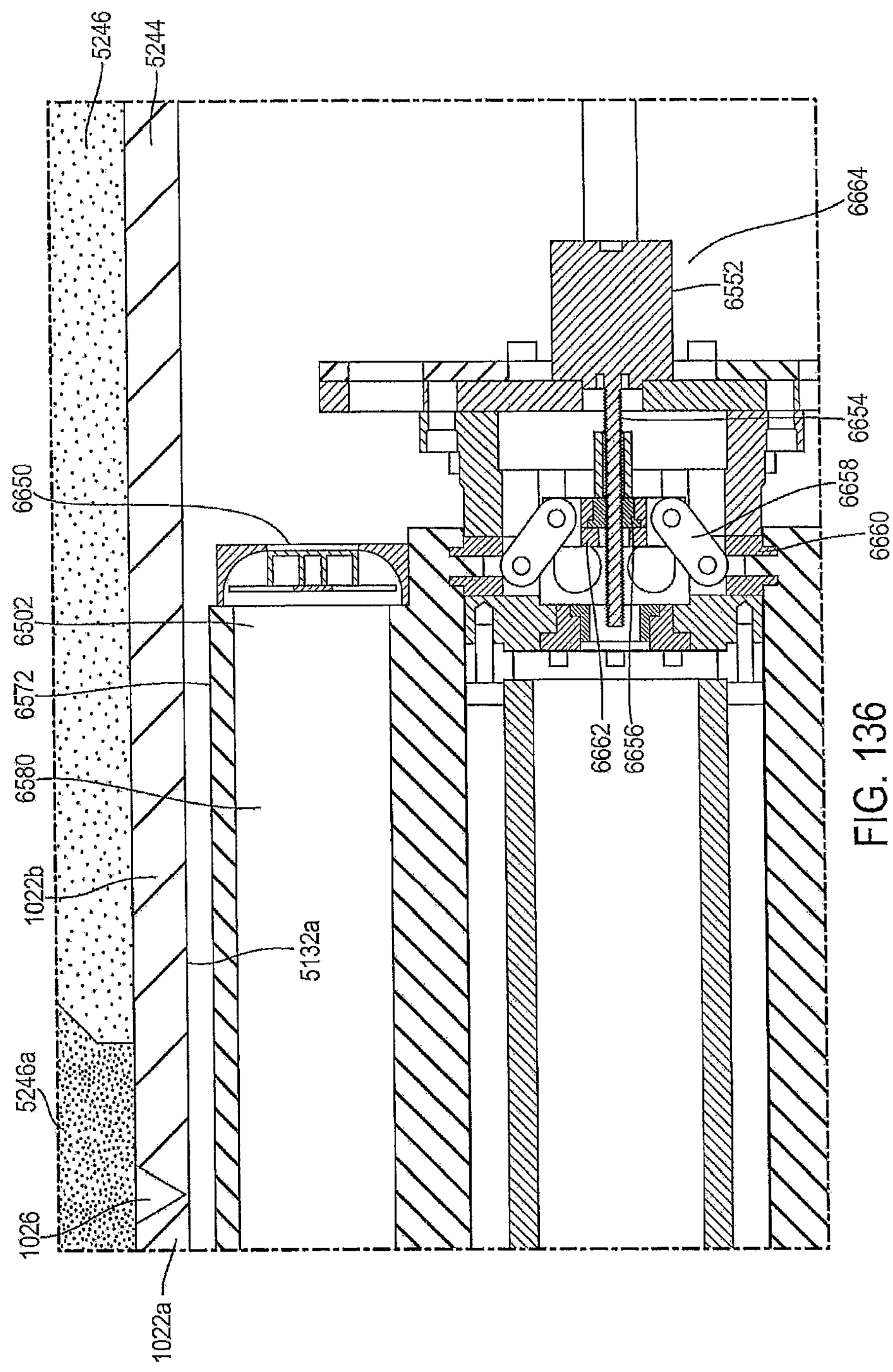
Figure 136A:
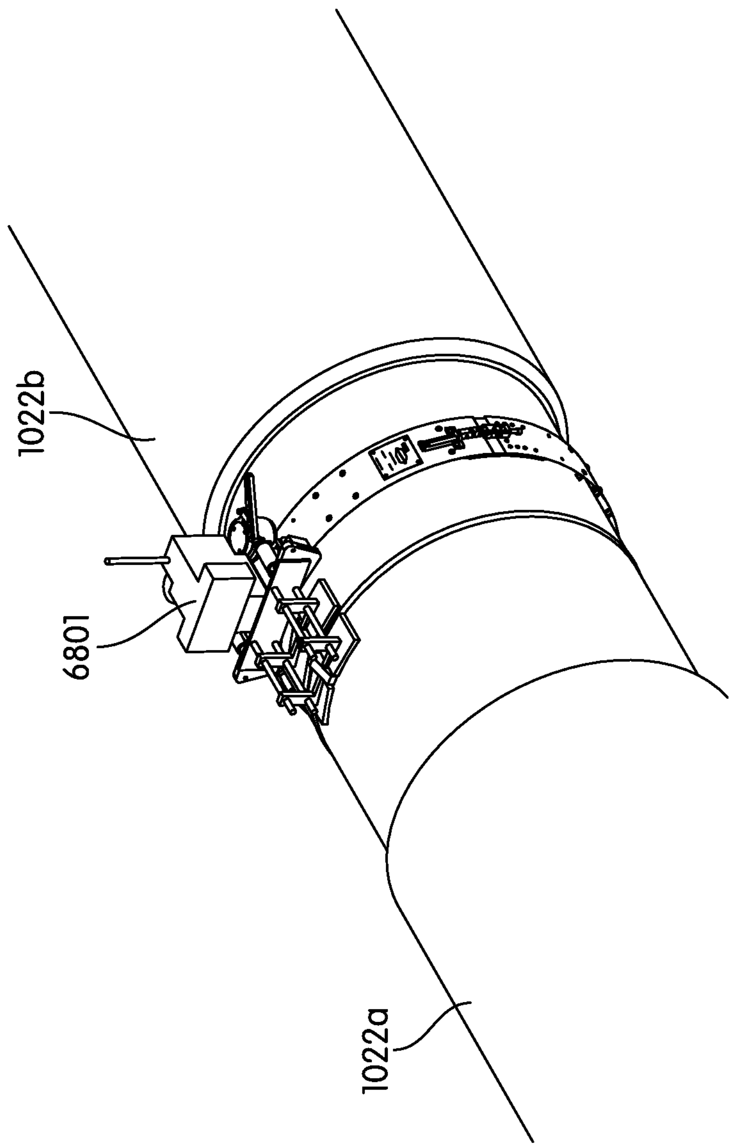
FIG. 136A shows a perspective view of an ultrasound inspection station that is configured to inspect the weld between the welded metal pipes in accordance with an embodiment of the present patent application.

In one embodiment, the Automated Ultrasound Testing is performed by an AUT scanner system (e.g., 6801 as shown in FIG. 136A). In one embodiment, the AUT scanner system includes an ultrasonic sensor system. In one embodiment, the AUT scanner system may be portable. In one embodiment, the AUT scanner system may also include a data acquisition system that is operatively connected to the ultrasonic sensor system. In one embodiment, the ultrasonic sensor system may include an emitter that is configured to send, for example, ultrasonic signals (e.g., wave pulses) into the pipe segments 1022*a* and 1022*b* and/or the girth weld 1026 therebetween. In one embodiment, the ultrasonic signals or pulses may be sent at a rate from 1 Hz to 20,000 Hz. In one embodiment, the frequency of the ultrasonic sound wave may vary from 0.5 MHz to 23 MHz.

In one embodiment, the ultrasonic signals or pulses, sent by the emitter, are configured to reflect off the boundaries where the density of the girth weld 1026 changes. In one embodiment, the ultrasonic sensor system may include a receiver that is configured to receive/detect the reflected pulses. In one embodiment, the receiver is configured to measure the intensity of the reflected pulse and produce an electronic signal proportional to the intensity of the reflected pulse. In one embodiment, the emitter and receiver of the ultrasonic sensor system may have multiple elements or components. In one embodiment, the emitter of the ultrasonic sensor system may be selectively activated to target the ultrasonic pulse at a specific location.

In one embodiment, a range of Automated Ultrasonic Testing (AUT) may include Time of Flight Diffraction (ToFD), Phased Array (PA), corrosion mapping, and/or complete weld inspection. In one embodiment, the Time of Flight Diffraction (ToFD) ultrasonic weld inspection may be used when multiple weld bevels are to be evaluated.

In one embodiment, the AUT weld inspection procedure may include a full-coverage pulse-echo ultrasonic weld inspection. In one embodiment, the pulse-echo ultrasonic inspection techniques use Phased Array (PA) probes coupled with ToFD inspection to provide very accurate weld flaw measurements. In one embodiment, the welds may be divided into zones (zonal discrimination) that are evaluated individually, with the results being reassembled into a comprehensive weld analysis. In one embodiment, a linear and sectorial scanning may provide superior weld examination. In one embodiment, the ToFD ultrasonic weld inspection may be used to supplement the full-coverage pulse-echo ultrasonic weld inspection.

In yet another embodiment, the weld inspection procedure 1008 may include an X-ray radiography Testing. In one embodiment, the X-ray radiography Testing is performed by an X-ray radiography system. In one embodiment, the X-ray radiography system includes an emitter that is configured to send an X-ray radiation into the pipe segments 1022*a* and 1022*b* and the girth weld 1026 therebetween. In one embodiment, the intensity of the X-ray radiation may be attenuated by the material of the pipe segments 1022*a* and 1022*b* and girth weld 1026 therebetween. In one embodiment, the X-ray radiography system includes a receiver that is configured to measure the intensity of the X-ray radiation that passes through the material of the pipe segments 1022*a* and 1022*b* and girth weld 1026 therebetween.

In one embodiment, the weld inspection procedure 1008 may include Gamma and close proximity radiography inspection. In one embodiment, the weld inspection procedure 1008 may include Magnetic Particle Inspection (MPI) or Dye Penetrant Inspection (DPI). In one embodiment, the weld inspection procedure 1008 may include any other Non-Destructive Testing (NDT), for example, but not limited to, Guided Wave Ultrasonic testing, eddy current testing, hardness testing, Tank Floor Testing (MFL), Positive Material Identification, Corrosion Mapping Surveys, etc. In one embodiment, the Non-Destructive Testing (NDT) may generally refer to any testing configured to identify weld defects without damaging the pipes and/or the weld formed therebetween.

Referring to FIG. 2G, in one embodiment, as discussed above, each pipe segment 1022*a*, 1022*b* includes the metal pipe interior 5244 surrounded by external protective coatings (e.g., an insulator material) 5246. In one embodiment, end portions 5248 and 5250 of the pipe segments 1022*a*, 1022*b* to be welded have the metal pipe interior exposed.

Figure 118:
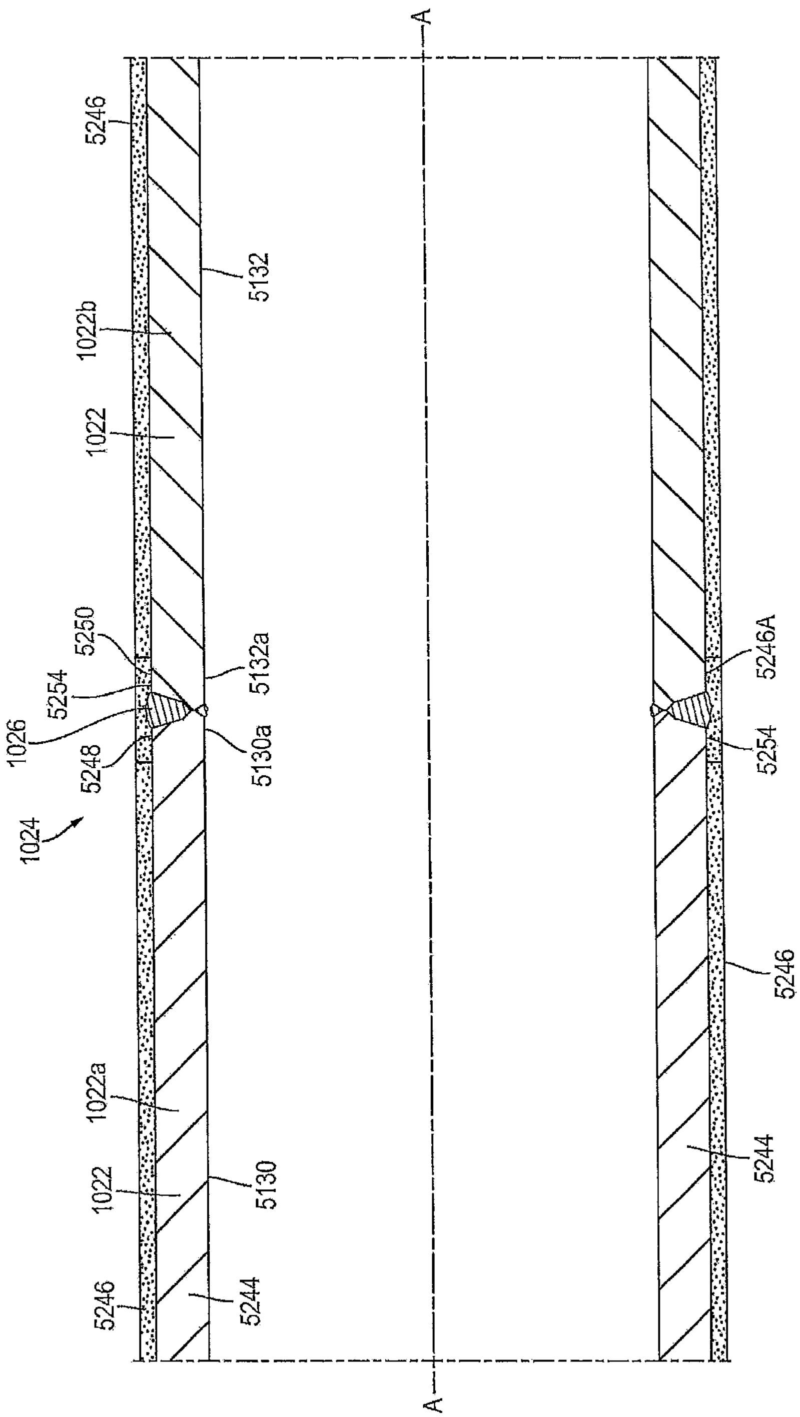
FIG. 118 shows a cross-sectional view of the pipes with the weld joint formed between their exposed metal pipe ends and an insulator adhered to the exterior surface of the metal pipe interior, thus insulating the formerly exposed end portions of the pipes in accordance with an embodiment of the present patent application.

In one embodiment, after the weld inspection procedure 1008, external protective coatings are applied back to the weld joint 1026. For example, an insulator is applied to the exposed end portions 5248, 5250 of the welded pipes 1022*a*, 1022*b* such that the insulator 5246A (as shown in FIG. 118) is adhered to an exterior surface 5254 of the metal pipe interior 5244, thus insulating the formerly exposed end portions 5248, 5250 of the pipes 1022*a*, 1022*b*.

In one embodiment, to facilitate the application of the external protective coatings or the insulator, the weld joint 1026 and the surrounding portions of the pipe segments 1022*a* and 1022*b* of the pipeline 1024 are heated to a predetermined coating temperature. In one embodiment, the exposed end portions 5248, 5250 of the welded pipes 1022*a*, 1022*b* are heated. In one embodiment, the predetermined coating temperature is the temperature that is required for the application of the external protective coatings or the insulator. In one embodiment, the predetermined coating temperature is configured to provide a good adhesion or bonding between the external protective coatings or the insulator and the pipeline 1024.

In one embodiment, the heating procedure 1010 is performed after the weld inspection procedure 1008. In one embodiment, an induction pre-heating procedure may be used to heat the exposed end portions 5248, 5250 of the welded pipes 1022*a*, 1022*b* of the pipeline 1024 in preparation for application of the coating material(s) or the insulator.

Figure 115A:
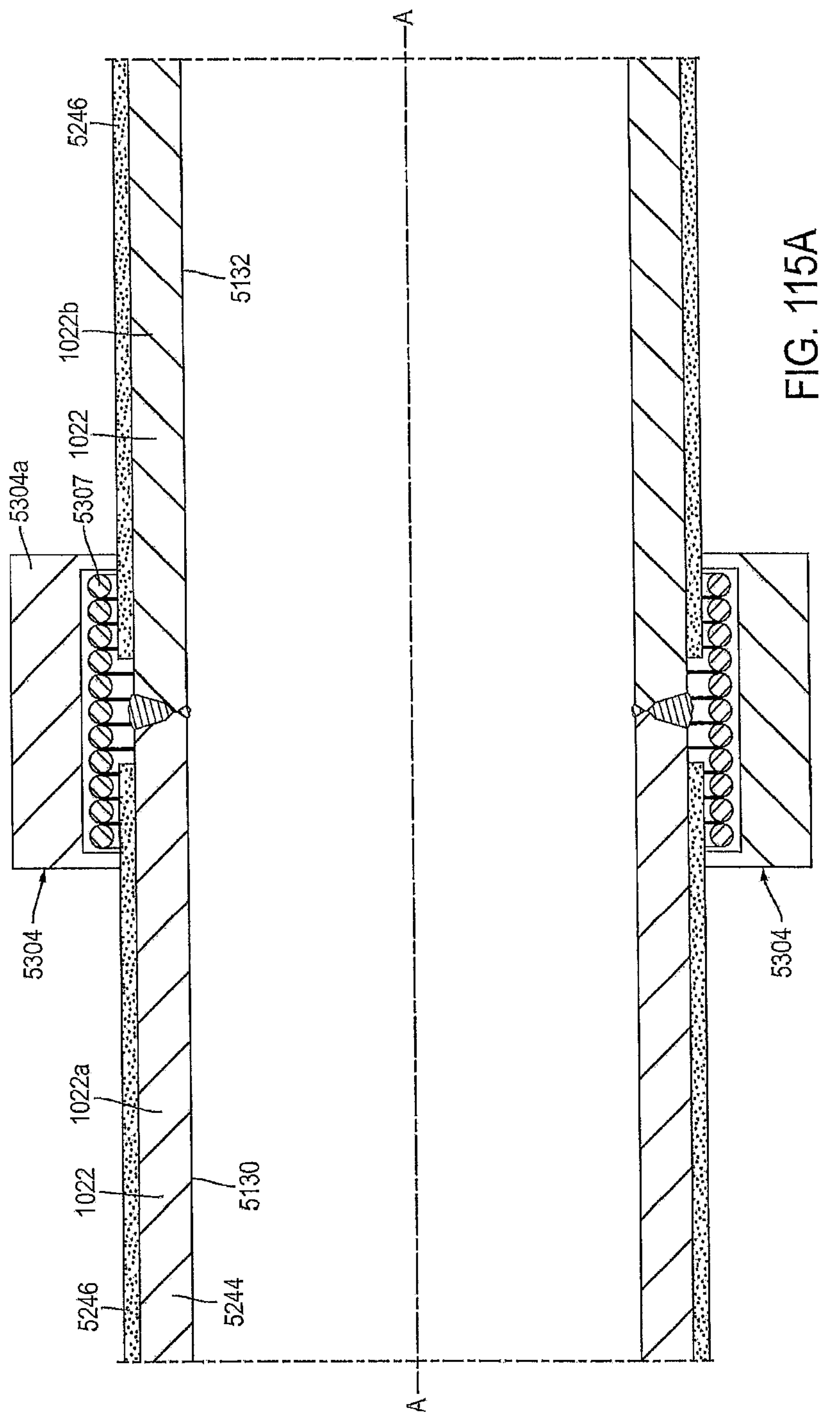
FIGS. 115A and 115B show a cross-sectional view and a perspective view of the pipes with the weld joint formed between their exposed metal pipe ends and a heater positioned on the pipes to heat the exposed end portions of the welded pipes, respectively in accordance with an embodiment of the present patent application.
Figure 115B:
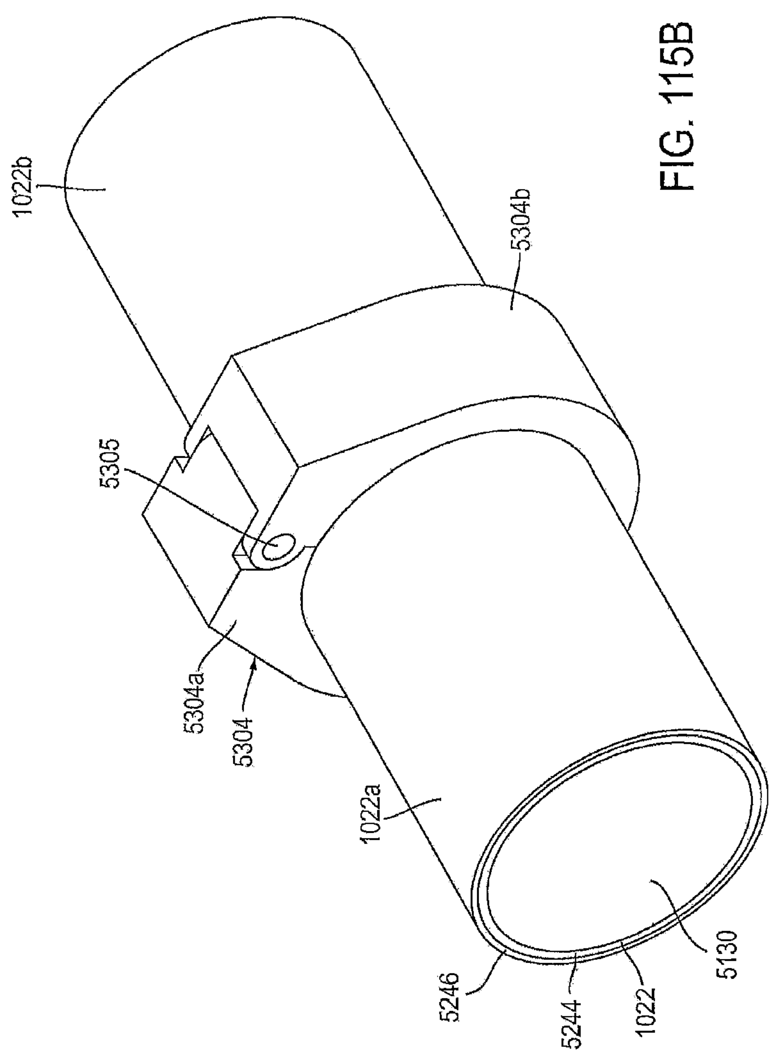

In one embodiment, the heating procedure 1010 is performed by a heating system 5304 (shown and explained with respect to FIGS. 115A and 115B). In one embodiment, the heating system may include an electrical heating system. In one embodiment, the heating system may include Ultra high frequency (UHF) induction coils that are configured to rapidly heat the exposed end portions 5248, 5250 of the welded pipes 1022*a*, 1022*b* of the pipeline 1024 up to the required coating temperature. In one embodiment, the heating system is also configured to regulate the temperature of the exposed end portions 5248, 5250 of the welded pipes 1022*a*, 1022*b* of the pipeline 1024 to maintain a suitable coating application temperature. In one embodiment, the heating system may include a heating feedback system configured to enable the heating system to achieve and maintain the required coating temperature and a temperature sensor operatively coupled to the feedback system. In one embodiment, the temperature sensor may be a contact or a non-contact temperature sensor. In one embodiment, the heating feedback system may include one or more sensors that are configured to sense other parameters of the heating procedure—heating time, etc.

In one embodiment, the coating procedure 1012 is performed immediately after the heating procedure 1010. In one embodiment, the coating procedure 1012 is performed in a coating shack (i.e., similar in construction to the weld shack) having a coating head that is constructed and arranged to apply/spray/provide insulator/coating/epoxy mixture to the exposed end portions 5248, 5250 of the welded pipes 1022*a*, 1022*b* of the pipeline 1024. In one embodiment, the coating head completes the coating procedure in less than a minute. In one embodiment, the coating head completes the coating procedure in 50 seconds.

In one embodiment, an insulator/coating is applied to the heated exposed end portions 5248, 5250 of the welded pipes such that the insulator/coating 5246A (as shown in FIG. 118) is adhered to the exterior surface 5254 of the metal pipe interior, thus insulating the formerly exposed end portions 5248, 5250 of the pipes 1022*a*, 1022*b*.

In one embodiment, the coatings are applied to external surfaces or areas of the pipe segments 1022*a* and 1022*b* surrounding the weld joint 1026 to provide an insulation barrier in order to prevent or minimize corrosion at weld areas.

In one embodiment, the coatings may include polypropylene coatings. In one embodiment, the coatings may include polyethylene coatings. In one embodiment, the coatings may include polyurethane coatings. In one embodiment, the coatings may include insulation (e.g., heat loss) coatings. In one embodiment, the coatings may include anti-corrosion coatings. In one embodiment, the coatings may include wear-resistant coatings. In one embodiment, the coatings may include fusion bonded epoxy (FBE). In one embodiment, the coatings may include fusion bonded epoxy (FBE) plus chemically modified polypropylene (CMPP) or polyethylene (CMPE) dual powder base layers. In one embodiment, the chemically modified polypropylene (CMPP) or polyethylene (CMPE) layer is then followed immediately by the polypropylene (PP) or polyethylene (PE) tape. In one embodiment, the coatings may include Multi-Component Liquid coatings (MCL) (e.g., urethane and epoxy based MCL coatings). In one embodiment, the coatings may include a field joint coating (FJC).

In one embodiment, the coatings may include an Injection Molded polypropylene. In such an embodiment, the pipeline 1024 is pre-heated to a temperature of 180° C. to receive the Injection Molded polypropylene coating.

In one embodiment, an automated equipment may be used to apply coating materials at the weld joint 1026. In one embodiment, the coating delivery system may include Injection Molded Coating System as shown and described in detail with respect to FIGS. 117A and 117B. In one embodiment, the coating delivery system may include a flame-spray coating system. In one embodiment, the insulation/coatings may be applied to the exposed regions of the weld joint using a nozzle device. In one embodiment, the nozzle device is configured to spray insulation materials onto the exposed region of pipe at the region of the welds. In one embodiment, the nozzle device is shown and described with respect to FIGS. 116A-116B.

In one embodiment, an abrasive blasting procedure may be used to prepare the pipeline 1024 for the coatings. In one embodiment, the abrasive blasting procedure may be performed prior to the heating procedure 1010. In one embodiment, the oxidized pipe weld joint is sandblasted to remove all contaminants.

In one embodiment, the coating system may include a coating feedback system configured to enable the coating system to achieve the desired coatings on the pipeline 1024 and one or more sensors operatively connected to the coating feedback system. In one embodiment, the one or more sensors are configured to sense the following parameters of the coating procedure—heating time, heating temperature, coating material temperature, coating material volume, etc.

In one embodiment, the method 1000 may include other procedures that are not shown in FIG. 1A. In one embodiment, these other procedures of the method 1000 are shown in and explained with respect to FIG. 1B.

In one embodiment, the method 1000 may include a pipe preparation procedure 1040, a pipe alignment procedure 1042, an optional weld inspection procedure 1044, a repair procedure 1046, a cooling procedure 1048, and a pipeline deployment procedure 1050. In one embodiment, each of these procedures is optional.

In one embodiment, the pipe preparation procedure 1040 is performed prior to the root pass weld procedure 1002. In one embodiment, the pipe preparation procedure 1040 is performed prior to the pipe alignment procedure 1042.

In one embodiment, the pipe preparation procedure 1040 may include a cutting procedure 1040*a*. In one embodiment, the cutting procedure 1040*a* is performed for preparation of the edge or end portions of the pipe segments 1022*a*, 1022*b* for welding. In one embodiment, during the cutting procedure 1040*a*, the pipe segments 1022*a* and 1022*b* that are to be welded together are cut into the desired dimensions. In one embodiment, the cutting procedure 1040*a* may be performed at the manufacturer's location.

In one embodiment, the method may include a stringing procedure in which the pipes are distributed according to a design plan (before the pipe joining/welding procedure). In one embodiment, each joint of the pipe segment has a specific place in the pipeline. The stringing crew ensures that each piece of pipe is placed where it belongs. Inspectors check the pipe's designated numbers to ensure that the joints are in the correct order.

In one embodiment, the method may include a bending procedure in which the pipes are bent to fit the right-of-way's topography. In one embodiment, the pipe is inserted into a bender and a mandrel is then positioned in the pipe. The mandrel is constructed and arranged to apply pressure inside the pipe to prevent buckling while bending. The operator positions the pipe and makes the bend. The pipe is removed from the bender after the bend is made. After the bending procedure, each piece of pipe is set in place.

In one embodiment, the pipe preparation procedure 1040 may include a beveling procedure 1040*b*. In one embodiment, the beveling procedure 1040*b* is performed for preparation of the edge or end portions of the pipe segments 1022*a* and 1022*b* for welding. In one embodiment, during the beveling procedure 1040*b*, the end portions of the pipe sections or segments 1022*a* and 1022*b* that are to be welded together are beveled into the desired dimensions. In one embodiment, the desired bevels may be machined into the end portions of the pipe segments 1022. In one embodiment, a pipe facing machine is inserted in the pipe and is anchored to the pipe (by raising its internal clamp shoes). In one embodiment, the beveling procedure 1040*b* may take 10 seconds. In one embodiment, the operator may manually check the formed bevel using a bevel gage 5801 shown in FIGS. 2C-2F. FIGS. 2C-2E show a front view, a perspective view and a side view of the bevel gage 5801, respectively, while FIG. 2F shows a detailed view of detail A in FIG. 2C. In one embodiment, the beveling procedures 1040*a*, 1040*b* may be performed at the manufacturer's location.

In one embodiment, the standard bevel depth for field welding from the inside of the pipe is 0.050 inches. In one embodiment, the weld bead is about 3 millimeters tall so that the weld bead protrudes from the surface by 0.05 to 0.07 inches. For making two weld passes (e.g., root and hot pass welds), in one embodiment, the bevel may be cut to a depth of 0.150 to 0.170 inches.

In one embodiment, the pipe alignment procedure 1042 is performed prior to the root pass weld procedure 1002. In one embodiment, the pipe alignment procedure 1042 is performed between the pipe preparation procedure 1040 and the root pass weld procedure 1002. In one embodiment, a preheat procedure may be performed, prior to the welding procedure (i.e., root pass weld procedure), to heat the pipe to over 100° C. so as to evaporate all moisture from the surface of the pipe.

In one embodiment, referring to FIG. 2G, the pipe alignment procedure 1042 may include providing a second pipe 1022*a* at the second end 1038*b* of the first pipe 1022*b*, and aligning the ends 1038*a*, 1038*b* of the first and second pipes 1022*a*, 1022*b* that are to be welded. In one embodiment, the internal weld system 5004 may include a feedback system (e.g., using inspection detector 5056, one or more processors 5140, orientation motors 5030, 5074, external cradle 5330, 6010A, 6010B, internal clamps 5144, 5144, 7050, 7052 as will be explained in detail below) that is configured to sense whether the ends 1038*a*, 1038*b* of the first and second pipes 1022*a*, 1022*b* are properly aligned. The term "motor" as used herein broadly refers to any type of electromechanical motor, such as an electric motor, hydraulic motor, pneumatic motor, just for example.

In one embodiment, the optional weld inspection procedure 1044 may be performed between the hot pass weld procedure 1004 and the fill and cap weld procedure 1006. In one embodiment, the optional weld inspection procedure 1044 may include X-ray radiography inspection. In one embodiment, the X-ray radiography inspection is performed by an X-ray radiography system. In one embodiment, the X-ray radiography system includes an emitter that is configured to send an x-ray radiation into the pipe segments 1022*a* and 1022*b* and the root and hot pass weld layers formed therebetween. In one embodiment, the intensity of the X-ray radiation may be attenuated by the material of the pipe segments 1022*a* and 1022*b* and the root and hot pass weld layers 1014, 1016 formed therebetween. In one embodiment, the X-ray radiography system includes a receiver that is configured to measure the intensity of the x-ray radiation that passes through the material of the pipe segments 1022*a* and 1022*b* and the root and hot pass weld layers 1014, 1016 formed therebetween. In another embodiment, the weld inspection procedure 1044 may include Gamma and close proximity radiography inspection.

In one embodiment, the repair procedure 1046 is performed after the weld inspection procedure 1008 and before the heating and coating procedures 1010 and 1012. In one embodiment, the repair procedure 1046 is configured to repair any weld defects that are detected during the weld inspection procedure 1008.

The weld repair procedure noted herein can be one of a variety of types. In one embodiment, an additional welding operation is performed on top of the previous weld to remedy any weld defect. In another embodiment, the defective weld may be ground down or optionally entirely cut out (manually or automatically) before any subsequent repair welding operation is conducted.

In one embodiment, after the heating and coating procedures 1010 and 1012, the pipeline 1024 is allowed to cool to a suitable temperature before further processing steps can occur (e.g., before spooling of the connected pipe segments or handling/placement of the pipe segments in water or at some other suitable location on land). In one embodiment, the cooling procedure 1048 is performed after the coating procedure 1012. In one embodiment, the cooling procedure 1048 is performed by a cooling system 2010, 2110, 2210, 6500 (as shown in and described with respect to FIGS. 104-112B and 119-136) that is configured to remove heat from the welded pipes so as to reduce their temperature to an acceptable temperature for effective spooling. For example, the pipeline should be below a predetermined temperature (e.g., 50 to 70° C.) to carry out the spooling procedure, the S-lay procedure, etc. In one embodiment, the cooling system may be an internal cooling system that is configured to cool the welded pipes from inside the pipeline 1024.

In one embodiment, the welded pipes may also be allowed to air cool over time. In one embodiment, the welded pipes may be cooled by spraying or pouring water on the outside of the insulation/coatings on the pipeline. In one embodiment, the water spraying or pouring procedure may be carried out in one or more stations.

In one embodiment, the cooling procedure 1048 is performed, for example, for a barge welding procedure, a spool base Tie-in welding procedure, and a spool base main line welding procedure. In one embodiment, the onshore main line welding procedure and the onshore tie-in welding procedure may not have a separate cooling procedure.

In one embodiment, the pipeline deployment/lowering procedure 1050 is performed after the coating procedure 1012. In one embodiment, the pipeline deployment/lowering procedure 1050 is performed after the cooling procedure 1048.

In one embodiment, the pipeline deployment procedure 1050 may include a spooling procedure 1050*a*, a S-lay procedure 1050*b*, or a pipeline lowering procedure 1050*c*.

In one embodiment, the spooling procedure 1050*a* is configured to spool the pipeline onto the vessel, which transports the pipeline to its final destination or location. In one embodiment, the pipeline should be below a predetermined temperature (e.g., 50 to 70° C.) to carry out the spooling procedure 1050*a*. In one embodiment, the predetermined temperature (e.g., 50 to 70° C.) is configured to avoid any damage during the spooling procedure 1050*a*.

In one embodiment, the S-lay procedure is an offshore pipe-lay procedure in which the pipeline is lowered to the sea in a horizontal position. In one embodiment, during the S-lay procedure 1050*b*, the pipeline is pushed off the end of the vessel in an S-shaped curve. In one embodiment, the pipeline should be below a predetermined temperature (e.g., 50 to 70° C.) to carry out the S-lay procedure 1050*b*. In one embodiment, the predetermined temperature (e.g., 50 to 70° C.) is configured to avoid any damage during the S-lay procedure 1050*b*.

The spooling procedure, the S-lay procedure and the J-lay procedure are described in detail with respect to FIGS. 136B-E.

In one embodiment, the pipeline lowering procedure 1050*c* is configured to position/lower the pipeline into a pre-dug ditch.

In one embodiment, the pipeline weld condition/situations may be classified into five categories, namely, onshore main line weld procedure, onshore tie-in weld procedure, spool base main line weld procedure, spool base tie-in weld procedure, and barge weld procedure.

Figure 3:
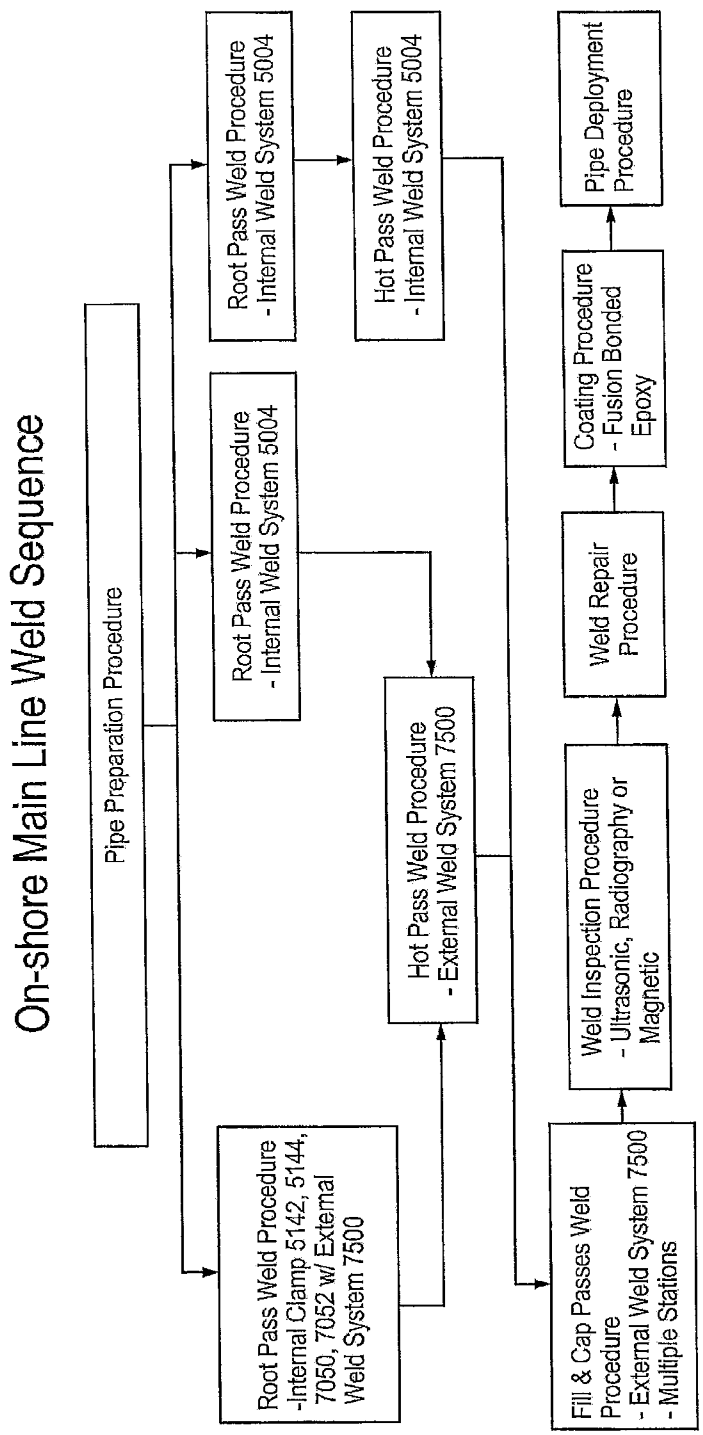
FIGS. 3-7 show block diagrams of the methods for welding pipe segments for different weld situations in accordance with an embodiment of the present patent application.

The onshore main line welding procedure is shown in FIG. 3. The onshore main line welding procedure is generally performed at a ground level and adjacent to a pre-dug ditch in which the pipeline will be disposed. In one embodiment, the onshore pipelines are welded together in sections, for example, up to 1 mile long. The welding stations of the onshore welding are near each other. The before welding procedures and after welding procedures of the onshore welding process are decoupled from the actual welding procedure itself so that the before and after welding procedures can occur at their own pace. After the segments of pipeline are welded together, they are lowered into the pre-dug ditch.

Figure 4:
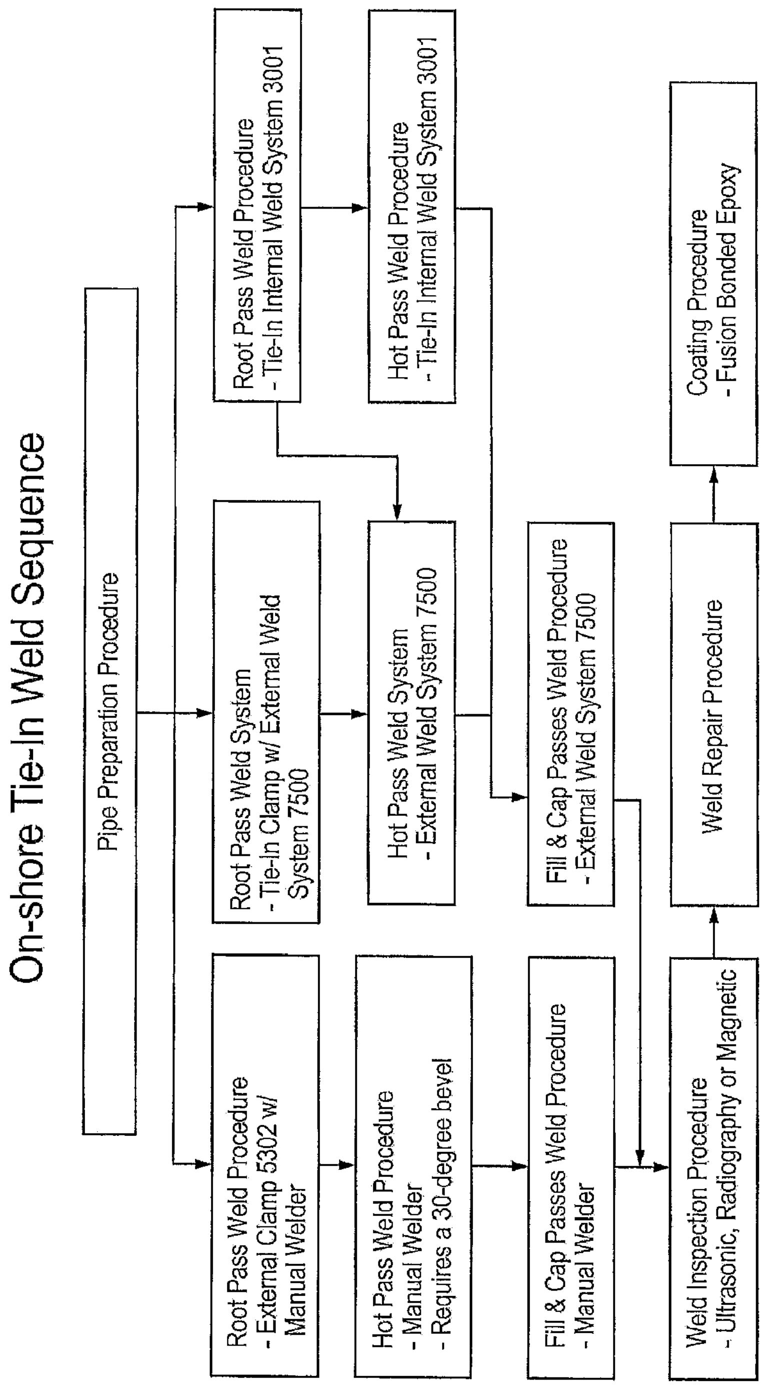

The onshore tie-in weld procedure is shown in FIG. 4. The onshore tie-in weld procedure generally occurs in a pre-dug ditch in which the pipeline will be disposed. That is, the sections or segments are cut to length and welded together in the pre-dug ditch.

Figure 5:
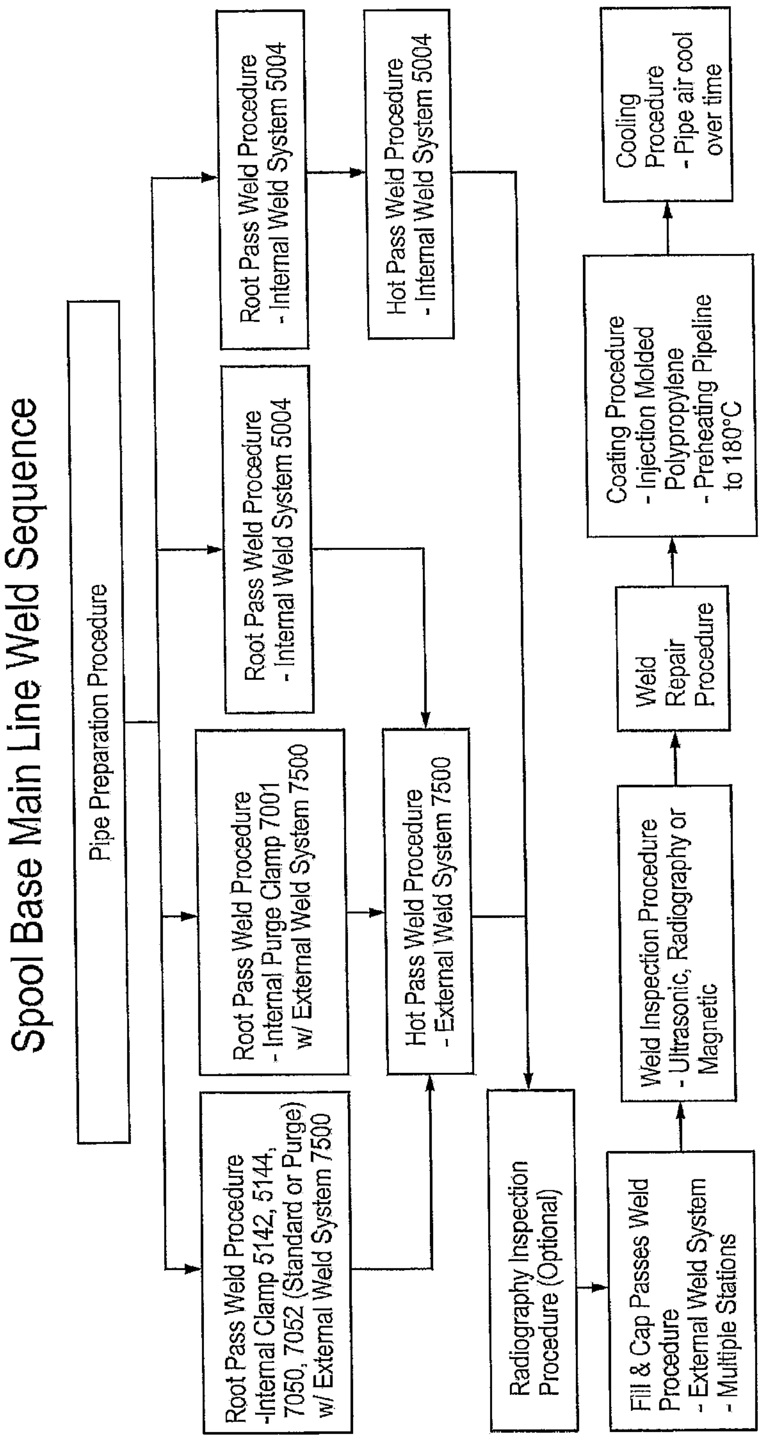

The spool base main line weld procedure is shown in FIG. 5. The spool base main line weld procedure is generally performed in a factory-like setting. All procedures of the spool base main line weld procedure happen within the factory-like setting and in a coordinated, assembly line process. For example, the pipes are welded, inspected and coated along a firing line to form a pipe stalk (e.g., sometimes as long as 7 kilometers). The pipe stalks are stored until they can be spooled onto a vessel for transport to their final location. That is, when the ship/barge is away from the spool base, the welded pipe is stored in long sections. The pipe stalks are reeled onto big spools on barges (typically J-lay) and unspooled when the barge arrives at the job location.

Figure 6:
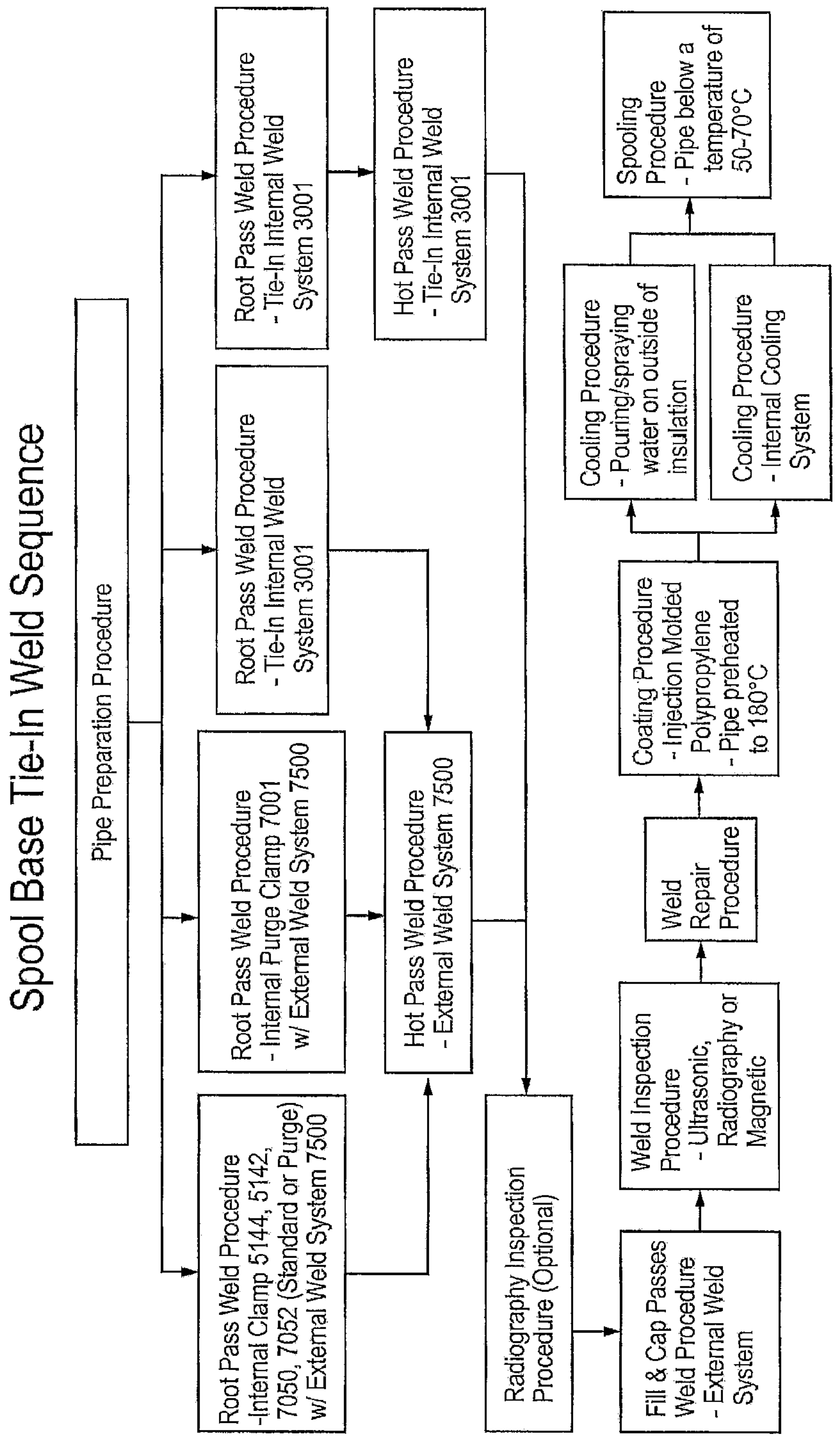

The spool base tie-in weld procedure is shown in FIG. 6. The spool base tie-in weld procedure is used to join the pre-assembled pipeline sections or segments together as they are being spooled onto the vessel/ship, which generally transports the pipeline to its final location. It is the cooling of this joint after coating that limits the spooling rate. All procedures of the spool base Tie-In weld are performed at the same station.

Figure 7:
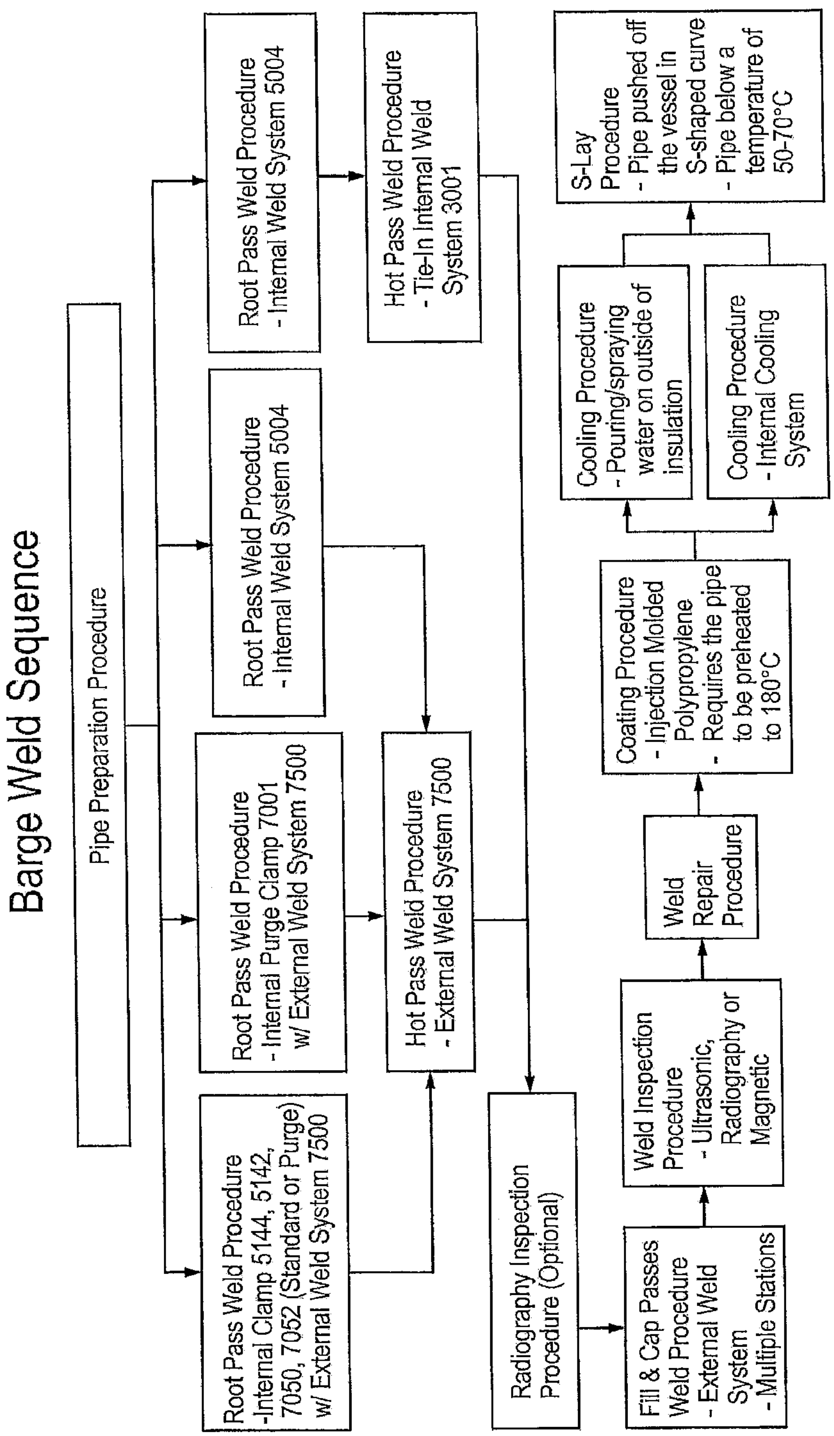

Barge weld procedure is shown in FIG. 7. The barge weld procedure is generally performed in a factory-like setting on-board a floating vessel. All procedures of the barge weld procedure are generally performed within the factory-like setting and in a coordinated, assembly line process. The pipeline is deployed in its final location as it comes off the vessel.

Each of these pipeline weld situations may have one or more weld procedures described with respect to FIGS. 1A and 1B. One or more systems described in this patent application (e.g., the internal weld system 5004, the tie-in internal weld system 3001, purge and inspection system 7001, the external weld system 7500, and the internal cooling system 2010) may be used in the operational procedures of these pipeline weld situations.

For example, referring to FIG. 3, the onshore main line weld procedure begins the with pipe preparation procedure in which an automated weld-friendly bevel is machined into each end of the pipes. This may be done by an advance crew that is working a short distance ahead of the welding crew. After the pipe preparation procedure, a root pass weld procedure is performed. In one embodiment, the root pass weld procedure may be performed by the internal weld system 5004. In another embodiment, the root pass weld procedure may be performed by an external weld system 7500 with internal positioned clamp(s) 7050, 7052. After the root pass weld procedure, the hot pass weld procedure is performed. The hot pass weld procedure may be performed either by the external weld system or by the internal weld system 5004.

In one embodiment, both the hot and root pass weld procedures are performed by the internal weld system 5004. In another embodiment, only the root pass weld procedure is performed by the internal weld system 5004, while the hot pass weld procedure is performed by the external weld system 7500.

In one embodiment, the fill and cap pass weld procedure is performed after the hot pass weld procedure. In one embodiment, the fill and cap pass weld procedure may be performed by the external weld system 7500. In one embodiment, the fill and cap pass weld procedure may be performed at multiple stations.

After the fill and cap pass weld procedure, the weld inspection procedure is performed. For example, Ultrasonic, x-ray radiography or Magnetic inspection may be used to inspect the weld area. Any weld defects detected during the weld inspection procedure are repaired during the weld repair procedure. The welded pipe is coated with Fusion Bonded Epoxy coating. The Fusion Bonded Epoxy coating is applied to the (heated) exposed end portions of the welded pipes such that the Fusion Bonded Epoxy coating is adhered to an exterior surface of the pipe interior. The coating procedure may be done by an autonomous crew that is working behind the repair crew. The pipeline is then lowered into the pre-dug ditch. The pipeline lowering procedure may be done by an autonomous crew that is working behind the coating crew.

Referring to FIG. 4, the onshore tie-in weld procedure begins with the pipe preparation procedure. The exact pipe lengths are not known in advance, so overlap is designed into the onshore tie-in weld procedure. Once the pipes are in the ditch, one pipe is cut to the correct length and the desired bevel is machined into the end of the pipe. After the pipe preparation procedure, a root pass weld procedure is performed.

In one embodiment, the root pass weld procedure may be performed by the tie-in internal weld system 3001. In another embodiment, the root pass weld procedure may be performed by the tie-in clamp system with an external weld system 7500. In another embodiment, the root pass weld procedure may be performed by a manual welder with externally positioned clamps.

After the root pass weld procedure, the hot pass weld procedure is performed. In one embodiment, the hot pass weld procedure may be performed by the tie-in internal weld system 3001. In another embodiment, the hot pass weld procedure may be performed by the external weld system 7500. In another embodiment, the hot pass weld procedure may be performed by a manual welder.

In one embodiment, both the hot and root pass weld procedures are performed by the tie-in internal weld system 3001. In another embodiment, only the root pass weld procedure is performed by the tie-in internal weld system 3001, while the hot pass weld procedure is performed by the external weld system 7500.

The fill and cap pass weld procedure is performed after the hot pass weld procedure. In one embodiment, the fill and cap pass weld procedure may be performed by the external weld system 7500. In another embodiment, the fill and cap pass weld procedure may be performed by the manual welder. The fill and cap pass weld procedure is done from the exterior of the pipes. After the fill and cap pass weld procedure, the weld inspection procedure is performed. For example, Ultrasonic, x-ray radiography or Magnetic inspection may be used to inspect the weld area. The weld inspection procedure is done by an autonomous crew that is working behind the welding crew. Any weld defects detected during the weld inspection procedure are repaired during the weld repair procedure. The repair procedure is performed by an autonomous crew that is working behind the inspection crew. The welded pipe is coated with Fusion Bonded Epoxy coating. The Fusion Bonded Epoxy coating is applied to the (heated) exposed end portions of the welded pipes such that the Fusion Bonded Epoxy coating is adhered to an exterior surface of the pipe interior. The coating procedure may be done by an autonomous crew that is working behind the repair crew.

Referring to FIG. 5, the spool base main line weld procedure begins with the pipe preparation procedure in which an appropriate bevel is machined into the ends of the pipe. After the pipe preparation procedure, a root pass weld procedure is performed. In one embodiment, the root pass weld procedure may be performed by the internal weld system 5004. In another embodiment, the root pass weld procedure may be performed by the purge and inspection system 7001 with the external weld system 7500. In another embodiment, the root pass weld procedure may be performed by the internal clamps with the external weld system.

After the root pass weld procedure, the hot pass weld procedure is performed. In one embodiment, the hot pass weld procedure may be performed by the internal weld system 5004. In another embodiment, the hot pass weld procedure may be performed by the external weld system 7500.

In one embodiment, both the hot and root pass weld procedures are performed by the internal weld system 5004. In another embodiment, only the root pass weld procedure is performed by the internal weld system 5004, while the hot pass weld procedure is performed by the external weld system 7500. In yet another embodiment, the root pass weld procedure is performed by the external weld system 7500 with internal purge clamps 7001, while the hot pass weld procedure is performed by the external weld system 7500.

The X-ray radiography weld inspection procedure is performed after the hot pass weld procedure. The X-ray radiography weld inspection procedure is optional.

The fill and cap pass weld procedure is performed after the hot pass weld procedure and X-ray radiography weld inspection procedure. In one embodiment, the fill and cap pass weld procedure may be performed by the external weld system. In one embodiment, the fill and cap pass weld procedure may be performed at multiple stations.

After the fill and cap pass weld procedure, the weld inspection procedure is performed to perform the weld inspection of the weld joint. For example, Ultrasonic, x-ray radiography or Magnetic inspection may be used to inspect the weld area. Any weld defects detected during the weld inspection procedure are repaired during the weld repair procedure. The welded pipe is coated with the Injection Molded Polypropylene coating. The Injection Molded Polypropylene coating is applied to the (pre-heated to 180° C.) exposed end portions of the welded pipes such that the Injection Molded Polypropylene coating is adhered to an exterior surface of the pipe interior. Cooling procedure is performed after the coating procedure. The pipes may be allowed to air cool over time.

Referring to FIG. 6, the spool base tie-in weld procedure begins with the pipe preparation procedure in which an appropriate bevel is machined into the ends of the pipe. After the pipe preparation procedure, a root pass weld procedure is performed. In one embodiment, the root pass weld procedure may be performed by the tie-in internal weld system 3001. In another embodiment, the root pass weld procedure may be performed by the purge clamp system 7001 with an external weld system 7500. In another embodiment, the root pass weld procedure may be performed by the internal clamps with the external weld system.

After the root pass weld procedure, the hot pass weld procedure is performed. In one embodiment, the hot pass weld procedure may be performed by the tie-in internal weld system 3001. In another embodiment, the hot pass weld procedure may be performed by the external weld system.

In one embodiment, both the hot and root pass weld procedures are performed by the tie-in internal weld system 3001. In another embodiment, only the root pass weld procedure is performed by the tie-in internal weld system 3001.

The X-ray radiography weld inspection procedure is performed after the hot pass weld procedure. The X-ray radiography weld inspection procedure is optional.

The fill and cap pass weld procedure is performed after the hot pass weld procedure. In one embodiment, the fill and cap pass weld procedure may be performed by the external weld system. In one embodiment, the fill and cap pass weld procedure may be performed at multiple stations.

After the fill and cap pass weld procedure, the weld inspection procedure is performed to perform the weld inspection of the weld joint. For example, Ultrasonic, x-ray radiography or Magnetic inspection may be used to inspect the weld area. Any weld defects detected during the weld inspection procedure are repaired during the weld repair procedure. The welded pipe is coated with the Injection Molded Polypropylene coating. The Injection Molded Polypropylene coating is applied to the (pre-heated to 180° C.) exposed end portions of the welded pipes such that the Injection Molded Polypropylene coating is adhered to an exterior surface of the pipe interior. Cooling procedure is performed after the coating procedure. In one embodiment, the pipes may be cooled by pouring or spraying water on the outside surfaces of the insulation. In another embodiment, the pipes may be cooled by an internal cooling system. In one embodiment, the pipes may be spooled onto the vessel after the cooling procedure. In one embodiment, the pipes should be below a temperature of between 50 and 70° C. during the spooling procedure so as to avoid any damage during the spooling process. In one embodiment, all the procedures of the spool base tie-in weld sequence may occur at the same location.

Referring to FIG. 7, the barge weld procedure begins with the pipe preparation procedure in which an appropriate bevel is machined into the ends of the pipe. After the pipe preparation procedure, a root pass weld procedure is performed. In one embodiment, the root pass weld procedure may be performed by the internal weld system 5004. In another embodiment, the root pass weld procedure may be performed by the purge clamp system 7001 with an external weld system 7500. In another embodiment, the root pass weld procedure may be performed by the internal clamps with the external weld system 7500.

After the root pass weld procedure, the hot pass weld procedure is performed. In one embodiment, the pipes advance to the hot pass weld procedure after the root pass weld procedure is complete. In one embodiment, the hot pass weld procedure may be performed by the internal weld system 5004. In another embodiment, the hot pass weld procedure may be performed by the external weld system.

In one embodiment, both the hot and root pass weld procedures are performed by the internal weld system 5004. In another embodiment, only the root pass weld procedure is performed by the internal weld system 5004. The X-ray radiography weld inspection procedure is performed after the hot pass weld procedure. The X-ray radiography weld inspection procedure is optional.

The fill and cap pass weld procedure is performed after the hot pass weld procedure and X-ray radiography weld inspection procedure. In one embodiment, the fill and cap pass weld procedure may be performed by the external weld system. In one embodiment, the fill and cap pass weld procedure may be performed at multiple stations.

After the fill and cap pass weld procedure, the weld inspection procedure is performed to perform the weld inspection. For example, Ultrasonic, x-ray radiography or Magnetic inspection may be used to inspect the weld area. Any weld defects detected during the weld inspection procedure are repaired during the weld repair procedure. The welded pipe is coated with the Injection Molded Polypropylene coating. The Injection Molded Polypropylene coating is applied to the (pre-heated to 180° C.) exposed end portions of the welded pipes such that the Injection Molded Polypropylene coating is adhered to an exterior surface of the pipe interior. The cooling procedure is performed after the coating procedure. In one embodiment, the pipes may be cooled by pouring or spraying water on the outside surfaces of the insulation. In one embodiment, the cooling procedure may be performed at multiple stations. In another embodiment, the pipes may be cooled by an internal cooling system. In one embodiment, the pipes may be pushed off the end of the vessel in a S-shaped configuration. In one embodiment, the pipes should be below a temperature of between 50 and 70° C. during the S-lay procedure so as to avoid any damage during the S-lay procedure.

In one embodiment, a field system 5000 for welding two pipes 1022*a*, 1022*b* is provided. The term "field system" as used herein is a generic term intended to refer to the system(s) disclosed herein as a whole, and/or any of the subsystems by themselves. Just for example, the "field system" can refer to the combination of the internal inspection system, external welder, internal pipe cooler, and ultrasound non-destructive testing system, together with the remote uLog processing system (e.g., remote computer system 13704). In another example, the "field system" can refer to the internal weld system alone, the internal inspection system alone, the internal cooling system alone, the tie-in welder alone, for example. That is, the "field system" can refer to the internal weld system 5004 alone, the internal inspection system 7001 alone, the internal cooling system 6500 alone, the tie-in welder 3001 alone, for example.

Figures 8, 9:
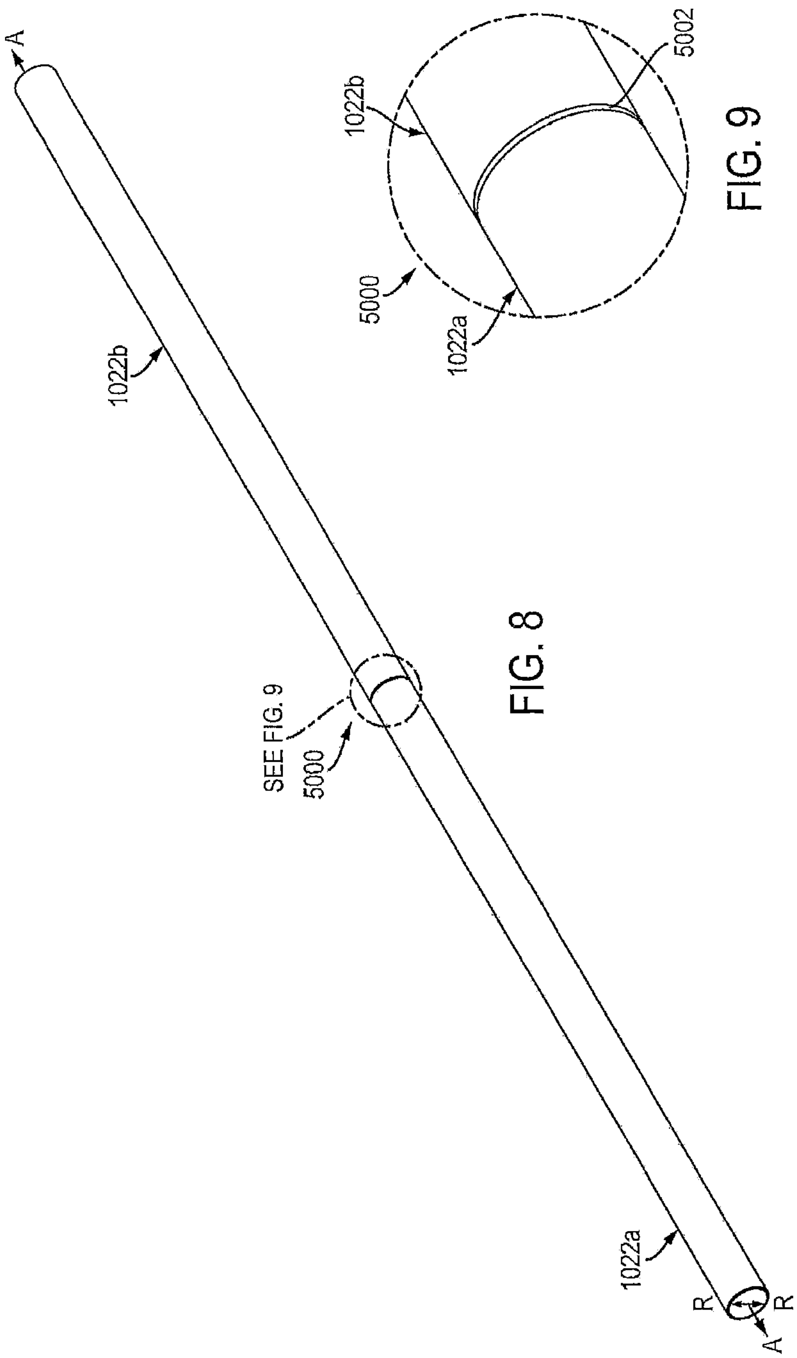
FIG. 8 shows a perspective view of a system for welding two pipe segments in accordance with an embodiment of the present patent application.
FIG. 9 shows an enlarged view of a pipe interface of two pipe segments to be welded using the system of FIG. 8 in accordance with an embodiment of the present patent application.
Figures 1, 10:
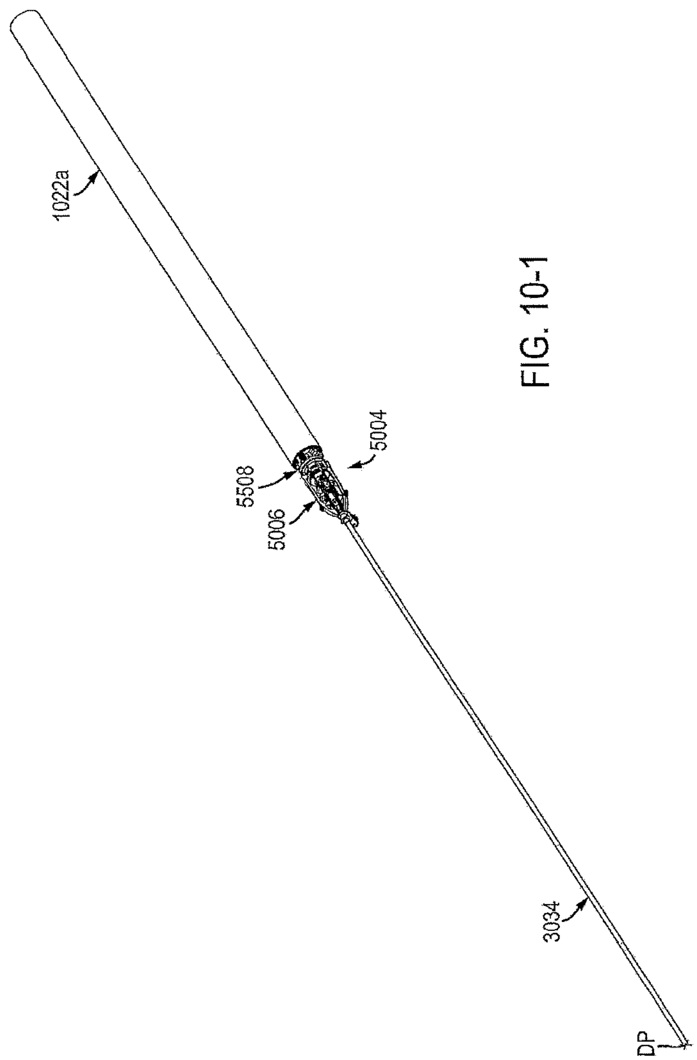
FIG. 10-1 shows the system of FIG. 8 in which an internal weld system is inserted into a first pipe segment in accordance with an embodiment of the present patent application.
Figures 2, 10:
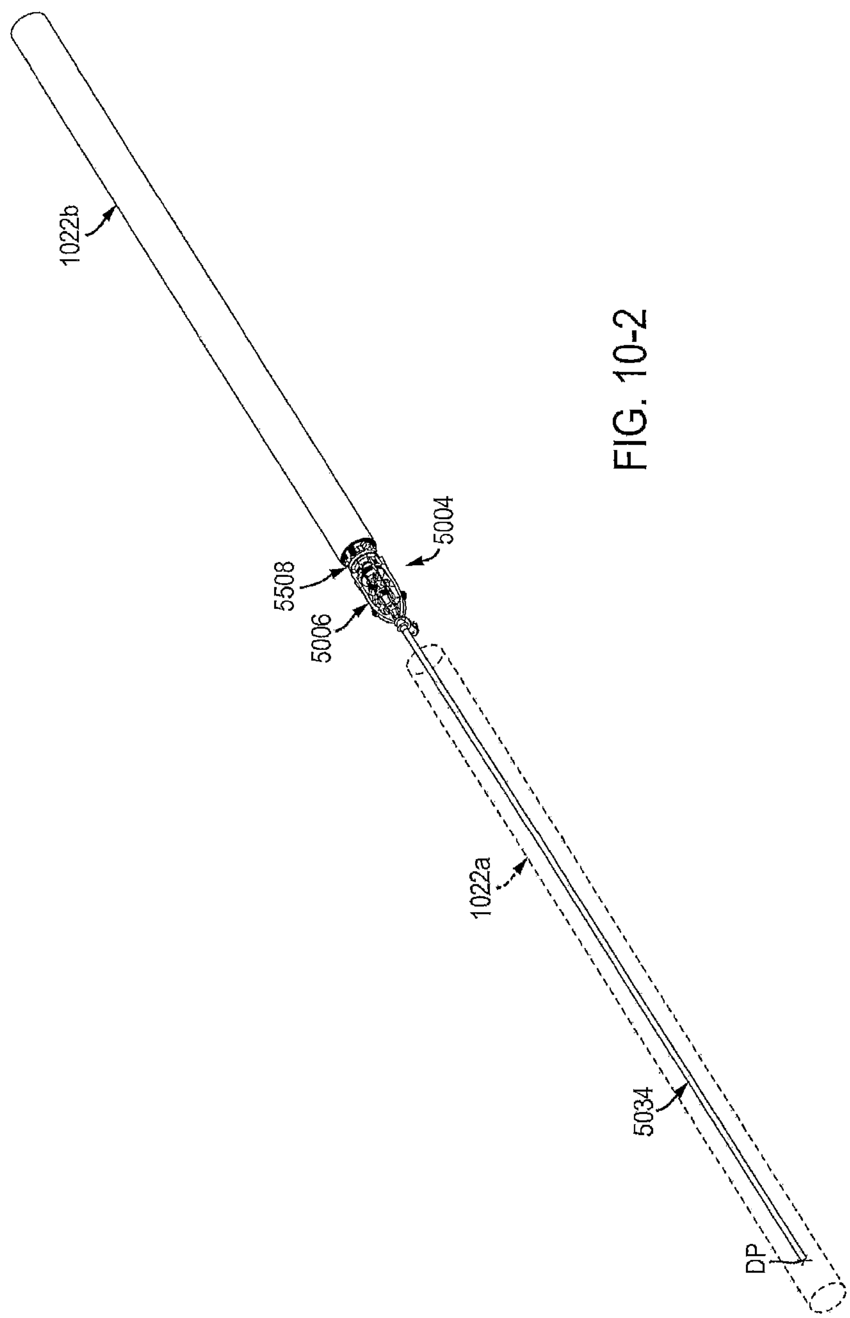
Figures 3, 10:
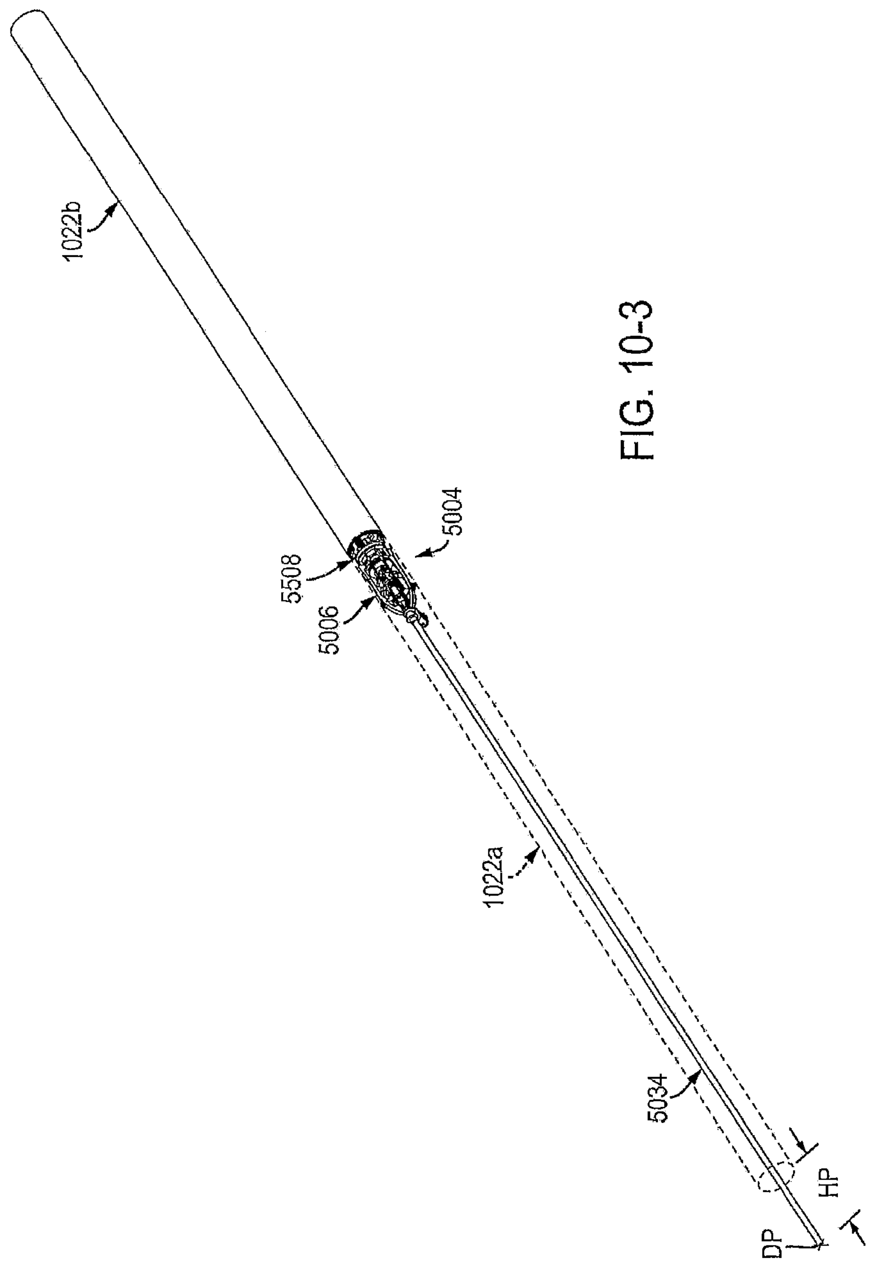

As shown in FIGS. 8, 9, 10-1, 10-2 and 10-3, in one embodiment, each pipe segment 1022*a* or 1022*b* has the longitudinal axis as shown by arrow A-A. As will be clear from the discussion below, the field system 5000 is configured to support multiple pipe segments 1022*a*, 1022*b* and adjust their positions and/or orientations until the pipe segments 1022*a*, 1022*b* are both aligned such that their longitudinal axes A-A are collinear and one end of each of the pipe segments 1022*a*, 1022*b* abuts at interface edges. FIG. 9 illustrates an enlarged detailed view of the field system 5000 of FIG. 8 in which the edges form a pipe interface 5002 (also known as a "fit up" joint). In one embodiment, the field system 5000 includes an internal weld system 5004 that applies a weld to the interior of the interface 5002 from inside the fitted up pipe segments 1022*a*, 1022*b*. To apply a weld to the interior of joint 5002, the internal weld system 5004 is rolled into an end of one of the pipe segments 1022*b* as shown in FIG. 10-1. The second pipe segment 1022*a* is then placed and manipulated until both pipe segments 1022*a*, 1022*b* are satisfactorily aligned. In one embodiment, the internal weld system 5004 applies a weld (e.g., a gas metal arc weld "GMAW") from inside the pipe segments 1022*a*, 1022*b* to a face or edge joint of the pipe segment 1022*a*, 1022*b* and into a v-shaped opening formed by chamfered/beveled edges of the two pipe segments 1022*a*, 1022*b* (other cross-sectional shapes other than a v-shaped opening may also be used).

Figure 9A:
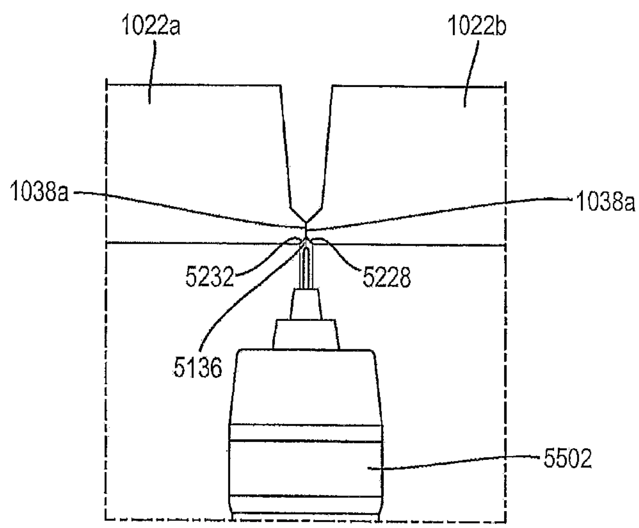
FIG. 9A shows a partial cross-sectional view of the pipeline in which an ideal alignment of a weld torch to an internal bevel (along longitudinal axes of the pipes) in accordance with an embodiment of the present patent application.

FIG. 9A shows a partial cross-sectional view of the pipeline 1024 displaying an ideal alignment of a weld torch 5502 of the internal weld system 5004 to the internal bevel surfaces 5228 and 5232 (along longitudinal axes A-A of the pipes 1022*a*, 1022*b*). In the illustrated embodiment, the pipes 1022*a*, 1022*b* are perfectly aligned with each other and do not have any Hi-Lo (i.e., a height difference between the bevel edges of the pipes 1022*a*, 1022*b* after the pipe alignment).

Figure 7B:
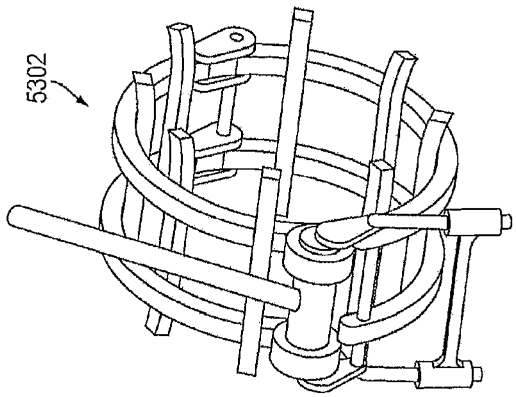
FIGS. 7A and 7B show views of an external clamp being used to clamp pipes together from the outside in accordance with an embodiment of the present patent application.
Figure 7A:
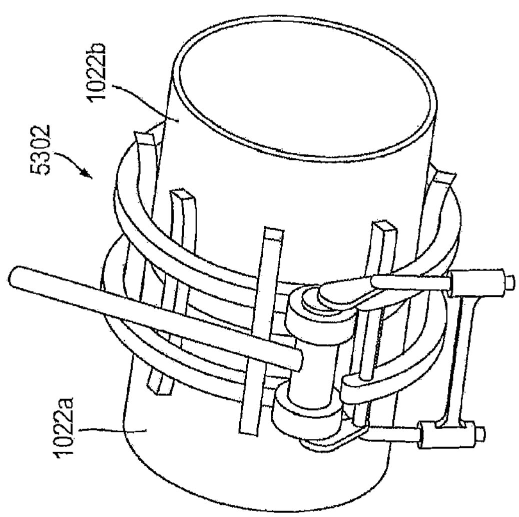

In one embodiment, the field system 5000 may include external clamps 5302 that are used to clamp pipes together from the outside (external to the pipes). In one embodiment, the external clamps 5302 have bars across the weld joint and welding may be done manually. In one embodiment, the external clamps 5302 may be hydraulically operated or may be mechanically operated (e.g., using a hand lever). For example, in one embodiment, the external clamps 5302 may be a tipton clamp as shown in FIGS. 7A and 7B.

In one embodiment, the internal weld system 5004 is connected to an external structure/system (i.e., external to the pipes 1022*a*, 1022*b* being welded) by an umbilical 5034 (as shown in FIG. 10-1). In one embodiment, the external system is the remote uLog processing system. In one embodiment, the umbilical 5034 may be between 40 and 80 feet long (e.g., for a pipe that is 40 or 80 feet long). In one embodiment, the umbilical 5034 may be referred to as a reach rod. In one embodiment, the reach rod/umbilical 5034 may be fixedly connected to the internal weld system 5004. That is, the reach rod/umbilical 5034 is a permanent piece of the internal weld system 5004. In one embodiment, the umbilical 5034 includes a structural tubular member that protects all of the cables, wiring and hoses (e.g., that connect the external structure/system and the internal weld system 5004) from damage.

In one embodiment, when the internal weld system 5004 is traveling from one pipe (weld) joint to the next pipe (weld) joint, the umbilical 5034 is disconnected at a disconnection point, DP (as shown in FIG. 10-2). This disconnection facilitates the new/incoming pipe segment 1022*a* to be placed in position with respect to the first pipe 1022*b*. FIG. 10-2 shows that the cables, hoses and wires (e.g., that connect the external structure/system and the internal weld system 5004) at the end of the reach rod/umbilical 5034 are disconnected and that the new/incoming pipe segment 1022*a* is being placed in position with respect to the first pipe 1022*b*.

As shown in FIG. 10-3, in one embodiment, after the incoming pipe 1002*a* is placed in position with respect to the first pipe 1002*b*, the umbilical 5034 may hang/extend out of the incoming pipe 1002*a* by a distance, HD. In one embodiment, the distance, HD that the umbilical 5034 may hang/extend out of the incoming pipe 1002*a* is in between 1 and 5 feet.

The umbilical 5034 is generally used to convey fluids (compressed air), send electrical signals and/or send communication signals between the external structure/system and the internal weld system 5004. In one embodiment, the tie-in internal weld system 3001 does not include the reach rod or the umbilical.

For example, the umbilical 5034 may include weld power lines configured to deliver power to the weld torches. In one embodiment, the umbilical 5034 includes three weld power lines to independently deliver power to the three associated weld torches in the internal weld system 5004. In one embodiment, the number of weld power lines in the umbilical 5034 may vary and depend on the number of weld torches in the internal weld system 5004.

In one embodiment, the umbilical 5034 may include communication lines configured to communicate with the inspection detector 5056, the inspection camera 5112, and/or other electronic modules (e.g., to start or stop welding) of the internal weld system 5004. In one embodiment, the communications to the internal weld system 5004, including to the inspection detector 5056, to the inspection camera 5112, and/or to other electronic modules of the internal weld system 5004, may be performed wirelessly. It should be appreciated that where a plurality of weld torches are provided, a plurality of inspection detectors/lasers 5056 may also be provided.

In one embodiment, the umbilical 5034 may include a fluid communication line configured to supply compressed air to the internal weld system 5004. In one embodiment, the umbilical 5034 may include another (separate) power line configured to deliver power to the batteries 5116 to recharge them. In one embodiment, the separate power line to recharge the batteries 5116 is optional. In one embodiment, the umbilical 5034 may include a separate power line configured to deliver power to one or more electronic modules and/or the motors of the internal weld system 5004. In another embodiment, this separate power line is optional.

In one embodiment, the internal weld system 5004 is used for pipes having an internal diameter of 26 to 28 inches with 0 to 1 inch pipe wall thickness. Therefore, the internal weld system 5004 is configured to fit in holes between 24 and 28 inches. In one embodiment, the internal weld system 5004 is used for pipes having an internal diameter of 24 inches or less with pipe wall thickness of 0 to 1 inch. In one embodiment, the internal weld system 5004 is used for pipes having an external diameter of 24 inches or less. In one embodiment, the internal weld system 5004 is used for pipes having an external diameter of 26 to 28 inches.

Figure 10A:
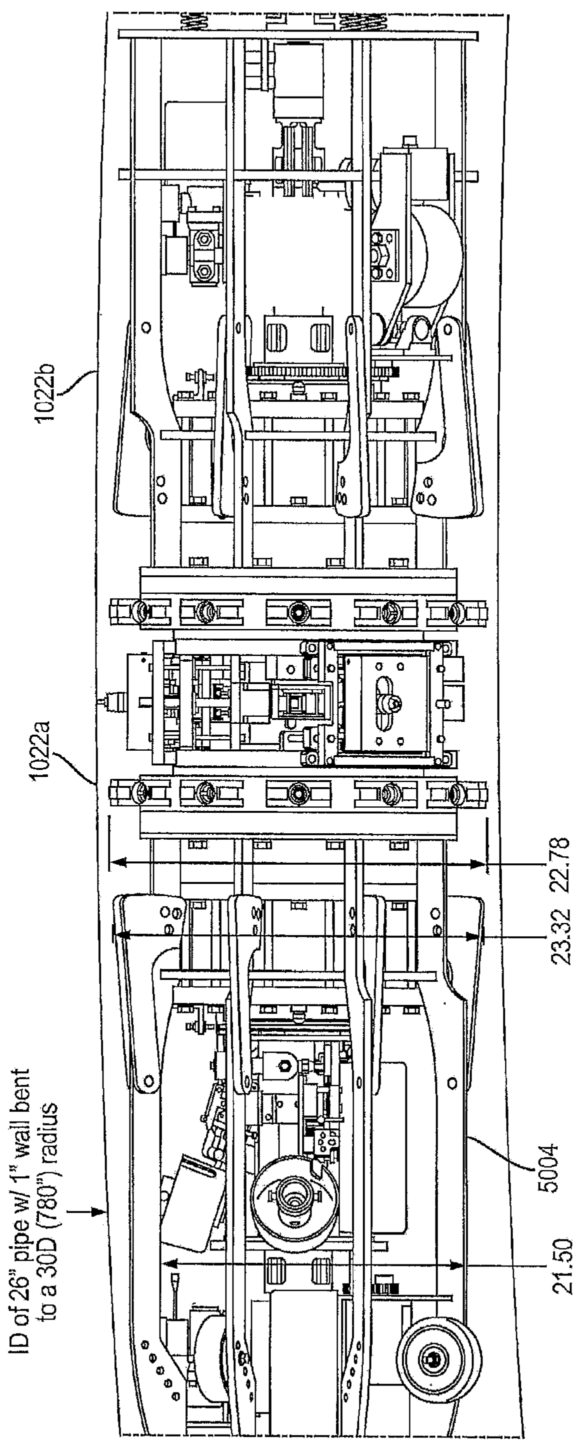
FIGS. 10A and 10B show views of the internal weld system being constructed and arranged to be positioned in pipes having an external diameter of 26 to 28 inches external diameter and in pipes having an external diameter of less than 24 inches, respectively in accordance with an embodiment of the present patent application.

FIG. 10A shows the internal weld system 5004 being constructed, sized and positioned in pipes having an internal diameter of 26 inches with 1 inch pipe wall thickness. For example, in one embodiment, the external diameter of the frame structure of the internal weld system 5004 is 23.32 inches in relation to the internal diameter of 26 inches (with 1 inch pipe wall thickness) of the pipes. For example, for 26 inch internal diameter pipe (with 1 inch pipe wall thickness), the outer diameter of the frame structure (not including its wheels) of the internal weld system 5004 is 23.32 inches.

Figure 10B:
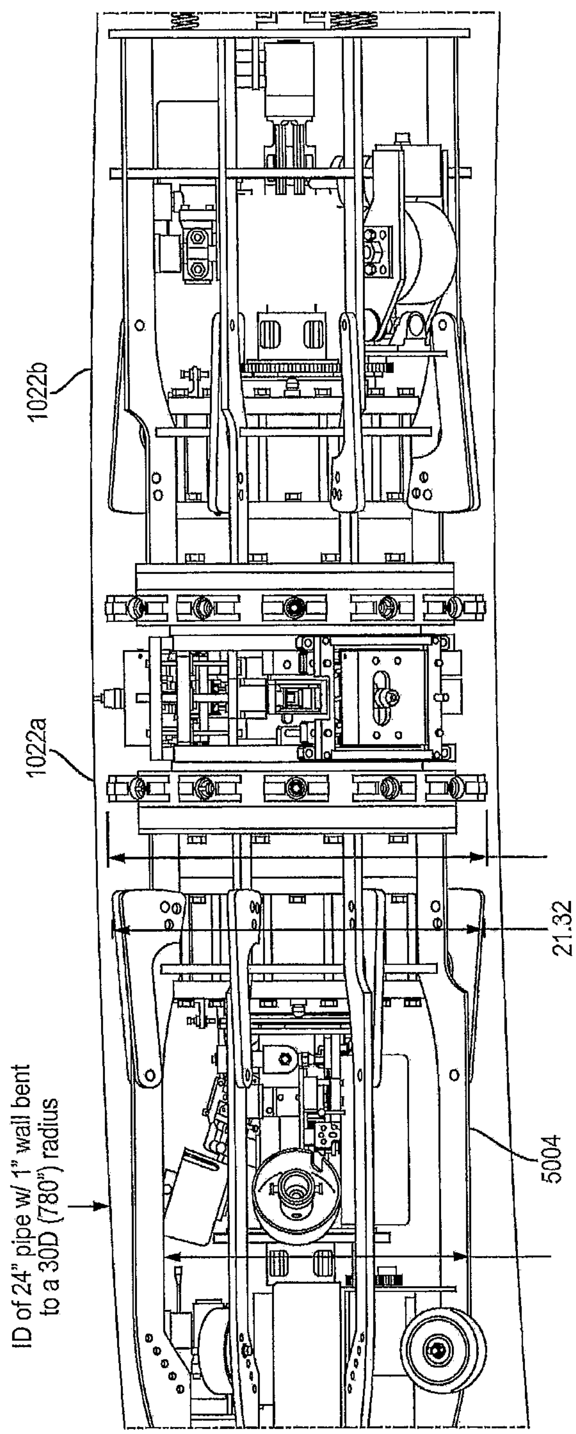

FIG. 10B shows the internal weld system 5004 being constructed, sized and positioned in pipes having an internal diameter of 24 inches with 1 inch pipe wall thickness. For example, in one embodiment, the external diameter of the frame structure of the internal weld system 5004 is 21.32 inches in relation to the internal diameter of 24 inches (with 1 inch pipe wall thickness) of the pipes. For example, for 24 inch internal diameter pipe, the outer diameter of the frame structure (not including its wheels) of the internal weld system 5004 is 21.32 inches.

In one embodiment, the diameter of the frame of the internal weld system 5004 may be a function of the internal weld system's ability to fit through the pipe bends. In one embodiment, the standard minimum bend radius of the pipe is 30 times D, where D is the external or outer diameter of the pipe. That is, the radius of the centerline of the pipe is 30 times the outer or external diameter of the pipe. For example, for a 26" outer or external diameter pipe, the minimum bend radius the internal weld system 5004 needs to traverse is 780 inches (i.e., (26 inches)×30). For example, for a 24" outer or external diameter pipe, the minimum bend radius the internal weld system 5004 needs to traverse is 720 inches (i.e., (24 inches)×30). In one embodiment, the longer the frame of the internal weld system 5004 is constructed, the narrower it has to get.

Figure 10C:
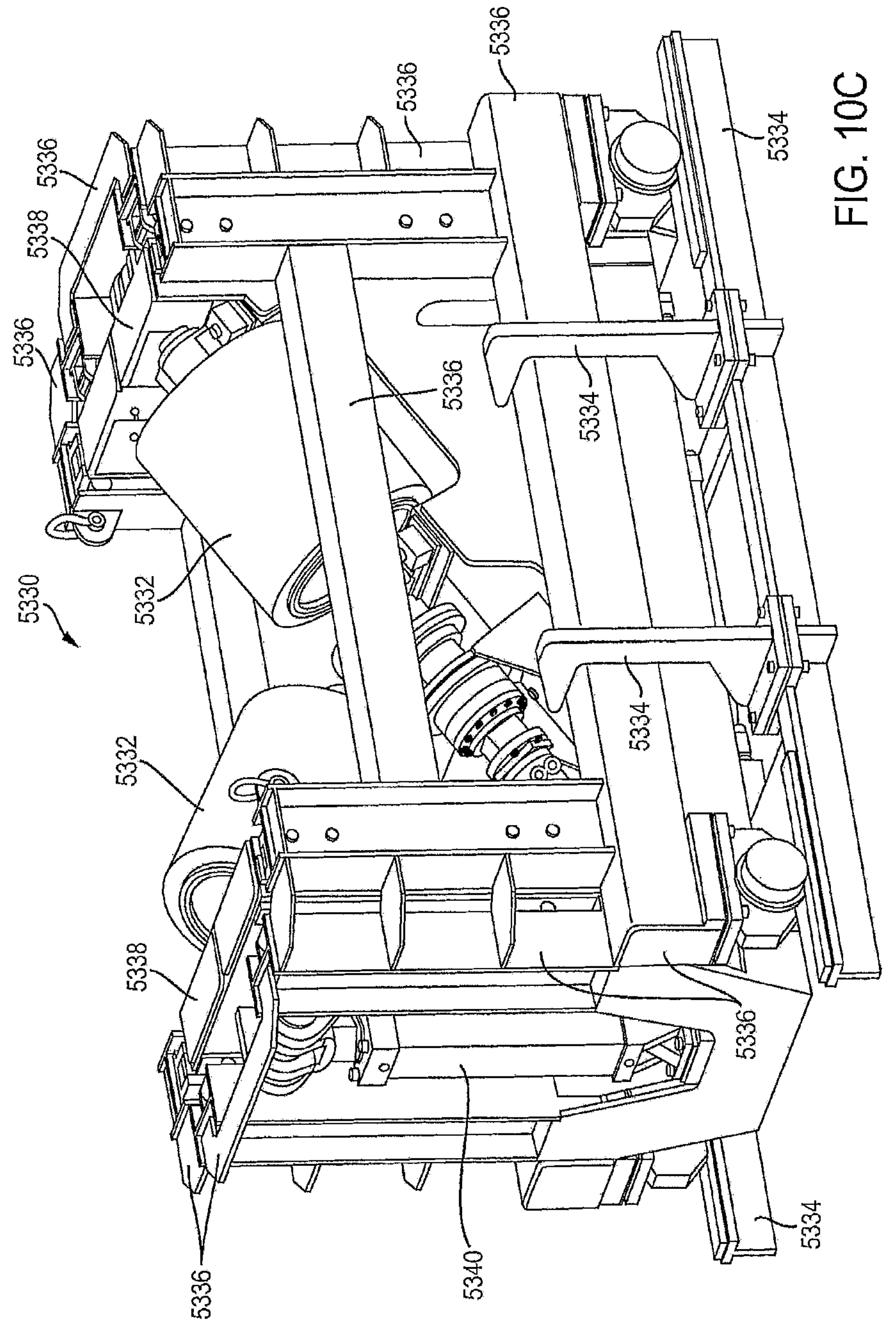
FIGS. 10C and 10D show a left side perspective view and a bottom perspective view of a cradle for carrying and moving the first pipe and the second pipe in accordance with an embodiment of the present patent application.
Figure 10D:
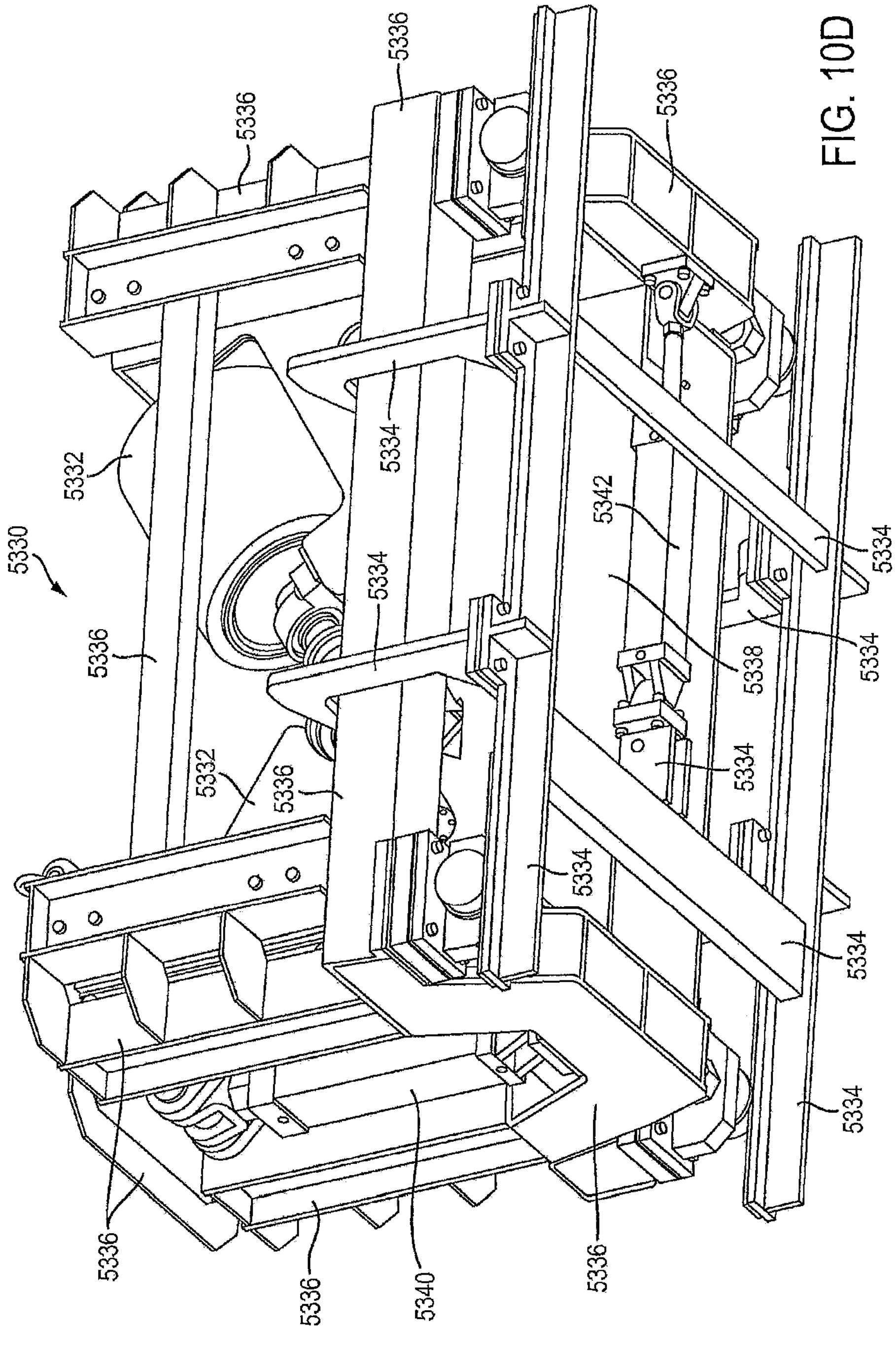

In one embodiment, as shown in the FIGS. 10C and 10D, the field system 5000 may include a cradle 5330 for carrying and moving the first pipe 1022*a* and the second pipe 1022*b*. In one embodiment, the cradle 5330 is configured to provide the second pipe 1022*a* at the second end 1038*b* of the first pipe 1022*b* after the frame assembly of the internal weld system 5004 is positioned at the second end of the first pipe 1022*b*. In one embodiment, the cradle 5330 may be referred to as a Line Up Module (LUM).

In one embodiment, there may be as many cradles as needed to hold the pipe 1022*a*, 1022*b*. For example, if the pipe 1022*a* or 1022*b* is small and flexible, there may be as many as four cradles spaced along the length of the pipe 1022*a* or 1022*b*. If the pipe 1022*a* or 1022*b* is large and stiff, there may be as few as two cradles along the length of the pipe 1022*a* or 1022*b*.

In one embodiment, two cradles may be used for carrying and moving the pipe such that each cradle is positioned at an end of the pipe. In one embodiment, three cradles may be used for carrying and moving the pipe such that two cradles are positioned at the ends of the pipe and one cradle is positioned at the center section of the pipe. In one embodiment, the centrally positioned cradle is configured to simply provide support and is not configured to be articulated. In one embodiment, the cradles 5330 used for incoming pipe 1022*a* may all be configured to be actuatable to carry, move, and provide the incoming pipe 1022*a* at the second end of the first pipe 1022*b* (after the frame assembly of the internal weld system 5004 is positioned at the second end of the first pipe 1022*b*) and re-align the incoming pipe 1022*a* in the event the pre-weld profile data determines adjustment is required.

In one embodiment, the cradle 5330 may include a set of actuated rollers 5332 external to the pipes 1022*a*, 1022*b*. In one embodiment, the rollers 5332 of the cradle 5330 may be referred to as the exterior rotatable members. In one embodiment, an exterior surface 5346 and/or 5348 (as shown in FIG. 2G) of the first pipe 1022*a* and/or the second pipe 1022*b* is movably engaged by the exterior rotatable member(s) 5332 to facilitate adjustment of the relative positioning of the pipes 1022*a*, 1022*b* based on the instructions from the one or more processors 5140.

In one embodiment, the cradle 5330 includes a fixed frame 5334 that is configured to be fixedly connected to a surface (e.g., ground), a first moveable frame 5336 that is configured to be moveable to position the pipe horizontally, and a second moveable frame 5338 that is configured to be moveable to position the pipe vertically.

In one embodiment, the cradle 5330 may be hydraulically operated. For example, hydraulic cylinders 5340 positioned on the sides of the cradle 5330 may be configured to move the second moveable frame 5338. In one embodiment, the hydraulic cylinder(s) 5342 positioned under the cradle 5330 may be configured to move the first moveable frame 5336. In one embodiment, the motion of the cradles 5330 (positioned at both ends of the pipes) may be coordinated to adjust the linear movement of the pipe 1022*a* or 1022*b* in all three directions (up-down, left-right, forward-back) and adjust the angular movement of the pipe 1022a or 1022b in in two directions (pitch, yaw)).

In one embodiment, the cradle 5330 is operatively associated with to the one or more processors 5140. In one embodiment, the cradle 5330 is connected wirelessly or using a wired connection to the one or more processors 5140 such that, in the event the pre-weld profile data determines adjustment is required, the hydraulic cylinders 5340 and 5342 are adjusted to move and re-align the incoming pipe 1022a based on the pre-weld profile data. In one embodiment, the externally positioned rollers 5332 may be operatively connected to and controlled by the one or more processors 5140 via the first moveable frame 5336 and/or the second moveable frame 5338.

Figures 73, 74:
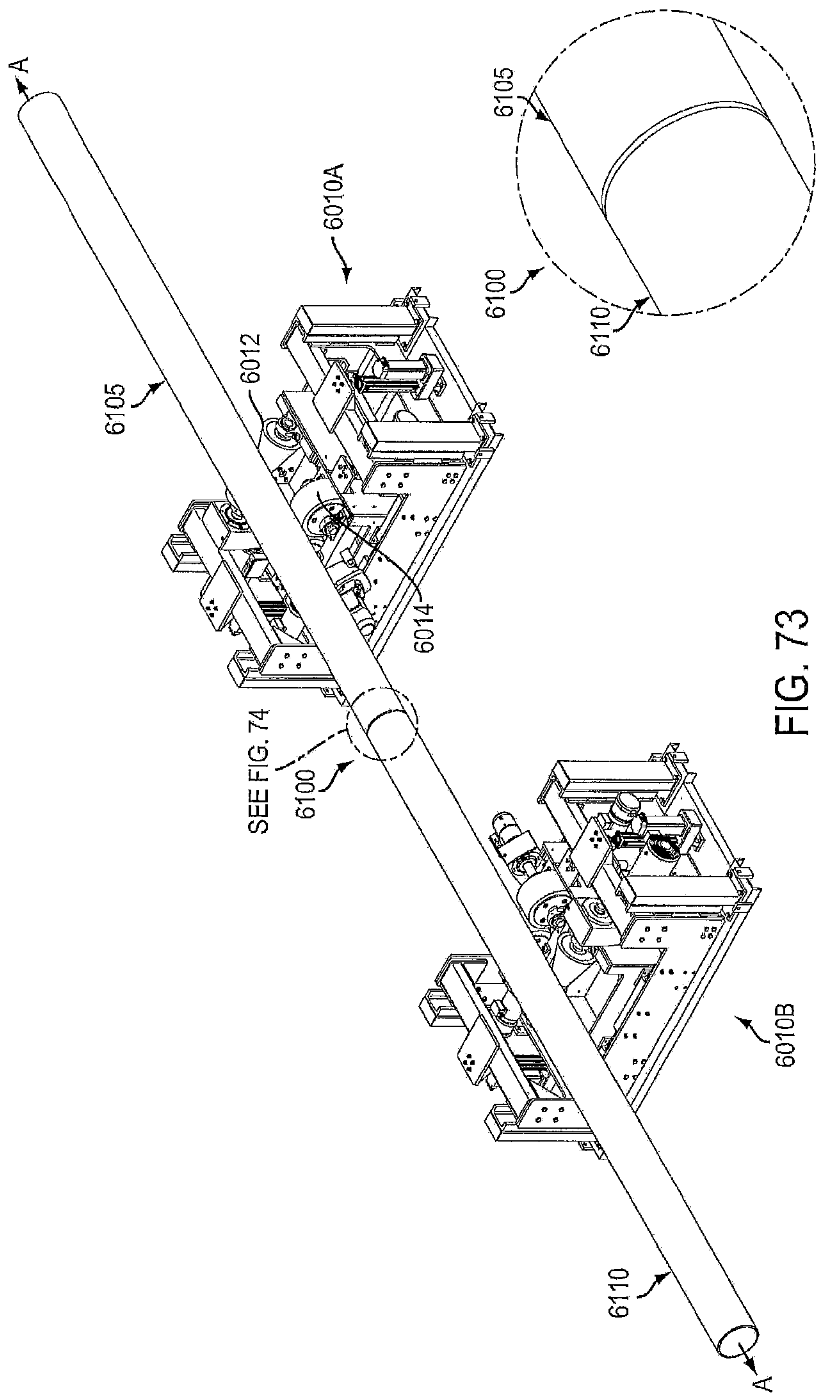
FIG. 73 shows a perspective view of a system for welding two externally aligned pipe segments supported on alignment mechanisms in accordance with an embodiment of the present patent application.
FIG. 74 shows an enlarged, external view of a pipe interface of two pipe segments to be welded using the system of FIG. 73 in accordance with an embodiment of the present patent application.

In one embodiment, the cradle 5300 may be electrically operated. For example, FIG. 73 shows electrically operated cradles 6010A and 6010B. In one embodiment, the rollers of the cradles 6010A and 6010B may be driven by motors to move the pipe 1022a or 1022b linearly and/or angularly. In one embodiment, the cradles 6010A and 6010B may include motors operatively connected to lead screw arrangements that enable the movement of the first moveable frame and/or the second moveable frame.

Figure 10E:
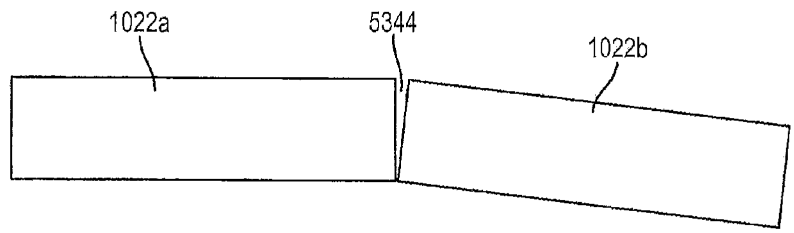
Figure 10F:
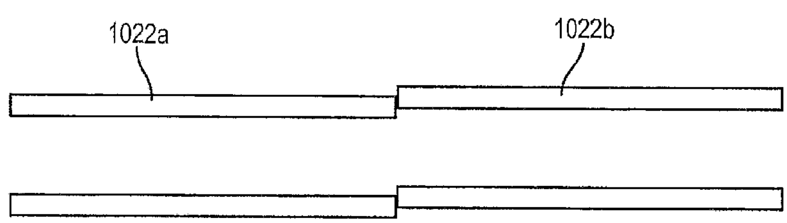

In general, when aligning the pipes for the welding procedure, there may be two pipe alignment errors, for example, an angular pipe alignment error and positional pipe alignment error. As shown in FIG. 10E, the angular alignment error causes a gap 5344 on one side of the pipe. As shown in FIG. 10F, the positional alignment error causes opposite Hi-Lo, i.e. high on one side (e.g., 1022b), low on the other side (e.g., 1022a).

In one embodiment, the cradles 5330 or the cradles 6010A and 6010B may be used in the offshore pipeline alignment and welding procedures. In the offshore pipeline applications, both angular and positional pipe alignment errors may be corrected by sending the control signals from the one or more processors 5140 to the cradles 5330 or the cradles 6010A and 6010B (to control the associated rollers 5332). Thus, the one or more processors 5140 are configured to adjust the relative positioning between the pipes (to correct their alignment errors) by controlling the cradles 5330 or the cradles 6010A and 6010B. In one embodiment, the one or more processors 5140 are configured to operate the cradle 5330 to enable relative movement between the first pipe 1022a and the second pipe 1002b based on the pre-weld profile data to alter an interface region 5136 between the pipes 1022a, 1022b prior to the welding operation based on the instructions from the one or more processors 5140.

In one embodiment, the pipes 1022a, 1002b may be aligned by a crane and the clamp (internal or external). In one embodiment, the clamp may be constructed and arranged to align the two pipes 1022a, 1002b both horizontally and vertically. In one embodiment, the crane is configured to control axial position and the two angles (pitch and yaw).

Figure 11:
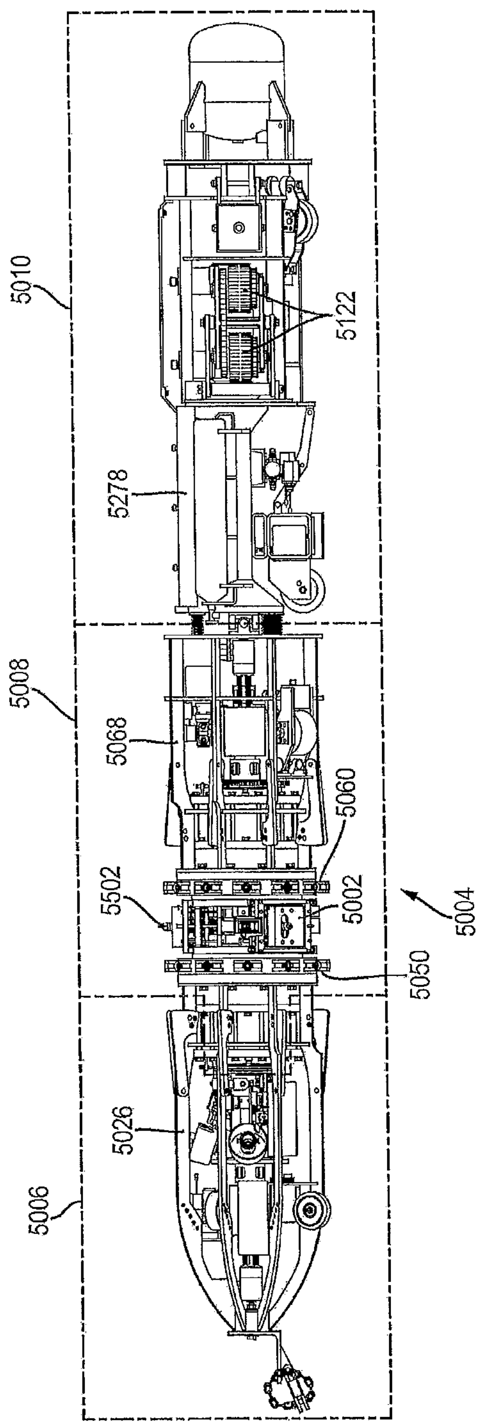
FIG. 11 shows the internal weld system for welding two pipe segments in accordance with an embodiment of the present patent application.

In one embodiment, referring to FIG. 11, the internal weld system 5004 includes a forward-most section 5006, a center section 5008 and a drive section 5010.

Figure 12:
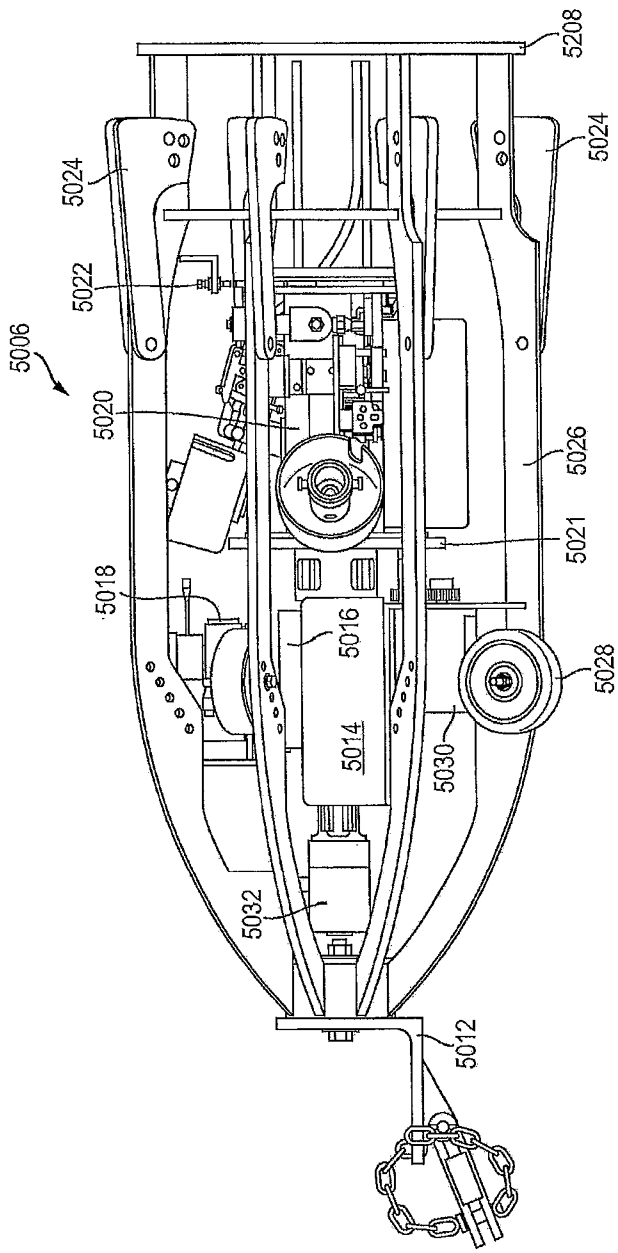
FIG. 12 shows a detailed view of a forward-most section of the internal weld system in accordance with an embodiment of the present patent application.
Figure 23:
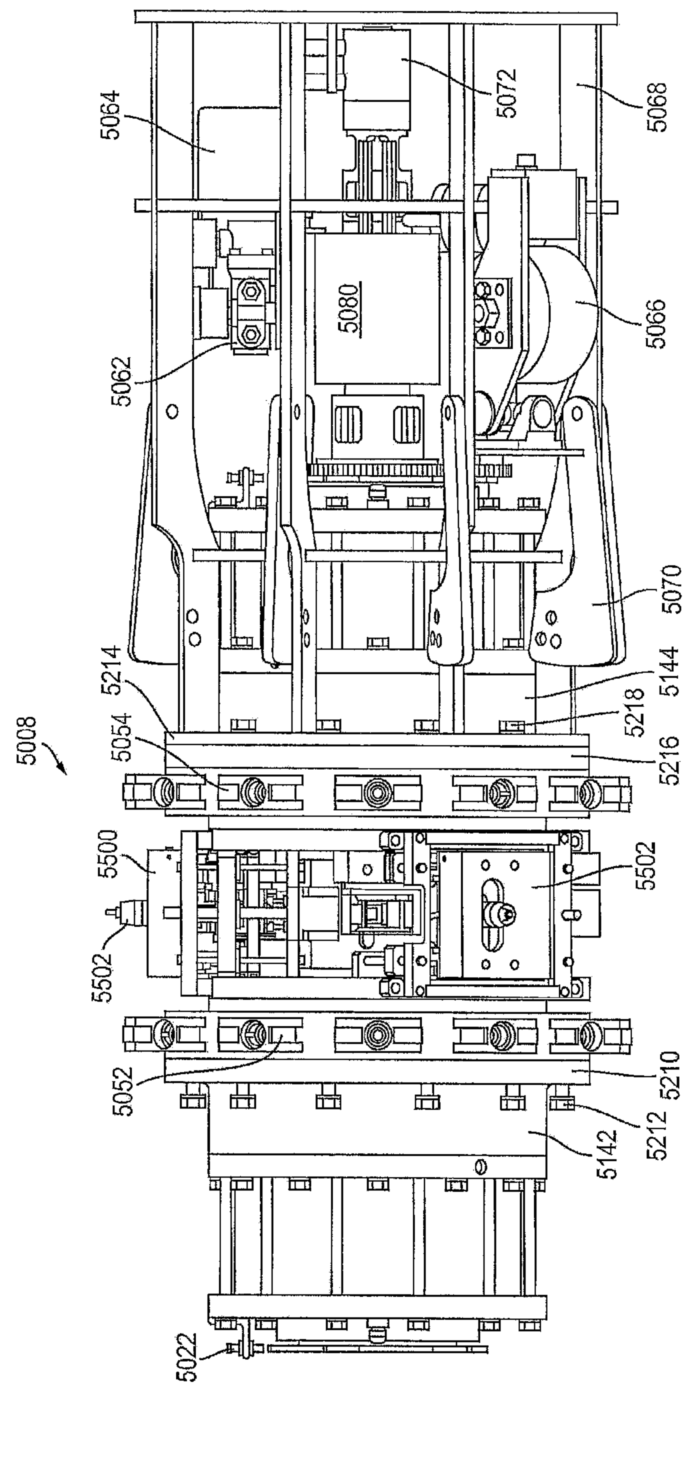
FIGS. 23 and 24 show a front view and a cross-sectional view of a center section of the internal weld system in accordance with an embodiment of the present patent application.
Figure 32A:
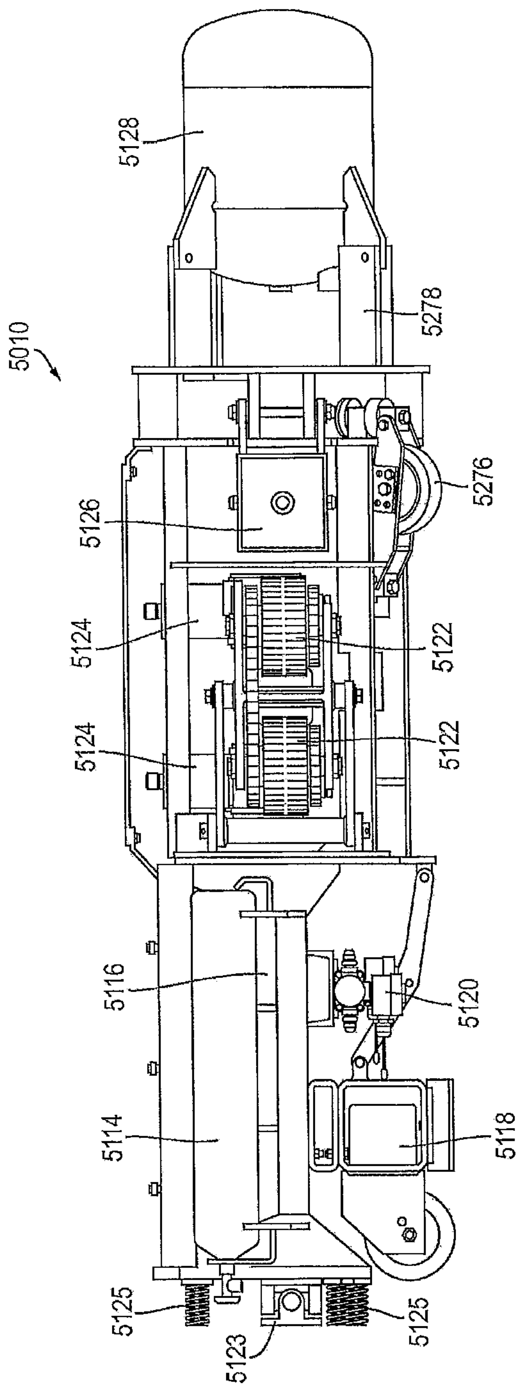
FIGS. 32A and 32B show side and top views of a drive section of the internal weld system in accordance with an embodiment of the present patent application.

In one embodiment, frame members of the forward-most section 5006, the center section 5008 and the drive section 5010 may be together may be referred to as a frame assembly or as the frame of the internal weld system 5004. In one embodiment, the frame or frame assembly of the internal weld system 5004 may be configured to support all of the components of each of the forward-most section 5006, the center section 5008 and the drive section 5010. In one embodiment, the frame or frame assembly of the internal weld system 5004 may include forward-most section frame 5026 (as shown in FIG. 12), center section frame 5068 (as shown in FIG. 23), and drive section frame 5278 (as shown in FIG. 32A). In one embodiment, the frame or frame assembly of the internal weld system 5004 is configured to be placed within the pipes 1022a, 1022b.

In one embodiment, the forward-most section 5006 is the section where external cables, wiring and hoses from the external system/structure (external to the pipes to be welded) connect. In one embodiment, the forward-most section 5006 is configured to house all of the weld support components as described in detail below. In one embodiment, the center section 5008 is configured to align the pipe segments 1022a, 1022b and perform the welding procedures. In one embodiment, the drive section 5010 is configured to move the internal weld system 5004 from one pipe joint to the next pipe joint. In one embodiment, the drive section 5010 is also configured to house batteries, compressed air and shield gas that the rest of the internal weld system 5004 needs to operate.

In one embodiment, some components of the internal weld system 5004 are positioned such that half of the component is positioned in the forward-most section 5006 and the remaining half of the component is positioned in the center section 5008. In one embodiment, some components of the internal weld system 5004 are positioned in the one of the three sections of the internal weld system 5004 but are connected to another of the three sections of the internal weld system 5004. For example, a component of the internal weld system 5004 is positioned in the forward-most section 5006 of the internal weld system 5004 and is connected to only the center section 5008 of the internal weld system 5004.

FIG. 12 shows a detailed view of the forward-most section 5006 of the internal weld system 5004. In one embodiment, the forward-most section 5006 of the internal weld system 5004 includes a tow hitch 5012, a forward-most electronics module 5014, a front slip ring 5016, a front clamp control valve 5018, a wire feed assembly 5020, a front position sensor 5022, adjustable ramps 5024, a forward-most section frame 5026, guide wheels 5028, a front rotation motor 5030, and a front rotary union 5032. In one embodiment, the forward-most electronics module 5014 may include the one or more processors 5014. In one embodiment, the front clamp control valve 5018, the front position sensor 5022, and the front rotation motor 5030 may be operatively connected to the one or more processors 5140.

Figure 13:
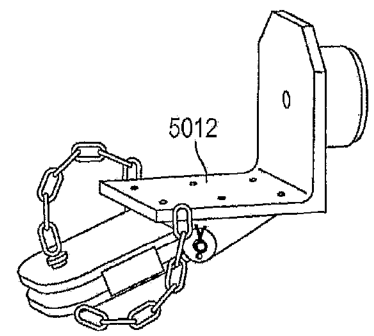
FIGS. 13-22 show views of various components of the forward-most section of the internal weld system in accordance with an embodiment of the present patent application.
Figure 14:
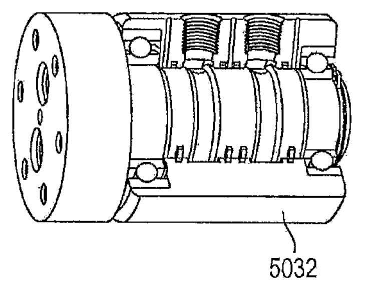
Figure 15:
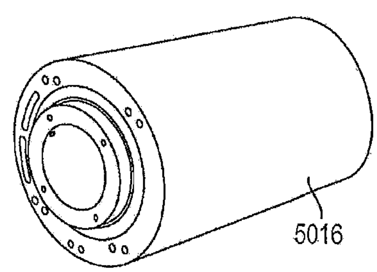
Figure 16:
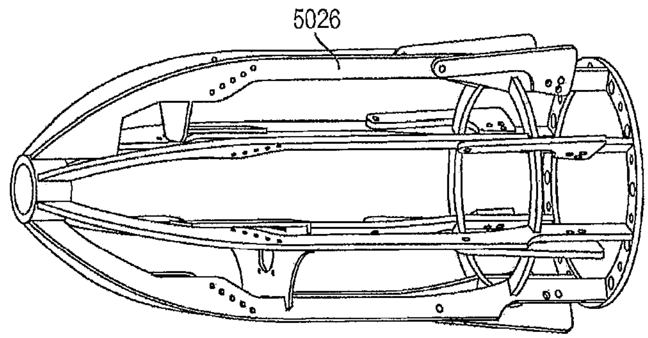
Figure 17:
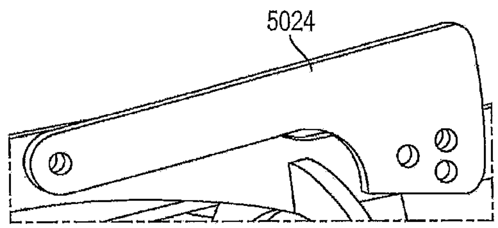
Figure 18:
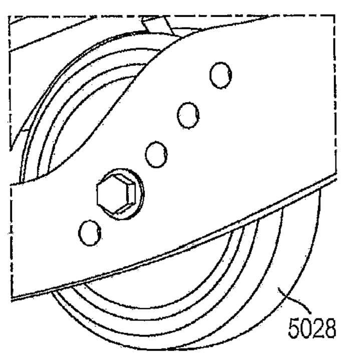
Figure 19:
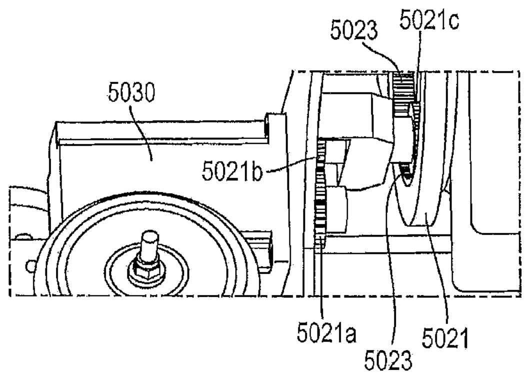
Figure 20:
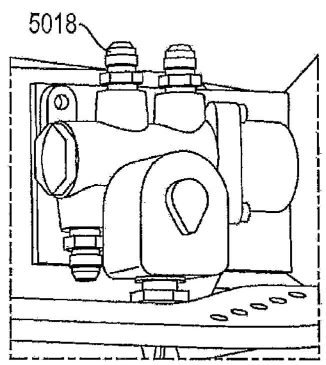
Figure 21:
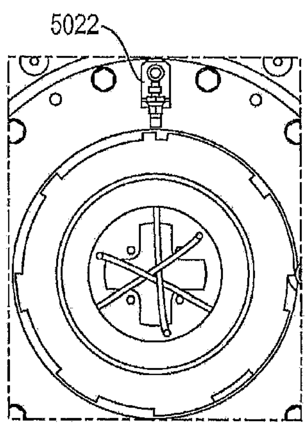
Figure 22:
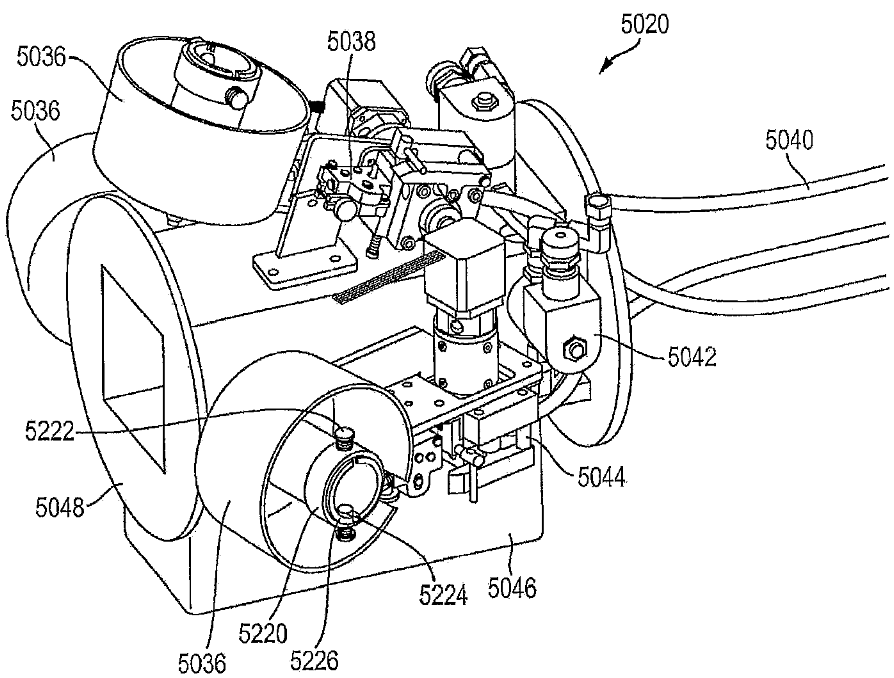

FIGS. 13-22 show views of various components of the forward-most section 5006 of the internal weld system 5004. For example, FIG. 13 shows the tow hitch 5012, FIG. 14 shows the front rotary union 5032, FIG. 15 shows the front slip ring 5016, FIG. 16 shows the forward-most section frame 5026, FIG. 17 shows the adjustable ramps 5024, FIG. 18 shows the guide wheels 5028, FIG. 19 shows the front rotation motor 5030, FIG. 20 shows the front clamp control valve 5018, FIG. 21 shows the front position sensor 5022, and FIG. 22 shows the wire feed assembly 5020, respectively.

Figure 11A:
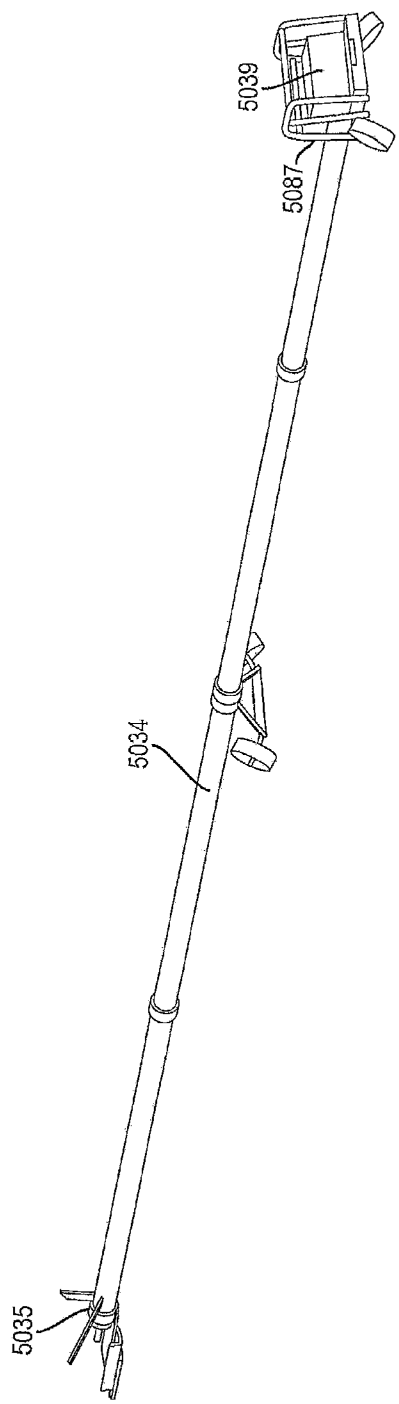
FIG. 11A shows a view of an umbilical operatively connected to the internal weld system in accordance with an embodiment of the present patent application.

FIG. 11A shows a view of the umbilical 5034 in which the internal weld system 5004 is configured to attached at a first end 5035 of the umbilical 5034 and an operator control system 5039 is configured to be attached to a second end 5037 of the umbilical 5034. In one embodiment, the first end 5035 of the umbilical 5034 is connected to the tow hitch 5012 of the forward-most section 5006 of the internal weld system 5004. In one embodiment, the communications (of the internal weld system 5004) with the Ulog system are configured to happen through one or more processors or modules in the operator control system 5039. In one embodiment, the operator control system 5039 is positioned external to the pipes 1022*a*, 1022*b* being welded.

In one embodiment, the forward-most section frame 5026 is constructed and arranged to house/support all of the components of the forward-most section 5006 of the internal weld system 5004. In one embodiment, the forward-most section frame 5026 is constructed and arranged to provide mounting points for all of the components at the front of the internal weld system 5004 and protect these components from damage. In one embodiment, the forward-most section frame 5026 is constructed and arranged to guide new pipe segments into alignment with the old/existing pipe segments. In one embodiment, the forward-most section frame 5026 may be made from steel or any other material as would be appreciated by one skilled in the art.

In one embodiment, the forward-most frame 5026 is constructed and arranged to have a nose cone shaped configuration to enable the internal weld system 5004 to easily move into the new pipe segment when joining/welding the new pipe segment with the old/existing pipe segment. In one embodiment, the nose cone shaped configuration of the forward-most frame 5026 may function as an alignment structure that is configured to facilitate alignment of the second pipe 1022*b* with the first pipe 1022*a*. In one embodiment, the nose cone shaped alignment structure is configured to project outwardly from the second end of the first pipe 1022*a* to facilitate alignment of the second pipe 1022*b* with the first pipe 1022*a*.

In one embodiment, referring to FIG. 12, the forward-most section frame 5026 includes a sensor 5352 configured to sense an end of the pipe when the frame of the internal weld system 5004 returns to pipe opening after welding a preceding pipe. In one embodiment, the sensor 5352 may be configured to be moveable with the frame of the internal weld system 5004. In one embodiment, the sensor 5352 is operatively connected to or associated with the one or more processors 5140.

In one embodiment, the sensor 5352 may be a rotary switch. For example, the rotary switch may have a downwardly projecting prod or wire biased into the interior pipe surface and configured to slidingly engage the interior pipe surface until it reaches the pipe and extends downwardly after reaching the pipe end to actuate the rotary switch, thus detecting the end of the pipe. For example, when the forward-most section frame 5026 reaches the end of the pipe, where a portion thereof will project outwardly of the pipe for receiving the end of the next pipe to be welded, the wire is configured to extend outwardly from its normal position to detect the end of the pipe. In another embodiment, the sensor 5352 may be a linear encoder that is configured to be operatively connected to the wheels/rollers of the internal weld system 5004 to determine the distance traveled by the internal weld system 5004 and use that information to sense/detect the end of the known pipe length.

In one embodiment, the sensor 5352 is configured to detect the interface region 5136 between the pipes 1022*a*, 1022*b*. In one embodiment, the one or more processors 5140 are configured to operate drive motors 5124 to move the frame of the internal weld system 5004 through at least one of the pipes 1022*a*, 1022*b* until the sensor 5352 detects the interface region 5136. In one embodiment, the sensor 5352 is configured to detect when the frame of the internal weld system 5004 is positioned at the interface region between the pipes 1002*a*, 1022*b*. In one embodiment, the sensor 5352 may be the inspection sensor 5056. In one embodiment, the sensor 5352 may be a laser. In one embodiment, the sensor 5352 may be the inspection camera 5112. In one embodiment, the inspection detector 5056 and/or the inspection camera 5112 are configured to also perform the sensing function of the sensor 5352.

In one embodiment, referring to FIG. 12, an end portion 5208 of the forward-most section frame 5026 is configured to be connected to a flange portion 5210 (as shown in FIG. 23) of a front clamp 5142 of the center section 5008. In one embodiment, the end portion 5208 of the forward-most section frame 5026 is configured to be connected to the flange portion 5210 of the front clamp 5142 of the center section 5008 using fastening members, for example, bolts 5212 (as shown in FIG. 23).

The front rotary union 5032 in the forward-most section 5006 is shown in FIGS. 12 and 14. A rotary union is generally a union or a coupling that is constructed and arranged to allow for rotation of two combined/united members. The rotary union is constructed and arranged to provide a seal between a stationary supply passage (pipe or tubing) and a rotating member (drum, cylinder or spindle) to permit the flow of a fluid into and/or out of the rotating member. Fluids generally used with the rotary unions include compressed air and purge gas. The rotary union generally includes a housing, a shaft, a seal and a bearing. The bearings and seal are assembled around the shaft. The bearings are used to allow a member of the rotary joint, either the shaft or the housing, to rotate. The seal is constructed and arranged to prevent the fluid medium (e.g., compressed air or purge gas) from leaking outside the rotary union while in operation. A rotary union locks onto an input valve while rotating to meet an outlet valve. During this time the fluid flows into the rotary union from its source and is held within the rotary union during its movement. This fluid leaves the rotary union when the valve openings meet during rotation and more fluid flows into the rotary union again for the next rotation.

In one embodiment, the front rotary union 5032 is configured to allow for the flow of compressed air therethrough. In one embodiment, the front rotary union 5032 (e.g., described in connection with FIG. 25, for example) is constructed and arranged to receive the compressed air from a rear rotary union 5072 (via, e.g., a rear slip ring 5080, a rotatable hub 5078 and the front slip ring 5016). The rear rotary union has essentially the same components and operates in essentially the same way as the front rotary union 5032 and hence not illustrated in the same detail as front rotary union 5032.

Figure 70:
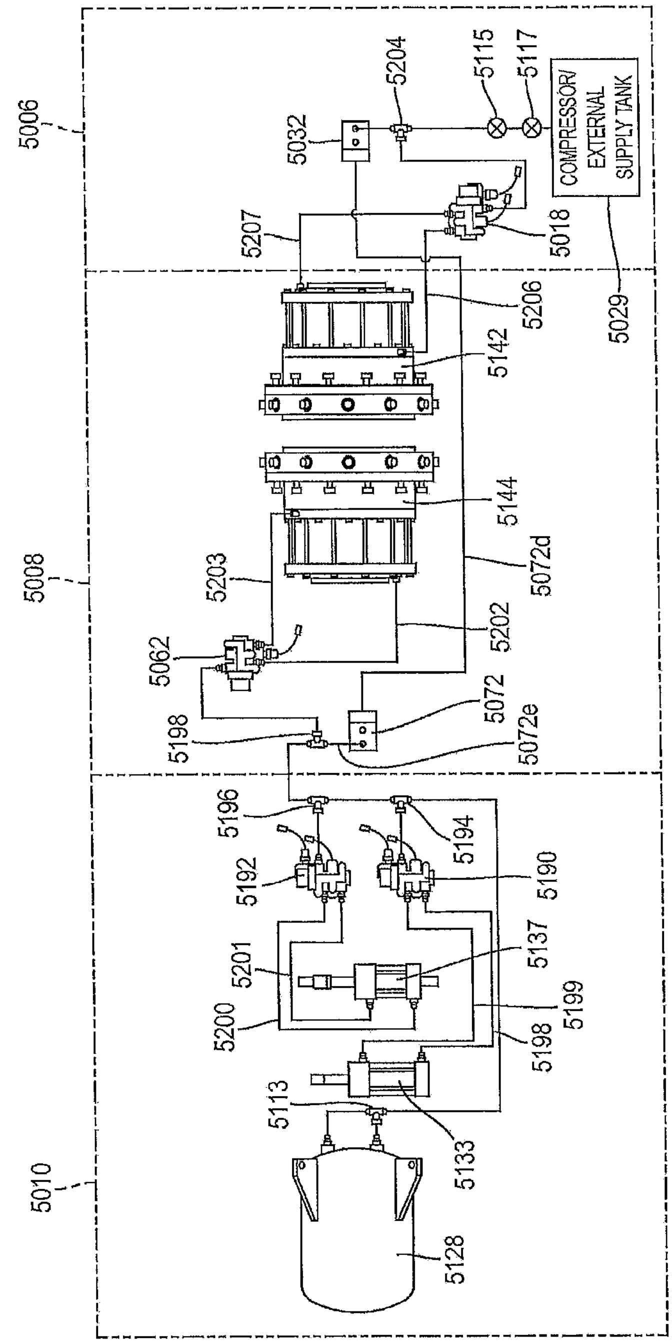
FIG. 70 shows a schematic diagram showing the flow of compressed air through the internal weld system in accordance with an embodiment of the present patent application.

In one embodiment, the front rotary union 5032 is constructed and arranged to send a portion of the received compressed air to the front clamp control valve 5018 (to actuate and operate the front clamp 5142) via the valve 5204. In one embodiment, the front rotary union 5032 is constructed and arranged to send the remaining portion of the received compressed air to a compressor or an external air supply tank 5029 (as shown in FIG. 70) to recharge the system (e.g., fill the tank with compressed air) via the valve 5204. In one embodiment, the remaining portion of the received compressed air sent to the compressor or external air supply tank 5029 (as shown in FIG. 70) passes through the front rotary union 5032.

In one embodiment, referring to FIG. 70, two valves 5115 and 5117 are configured to be closed until the start of the refill procedure. During the refill procedure, the compressed air from the external air supply tank 5029 travels through the valve 5115, 5117, and 5204 to the front rotary union 5032, from the front rotary union 5032 to the rear rotary union 5072, and then through the valves 5198, 5196, 5194 and 5113 to the compressed air tank 5128 to refill the compressed air tank 5128 with the compressed air. In one embodiment, the entire fluid communication path (or the supply fluid communication line) between the external air supply tank 5029 and the compressed air tank 5128 is maintained at tank pressure during the refill procedure.

In one embodiment, the front rotary union 5032 in the forward-most section 5006 is also configured to allow the compressed air from the umbilical 5034 to be connected to the wire feed assembly 5020 which is rotatably mounted on a rotatable hub 5078 of the center section 5008.

The front slip ring 5016 in the forward-most section 5006 is shown in FIGS. 12 and 15. A slip ring is an electromechanical device (electrical connector) that is constructed and arranged to allow the transmission of power and communication signals from a stationary structure to a rotating structure. A slip ring can be used in any electromechanical system that requires unrestrained, continuous rotation while transmitting power and/or data signals. The slip ring includes a stationary structure (brush) which rubs on the outside diameter of a rotating structure. As the rotating structure turns, the electric current or signal is conducted through the stationary structure to the rotating structure making the connection. The stationary structure may be a graphite or metal contact (brush) and the rotating structure may be a metal ring. Additional ring/brush assemblies are stacked along the rotating axis if more than one electrical circuit is needed. Either the brushes or the rings are stationary and the other component rotates.

In one embodiment, the front slip ring 5016 is configured to allow the transmission of communication signals from the forward-most electronics module 5014 to a wire feed electronics module 5046 of the wire feed assembly 5020. In one embodiment, the front slip ring 5016 is also configured to allow the transmission of (welding) power and the transmission of communication signals from the umbilical 5034 to the internal weld system 5004.

In one embodiment, as shown in FIGS. 12 and 17, the adjustable ramps 5024 are constructed and arranged to improve the alignment of the pipe segments 1022*a*, 1022*b*. In one embodiment, the adjustable ramps 5024 are constructed and arranged to be adjustable to accommodate different pipe sizes. In one embodiment, the adjustable ramps 5024 are constructed and arranged to also protect the center section 5008 from being hit by the incoming pipe segment 1022*b*. In one embodiment, the adjustable ramps 5024 of the internal weld system 5004 are constructed and arranged to be adjustable to extend a little more than the retracted clamp shoes (i.e., the clamp shoes 5157 in their retracted positions) but extend less than the extended clamp shoes (i.e., the clamp shoes 5157 in their extended positions).

In one embodiment, as shown in FIGS. 12 and 18, the guide wheels 5028 are constructed and arranged to prevent the incoming pipe segment 1022*b* from scraping the sides of the forward-most section 5006. In one embodiment, the guide wheels 5028 are constructed and arranged to be adjustable to accommodate different pipe sizes. In one embodiment, the guide wheels 5028 are passive members.

In one embodiment, as shown in FIG. 12, the forward-most electronics module 5014 includes communication connections to the umbilical 1034 and to the front slip ring 5016. For example, in one embodiment, the forward-most electronics module 5014 is configured to communicate power and communication signals to and from the umbilical 5034 and is configured to communicate power and communication signals to and from the front slip ring 5016.

In one embodiment, the forward-most electronics module 5014 is also configured to control the operation of the front rotation motor 5030 and the front clamp control valve 5018. In one embodiment, the forward-most electronics module 5014 is further configured to receive signals from the front position sensor 5022.

The front rotation motor 5030 in the forward-most section 5006 is shown in FIGS. 12 and 19. In one embodiment, the front rotation motor 5030 is electronically synchronized with a rear rotation motor 5074 positioned in the center section 5008 (described below). In one embodiment, together the two rotation motors 5030 and 5074 are configured to rotate the rotatable hub 5078 of the center section 5008 while maintaining the front and rear clamps 5142 and 5144 stationary.

In one embodiment, the front rotation motor 5030 may include an offset gear drive (due to packaging constraints). For example, in one embodiment, the front rotation motor 5030 has an electric motor having a rotor, a rotary shaft rotated by the rotor, and an external gear 5021*a* supported by the rotary motor shaft and having external teeth thereon. The external gear 5021*a* may engage an offset gear 5021*b*, also having external teeth. An opposite end of the offset gear 5021*b* also has external teeth 5021*c*. The external teeth 5021*c* of the external/driver gear are constructed and arranged to engage with internal teeth 5023 (as shown in FIG. 19) formed on an inner circumferential surface on a driven (annulus) gear member 5021 of the wire feed assembly 5020 to transmit torque from the front rotation motor 5030 to the wire feed assembly 5020. In one embodiment, the external teeth 5021*c* of the external/driver gear are constructed and arranged to engage with the internal teeth 5023 formed on the driven (annulus) gear member 5021 of the wire feed assembly 5020 using a gear train arrangement (see FIG. 19) to transmit torque from the front rotation motor 5030 to the wire feed assembly 5020.

In one embodiment, as shown in FIGS. 12 and 20, the front clamp control valve 5018 is configured to receive the compressed air from the stationary side of the front rotary union 5032.

In one embodiment, the front clamp control valve 5018 is operatively connected to receive control signals from the forward electronics module 5014. In one embodiment, the front clamp control valve 5018 is configured to supply the compressed air to actuate and operate the front clamp 5142, when it receives signals from the forward-most electronics module 5014.

In one embodiment, as shown in FIGS. 12 and 21, the front position sensor 5022 may be a proximity sensor and specially profiled encoder wheel. In one embodiment, the encoder wheel is constructed and arranged to be rotatably mounted on the wire feed assembly 5020 so as to be rotated with the rotatable hub 5078.

In one embodiment, the front position sensor 5022 is operatively connected to send control signals to the forward electronics module 5014. In one embodiment, the proximity sensor of the front position sensor 5022 may be configured to send control signals to the forward-most electronics module 5014 when the sensor is at a high point on the encoder wheel. In one embodiment, the forward-most electronics module 5014 is configured to use the signals received from the front position sensor 5022 to determine the orientation of the forward-most section 5006 relative to the rest of the internal weld system 5004 (e.g., rotatable hub 5078).

Figure 22A:
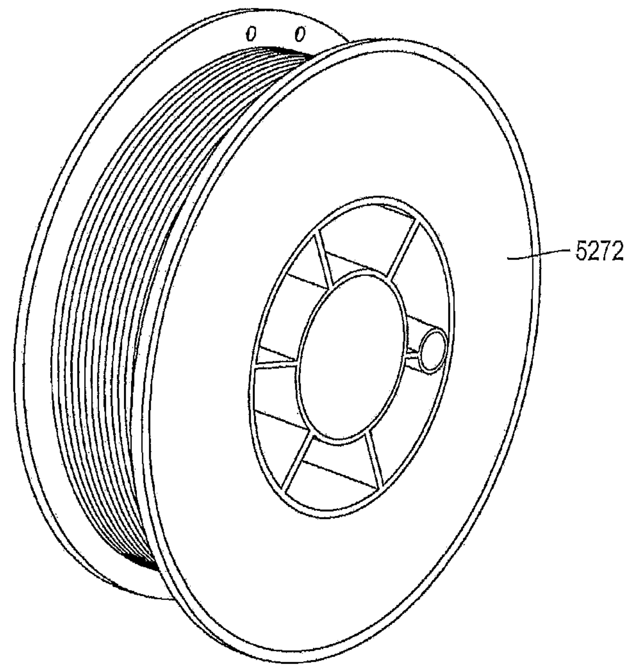
FIG. 22A shows an exemplary weld wire spool in accordance with an embodiment of the present patent application.
Figure 22B:
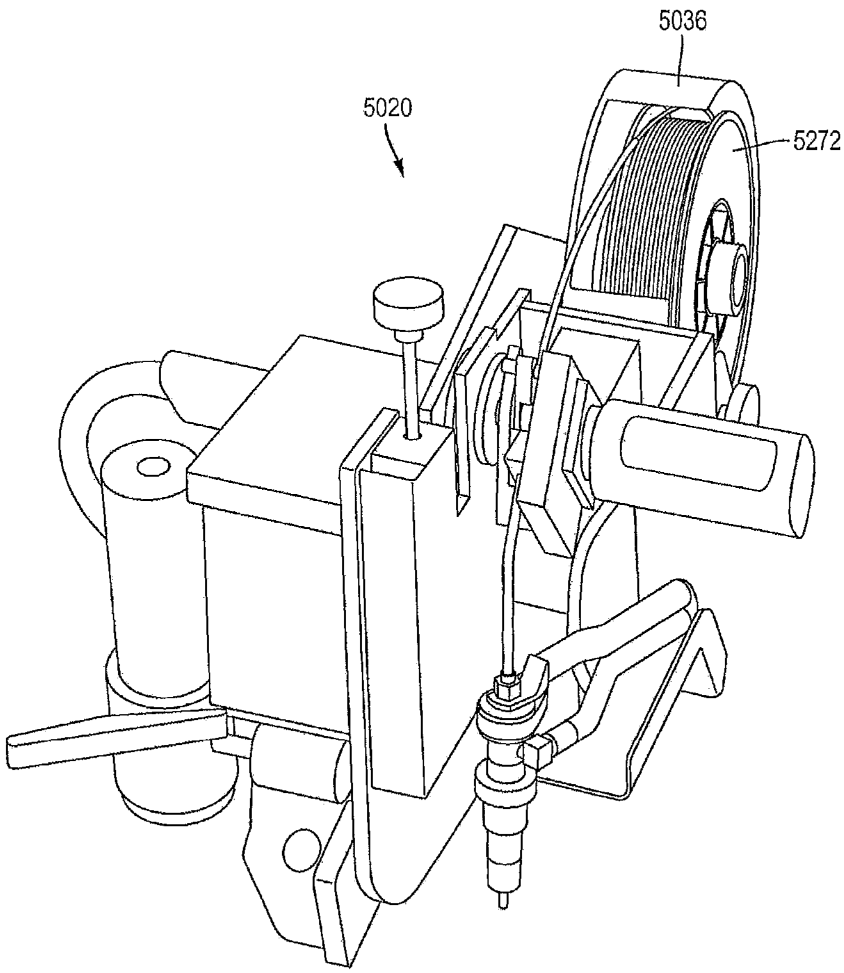
FIG. 22B shows an exemplary weld feed assembly in accordance with an embodiment of the present patent application.

In one embodiment, as shown in FIGS. 12, 22, 22A and 22B, the wire feed assembly 5020 includes a wire spool holder 5036, a wire straightener 5038, a weld wire bowden (guide) tube 5040, a shield gas control valve 5042, a wire feed system 5044, the wire feed electronics module 5046, and a wire feed assembly frame 5048. In one embodiment, an exemplary weld wire spool 5272 is shown in FIG. 22A. In one embodiment, the wire straightener 5038, the shield gas control valve 5042, and the wire feed system 5044 may be operatively connected to one or more processors 5140. In one embodiment, the wire feed electronics module 5046 may include one or more processors 5140.

In one embodiment, the wire feed assembly 5020 is constructed and arranged to house the wire spools 5272, the wire spool holders, the wire straighteners, the wire feed system, and the shield gas control valves for each of three illustrated weld torches 5502 in the center section 5008 of the internal weld system 5004. In the illustrated embodiment, the wire feed assembly 5020 includes three wire spool holders 5036, three wire straighteners 5038, three weld wire bowden (guide) tubes 5040, three shield gas control valves 5042, and three wire feed systems 5044 associated with three illustrated weld torches 5502 in the center section 5008 of the internal weld system 5004. In one embodiment, the number of the wire spool holders, the wire straighteners, the weld wire bowden (guide) tubes, the shield gas control valves, the weld wire/electrode spools and the wire feed systems in the internal weld system 5004 may vary and depend on the number of the weld torches.

In one embodiment, the weld wire spool 5272 has a size of 7 (⅞) inches and a weight of 10 pounds. In one embodiment, the size of the electrode or weld wire is 0.03 inches. In one embodiment, the electrode or weld wire is made of a carbon steel material. In one embodiment, the electrode or weld wire is a ER70S-6 carbon steel MIG weld wire manufactured, for example, by Chicago Electric Welding Systems. In one embodiment, the electrode or weld wire is designed for use with various shield gas mixtures such as 100% Carbon dioxide ($CO_2$), a mixture of 75% Argon and 25% $CO_2$, or a mixture of 98% Argon and 2% $O_2$.

In one embodiment, the wire feed assembly 5020 is constructed and arranged to be connected to the rotatable hub 5078 of the center section 5008, so that rotation of the wire feed module 5020 via the front rotation motor is directly translated to the rotatable hub 5078. In one embodiment, the wire feed assembly 5020 is constructed and arranged to be fastened (e.g., using fastening members) to the rotatable hub 5078 of the center section 5008. In one embodiment, the wire feed assembly 5020 is also constructed and arranged to house electronics for operating all of the motors in the wire feed assembly 5020 and the rotatable hub 5078.

In one embodiment, the wire feed assembly frame 5048 is constructed and arranged to be hollow so as to allow power, communication signals, shield gas, weld wire/electrode, motor control signals, and compressed air to pass into, out of, and through it.

In one embodiment, as shown in FIG. 22, the wire spool holder 5036 is constructed and arranged to receive and hold weld wire/electrode spools (not shown) for use by the internal weld system 5004. In one embodiment, the wire spool holder 5036 may include a retainer member 5220 configured to retain the weld wire/electrode spool therein.

In one embodiment, the retainer member 5220 may be removable positioned on a shaft 5226 of the wire spool holder 5036 using a lock member 5222 attached to the retainer member 5220. The lock member 5222 may include a smaller diameter region and a larger diameter region. In one embodiment, a lock member receiving opening may be formed on the shaft 5226 as having a cross-sectional shape of a generally enclosed circle, with a side opening 5224 extending outwardly from the shaft 5226. With such a configuration, the lock member 5222 may slidably be positioned such that either the larger diameter region or the smaller diameter region is within the generally enclosed circular cross-sectional shape of the lock member receiving opening. When the larger diameter region is positioned in the lock member receiving opening, the shaft 5226 surrounds the larger diameter region, which is unable to pass through the side opening 5224, locking the retainer member 5220 to the shaft 5226 due to the engagement between the lock member 5222 and the lock member receiving opening. Alternatively, where the lock member 5222 is positioned such that the smaller diameter region is generally surrounded by the lock member receiving opening, the retainer member 5220 may freely be removed from the shaft 5226, as the smaller diameter region may pass through the side opening 5224. In another embodiment, the retainer member 5220 may be removable attached to the shaft 5226 of the wire spool holder 5036 using a retaining screw.

The weld wire or electrode that comes off of the weld wire/electrode spool may have a permanent bend to it. In one embodiment, the wire straightener 5038 is configured to remove the permanent bend and make the weld wire straight (e.g., by bending the weld wire in the other direction). The straight configuration of the weld wire helps the weld wire to pass through the weld wire bowden (guide) tube 5040 more easily. Also, providing straight weld wire to the weld torch 5502 results in more consistent welds. In one embodiment, the wire straightener 5038 is optional.

In one embodiment, the weld wire bowden (guide) tube 5040 is constructed and arranged to guide the weld wire/electrode from the wire feed system 5044 to the weld torch 5502. In one embodiment, the weld wire bowden (guide) tube 5040 attached at both its ends. In one embodiment, the weld wire is sheathed by the weld wire bowden (guide) tube 5040.

In one embodiment, the wire feed system 5044 is constructed and arranged to pull the weld wire through the wire straightener 5038 from the weld wire spool 5272 and push the weld wire through the weld wire bowden (guide) tube 5040 to the weld torch 5502.

In one embodiment, the wire feed system 5044 is configured to be automatically controlled to deliver the appropriate amount of wire to the weld torch 5502. In one embodiment, the wire feed system 5044 may include motor and two serrated wheels that are configured pull weld wire through the wire straightener 5038 from the weld wire spool 5272 and push the weld wire through the weld wire bowden (guide) tube 5040 to the weld torch 5502. In one embodiment, the motor(s) of the wire feed system 5004 may include an encoder that is configured to measure the revolutions of the motor. In one embodiment, the motor(s) of the wire feed system 5004 are operatively connected to the one or more processors 5140. This information may be used by the one or more processors 5140 to determine how much wire is fed to the weld torch 5502 and to regulate the amount of the weld wire is being fed to the weld torch 5502. In one embodiment, as the rotatable hub 5078 is rotated, the weld wire/electrode is fed to the torch 5502 by the wire feed assembly 5020.

In one embodiment, the shield gas control valve 5042 is configured to control the flow of the shield gas to the weld torch through a shield gas line. In one embodiment, each weld torch 5502 has a corresponding shield gas control valve 5042 connected to it.

In one embodiment, the shield gas is stored in the drive section 5010 and is brought to the wire feed assembly 5020 by a hose/shield gas line for distribution to the one or more weld torches 5502. In one embodiment, the shield gas control valve 5042 is configured to receive the shield gas from the rear rotary union 5072 (e.g., via the rear slip ring 5080 and the rotatable hub 5078).

In one embodiment, the shield gas control valve 5042 is operatively connected to receive control signals from the wire feed electronics module 5046. In one embodiment, the shield gas control valve 5042 is configured to supply the shield gas to the corresponding weld torch, when it receives signals from the wire feed electronics module 5046.

In one embodiment, the wire feed electronics module 5046 is configured to send and receive power and communication signals upstream through the front slip ring 5016 to the forward-most electronics module 5014. In one embodiment, the wire feed electronics module 5046 is configured to send and receive power and communication signals downstream through the rear slip ring 5080 to a center section electronics module 5064.

In one embodiment, the wire feed electronics module 5046 is configured to control all of the motors and valves attached to the rotatable hub 5078 of the center section 5008. For example, the wire feed electronics module 5046 is configured to control the wire feed system, axial motion of the weld torch 5502, radial motion of the weld torch 5502, tilt motion of the weld torch 5502, and/or flow and delivery of the shield gas. That is, the wire feed electronics module 5046 is operatively connected to the shield gas control valve(s) 5042 to control the flow and delivery of the shield gas to the weld torch(es) 5502.

In one embodiment, the wire feed electronics module 5046 is operatively connected to the axial weld torch motor 5550 to control the axial motion of the weld torch 5502. In one embodiment, the wire feed electronics module 5046 is operatively connected to the radial weld torch motor 5512 to control the radial motion of the weld torch 5502. In one embodiment, the wire feed electronics module 5046 is operatively connected to the tilt weld torch motor 5588 to control the tilt motion of the weld torch 5502. In one embodiment, the axial weld torch motor 5550, the radial weld torch motor and the tilt weld torch motor 5588 may either individually or together be referred to as "weld torch motor(s)".

In one embodiment, the wire feed electronics module 5046 is configured to communicate with and control an inspection detector 5056 and an inspection camera 5112 both rotatably mounted on the rotatable hub 5078. In one embodiment, the inspection detector 5056 is carried by the frame assembly of the internal weld system 5004. In one embodiment, the inspection camera 5112 is carried by the frame assembly of the internal weld system 5004.

In one embodiment, the inspection detector 5056 may include an inspection laser, a three dimensional inspection camera, an inspection ultrasound sensor system, an inspection electrical capacitive probe, and any other inspection detectors as would be appreciated by one skilled in the art.

Figure 24:
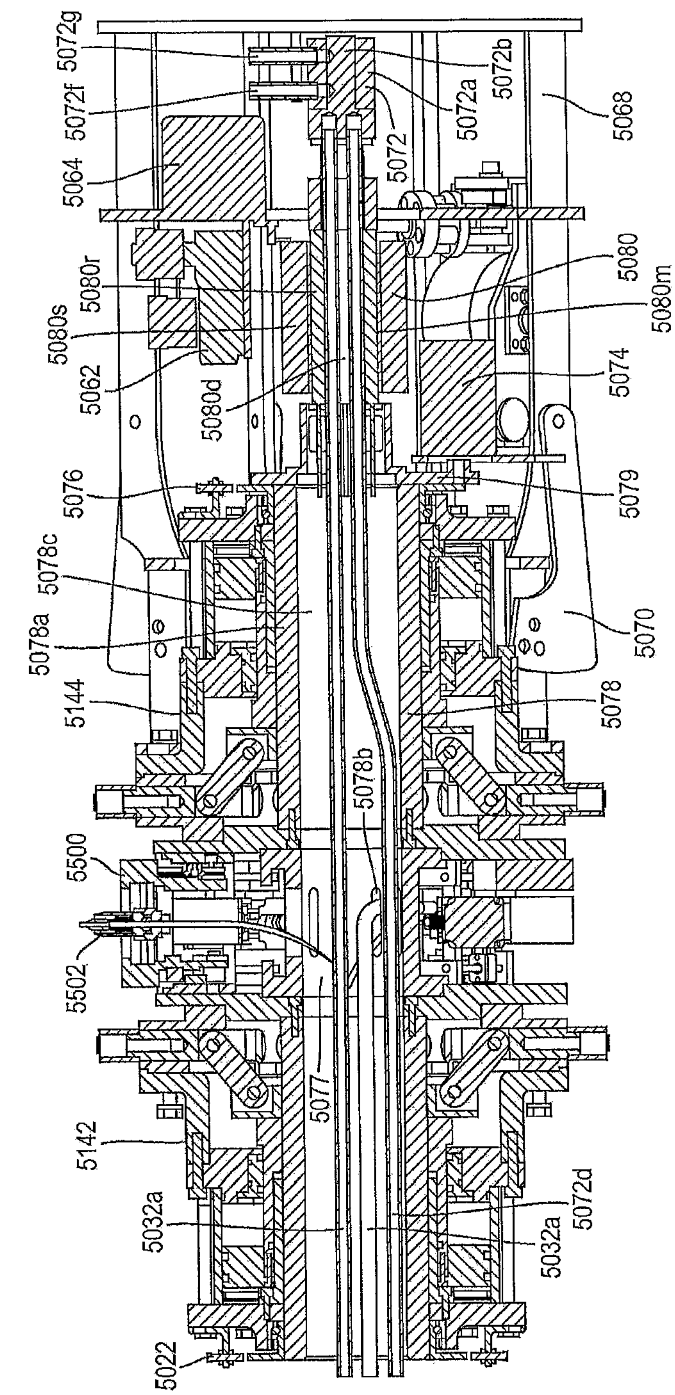

FIGS. 23 and 24 show a front view and a cross-sectional view of the center section 5008 of the internal weld system 5004. In one embodiment, as discussed above, the forward-most frame 5026 of the forward-most section 5006 is connected to the front clamp 5142 of the center section 5008, and the wire feed assembly 5020 is rotatably connected to the rotatable hub 5078.

In one embodiment, the center section 5008 of the internal weld system 5004 includes the front clamp 5142 (or first pipe engagement structure 5052), the inspection detector 5056, a weld head assembly or torch module 5500, a rear clamp 5144 (and second pipe engagement structure 5054), a rear clamp control valve 5062, the center section electronics module 5064, toe wheels 5066, a center section frame 5068, adjustable ramps 5070, the rear rotary union 5072, the rear rotation motor 5074, a rear position sensor 5076, the rotation module 5078, and the rear slip ring 5080.

In one embodiment, the front clamp 5142 (or first pipe engagement structure 5052), the inspection detector 5056, the weld head assembly or torch assembly 5500, the rear clamp 5144 (and second pipe engagement structure 5054), the rear clamp control valve 5062, the rear rotation motor 5074, the rear position sensor 5076 are operatively connected to the one or more processors 5140. In one embodiment, the inspection camera 5112 is operatively connected to the one or more processors 5140. In one embodiment, the center section electronics module 5064 may include the one or more processors 5140. The term "pipe engagement structure" as used herein can refer to a clamp for fixedly securing to a pipe surface, or an interior seal that is configured to create a gas seal against the pipe interior surface, or the combination of both the aforementioned clamp and seal. For example, in one embodiment, the first pipe engagement structure 5052 may be the first clamp 5142, the first seal 5146 or a combination thereof. In one embodiment, the second pipe engagement structure 5054 may be the second clamp 5144, the second seal 5148 or a combination thereof. In one embodiment, the first and second pipe engagement structures 5052 and 5054 are carried by the frame assembly of the internal weld system 5004.

Figure 25:
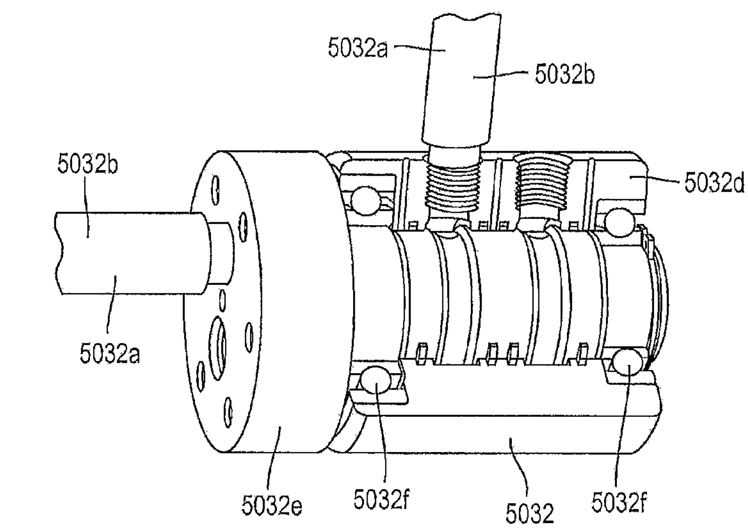
FIGS. 25-31 show views of various components of the center section of the internal weld system in accordance with an embodiment of the present patent application.
Figure 26:
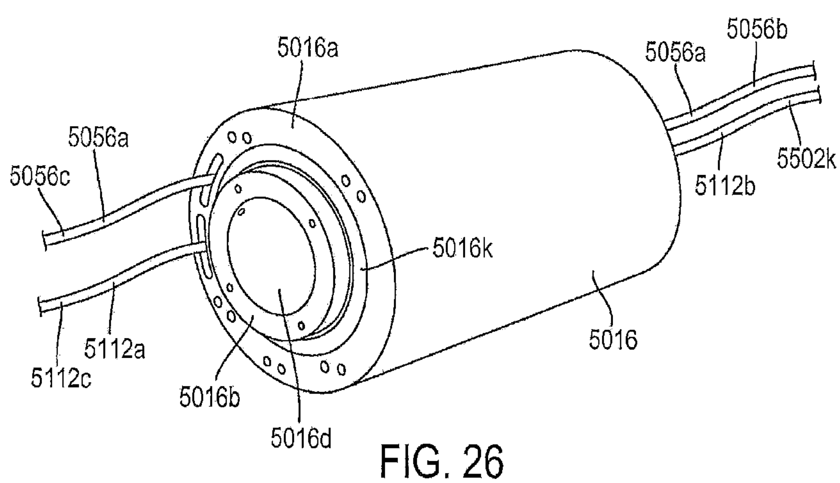
Figure 27:
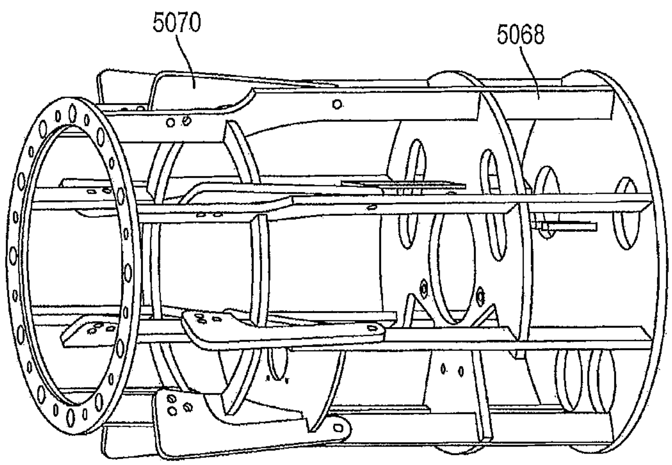
Figure 28:
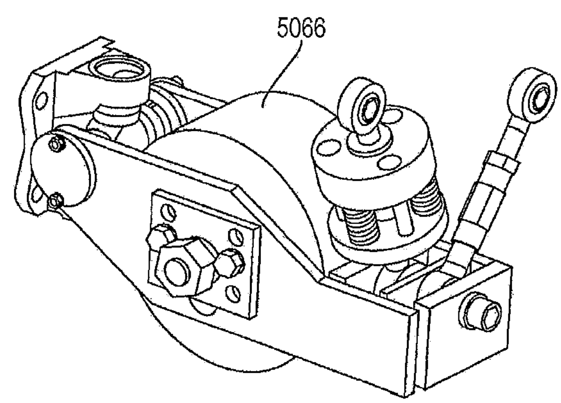
Figure 29:
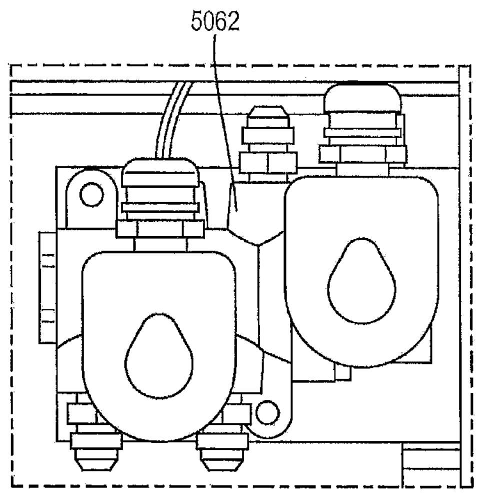
Figure 30:
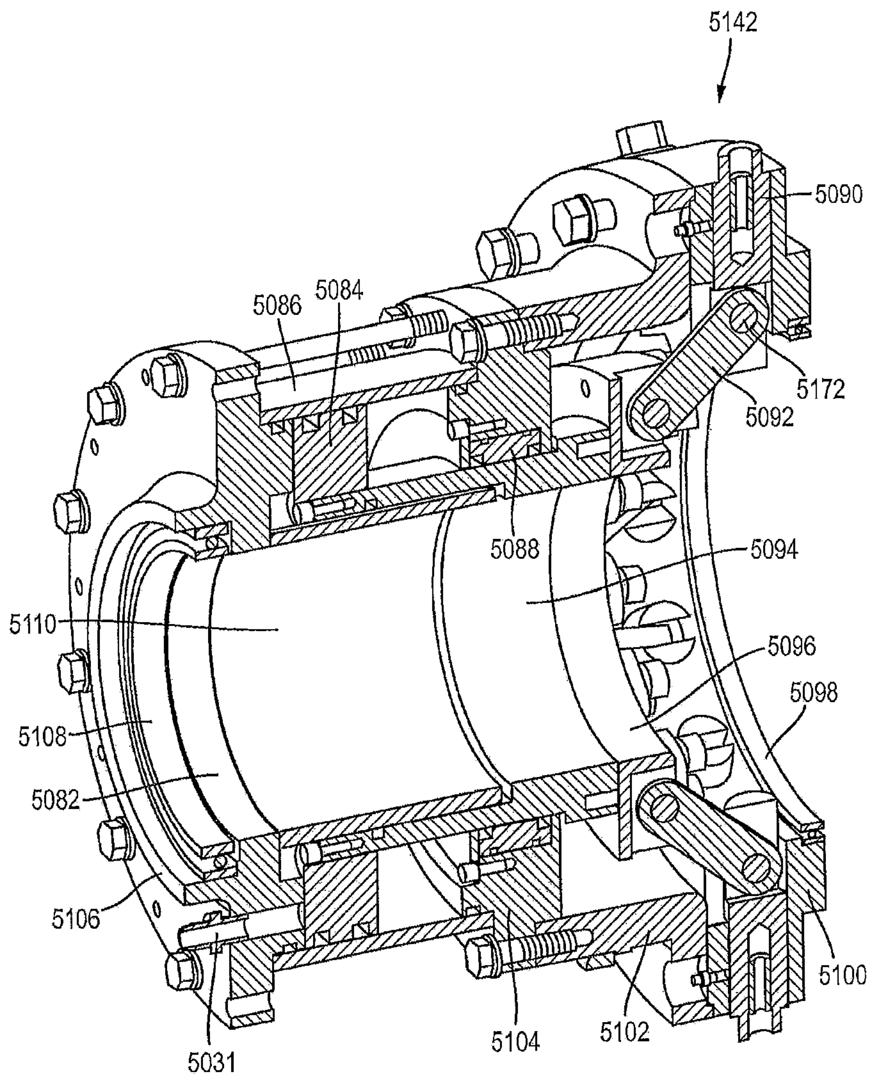
Figure 31:
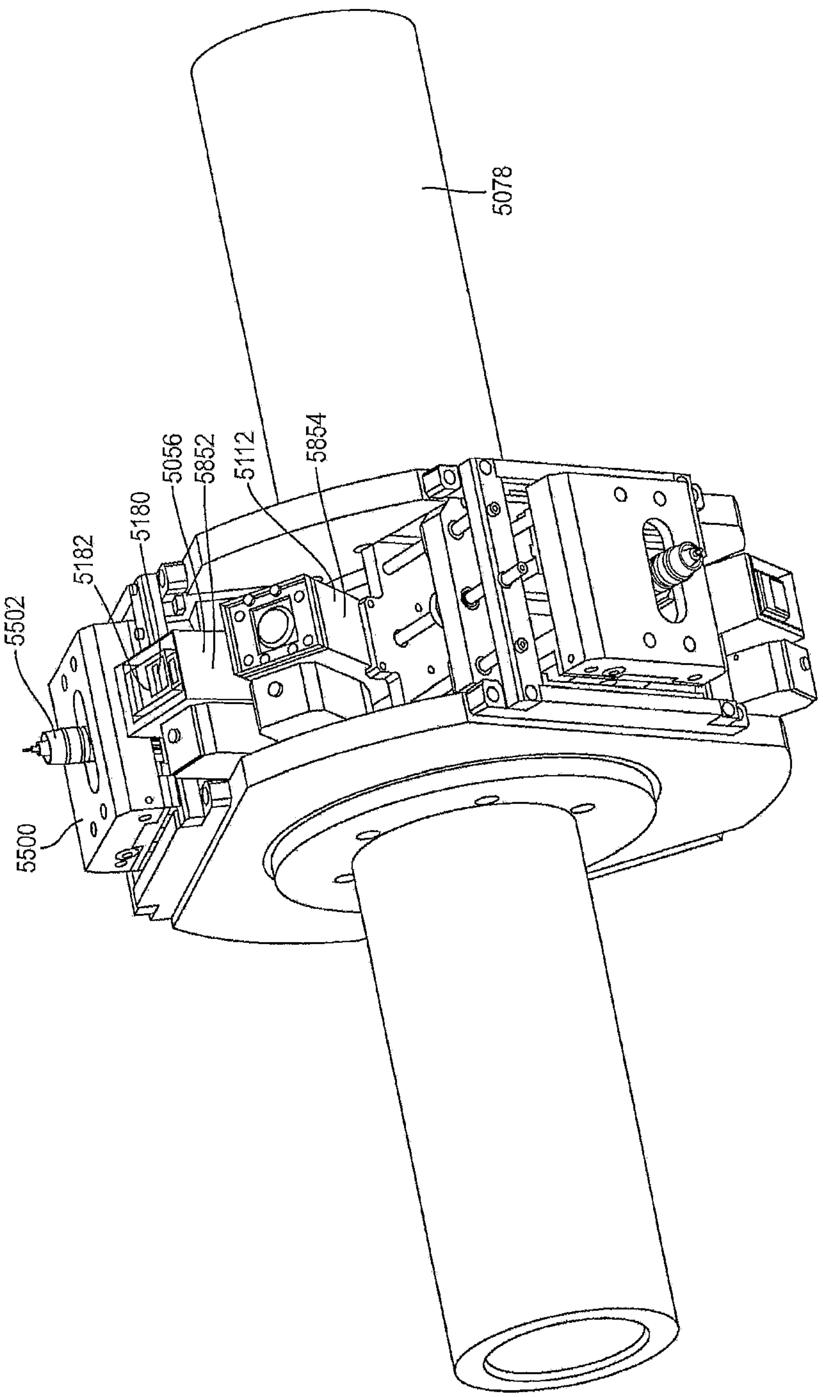

FIGS. 25-31 show views of various components of the center section 5008 of the internal weld system 5004. For example, FIG. 25 shows the rear rotary union 5072, FIG. 26 shows the rear slip ring 5080, FIG. 27 shows the center section frame 5068 and the adjustable ramps 5070, FIG. 28 shows the toe wheels 5066, FIG. 29 shows the rear clamp control valve 5062, FIG. 30 shows the front clamp 5142, and FIG. 31 shows the rotation module 5078, respectively.

The rear rotary union 5072 in the center section 5008 is shown in FIGS. 23, 24 and 25. In one embodiment, the structure and operation of the rear rotary union 5072 is similar to the front rotary union 5032, and hence the structure and operation of the rear rotary union 5072 will not be described in detail here, except for the differences noted below.

Figure 32B:
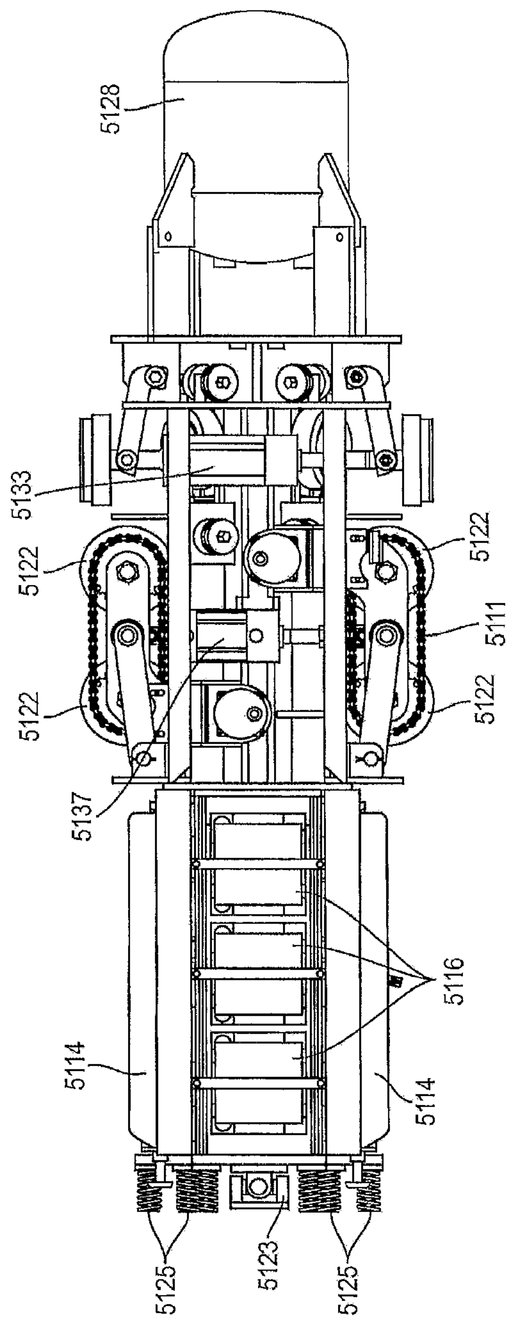

In one embodiment, the rear rotary union 5072 is configured to allow for the flow of compressed air and the flow of shield gas (or purge gas) therethrough. In one embodiment, the rear rotary union 5072 in the center section 5008 is configured to allow the compressed air from a compressed air tank 5128 (as shown in FIGS. 32A and B) of the drive section 5010 to be connected through the rotatable hub 5078 of the center section 5008 to the front rotary union 5032. In one embodiment, the rear rotary union 5072 in the center section 5008 is also configured to connect shield gas tanks 5114 (as shown in FIGS. 32A and 32B) in the drive section 5010 to the shield gas control valves 5042 in the wire feed assembly 5020 of the forward-most section 5006.

In one embodiment, the rear rotary union 5072 is constructed and arranged to send a portion of the received compressed air to the rear clamp control valve 5062 (to operate the rear clamp 5144). In one embodiment, the rear rotary union 5072 is constructed and arranged to send the remaining portion of the received compressed air to the front rotary union 5032 (e.g., via the rear slip ring 5080, the rotatable hub 5078 and the front slip ring 5016). In one embodiment, the remaining portion of the received compressed air sent to the front rotary union 5032 passes through the rear rotary union 5072.

In one embodiment, the front and rear rotary unions 5032 and 5072 of the present patent application may be of the type which is available commercially under the name Series 012 2 Pass Threaded Shaft Unions, manufactured by the Rotary Systems, Inc. In another embodiment, the front and rear rotary unions of the present patent application may be any rotary union that would be appreciated by one skilled in the art.

In one embodiment, the structure and operation of the rear slip ring 5080 is similar to the front slip ring 5016, and hence the structure and operation of the rear slip ring 5080 will not be described in detail here, except for the differences noted below.

In one embodiment, as shown in FIGS. 23, 24 and 26, the rear slip ring 5080 in the center section 5008 is configured to allow the transmission of communication signals between the wire feed electronics module 5046 and the center section electronics module 5064.

In one embodiment, the front and rear slip rings 5016 and 5080 of the present patent application may be of the type which is available commercially under the name AC6275, manufactured by the Moog, Inc. In one embodiment, the front and rear slip rings 5016 and 5080 of the present patent application may be rated 50 amps. In another embodiment, the front and rear slip rings of the present patent application may be any rotary union that would be appreciated by one skilled in the art.

In one embodiment, as shown in FIGS. 23 and 24, the center section electronics module 5064 in the center section 5008 includes communication cables to the wire feed assembly 5020 through the rear slip ring 5080 and communication cables to the drive section 5010. In one embodiment, the center section electronics module 5064 in the center section 5008 is configured to control the rear rotation motor 5074 and receive signals from the rear position sensor 5076. In one embodiment, the center section electronics module 5064 in the center section 5008 is also configured to control the rear clamp control valve 5062.

In one embodiment, as shown in FIGS. 23, 24 and 27, the center section frame 5068 is constructed and arranged to house/support all of the components of the center section 5008 of the internal weld system 5004. In one embodiment, the center section frame 5068 is constructed and arranged to provide mounting points for all of the components located in the center section 5008 and protects these components from damage. In one embodiment, the center section frame 5068 is also constructed and arranged to connect to the drive section 5010 through a U-joint that allows the internal weld system 5004 to bend in curved pipes. In one embodiment, the center section frame 5068 may be made from steel or any other material as would be appreciated by one skilled in the art.

In one embodiment, an end portion 5214 of the center section frame 5068 is configured to be connected to a flange portion 5216 of the rear clamp 5144. In one embodiment, the end portion 5214 of the center section frame 5068 is configured to be connected to the flange portion 5216 of the rear clamp 5144 using fastening members, for example, bolts 5218.

In one embodiment, as shown in FIGS. 23, 24 and 27, the adjustable ramps 5070 are constructed and arranged to help center the internal weld system 5004 when the internal weld system 5004 is being placed into a pipe. In one embodiment, the adjustable ramps 5070 are also constructed and arranged to protect the center section 5008 from being hit by the end of the pipe segment. In one embodiment, the adjustable ramps 5070 are constructed and arranged to be adjustable to accommodate different pipe sizes.

In one embodiment, as shown in FIGS. 23, 24 and 28, the toe wheels 5066 are constructed and arranged to support the weight of the center section 5008. In one embodiment, the toe wheels 5066 are constructed and arranged to be sprung to protect the internal weld system 5004 from jarring shocks when the internal weld system 5004 crosses over a weld bead. In one embodiment, the toe wheels 5066 are constructed and arranged to have an adjustable toe angle to help the internal weld system 5004 run straight in the pipe. In one embodiment, the toe wheels 5066 are constructed and arranged to be adjustable in height for different pipe sizes. In one embodiment, the toe wheels 5066 are passive members.

In one embodiment, as shown in FIGS. 23, 24 and 29, the rear clamp control valve 5062 is constructed and arranged to receive the compressed air from the stationary side of the rear rotary union 5072.

In one embodiment, the rear clamp control valve 5062 is operatively connected to receive control signals from the center section electronics module 5064. In one embodiment, the rear clamp control valve 5062 is configured to supply the compressed air to actuate and operate the rear clamp 5144, when it receives signals from the center section electronics module 5064.

In one embodiment, as shown in FIG. 24, the rear position sensor 5076 may be a proximity sensor and specially profiled encoder wheel. In one embodiment, the encoder wheel is constructed and arranged to be rotatably mounted on the rotatable hub 5078.

In one embodiment, the rear position sensor 5076 is operatively connected to send control signals to the center section electronics module 5064. For example, in one embodiment, the proximity sensor of the rear position sensor 5076 may be configured to send control signals to the center section electronics module 5064 when the sensor is at a high point on the encoder wheel. In one embodiment, the center section electronics module 5064 is configured to use the signals received from the rear position sensor 5076 to determine the orientation of the center section 5008 relative to the rest of the internal weld system 5004 (e.g., rotatable hub 5078).

The rear rotation motor 5074 in the center section 5008 is shown in FIG. 24. In one embodiment, the rear rotation motor 5074 is electronically synchronized with the front rotation motor 5030 such that the rotation motors 5030 and 5074 together are configured to rotate the rotatable hub 5078 of the center section 5008 while maintaining the front and rear clamps 5142, 5144 stationary. In one embodiment, the rotation motors 5030 and 5074 are configured to rotate the weld torch 5502 circumferentially (360° rotation) along an interface region 5136. In one embodiment, the rotation motors 5030 and 5074, configured to direct the inspection beam of radiation, are also configured to drive the weld torch 5502 at least 360° relative to the pipe axis A-A so as to complete a rotationally continuous, root pass weld.

In one embodiment, the front rotation motor 5030 and the rear rotation motor 5074 may be referred to as the orientation motors. In one embodiment, the front rotation motor

5030 and the rear rotation motor 5074 are operatively associated with the one or more processors 5140.

In one embodiment, the rear rotation motor 5074 has an electric motor having a rotor, a rotary shaft rotated by the rotor, and a driver gear supported by the rotary shaft and having teeth thereon. The teeth of the driver gear are constructed and arranged to engage with teeth formed on a driven gear member 5079 of the rotatable hub 5078 to transmit torque from the rear rotation motor 5074 to the rotatable hub 5078.

In one embodiment, the rotatable hub 5078 is constructed and arranged to rotate during welding, pre-weld scan and post-weld scan procedures. In one embodiment, the rotatable hub 5078 is positioned between the first and second clamps 5142 and 5144. Since the first and second clamps 5142 and 5144 are not physically linked to each other, the front rotation motor 5030 and the rear rotation motor 5074 at each end of the rotatable hub 5078 are synchronized to keep the two pipes 1022*a*, 1022*b* from moving relative to each other. In one embodiment, the two pipe engagement structures 5142, 5144 may be rotated relative to each other by turning the front rotation motor 5030 and the rear rotation motor 5074, for example, at different speeds and/or different directions. In one embodiment, only when the front rotation motor 5030 and the rear rotation motor 5074 are turning at the same speed and in the same direction, that the weld torch 5502 and the inspection detector 5056 rotate along the interface region 5136 between the pipes 1022*a*, 1022*b* (e.g., without moving the pipe engagement structures 5142, 5144).

In one embodiment, a central portion 5077 of the rotatable hub 5078 includes slots/openings through which the shield gas hoses, the bowden tubes, the weld power cables, the motor cables, the inspection detector cables, and the camera cables are configured to pass.

In one embodiment, as shown in FIGS. 23, 24 and 30, the front clamp 5142 has a hollow configuration. In one embodiment, an opening 5082 through the center of the front clamp 5142 is constructed and arranged to be large enough to allow all of the required cables and hoses to pass therethrough. In one embodiment, the opening 5082 of the front clamp 5142 is also constructed and arranged to allow for a structural member that is required to support the weight of the front half of the internal weld system 5004 as well as to maintain alignment of the two halves/pipe segments 1022*a*, 1022*b* of the weld joint. In one embodiment, the front and rear clamps 5142, 5144 are constructed and arranged to be mounted to the rotatable hub 5078, for example, by angular contact ball bearings 5108, 5098 that are preloaded to provide stiffness.

In one embodiment, the interior surface 5130, 5132 of the first pipe 1022*a* and/or the second pipe 1022*b* is engaged and manipulated by the first clamp 5142 and the second clamp 5144, respectively to adjust the relative positioning of the pipes based on the instructions from the one or more processors 5140. In one embodiment, the adjustment of the relative positioning of the pipes 1022*a*, 1022*b* is achieved without disengaging the first pipe engagement structure 5144 from the interior surface 5132 of the first pipe 1022*b* and without disengaging the second pipe engaging structure 5142 from the interior surface 5130 of the second pipe 1022*a*. This can be done because the rotation motors 5030 and 5074 are configured to rotate the pipes 1022*a*, 1022*b* without disengaging the pipe engagement structures 5144, 5142 as described in this application.

In one embodiment, as shown in FIGS. 23, 24 and 30, the front clamp 5142 generally includes a piston 5084, a cylinder 5086, a bushing 5088, clamp shoe pin members 5090, link members 5092, a shaft 5094, a hub 5096, a front bearing 5098, a spider member 5100, a bell housing 5102, a front plate 5104, a rear plate 5106, a rear bearing 5108, and a sleeve 5110. In one embodiment, the rear bearing 5108 and the front bearing 5098 are configured to support the rotatable hub 5078. In one embodiment, the rear clamp 5144 has the same structure, configuration and operation as described above with respect to the front clamp 5142 and hence the structure, configuration and operation of the rear clamp 5144 will not be described in detail here.

In one embodiment, the front clamp 5142 is configured to clamp one of the pipes 1022*a*, 1022*b* and the second clamp 5144 is configured to clamp the other of the pipes 1022*a*, 1022*b*. In one embodiment, one of the clamps 5142, 5144 may be referred to as a first clamp and the other of the clamps 5142, 5144 may be referred to as the second clamp. In one embodiment, the clamps 5142, 5144 of the internal weld system 5004 may either individually or together be referred to as the brake system of the internal weld system 5004 that secures the frame of the internal weld system 5004 at a desired location within the pipes 1022*a*, 1022*b*. In one embodiment, the front and rear clamps 5142, 5144 are radially extending clamps that engage the interior surface 5130, 5132 of the pipes 1022*a*, 1022*b*, respectively to secure the frame of the internal weld system 5004 from movement. The operation of the front and rear clamps 5142 and 5144 will be discussed in detail below.

In one embodiment, the internal weld system 5004 includes the first pipe engagement structure 5052, the second pipe engagement structure 5054, the inspection detector 5056, the one or more processors 5140; and the weld torch 5502. In one embodiment, the inspection detector 5056, the inspection camera 5112, the weld torch 5502 and the weld head assembly 5500 are rotatably mounted on the rotatable hub 5078. The structure, configuration and operation of each of the first pipe engagement structure 5052, the second pipe engagement structure 5054, the inspection detector 5056, the inspection camera 5112, the weld torch 5502 and the weld head assembly 5500 are described in detail with respect to the FIGS. 30 and 33-59 and their related descriptions.

FIGS. 32A and 32B show detailed side and top views of the drive section 5010 of the internal weld system 5004. In one embodiment, the drive section 5010 of the internal weld system 5004 includes the shield gas tanks 5114, batteries 5116, drive section electronics module 5118, pneumatic valves 5120, drive wheels or rollers 5122, drive motors 5124, brakes 5126 and the compressed air tank 5128. In one embodiment, the pneumatic valves 5120 include a brake valve 5190 and a drive wheel valve 5192 (both shown in FIG. 70). In one embodiment, the drive section 5010 of the internal weld system 5004 includes drive section frame 5278. In one embodiment, the drive section frame 5278 may be made from steel or any other material as would be appreciated by one skilled in the art.

In one embodiment, the drive section electronics module 5118 may include the one or more processors 5140. In one embodiment, the pneumatic valves 5120 (the brake valve 5190 and the drive wheel valve 5192), and the drive motors 5124 may be operatively connected to the one or more processors 5140.

In one embodiment, the drive section 5010 may be connected to the center section 5008 via a universal joint 5123 and spring members 5125.

In one embodiment, the shield gas tanks 5114 are constructed and arranged to hold the shield gas required for the weld torches 5502. In one embodiment, the hoses are constructed and arranged to connect the shield gas tanks 5114 to the rear rotary union 5072 in the center section 5008.

In one embodiment, the batteries 5116 are Lithium ion batteries. In one embodiment, the batteries 5116 are configured to power all of the electronics as well as the electric drive motors 5124 of the internal weld system 5004. For example, in one embodiment, the batteries 5116 are configured to power the center section electronics module 5064, the forward-most section electronics module 5014, the drive section electronics module 5118 and the weed feed electronics module 5046. In one embodiment, the batteries 5116 may be operatively connected to the one or more processors 5114.

In one embodiment, the batteries 5116 are also configured to power the radial weld torch motor 5512, the tilt weld torch motor 5588, the axial weld torch motor 5550, the motors of the wire feed systems 5044, the front and rear rotation motors 5030 and 5074, and the drive motors 5124. In one embodiment, the batteries 5116 are not configured to supply to weld power. In one embodiment, the batteries 5116 are configured to deliver power to just the drive section electronics module 5118 and the drive motors 5124, while the power to the rest of the motors and the electronic modules of the internal weld system 5004, including the radial weld torch motor 5512, the tilt weld torch motor 5588, the axial weld torch motor 5550, the motors of the wire feed systems 5044, the front and rear rotation motors 5030 and 5074, the center section electronics module 5064, the forward-most section electronics module 5014, and the weed feed electronics module 5046, is supplied from an external power source via the reach rod/umbilical 5034.

In one embodiment, the drive motors 5124 are configured to drive the rollers or wheels 5122 to move the frame assembly (including the first pipe engagement structure 5052, the second pipe engagement structure 5054, the weld torch(es) 5502 and the inspection detector 5056) of the internal weld system 5004, from the first end of the pipe 1022*a*, 1022*b* to the second end of the pipe 1022*a*, 1022*b* along an interior 5130, 5132 of the pipe 1022*a*, 1022*b*. In one embodiment, the drive motors 5124 of the drive section 5010 are configured to move the frame of the internal weld system 5004 down the pipeline 1004 after each weld is completed. In one embodiment, the drive motors 5124 of the drive section 5010 are configured to both accelerate and decelerate the internal weld system 5004 in the pipeline 1004.

In one embodiment, the power source is carried by the frame assembly of the internal weld system 5004 and is configured to power the drive motors 5124. In one embodiment, the drive motors 5124 of the drive section 5010 are electrically powered. In one embodiment, the drive motors 5124 of the drive section 5010 are powered by the batteries 5116.

In one embodiment, the drive rollers 5122 are configured to engage the interior surfaces 5130, 5132 of one or more of the pipes 1022*a*, 1022*b*. In one embodiment, the drive rollers 5122 are operatively connected to the drive motors 5124 of the drive section 5010. In one embodiment, the drive rollers 5122 is configured to be actuated by a pneumatic cylinder 5137 that is operatively associated with the pneumatic valves 5120 to receive the compressed air from the compressed air tank 5128. In one embodiment, the drive rollers 5122 are made of an elastomeric material or a rubber material.

In one embodiment, the drive rollers 5122 are configured to enable the movement of the internal weld system 5004 down the pipeline 1004 after each weld is completed. In one embodiment, the internal weld system 5004 may include a plurality of drive rollers 5122 that are configured to rotatably support the frame or frame assembly of the internal weld system 5004. For example, in one embodiment, the internal weld system 5004 includes four active drive wheels. That is, two drive wheels on each side that are 180° apart. In one embodiment, the number of drive wheels may vary. In one embodiment, the drive rollers 5122 may include treads thereon to increase their traction when the internal weld system 5004 is driving through the pipeline.

In one embodiment, two of the four drive rollers 5122 may be directly connected to and driven by their respective drive motors 5124. In one embodiment, the other two drive rollers 5122 may be connected to the motor driven drive wheels by chains 5111 and are driven by the motor driven drive wheels.

In one embodiment, the drive rollers 5122 are constructed and arranged for driving the weld system 5004 inside the pipes 1022*a*, 1022*b* until the weld system 5004 is at the desired location. In one embodiment, the drive rollers 5122 are constructed and arranged to be pressed against the inside of the pipe by a pneumatic cylinder.

In one embodiment, the brake 5126 is configured to be actuated by a pneumatic cylinder 5133 that is operatively associated with the pneumatic valves 5120 to receive the compressed air from the compressed air tank 5128. In one embodiment, the brake 5126 of the internal weld system 5004 is for emergency use. For example, the brake 5126 can be used in case the drive motors 5124 of the drive section 5010 fail to decelerate the internal weld system 5004 for some reason. For example, the brake 5126 may be applied on hillsides to keep the internal weld system 5004 from rolling deep into the pipeline 1004 or falling out of the pipe depending on slope direction. In one embodiment, the brake 5126 is configured to be either manually or automatically controlled.

In one embodiment, the brake 5126 may also be used to secure the frame of the internal weld system 5004 in place within the pipes during the welding procedure, the pre-weld scan procedure and/or the post weld scan procedure. For example, the brake 5126 may be configured to secure the frame of the internal weld system 5004 from movement at a desired location within the pipes during the welding procedure, the pre-weld scan procedure and/or the post weld scan procedure.

In one embodiment, the compressed air tank 5128 is constructed and arranged to hold the air for operating the brake 5126, the drive rollers 5122, and the front and the rear clamps 5142, 5144. In one embodiment, the compressed air tank 5128 is constructed and arranged to be connected to the umbilical 5034 through both the front and rear rotary unions 5032, 5072 so that compressed air tank 5128 may be refilled as needed.

In one embodiment, the pneumatic valves 5120 are constructed and arranged to control air to the two pneumatic cylinders that are configured to engage and operate the brake 5126 and the drive rollers 5122, respectively.

In one embodiment, the drive section electronics module 5118 is configured to allow the transmission of the communication signals upstream to the center section electronics module 5064. In one embodiment, the drive section electronics module 5118 is also configured to control the drive motors 5124 and the two pneumatic valves 5120.

In one embodiment, the one or more processors 5140 are configured to operate the drive motors 5124 to move the frame of the internal weld system 5004 through at least one of the pipes 1022*a*, 1022*b* until the sensor 5352 detects the interface region 5136 between the pipes 1022*a*, 1022*b*. In one embodiment, the one or more processors 5140 are configured to operate the brake system of the internal weld system 5004 to secure the frame of the internal weld system 5004 from movement at a location within the pipes 1022*a*, 1022*b* that positions the inspection detector 5056 in relation to the interface region 5136 to enable the inspection detector 5056 to detect the profile of the interface region 5136 between the pipes 1022*a*, 1022*b*.

Figure 33:
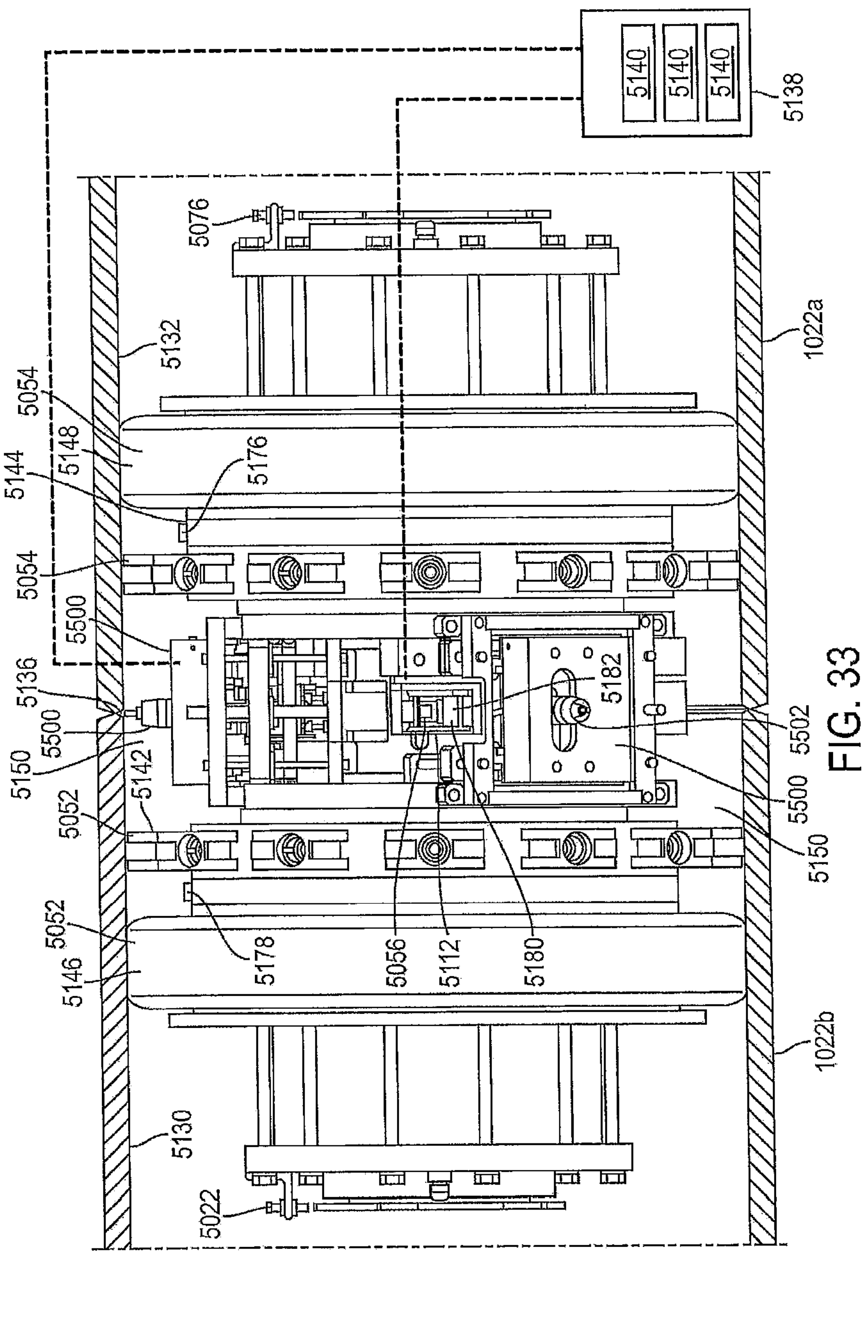
FIG. 33 shows a view of the center section of the internal weld system being positioned inside the pipe segments, where both clamps and seals are engaging the inner surfaces of the pipes, and where some components of the center section are not shown for sake of clarity, in accordance with an embodiment of the present patent application.

FIG. 33 shows a view of the center section 5008 of the internal weld system 5004 being positioned inside the pipe segments 1022*a*, 1022*b*, where some components of the center section 5008 are not shown for sake of clarity. For example, the front and rear clamps 5142, 5144, the rotatable hub 5078, the weld head assembly 5500, the inspection detector 5056 and the inspection camera 5112 are shown in FIG. 33.

In one embodiment, the field system 5000 for welding two pipes includes a computer system 5138 for facilitating pipe welding. In one embodiment, the computer system 5138 includes the one or more processors 5140 that are communicatively connected to the weld system 5004. In one embodiment, the computer system 5138 and its one or more processors 5140 may be communicatively connected to the weld system 5004 (and one or more components thereof) via one or more wired or wireless communication links. As an example, the wired communication links may comprise one or more Ethernet links, coaxial communication links, Fiber Optic communication links, or other wired communication links. As another example, the wireless communication links may comprise one or more Wi-Fi communication links, Bluetooth communication links, near-field communication (NFC) communication links, cellular communication links, or other wireless communication links. In one embodiment, one or more components of the weld system 5004 may be communicatively connected to one another via one or more of the foregoing wired or wireless communication links. In one embodiment, it may be advantageous to utilize one or more wireless communications links to enable the one or more processors 5140 or one or more components of the weld system 5004 to communicate with one another to reduce the number of communication cables in the weld system 5004 to reduce potential entanglement of the cables that could delay operations or damage other components of the weld system 5004. For example, by reducing the number of communication cables in the weld system 5004 in some embodiments may reduce potential entanglement of the cables during rotation of an inspection device (e.g., inspection laser, inspection camera, or other inspection device), a weld torch, or other component of the weld system 5004.

In one embodiment, the computer system 5138 and its one or more processors 5140 may be positioned in the field system 5000. In another embodiment, the computer system 5138 and its one or more processors 5140 may be positioned remotely from the field system 5000. In one embodiment, the one or more processors 5140 may include a digital processor, an analog processor, a digital circuit designed to process information, an analog circuit designed to process information, a state machine, and/or other mechanisms for electronically processing information.

It should be appreciated that the "one or more processors" as disclosed herein may constitute a single processor that is located on-board and local to the particular system or component being discussed, off-board and local to the particular system or component being discussed, or remotely located to the particular system or component being discussed. In addition, the connection with the one or more processors can be wired or wireless. Further, the "one or more processors" may also refer to a plurality of processors that are on-board and local, a plurality of processors that are off-board and local, a plurality of processors that are remote, or any combination of on-board (and local), off-board (and local), and remote processors. In referring to on-board processors, such processors refer to processors that are carried physically (i.e., physically connected, and move with) by the particular system or component. In referring to off-board processors, these refer to processors that are local to a job-site and communicate wirelessly with on-board electronics. Off-board processors can also refer to electronics that are tethered to the on-board system (e.g., through a reach rod), and are local to the job site. Seen in another light, if the processor moves with the reach rod, it may also be considered an "on-board" processor.

In one embodiment, the first pipe engagement structure 5052 is configured to engage an interior surface 5130 of the first pipe 1022*a* to enable the first pipe engagement structure 5052 to be fixed relative to the first pipe 1022*a*. In one embodiment, the second pipe engagement structure 5054 is configured to engage an interior surface 5132 of the second pipe 1022*b* to enable the second pipe engagement structure 5054 to be fixed relative to the second pipe 1022*b*.

In one embodiment, the inspection detector 5056 is positioned between the first pipe engagement structure 5052 and the second pipe engagement structure 5054 and is configured to emit an inspection beam of radiation. In one embodiment, an inspection detector motor is operatively associated with the inspection detector 5056 to direct the inspection beam of radiation along the interface region 5136 between the pipes 1022*a*, 1022*b*. In one embodiment, the front and rear rotation motors 5030 and 5074 may individually or together be referred to as the inspection detector motor. In one embodiment, the front and rear rotation motors 5030 and 5074 are configured to rotationally move the inspection detector 5056 along the interface region 5136. In one embodiment, the inspection detector 5056 is configured to generate signals based upon a profile of the interface region 5136 between the pipes 1022*a*, 1022*b*. In one embodiment, the interface region 5136 is an annular interface region. In one embodiment, the interface region 5136 is in the interior of the pipes 1022*a*, 1022*b* at regions of the pipes 1022*a*, 1022*b* adjacent to where the weld would go.

The term "interface region" as used herein refers to the interior surfaces of the pipes to be welded in the area, and optionally in the adjacent vicinity, where the weld material is to be deposited. The interface region includes at least a portion, or optionally the entirety, of the internal bevel of both pipes to be welded, if such bevels are provided. In one embodiment, the interface region includes the entirety of the beveled surfaces and also extends beyond the beveled surface, if bevels are provided.

In one embodiment, the wheels 5028 on the forward-most section 5006 of the internal weld system are constructed and arranged to keep the clamps from dragging on the inner surfaces of the pipe. The less the wheels 5028 extend out, the easier the internal weld system fits through the pipe bends. In one embodiment, the wheels 5028 may be adjustable. In one embodiment, the wheels 5028 may not be adjustable. In one embodiment, the sprung or toe wheels 5066 (as shown in FIG. 23) at the rear clamp 5144 and the adjustable wheels 5276 (as shown in FIG. 32A) at the back of the drive section 5008 are constructed and arranged so that the clamp centerline is about 0.25 inches below the pipe centerline. With this configuration, when the clamps expand against the inner surfaces of the pipe, the expander picks the clamp up off of the wheels rather than compress the wheels into the pipe's inner walls In some embodiments, the "pipe engagement structure" comprises a clamp that securely engages a pipe surface. The clamp, for example, can include one or more shoes or other support structure configured to fixedly engage with a pipe surface so as to prevent movement thereof. In another embodiment, the "pipe engagement structure" comprises a seal that sealingly engages the interior surface of a pipe so as to inhibit gas from passing therethrough. Such seal may comprise, for example, an inflatable bladder, a resilient structure, or other engineered structure that engages the interior pipe surface to inhibit gas from passing therethrough. Such seal can be used in a purging operator to remove oxygen from a region in the pipe to be welded, so as to prevent or reduce oxidation as a result of the welding process. In yet another embodiment, the pipe engagement structure comprises a combination of a clamp and a seal, or one or more clamps and/or one or more seals.

In one embodiment, the first pipe engagement structure 5052 includes the first clamp 5142 and the second pipe engagement structure 5054 includes the second clamp 5144.

In one embodiment, the first pipe engagement structure 5052 includes a first seal 5146 and the second pipe engagement structure 5054 includes a second seal 5148.

In one embodiment, the second seal 5148 and the second clamp 5144 may be referred to as the rear seal 5148 and the rear clamp 5144, respectively. In one embodiment, the first seal 5146 and the first clamp 5142 may be referred to as the front seal 5146 and the front clamp 5142, respectively.

In one embodiment, the first pipe engagement structure 5052 includes the clamp 5142 and the second pipe engagement structure 5054 includes the seal 5148. In one embodiment, the first pipe engagement structure 5052 includes the seal 5146 and the second pipe engagement structure 5054 includes the clamp 5144.

In one embodiment, the first pipe engagement structure 5052 includes the clamp 5142 and the seal 5146 and the second pipe engagement structure 5054 includes the clamp 5144 and the seal 5148. In one embodiment, the first pipe engagement structure 5052 includes the clamp 5142 and the seal 5146 and the second pipe engagement structure 5054 includes the clamp 5144. In one embodiment, the first pipe engagement structure 5052 includes the clamp 5142 and the seal 5146 and the second pipe engagement structure 5054 includes the seal 5148. In one embodiment, the first pipe engagement structure 5052 includes the clamp 5142 and the second pipe engagement structure 5054 includes the clamp 5144 and the seal 5148. In one embodiment, the first pipe engagement structure 5052 includes the seal 5146 and the second pipe engagement structure 5054 includes the clamp 5144 and the seal 5148.

In the configuration where there is a seal on one side of the inspection detector 5056 and the inspection camera 5112 and a clamp of the other (opposite) side of the inspection detector 5056 and the inspection camera 5112, a high pressure purge gas is sent into a region between the clamp and the seal. The purge gas from the region between the clamp and the seal may leak through the slight gap between the pipes about to be welded and may also be exhausted from the pipes on the side of the inspection detector 5056 and the inspection camera 5112 where there is no seal and has just the clamp. This optional configuration prevents the over pressurization of the region between the clamp and the seal (e.g., in comparison with arrangements having two seals, one on either side of the inspection detector 5056 and the camera 5112), without the provision of a regulator to regulate pressure with the purge gas region, and/or a separate over pressurization relief valve for the region between the clamp and the seal. The continuous supply of the high pressure purge gas into the region between the clamp and the seal is configured to reduce the oxygen in a region in the vicinity of the weld torch during a welding operation.

In another embodiment, the first and the second seals may optionally have openings therethrough to prevent over pressurization of the purge gas chamber formed between the first and the second seals. In another embodiment, one or both of the seals, where an inflatable seal bladder is provided for the seal, may be partially inflated to provide a predefined or calculated gap therearound to allow flow out of the purge area at a desired rate.

Where two purge seals 5146, 5148 are provided, inert gas is introduced into the purge chamber therebetween. It should be understood, however, that the purge seals 5146, 5148 need not (and typically do not) create a perfect seal. Inert gas is leaked, for example, through the gap between the two pipes **1022*a*, 1022*b* being welded. The inert purge gas may also leak around the seals 5146, 5148, which need not be perfect. Of course, during the welding operation, the gap between the pipes 1022*a*, 1022*b* is slowly closed and sealed. As a result, the pressure within the purge chamber between the pipes 1022*a*, 1022*b* may rise as the weld between the pipes 1022*a*, 1022*b* is created. As such, the pressure sensor provided within the purge chamber detects the pressure within the purge chamber and generates signals to the one or more processors 5140, which in turn communicates with one or more valves and/or one or more regulators, so as to control or regulate the purge gas pressure within the purge chamber to prevent over-pressurization. Over-pressurization within the purge chamber would apply a greater than desired outwardly directed gas force through the gap between the pipes to be welded and potentially alter a desired outcome of the weld. In a different embodiment, only a single seal 5146, 5148** is provided to create a purge chamber that is sealed on only one side. This arrangement still provides a reasonable purge chamber, which is largely devoid of oxygen, and also prevents any possibility of over-pressurization. In such embodiment, inert purge gas will leak not only from the gap between the pipes, but also through an end of the pipe that is not sealed, and hence may consume more gas in comparison with the double sealed embodiment.

In one embodiment, the inspection detector 5056 and the inspection camera 5112 are configured to be positioned axially (with respect to the pipe axis) between the first clamp 5142 and the second seal 5148. That is, the first clamp 5142 and the second seal 5148 are each positioned on axially opposite sides of the inspection detector 5056 and the inspection camera 5112.

In one embodiment, the inspection detector 5056 and the inspection camera 5112 are configured to be positioned axially (with respect to the pipe axis) between the first seal 5146 and the second clamp 5144. That is, the first seal 5146 and the second clamp 5144 are each positioned on axially opposite sides of the inspection detector 5056 and the inspection camera 5112.

In one embodiment, the inspection detector 5056 and the inspection camera 5112 are configured to be positioned axially (with respect to the pipe axis) between the first clamp 5142 and the second clamp 5144. That is, the first clamp 5142 and the second clamp 5144 are each positioned on axially opposite sides of the inspection detector 5056 and the inspection camera 5112.

In one embodiment, the inspection detector 5056 and the inspection camera 5112 are configured to be positioned axially (with respect to the pipe axis) between the first seal 5146 and the second seal 5148. That is, the first seal 5146 and the second seal 5148 are each positioned on axially opposite sides of the inspection detector 5056 and the inspection camera 5112.

In one embodiment, the inspection detector 5056 and the inspection camera 5112 are configured to be positioned axially (with respect to the pipe axis) between the first seal 5146, the first clamp 5142, the second clamp 5144 and the second seal 5148. That is, the first seal 5146 and the first clamp 5142 are positioned axially on one side of the inspection detector 5056 and the inspection camera 5112 and the second clamp 5144 and the second seal 5148 are positioned axially on the other side of the inspection detector 5056 and the inspection camera 5112.

In one embodiment, the inspection detector 5056 and the inspection camera 5112 are configured to be positioned axially (with respect to the pipe axis) between the first seal 5146, the first clamp 5142 and the second seal 5148. That is, the first seal 5146 and the first clamp 5142 are positioned axially on one side of the inspection detector 5056 and the inspection camera 5112 and the second seal 5148 is positioned axially on the other (opposite) side of the inspection detector 5056 and the inspection camera 5112.

In one embodiment, the inspection detector 5056 and the inspection camera 5112 are configured to be positioned axially (with respect to the pipe axis) between the first seal 5146, the second seal 5148 and the second clamp 5144. That is, the second seal 5148 and the second clamp 5144 are positioned axially on one side of the inspection detector 5056 and the inspection camera 5112 and the first seal 5146 is positioned axially on the other (opposite) side of the inspection detector 5056 and the inspection camera 5112.

In one embodiment, the inspection detector 5056 and the inspection camera 5112 are configured to be positioned axially (with respect to the pipe axis) between the first seal 5146, the first clamp 5142 and the second clamp 5144. That is, the first seal 5146 and the first clamp 5142 are positioned axially on one side of the inspection detector 5056 and the inspection camera 5112 and the second clamp 5144 is positioned axially on the other (opposite) side of the inspection detector 5056 and the inspection camera 5112.

In one embodiment, the inspection detector 5056 and the inspection camera 5112 are configured to be positioned axially (with respect to the pipe axis) between the first clamp 5142, the second seal 5148 and the second clamp 5144. That is, the second seal 5148 and the second clamp 5144 are positioned axially on one side of the inspection detector 5056 and the inspection camera 5112 and the first clamp 5142 is positioned axially on the other (opposite) side of the inspection detector 5056 and the inspection camera 5112.

In one or more embodiments, because the inspection detector 5056 is positioned between the clamps 5142, 5144, it is able to extract profile data from between the clamps 5142, 5144 after the clamps 5142, 5144 have been clamped in place. As such the inspection detector 5056 can continue to scan and detect the profile of the interface region 5136 during a welding operation. This is beneficial for some applications, as the interface region 5136 may change slightly as the two pipes 1022*a*, 1022*b* are being welded, as the welded connection itself may change the interface region 5136 in other areas that have not been welded yet. Hence, the inspection detector 5056 allows for a detection and determination of any change in one or more characteristics of the interface region 5136 on-the-fly, or in "real time" at regions of the interface region 5136 about to be welded. In addition, because the inspection detector 5056 is positioned between the clamps 5142, 5144, it is able to extract pre-weld profile data from the interface region 5136 after the clamping force is applied by the clamps 5142, 5144. The clamping force of the clamps 5142, 5144 themselves may alter the interface region 5136. For example, the clamping force may slightly alter the distance between the pipe ends and/a relative height displacement between the pipe ends at certain (or all) regions of the interface region 5136. In addition, the clamping force applied by the clamps 5142, 5144 may change a roundness of one or both of the pipes (e.g., the first clamp may alter the roundness of the first pipe to be welded and/or the second clamp may alter the roundness of the second pipe to be welded. In one embodiment, for example, the clamp shoes for any one of the clamps 5142, 5144 are symmetrically provided and evenly circumferentially spaced about the interior of the pipe being engaged. In addition, the outermost surface of each clamp shoe may be equally spaced from the central axis of the clamp. The spacing of each clamp shoe can be set to be slightly larger than the inner diameter of the pipe. In that way, if each clamp shoe is extended to its maximum position, the clamping force of the clamp 5142, 5144 can be used to change the shape of a slightly out of round pipe to one that is more rounded. Until the fully clamping force is applied by both clamps 5142, 5144, the profile of the interface region 5136 is not yet fully determined because of the shape changing possibility. The inspection detector 5136 describe herein can be used to determine the profile after clamping has been applied.

In one or more embodiments, because the inspection detector 5056 and/or camera 5112 is positioned between the two seals, the inspection detector 5056 and/or camera 5112 are able to extract profile data from between the seals 5146, 5148 after the seals 5146, 5148 have been engaged with the interior surfaces 5130, 5132 of the pipes 1022*a*, 1022*b* to be welded. As such the inspection detector 5056 can continue to scan and detect the profile of the interface region 5136 before, during and/or after a welding operation in which the regions between the seals 5146, 5148 have been provided or filled with a purge gas. This is beneficial for some applications, as the interface region 5136 may be inspected by the inspection detector 5056 and/or camera 5112, before, during, and/or after a welding operation without breaking the seal 5146, 5148. If, for example, the inspection detector 5056 and/or camera 5112 (together with the one or more processors 5140) determine(s) that a slight modification to the weld, or an additional welding operation is desired, such modification or additional welding operation can be accomplished without the need to reestablish the purge chamber (for example, in comparison to a contemplated arrangement in which a post-weld inspection detector and/or camera are located outside the purge chamber, and introducing the inspection detector 5056 and/or camera 5112 to inspect the welded interface region 5136 only after the purge chamber has been broken). Thus, the inspection detector 5056 can be used to scan the interface region 5136 between the pipes 1022*a*, 1022*b* to determine the profile of the interface region 5136 between the pipes 1022*a*, 1022*b* subsequent to a welding operation and generate post-weld profile data based on the scan, and this post-weld profile data can be obtained, and optionally a corrective or other additional weld can be achieved based on the post-weld profile data, without releasing the clamps 5142, 5144 and/or seals 5146, 5148.

In one embodiment, the clamps 5142, 5144 are configured to rotate. In one embodiment, the clamps 5142, 5144 are configured to rotate in opposite directions to one another.

In addition, as described herein, the present system enables relative rotation between the first clamp and the second clamp 5142, 5144, after they have been clamped to the first and second pipe interiors 5130, 5132 respectively. This can be accomplished by the one or more orientation motors 5030, 5074 operating one or both of the clamps 5142, 5144 as described herein. Such relative rotation of the pipes 1022*a*, 1022*b* can be conducted in response to pre-weld profile data determining that a better rotational match between the pipe ends is available and can be accomplished by relative rotation of one or both of the clamps 5142, 5144. Such relative rotation is accomplished without the need to unclamp the first and second clamps 5142, 5144, and while the inspection detector 5056 remains axially positioned between the clamps 5142, 5144. After the first and/or second pipe 1022*a*, 1022*b* is rotated, a new profile of the interface region 5136 exists, and the inspection detector 5056 can be again used to scan the interface region 5136 to obtain new pre-weld profile data. It should be appreciated that because neither clamp 5142, 5144 needs to be released to obtain the new pre-weld profile data, unnecessary downtime can be avoided. During the relative rotation of the pipes 1022*a*, 1022*b*, it should be appreciated that, in one embodiment, the rollers 5332 of the external cradle 5330 (6010A, 6010B) can be used (as instructed by the one or more processors 5140) to work in conjunction with the one or more clamps 5142, 5144 to effect such relative rotation.

In one embodiment, the clamps 5142, 5144 and the seals 5146, 5148 are positioned inside the pipes 1022*a*, 1022*b* to form an internal sealed region/area. In one embodiment, the clamps 5142, 5144 and the seals 5146, 5148 are configured to seal opposite sides of a seam to be welded.

In one embodiment, the clamp 5142 and the seal 5146 are activated together and the clamp 5144 and the seal 5148 are activated together. In one embodiment, the clamps 5142, 5144 and the seals 5146, 5148 are controlled by the same valve.

In one embodiment, the seals 5146, 5148 are activated with the clamp 5142. In one embodiment, the seals 5146, 5148 are activated with the clamp 5144. In one embodiment, the clamp 5142 and the seal 5146 are activated independently and the clamp 5144 and the seal 5148 are activated independently. In one embodiment, a separate seal control system may be configured to operate both the seals 5146, 5148 that is independent (and separate from) of a clamp control system that is configured to operate both the clamps 5142, 5144.

In one embodiment, the clamp 5144 is positioned relative to the end of the pipe 1022*b*. In one embodiment, the clamp 5142 and the seal 5146 are then activated together. In one embodiment, when the pipe 1022*a* is positioned relative to the pipe 1022*b*, the clamp 5144 and the seal 5148 are activated together.

Figure 35:
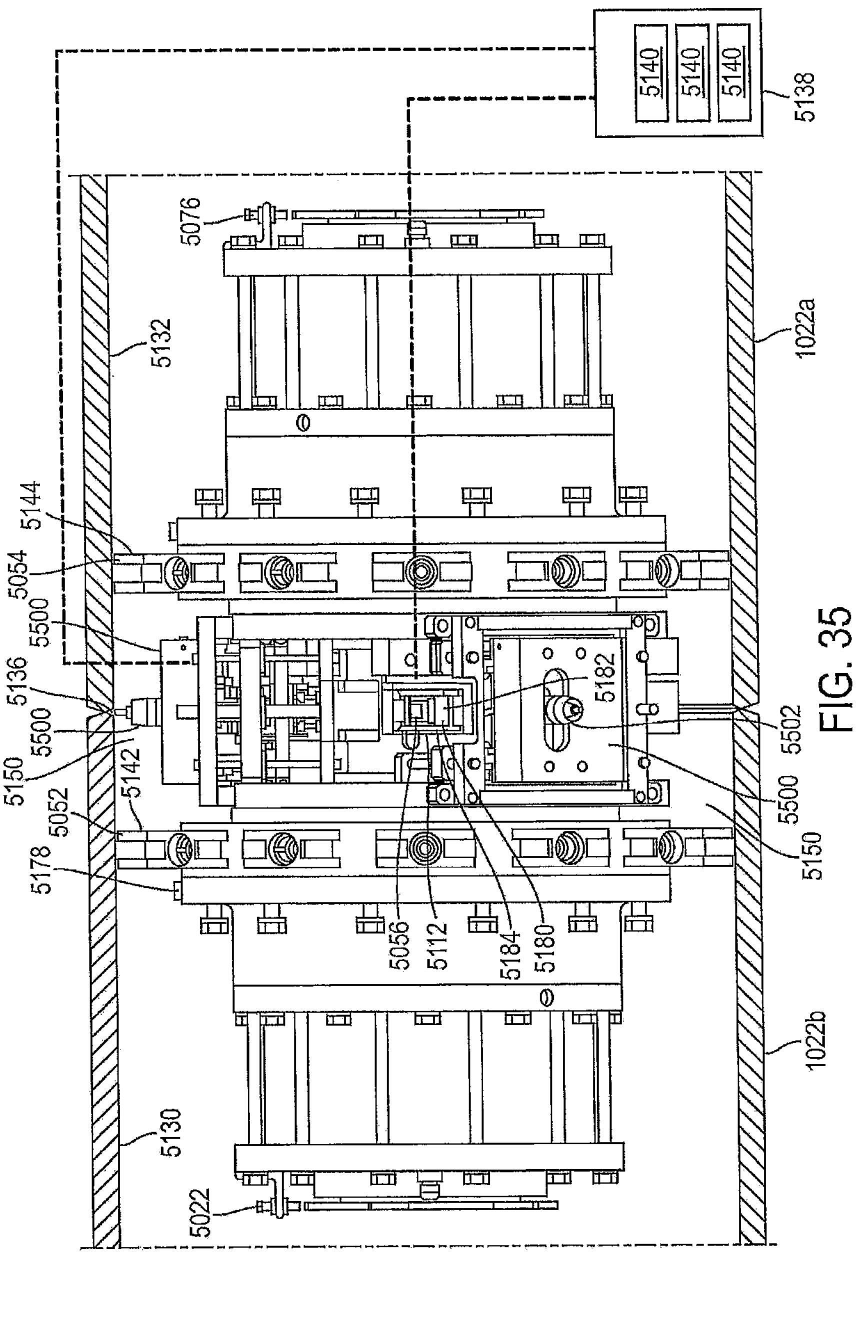
FIG. 35 shows a view of the center section of the internal weld system being positioned inside the pipe segments, where only clamps are engaging the inner surfaces of the pipes and where some components of the center section are not shown for sake of clarity, in accordance with an embodiment of the present patent application.
Figure 35A:
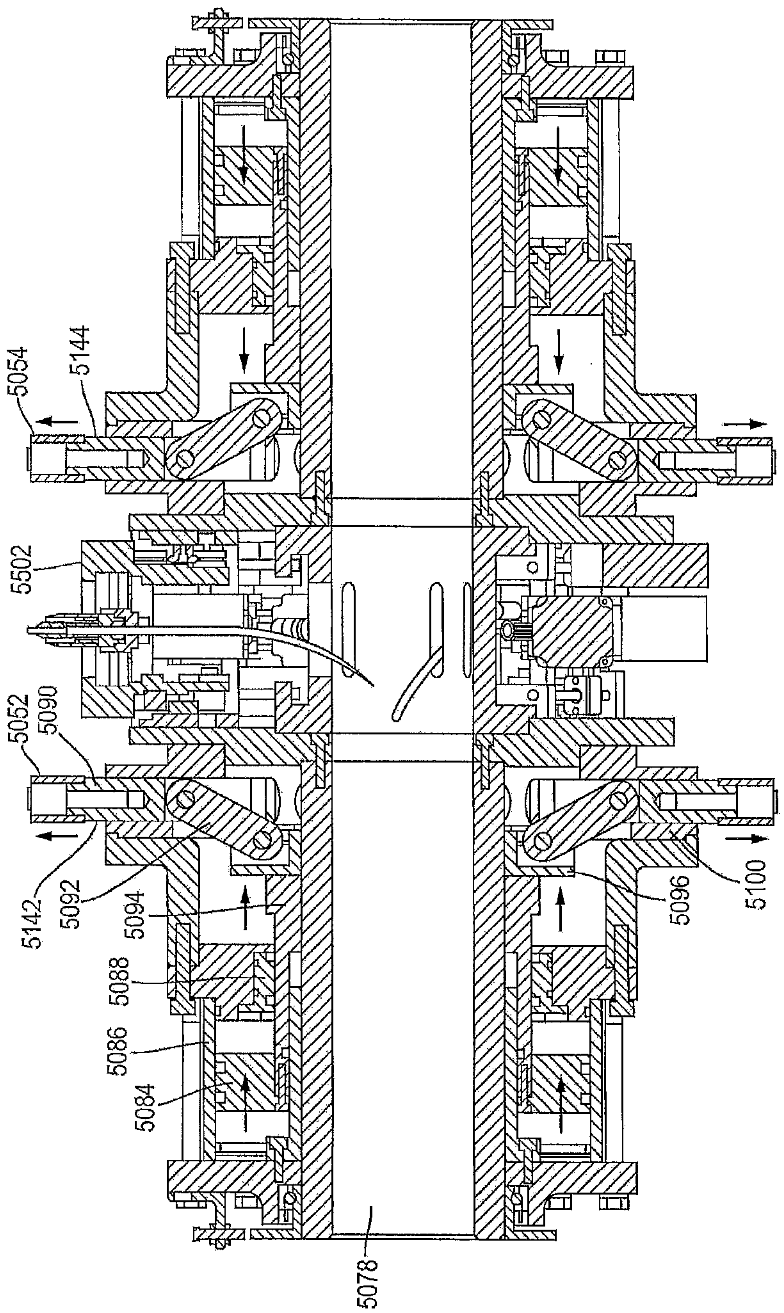
FIGS. 35A and 35B show cross-sectional views of the center section of the internal weld system, where the clamps are in their extended and retracted positions, respectively and where some components of the center section are not shown for sake of clarity, in accordance with an embodiment of the present patent application.
Figure 35B:
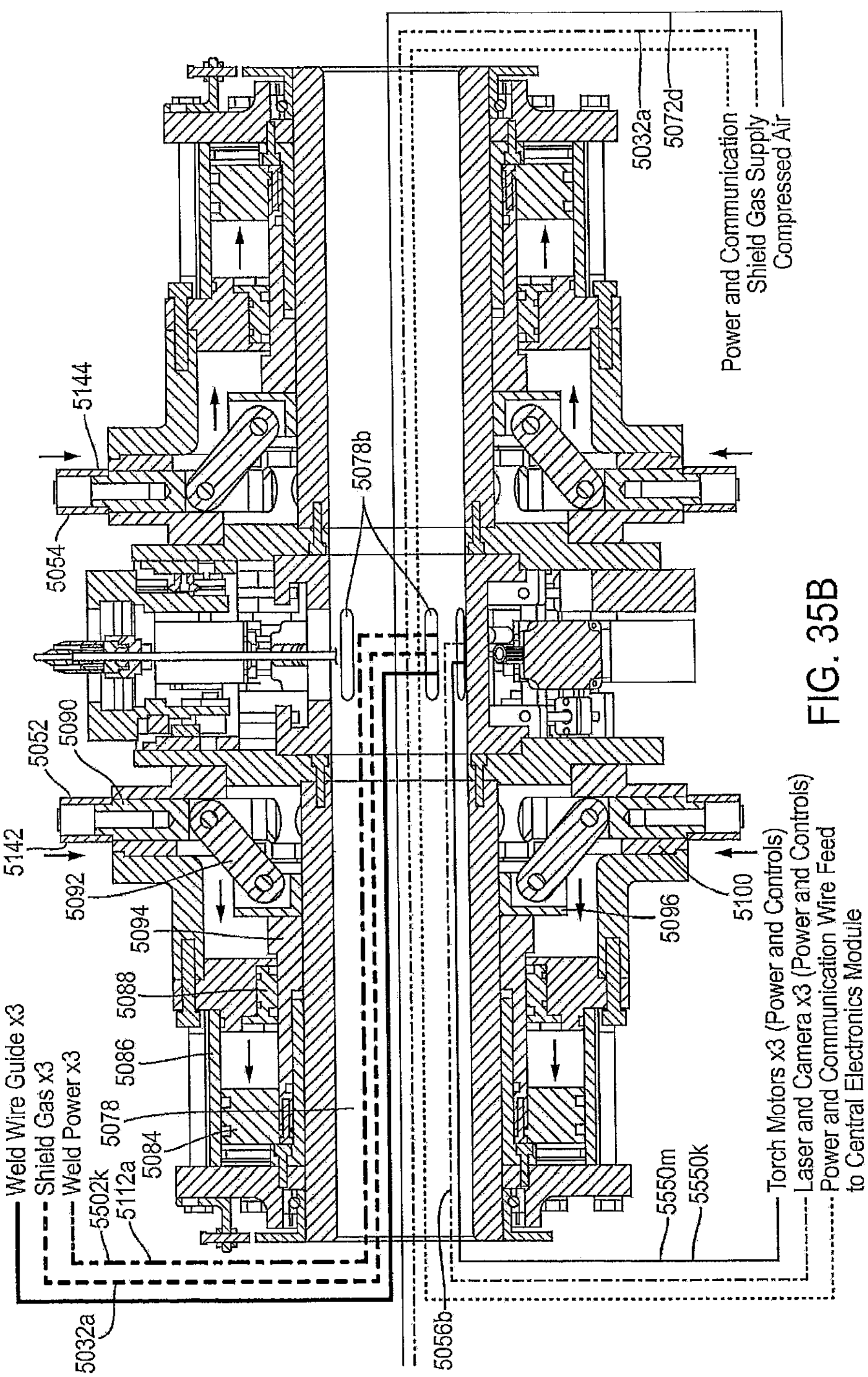

In one embodiment, the clamps 5142, 5144 are configured to be moveable between a retracted position (as shown in FIG. 35B) where the clamps 5142, 5144 are not in contact with the inner surfaces 5130, 5132 of the pipes 1022*a*, 1022*b* and an extended position (as shown in FIG. 35A) where the clamps 5142, 5144 are configured to apply clamp forces on the inner surfaces 5130, 5132 of the pipes 1022*a*, 1022*b*. In one embodiment, the clamps 5142, 5144 are constructed and arranged to engage (make contact) with the pipes 1022*a*, 1022*b* and transmit forces that grip and shape the pipes 1022*a*, 1022*b*.

Figure 34:
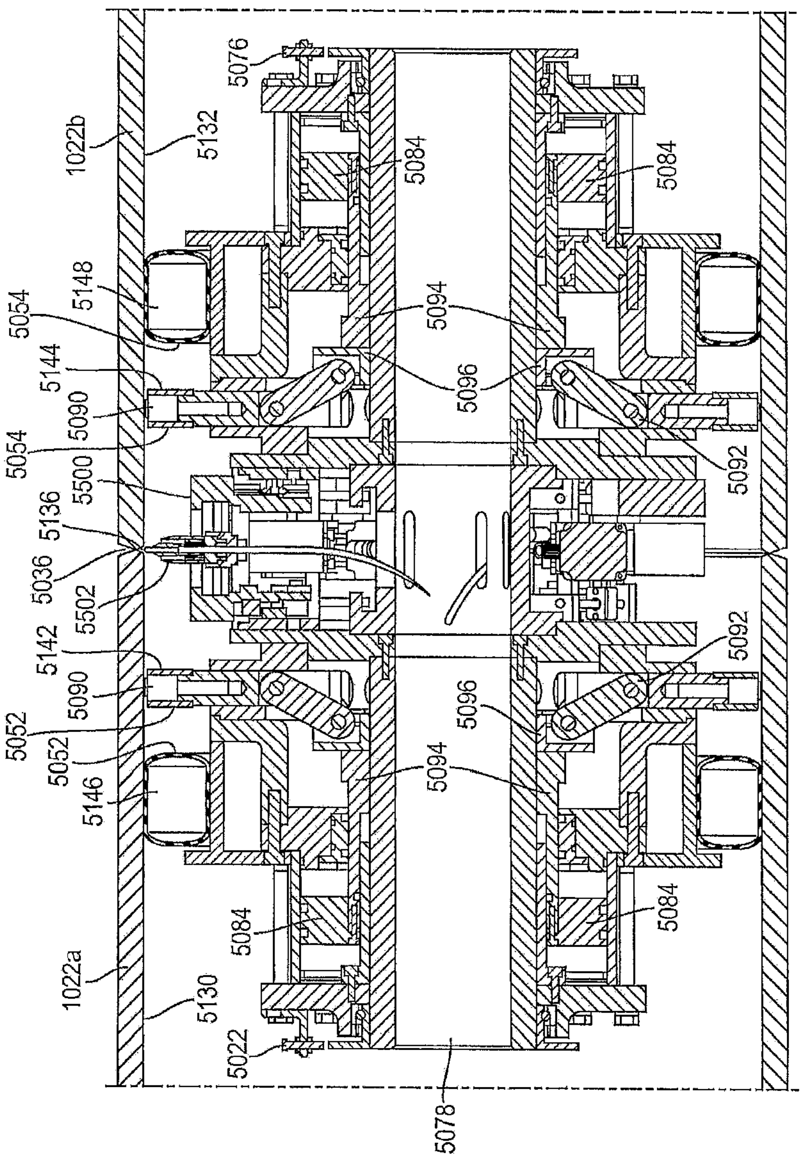
FIG. 34 shows a cross-sectional view of the center section of the internal weld system being positioned inside the pipe segments, where some components of the center section are not shown for sake of clarity, in accordance with an embodiment of the present patent application.
Figure 36:
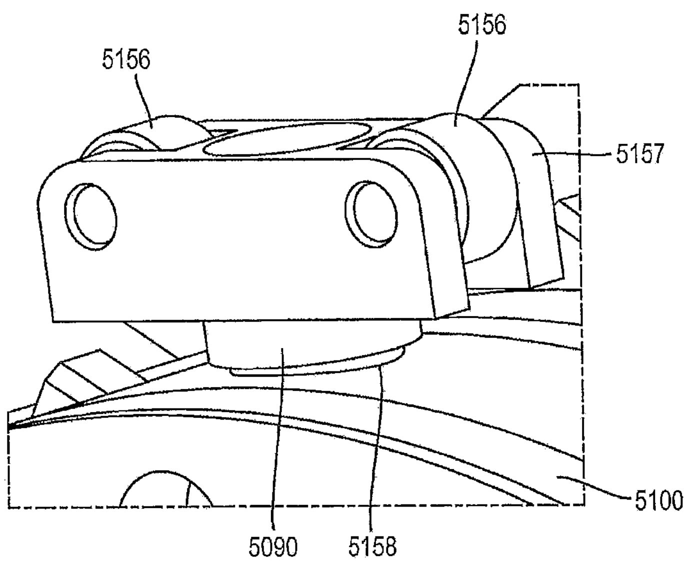
FIG. 36 shows a view of a clamp shoe of the internal weld system in accordance with an embodiment of the present patent application.
Figure 37:
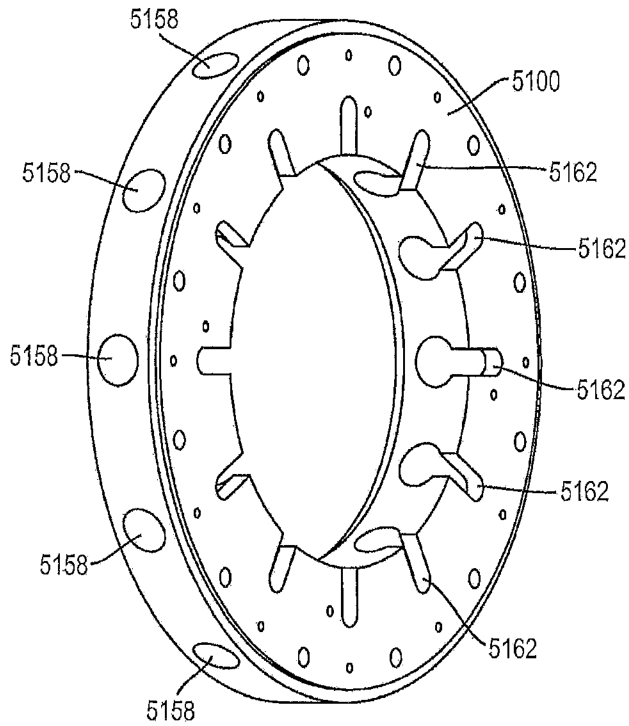
FIG. 37 shows a view of a spider member of an clamp of the internal weld system in accordance with an embodiment of the present patent application.
Figure 38:
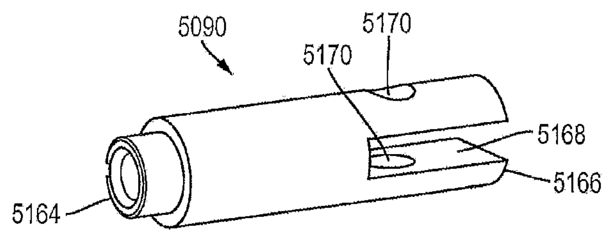
FIG. 38 shows a view of a clamp shoe pin member of the internal weld system in accordance with an embodiment of the present patent application.
Figure 39:
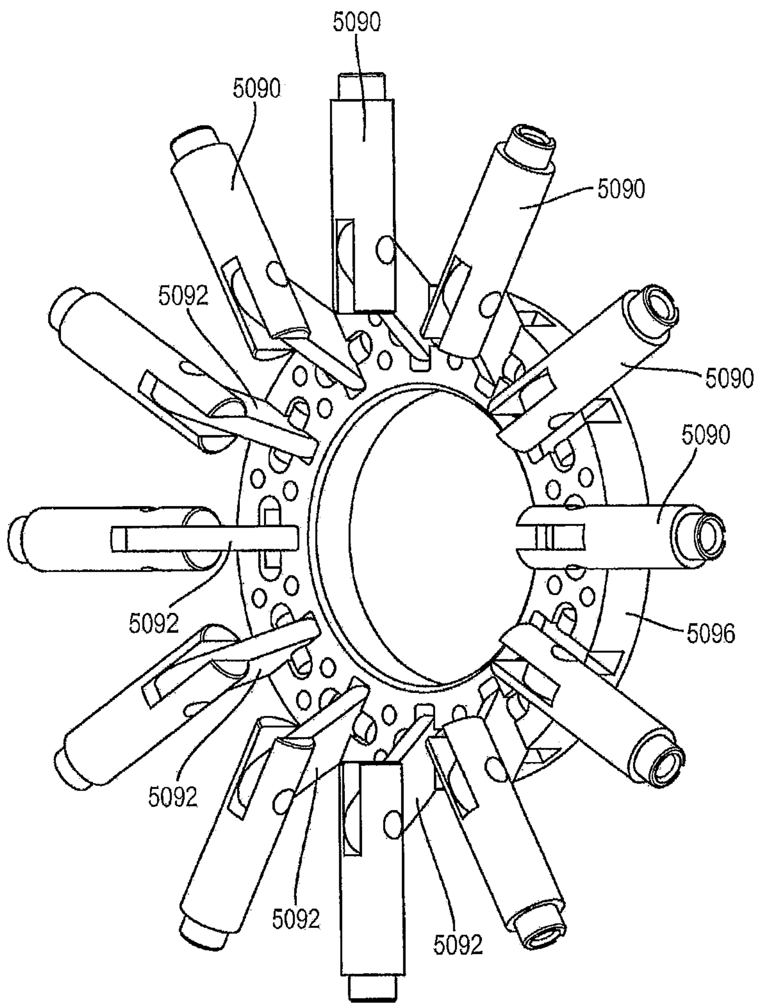
FIGS. 39 and 40 show views of a hub of the clamp of the internal weld system with the clamp shoe pin member and the link member connected thereto in accordance with an embodiment of the present patent application.
Figure 40:
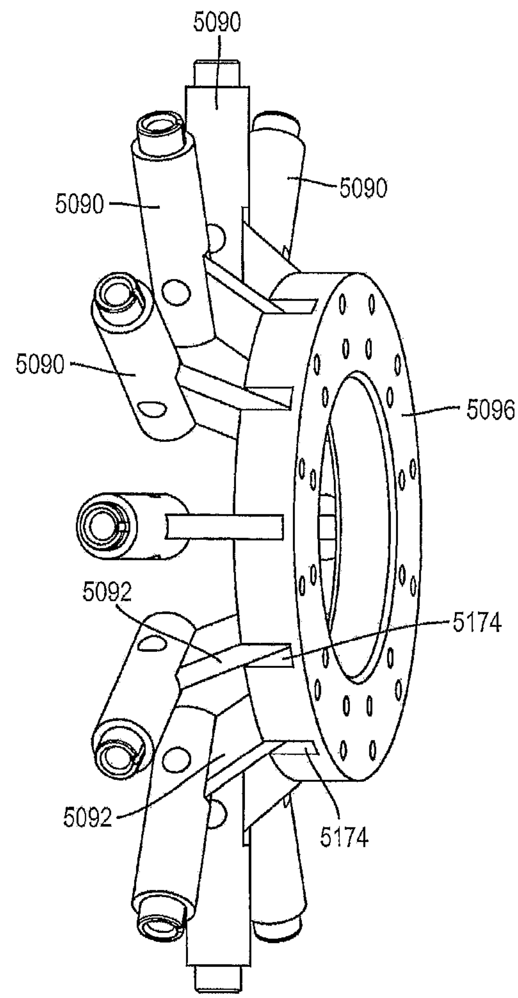

In one embodiment, the structure, configuration and operation of the clamps 5142, 5144 are shown and explained with respect to FIGS. 30, and 33-42. For example, FIGS. 33 and 34 show a perspective and a cross-sectional of the center section 5008 of the internal weld system 5004 being positioned inside the pipe segments 1022*a*, 1022*b*, where both clamps 5142, 5144 and seals 5146, 5148 are engaging the inner surfaces 5130 and 5132 of the pipes segments 1022*a*, 1022*b* and where some components of the center section 5008 are not shown for sake of clarity; FIG. 35 shows a view of the center section 5008 of the internal weld system 5004 being positioned inside the pipe segments 1022*a*, 1022*b*, where only clamps 5142, 5144 (no seals) are engaging the inner surfaces 5130 and 5132 of the pipes segments 1022*a*, 1022*b* and where some components of the center section are not shown for sake of clarity; FIG. 36 shows a perspective view of the clamp shoe 5157 attached to the clamp shoe pin member 5090 positioned in the spider member 5100; FIG. 37 shows a perspective view of the spider member 5100; FIG. 38 shows a perspective view of the clamp shoe pin member 5090; and FIGS. 39 and 40 show perspective views of the hub 5096 of the clamps 5142 or 5144 with the clamp shoe pin members 5090 and the link members 5092 connected thereto.

Figure 35C:
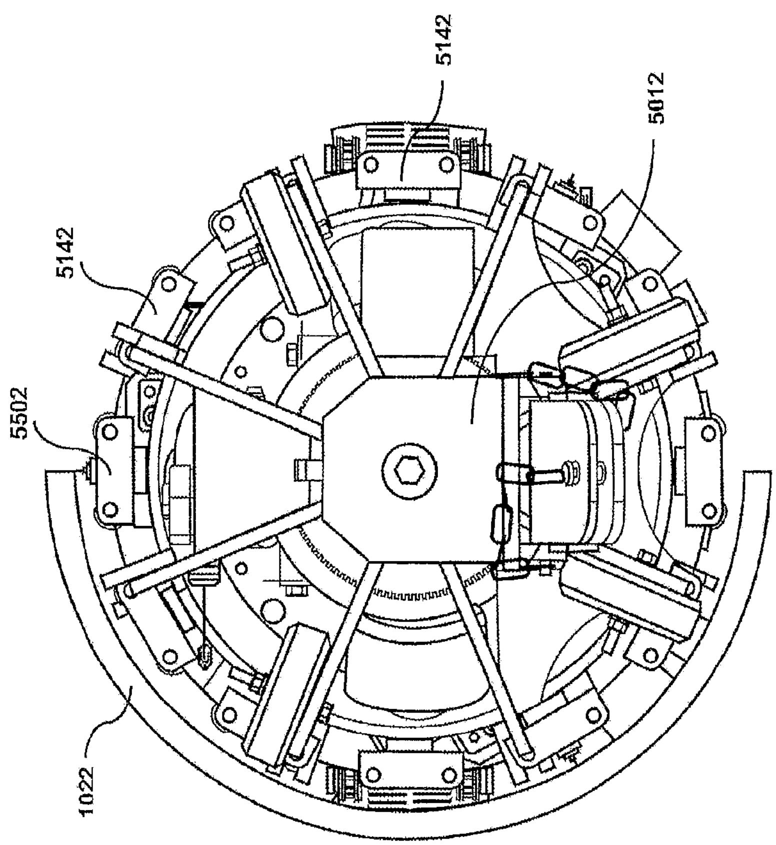
FIG. 35C shows a side (head-on) view of the internal weld system in accordance with an embodiment of the present patent application.

In one embodiment, as shown in FIG. 35C, the clamps 5142, 5144 are shown in retracted position to show how the ramps 5026, 5070 extend slightly higher. In FIG. 35C, the weld torches 5502 are shown in their extended positions. Typically, the weld torches 5502 would only be extended after the clamps 5142, 5144 are extended.

In one embodiment, referring to FIG. 36, the weld system 5004 may include a plurality of first clamp shoes 5157 circumferentially, equally spaced apart from each other on its respective spider member 5100 and a plurality of second clamp shoes 5157 circumferentially, equally spaced apart from each other on its respective spider member 5100.

In one embodiment, the clamp shoes 5157 may have different heights for different size pipes and may be fine-tuned, for example, with shims or any other adjustment members. In one embodiment, the clamps shoes 5157 may be self-centering members. In one embodiment, the clamp shoes 5157 of the internal weld system 5004 are constructed and arranged to have a radial clearance of about 1 inch to the inner surfaces of the pipe.

In one embodiment, each clamp shoe 5157 includes pipe surface contact members (or surfaces) 5156. In one embodiment, the pipe surface contact members 5156 are constructed and arranged to frictionally engage, when the clamps 5152, 5154 are extended, the inner surfaces 5130, 5132 of the pipes 1022*a*, 1022*b* on either side of the interface region 5136.

In one embodiment, referring to FIGS. 30 and 36-38, each clamp shoe 5157 is constructed and arranged to be connected to and positioned on its associated clamp shoe pin member 5090. In one embodiment, the clamp shoe pin member 5090 is constructed and arranged to extend through its corresponding opening 5158 in the spider member 5100. In one embodiment, the openings 5158 in the spider member 5100 are constructed and arranged to generally extend radially in the spider member 5100 so as to enable a radial movement (e.g., up and down radial movement) of the clamp shoe pin member 5090 in the corresponding opening 5158 in the spider member 5100. In one embodiment, the spider member 5100 may be any member that is constructed and arranged to facilitate movement of the clamp shoe pin members 5090 such that the clamps 5142, 5144 apply clamping forces on the inner surfaces 5130, 5132 of the pipes 1022*a*, 1022*b*.

In one embodiment, referring to FIG. 38, one end 5164 of the clamp shoe pin member 5090 is attached to the clamp shoe 5157 and the other end 5166 of the clamp shoe pin member 5090 is connected to the link member 5092. In one embodiment, the end 5166 of the clamp shoe pin member 5090 includes a notch 5168 that is constructed and arranged to receive the link member 5092 therein. In one embodiment, the end 5166 of the clamp shoe pin member 5090 also includes openings 5170 that constructed and arranged to receive fastening members 5172 to connect the link member 5092 to the end 5166 of the clamp shoe pin member 5090.

In one embodiment, referring to FIG. 37, the spider member 5100 may include openings 5162 that are constructed and arranged to enable the connection between the clamp shoe pin members 5090 and the link members 5092. In one embodiment, the openings 5162 of the spider member 5100 are also constructed and arranged to enable the movement of the link member 5092 when the clamps 5142, 5144 are moved between their retracted and extended positions. In one embodiment, the spider member 5100 is attached to the respective clamps 5142 or 5144.

In one embodiment, the link member 5092 is an elongated member with openings formed at its end portions. In one embodiment, the end portions of the link member have generally rounded configurations to enable the movement of the link member 5092 when the clamps 5142, 5144 are moved between their retracted and extended positions In one embodiment, referring to FIGS. 30, 39 and 40, one end of the link member 5092 is connected to the clamp shoe pin member 5090 and the other end of the link member 5092 is connected to the hub 5096. In one embodiment, each clamp shoe is thus connected to the hub 5096 via its associated clamp shoe pin member 5090 and link member 5092.

In one embodiment, the hub 5096 may include notches 5174 (as shown in FIG. 40) that are constructed and arranged to enable the connections between the link members 5092 and the hub 5096. In one embodiment, the notches 5174 of the hub 5096 are also constructed and arranged to enable the movement of the link members 5092 in the notches 5174 when the clamps are moved between their retracted and extended positions.

In one embodiment, referring to FIG. 30, the clamp 5152 or 5154 includes the cylinder 5086, the piston 5084 and the shaft 5094. In one embodiment, the piston 5084 is configured to be movable axially in the cylinder 5086, and the shaft 5094 is secured to the piston 5084. In one embodiment, the shaft 5094 is movable with the piston 5084.

In one embodiment, the hub 5096 is constructed and arranged to be connected to the shaft 5094 that is longitudinally moved by the axially, reciprocating piston 5084, for example, driven by fluid (hydraulic or pneumatic) pressure inside the cylinder 5086.

The clamps 5142, 5144 are moved from the retracted position (as shown in FIG. 35B) where the clamps 5142, 5144 are not in contact with the inner surfaces 5130, 5132 of the pipes 1022*a*, 1022*b* to the extended position (as shown in FIG. 35A) where the clamps 5142, 5144 are configured to apply clamp forces on the inner surfaces 5130, 5132 of the pipes 1022*a*, 1022*b*, by activating the cylinder 5086 so that the piston 5084 is axially moved in the cylinder 5086. In one embodiment, the compressed air from the front rotary union 5032 through the front clamp control valve 5018 enter a port 5031 (as shown in FIG. 30). The compressed air entering the port 5031 pushes the piston 5084 forward to move the clamps 5142, 5144 to their extended position.

That is, the axial movement of the piston 5084 causes an axial movement of the shaft 5094 connected to the piston 5084. In one embodiment, the axial movement of the shaft 5094 in turn causes an axial movement of the hub 5096. In one embodiment, the axial movement of the hub 5096 is translated to a radial movement of the clamp shoe pin members 5090 via their link members 5092. Thus, the radial clamp forces are generated by fluid pressure of the compressed air acting on the piston 5084 that drives the link members 5092 that convert the axial movement of the piston 5084 (via the shaft 5094 and the hub 5096) to a radial movement of the clamps shoes 5157.

In one embodiment, the size of the cylinder, the applied fluid pressure, and the sizes of various components of the clamps 5142 and 5144 may be changed to control the clamp forces being applied by the clamps on the inner surfaces 5130, 5132 of the pipes 1022*a*, 1022*b*.

In one embodiment, the seals 5146, 5148 have a generally donut or annular shaped configuration to allow a portion of the center section (e.g., the front clamp 5142 or the rear clamp 5144) to pass therethrough. In one embodiment, the seals 5146, 5148 are constructed and arranged to be radially expandable members. In one embodiment, the seals 5146, 5148 are constructed and arranged to be connected to a pneumatic or a hydraulic line that conveys fluid to the seals 5146, 5148 to inflate them. As the seals 5146, 5148 inflate, they are constructed and arranged to engage the inner surfaces 5130, 5132 of the pipes 1022*a*, 1022*b*, respectively forming a chamber 5150 therebetween. In one embodiment, the seal 5146, when inflated, engaged the inner surface 5130 of the pipe 1022*a* and the seal 5148, when inflated, engaged the inner surface 5132 of the pipe 1022*b*. In one embodiment, the seals 5146, 5148, when inflated, engage on opposite sides of the interface region 5136. In one embodiment, the chamber 5150 is a closed volume that may be referred to as a purge gas chamber. In one embodiment, the chamber 5150 is constructed and arranged to receive a purge gas therein.

In one embodiment, the internal weld system 5004 may include the purge gas tank configured to provide purge gas between the inflated first seal 5146 and the inflated second seal 5148 to reduce oxygen from between the inflated first and the second seals 5146 and 5148 during a welding operation. In one embodiment, the purge tank may be positioned in the drive section 5010 of the internal weld system 5004. In one embodiment, the purge gas is configured to prevent oxidation during a welding procedure. In one embodiment, the purge gas is an inert gas. In one embodiment, the purge gas may include argon, helium, nitrogen, or a combination thereof. In one embodiment, the purge gas may include a combination of argon and $CO_2$.

In one embodiment, the purge gas is pumped into the internal sealed region that is formed between the inflated first and the second seals 5146, 5148. By keeping the sealed, internal region free of oxygen, oxidation that may result from the extreme heats that take place during the welding procedure may be prevented.

In one embodiment, the internal weld system 5004 may include an oxygen sensor 5176 and a pressure sensor 5178. In one embodiment, the oxygen and pressure sensors 5176 and 5178 are operatively connected to the one or more processors 5140. In one embodiment, the oxygen and pressure sensors 5176 and 5178 are constructed and arranged to be positioned on the rotatable hub 5078. In another embodiment, the oxygen and pressure sensors 5176 and 5178 are constructed and arranged to be positioned on the spider member 5100 (e.g., between the clamps).

In one embodiment, the oxygen sensor 5176 is configured to measure oxygen content of the gas in the purge chamber 5150 and send an oxygen content data, which is indicative of the oxygen content of the gas in the purge chamber 5150, to the one or more processors 5140. In one embodiment, the one or more processors 5140 are configured to receive the oxygen content data, compare the received oxygen content data to its predetermined oxygen content value, and generate an excess oxygen gas signal if the oxygen content data is greater than the predetermined oxygen content value. In one embodiment, based on the excess oxygen gas signal, the internal weld system 5004 may be configured to open a valve structure to allow purge gas (from the purge gas source/tank) to flow into the purge chamber 5150 until the measured oxygen content falls below the predetermined oxygen content value. In one embodiment, based on the excess oxygen gas signal, the internal weld system 5004 may be configured to stop the welding procedure.

In one embodiment, the pressure sensor 5178 is configured to measure pressure of the inert gas in the purge chamber 5150 and send pressure data, which is indicative of the pressure of the inert gas in the purge chamber 5150, to the one or more processors 5140. In one embodiment, the one or more processors 5140 are configured to receive the pressure data, compare the received pressure data to its predetermined pressure value, and generate an overpressure signal if the pressure data is greater than the predetermined pressure value. In one embodiment, based on the overpressure signal, the internal weld system 5004 may be configured to open an exhaust valve structure to release the pressure in the purge chamber 5150 until the measured pressure falls below the predetermined pressure value. In one embodiment, based on the overpressure signal, the internal weld system 5004 may be configured to stop the welding procedure.

In one embodiment, the seals 5146, 5148, the purge gas tank, the purge gas chamber 5150 formed between the seals 5146, 5148, the oxygen and pressure sensors 5176 and 5178 that monitor the gas in the purge gas chamber 5150 are all optional.

In one embodiment, referring to FIG. 33, the internal weld system 5004 includes the inspection camera 5112 configured to be positioned between the first pipe engagement structure 5052 and the second pipe engagement structure 5054. In one embodiment, the inspection camera 5112 is constructed and arranged to be rotatably mounted on and connected to the rotatable hub 5078.

In one embodiment, the inspection camera 5112 is operatively connected to the one or more processors 5140. In one embodiment, the inspection camera 5112 is configured to send camera inspection data prior to, subsequent to, or during a weld operation to the one or more processors 5140.

In one embodiment, the camera inspection data may generally include image(s), captured by the inspection camera 5112, of the weld joint. In one embodiment, the inspection camera 5112 is configured to capture image(s) of weld joint during or subsequent to the weld operation.

In one embodiment, the camera inspection data may generally include image(s), captured by the inspection camera 5112, of the interface region 5136 between the pipes 1022*a*, 1022*b*. In one embodiment, the inspection camera 5112 is configured to capture image(s) of the interface region 5136 between the pipes 1022*a*, 1022*b* prior to or during the weld operation.

In one embodiment, the inspection camera 5112 may be any device that is configured for capturing/viewing the weld joint or the interface region 5136 between the pipes 1022*a*, 1022*b*. In one embodiment, the camera device 5112 may be a two-dimensional (2D) camera for visual inspection of the weld joint or the interface region 5136 between the pipes 1022*a*, 1022*b*.

In one embodiment, the inspection camera 5112 may be a two-dimensional (2D) charge-coupled device (CCD) color camera. In one embodiment, the one or more processors 5140 that are associated with the inspection camera 5112 may be configured to analyze the image(s) captured by the inspection camera 5112 to detect any defects present in the weld joint. In one embodiment, a visual signal may be delivered to an external operator display based on the analysis. For example, the 2D camera may be a color camera and a change in coloration may indicate a weld defect to the operator. In one embodiment, a perceived change in profile may also indicate a weld defect.

In one embodiment, the inspection camera 5112 is configured to obtain a thermal image of (e.g., various color regions of the metal) of the weld joint/region. This thermal image is then analyzed to determine what temperatures the different regions of the weld joint/region have reached.

In one embodiment, the images provided by the inspection camera 5112 may be color images. In one embodiment, the one or more processors 5140 that are associated with the inspection camera 5112 may be configured to analyze the color of each pixel of the received image to determine the temperature associated with that pixel.

In another embodiment, the images provided by the inspection camera 5112 may be grayscale images. In one embodiment, the one or more processors 5140 that are associated with the inspection camera 5112 may be configured to analyze the intensity or brightness of each pixel of the received image to determine the temperature associated with that pixel. In one embodiment, the one or more processors 5140 that are associated with the inspection camera 5112 may be configured to analyze the properties of the pixels of the received image to determine if the temperature is outside the threshold or predetermined temperature range (and is a relatively very high or relatively very low) and or if there is a large temperature difference between adjacent pixels. In one embodiment, the abnormal temperature(s) or temperature differences may be an indication of the occurrence of a weld defect.

For example, in one embodiment, the image may be analyzed to determine whether a region or regions of the weld joint/region have reached a relatively very high or relatively very low temperature. In one embodiment, the image may be analyzed to determine whether a region or regions of the weld joint/region have temperature differential/changes. In one embodiment, a temperature of each region of the weld joint/region is determined, and the determined temperature of each region of the weld joint/region is compared with a threshold or predetermined temperature range to determine whether a region or regions of the weld joint/region have reached a relatively very high temperature, and/or a region or regions of the weld joint/region have temperature differential/changes.

In one embodiment, the inspection camera 5112 is configured to follow the weld torch 5502 so that an operator can inspect the weld as soon as the weld is created by the weld torch 5502.

In various embodiments, the inspection detector comprises a laser, 3D camera, ultrasound, and an electric capacitive probe. Where a laser is used, the type of laser can be a Laser Displacement Sensor. In one embodiment, the laser can be LK-G5000 series Ultra High-Speed/High-Accuracy Laser Displacement Sensor manufactured by Keyence. In one embodiment, the laser can be a smart laser sensor, such as, Smart Laser Sensor SLS-050 manufactured by Meta Vision Systems Inc.

In one embodiment, the inspection detector may include an emitter for emitting the inspection beam of radiation, and a receiver for receiving inspection signals from reflected radiation. In one or more embodiments, the detector's receiver comprises a sensor that detects the reflected radiation and generates signals based upon the reflected radiation. The signals are received by the one or more processors. In one embodiment, the signals contain data and information corresponding to the three dimensional profile of the interface region between pipes to be welded and can be used to detect, for example, the relative heights of the adjacent pipe surfaces at the regions to be welded, the relative spacing between the pipes, any non-uniformities in the adjacent surfaces to be welded (e.g., at the bevels thereof). In addition, because the inspector detector is scanned along the entire interface between the pipes, it can determine the specific interface profile at any particular region of the scan. This information can be used by the one or more processors to control the operation of the weld torch to provide a customized/tailored weld that is tailored specifically to the structural profile of the pipes to be welded at the interface region thereof.

In one embodiment, the system 5000 may include housings 5852, 5854 (as shown in FIG. 31) that are configured to house and protect the inspection detector 5056 and the inspection camera 5112, respectively from flying hot weld sparks (spatter) and/or other debris that may fly towards the inspection detector 5056 and/or the inspection camera 5112 during a welding operation.

In one embodiment, the housings 5852, 5854 of the inspection detector 5056 and/or the inspection camera 5112 may be made of polycarbonate material. In one embodiment, portions of the housings 5852, 5854 may be configured to be removable to facilitate cleaning (e.g., removal of the weld spatter or other weld debris therefrom) or repair. In one embodiment, the portions of the housings 5852, 5854 may include camera lens shield or inspection detector lens shield. In one embodiment, portions of the housings 5852, 5854 of the inspection detector 5056 and/or the inspection camera 5112 may be configured to be disposable so that portions of the housings 5852, 5854 may be easily replaced when they are clogged with the weld spatter or other weld debris. For example, in one embodiment, the inspection camera 5112 may include a (rectangular) polycarbonate member in front of its lens that may be replaced when obstructed/blocked by the weld spatter or other weld debris.

In one embodiment, the pre-weld inspection, the on-the-fly inspection and the post-weld inspection may be performed by the inspection detector 5056. In one embodiment, the pre-weld inspection, the on-the-fly inspection and the post-weld inspection may be performed by the inspection detector 5056 and the inspection camera 5112.

In one embodiment, the inspection detector 5056 includes an emitter 5180 for emitting the beam of radiation, and a receiver 5182 for receiving inspection signals from reflected radiation. In one embodiment, the inspection detector 5056 transmits radiation towards the interface region 5136. In one embodiment, the received 5182 of the inspection detector 5136 is configured for receiving radiation reflected from the surfaces of the interface region 5136 and generating electronic signals based thereon. In one embodiment, the receiver or sensor 5182 of the inspection detector 5056 is configured to sense the reflected signal to detect 3D topography of the weld joint/region. The inspection detector 5056 may interchangeably be referred to herein as the inspection laser.

In one embodiment, the inspection detector 5136 includes a plurality of inspection detectors that transmit radiation towards the interface region 5136. In one embodiment, each inspection detector may include a receiver for receiving radiation reflected from the surfaces of the interface region 5136 and generating electronic signals based thereon.

In one embodiment, the inspection detector 5056 may include a Laser Displacement Sensor. In one embodiment, the inspection detector 5056 may include a Complementary metal-oxide-semiconductor (CMOS) sensor. In one embodiment, the inspection detector 5056 may include High Definition Ernostar type lens. In one embodiment, the one or more processors 5140 that are associated with the inspection detector 5056 are configured to use triangulation to detect the position of the reflected light on the RS-CMOS sensor.

In one embodiment, the inspection detector 5056 may receive its power from the wire feed electronics module 5046. In one embodiment, the wire feed electronics module 5046 is configured to receive its power from the batteries 5116 in the drive section 5010 via the rear slip ring 5080. Thus, the inspection detector 5056 receives its power from the batteries 5116 in the drive section 5010 via the rear slip ring 5080 and the wire feed electronics module 5046. This may be the case when the cables, hoses, and/or wires to the reach rod/umbilical 5034 are disconnected from the system 5004, for example, when the system 5004 is traveling from one weld joint to the next weld joint.

In another embodiment, the inspection detector 5056 may receive its power directly from the umbilical/reach rod 5034. For example, when the cables, hoses, and/or wires to the reach rod/umbilical 5034 are connected from the system 5004, the inspection detector 5056 may receive its power directly from the umbilical/reach rod 5034.

It should be appreciated that, in some embodiments, power to and communication from the inspection detector 5056 and/or camera 5112 may be desired. Such power and/or communication of the inspection detector 5056 and/or camera 5112 may take place with components, such as the one or more processors 5140 and/or a power source, that are outside of the pipe engagement structures (e.g., outside of the clamps 5142, 5144 and/or seals 5146, 5148). In some embodiments, where the power and/or communication takes place through a hardwired (as opposed to wireless) communication and/or power line, such hardwired line may take into account rotation by the rotatable hub 5078, for example, to reduce or prevent twisting and/or tangling of the hardwired line. As such, in one example as described herein, the hardwired line (which can transmit information and/or power) can be provided with (i) a movable portion that moves with inspection detector 5056 while the inspection detector 5056 directs the inspection beam along the interface region under the rotational force of the one or more orientation motors, and (ii) a stationary portion that remains fixed during movement of the movable portion. The stationary and rotational portions of the hardwired line can be connected via the described slip ring that provides the interface between the movable and fixed portions of the hardwired line to enable the signals to pass from the movable portion to the stationary portion. It should be appreciated that either a single hardwired line (e.g., with multiple, discreet wires) can be used, or a plurality of hardwired lines (separate lines for power and communication). In addition, if on-board power is provided to the inspection detector, then only a communication line may pass through the slip ring. If wireless communication with the inspection detector is provided, then only a power line may pass through the slip ring. If on-board power and wireless communication is provided, then a hardwired communication need not be provided.

Similarly to what has been described with respect to the hardwired communication line, it may also be desirable to provide the inert gas to an axial location between the pipe engagement structures (e.g., between clamps and/or seals) through a pneumatic line or tube for carrying pressurized inert gas. There may also be a desire to reduce twisting and/or tangling of the pneumatic line which might otherwise take place during rotation of the rotatable hub 5078. As such, the pneumatic line can be provided with the stationary portion connected with the inert gas source and the movable portion that extends into the rotatable hub, the movable portion being coupled to the stationary portion through the rotary union. The rotary union permits relative rotation between the stationary and movable pneumatic portions.

In one embodiment, the inspection detector 5056 may be operatively associated with the inspection motor to direct a beam of radiation along the interface region 5136 between the pipes 1022*a* and 1022*b*. In one embodiment, the inspection detector 5056 and the inspection motor may be operatively associated with one or more processors 5140. In one embodiment, the first and second rotation motors 5030 and 5074 together may be interchangeably referred to as the inspection motor.

In one embodiment, the inspection detector 5056 is configured to detect a characteristic of the interface region 5136 between the pipes 1022*a*, 1022*b*. In one embodiment, the characteristic of the interface region 5136 may include a gap between the pipes 1022*a*, 1022*b*. In one embodiment, the characteristic of the interface region 5136 may include a radial offset (e.g., high/low) between the pipes 1022*a*, 1022*b*. In one embodiment, the characteristic of the interface region 5136 may include geometry at each weld location. In one embodiment, the characteristic of the interface region 5136 may include chips, gauges, or any irregularities in the pipes 1022*a*, 1022*b*. In one embodiment, the characteristic of the interface region 5136 may include roundness of the pipes 1022*a*, 1022*b*. In one embodiment, the characteristic of the interface region 5136 may include contours of bevels of the pipes 1022*a*, 1022*b* (after pipe alignment). In one embodiment, the characteristic of the interface region 5136 may include various color regions of the metal of the weld joint/region. For example, these color regions are analyzed to determine what temperatures the different regions of the weld joint/region have reached.

In one embodiment, the inspection detector 5056 may be configured to detect the characteristic of the interface region 5136 between the pipes 1022*a*, 1022*b*, for example, before the weld torch 5502 has been activated to commence securing/welding the pipes 1022*a*, 1022*b* to one another. For example, the characteristic of the interface region 5136 may include a pipe bevel geometry, a gap between internal adjoining ends of the pipes 1022*a*, 1022*b* (after pipe alignment), a gap between bevels of the pipes 1022*a*, 1022*b* (after pipe alignment), etc. In one embodiment, the inspection detector 5056 may be configured to detect the characteristic of the interface region 5136 between the pipes 1022*a*, 1022*b*, for example, 1022*b* during a welding operation, at a region of the interface prior to weld material being deposited thereon. For example, the characteristic of the interface region 5136 may include a height difference between the bevel edges of the pipes after their alignment. In one embodiment, the characteristic of the interface region 5136 may include high-low differences between the adjacent edges of the pipes (e.g., at the interior beveled portions thereof). In one embodiment, the inspection detector 5056 may be configured to detect the characteristic of the interface region 5136 between the pipes 1022*a*, 1022*b*, for example, subsequent to a welding operation. For example, the characteristic of the interface region 5136 may include a characteristic of the formed weld beads, weld shape parameters such as mismatch, bead concavity, the re-entrant angle.

In one embodiment, the one or more processors 5140 are configured to operate the inspection detector 5056 and the motor 5030, 5074 to scan the interface region 5136 between the pipes 1022*a*, 1022*b*.

In one embodiment, the one or more processors 5140 are configured to interact with the inspection detector 5056 to scan the interface region 5136 between the pipes 1022*a* and 1022*b* to determine a profile of the interface region 5136 between the pipes 1022*a* and 1022*b* prior to a welding procedure and generate pre-weld profile data based thereon.

The term "profile" as used herein is a generic term in referring to physical attributes of the interface region to be welded between the pipes. The term "profile data" refers to data, corresponding to the profile, that can be derived from the interface region. For example, such data can be obtained by scanning the interface region with an inspection detector, such as a laser. The profile data can contain numerous types of information about the profile, such different types of information are referred to herein as "characteristics."

In one embodiment, the one or more processors 5140 are configured to interact with the inspection detector 5056 to scan the interface region 5136 between the pipes 1022*a*, 1022*b* to determine the profile of the interface region 5136 between the pipes 1022*a* and 1022*b* during a welding procedure, at a region of the interface 5136 prior to weld material being deposited thereon, and generate on-the-fly profile data. In one embodiment, the one or more processors 5140 are configured to generate weld signals to control the weld torch 5502 based on the on-the-fly profile data. The on-the-fly profile data is described in detail below. The term "on-the-fly" as used herein also means or refers to "real-time," meaning that the sensing or detection is used by the one or more processors during a current welding operation to control the welder. Of course, because the inspection detector, weld torch trails the inspection detector/inspection laser be a defined amount, some buffering (or slight time delay) takes place between the receipt of the profile data, and the use of such by the one or more processors to control the weld torch.

In one embodiment, the one or more processors 5140 are configured to interact with the inspection detector 5056 to scan the interface region 5136 between the pipes 1022*a*, 1022*b* to determine the profile of the interface region 5136 between the pipes 1022*a* and 1022*b* subsequent to a welding procedure and generate post-weld profile data based thereon. The post-weld profile data is described in detail below.

In one embodiment, the inspection detector 5056 is configured to work in conjunction with the weld torch 5502 of the weld system 5004 to sense interface joint profile or/and weld material profile to apply weld material to the edge joint in the appropriate location and amount. In one embodiment, the inspection detector 5056 is configured to survey the weld and send a signal to the one or more processors 5140 of the articulating weld head 5502 to control movement of the weld head 5502 around the entire edge joint. Specifically, the weld torch 5502 is configured to follow the inspection detector as the weld head control system continuously receives weld profile information from the edge joint. The information is then used to continuously adjust the weld torch 5502 to achieve the desired weld structure/profile.

In one embodiment, the internal weld system 5004 may include one inspection detector per weld torch 5502. In one embodiment, the internal weld system 5004 includes three weld torches 5502 and three associated inspection detectors 5056. In another embodiment, the internal weld system 5004 may include two inspection detectors per weld torch 5502. In one embodiment, the number of inspection detectors used in the internal weld system 5004 may vary.

In one embodiment, the field system 5000 of the present patent application is an intelligent internal inspection system that places the internal automation, including the inspection camera 5112, the inspection detector 5056, and the weld head or torch 5502 between the spaced clamps 5142, 5144 and the sealed structure 5146, 5148. In one embodiment, the field system 5000 of the present patent application is an intelligent internal inspection system that places the inspection camera 5112 and the inspection detector 5056 between the spaced clamps 5142, 5144 and the sealed structure 5146, 5148. In one embodiment, the field system 5000 of the present patent application is an intelligent internal inspection system that places the internal automation, including the inspection camera 5112, the inspection detector 5056, and the weld head or torch 5502 between the spaced clamps 5142, 5144.

In one embodiment, the weld system is attached to the rear of the line-up clamp, becoming an inline analytical tool that minimizes the downtime associated with using a third-party tool. In one embodiment, both the inspection camera 5112 and the inspection detector 5056 are used for inspecting the weld. In one embodiment, the inspection camera 5112 is configured to capture a two-dimensional image of the weld and analyze the color of the weld. Since the color of the weld is indicative of what temperature the material was raised to during the welding procedure, the information obtained by the inspection camera 5112 helps determine whether the weld was done correctly. In one embodiment, the inspection detector 5056 is configured to analyze the profile of the weld. In one embodiment, the inspection detector 5056 in conjunction with the two-dimensional (2D) charge-coupled device (CCD) color camera 5112 is configured to perform a root inspection directly after the root and hot pass weld procedures. In one embodiment, the weld system 5004 is configured to provide the root pass weld layer profile and the 2D raw color image that show the discoloration and any geometrical defects of the root pass weld layer. In one embodiment, the weld system 5004 is configured to create a permanent record of the root pass weld layer profile and visual image that can be stored and replayed in the user's electronic device (e.g., laptop).

In one embodiment, the inspection performed by the inspection detector 5056 in conjunction with the color camera 5112 may be used as a reference for the AUT weld inspection. In one embodiment, the inspection performed by the inspection detector 5056 in conjunction with the color camera 5112 may be used as a "go, no-go" (pass/fail test (or check)) for the root and hot pass welds. In one embodiment, if a root defect is found, the weld joint can be cut and prepped in the same station, far before the defect callout would happen after all the passes had been deposited, so a significant waste of production time can be avoided.

In one embodiment, the internal weld system 5004 includes a feedback system that is configured to be operatively connected to a plurality of sensors and the one or more processors 5140. In one embodiment, the one or more processors 5140 are configured to analyze the data provided by the plurality of sensors. In one embodiment, one of the plurality of sensors include a temperature sensor that is configured to provide an indication of the temperature(s) of the weld joint and/or monitor the temperature during the welding procedure. In one embodiment, one of the plurality of sensors includes a weld material sensor that is configured to monitor the weld material usage during the welding procedure. In one embodiment, one of the plurality of sensors may include sensors that are configured to monitor speed and time of the welding procedure.

Figure 41:
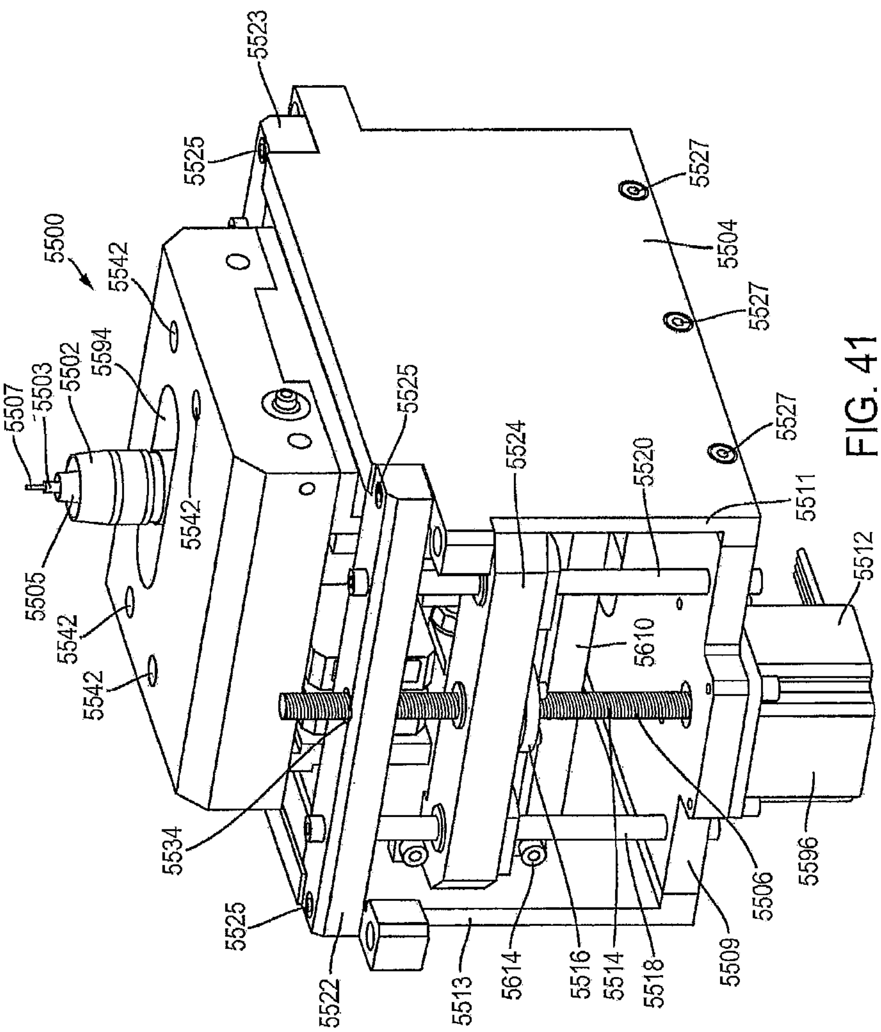
FIGS. 41 and 42 show front perspective and rear perspective views of a weld head assembly of the internal weld system in accordance with an embodiment of the present patent application.
Figure 42:
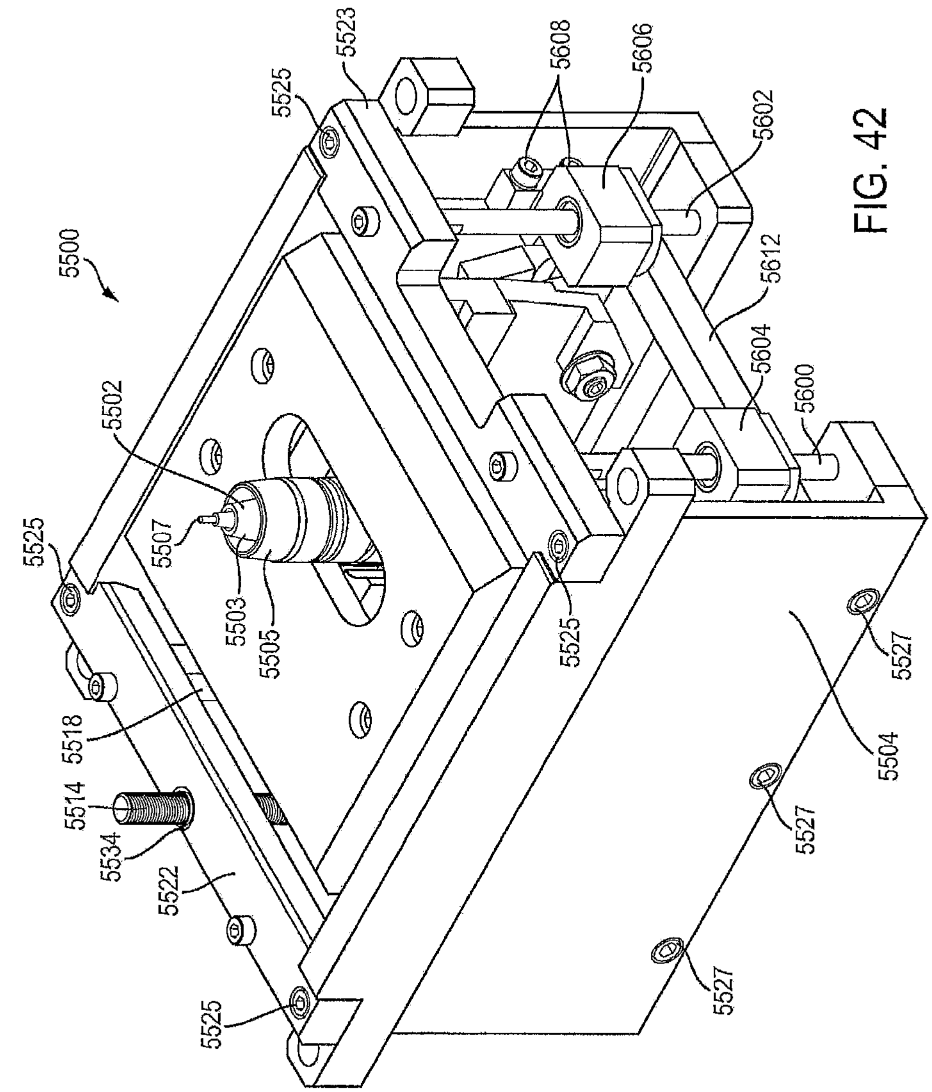
Figure 43:
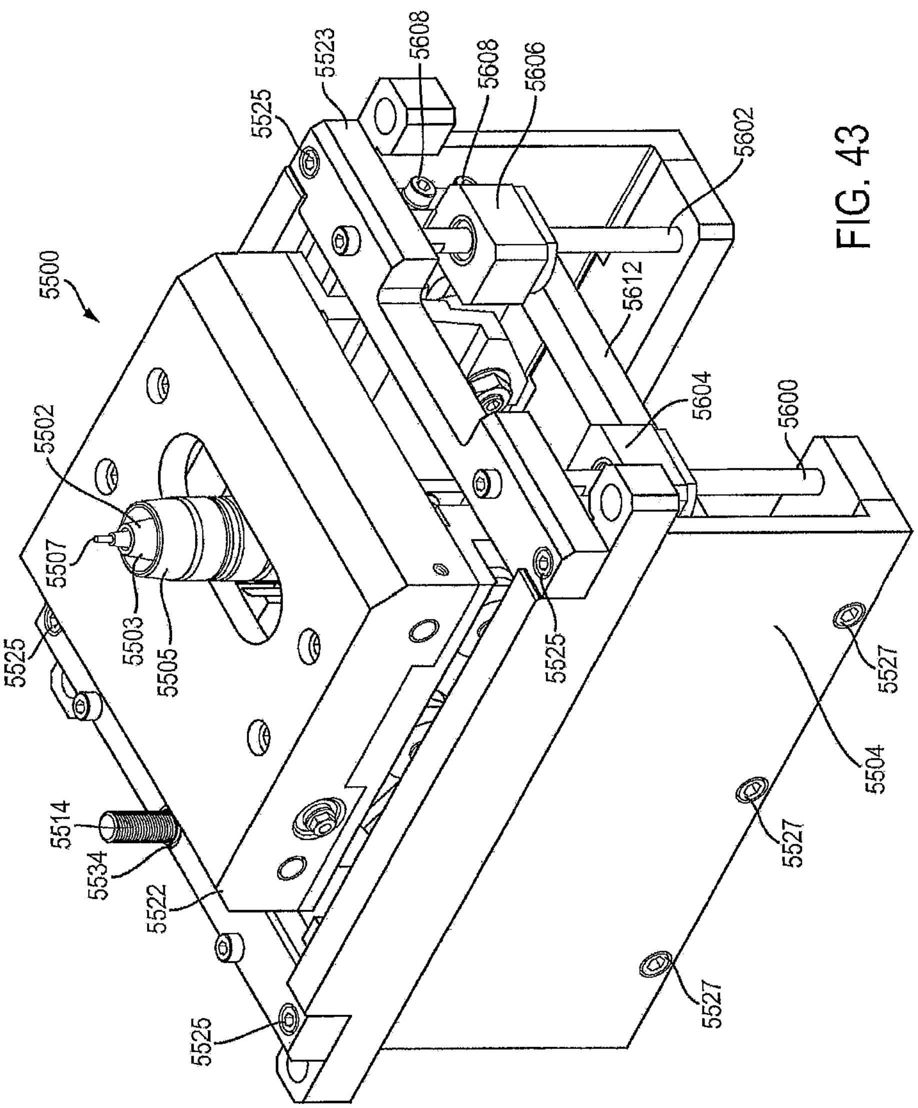
FIG. 43 shows another rear perspective view of the weld head assembly of the internal weld system, wherein a weld torch of the weld head assembly has been raised to a desired welding position, in accordance with an embodiment of the present patent application.
Figure 44:
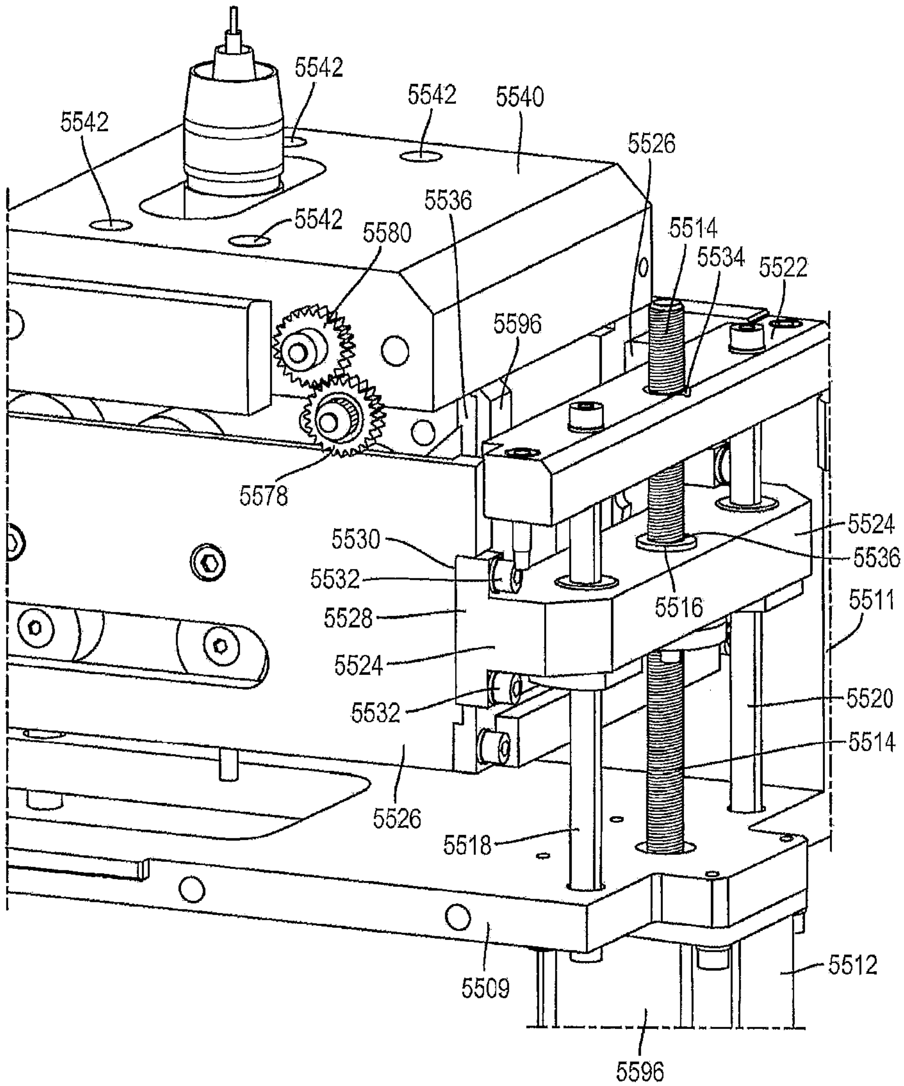
FIGS. 44-46 show a left side perspective view, a perspective view and a cross-sectional view of the weld head assembly, where some components of the weld head assembly are not shown for sake of clarity, in accordance with an embodiment of the present patent application.
Figure 45:
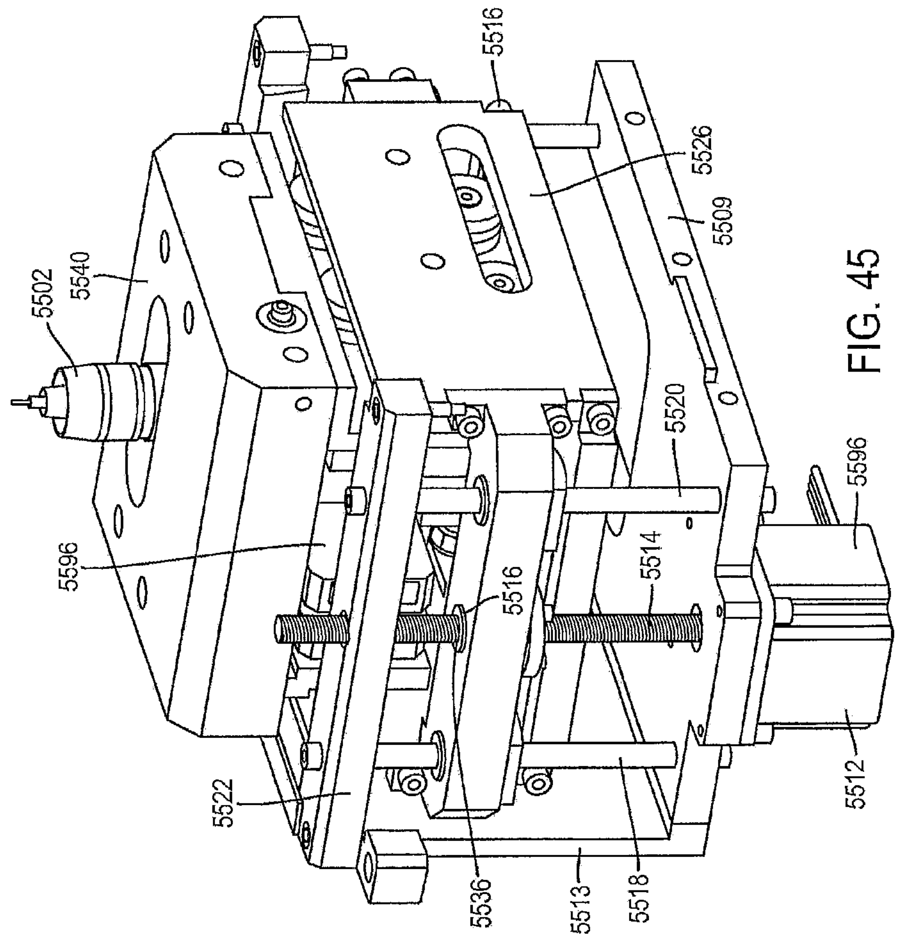
Figure 46:
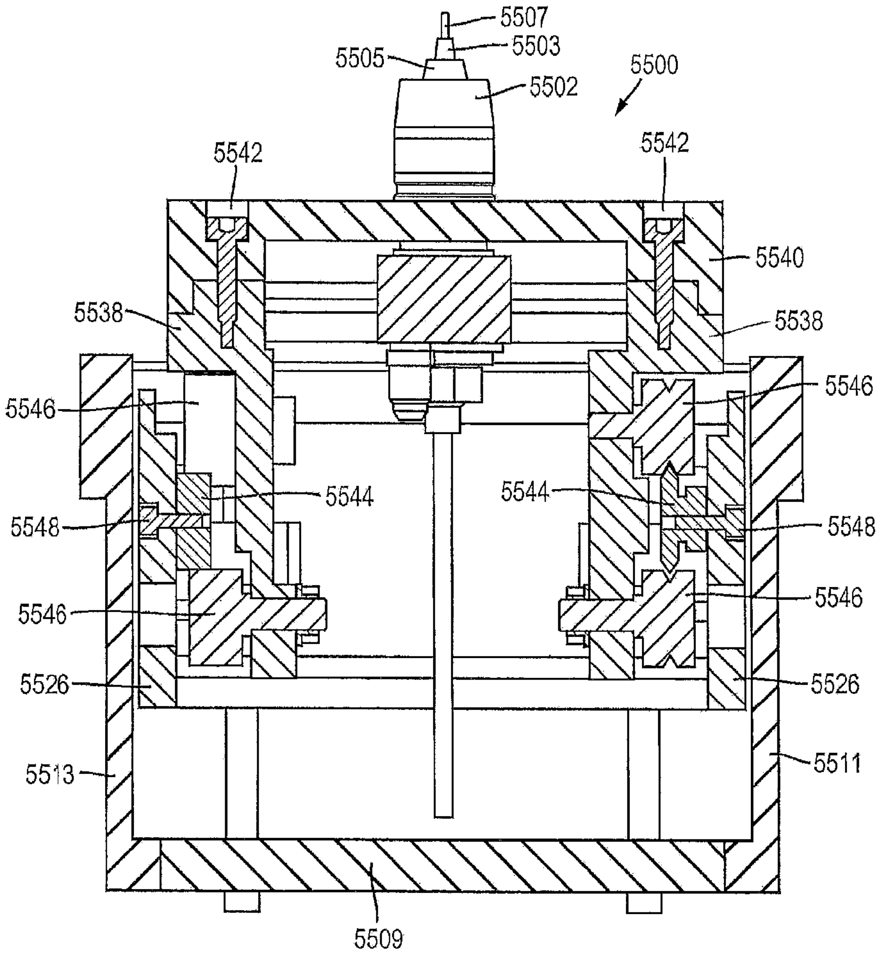

FIG. 41 shows a front perspective view of the weld head assembly 5500, while FIGS. 42 and 43 show rear perspective view of the weld head assembly 5500. FIGS. 44-46 show a left side perspective view, a right side perspective view and a cross-sectional view of the weld head assembly 5500, where some components of the weld head assembly 5500 are not shown for sake of clarity.

In one embodiment, in the illustrated embodiment, the center section 5008 may have three weld torches 5502. In another embodiment, the center section 5008 may have two weld torches 5502. In yet another embodiment, the center section 5008 may have only one weld torch 5502. In one embodiment, the number of weld torches may vary.

In one embodiment, the weld head assembly 5500 includes the weld torch 5502 and a weld torch housing assembly 5504. In one embodiment, the weld torch 5502 includes a weld tip 5503. In one embodiment, the weld head assembly 5500 (the weld torch 5502 and the weld torch housing assembly 5504) is carried by the frame or frame assembly of the internal weld system 5004.

In one embodiment, the weld torch 5502 is constructed and arranged to feed or guide a consumable electrode wire 5507 into the weld area/zone. The consumable electrode wire 5507 is supplied from a source (e.g., a wire reel or spool) through the wire feed system 5044. In one embodiment, the weld torch 5502 is constructed and arranged to be connected to a power supply (e.g., a constant voltage power supply). In one embodiment, an electric arc forms between a consumable electrode wire 5507 and the pipes **1022*a*, 1022*b*, which heats the pipes 1022*a*, 1022*b*, causing them to melt, and join. In one embodiment, along with the consumable electrode wire 5507, a shield gas is fed through the weld torch 5502, which shields the weld procedure from contaminants in the air. In one embodiment, the shield gas is fed to the weld area/zone through the weld torch nozzle that may include a gas cup 5505. In one embodiment, the electrode 5507 may extend beyond the end of the gas cup 5505**.

In one embodiment, the shield gas stored in the drive section 5010 is brought to the wire feed assembly 5020 by a hose/shield gas line for distribution to the one or more weld torches 5502. In one embodiment, the shield gas control valve 5042 is configured to receive the shield gas from the rear rotary union 5072 (e.g., via the rear slip ring 5080, the rotatable hub 5078 and the front slip ring 5016). In one embodiment, the shield gas control valve 5042 is configured to control the flow of the shield gas to the weld torch 5502 through a shield gas line. In one embodiment, each weld torch 5502 has a corresponding shield gas control valve 5042 connected to it. In one embodiment, the shield gas control valve 5042 is configured to supply the shield gas to the corresponding weld torch 5502, when it receives signals from the wire feed electronics module 5046.

In one embodiment, the weld torch 5502 is configured to be carried by the frame assembly of the internal weld system 5004 and configured to create a weld at the end of the second end of the first pipe **1022*a*. In one embodiment, the weld torch 5502 is configured to be positioned internally within to the first pipe 1022***a* and/or second pipe 1022*b* to provide an internal welding operation. In one embodiment, the internally positioned weld torch 5502 is mounted to (positioned on) and connected to the rotatable hub 5078.

In one embodiment, the weld torch 5502 may have at least three degrees of freedom. In one embodiment, the degrees of freedom of articulation allow the weld torch 5502 to be very effective and efficient in filling in interface profiles optimally and where necessary.

The degree of freedom generally refers to the freedom of movement of the weld torch 5502 in the three-dimensional space. The translational movement or displacement generally refers to linear movement or displacement along the three mutually perpendicular X, Y and Z axes.

In one embodiment, the term position as used herein generally refers to the translational movement or displacement. In one embodiment, position may be relative or absolute.

In one embodiment, the coordinate system may include: a Y axis, which is aligned substantially parallel to the longitudinal axis A-A (as shown in FIG. 8) of the pipes 1022*a*, 1022*b*; a X axis, which is perpendicular to the Y axis; and a Z axis, which is perpendicular to the Y axis and is aligned substantially parallel to a radial axis R-R (as shown in FIG. 8) of the pipes 1022*a*, 1022*b*. For example, the translational movement along the X axis generally refers to a forward and backward movement. The translational movement along the Y axis generally refers to a left to right side movement. The translational movement along the Z axis generally refers to an up and down movement.

The rotational movement or displacement generally refers to rotation about these same three mutually perpendicular X, Y and Z axes. The rotation about the three mutually perpendicular X, Y and Z axes is generally referred to as yaw (Z-axis), pitch (Y-axis) and roll (X-axis). For example, the rotational movement about the X axis generally refers to a left or right side tilting movement. The rotational movement about the Y axis generally refers to a forward or (rearward) backward tilting movement. The rotational movement about the Z axis generally refers to a left or right turning movement.

In one embodiment, the term orientation as used herein generally refers to the rotational movement or displacement. In one embodiment, orientation may be relative or absolute.

In one embodiment, the at least three degrees of freedom may include two translational movements of the weld torch 5502 along two of the three mutually perpendicular X, Y and Z axes and one rotational movement of the weld torch 5502 about one of the same three mutually perpendicular X, Y and Z axes.

In one embodiment, the two translational movements of the weld torch 5502 along two of the three mutually perpendicular X, Y and Z axes may include an up and down movement of the weld torch 5502 and a side to side (e.g., left to right) movement of the weld torch 5502. In one embodiment, the up and down movement of the weld torch 5502 may be referred to as a radial movement (i.e., substantially parallel to the radial axis R-R of the pipes 1022*a*, 1022*b*) of the weld torch 5502, and the side to side (left to right) movement of the weld torch 5502 may be referred to as an axial movement (i.e., substantially parallel to the longitudinal axis A-A of the pipes 1022*a*, 1022*b*) of the weld torch 5502.

In one embodiment, the one rotational movement of the weld torch 5502 about one of the same three mutually perpendicular X, Y and Z axes may include a forward or (rearward) backward tilting movement of the weld torch 5502.

In one embodiment, the weld torch 5502 is mounted for movement about a pivot point P (as shown in the FIGS. 54, 56 and 58) at or adjacent to the weld tip 5503 of the weld torch 5502 such that a weld pool created at the weld tip 5503 generally coincides with the pivot point P. In one embodiment, the pivot point P is positioned forwardly of the weld tip 5503. For example, in one embodiment, the weld torch 5502 has been designed to pivot about the pivot point P (as shown in the FIGS. 54, 56 and 58) where the electrode wire 5507 makes contact with the pipe 1022*a*, 1022*b*. In one embodiment, the weld torch 5502 is mounted for movement such that it articulates about an axis that is proximate to the weld torch tip 5503. In one embodiment, the axis passes through the pivot point P and is substantially parallel to the longitudinal axis A-A of the pipes 1022*a*, 1022*b*.

In one embodiment, the weld torch 5502 is operatively connected to one or more weld torch motors 5596. In one embodiment, the one or more weld torch motors 5596 and the weld torch 5502 are configured to be positioned within an interior of the first and/or second pipes 1022*a*, 1022*b*. In one embodiment, one or more weld torch motors 5596 are configured to move the weld torch 5502 relative to the first and second pipe engagement structures 5052, 5054 after they are fixed relative to the first pipe and second pipe 1022*a*, 1022*b* respectively.

In one embodiment, the one or more processors 5140 are configured to control the one or more weld torch motors 5596 to control a position and orientation of the weld torch 5502. For example, as will be described in detail below, the one or more weld torch motors 5596 may include the radial weld torch motor 5512 that is configured to control the radial position and orientation of the weld torch 5502, the axial weld torch motor 5550 that is configured to control the axial position and orientation of the weld torch 5502 and the tilt weld torch motor 5588 that is configured to control the tilt position and orientation of the weld torch 5502.

In one embodiment, the motors 5030 and 5074 are configured for moving the weld torch 5502 circumferentially about the interface region 5136 and also to move the inspection detector 5056 about the interface region 5136 simultaneously with the weld torch 5502. In one embodiment, the weld torch 5502 is trailing the inspection detector 5056. In one embodiment, the front and rear rotation motors 5030 and 5074 are configured to rotate the rotatable hub 5078 and to rotate the weld torches 5502, the inspection detector 5056 and the inspection camera 5112 all positioned on and connected to the rotatable hub 5078. In one embodiment, the front and rear rotation motors 5030 and 5074 may be interchangeably referred to as the circumferential weld torch motors.

In one embodiment, the one or more processors 5140 are operatively connected with the one or more orientation motors 5030 and 5074 to rotate the first clamp 5142 relative to the second clamp 5144, so as to rotate the first pipe 1022*a* relative to the second pipe 1022*b*, based on the instructions from the one or more processors 5140.

In one embodiment, the motors 5030 and 5074 are configured to move the weld torch 5502 circumferentially about the interface region 5136 and are also configured to move the inspection camera 5112 about the interface region 5136 simultaneously with the weld torch 5502. In one embodiment, the weld torch 5502 is trailing the inspection camera 5112. In one embodiment, the inspection camera 5112 is trailing the weld torch 5502.

In one embodiment, the motors 5030 and 5074 are configured to move the weld torch 5502 circumferentially about the interface region 5136 and are also configured to move both the inspection camera 5112 and the inspection detector 5056 about the interface region 5136 simultaneously with the weld torch 5502. In one embodiment, the weld torch 5502 is trailing both the inspection detector 5056 and the inspection camera 5112. In one embodiment, the weld torch 5502 is trailing the inspection detector 5056 and is leading the inspection camera 5112.

In one embodiment, the motors 5030 and 5074 are configured to drive the weld torch 5502 in a first rotational direction during the root pass weld and to drive the weld torch 5502 in a second direction, opposite the first direction, during the hot pass weld.

In one embodiment, the motors 5030 and 5074 are configured to drive the weld torch 5502 at least 360° relative to the pipe axis A-A (as shown in FIG. 8) so as to complete a rotationally continuous root pass weld. In one embodiment, 360° rotation of the weld torch 5502 relative to the pipe axis A-A (around the interior surface of the pipe) is possible because the weld torch 5502 is mounted on the rotatable hub 5078 (i.e., configured to be axial rotation).

Figure 48:
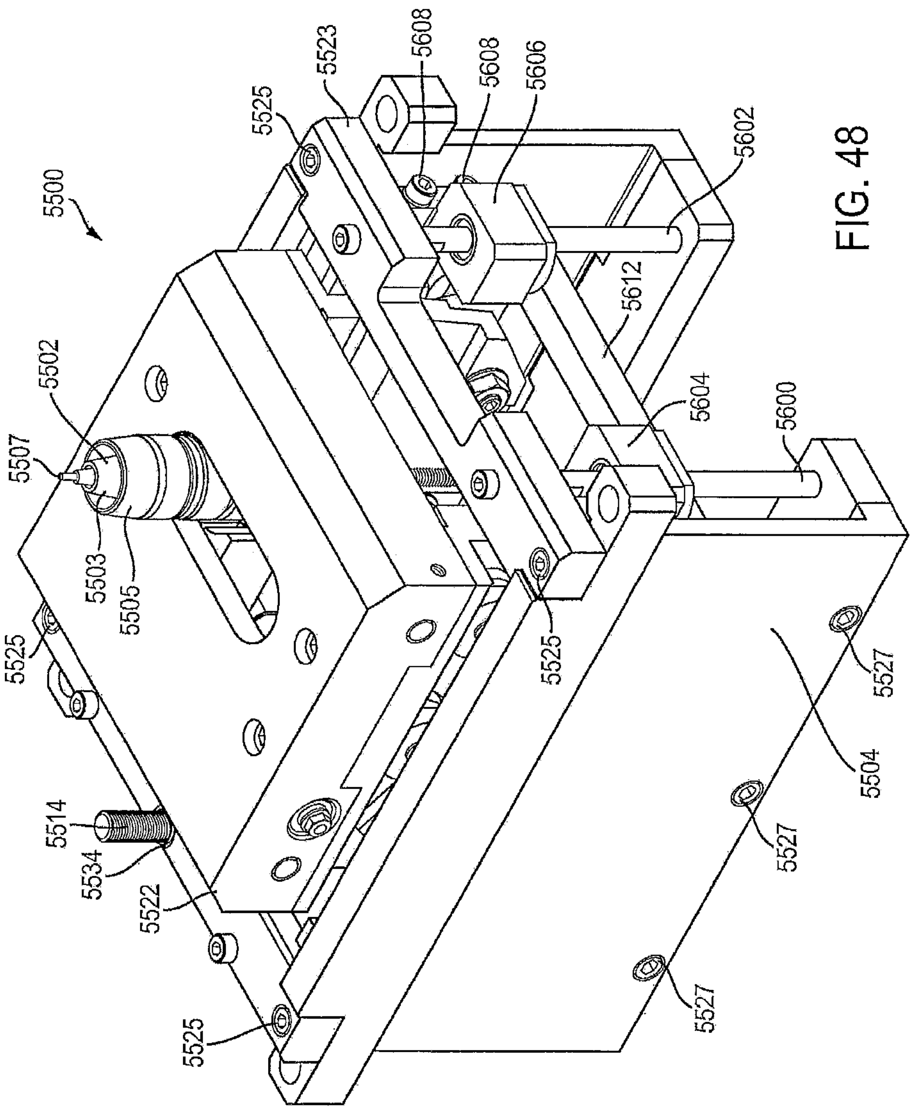
Figure 49:
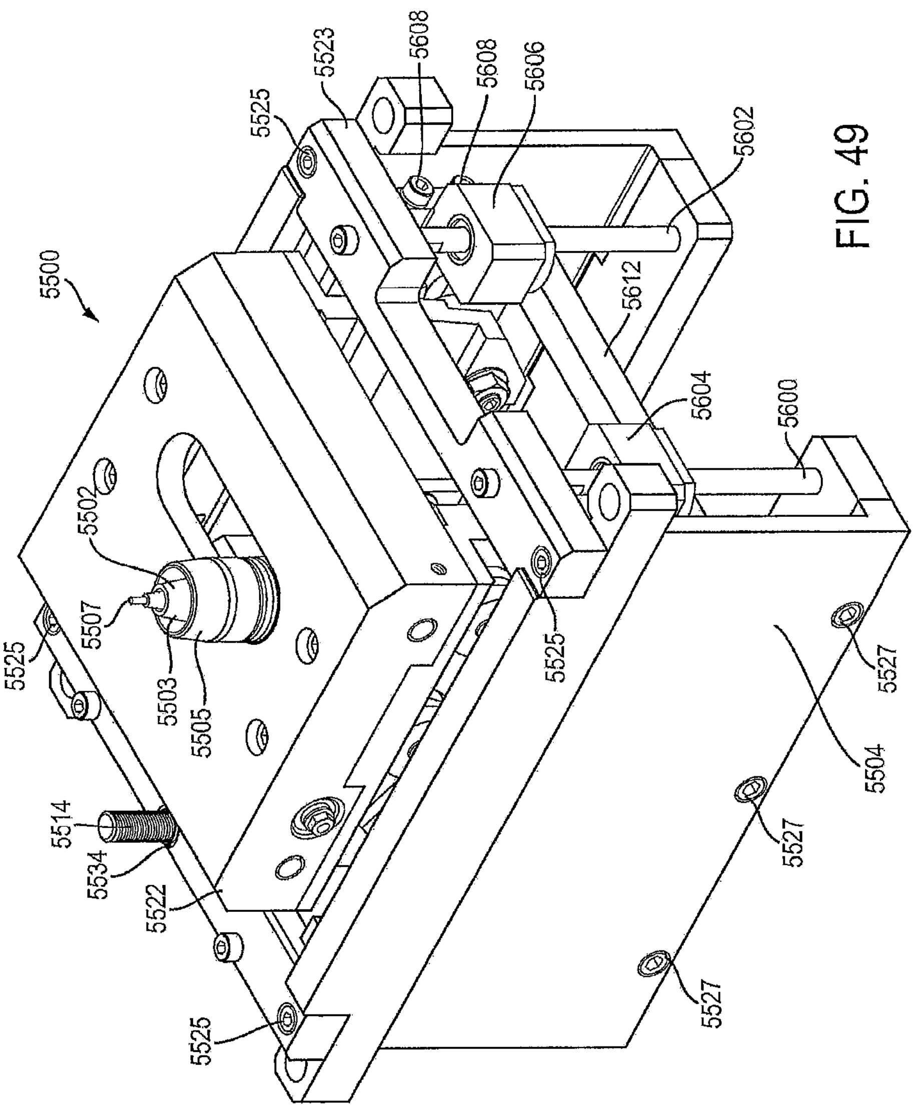
Figure 56:
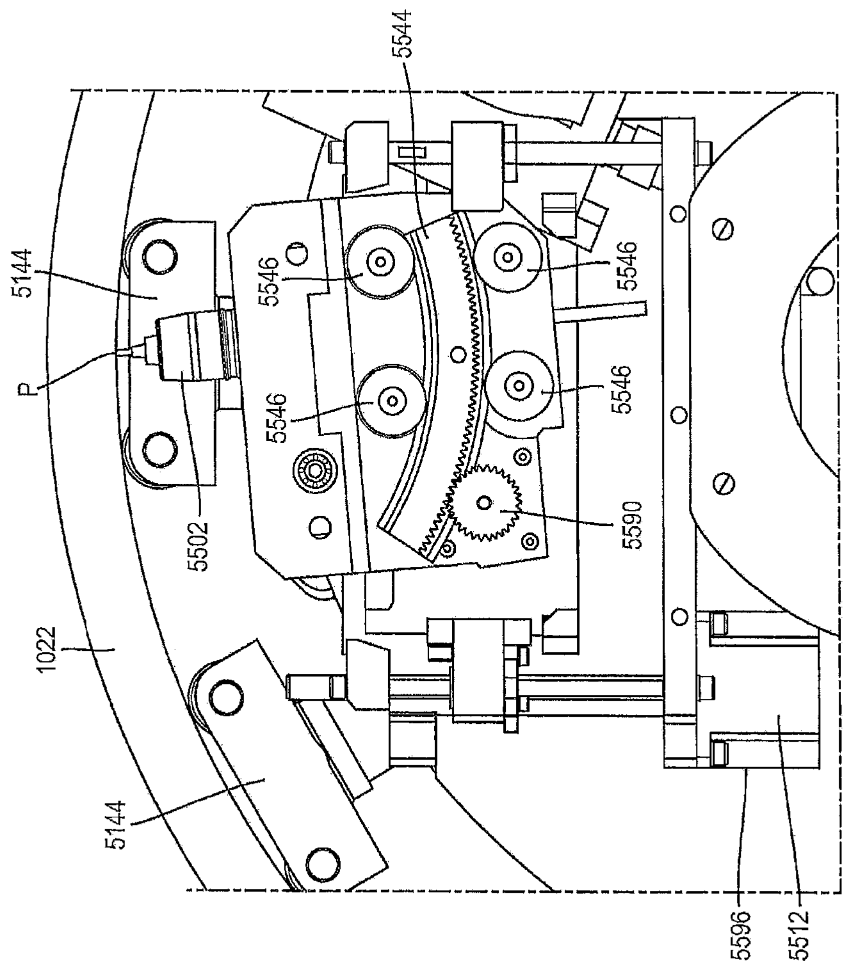
Figure 58:
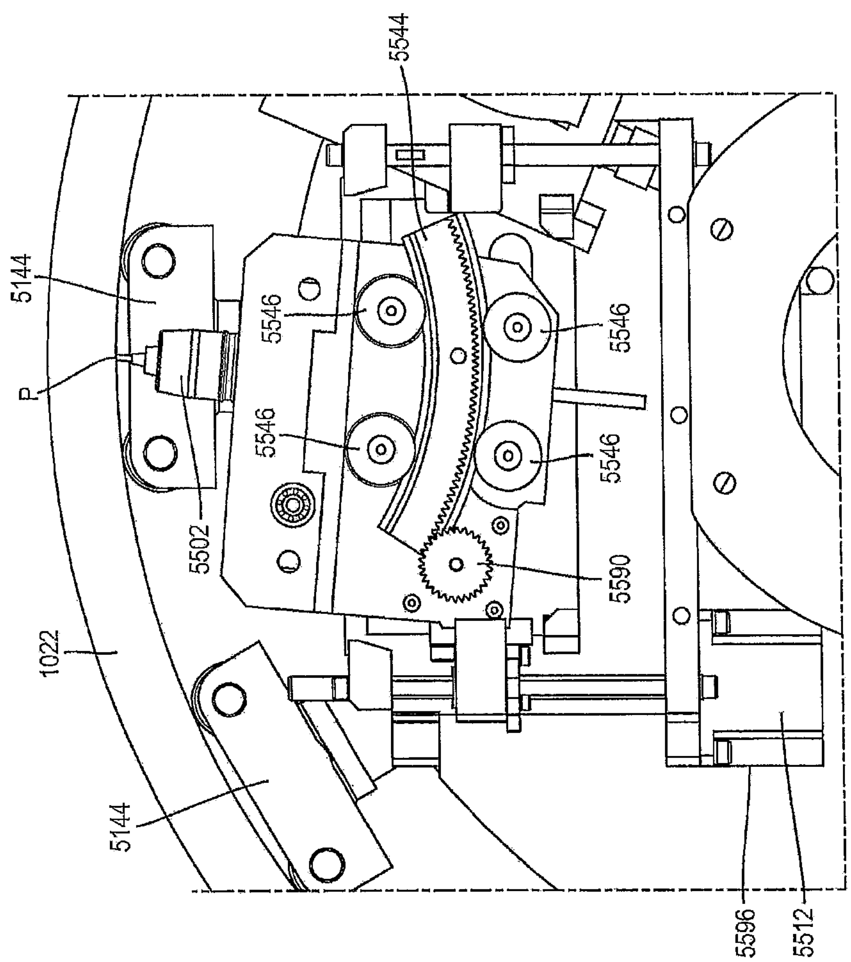
Figure 59:
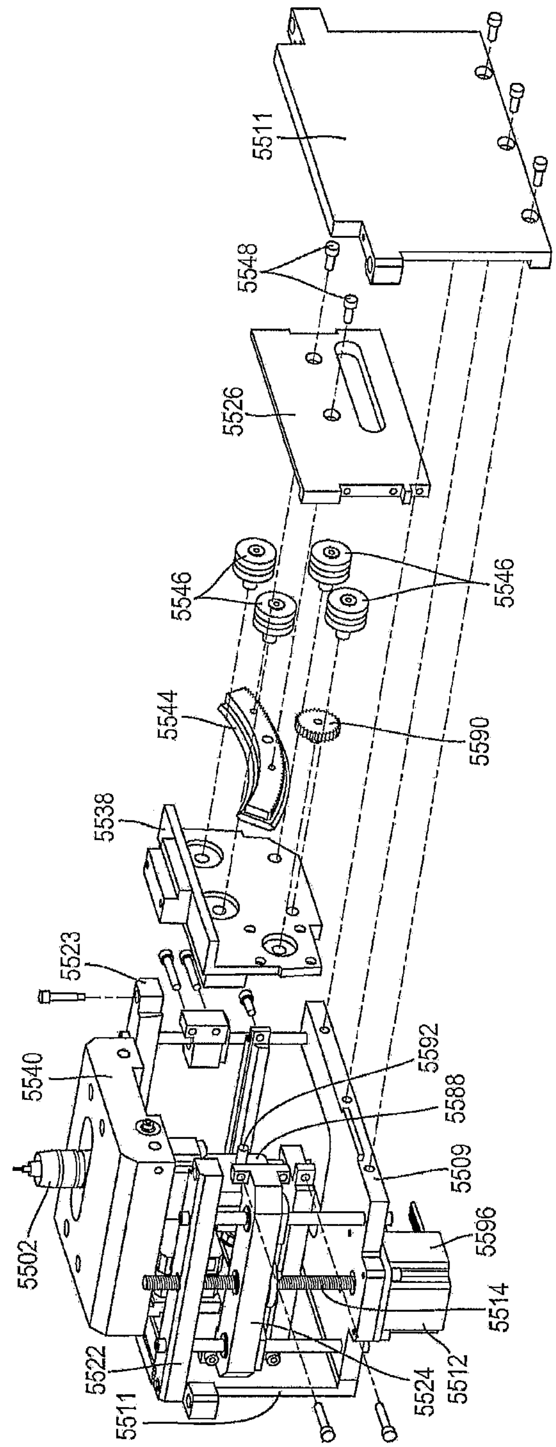
FIG. 59 shows an exploded view of the weld head assembly, where some components of the weld head assembly are not shown for sake of clarity, in accordance with an embodiment of the present patent application.

In one embodiment, one or more weld torch motors 5596 are configured to move the weld torch 5502 longitudinally (as shown in FIGS. 48 and 49) within the pipes 1022*a*, 1022*b*, toward and away from the inner surface 5130, 5132 (as shown in FIG. 33) of the pipes 1022*a*, 1022*b*. In one embodiment, one or more weld torch motors 5596 are configured to move the weld torch 5502 angularly relative to the weld (as shown in FIGS. 56 and 58). In one embodiment, the motors 5030 and 5074 are configured to move the weld torch 5502 circumferentially along the interface region 5136.

In one embodiment, the weld head assembly 5500 includes a radial positioning system 5506 that is configured to enable the radial movement of the weld torch 5502, an axial positioning system 5508 that is configured to enable the axial movement of the weld torch 5502. and a tilt positioning system 5510 that is configured to enable the tilt movement of the weld torch 5502.

In one embodiment, the torch housing assembly 5504 is constructed and arranged to enclose the weld torch 5502, the radial positioning system 5506, the axial positioning system 5508 and the tilt positioning system 5510 therein. In one embodiment, the torch housing assembly 5504 is configured to protect the components of the weld torch 5502 and various components of its positioning systems 5506, 5508, and 5510 from the welding heat and spatter.

In one embodiment, the torch housing assembly 5504 may include a base member 5509 and two side housing members 5511 and 5513. For example, the base member 5509 may be connected to the side housing members 5511 and 5513 using any suitable fastening mechanism (e.g., fastener members 5527). In one embodiment, the torch housing assembly 5504 may include a first transverse housing member 5522 and an opposing, second transverse housing member 5523 that are constructed and arranged to connect the side housing members 5511 and 5513 to each other at their top end portions. For example, the first and second transverse housing members 5522, 5523 may be connected to the side housing members 5511 and 5513 using any suitable fastening mechanism (e.g., fastener members 5525).

In one embodiment, referring to FIGS. 41-46, the weld torch 5502 is mounted for movement, by the radial positioning system 5506, such that the weld tip 5503 is configured to move towards and away from the weld surface 5130, 5132 of the pipes 1022*a*, 1022*b*. In one embodiment, the one or more processors 5140 are configured to control the one or more weld torch motors 5512 to adjust a radial distance of the weld tip 5503 from within the pipes 1022*a*, 1022*b* to the interface region 5136.

In one embodiment, the one or more processors 5140 are configured to control the one or more weld torch motors 5512 to move the weld tip 5503 radially away from the interface region 5136 after the root pass weld so as to accommodate the weld material deposited in the root pass weld and provide a hot pass weld on top of the root pass weld from within the pipes 1022*a*, 1022*b* (closer to the longitudinal axis A-A).

In one embodiment, the one or more processors 5140 that are configured to control the one or more weld torch motors may be part of the wire feed electronics module 5046.

In one embodiment, the radial positioning system 5506 is configured to enable the weld torch 5502 to move radially to track variations in the pipe shape, to adjust the weld tip-to-work piece (e.g., pipe) distance for multiple passes (e.g., root and hot pass weld procedures), and to retract away from the pipes 1022*a*, 1022*b* when the internal weld system is travelling.

In one embodiment, the radial positioning system 5506 is configured to provide the weld torch 5502 with a 1.25 inch radial travel. In one embodiment, the weld torch 5502 is moveable by the radial positioning system 5506 between a normal, non-raised configuration and a raised configuration. As shown in FIG. 43, the weld torch 5502 has been raised (to its raised configuration) by the radial positioning system 5506 so that the weld torch 5502 is positioned at the correct/desired/predetermined distance from the pipes 1022*a*, 1022*b* for the welding procedure.

In one embodiment, the radial positioning system 5506 may include a linear actuator. In one embodiment, the radial positioning system 5506 may include the radial weld torch (electric) motor 5512, a lead screw 5514, and a lead nut 5516. In one embodiment, the motor 5512 is configured (e.g., mechanically connected) to rotate the lead screw 5514. In one embodiment, the motor 5512 is configured to rotate either clockwise or counter clockwise direction so as to cause the raising or lowering of the weld torch 5502 substantially parallel to the radial axis R-R (as shown in FIG. 8) of the pipes 1022*a*, 1022*b*. In one embodiment, the motor 5512 is configured to be directly connected to rotate the lead screw 5514. In another embodiment, the motor 5512 is configured to be indirectly connected, e.g., through a series of gears or a gearbox, to rotate the lead screw 5514.

In one embodiment, the lead screw 5514 includes threads machined on its outer surface and extending along its length. In one embodiment, the lead nut 5516 is constructed and arranged to be threaded onto the lead screw 5514 and includes complimentary threads machined on its inner surface.

In one embodiment, the radial positioning system 5506 includes two front vertical guide rod members 5518 and 5520 that are positioned parallel to and on both sides of the lead screw 5514. In one embodiment, the front vertical guide rod members 5518 and 5520 are each connected to the base member 5509 of the torch housing assembly 5504 on one end thereof and connected to the first transverse housing member 5522 on the other end thereof. In one embodiment, the end portions of the front vertical guide rod members 5518 and 5520 are received in openings formed in the base member 5509 of the torch housing assembly 5504 to connect the front vertical guide rod members 5518 and 5520 to the base member 5509 of the torch housing assembly 5504. In one embodiment, the end portions of the front vertical guide rod members 5518 and 5520 are received in openings formed in the first transverse housing member 5522 to connect the front vertical guide rod members 5518 and 5520 to the first transverse housing member 5522.

In one embodiment, an end portion of the lead screw 5514 (that is opposite to its end portion connected to the motor 5512) is constructed and arranged to pass through an opening 5534 in the first transverse housing member 5522.

In one embodiment, the radial positioning system 5506 includes two rear vertical guide rod members 5600 and 5602 that are positioned parallel to the lead screw 5514 and the two front vertical guide rod members 5518 and 5520. In one embodiment, the rear vertical guide rod members 5600 and 5602 are each connected to the base member 5509 of the torch housing assembly 5504 on one end thereof and connected to the second transverse housing member 5523 on the other end thereof. In one embodiment, the end portions of the rear vertical guide rod members 5600 and 5602 are received in openings formed in the base member 5509 of the torch housing assembly 5504 to connect the rear vertical guide rod members 5600 and 5602 to the base member 5509 of the torch housing assembly 5504. In one embodiment, the end portions of the rear vertical guide rod members 5600 and 5602 are received in openings formed in the second transverse housing member 5523 to connect the rear vertical guide rod members 5600 and 5602 to the second transverse housing member 5523.

In one embodiment, the radial positioning system 5506 also includes a transverse radial positioning member 5524 and two vertical radial positioning members 5526. In one embodiment, the two vertical radial positioning members 5526 are connected to both end portions of the transverse radial positioning member 5524. In one embodiment, the transverse radial positioning member 5524 and the two vertical radial positioning members 5526 of the radial positioning system 5506 are configured to be movable during the radial movement of the weld torch 5502.

In one embodiment, the transverse radial positioning member 5524 may have protruding end portions 5528 that are configured to engage with notches or protruding end portions receiving openings 5530 of the two vertical radial positioning members 5526. In one embodiment, after the protruding end portions 5528 of the transverse radial positioning member 5524 are received in the notches or protruding end portions receiving openings 5530 of the two vertical radial positioning members 5526, the transverse radial positioning member 5524 and the two vertical radial positioning members 5526 may then be securely connected to each other using any suitable fastening mechanism (e.g., fastener members 5532).

In one embodiment, the transverse radial positioning member 5524 includes openings to receive the front vertical guide rod members 5518 and 5520 therethrough. This configuration enables the transverse radial positioning member 5524 to be slidable to adjusted positions on the front vertical guide rod members 5518 and 5520. In one embodiment, the lead screw 5514 is configured to pass through a central opening 5536 of the transverse radial positioning member 5524.

In one embodiment, the radial positioning system 5506 also includes two rear radial positioning members 5604 and 5606. In one embodiment, the two vertical radial positioning members 5526 are connected to the two rear radial positioning members 5604 and 5606. In one embodiment, the two rear radial positioning members 5604 and 5606 and the two vertical radial positioning members 5526 of the radial positioning system 5506 are configured to be movable during the radial movement of the weld torch 5502.

In one embodiment, each rear radial positioning members 5604 and 5606 have end portions that are configured to engage with end portions of its corresponding vertical radial positioning member 5526. In one embodiment, after the end portions of the rear radial positioning members 5604 and 5606 are engaged with end portions of the two vertical radial positioning members 5526, each rear radial positioning member 5604 and 5606 may then be securely connected to its corresponding vertical radial positioning member 5526 using any suitable fastening mechanism (e.g., fastener members 5608).

In one embodiment, the rear radial positioning members 5604 and 5606 include openings to receive the rear vertical guide rod members 5600 and 5602, respectively therethrough. This configuration enables the rear radial positioning members 5604 and 5606 to be slidable to adjusted positions on the rear vertical guide rod members 5600 and 5602.

In one embodiment, the lead nut 5516 is configured to interlock with a portion of the transverse radial positioning member 5524 so that the rotation of the lead nut 5516 is prevented along with the lead screw 5514. That is, the lead nut 5516 is restrained from rotating along with the lead screw 5514, therefore the lead nut 5516 is configured to travel up and down the lead screw 5514. In one embodiment, the lead nut 5516 is interlocked and positioned in the central opening 5536 of the transverse radial positioning member 5524. In one embodiment, the lead screw 5514 is configured to pass through an opening of the interlocked lead nut 5516.

In one embodiment, the two vertical radial positioning members 5526 are connected to each other using a front and a rear transverse support members 5610 and 5612. For example, the front transverse support member 5610 is constructed and arranged to be connected to the front, and bottom portions of the two vertical radial positioning members 5526 using any suitable fastening mechanism (e.g., fastener members 5614). The rear transverse support member 5612 is constructed and arranged to be connected to the rear and bottom portions of the two vertical radial positioning members 5526 using any suitable fastening mechanism (e.g., fastener members 5616).

In one embodiment, the weld assembly 5500 also includes two vertical positioning members 5538 and a top positioning member 5540. In one embodiment, the two vertical positioning members 5538 are each connected to end portions of the top positioning member 5540. In one embodiment, the end portions of the top positioning member 5540 each may have a L-shaped configuration. In one embodiment, corresponding connection portions of the two vertical positioning members 5538 may include complementary shaped configurations that are configured to engage with the L-shaped configurations of the end portions of the top positioning member 5540. In one embodiment, after the L-shaped configurations of the end portions of the top positioning member 5540 are engaged with the complementary shaped configurations of corresponding connection portions of the two vertical positioning members 5538, the top positioning member 5540 and the two vertical positioning members 5538 may then be securely connected to each other using any suitable fastening mechanism (e.g., fastener members 5542).

In one embodiment, the axial positioning system 5508 is configured to enable the weld torch 5502 to move axially to keep the weld torch 5502 in the weld bevel as the weld torch

5502 travels around the pipe and to allow the weld torch 5502 to oscillate within the weld bevel if needed to completely fill the bevel.

Figure 47:
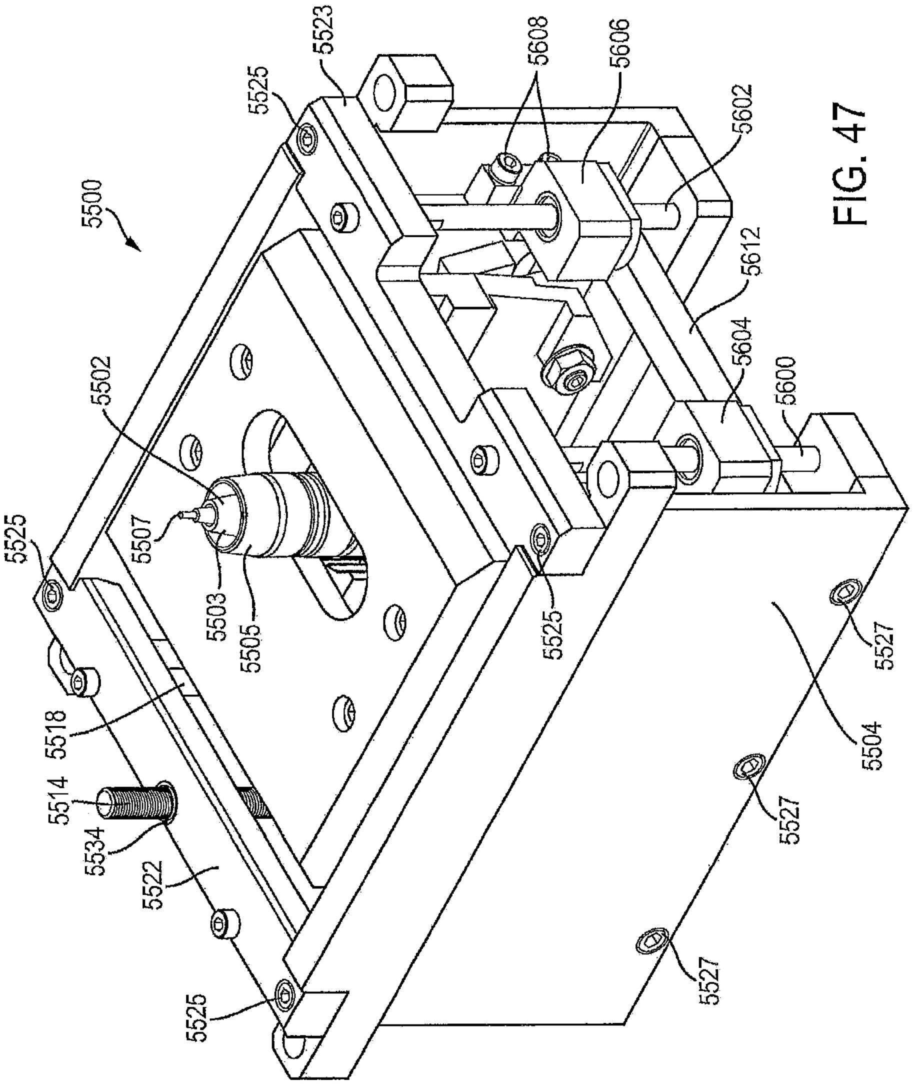
FIGS. 47, 48 and 49 show perspective views of the weld head assembly, where the weld torch is positioned, by an axial positioning system, in its centered axial position in FIG. 47, and the weld torch is positioned, by the axial positioning system, in the right and left axial positions in FIGS. 48 and 49, respectively, in accordance with an embodiment of the present patent application.

FIG. 47 shows the weld torch 5502 positioned in a normal, centered axial position. In one embodiment, the axial positioning system 5508 is configured to provide the weld torch 5502 with a +/−1 inch axial travel. For example, as shown in FIGS. 48 and 49, the weld torch 5502 has been moved by the axial positioning system 5508 to +1 inch of axial travel and −1 inch of axial travel, respectively so that the weld torch 5502 is positioned at the correct/desired/predetermined distance from the pipe for welding.

Figure 50:
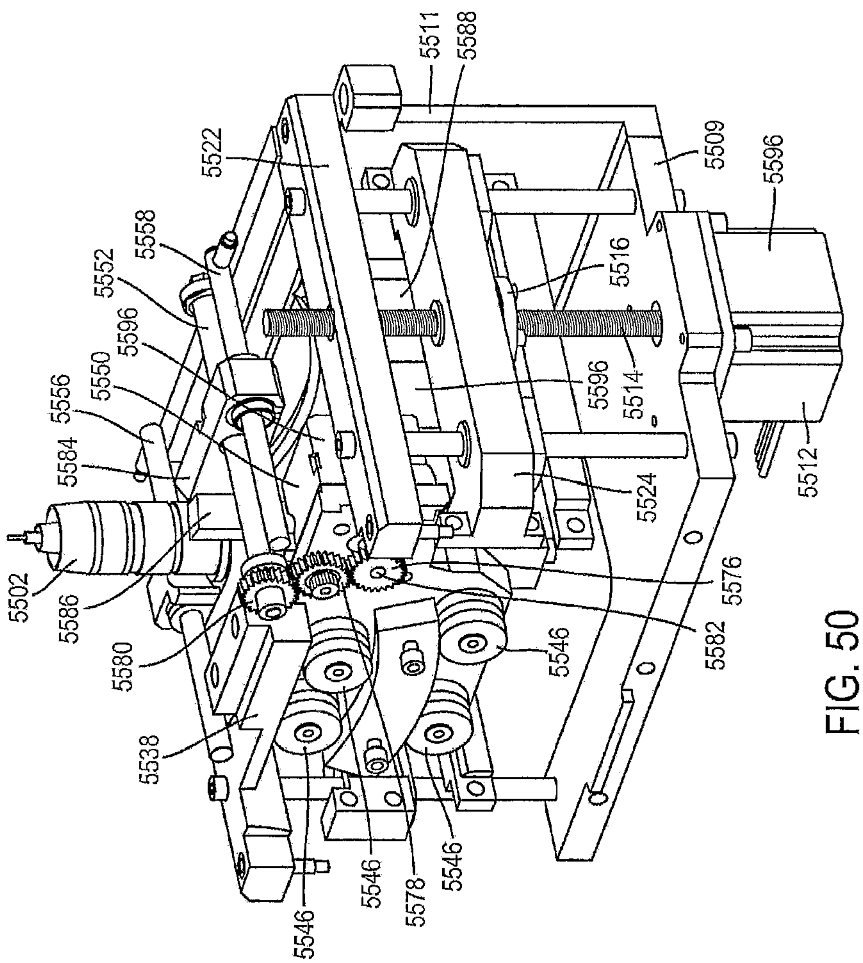
FIGS. 50 and 51 show a left side perspective view and an exploded view of the weld head assembly, where some components of the weld head assembly are not shown for sake of clarity, in accordance with an embodiment of the present patent application.
Figure 51:
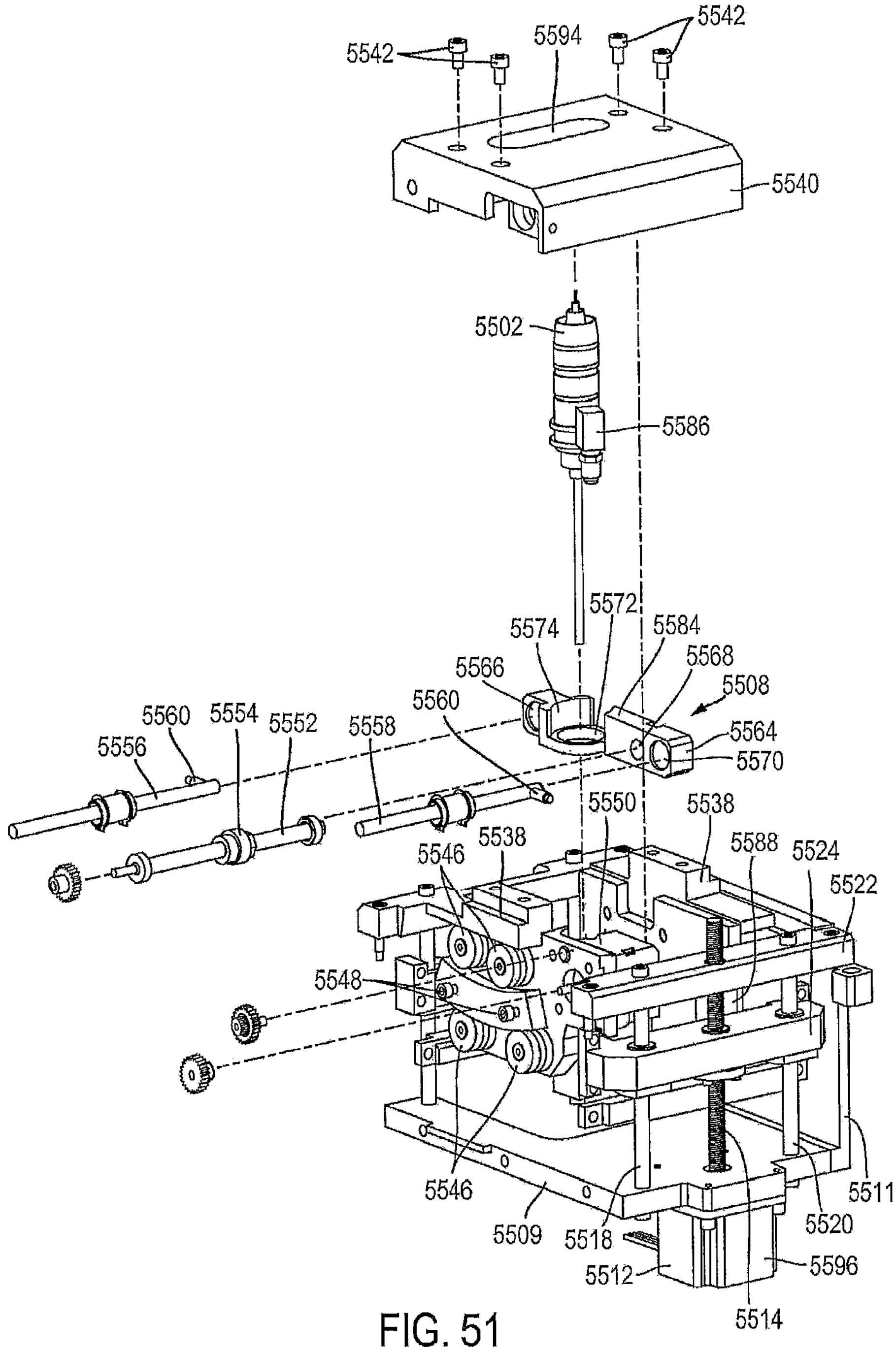
Figure 52:
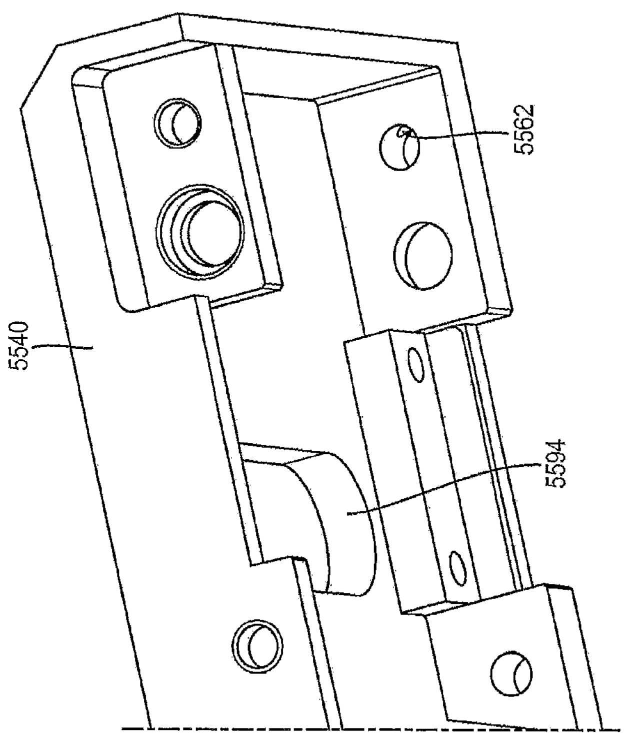
FIG. 52 shows a bottom perspective view of a top positioning member of the weld head assembly in accordance with an embodiment of the present patent application.
Figure 53:
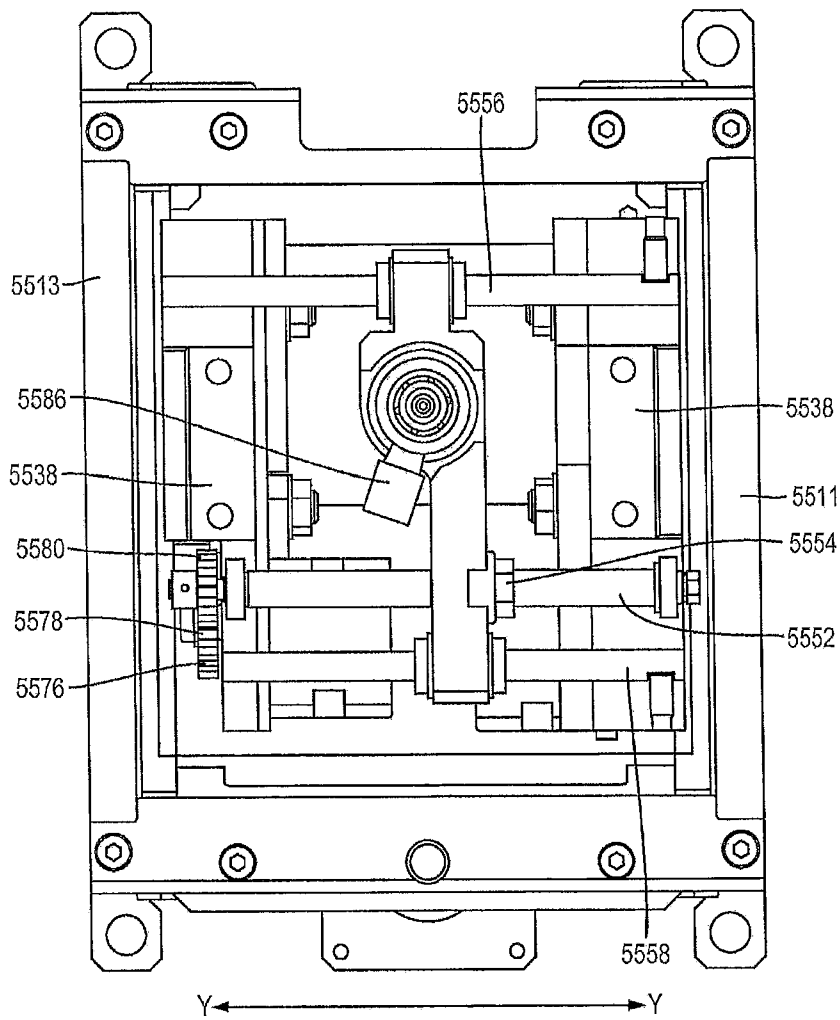
FIG. 53 shows a top elevational view of the weld head assembly, where some components of the weld head assembly are not shown for sake of clarity, in accordance with an embodiment of the present patent application.

FIGS. 50 and 51 show a left side perspective view and an exploded view of the weld head assembly 5500, where some components of the weld head assembly 5500 are not shown for sake of clarity. FIG. 52 shows a bottom perspective view of the top positioning member 5540 of the weld head assembly. FIG. 53 shows a top elevational view of the weld head assembly 5500, where some components of the weld head assembly 5500 are not shown for sake of clarity.

In one embodiment, referring to FIGS. 50-53, the axial positioning system 5508 may be a linear actuator. In one embodiment, the axial positioning system 5508 may include the axial weld torch (electric) motor 5550, a lead screw 5552, and a lead nut 5554. In one embodiment, the structure, the configuration and the operation of each of the motor 5550, the lead screw 5552 and the lead nut 5554 of the axial positioning system 5508 is similar to the motor 5512, the lead screw 5514 and the lead nut 5516 of the radial positioning system 5506 and, hence, will not be described in great detail here. In one embodiment, when the lead screw 5552 is rotated by the motor 5550, the lead nut 5554 is driven along the threads.

In one embodiment, the axial positioning system 5508 includes two horizontal guide rod members 5556 and 5558 that are positioned parallel to and on both sides of the horizontally positioned lead screw 5552. In one embodiment, each of the horizontal guide rod members 5556 and 5558 are connected to the top positioning member 5540 at both of their ends. In one embodiment, the end portions of the horizontal guide rod members 5556 and 5558 are received in openings formed in the top positioning member 5540 to connect the horizontal guide rod members 5556 and 5558 with the top positioning member 5540. In one embodiment, at least one end portion of each of the horizontal guide rod members 5556 and 5558 includes a protruding member 5560 that is configured to be received in a corresponding protruding member receiving portion 5562 formed in the opening of the top positioning member 5540 to secure the horizontal guide rod members 5556 and 5558 with the top positioning member 5540.

In one embodiment, the weld head assembly 5500 includes a weld torch frame 5564 that is configured to receive the weld torch 5502 therein. In one embodiment, the weld torch frame 5564 includes three horizontally extending openings 5566, 5568, and 5570 and a vertically extending opening 5572 formed therein. In one embodiment, the horizontal guide rod members 5556 and 5558 are configured to pass through the openings 5566 and 5570 of the weld torch frame 5564, respectively. In one embodiment, the horizontally positioned lead screw 5552 is configured to pass through the opening 5568 of the weld torch frame 5564. In one embodiment, the weld torch 5502 is configured to pass through the opening 5572 of the weld torch frame 5564. In one embodiment, the weld torch frame 5564 may include a support portion 5574 that is configured to support portions of the weld torch 5502, when the weld torch 5502 is received in the opening 5572 of the weld torch frame 5564.

In one embodiment, a portion 5584 of the weld torch frame 5564 is configured to engage with a portion 5586 of the weld torch 5502 so as to prevent any rotation of the weld torch 5502, when the weld torch 5502 is received in the opening 5572 of the weld torch frame 5564.

In one embodiment, the motor 5550 is configured (e.g., mechanically connected) to rotate the lead screw 5552. In one embodiment, the motor 5512 is configured to rotate either clockwise or counter clockwise direction so as to cause the left or right side movement of weld torch 5502 substantially parallel to the axial axis A-A (as shown in FIG. 8) of the pipes 1022*a*, 1022*b*. In one embodiment, the motor 5550 is configured to be indirectly connected, e.g., through a series of gears 5576, 5578, and 5580, to rotate the lead screw 5552. That is, the motor 5550 comprises an output shaft 5582 and the motor 5550 is operably connected to the lead screw 5552 through the gears 5576, 5578, and 5580 engaging the output shaft 5582 of the motor 5550. In one embodiment, the gear 5576 is connected to the output shaft 5582 of the motor 5550, the gear 5580 is connected or attached to the lead screw 5552, and the gears 5576 and 5580 are coupled to each other via the gear 5578. By connecting the motor 5550 to the lead screw 5552 through the gears 5576, 5578, and 5580, the lead screw 5552 turns when the motor 5550 operates. In another embodiment, the motor 5550 is configured to be directly connected (i.e., without the gear arrangement) to rotate the lead screw 5552.

In one embodiment, the lead nut 5554 is configured to interlock with a portion of the weld torch frame 5564 so that the lead nut 5554 is prevented from rotation along with the lead screw 5552. That is, the lead nut 5554 is restrained from rotating along with the lead screw 5552, therefore the lead nut 5554 is configured to travel/move side to side (i.e., substantially parallel to the axial direction Y-Y as shown in FIG. 53) with the lead screw 5552. In one embodiment, the lead nut 5554 is interlocked and positioned in the opening 5568 of the weld torch frame 5564. In one embodiment, the lead screw 5552 is configured to pass through an opening of the interlocked lead nut 5554.

In one embodiment, the tilt positioning system 5510 is configured to enable the weld torch 5502 to change its tilt angle in the plane of travel to account for changes in the direction of welding relative to the direction of gravity. In one embodiment, the tilt angle of the weld torch 5502 may be changed to accommodate the force of gravity. In one embodiment, the tilt angle of the weld torch 5502 may be adjusted to compensate for different orientation due to gravity. In one embodiment, the angular orientation of the weld torch 5502 is controlled based upon the profile of the interface region. In one embodiment, the tilt angle of the weld torch 5502 may be adjusted based on the on-the-fly weld profile data. In one embodiment, the tilt angle of the weld torch 5502 may be adjusted based on the on-the-fly weld profile data to accommodate and/or compensate for other weld conditions (i.e., not just the force of gravity).

Because the weld torch is able to articulate during the weld operation, it is able to take into account gravitational forces acting on the weld pool, as the weld torch rotates about the fixed pipe. Specifically, the angle of the weld torch can change by being operated by the at least one weld torch motor (i.e., the tilt weld torch motor 5588), based upon whether the weld is torch it traveling upwardly against the force of gravity, or downwardly with the force of gravity. The one or more motors (e.g., tilt weld torch motor 5588) can also change the weld angle within to rotational plane based up the specific location within the upwards or downwards travel of the weld torch. It should be appreciated that because the weld torch can be articulated for some embodiments, it can be better angled to accommodate the force of gravity, and need not be set in a fixed position under the assumption, for example, that it would only be traveling downwardly, with the force of gravity. In some embodiments, as noted above, the present application contemplates that welding can be accomplished while the weld torch is moving upwardly (against the force of gravity) or downwardly (with the force of gravity). In addition, the weld torch can be articulated based on the different rotational position (e.g., a welding operation conducted at 10 degrees from top dead center may ideally slightly different requirements than a weld conducted at 90 degrees from top dead center, due to (for example) gravitational forces applied to the weld pool, as well as the tendency for the weld pool to adhere to the interior surface of the pipe differently at different positions on the pipe to be welded.

In one embodiment, the motors 5030 and 5074 that direct the inspection detector 5056 also rotates the weld torch 5502 circumferentially about a rotational plane to create the weld along the interface region 5136. In one embodiment, the tilt positioning motor 5588 that angularly articulates the weld torch 5502 generally within the rotational plane. In one embodiment, the angular orientation of the weld torch 5502 is controlled based upon the position of the torch. In one embodiment, the weld torch 5502 is configured to pivot along the weld seam about the rotational plane.

In one embodiment, the weld torch 5502 may be configured such that the weld torch 5502 may include a different torch tilt angle for each 90° of rotation. For example, in one embodiment, the weld torch 5502 may include a tilt angle 1 when performing the weld procedure in a section boundary 1 from 2 o'clock position to 5 o'clock position, the weld torch 5502 may include a tilt angle 2 when performing the weld procedure in a section boundary 2 from 5 o'clock position to 8 o'clock position, the weld torch 5502 may include a tilt angle 3 when performing the weld procedure in a section boundary 3 from 8 o'clock position to 11 o'clock position, and the weld torch 5502 may include a tilt angle 4 when performing the weld procedure in a section boundary 4 from 11 o'clock position to 2 o'clock position. In one embodiment, the weld torch 5502 may be configured such that the weld torch 5502 may include a different torch tilt angle for each 30° of rotation. In one embodiment, the weld torch 5502 may be configured such that the weld torch 5502 may include a different torch tilt angle for each 60° of rotation. In one embodiment, the weld torch 5502 may be configured such that the weld torch 5502 may include a different torch tilt angle for each 120° of rotation. In one embodiment, the weld torch 5502 may be configured such that the weld torch 5502 may include a different torch tilt angle for any desired degrees of rotation.

In one embodiment, the weld torch 5502 may be configured to have a continuously variable torch tilt angle to compensate for or accommodate the continuously changing orientation of the weld torch due to gravity. In one embodiment, the weld torch 5502 may be configured to progressively change the torch tilt angle based upon the position at which the weld torch is (i.e., the position of the weld torch along the circumferential weld).

Figure 54:
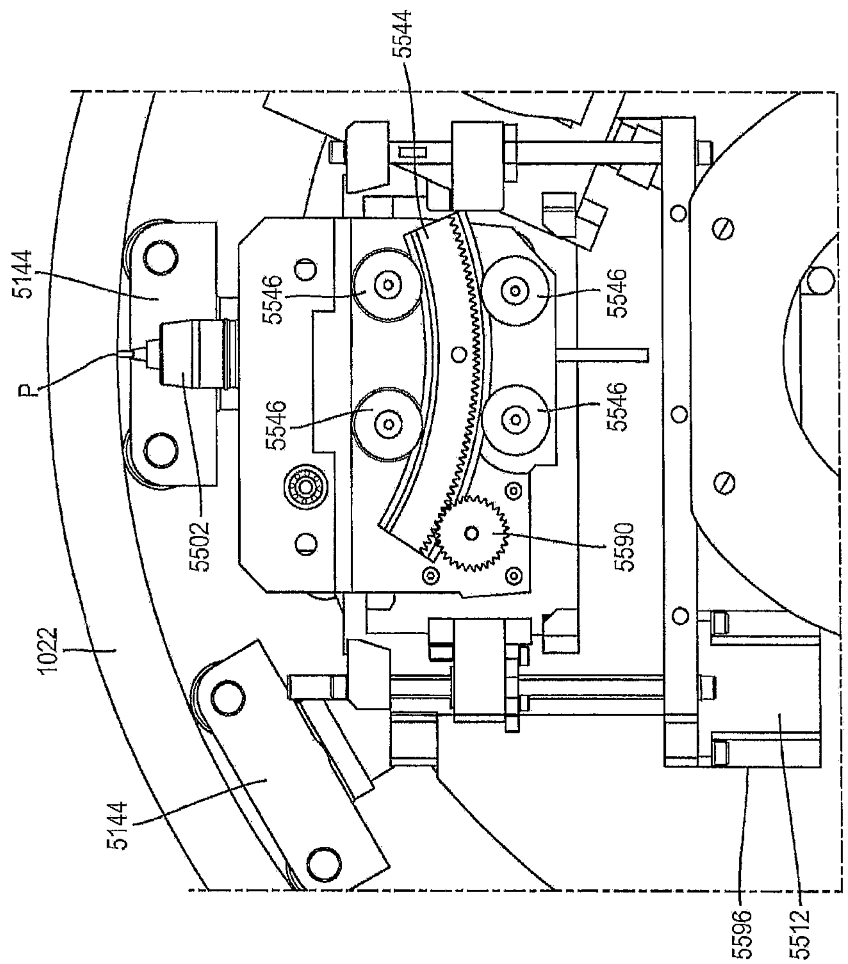
FIG. 54 shows a cross-sectional view of the weld head assembly wherein the weld torch is positioned in a normal, non-tilted position in accordance with an embodiment of the present patent application.
Figure 55:
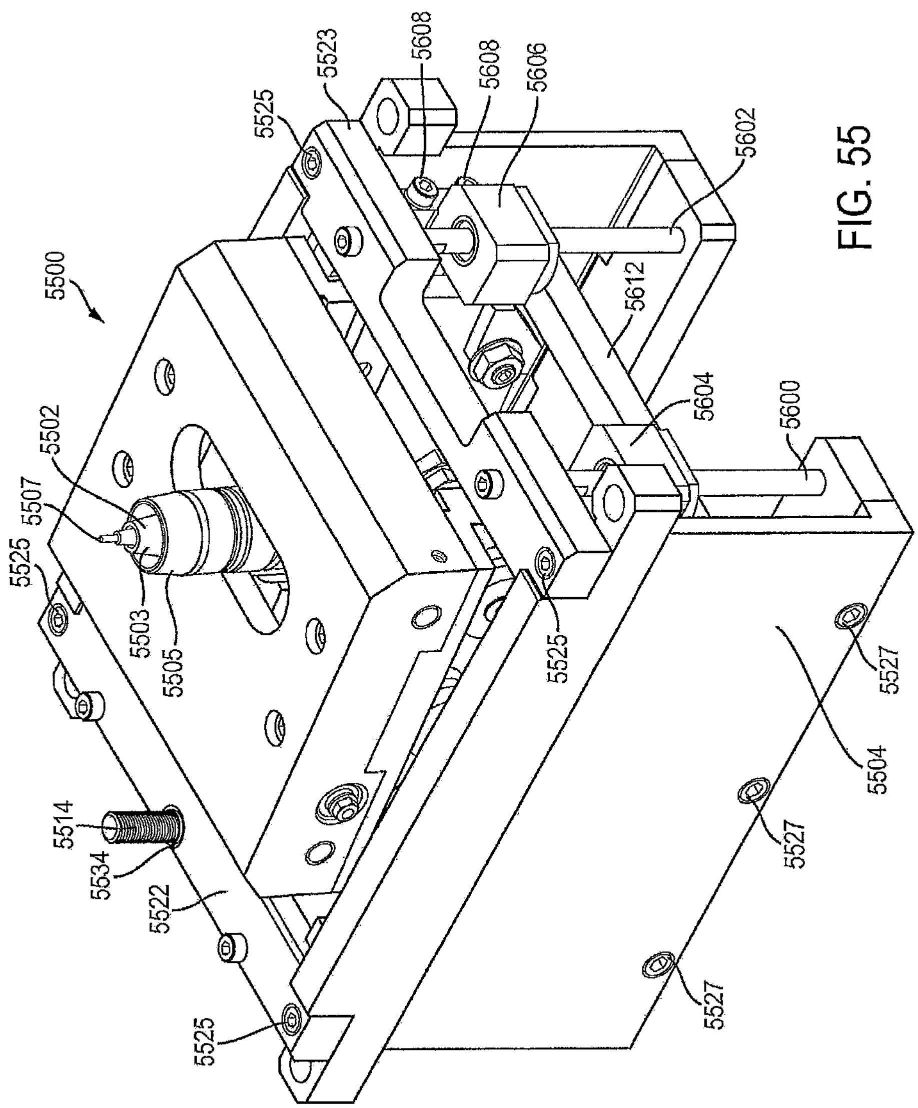
FIGS. 55 and 56 show a rear perspective view and a cross-sectional view of the weld head assembly, respectively, wherein the weld torch is positioned by a tilt positioning system to +5° of angular tilt in accordance with an embodiment of the present patent application.
Figure 57:
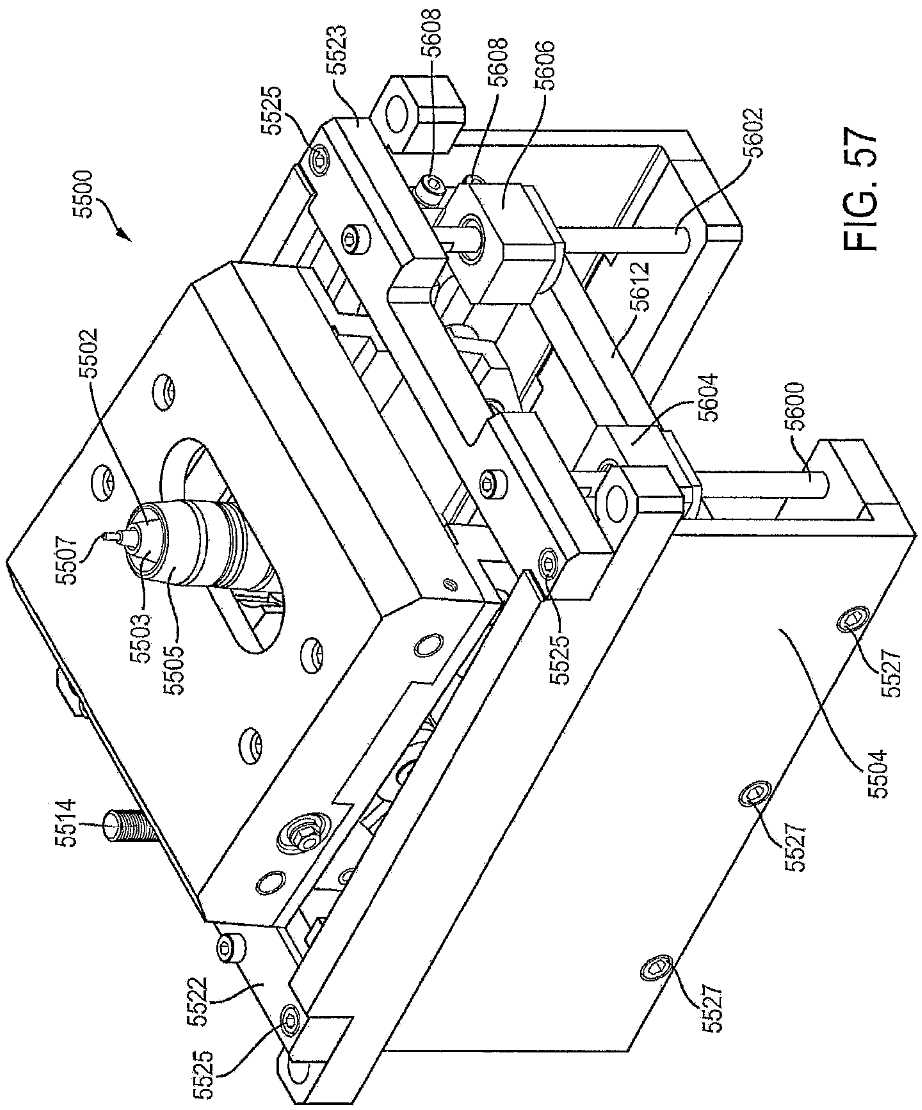
FIGS. 57 and 58 show a rear perspective view and a cross-sectional view of the weld head assembly, respectively, wherein the weld torch is positioned by a tilt positioning system to −5° of angular tilt in accordance with an embodiment of the present patent application.

FIG. 54 shows the weld torch 5502 is positioned in a normal, non-tilted position. In one embodiment, the tilt positioning system 5510 is configured to provide the weld torch 5502 with a +/−5° of angular tilt. For example, as shown in FIGS. 55 and 56, the weld torch 5502 has been moved by the tilt positioning system 5510 to +5° of angular tilt so that the weld torch 5502 is positioned at the correct/desired/predetermined distance from the pipe for welding. As shown in FIGS. 57 and 58, the weld torch 5502 has been moved by the tilt positioning system 5510 to −5° of angular tilt, respectively so that the weld torch 5502 is positioned at the correct/desired/predetermined distance from the pipe for welding. In another embodiment, the tilt positioning system 5510 is configured to provide the weld torch 5502 with a +/−7° of angular tilt. In one embodiment, the tilt positioning system 5510 is configured to provide the weld torch 5502 with less than +/−5° of angular tilt.

In one embodiment, a circumferential arc between the pivot point P and a point of impingement PI (as shown in FIGS. 56 and 58) of the inspection beam of radiation upon the interface region remains generally constant during a welding procedure. In one embodiment, the one or more processors 5140 have knowledge of a constant arcuate distance between the pivot point P (e.g., weld tip) and the point of inspection PI, so that the one or more processors 5140 are configured to control the articulation and pivoting movement of the weld torch 5502 based on the pre-weld profile inspection data.

The configuration of the weld torch 5502 that enables the weld torch 5502 to pivot about the pivot point P allows the angle of the weld torch 5502 to be changed while welding without affecting the speed at which the weld torch 5502 is travelling. For example, this is especially useful for weld systems with multiple weld torches. In one embodiment, the weld torches will not have their angles changed at the same time, in which case it would be beneficial for a torch's angle to be changed without any adverse effects on the other weld torches.

In one embodiment, the tilt positioning system 5510 includes the tilt weld torch motor 5588, guide rail members 5544, and guide rollers 5546. In one embodiment, the guide rail members 5544 are configured to be engaged with the guide rollers 5546 to facilitate the tilt positioning of the weld torch 5502. In the illustrated embodiment, the guide rollers 5546 may include two upper and two lower guide rollers. In one embodiment, the tilt positioning system 5510 includes one guide rail member 5544 and its four associated guide rollers 5546 positioned on opposing sides of the weld torch assembly 5500.

In one embodiment, the guide rollers 5546 are constructed and arranged to be connected to their corresponding vertical positioning members 5538. In one embodiment, each vertical radial positioning member 5526 is configured to be connected with a corresponding guide rail member 5544 using any suitable fastening mechanism (e.g., fastener members 5548). This configuration enables each vertical radial positioning member 5526 to be connected to the corresponding vertical positioning members 5538 through the engagement of the corresponding guide rail member 5544 and the guide rollers 5546.

In one embodiment, the motor 5588 is configured (e.g., mechanically connected) to rotate a gear 5590. In one embodiment, the motor 5588 is configured to rotate either clockwise or counter clockwise direction so as to cause the forward or rearward tilt movement of weld torch 5502. In one embodiment, the motor 5588 is configured to be connected, e.g., through the gear 5590, to the guide rail member 5544. That is, the motor 5588 comprises an output shaft 5592, and the gear 5590 is connected to the output shaft 5592 of the motor 5588. By connecting the motor 5588 to the guide rail member 5544 through the gear 5590, the guide rail 5544 moves when the motor 5588 operates.

In one embodiment, the guide rail member 5544 is configured to guide the upper and lower guide rollers 5546. In one embodiment, the upper and lower guide rollers 5546 are biased against the guide rail member 5544 such that the upper and lower guide rollers 5546 are configured to cause the corresponding vertical positioning member 5538 (connected thereto) to move and thereby enable the weld torch 5502 to change its tilt angle in the plane of travel.

In one embodiment, the two opposing vertical positioning members 5538 are connected to each other via the top positioning member 5540 such that the movement in one of the vertical positioning members 5538 (i.e., caused by the motor 5588) causes a similar movement in the other of the vertical positioning members 5538. The configuration of the two horizontal guide rod members 5556 and 5558 being connected to the top positioning member 5540 at both of their ends also facilitates the translation of the movement from one of the vertical positioning members 5538 to the other.

The operation of the radial positioning system 5506 is discussed in detail below. When the lead screw 5514 is rotated by the motor 5512, the lead nut 5516 is driven along the threads. In one embodiment, the direction of motion of the lead nut 5516 depends on the direction of rotation of the lead screw 5514 by the motor 5512.

As the lead nut 5516 is interlocked in the opening 5536 of the transverse radial positioning member 5524, the transverse radial positioning member 5524 is configured to travel/move (up or down) the lead screw 5514 along with the lead nut 5516. The slidable engagement between the transverse radial positioning member 5524 and the front vertical guide rod members 5518 and 5520 also facilitate this (up or down) travel/movement of the transverse radial positioning member 5524.

Also, as the transverse radial positioning member 5524 is connected to the two vertical radial positioning members 5526, the (up or down) movement of the transverse radial positioning member 5524 causes the (up or down) movement of the two vertical radial positioning members 5526.

The two vertical radial positioning members 5526 are also connected to the two rear radial positioning members 5604 and 5606. The (up or down) movement of the two vertical radial positioning members 5526 causes the (up or down) movement of the two rear radial positioning members 5604 and 5606 on the rear vertical guide rod members 5600 and 5602. The slidable engagement between the rear radial positioning members 5604 and 5606 and the rear vertical guide rod members 5600 and 5602 also aid the (up or down) travel/movement of the two vertical radial positioning members 5526.

As discussed above, each vertical radial positioning member 5526 is connected with the corresponding vertical positioning members 5538 through the engagement of the corresponding guide rail member 5544 and guide rollers 5546. Thus, the (up or down) movement of each vertical radial positioning member 5526 also causes the (up or down) movement of its corresponding vertical positioning member 5538. As the two vertical positioning members 5538 are securely connected to the top positioning member 5540, the (up or down) movement of the two vertical positioning members 5538 causes the (up or down) movement of the top positioning member 5540.

As the weld torch 5502 is connected to the top positioning member 5540 via the horizontal lead screw 5552, the two horizontal guide rod members 5556 and 5558 and the weld torch frame 5564, the (up or down) movement of the top positioning member 5540 also causes the (up or down) movement of the weld torch 5502. Thus, the weld torch 5502 is mounted for movement, by the radial positioning system 5506, such that the weld tip 5503 is configured to move towards and away from the weld surface of the pipes 1022*a*, 1022*b*.

The operation of the axial positioning system 5508 is discussed in detail below. When the lead screw 5552 is rotated by the motor 5550 via the gears 5576, 5578 and 5580, the lead nut 5554 is driven along the threads. In one embodiment, the direction of motion of the lead nut 5554 depends on the direction of rotation of the lead screw 5552 by the motor 5550.

As the lead nut 5554 is interlocked in the opening 5568 of the weld torch frame 5564, the weld torch frame 5564 is configured to travel/move (side to side) along with the lead nut 5554. The slidable engagement between the weld torch frame 5564 and the horizontal guide rod members 5556 and 5558 also facilitate this (side to side) travel/movement of the weld torch frame 5564. The slidable engagement between the two horizontal guide rod members 5556 and 5558 and the weld torch frame 5564 also aid the (side to side) travel/movement of the weld torch frame 5564 (and the weld torch 5502). In one embodiment, the amount of the axial movement of the weld torch frame 5564 is restricted by an elongated opening 5594 in the top positioning member 5540.

The operation of the tilt positioning system 5510 is discussed in detail below. When the gear 5590 is rotated by the motor 5588, the guide rail member 5544 is driven along the teeth. In one embodiment, the direction of motion of the guide rail member 5544 depends on the direction of rotation of the gear 5590 by the motor 5588.

In one embodiment, the upper and lower guide rollers 5546 that are biased against the guide rail 5544 are configured to cause the corresponding vertical positioning member 5538 (connected to the guide rollers 5546) to move/tilt.

In one embodiment, the configuration of the two opposing vertical positioning members 5538 being connected to each other via the top positioning member 5540 is such that the movement in one of the vertical positioning members 5538 (i.e., caused by the motor 5588) causes a similar movement in the other of the vertical positioning members 5538. The configuration of the two horizontal guide rod members 5556 and 5558 being connected to the top positioning member 5540 at both of their ends also facilitates the translation of the movement from one of the vertical positioning members 5538 to the other.

When the vertical positioning members 5538 and the top positioning member 5540 (along with the two horizontal guide rod members 5556 and 5558) are moved/titled, this movement enables the weld torch 5502 (connected to the two horizontal guide rod members 5556 and 5558 via the weld torch frame 5564) to change the tilt angle of the weld torch 5502 in the plane of travel.

As noted herein, the weld torch is mounted for movement in a manner such that when it is driven by the tilt weld torch motor 5588, it is articulated or pivoted about a point that is at, or slightly in front, the weld torch tip. For example, the weld torch tip may articulate about a point that sits in the weld pool that it creates during a welding operation. As a result, the position of the weld pool will not change relative to a radius drawn to the weld pool, irrespective of the fact that the weld torch may be articulated by the tilt weld torch motor. Thus, arc length between the weld pool and the point at which the radiation beam emitted from the inspection laser impinges upon the inner surface of the pipes to be welded (e.g., at the interface region) remains constant as the orientation motors rotate the weld torch and the inspection laser, irrespective of the articulation of the weld torch by the tilt weld torch motor. And because the speed and the orientation motors are also controlled and known by the one or more processors, the one or more processors can control weld parameters at a particular region of the interface region, knowing the fixed arc length and based on the processor calculating the detected weld profile at the upcoming region in front of the weld tip. In one embodiment, the orientation motors are provided with angular encoders operatively connected to the one or more processors to enable the one or more processors to determine the rotational position of the motors and hence the clamps and pipes as well. In another embodiment, signals from the inspection detector (e.g., inspection laser) are be used to detect movement of the pipe being welded, with such signals being used by the one or more processors, knowing the fixed arc length, to control the torch at the appropriate location corresponding to the determined position of the weld torch. In another embodiment, the point to articulation of the weld torch need not be at the position in front of, or at, the weld tip, and arc length between the weld pool and point of inspection laser beam impingement upon the interface regions need not remain constant. Instead, the one or more processors, receiving positional information of the weld torch tip from the one or more weld torch motors and/or the inspection detector is used to calculate the actual position of the weld tip relative to the pipe in real time ("on the fly") in order to control the one or more weld torch motors to position the weld torch tip in the desired location based upon the profile data received from the inspection detector.

As noted herein, the weld torch is mounted to be moved or driven by the one or more motors in a generally radial direction, along the longitudinal axis of the weld torch tip, either towards or away from the interior surface of the pipe being welded. It should be appreciated that because the longitudinal axis of the weld torch (e.g., through its weld torch tip) is likely not aligned with the radius of the pipe being welded (taken from the central axis) or the radius of the rotatable central hub, due to the fact that the weld torch is typically angled in a forward weld direction (and articulated by the tilt weld torch motor 5588, when referring to the "radial" movement of the weld torch and its tip towards and away from the interior surface of the pipe (e.g., the interface region), such radial movement is being used in the context described above. For example, such radial movement of the weld torch can be considered to refer to longitudinal movement of the weld torch along the weld torch tip axis. Because the weld torch is mounted for movement by the at least one weld torch motor, and specifically the radial weld torch motor 5512 to enable the torch tip is to move towards and away from the weld surface, the weld tip can be moved further away from the interface region after each weld pass to accommodate for weld material build-up. After the first and second pipe engagement structures are fixed relative to the pipes, the weld torch can be used to complete a full root weld pass, the "root" weld pass being the first weld applied between the pipe ends (e.g., one full 360 degree weld). After the root weld pass is completed, the weld tip can be moved (retracted) slight away from interior surface of the pipes (and in particular away from the weld material of the applied root pass weld) so that the second weld pass (also referred to as the "hot" pass weld can be conducted with the weld tip at an appropriate distance from the root pass weld material.

In one embodiment, the one or more processors 5140 operating the motors 5030 and 5074 and the one or more weld torches 5502 to generate a complete circumferential weld along the interface region 5136 by rotating the one or more weld torches 5502 along the interface region 5502 in a single rotational direction until the complete circumferential weld is completed.

In one embodiment, the one or more weld torches 5502 include a plurality of weld torches. In one embodiment, at least one of the plurality of weld torches weld in an upwards rotational direction while at least another of the plurality of weld torches and weld in an downwards rotational direction.

In one embodiment, the weld tip is configured to be pointing in the weld direction. In one embodiment, the weld torch is always pointing into the direction of travel. That is, basically, the weld tip is pointing generally in the direction of travel. In one embodiment, the weld torch tilt angle is slightly higher when the weld torch 5502 is performing an uphill weld procedure (where the weld torch 5502 is welding in an upwards rotational direction) and the weld torch tilt angle is slightly less performing a downhill weld procedure (where the weld torch 5502 is welding in a downwards rotational direction).

In one embodiment, the internal weld system is configured to perform the downhill weld procedure (i.e., weld in the downwards rotational direction) when using a short-arc weld procedure.

In one embodiment, when the internal weld system is configured to perform the uphill weld procedure (i.e., weld in the upwards rotational direction), the productivity and the quality of the weld may be improved. In one embodiment, the uphill weld procedure is configured to provide an option to weld both sides of the pipe at the same time instead of the downhill weld procedure being performed on each side in succession. For example, this may a multi-weld torch operation and having multiple weld overlaps. Alternatively, this may provide an option to weld 360° in one, continuous pass to produce a weld with only one overlap. In one embodiment, the requirements of the customer and the size of the pipe may dictate which approach would be used.

In one embodiment, unless there is a quality requirement for only having one weld overlap joint, the weld may be performed with as many weld torches as they fit inside the pipe. In one embodiment, the internal weld system 5004 may include four weld torches, six weld torches, or eight weld torches with half of those weld torches performing the weld in the downwards rotational direction and the other half of the weld torches performing the weld in the upwards rotational direction. In one embodiment, the half of those weld torches are configured to perform the clockwise weld procedure and the other half of the weld torches are configured to perform the counterclockwise weld procedure. In one embodiment, four weld torches of the internal weld system 5004 may be positioned 90° apart from each other and are configured to rotate 90° each. In one embodiment, six weld torches of the internal weld system 5004 may be positioned 60° apart from each other and are configured to rotate 60° each. In one embodiment, eight weld torches of the internal weld system 5004 may be positioned 45° apart from each other and are configured to rotate 45° each. In one embodiment, the internal weld system 5004 may include two weld torches positioned 180° apart from each other and are configured to rotate 180° each. In one embodiment, the internal weld system 5004 may include one weld torch that is configured to rotate 360°.

The ability to weld upwards as well as in the downwards direction may improve weld operation speed (weld throughput time) and also improve weld quality (by taking into account the gravitational forces at different locations). Also, where multiple weld torches are provided, welding can take place both upwardly and downwardly at the same time (e.g., plural, circumferentially spaced weld torches, moving in the same rotational direction and simultaneously applying weld material), with at least one weld torch moving upwards while at least another moves downwards. This is time efficient, for example, in comparison with welding downhill on each side of the pipe in sequence. Alternatively, in one embodiment, a single weld torch can be used to conduct a single 360-degree weld to provide a continuous weld, with no overlap of weld portions. Such overlap would occur when more than one weld torch is used and the end of each weld seam portion from a trailing weld torch needs to connect with and slightly overlap with the beginning of the weld seam portion applied by a weld torch in front of the trailing weld torch. As a result, for some applications where it may be desired to avoid portions of weld overlap (which make weld pass slightly less uniform at the points of overlap), the continuous 360-degree internal weld can be useful.

Figure 56A:
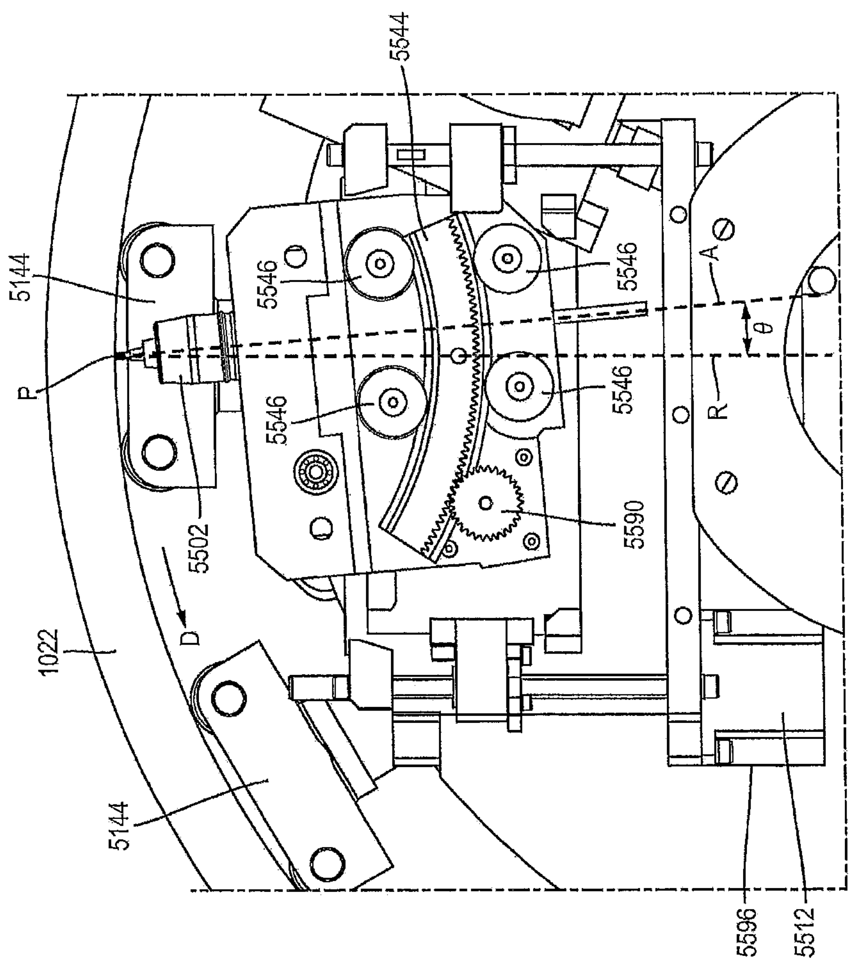
FIG. 56A shows a cross-sectional view of the weld head assembly in accordance with an embodiment of the present patent application

In one embodiment, the weld torches all point in a forward weld direction. In other words, they are pointed slightly in the weld direction so that the weld torch tip "pushes" the weld, rather than trailing the weld. This is true whether the weld torch is positioned internally, as in some embodiments, or externally as in other embodiments described herein. This is illustrated with respect to internal welder, as shown in FIG. 56A. In one embodiment, the weld torch tips are pointing at an angle θ (e.g., a "lead angle") of between 3 degrees to 7 degrees. The lead angle θ is defined as an angle measured between a line (radius) R from the axial center of the pipes being welded to weld torch tip (or the weld pool) as shown in FIG. 56A (the line R can also be considered the radius taken from the axial center of the rotational hub 5078 to the torch tip or weld pool), and a line passing through the longitudinal axis A of the weld torch tip. In the illustration of FIG. 56A, the weld torch is being rotationally moved in a counterclockwise direction, as depicted by the arrow D. That lead angle θ can be changed by operation of the tilt weld torch motor 5588 as the weld torch is moved circumferentially around the interior of pipes by the orientation motor. It is contemplated that the lead angle θ will be slightly higher (e.g., 6 degrees) when the weld torch is traveling upwardly, and slightly lower (e.g., 4 degrees) when traveling downwardly. In addition, in one embodiment, the lead angle θ can change continuously throughout the travel of a particular weld torch. In another embodiment, the pipe can be divided into sectors, with the weld angle θ being changed based on the sector. For example, in considering the full 360 degrees or movement to correspond to the hour hand on a clock, the pipe can be divided into the various o'clock sectors: 2-5, 5-8, 8-11, 11-2. The one or more motors can be operated by the one or more processors to change at the sector boundaries.

As will be appreciated from FIG. 56A, welding is being conducted in an counterclockwise direction in the depiction shown. For welding in a clockwise direction, the one or more processors 5140 sends a signal to the one or more torch motors so that the gear 5590 is rotated and the weld torch 5502 is pivoted (e.g., about point P), such that the axis through the torch (line A) is moved to the opposite side of the radial line R. As such, the angle θ will be negative for clockwise welding. This will enable the weld torch to point in the forwards direction ("pushing" the weld pool) when welding in the clockwise direction.

In one embodiment, as shown in FIGS. 60A-63, the internal weld system 5004 may include one weld torch WT, a camera C and two inspection detectors $L_1$ and $L_2$. In one embodiment, the weld torch WT and the camera C are separated by a 180° angle. In one embodiment, the angle between the camera and the weld torch WT may vary.

In one embodiment, one of the two inspection detectors $L_1$ and $L_2$ may be a leading inspection detector that is configured to lead the weld torch WT during the welding procedure and also to provide pre-weld data. In one embodiment, the other of the two inspection detectors $L_1$ and $L_2$ may be a trailing inspection detector that is configured to trail the weld torch WT during the welding procedure and to provide post-weld data.

In one embodiment, the inspection detector $L_1$ and the weld torch WT are separated by a 20° angle. In one embodiment, the inspection detector $L_2$ and the weld torch WT are separated by a 20° angle. In one embodiment, the angle between the inspection detector $L_2$ and the weld torch WT and the angle between the inspection detector $L_1$ and the weld torch WT may vary.

In one embodiment, the angle between the inspection detector $L_2$ and the weld torch WT and the angle between the inspection detector $L_1$ and the weld torch WT may be adjustable. For example, in one embodiment, when $L_1$ is a leading inspection detector, then the angle between the inspection detector $L_1$ and the weld torch WT is 20° or less and the angle between the trailing inspection detector $L_2$ and the weld torch WT is more than 20°. In one embodiment, when $L_2$ is a leading inspection detector, then the angle between the inspection detector $L_2$ and the weld torch WT is 20° or less and the angle between the trailing inspection detector $L_1$ and the weld torch WT is more than 20°.

Figure 60A:
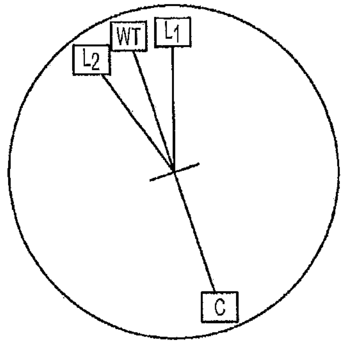
FIGS. 60A-63 show schematic views of the internal weld system with one weld torch, an inspection camera and two inspection detectors in accordance with an embodiment of the present patent application.
Figure 60B:
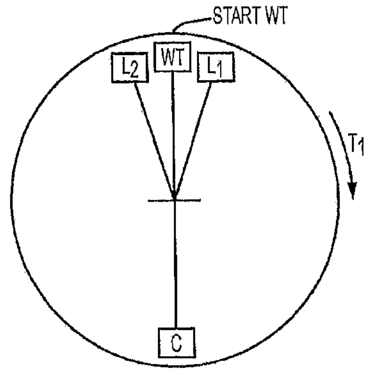
Figure 61:
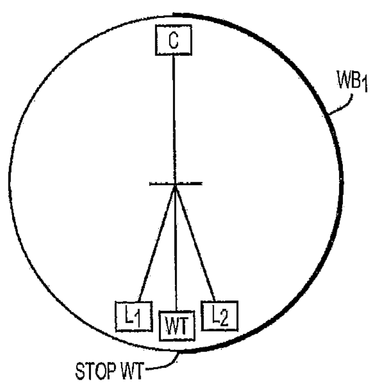

In one embodiment, as shown in FIG. 60A, the inspection detector $L_1$ is positioned at its start position. In one embodiment, referring to FIG. 60B, the weld torch WT starts the welding procedure when the weld torch WT is positioned at $Start_{WT}$. In one embodiment, the weld torch WT is configured to travel in a clockwise direction (as indicated by arrow $T_1$) during the welding procedure. In one embodiment, referring to FIG. 61, the weld torch WT ends the welding procedure when the weld torch WT reaches $Stop_{WT}$. In one embodiment, a weld bead $WB_1$ formed by the weld torch WT as it travels from $Start_{WT}$ to $Stop_{WT}$ in the clockwise direction indicated by the arrow $T_1$. In one embodiment, as shown in FIGS. 60B and 61, the torch WT follows the inspection detector $L_1$ during its travel from $Start_{WT}$ to $Stop_{WT}$ in the clockwise direction indicated by the arrow $T_1$. After the welding procedure, the weld torch WT is moved in a counter clockwise direction (i.e., opposite to the direction of the arrow $T_1$) such that the inspection detector $L_2$ is positioned back at its start position, $Start_{WT}$.

Figure 62:
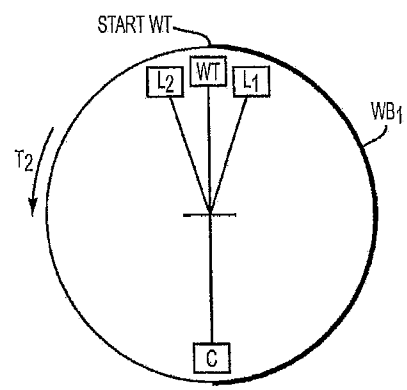
Figure 63:
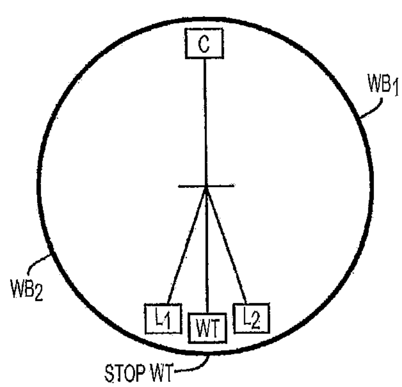

In one embodiment, referring to FIG. 62, the weld torch WT starts the welding procedure when the weld torch WT is positioned at $Start_{WT}$. In one embodiment, the weld torch WT is configured to travel in a counterclockwise direction (as indicated by arrow $T_2$) during the welding procedure. In one embodiment, referring to FIG. 63, the weld torch WT ends the welding procedure when the weld torch WT reaches $Stop_{WT}$. In one embodiment, a weld bead $WB_2$ formed by the weld torch WT as it travels from $Start_{WT}$ to $Stop_{WT}$ in the counterclockwise direction indicated by the arrow T2. In one embodiment, as shown in FIGS. 62-63, the torch WT follows the inspection detector $L_2$ during its travel from $Start_{WT}$ to $Stop_{WT}$ in the counterclockwise direction indicated by the arrow $T_2$. After the welding procedure, the weld torch WT is moved in a clockwise direction (i.e., opposite to the direction of the arrow $T_2$) such that the laser $L_1$ is positioned back at its start position, $Start_{WT}$.

In one embodiment, as shown in FIGS. 64-69, the internal weld system 5004 may include two weld torches $WT_1$ and $WT_2$, a camera C and one inspection detector L. In one embodiment, the inspection detector L and the weld torch $WT_1$ are separated by a 20° angle. In one embodiment, the inspection detector L and the weld torch $WT_2$ are separated by a 20° angle. In one embodiment, the inspection detector L and the camera C are separated by a 180° angle.

Figure 64:
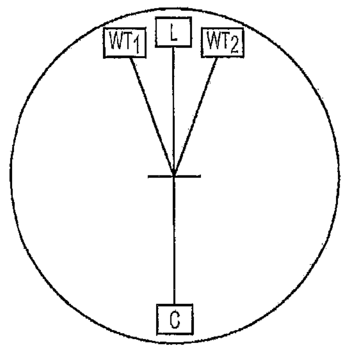
FIGS. 64-69 show schematic views of the internal weld system with two weld torches, an inspection camera and an inspection detector in accordance with an embodiment of the present patent application.
Figure 65:
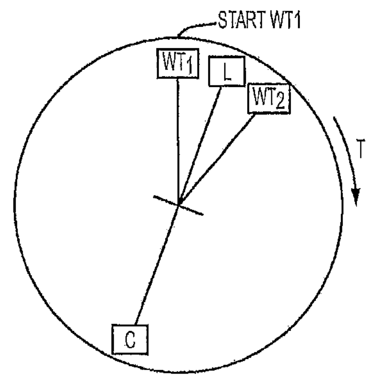
Figure 66:
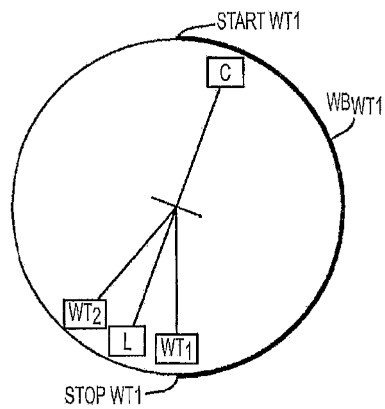
Figure 67:
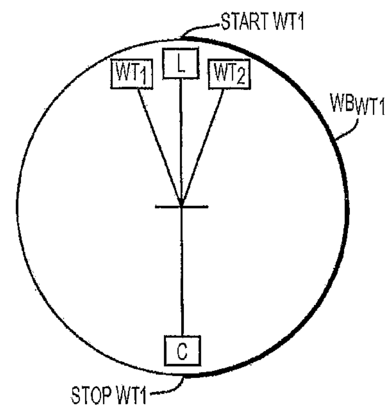

In one embodiment, as shown in FIG. 64, the inspection detector L is positioned at its start position. In one embodiment, referring to FIG. 65, the weld torch $WT_1$ starts the welding procedure when the weld torch $WT_1$ is positioned at $Start_{WT1}$. In one embodiment, the weld torch $WT_1$ is configured to travel in a clockwise direction (as indicated by arrow $T_1$) during the welding procedure. In one embodiment, referring to FIG. 66, the weld torch $WT_1$ ends the welding procedure when the weld torch $WT_1$ reaches $Stop_{WT1}$. In one embodiment, as shown in FIG. 66, a weld bead $WB_{WT1}$ is formed by the weld torch $WT_1$ as it travels from $Start_{WT1}$ to $Stop_{WT1}$ in the clockwise direction indicated by the arrow $T_1$. In one embodiment, as shown in FIGS. 64-66, the torch $WT_1$ follows the inspection detector L during its travel from $Start_{WT1}$ to $Stop_{WT1}$ in the clockwise direction indicated by the arrow $T_1$. After the welding procedure, the weld torch $WT_1$ is moved in a counter clockwise direction (i.e., opposite to the direction of the arrow $T_1$) such that the inspection detector L is positioned back at its start position as shown in FIG. 67.

Figure 68:
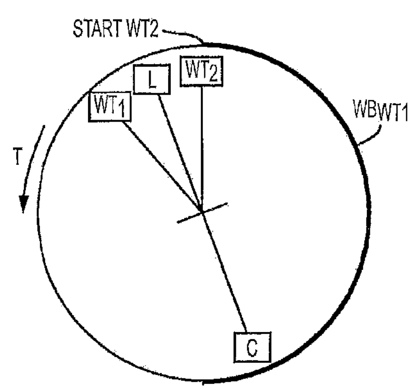
Figure 69:
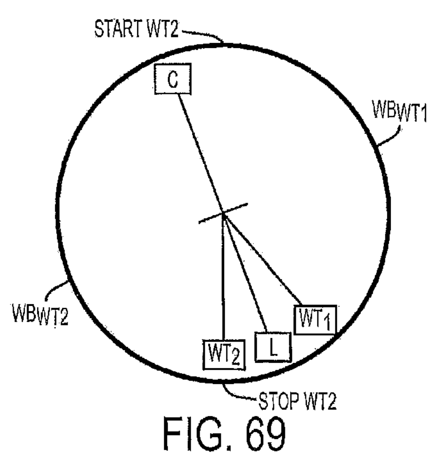

In one embodiment, referring to FIG. 68, the weld torch $WT_2$ starts the welding procedure when the weld torch $WT_2$ is positioned at $Start_{WT2}$. In one embodiment, the weld torch $WT_2$ is configured to travel in a counterclockwise direction (as indicated by arrow $T_2$) during the welding procedure. In one embodiment, referring to FIG. 69, the weld torch $WT_2$ ends the welding procedure when the weld torch $WT_2$ reaches $Stop_{WT2}$. In one embodiment, a weld bead $WB_{WT2}$ is formed by the weld torch $WT_2$ as it travels from $Start_{WT2}$ to $Stop_{WT2}$ in the counterclockwise direction indicated by the arrow $T_2$ as shown in FIG. 69. In one embodiment, as shown in FIGS. 68-69, the torch $WT_2$ follows the inspection detector L during its travel from $Start_{WT2}$ to $Stop_{WT2}$ in the counterclockwise direction indicated by the arrow $T_2$. After the welding procedure, the weld torch $WT_2$ is moved in a clockwise direction (i.e., opposite to the direction of the arrow $T_2$) such that the inspection detector L is positioned back at its start position as shown in FIGS. 64 and 67.

In one embodiment, the internal weld system 5004 may include one weld torch and one inspection detector. In one embodiment, the angle between the inspection detector and the weld torch may be 20° or less. In one embodiment, the inspection detector and the weld torch may be separated by an arc length AL (as shown in FIG. 64) of 3 inches. In one embodiment, the inspection detector and the weld torch may be separated by an arc length AL of 4 inches. In one embodiment, the angle between the inspection detector and the weld torch is 19°. In one embodiment, the angle between the inspection detector and the weld torch is 16°. In one embodiment, the angle between the inspection detector and the weld torch is 14°. In one embodiment, the angle between the inspection detector and the weld torch is 12°.

FIG. 70 shows a schematic diagram showing the flow of compressed air through the internal weld system 5004, where some components of the internal weld system 5004 are not shown for sake of clarity and to better illustrate the other components and/or features of the internal weld system 5004.

Referring to FIG. 70, the compressed air tank 5128, the brake cylinder 5133, the drive wheel cylinder 5137, brake valve 5190 and drive wheel valve 5192 are shown in the drive section 5010 of the internal weld system 5004. The rear rotary union 5072, the rear clamp control valve 5062, the rear clamp 5144 and the front clamp 5142 are shown in the center section 5008 of the internal weld system 5004. The front rotary union 5032 and the front clamp control valve 5018 are shown in the forward-most section 5006 of the internal weld system 5004.

In one embodiment, the compressed air tank 5128 has two separate fluid communication lines connected via a valve 5113. In one embodiment, the compressed air tank 5128 is in fluid communication through fluid communication lines with the brake valve 5190 (and the brake cylinder 5133), the drive wheel valve 5192 (and the drive wheel cylinder 5137), the rear clamp control valve 5062 (and the rear clamp 5144), the rear rotary union 5072, the front rotary union 5032, the front clamp control valve 5018 (and the front clamp 5142), and the compressor 5029.

The compressed air stored in the compressed air tank 5128 is sent through the fluid line to a valve 5194. A portion of the compressed air received by the valve 5194 is sent to the brake valve 5190 and the remaining portion of the compressed air received by the valve 5194 is sent to a valve 5196. The brake valve 5190 is in fluid communication through lines 5198 and 5199 with the brake cylinder 5133. In one embodiment, the brake valve 5190 is configured to supply the compressed air to actuate the brake cylinder 5133, when it receives signals from the drive section electronics module 5118. The compressed air operates the brake cylinder 5133 which through its operation provides a brake force to the drive rollers 5122. In one embodiment, the brake cylinder 5133 and the brake valve 5190 may be referred to as a brake system that is configured to secure the frame of the internal weld system 5004 from movement at a desired location within the pipes 1022*a*, 1022*b*. In one embodiment, the brake system that is configured to secure the frame of the internal weld system 5004 from movement at a desired location within the pipes 1022*a*, 1022*b* may include a wheel/roller lock. In one embodiment, the wheel/roller lock is configured to prevent the one or more of the rollers 5122 to secure the frame of the internal weld system 5004 from movement. In one embodiment, the brake system may also include a motor lock. In one embodiment, the motor lock is configured to prevent the rotation of the drive motors 5124 that drive the rollers 5122 for the locomotion of the frame of the internal weld system 5004.

A portion of the compressed air received by the valve 5196 is sent to the drive wheel valve 5192 and the remaining portion of the compressed air received by the valve 5196 is sent to a valve 5198. The drive wheel valve 5192 is in fluid communication through lines 5200 and 5201 with the drive wheel cylinder 5137. In one embodiment, the drive wheel valve 5192 is configured to supply the compressed air to actuate the drive wheel cylinder 5137, when it receives signals from the drive section electronics module 5118. The compressed air operates the drive wheel cylinder 5137 which through its operation provides a drive force to the drive rollers 5122. In one embodiment, the drive wheel cylinder 5137 may be operatively connected to an axle having the drive rollers 5122 thereon. In one embodiment, the drive wheel cylinder 5137 may be operatively connected to the axle via one or more gear arrangements.

In one embodiment, both the drive wheel cylinder 5137 and the brake cylinder 5133 are retracted when loading the internal weld system 5004 into the pipes. In one embodiment, the drive wheel cylinder 5137 is retracted only when the internal weld system 5004 is taken out of the pipes. In one embodiment, the drive wheel cylinder 5137 is extended to accelerate or decelerate (the travel of) the internal weld system 5004 in the pipes A portion of the compressed air received by the valve 5198 is sent to the rear rotary union 5072 and the remaining portion of the compressed air received by the valve 5198 is sent to the rear clamp control valve 5062. The rear clamp control valve 5062 is in fluid communication through lines 5202 and 5203 with the rear clamp 5144. In one embodiment, the fluid communication line 5202 is used for the extension of the clamps 5144 and the fluid communication line 5203 is used for the retraction of the clamps 5144. In one embodiment, the rear clamp control valve 5062 is configured to supply the compressed air to actuate and operate the rear clamp 5144, when it receives signals from the center section electronics module 5064.

The compressed air output by the rear rotary union 5072 is sent to the front rotary union 5032. The compressed air output by the front rotary union 5032 is sent to a valve 5204. A portion of the compressed air received by the valve 5204 is sent to the front clamp control valve 5018 and the remaining portion of the compressed air received by the valve 5204 is sent to the compressor 5029. In one embodiment, the compressor 5029 is configured to recharge the system (e.g., fill the tank with compressed air) using the received compressed air.

The front clamp control valve 5018 is in fluid communication through lines 5206 and 5207 with the front clamp 5142. In one embodiment, the fluid communication line 5206 is used for the extension of the front clamp 5142 and the fluid communication line 5207 is used for the retraction of the front clamp 5142. In one embodiment, the front clamp control valve 5018 is configured to supply the compressed air to actuate and operate the front clamp 5142, when it receives signals from the forward-most electronics module 5014.

Figure 71:
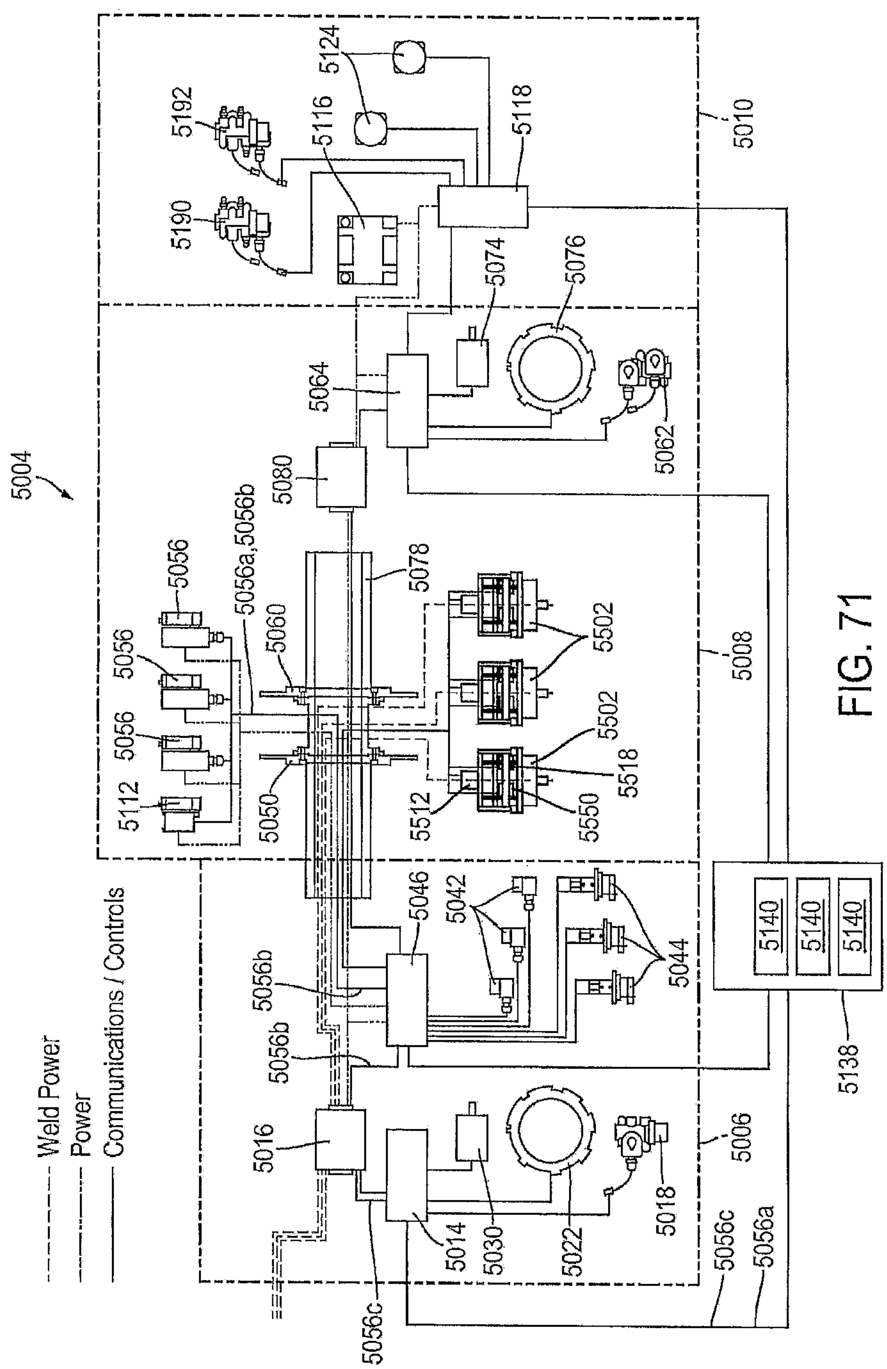
FIG. 71 shows a schematic diagram showing the flow of power, including weld power, communication data, and controls data through the internal weld system in accordance with an embodiment of the present patent application.

FIG. 71 shows a schematic diagram showing the flow of power including weld power, communication data, and controls data through the internal weld system 5004, where some components of the internal weld system 5004 are not shown for sake of clarity and to better illustrate the other components and/or features of the internal weld system 5004.

Referring to FIG. 71, the forward-most electronics module 5014, the front rotation motor 5030, the front position sensor 5022, the front clamp control valve 5018, the front slip ring 5016, the wire feed electronics module 5046 of the wire feed assembly 5020, the wire feed systems 5044, and the shield gas control valve 5042 are shown in the forward-most section 5006 of the internal weld system 5004. The rotatable hub 5078, the weld torches 5502, the inspection detectors 5056, the inspection camera 5112, the front clamp 5142 and the rear clamp 5144, the rear slip ring 5080, the center section electronics module 5064, the rear position sensor 5076, the rear clamp control valve 5062, and the rear rotation motor 5074 are shown in the center section 5008 of the internal weld system 5004. The batteries 5116, the drive section electronics module 5118, the brake valve 5190, the drive wheel valve 5192, and the drive motors 5124 are shown in the drive section 5010 of the internal weld system 5004.

In one embodiment, the weld power is received by the internal weld system 5004 from the umbilical 5034. In one embodiment, the weld power, from the umbilical 5034, is supplied to the weld torches 5502 via the front slip ring 5016.

In one embodiment, the batteries 5116 of the drive section 5010 are configured to supply the power to all the electronics modules in the internal weld system 5004, including the forward-most electronics module 5014, the wire feed electronics module 5046, the center section electronics module 5064 and the drive section electronics module 5118. In one embodiment, the batteries 5116 of the drive section 5010 are configured to supply the power to all the electric drive motors in the internal weld system 5004, including the front rotation motor 5030, the motors of the wire feed systems 5044, the rear rotation motor 5074, the drive motors 5124, the axial weld torch motor 5550, the radial weld torch motor 5512, and the tilt weld torch motor 5588.

In one embodiment, the power of the batteries 5116 is directly supplied to the rear slip ring 5080, the center section electronics module 5064 and the drive section electronics module 5118. In one embodiment, the power of the batteries 5116 is supplied to the front slip ring 5016 via the rear slip ring 5080. That is, the power of the batteries 5116 transfers from the rear slip ring 5080 to the front slip ring 5016. In one embodiment, the power from the batteries 5116 is supplied from the front slip ring 5016 to the forward-most electronics module 5014 and the wire feed electronics module 5046.

In one embodiment, the power of the batteries 5116 is supplied from the forward-most electronics module 5014 to the front rotation motor 5030 and from the wire feed electronics module 5046 to the motors of the wire feed systems 5044. In one embodiment, the power of the batteries 5116 is supplied from the center section electronics module 5064 to the rear rotation motor 5074. In one embodiment, the power of the batteries 5116 is supplied from the drive section electronics module 5118 to the drive motors 5124. In one embodiment, the power of the batteries 5116 is supplied from the wire feed electronics module 5046 to the axial weld torch motor 5550, the radial weld torch motor 5512, and the tilt weld torch motor 5588.

In one embodiment, the batteries 5116 are also configured to supply the power to the inspection camera 5112 and the inspection detectors 5056. For example, the power of the batteries 5116 is supplied from the wire feed electronics module 5046 to the inspection camera 5112 and the inspection detectors 5056.

In one embodiment, the batteries 5116 are also configured to supply the power to the front position sensor 5022 and the rear position sensor 5076. For example, the power of the batteries 5116 is supplied from the forward-most electronics module 5014 to the front position sensor 5022 and from the center section electronics module 5064 to the rear position sensor 5076.

In one embodiment, the batteries 5116 are also configured to supply the power to the front clamp control valve 5018, the shield gas control valve 5042, the rear clamp control valve 5062, the brake valve 5190, and the drive wheel valve 5192. For example, the power of the batteries 5116 is supplied from the forward-most electronics module 5014 to the front clamp control valve 5018, from the wire feed electronics module 5046 to the shield gas control valve 5042, from the center section electronics module 5064 to the rear clamp control valve 5062, and from the drive section electronics module 5118 to the brake valve 5190, and the drive wheel valve 5192.

In one embodiment, the internal weld system 5004 is configured to receive and send communication signals via the umbilical 5034 to the external computer system (e.g., have one or more processors). In one embodiment, a received communication signal may travel from the umbilical 5034 to the forward-most electronics module 5014, then to the wire feed electronics module 5046 via the front slip ring 5016, then to the center section electronics module 5064 via the rear slip ring 5080, and then to the drive section electronics module 5118.

In one embodiment, a communication signal may travel (in the opposite direction to the received signal) from the drive section electronics module 5118, then to the center section electronics module 5064, then to the wire feed electronics module 5046 via the rear slip ring 5080, then to the forward-most electronics module 5014 via the front slip ring 5016, and to the umbilical (and to the external computer system having one or more processors).

In one or more embodiments describe herein, and as may be appreciated from FIG. 71, the one or more processors 5140 are operatively associated with inspection detector 5056, e.g., inspection laser (or optionally plural inspection detectors 5056 where more than one is provided) through a hardwired communication line or lines 5056*a* that transmits signals from the inspection laser 5056 to the one or more processors 5140. The hardwired communication line has (i) a movable portion 5056*b* that moves with inspection detector(s) 5056 while the inspection laser directs the inspection beam along the interface region, and (ii) a stationary portion 5056*c* that remains fixed during movement of the movable portion 5056*b*. The system further comprises the previously described front slip ring 5016 (which can be, from one perspective, considered part of the hardwired communication line) that provides an interface between a section of the movable portion 5056*b* and a section of the fixed portion 5056*c* of the communication line to enable the signals to pass from the movable portion 5056*b* to the stationary portion 5056*c*.

It should be appreciated that the hardwired communication line or lines 5056*a* (including the movable and stationary portions thereof) are also configured (or alternatively configured if wireless communications are provided for the inspection detectors 5056 to communicate with the one or more processors) to transmit power to the inspection detectors 5056 through the slip ring 5016.

The slip ring 5016 comprises an outer stator 5016*a* and an inner rotor 5016*b* (see FIG. 26). The inner rotor 5016*b* and stator 5016*a* have a bearing 5016*k* therebetween. The stator 5016*a* is fixedly mounted with respect to the center frame 5068 (see FIGS. 23 and 24), while the rotor 5016*b* is connected with the rotatable hub 5078 at its central axis (e.g., see FIG. 24). The rotor 5016*b* is rotated along with the rotatable hub 5078 when the hub is driven for rotation. The stator 5016*a* is connected with the stationary portion 5056*c* of the hardwire communication line, and rotor 5016*b* connected with the movable portion 5056*b* of the hardwire communication line, as shown in FIG. 26. As seen in FIG. 26, the rotor 5016*b* of the front slip ring 5016 has a hollow cylindrical configuration, with a central passage 5016*d* therethrough. The passage 5016*d* allow the passage of other conduits or lines therethrough, and specifically, for example, pneumatic lines from the front rotary union (such as external compressed air lines that will be communicated to compressed air tank 5128).

As can be appreciated, the hardwiring between the inspection detector 5056 and the one or more processors 5140 can, in some embodiments, travel through other components as well. For example, as shown in FIG. 71, the communication line from the inspection detector 5056 may travel through the wire feed electronics 5046 before being received by the slip ring 5016.

The slip ring 5016 permits the movable portion 5056*b* of the communication line to move with rotatable hub 5078, as the hub 5078 rotates during a scanning operation of the inspection detector 5056, during a pre-weld scan of the interface region between the pipes prior to a welding operation, as well as during the on-the-fly scan of the interface region between the pipes during a welding operation.

It should also be appreciated that the slip ring 5016 is further configured to couple the communication connection between the one or more processors 5140 and the inspection camera 5112, as well as provide power to the inspection camera 5112. This can be done through the same hardwired communication line or lines 5056*a* The one or more processors 5140 are configured to receive camera inspection data from the inspection camera 5112 prior to, subsequent to, or during a weld operation. The movable portion 5056*b* moves with the camera (and rotatable hub 5078) while the camera scans the interface region, and stationary portion 5056*c* remains fixed during movement of the movable portion 5056*b* that communicates with the camera 5112.

It should further be appreciated that the same slip ring 5016 (and/or slip ring 5080) are configured to communicate power to other components that may rotate with the rotatable hub 5078. For example, as illustrated in FIG. 35B, weld power lines 5502*k* for providing weld power to the weld torches 5502, and power and command lines 5550*k* for controlling and powering the one or more weld torch motors 5550, 5512, 5588 for controlling the weld torch are all lines that are configured to pass through slip ring 5016. For example, for illustrative purposes in FIGS. 26 and 35B, the stationary portion of the hardware power line for the weld power line 5502*k* is labeled as 5112*c* and the movable portion of the weld power line is labeled as 5112*b*. It can be appreciated that they could alternatively be represented by showing additional lines into the same slip ring 5016, or shown in connection with a separate slip ring.

Similarly, a hardwired communication line 5550*k* can be provided through slip ring 5016 to provide command (and control), as well as power to the torch motors 5550, 5512, 5588. For sake of simplicity sake, and without the need for redundancy, the movable portion 5550*m* is of this hardwired line 5550*k* is shown in FIG. 35B, but not shown in FIG. 26. It should be appreciated that this FIG. 26, as well as FIG. 71, are used to illustrate how slip ring 5016 (or another slip ring) can be used to transmit power and communication to the weld torches 5502 as the weld torches are rotated with the rotatable hub 5078, and as they are powered and controlled to create a weld during a welding operation.

As shown in FIG. 35B (and several other figures), the rotatable hub 5078 has a generally hollow cylindrical portion 5078*a*. The middle of the cylindrical portion, at a region that is generally axially aligned with the weld torches, lasers and camera, has a plurality of openings or slots 5078*b* therethrough. The openings 5078*b* allow the movable power lines and communication lines from the slip ring 5016 (and optionally from slip ring 5080) to pass radially outwardly from the interior 5078*c* of the rotatable hub 5078 to the exterior of the hub 5078 for connection with the weld torches, lasers, and camera.

It should be appreciated that while the rotatable hub 5078 shown and described herein has a generally cylindrical configuration, the hub can be of a different shape. The rotatable hub can be of any tubular shape (e.g., with a hollow square or triangular configuration, just for example). In addition, the rotatable hub can also be interchangeably termed a "rotatable frame."

As shown and described above, the inspection detector 5056 is mounted on the exterior of the tubular hub, the tubular hub having opposite ends and a radial opening 5078*b* between the ends. The movable portion 5056*b* of the power and communication lines extending from the front slip ring 5016 and wire feed electronics module 5046 extends through the interior 5078*c* of the tubular hub 5078, through the radial opening 5078*b*, and connected with the one or more inspection detectors 5056.

As can also be appreciated from FIGS. 24 and 35B, a pneumatic line 5032*a* carrying shield gas (an inert gas) passes through the rear rotary union 5072, through the opening 5080*d* in the slip ring, and travels through the hollow interior 5078*c* of the rotatable hub 5078 to one of the shield gas valves 5042 (see FIG. 72), the valves being mounted in the wire feed electronics module 5046 (see FIG. 71) which is mounted on the rotatable hub 5078 for rotation therewith. The pneumatic line 5032*a*, which is a movable line that moves with the rotation of the rotatable hub 5078, after connecting with the shield gas valves 5042, doubles back and again extends through the hollow interior 5078*c* of the rotatable hub 5078 (thus two lines 5032*a* are shown in FIG. 24). The pneumatic line 5032*a* passes through one or more of the openings 5078*b* so as to be directed into the vicinity of the tip of the weld torch 5502. The pneumatic line 5032*a* shown in FIG. 35B comprise movable portions of the pneumatic line that will rotate with rotation of the rotatable hub. 5078.

FIG. 25 is a partial sectional view of the front rotary union 5032, which is essentially of the same construction of the rear rotary union 5072. The front rotary union 5032 is used to communicate compressed air from an external source 5029 to an on-board compressed air tank 5128. The front rotary union comprises a stator 5032*d* and a rotor 5032*e*. The rotor 5032*e* is mounted on the stator 5032*d* by ball bearings 5032*f* The stator 5032*d* is fixed relative to the center frame 5068, and the rotor 5032*e* is coupled to the movable portion 5072*d* of the pneumatic line, the opposite end of movable portion 5072*d* connecting with the rotor or the rear rotary union 5072. The movable portion 5072*d* of the pneumatic line passes through the central passage 5016*d* of the slip ring 5016 so as to be introduced into the interior 5078*c* of the rotatable hub 5078 and then to the rotor of the rear rotary union 5072.

It should be appreciated that while front slip ring 5016 is illustrated in FIG. 26 and the front rotary union 5032 is illustrated in FIG. 25, the same configurations for each will apply to the rear rotary union 5072 and the rear slip ring 5080.

The manner in which the movable portion of the pneumatic line passes through the central passage 5016*d* of slip ring 5016 can be further appreciated from the cross sectional view of FIG. 24, which illustrates this attribute in the context of how this applies to the rear slip ring 5080 and rear rotary union 5072. Specifically, the rear rotary union 5072 has an outer stator 5072*a* and an inner rotor 5072*b*. The rotor 5072*b* receives compressed air from a rotatable pneumatic supply line 5072*d* (See FIGS. 24 and 70; it should be appreciated that FIG. 70 is a schematic drawings and the line 5072*d* is drawn schematically in FIG. 70, but passes through the interior 5078*c* of the rotatable hub as shown in FIG. 24). The rotatable supply line 5072*d* is connected at its opposite end to the rotor of the front rotary union 5032. Specifically, the external supply tank 5029 first passes the compressed gas through the stator of the front rotary union 5032 and then exits out through the rotor of the front rotary union 5032. The front rotary union 5032 has its rotor operatively connected with the rotatable hub 5078 so as to be rotatable together. The rotatable supply line 5072*d* passes from the rotor of the front rotary union 5032 to the rotor 5072*b* of the rear rotary union 5072. The compressed air passed through the stator 5072*a* of the rear rotary union to a stationary pneumatic supply line 5072*f* extending therefrom. The fixed pneumatic supply line 5072*f* is connected through valves to the compressed air tank 5128, which receives compressed air from the external supply tank 5029 periodically, when tank 5128 is depleted. As seen in FIG. 24, the rotatable supply line 5072*d* passes from the rotor 5072*b* through the central opening 5080*d* in the rear slip ring 5080. The movable pneumatic supply line 5072*d* then passes through the through passage 5078*c* within the rotatable hub 5078 for connection with the front rotary union 5032.

As can be seen in FIG. 24, the rear slip ring 5080 has an inner rotor 5080*r*, an outer stator 5080*s*, and a bearing 5080*m* therebetween.

As can also be appreciated from FIGS. 24, 72, the rear rotary union 5072 also has another stationary line 5072*g* that receives shield gas from the shield gas tanks 5262 to be described in greater detail later. The shield gas passes from the stator 5072*a* to the rotor 5072*b*, and then out from the rotor through the movable pneumatic line 5032*a*. The movable pneumatic line 5032*a* passes through the opening 5080*d* in the slip ring and into passage 5078*c*. The pneumatic line 5032*a* moves with the rotation of the rotatable hub 5078. The opposite end of the pneumatic line 5032*a* connects with the shield gas valves 5042 and then doubles back (hence two lines 5032*a* shown in FIG. 24) and passes to weld torches 5502. In traveling to the weld torches 5502, the movable pneumatic line 5032*a* passes through the openings 5078*b* in the rotatable hub 5078, as can be appreciated from FIG. 72.

Figure 94:
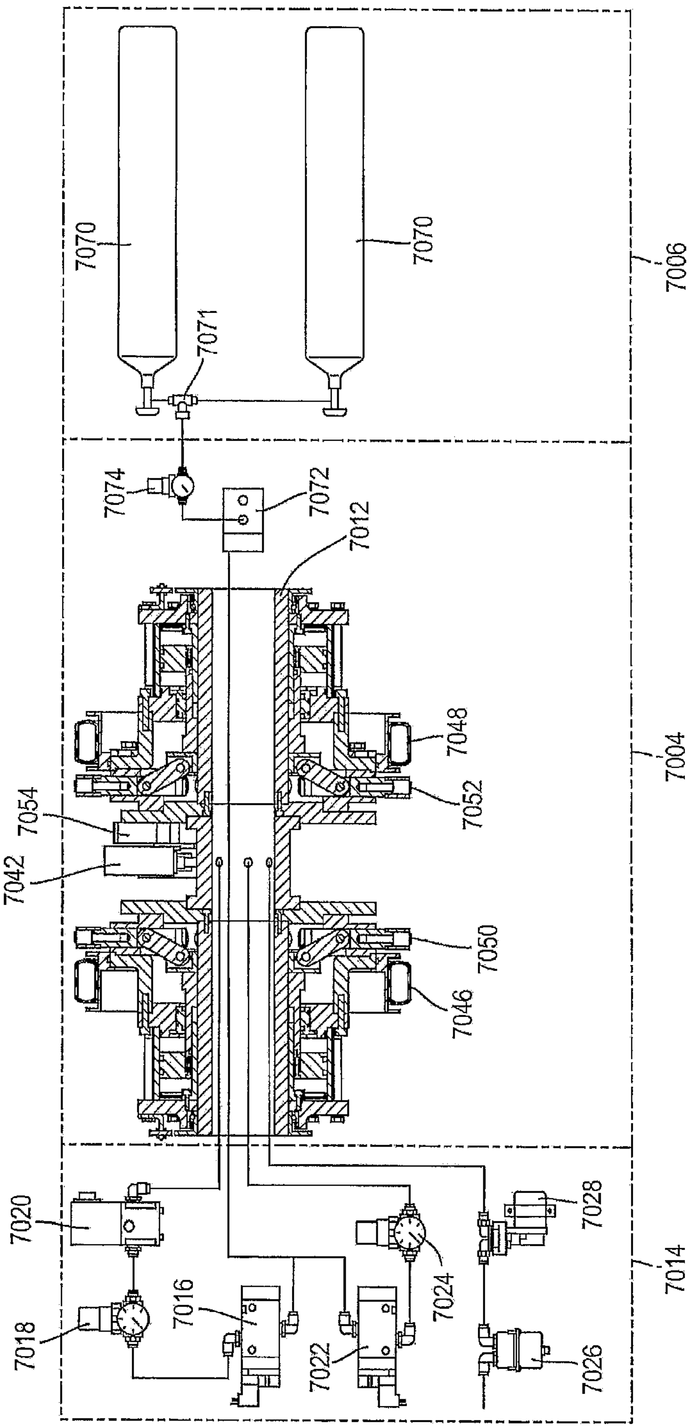
FIG. 94 shows a schematic diagram showing the flow of purge gas through the purge and inspection system in accordance with an embodiment of the present patent application.

Although not described in detail here, it should be appreciated that the provision of the shield gas through the rear rotary union 5072 will also apply to passage of purge gas from purge gas tanks 7070 through rear rotary union 7072 as shown in FIG. 94 described later.

In FIG. 25, the front rotary union 5032 is illustrated as having two inlet and outlet ports. As shown, only one of the ports for communicating compressed air through pneumatic line (stationary portion 5032*c* and movable portion 5072*d*) is used. The other ports are not functional for the front rotary union, but both ports will be used for the rear rotary union 5072 as will be appreciated from the above description.

It should also be appreciated, that in some embodiments, wireless communication may be provided to/from the inspection detector, camera and/or weld torch, in which case the use of a slip ring for certain functionality can be by passed.

In one embodiment, the communications signals may not traverse the entire communication path between the umbilical 5034 and the drive section electronics module 5118 and may travel between specific devices/modules of the communication path.

In one embodiment, all the electronics modules in the internal weld system 5004, including the forward-most electronics module 5014, the wire feed electronics module 5046, the center section electronics module 5064 and the drive section electronics module 5118 may each include a memory, a secondary storage device, and one or more processors configured to perform system controls. In one embodiment, all the electronics modules in the internal weld system 5004 may be configured to receive, process, store, retrieve and transmit signals (sensor or control) and data. In one embodiment, these electronics modules may contain other components. For example, various circuitry such as, for example, power supply circuitry, signal conditioning circuitry, solenoid driver circuitry, and/or any other circuitry that is known in the art may be incorporated in the electronics modules. In one embodiment, all the electronics modules in the internal weld system 5004 may be configured to transmit control signals that are used to direct the operation of the devices operatively connected thereto and receive data or other signals (sensor) from the devices operatively connected thereto.

For example, the forward-most electronics module 5014 is operatively coupled to the front rotation motor 5030, the front position sensor 5022, and the front clamp control valve 5018. In one embodiment, the forward-most electronics module 5014 is configured to transmit control signals to control the operation of the front rotation motor 5030 and the front clamp control valve 5018 and receive sensor signals from the front position sensor 5022.

In one embodiment, the wire feed electronics module 5046 is operatively coupled to the shield gas control valve 5042, the motors of the wire feed systems 5044, the axial weld torch motor 5550, the radial weld torch motor 5512, and the tilt weld torch motor 5588. In one embodiment, the wire feed electronics module 5046 is configured to transmit control signals to control the operation of the shield gas control valve 5042, the motors of the wire feed systems 5044, the axial weld torch motor 5550, the radial weld torch motor 5512, and the tilt weld torch motor 5588.

In one embodiment, the center section electronics module 5064 is operatively coupled to the rear rotation motor 5074, the rear position sensor 5076, and the rear clamp control valve 5062. In one embodiment, the center section electronics module 5064 is configured to transmit control signals to control the operation of the rear rotation motor 5074 and rear clamp control valve 5062, and receive sensor signals from the rear position sensor 5076.

In one embodiment, the drive section electronics module 5118 is operatively coupled to the drive motors 5124, the brake valve 5190, and the drive wheel valve 5192. In one embodiment, the drive section electronics module 5118 is configured to transmit control signals to control the operation of the drive motors 5124, the brake valve 5190, and the drive wheel valve 5192.

Figure 72:
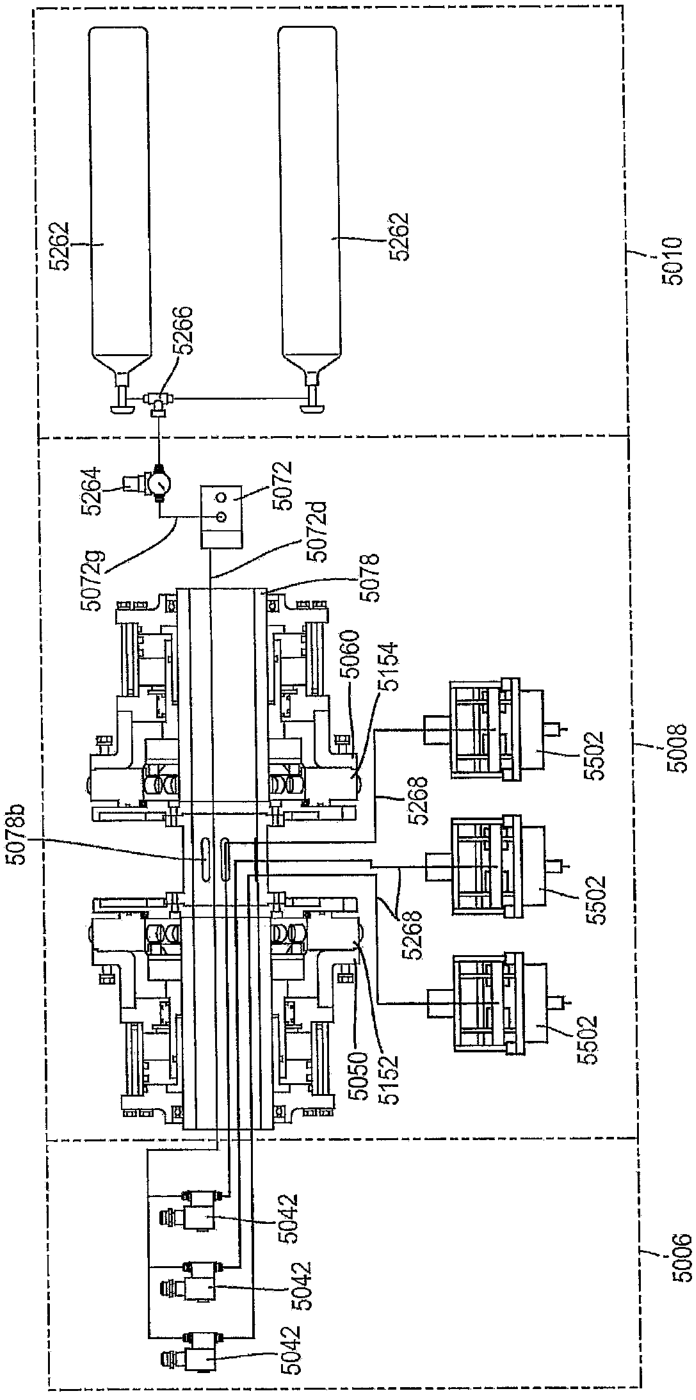
FIG. 72 shows a schematic diagram showing the flow of shield gas through the internal weld system in accordance with an embodiment of the present patent application.

FIG. 72 shows a schematic diagram showing the flow of shield gas through the internal weld system 5004, where some components of the internal weld system 5004 are not shown for sake of clarity and to better illustrate the other components and/or features of the internal weld system 5004.

In one embodiment, an inert/shield gas supply line is configured to direct inert/shield gas from the inert/shield gas source 5262 to a region between the first and second clamps 5142, 5144, and towards a region in a vicinity of the weld tip 5503 of the weld torch 5502, to reduce oxygen in the vicinity of the weld tip 5503 during a welding operation.

Referring to FIG. 72, the shield gas tanks 5262 are shown in the drive section 5010 of the internal weld system 5004. In one embodiment, a high pressure regulator 5264 may be positioned in the drive section 5010 of the internal weld system 5004. In one embodiment, the high pressure regulator 5264 may be positioned in the center section 5008 of the internal weld system 5004. In one embodiment, the rear rotary union 5072, the welding torches 5502, the rotatable hub 5078, the front and rear clamps 5142, 5144, and the front and rear clamps 5142 and 5144 are shown in the center section 5008 of the internal weld system 5004. In one embodiment, the front and rear seals 5146 and 5148 may be positioned in the center section 5008 of the internal weld system 5004. The shield gas valves 5042 are shown in the forward-most section 5006 of the internal weld system 5004.

In one embodiment, the shield gas tanks 5262 are configured to be maintained at a pressure of 500-2400 psi. The shield gas tanks 5262 are in fluid communication through fluid communication lines with the rear rotary union 5072. In one embodiment, the shield gas tanks 5262 are in fluid communication with the rear rotary union 5072 via a valve 5266 and the high pressure regulator 5264. In one embodiment, the high pressure regulator 5264 is configured to automatically cut off the flow of the purge gas at a pressure of 75 psi. That is, the high pressure regulator 5264 is typically set to reduce the pressure in the shield gas tanks 5262 to about 75 psi in the fluid communication line downstream of the high pressure regulator 5264, and from the rear rotary union 5072 to the shield gas valves 5042.

In one embodiment, the rear rotary union 5072 is in fluid communication through fluid communication lines with the shield valves 5042. In one embodiment, the shield gas stored in the shield gas tanks 5262 is sent through the fluid communication lines to the rear rotary union 5072, and then through the fluid communication lines from the rear rotary union 5072 to the shield gas valves 5042. In one embodiment, each shield gas control valve 5042 is configured to control the flow of the shield gas to the corresponding weld torch 5502 through a shield gas line 5268. In one embodiment, each weld torch 5502 has a corresponding shield gas control valve 5042 connected to it. In one embodiment, the shield gas control valve 5042 is operatively connected to receive control signals from the wire feed electronics module 5046. In one embodiment, the shield gas control valve 5042 is configured to supply the shield gas to the corresponding weld torch, when it receives signals from the wire feed electronics module 5046.

In one embodiment, the drive section 5010 of the internal weld system 5004 may include the purge gas tanks, the shield gas tanks 5262 and the compressed air gas tanks. In one embodiment, the shield gas from the shield gas tanks 5262 is only used to supply shield gas to the weld torches 5502. In one embodiment, separate purge gas tanks may be configured to fill and maintain the purge gas in the purge gas chamber. In one embodiment, the compressed air is used to inflate the seals 5146 and 5148 and to expand the clamps 5142 and 5144.

In one embodiment, the drive section 5010 of the internal weld system 5004 may include the compressed air gas tanks and the purge/shield gas tanks. That is, the shield and purge gas tanks are one and the same. In one embodiment, the compressed air from the compressed air gas tanks is used to inflate the seals 5146 and 5148 and to expand the clamps 5142 and 5144. In one embodiment, the seals 5146 and 5148 are optional in the internal weld system 5004. In one embodiment, the shield gas to the weld torches 5502 and the purge gas to the purge gas chamber are supplied by the same gas tank having purge/shield gas. In one embodiment, the supply of the purge gas to the purge gas chamber is optional.

In one embodiment, the drive section 5010 of the internal weld system 5004 may only include the purge/shield gas tanks (i.e., no compressed air gas tanks). This may be the case for small internal weld systems. In one embodiment, the purge/shield gas tanks are configured to supply the purge/shield gas to the weld torches 5502, the purge/shield gas to the purge gas chamber, and the purge/shield gas to inflate the seals 5146 and 5148 and to expand the clamps 5142 and 5144. In one embodiment, the seals 5146 and 5148 are optional in the internal weld system 5004. In one embodiment, the supply of the purge gas to the purge gas chamber is optional.

Figure 72A:
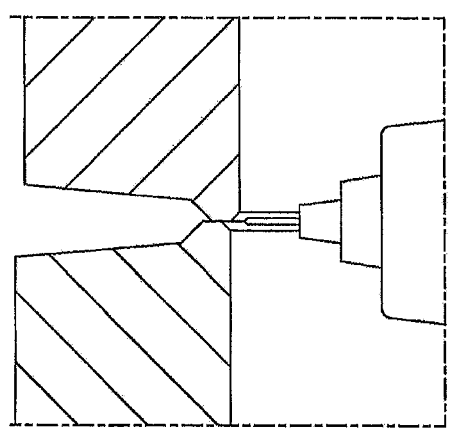
FIGS. 72A, 72B and 72C show close-up views of an internal weld torch used in a prior art system and the internal weld system, respectively, where the pipes have a gap and radial offset (Hi-Lo) alignment.
Figure 72B:
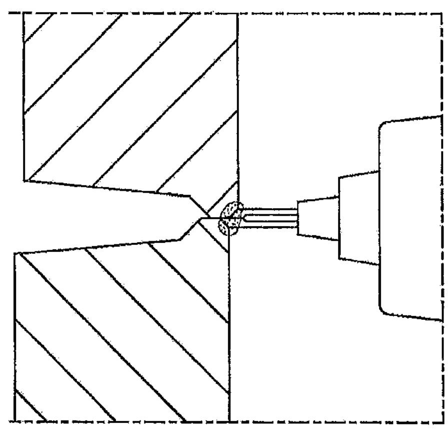
Figure 72C:
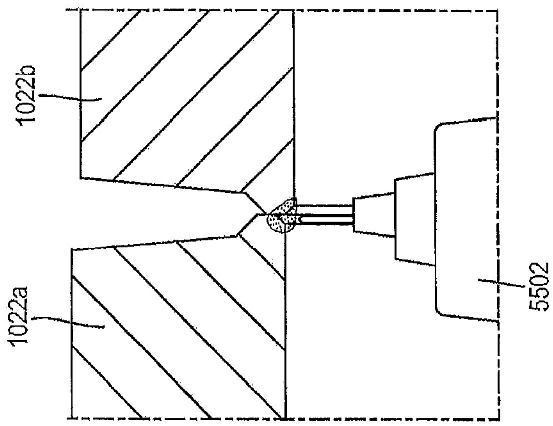

FIGS. 72A, 72B and 72C show close-up views of the internal weld torch used in a prior art system and the internal weld system 5004, respectively, where the pipes have a gap and radial offset (Hi-Lo) alignment. For example, as shown in FIG. 72A, the pipes 1022*a*, 1022*b* have a 1 millimeter gap and radial offset (Hi-Lo).

As shown in FIG. 72B, in the prior art system, the raised edge of the pipe shields the left side of the weld groove causing reduced weld penetration. As shown in FIG. 72C, the one or more processors 5140 associated with the internal weld system 5004 are configured to receive weld profile data (e.g., prior to, during and subsequent to the welding procedure) and are configured, based on the received weld profile data, to shift its internal weld torch 5502 and/or to tilt its external weld torch 5502 to achieve a full weld penetration. Thus, the weld profile data from the internal weld system 5004 may be used to make better weld.

In one embodiment, the one or more processors 5140 are configured to receive profile data related to welding of the interface region 5136 between the first pipe 1022*a* and the second pipe 1022*b* from the field system 5000. In one embodiment, the related profile data is based on a scan of the interface region 5136 between the pipes 1022*a*, 1022*b*. In one embodiment, the one or more processors 5140 are configured to compare one or more characteristics of the related profile data with one or more predefined profile characteristics to generate a response to the field system 5000. In one embodiment, the one or more processors 5140 are configured to transmit the response to the field system 5000 to cause the field system 5000 to perform one or more operations based on the response. In one embodiment, the one or more processors 5140 are configured to transmit a signal to the field system 5000 to stop welding-related procedure, change or develop a welding protocol, save or further analyze profile data of the interface region 5136, save or further analyze pre-weld profile data, save or further analyze post-weld profile data, affirm or modify a version thereof, etc.

In one embodiment, the one or more processors 5140 are operatively associated with the inspection detector 5056 to determine a profile of the interface region 5136 between the pipes 1022*a*, 1022*b*. In one embodiment, the weld torch 5502 is configured to create a weld at the interface region 5136 between the pipes 1022*a*, 1022*b* based on the profile of the interface region 5136 between the pipes 1022*a*, 1022*b*. In one embodiment, the weld torch (e.g., of the external weld system 7500) is configured to create a weld between the pipes 1022*a*, 1022*b* based on the profile of the interface region 5136 between the pipes 1022*a*, 1022*b*.

In one embodiment, the one or more processors 5140 are configured to receive inspection data from the inspection detector 5056 prior to, subsequent to, or during a weld operation. In one embodiment, the one or more processors 5140 are configured to receive camera inspection data from the inspection camera 5112 prior to, subsequent to, or during a weld operation. In one embodiment, the one or more processors 5140 are configured to receive inspection data from the inspection detector 5056 and the camera inspection data from the inspection camera 5112 prior to, subsequent to, or during a weld operation.

In one embodiment, the inspection camera 5112 is configured to scan the welded interface region 5136 after a welding operation. In one embodiment, the inspection camera 5112 is configured to send signals to the one or more processors 5140 based on the scan. In one embodiment, the one or more processors 5140 are configured to determine a characteristic of the welded interface region 5136 based on the signals from the inspection camera 5112.

In one embodiment, the one or more processors 5140 are configured to analyze the data to automatically detect undercuts or other shape deviations.

In one embodiment, if a characteristic of the interface region 5136 is greater than a predetermined threshold, it may be referred to as an undesirable characteristic of the interface region 5136. In one embodiment, if a characteristic of the interface region 5136 is greater than a predetermined threshold and a difference between the characteristic and the predetermined threshold is falling within a predetermined acceptable/allowable range, it is determined that the undesirable characteristic of the interface region 5136 does not need correction. In one embodiment, if a characteristic of the interface region 5136 is greater than a predetermined threshold and a difference between the characteristic and the predetermined threshold is not falling within a predetermined acceptable/allowable range, it is determined that the undesirable characteristic of the interface region 5136 needs correction.

In one embodiment, if a characteristic of the interface region 5136 is less than a predetermined threshold, it may be referred to as undesirable characteristic of the interface region 5136. In one embodiment, if a characteristic of the interface region 5136 is less than a predetermined threshold and a difference between the characteristic and the predetermined threshold is falling within a predetermined acceptable/allowable range, it is determined that the undesirable characteristic of the interface region 5136 does not need correction. In one embodiment, if a characteristic of the interface region 5136 is less than a predetermined threshold and a difference between the characteristic and the predetermined threshold is not falling within a predetermined acceptable/allowable range, it is determined that the undesirable characteristic of the interface region 5136 needs correction.

In one embodiment, if a characteristic of the interface region 5136 is not within a predetermined range, it may be referred to as undesirable characteristic of the interface region 5136. In one embodiment, if a characteristic of the interface region 5136 is not within a predetermined range and is falling within an acceptable/allowable range, it is determined that the undesirable characteristic of the interface region 5136 does not need correction. In one embodiment, if a characteristic of the interface region 5136 is not within a predetermined range and is not falling within the acceptable/allowable range, it is determined that the undesirable characteristic of the interface region 5136 does not need correction.

In one embodiment, the one or more processors 5140 are configured to receive the electronic signals (e.g., generated by the receiver of the inspection detector 5136) to determine whether the undesirable characteristic of the interface region 5136 should be corrected. In one embodiment, in response to detecting one or more undesirable characteristics of the interface region 5136, the one or more processors 5140 are configured to send instructions to the motor 5030, 5074 controlling an axially rotational position of one of the pipes to cause the motor 5030, 5074 to rotate the one of the pipes 1022*a*, 1022*b* relative to the other of the pipes 1022*a*, 1022*b* to correct the undesirable characteristic. In one embodiment, the motor 5030, 5074 is configured for moving a radially extending clamp 5142, 5144.

In one embodiment, the weld torch 5502, operatively connected with the one or more processors 5140, is configured to perform a weld operation to weld the pipes 1022*a*,

1022*b* together in response to the one or more processors 5140 detecting that no undesirable characteristics exist.

In one embodiment, the one or more processors 5140 are configured to interact with the inspection detector 5056 to scan the interface region 5136 between the pipes 1022*a*, 1022*b* to determine the profile of the interface region 5136 between the pipes 1022*a*, 1022*b* prior to a welding operation and generate pre-weld profile data based thereon. In one embodiment, the one or more processors 5140 are configured to interact with the inspection detector 5056 to scan the entire interface region 5136 between the pipes 1022*a*, 1022*b* to generate the pre-weld profile data prior to weld material being applied to weld the two pipes 1022*a*, 1022*b* together. In one embodiment, the one or more processors 5140 are configured to interact with the inspection detector 5056 to scan the interface region 5136 to obtain the pre-weld profile data subsequent to the first clamp 5142 and the second clamp 5144 engaging with the first pipe and second pipe 1022*a*, 1022*b*, respectively.

Additionally, or alternatively, the one or more processors 5140 are configured to interact with the inspection camera 5112, x-ray radiography inspection device, gamma ray inspection device, ultrasonic inspection device, magnetic particle inspection device, eddy current inspection device or other inspection devices to scan the interface region 5136 between the pipes 1022*a*, 1022*b* to determine the profile of the interface region 5136 prior to the welding operation.

The pre-weld scan/inspection procedure is the same for the tie-in internal weld system 3001 and the purge and inspection system 7001, and, therefore, will not be described again with reference to the tie-in internal weld system 3001 and the purge and inspection system 7001.

In various embodiments, the "pre-weld" profile data described herein refers to data obtained from the inspection detector (e.g., such as by an inspection laser) that has scanned the interface region between two pipes to be welded before the weld torch has been activated to commence securing the pipes to one another. This pre-weld profile data is communicated to the one or more processors to determine whether the pipes are sufficiently aligned prior to any weld material being deposited to the interface region. In one embodiment, if misalignment is detected, e.g., by a determination by the one or more processors that the misalignment is outside an acceptable misalignment value, the one or more processors are configured to send signals to the cradles that engage with the exterior surfaces of the pipes. One or both of the cradles can be adjusted based on output signals from the pre-weld profile data to adjust relative positioning between the pipes to bring the alignment of the interface region within an acceptable misalignment value.

It should be appreciated that, given slight inconsistencies in the pipe structures, absolutely perfect alignment is often (and typically) not achieved. Nevertheless, such perfect alignment is unnecessary so long as the alignment is within a tolerance range suitable for a good weld.

In one embodiment, the pre-weld profile data may include pipe ovality/roundness data. In one embodiment, the pipe ovality/roundness data may include location and size of minimum inner diameter, location and size of maximum inner diameter, pipe average inner diameter, pipe average wall thickness, location and size of minimum wall thickness, and/or location and size of maximum wall thickness. In one embodiment, the pipe ovality/roundness data may include a comparison between each of location and size of minimum inner diameter, location and size of maximum inner diameter, location and size of minimum wall thickness, and location and size of maximum wall thickness, and their respective predetermined values. In one embodiment, the pipe ovality/roundness data may include a comparison between each of pipe average inner diameter and pipe average wall thickness, and their respective predetermined values. In one embodiment, the pipe ovality/roundness data may include inner diameter deviations of the pipe at all locations on the circumference of the pipe based on the comparison.

In one embodiment, the pre-weld profile data may include pipe bevel profile data. In one embodiment, the pipe bevel profile data may include pipe bevel geometry. In one embodiment, the pipe bevel profile data may include a comparison between each of size and shape of the pipe bevel, root face (land) thickness of the pipe bevel, bevel angle of the pipe bevel, offset of the pipe bevel, and root angle of the pipe bevel, and their respective predetermined values. In one embodiment, the pipe bevel profile data may include pipe bevel deviations of the pipe at all locations on the circumference of the pipe based on the comparison.

In one embodiment, the pre-weld profile data may include weld joint fit-up and alignment data. In one embodiment, the weld joint fit-up and alignment data may include data on the gap between internal adjoining ends of the pipes (after pipe alignment). In one embodiment, the weld joint fit-up and alignment data may include data on the gap between bevels of the pipes (after pipe alignment). In one embodiment, the weld joint fit-up and alignment data may include location and size of minimum gap, location and size of maximum gap, and/or average gap. In one embodiment, the weld joint fit-up and alignment data may include a comparison between each of location and size of minimum gap, and location and size of maximum gap, and their respective predetermined values. In one embodiment, the weld joint fit-up and alignment data may include a comparison between average gap and its respective predetermined value. In one embodiment, the weld joint fit-up and alignment data may include gap deviations of the pipes at all locations on the circumference of the pipes based on the comparison. In one embodiment, the weld joint fit-up and alignment data may include the minimal differences in height between the pipes (e.g., what is acceptable alignment), etc.

In one embodiment, the one or more processors 5140 are configured to interact with the inspection detector 5056 to scan the interface region 5136 subsequent to the first clamp 5142 and the second clamp 5144 engaging with the first pipe 1022*a* and second pipe 1022*b*, respectively. In one embodiment, the one or more processors 5140 are configured to be operatively connected with the first pipe engagement structure 5052 and the second pipe engagement structure 5054. In one embodiment, the one or more processors 5140 are configured to operate the first pipe engagement structure 5052 and/or the second pipe engagement structure 5054 based on the pre-weld profile data to alter the interface region 5136 between the pipes 1022*a*, 1022*b* prior to the welding operation.

In one embodiment, the one or more processors 5140 are configured to alter the interface region 5136 between the pipes 1022*a*, 1022*b* prior to the welding operation by driving the first pipe engagement structure 5052 and/or the second pipe engagement structure 5054 to change the roundness (or ovality) of the first pipe 1022*a* and/or second pipe 1022*b* based on the pre-weld profile data. For example, in one embodiment, the one or more processors 5140 are configured to alter the interface region 5136 between the pipes 1022*a*, 1022*b* prior to the welding operation by selectively driving the one or more clamp shoes 5157 of the clamps

5142 and/or 5144 to change the roundness of the first pipe 1022*a* and/or second pipe 1022*b* based on the pre-weld profile data.

In one embodiment, the one or more processors 5140 are configured to alter the interface region 5136 between the pipes 1022*a*, 1022*b* prior to the welding operation by driving the first pipe engagement structure 5052 and/or the second pipe engagement structure 5054 to rotate and/or axially move the first pipe 1022*a* and/or second pipe 1022*b* based on the pre-weld profile data. In one embodiment, the one or more processors 5140 are configured to alter the interface region 5136 between the pipes 1022*a*, 1022*b* prior to the welding operation by rotating one pipe 1022*a* or 1022*b* relative to the other 1022*a* or 1022*b*.

In one embodiment, the one or more processors 5140 are configured to develop a welding protocol based on the pre-weld profile data. In one embodiment, the welding protocol includes a welding speed and weld torch position protocol.

In one embodiment, the one or more processors 5140 are configured to operate the cradles 5330 (as shown in FIGS. 10A and 10B) or 6010A and 6010B (as shown in FIG. 73) for providing the incoming pipe 1022*a* at the second end of the pipe 1022*b* (after the frame assembly of the internal weld system 5004 is positioned at the second end of the pipe 1022*b*) based on the pre-weld profile data to alter interface region 5136 between the pipes 1022*a*, 1022*b* prior to the welding operation. In one embodiment, the one or more processors 5140 are configured to control the externally positioned rollers 5332 the cradles 5330 for providing the incoming pipe 1022*a* at the second end of the pipe 1022*b* (after the frame assembly of the internal weld system 5004 is positioned at the second end of the first pipe 1022*b*) based on the pre-weld profile data.

In one embodiment, the one or more processors 5140 are configured to operate the cradles 5330 (as shown in FIGS. 10A and 10B) or 6010A and 6010B (as shown in FIG. 73) to generate relative movement between the first pipe 1022*a* and second pipe 1022*b* based on the pre-weld profile data to alter interface region 5136 between the pipes 1022*a*, 1022*b* prior to the welding operation. In one embodiment, an exterior surface 5346 and/or 5348 (as shown in FIG. 2G) of the first pipe 1022*a* and/or second pipe 1022*b* is engaged to adjust the relative positioning of the pipes 1022*a*, 1022*b* in the event the pre-weld profile data determines adjustment is required. In one embodiment, the cradles 5330 (as shown in FIGS. 10A and 10B) and 6010A and 6010B (as shown in FIG. 73) are operated by the one or more processors 5140 (or otherwise controlled) to engage the exterior surfaces 5346 and/or 5348 (as shown in FIG. 2G) of the first pipe 1022*a* and/or second pipe 1022*b* to adjust the relative positioning of the pipes 1022*a*, 1022*b* in the event the pre-weld profile data determines adjustment is required.

In one embodiment, the first clamp and/or the second clamp 5142, 5144 are released to enable adjustment of relative positioning of the pipes 1022*a*, 1022*b* in the event the pre-weld profile data determined adjustment is required. In one embodiment, the first and second clamps are internally positioned clamps and are released to enable adjustment of relative positioning of the pipes 1022*a*, 1022*b* in the event the pre-weld profile data determined adjustment is required. In one embodiment, the first and second clamps are externally positioned clamps and are released to enable adjustment of relative positioning of the pipes 1022*a*, 1022*b* in the event the pre-weld profile data determined adjustment is required. In one embodiment, the first and second clamps include both internally positioned clamps and the externally positioned clamps. In one embodiment, both the internally positioned clamps and the externally positioned clamps are released to enable adjustment of relative positioning of the pipes 1022*a*, 1022*b* in the event the pre-weld profile data determined adjustment is required.

In one embodiment, the adjustment of the relative positioning of the pipes 1022*a*, 1022*b* (based on the pre-weld profile data) may be either automatically performed by the processors 5140 controlling the externally positioned rollers 5332 (as shown in FIGS. 10A and 10B) or performed by an operator using a crane and (internal and/or external) clamps. In one embodiment, the adjustment of the relative positioning of the pipes 1022*a*, 1022*b* (based on the pre-weld profile data) may also be referred to as re-alignment of the pipes 1022*a*, 1022*b*.

In one embodiment, the adjustment of the relative positioning of the pipes 1022*a*, 1022*b* (based on the pre-weld profile data) may include an adjustment along the longitudinal axis of the pipes 1022*a*, 1022*b*, and/or an adjustment along the radial axis of the pipes 1022*a*, 1022*b*. In one embodiment, the adjustment of the relative positioning of the pipes 1022*a*, 1022*b* (based on the pre-weld profile data) may include position adjustment and orientation adjustment of the pipes 1022*a*, 1022*b*. In one embodiment, the adjustment of the relative positioning of the pipes 1022*a*, 1022*b* (based on the pre-weld profile data) may include up and down movement and longitudinal movement (along the longitudinal axis of the pipes 1022*a*, 1022*b*).

In one embodiment, the internal and/or external clamp(s) (holding the pipes 1022*a*, 1022*b* in place during the pre-weld procedure) are released and a crane, electronically controlled externally positioned rollers 5332 or other such devices may be used to maneuver the pipe based on the pre-weld profile data. In one embodiment, the internal and/or external clamp(s) (holding the pipes 1022*a*, 1022*b* in place during the pre-weld procedure) are released before the re-alignment procedure. In one embodiment, after the re-alignment of the pipes 1022*a*, 1022*b*, the pipes 1022*a*, 1022*b* are clamped back using the external and/or internal clamps.

In one embodiment, a new pipe to be welded 1022*a* may be rotated about its longitudinal axis relative to the prior pipe that has been welded 1022*b*, based on the pre-weld profile data that has been obtained from the inspection detector (e.g., the inspection laser) 5056. Specifically, the pre-weld profile data can be used to determine that, in some instances, the relative rotational positions of the pipes 1022*a* and 1022*b* can be changed to effect a better match for welding. For example, if each of the pipes 1022*a*, 1022*b* has a slight ovality to them, then matching the pipes so that major axis of each of the two pipes are generally aligned and the minor axis of each of the two pipes are generally aligned, can have an overall beneficial effect. Thus, in one embodiment, the inspection detector 5056 can generate signals that are processed by the one or more processors 5140 to determine a more beneficial rotational position for the incoming pipe 1022*a* to be welded. Such rotation can be accomplished by the one or more processors 5140 activating the front rotation motor 5030 to rotate the pipe 1022*a* prior to a welding operation. In particular, to rotate the incoming pipe 1022*a*, the center frame 5068 remains rotatably fixed with respect to the previously welded pipe. This rotationally fixed relationship between the center frame 5068 and pipe 1022*b* is accomplished by having the rear clamp 5144 actuated by the one or more processors 5140 to be securely engaged with the interior surface of pipe 1022*b* to prevent relative rotation therebetween. In addition to the rear clamp 5144 and the center frame 5068 being rotationally fixed with respect to the pipe, the rear rotation motor 5074 is not activated by the processor 5140 and its motor shaft is locked from rotation. As a result of the rear rotation motor shaft being prevented from rotation, the entire rotatable hub 5078 remains rotatably fixed relative to the center frame 5068 and the pipe 1022*b*. The front rotation motor 5030 is then activated. Its shaft rotates to drive the gear train as shown in FIG. 19 and described above so that gear teeth 23 rotatably engage the gear teach 5023 of the ring gear 5021. Because the wire feed module 5020 (which is fixed to the rotatable hub 5078) and the rotatable hub 5078 are fixed from rotation, the front rotation motor 5030 and gear 5023 operatively connected thereto is driven circumferentially along the ring gear 5021. This rotational driving force posed on the front rotation motor 5030 rotatably moves the entire forward-most section frame 5026 to which the motor 5030 is connected. The rotation of the forward-most section frame 5026, in turn, rotatably drives the front clamp 5142. The clamp 5142 rotates around the rotatable hub 5078 on the bearings 5108, 5098 that are between the clamp 5142 and the rotatable hub 5078. Because the clamp 5142 is extended and clamped to the interior surface of the pipe 1022*a*, the pipe 1022*a* is rotated as a result to the located determined by the one or more processors 5140 based upon the pre-weld scanned information received from the inspection detector 5056. During rotation of the pipe 1022*a*, if an external cradle (5330, 6010A, 6010B) is engaging the exterior surface of the pipe, the rollers 5332 on the external cradle (5330, 6010A, 6010B) are instructed by the one or more processors 5140 to optionally be in a free-wheeling state where they are passive, or optionally the one or more motors operatively connected with the rollers 5332 are instructed by the one or more processors 5140 to drive to rollers 5332 at a rotational speed commensurate with (similar to or the same as) the speed at which the front rotation motor 5030 drives the rotation from inside the pipe 1022*a*. This latter approach provides rotational forces to the pipe 1022*a* from both inside and outside the pipe, although in some embodiments, either driving force alone may be sufficient.

In the embodiment just described, the clamps 5142 and 5144 are engaged with the associated pipes 1022*a* and 1022*b* to prevent relative rotation between the frame 5026 and pipe 1022*a*, and to prevent rotation between the center frame 5068 and the pipe 1022*b*. In one or more embodiments, however, the clamps 5142 and 5144 need not be responsible for this function. Instead, wheels operatively associated with both frames may be configured to engage the associated pipes with sufficient friction and/or outward force to prevent relative rotation between the pipes and frames. In one embodiment, the wheels the effect or permit locomotion between the frames and the pipes permit generally longitudinal movement only between the frames and pipes and prevent relative rotational movement therebetween. This can be true for wheels on one or more of the frames. The wheel engagement option can be used on only one of the frames, on both of the frames, and can optionally be used in combination with the clamping methodology for one or both of the frames.

The pipe rotation techniques described herein can also be used to return the frames to a desired "start" or "home" rotational position after a welding operation is completed and a new pipe comes in for the next pre-weld scan.

In one embodiment, the one or more processors 5140 are configured to send the pre-weld profile data to a remote processor for further processing.

In one embodiment, the one or more processors 5140 are configured to interact with the inspection detector 5056 to scan the interface region 5136 between the pipes 1022*a*, 1022*b* to determine the profile of the interface region 5136 between the pipes 1022*a*, 1022*b* during a welding operation, at a region of the interface prior to weld material being deposited thereon, and generate on-the-fly profile data.

The on-the-fly scan/inspection procedure is the same for the tie-in internal weld system 3001 and the purge and inspection system 7001, and, therefore, will not be described again with reference to the tie-in internal weld system 3001 and the purge and inspection system 7001.

In various embodiments, the on-the-fly profile data refers to data obtained from the inspection detector during a welding operation. For example, the on-the-fly profile data is taken from a position immediately before (in front of) the region that is being welded (for example, 1-6 inches in front of the region being welded). In particular, the inspection detector scans the interface region in the region about to be welded so as to provide data on the profile of the interface region immediately before the weld material is deposited. It should be appreciated that the profile of the interface region between the pipes may change slightly as increasing more of the interface region is welded. In other words, the sequential welding itself may slightly alter the alignment/positioning of the pipes at the interface region at the portions of the interface region yet to be welded. The inspection detector measures the profile of the interface region immediately before the weld torch deposit's weld material on the yet-to-be welded regions of the interface region, and signals from the inspection detector are received and used by the one or more processors to output signals/instructions to the weld torch and/or its motors to control various weld torch parameters to tailor the weld to the pipes as they are being welded. The weld torch parameters can include one or more of the following: wire feed speed, wire consumption, oscillation width, oscillation waveform, oscillation amplitude, weld time, gas flow rate, power levels of the weld arc, weld current, weld voltage, weld impedance, weld torch travel speed, position of the weld tip of the weld torch along the pipe axis, angular positioning of the weld tip of the weld torch with respect to its rotational plane and/or the distance of the weld tip of the weld torch to the inner surfaces of the pipes to be welded.

In one embodiment, the on-the-fly weld profile data may include a high-low (Hi-Lo) data. In one embodiment, the high-low (Hi-Lo) may generally refer to a height difference between the bevel edges of the pipes after their alignment. In one embodiment, the high-low (Hi-Lo) data may include a comparison between each of location and size of minimum height difference, and location and size of maximum height difference, and their respective predetermined values. In one embodiment, the high-low (Hi-Lo) data may include a comparison between average height difference and its respective predetermined value. In one embodiment, the high-low (Hi-Lo) data may include height difference deviations of the pipes at all locations on the circumference of the pipes based on the comparison.

In one embodiment, the on-the-fly weld profile data may include weld joint characteristics.

In one embodiment, the on-the-fly weld profile data may include width of the weld joint and root gap of the weld joint.

In one embodiment, the one or more processors 5140 are configured to generate weld signals to control the weld torch 5502 based on the on-the-fly profile data. In one embodiment, the one or more processors 5140 are configured to control a position and speed of the weld torch 5502 based on-the-fly profile data during a weld operation. In one embodiment, the torch motor 5588 is operatively connected to the one or more processors 5140 to control an angle of the weld torch 5502 during the weld operation.

In one embodiment, the one or processors 5140 are configured to instruct the one or more torch motors 5512 to move the weld tip 5503 further away from the interface region 5136 after each weld pass to accommodate for weld material build-up. In one embodiment, the one or processors 5140 are configured to control the axial weld torch motor 5550 to control the axial motion of the weld torch 5502 (i.e., move the weld tip 5503 further away from the interface region 5136).

In one embodiment, the one or more processors 5140 are configured to generate an initial plotted weld profile based on the pre-weld profile data and modify/adapt the initial plotted weld profile based the on-the-fly profile data.

In one embodiment, wire feed speed, oscillation width, power levels of the weld arc, and/or the distance of the weld tip 5503 of the weld torch 5502 to the surfaces of the pipes to be welded may be controlled based the on-the-fly profile data.

In one embodiment, the one or more processors 5140 are configured to interact with the inspection detector 5056 to scan the interface region 5136 between the pipes 1022*a*, 1022*b* to determine the profile of the interface region 5136 between the pipes 1022*a*, 1022*b* subsequent to a welding operation and generate post-weld profile data based thereon. In one embodiment, the post-weld profile data is obtained with the inspection detector 5056 positioned within the first pipe 1022*a* and/or the second pipe 1022*b*, without disengaging the first pipe engagement structure 5052 or the second pipe engaging structure 5054 from the interior surface 5130 of the first pipe 1022*a* or the interior surface 5132 of the second pipe 1022*b*, respectively.

The post-weld scan/inspection procedure is the same for the tie-in internal weld system 3001 and the purge and inspection system 7001, and, therefore, will not be described again with reference to the tie-in internal weld system 3001 and the purge and inspection system 7001.

Additionally, or alternatively, the one or more processors 5140 are configured to interact with the inspection camera 5112, x-ray radiography inspection device, gamma ray inspection device, ultrasonic inspection device, magnetic particle inspection device, eddy current inspection device or other inspection devices to scan the interface region 5136 between the pipes 1022*a*, 1022*b* to determine the profile of the interface region 5136 subsequent to a welding operation.

In one embodiment, the post-weld profile data may include profile(s) of the formed weld beads. In one embodiment, the post-weld profile data may include profile(s) of the formed root pass weld layer. In one embodiment, the post-weld profile data may include weld shape characteristics such as mismatch, bead concavity, and the re-entrant angle.

In one embodiment, the one or more processors 5140 are configured to cause, based on the post-weld profile data, another weld operation to be performed on the interface region 5136 between the pipes 1022*a*, 1022*b*.

Certain weld variables/parameters have well known relationships. That is, a change in one weld variable/parameter has a corresponding change in the other weld variable/parameter. The weld variable/parameters, such as, weld current, weld voltage, weld torch travel speed, and heat input are all connected. For example, if the weld current increases and all other weld variable/parameters remain constant, then voltage should decrease. Also, if the weld torch travel speed increases and all other weld variables/parameters remain constant, then heat input should decrease. In one embodiment, the one or more processors 5140 are configured to analyze of the data gathered (e.g., prior to, subsequent to, or during a weld operation) to detect problems and make process/parameter changes. In one embodiment, based on the analysis and detection, the one or more processors 5140 are configured to take the internal weld system 5004 off-line for maintenance as needed to prevent a recurrence.

In one embodiment, every data point collected/received by the one or more processors 5140 prior to, subsequent to, or during a weld operation is compared to its corresponding (Gold Standard) ideal weld value. If any process variables differ by more than a set/predetermined limit, these differences can be flagged. If the differences persist for longer than the maximum allowable defect size, the weld process can be stopped so that the weld can be repaired. Over time, the ideal weld values and the allowable limits may be improved as more weld data is collected.

In one embodiment, the one or more processors may be configured to see what happened right before the deviation occurred and determine if there is a deficiency in the control loop programming that allowed the deviation to occur. If so, the one or more processors can send an updated control loop program to the internal weld system 5004 and observe if the change improves the performance of the internal weld system 5004.

In one embodiment, the one or more processors may also be configured to monitor the commands being given to the internal weld system 5004 locally by the operator. If these commands are determined to cause the weld defects, the one or more processors are configured to send a message to the operator to stop providing commands to the internal weld system 5004. If the commands are determined to prevent weld defects, the one or more processors are configured to send a message to all operators instructing them to begin using the commands.

In one embodiment, the one or more processors are configured to collect and analyze the Non-Destructive Test (NDT) data. In one embodiment, the locations where the weld defects are detected can be compared back to the weld parameters that were logged at the same location, even if the defect is small enough to not require repair. In one embodiment, the one or more processors will be able to know about the weld defects that would not be included in a traditional inspection report. This gives the one or more processors a very good statistical sample for every welding parameter and the quality of the resulting weld. This statistical model can be used to determine the best settings for each welding parameter as well as the allowable deviation from the setting. These new parameters can be communicated directly to the internal weld system 5004 as each new NDT scan improves the statistical model.

In one embodiment, as described herein, the computer system 5138 (comprising the one or more processors 5140) may be a computer system local to the field system 5000. In another embodiment, as described herein, the computer system 5138 may be a computer system positioned remotely from the field system 5000 (e.g., remote computer system 13704 or other remote computer system) and may be communicatively connected to the field system 5000 or a local computer system thereof.

In one embodiment, the one or more processors 5140 may receive (via a receiver) inspection data associated with an inspection of the interface region 5136 between the pipes 1022*a*, 1022*b* from the field system 5000 (e.g., raw data from the inspection devices, 2D or 3D imaging data, or other data from the inspection). One or more inspection devices used for the inspection may comprise one or any combination of an inspection laser, an inspection camera, an x-ray radiography inspection device, a gamma ray inspection device, an ultrasonic inspection device, a magnetic particle inspection device, eddy current inspection device, a temperature monitor, or other inspection device. The inspection data may respectively comprise one or any combination of laser inspection data, camera inspection data, x-ray inspection data, gamma ray inspection data, ultrasound inspection data, magnetic particle inspection data, eddy current inspection data, temperature inspection data, or other inspection data.

In one embodiment, the one or more processors 5140 may automatically generate a response comprising profile data for the interface region 5136 (e.g., pre-weld profile data, on-the-fly profile data, post-weld profile data, or other data) based on the received inspection data, and transmit (via a transmitter) the profile data to the field system 5000. In one embodiment, for example, where the received inspection data is based on a scan of the interface region prior to a welding operation, the one or more processors 5140 may use the received inspection data to generate a response comprising pre-weld profile data for the interface region 5136, and transmit (via a transmitter) the pre-weld profile data to the field system 5000. In one embodiment, where the received inspection data is based on a scan of the interface region during a welding operation, the one or more processors 5140 may use the received inspection data to generate a response comprising on-the-fly-weld profile data for the interface region 5136, and transmit (via a transmitter) the on-the-fly profile data to the field system 5000. In one embodiment, where the received inspection data is based on a scan of the interface region subsequent a welding operation, the one or more processors 5140 may use the received inspection data to generate a response comprising post-weld profile data for the interface region 5136, and transmit (via a transmitter) the post-weld profile data to the field system 5000.

In one embodiment, the one or more processors 5140 may automatically generate a response comprising one or more welding protocols or other operation protocols based on the received inspection data, and transmit (via a transmitter) the operation protocols as control operation data to the field system 5000. As an example, upon receipt of the operation protocols, the field system 5000 may perform one or more operations based on the received operation protocols. In another embodiment, the one or more processors 5140 may generate profile data based on the received inspection data to obtain the profile data for the interface region 5136 (e.g., pre-weld profile data, on-the-fly profile data, post-weld profile data, or other profile data). In a further embodiment, the one or more processors 5140 may use the profile data to obtain the welding protocols or other operation protocols, and transmit (via a transmitter) the operation protocols to the field system 5000.

In one embodiment, the one or more processors 5140 may generate a welding protocol or other operation protocol based on inspection data associated with one or more other pipes (other than pipes 1022*a*, 1022*b*), data related to input parameters (e.g., welding or other parameters) used to perform one or more operations (e.g., welding or other operations) on the other pipes, data related to observations of the operations, or other data. As an example, the one or more processors 5140 may obtain the inspection data from one or more field systems, and analyze the inspection data to determine whether and which of the pipes have defects. The processors may then compare one or more sets of observations of an operation performed on one or more objects determined to have a defect (after the performance of the operation) against one or more other sets of observations of the same operation performed on one or more other objects without the defect to determine the circumstances that likely caused the defect (as described in further detail herein elsewhere). Based on the comparison, the one or more processors 5140 may generate the welding protocol or other operation protocol such that the operation protocol avoids or would otherwise addresses the circumstances (likely to have caused the defect) when the operation protocol is used for one or more subsequent operations (e.g., subsequent operations that are the same or similar to the operation performed and observed).

In one embodiment, the one or more processors 5140 may obtain pre-weld profile data for the interface region 5136 (between the pipes 1022*a*, 1022*b*), where the pre-weld profile data is based a scan of the interface region 5136 at the field system 5000 prior to a welding operation. As an example, the one or more processors may receive the pre-weld profile data from the field system 5000. As another example, the one or more processors 5140 may generate the pre-weld profile data based on inspection data received from the field system 5000. Upon obtainment, the one or more processors 5136 may analyze the pre-weld profile data to generate a response to the field system 5000. In one embodiment, the one or more processors 5140 may compare one or more characteristics of the pre-weld profile data (e.g., pipe ovality/roundness characteristics, pipe bevel profile characteristics, weld joint fit-up and alignment characteristics, or other characteristics) with one or more characteristics of acceptable predefined pre-weld profiles. Based on the comparison, the processors 5140 may transmit (via a transmitter) a response as control operation data to field system 5000 indicating whether the field system 5000 is to begin the welding operation.

As an example, the response may specify that the interface region 5136 is within specification for the welding operation, indicating that the field system 5000 is to be begin the welding operation. The response may additionally or alternatively comprise one or more welding protocols for the welding operation. As another example, the response may specify that the interface region 5136 is not within specification, indicating that the field system 5000 should not perform the welding operation on the interface region 5136 in its current state. In one use case, the response may indicate a need to alter the interface region 5136 prior to the welding operation (e.g., a need to realign the pipes 1022*a*, 1022*b* or other alternations). As such, the response may cause the field system 5000 to operate a pipe engagement structure of the field system 5000 to alter the interface region 5136 prior to the welding operation so that the interface region 5136 is within specification for the welding operation.

In one embodiment, the one or more processors 5140 may compare one or more characteristics of profile data (obtain based on a scan of the interface region 5136 at the field system 5000) with one or more predefined profile characteristics to determine one or more matching characteristics. Based on the matching characteristics, for example, the one or more processors 5140 may automatically determine one or more welding protocols for welding the interface region 5136 between the pipes 1022*a*, 1022*b*, and transmit (via a transmitter) the one or more welding protocols to the field system 5000 to cause the field system 5000 to perform a welding operation on the interface region 5136 based on the one or more welding protocols. As an example, a welding protocol may comprise one or more input parameters, such as wire feed speed, wire consumption, oscillation width, oscillation waveform, oscillation amplitude, weld time, gas flow rate, power levels of the weld arc, weld current, weld voltage, weld impedance, weld torch travel speed, position of the weld tip of the weld torch along the pipe axis, angular positioning of the weld tip of the weld torch with respect to its rotational plane, the distance of the weld tip of the weld torch to the inner surfaces of the pipes to be welded, or other parameters.

In one embodiment, the one or more processors 5140 may obtain on-the-fly profile data for the interface region 5136 (between the pipes 1022*a*, 1022*b*), where the on-the-fly profile data is based a scan of the interface region 5136 at the field system 5000 during a welding operation. As an example, the one or more processors 5140 may receive (via a receiver) the on-the-fly profile data from the field system 5000. As another example, the one or more processors 5140 may generate the on-the-fly profile data based on inspection data received from the field system 5000. Upon obtainment, the one or more processors 5140 may analyze the on-the-fly profile data to generate a response to the field system 5000. In one embodiment, the one or more processors 5140 may compare one or more characteristics of the on-the-fly profile data (e.g., pipe ovality/roundness characteristics, pipe bevel profile characteristics, weld joint fit-up and alignment characteristics, weld shape characteristics, or other characteristics) with one or more characteristics of acceptable predefined profiles (e.g., predefined pre-weld profiles, predefined post-weld profiles, or other profiles). Based on the comparison, the processors 5140 may transmit a response to field system 5000 comprising on-the-fly updates to one or more welding characteristics for the welding operation. As an example, the response may cause the field system 5000 to control a weld torch based on the on-the fly-updates to the welding characteristics during the welding operation.

In one embodiment, the one or more processors 5140 may obtain post-weld profile data for the interface region 5136 (between the pipes 1022*a*, 1022*b*), where the post-weld profile data is based a scan of the interface region 5136 at the field system 5000 subsequent to a welding operation. As an example, the one or more processors 5140 may receive (via a receiver) the post-weld profile data from the field system 5000. As another example, the one or more processors 5140 may generate the post-weld profile data based on inspection data received from the field system 5000. Upon obtainment, the one or more processors 5140 may analyze the on-the-fly profile to generate a response to the field system 5000. In one embodiment, the one or more processors 5140 may compare one or more characteristics of the post-weld profile data (e.g., weld shape characteristics or other characteristics) with one or more characteristics of acceptable predefined post-weld profiles. Based on the comparison, the processors 5140 may transmit (via a transmitter) a response to field system 5000 indicating whether a result of the welding operation is acceptable. Additionally or alternatively, the one or more processors 5140 may automatically determine one or more welding protocols for a subsequent operation (e.g., an operation that repairs or compensates for a defect resulting from the welding operation, an operation that typically follows the welding operation if no defect of significance is detected, etc.), and include the one or more welding protocols in the transmitted response.

As an example, if the welding operation is for a root pass, the response may specify that the root pass layer resulting from the welding operation is within specification, and the response may specify that preparation for a subsequent welding operation for a hot pass is to begin. As such, the response may cause the field system 5000 to initiate performance of the hot pass operation on the interface region 5136. As another example, the response may specify that the resulting root pass layer is not within specification. In one use case, for instance, the response may specify that the field system 5000 should not proceed with the hot pass operation until further notice. In another use case, the response may specify that the field system 5000 is to proceed with a different welding protocol (than otherwise pre-planned for the hot pass operation), where the different welding protocol repairs or compensates for the resulting root pass layer not being within specification.

In one embodiment, where the one or more processors 5140 are local to the field system 5000 (e.g., part of a computer system local to the field system 5000), the one or more processors 5140 may transmit, to a remote computer system, inspection data associated with an inspection of a region (e.g., interface region 5136 or other region) between the pipes 1022*a*, 1022*b*. The transmitted inspection data may, for example, comprise one or any combination of the types of inspection data described herein. In one embodiment, the one or more processors 5140 may receive (via a receiver) a response from the remote computer system responsive to transmitting the inspection data to the remote computer system (e.g., a response comprising pre-weld profile data, on-the-fly profile data, post-weld profile data, an affirmation of transmitted profile data, a welding or other operation protocol, an alert indicating a defect, or other data). In one embodiment, the response may be derived from the transmitted inspection data and additional data received by the remote computer system. As an example, the additional data may be related to observations of one or more operations performed on other pipes, inspection of the other pipes, one or more input parameters used to perform the observed operations, or other data (as described herein). In this way, for example, one or more operations in a field system (e.g., field system 5000 or other field system) may be managed based on previously unavailable large data pools with data from the same field system and/or other field systems. For example, the data pools (comprising data on the observation of operations on the other pipes, the inspection of the other pipes, the input parameters for performing the observed operations, or other data from the same field system or other field systems) may be used to generate and select one or more welding or other operation protocols for subsequent operations (as described herein) to prevent or reduce weld defects or create better welds for current and future customers. As another example, the large pool of data from different field systems may be used to improve inspection and analysis thereof (as described herein) to provide current and future customers with better products (e.g., by reducing weld defects, detecting defects earlier in the process, etc.).

In one embodiment, where the one or more processors 5140 are local to the field system 5000 (e.g., part of a computer system local to the field system 5000), the one or more processors 5140 may transmit a profile of the interface region 5136 between the pipes 1022*a*, 1022*b* to a remote computer system (e.g., a profile derived based on a scan of the interface region 5136). In response, the one or more processors 5140 may receive (via a receiver) an affirmation of the profile of the interface region or a modified version of the profile of the interface region 5136 from the remote computer system. In one embodiment, the one or more processors may cause a weld torch of the weld system 5004 to create a weld at the interface region 5136 based on the affirmation or the modified version of the profile of the interface region 3136.

As an example, the one or more processors 5140 of the field system 5000 may cause one or more inspection devices to inspect the interface region 5136 between the pipes 1022*a*, 1022*b* to obtain inspection data (e.g., raw data from the inspection devices, 2D or 3D imaging data, or other data from the inspection). The inspection devices used for the inspection may comprise one or any combination of the types of inspection devices described herein. The obtained inspection data may respectively comprise one or any combination of the types of inspection data described herein. As a further example, the one or more processors 5140 may determine the profile of the interface region 5136 based on the obtained inspection data, but may also transmit the inspection data to the remote computer system to assess the inspection data. The one or more processors 5140 may transmit its determined profile of the interface region 5136 to the remote computer system for an accuracy check. Based on its own assessment of the inspection data, the remote computer system may respond to the one or more processors 5140 with an affirmation of the profile of the interface region 5136, an indication that the profile provided is inaccurate, or other response. Additionally or alternatively, if the profile provided is inaccurate, the remote computer system may respond with its own modified version of the profile of the interface region 5316 derived from the remote computer system's assessment of the inspection data. Responsive to receipt of an affirmation, for instance, the one or more processors 5140 may cause a weld torch of the weld system 5004 to begin or continue a welding operation based on its determined profile of the interface region 5136 to create the weld at the interface region 5316. If, however, a modified version of the profile is received, the one or more processors 5140 may cause a weld torch of the weld system 5004 to begin or continue a welding operation based on the modified version of the profile to create the weld at the interface region 5316.

In one embodiment, where the one or more processors 5140 are local to the field system 5000 (e.g., part of a computer system local to the field system 5000), the one or more processors 5140 may interact with an inspection laser of the weld system 5004 to scan the interface region 5136 between the pipes 1022*a*, 1022*b* to determine a profile of the interface region 5136 prior to a welding operation and generate pre-weld profile data based on the scan. In a further embodiment, the one or more processors 5140 may transmit the pre-weld profile data to a remote computer system. In response, the one or more processors 5140 may receive (via a receiver) an affirmation of the pre-weld profile data or a modified version of the pre-weld profile data from the remote computer system. In one embodiment, the one or more processors may operate pipe engagement structure 5052 and/or pipe engagement structure 5054 based on the affirmation or the modified version of the pre-weld profile data to alter the interface region 5136 between the pipes prior to the welding operation.

As an example, the one or more processors 5140 of the field system 5000 may cause one or more inspection devices to inspect the interface region 5136 between the pipes 1022*a*, 1022*b* to obtain inspection data prior to a welding operation on the interface region 5136. The inspection devices used for the inspection may comprise one or any combination of the types of inspection devices described herein. The obtained inspection data may respectively comprise one or any combination of the types of inspection data described herein. The one or more processors 5140 may generate pre-weld profile data based on the obtained inspection data, but may also transmit the inspection data to the remote computer system to assess the inspection data. The one or more processors 5140 may transmit its generated pre-weld profile data to the remote computer system for an accuracy check. Based on its own assessment of the inspection data, the remote computer system may respond to the one or more processors 5140 with an affirmation of the pre-weld profile data, an indication that the pre-weld profile data provided is inaccurate, or other response. Additionally or alternatively, if the pre-weld profile data provided is inaccurate, the remote computer system may respond with its own modified version of the pre-weld profile data derived from the remote computer system's assessment of the inspection data. As a further example, if the pre-weld profile data indicates that the pipes 1022*a*, 1022*b* are misaligned, and an affirmation of the pre-weld profile data is received, the one or more processors 5140 may cause pipe engagement structures 5052, 5054 realign the pipes 1022*a*, 1022*b* prior to a welding operation to create the weld at the interface region 5136. If, however, a modified version of the pre-weld profile data is received, the one or more processors 5140 may instead utilize the modified version to perform subsequent operations, such as using the modified version to determine whether realignment is needed and how it is to be performed, to select a welding protocol to use to create a weld at the interface region 5136, etc.

In one embodiment, where the one or more processors 5140 are local to the field system 5000 (e.g., part of a computer system local to the field system 5000), the one or more processors may develop a welding protocol based on the affirmation or the modified version of the pre-weld profile data (received from the remote computer system). As an example, if the affirmation of the pre-weld profile data is received, the one or more processors 5140 may use its generated pre-weld profile data to develop a welding protocol to be used to perform a welding operation on the interface region 5136. As another example, if the modified version of the pre-weld profile data is received, the one or more processors 5140 may use the modified version to develop a welding protocol to be used to perform a welding operation on the interface region 5136.

In one embodiment, where the one or more processors 5140 are local to the field system 5000 (e.g., part of a computer system local to the field system 5000), the one or more processors 5140 may interact with an inspection laser of the weld system 5004 to scan the interface region 5136 between the pipes 1022*a*, 1022*b* to determine the profile of the interface region 5136 during a welding operation and generate on-the-fly profile data based on the scan. In a further embodiment, the one or more processors 5140 may transmit (via a transmitter) the on-the-fly profile data to a remote computer system. In response, the one or more processors 5140 may receive (via a receiver) an affirmation of the on-the-fly profile data or a modified version of the on-the-fly profile data from the remote computer system. In one embodiment, the one or more processors 5140 may control a weld torch of the weld system 5004 based on the affirmation or the modified version of the one-the-fly profile data during the welding operation.

As an example, the one or more processors 5140 of the field system 5000 may cause one or more inspection devices to inspect the interface region 5136 between the pipes 1022*a*, 1022*b* to obtain inspection data during a welding operation on the interface region 5136. The inspection devices used for the inspection may comprise one or any combination of the types of inspection devices described herein. The obtained inspection data may respectively comprise one or any combination of the types of inspection data described herein. The one or more processors 5140 may generate on-the-fly profile data based on the obtained inspection data, but may also transmit the inspection data to the remote computer system to assess the inspection data. The one or more processors 5140 may transmit its generated on-the-fly profile data to the remote computer system for an accuracy check. Based on its own assessment of the inspection data, the remote computer system may respond to the one or more processors 5140 with an affirmation of the on-the-fly profile data, an indication that the on-the-fly profile data provided is inaccurate, or other response. Additionally or alternatively, if the post-weld profile data provided is inaccurate, the remote computer system may respond with its own modified version of the on-the-fly profile data derived from the remote computer system's assessment of the inspection data.

As a further example, if the affirmation of the on-the-fly profile data is received, the one or more processors 5140 may use its generated on-the-fly profile data to update the welding parameters being used to control the weld torch of the weld system 5004 protocol (to perform the welding operation on the interface region 5136) as the welding operation is being performed. As another example, if the modified version of the on-the-fly profile data is received, the one or more processors 5140 may use the modified version to update the welding parameters being used to control the weld torch of the weld system 5004 protocol (to perform the welding operation on the interface region 5136) as the welding operation is being performed.

In one embodiment, where the one or more processors 5140 are local to the field system 5000 (e.g., part of a computer system local to the field system 5000), the one or more processors 5140 may interact with an inspection laser of the weld system 5004 to scan the interface region 5136 between the pipes 1022*a*, 1022*b* to determine the profile of the interface region 5136 subsequent to a welding operation and generate post-weld profile data based on the scan. In a further embodiment, the one or more processors 5140 may transmit the post-weld profile data to a remote computer system. In response, the one or more processors 5140 may receive (via a receiver) an affirmation of the post-weld profile data or a modified version of the post-weld profile data from the remote computer system.

As an example, the one or more processors 5140 of the field system 5000 may cause one or more inspection devices to inspect the interface region 5136 between the pipes 1022*a*, 1022*b* to obtain inspection data subsequent to a welding operation on the interface region 5136. The inspection devices used for the inspection may comprise one or any combination of the types of inspection devices described herein. The obtained inspection data may respectively comprise one or any combination of the types of inspection data described herein. The one or more processors 5140 may generate post-weld profile data based on the obtained inspection data, but may also transmit the inspection data to the remote computer system to assess the inspection data. The one or more processors 5140 may transmit its generated post-weld profile data to the remote computer system for an accuracy check. Based on its own assessment of the inspection data, the remote computer system may respond to the one or more processors 5140 with an affirmation of the post-weld profile data, an indication that the post-weld profile data provided is inaccurate, or other response. Additionally or alternatively, if the post-weld profile data provided is inaccurate, the remote computer system may respond with its own modified version of the post-weld profile data derived from the remote computer system's assessment of the inspection data.

In one embodiment, where the one or more processors 5140 are local to the field system 5000 (e.g., part of a computer system local to the field system 5000), the one or more processors 5140 may cause, based on the affirmation or the modified version of the post-weld profile data (received from the remote computer system), another weld operation to be performed on the interface region 5136 between the pipes. As an example, if the affirmation of the post-weld profile data is received, the one or more processors 5140 may use its generated post-weld profile data to determine whether a result of a welding operation has one or more defects, whether the interface region 5136 is ready for the next stage of operations, or other determinations. In one use case, for instance, upon completing a root pass operation in the interface region 5316, post-weld profile data of the root pass layer in the interface region 5316 may reveal that the root pass layer is insufficiently thick. In response, the post-weld profile data may be utilized to determine welding parameters for a welding operation to repair the insufficient thickness or welding parameters for a hot pass operation to produce a hot pass layer (on the root pass layer) that compensates for the insufficient thickness of the root pass layer. As another example, if the modified version of the pre-weld profile data is received, the one or more processors 5140 may use the modified version to perform the foregoing in lieu of its generated post-weld profile data.

In one embodiment, the welding parameters that affect the quality of the weld may include voltage, current, weld torch travel speed, wire feed speed, gas flow, etc. In one embodiment, the other welding parameters that affect the quality of the weld may include impedance, temperature, etc.

In one embodiment, the voltage used during the welding procedure may affect the weld bead width and weld bead shape. In one embodiment, the voltage is measured in volts. In one embodiment, the weld system may include a voltage sensor configured to measure the voltage of the power source that is used to create the welding arc.

In one embodiment, the current used during the welding procedure may affect the penetration of the weld bead. In one embodiment, the current is measured in amperes. In one embodiment, the weld system may include a current sensor configured to measure the current of the power source that is used to create the welding arc.

In one embodiment, the weld feed speed is a rate of travel of a weld electrode, during the welding procedure, along a joint being welded. In one embodiment, the weld electrode is fed from a welding torch. In one embodiment, the weld speed may be controlled by controlling the welding torch that feeds the weld electrode. In one embodiment, the weld speed during the welding procedure may affect the size of the weld bead and/or the penetration of the weld bead. In one embodiment, the weld speed is measured in millimeters/second or inches/minutes.

In one embodiment, the wire feed speed/wire usage is a rate at which the weld electrode material/filler material is being consumed (or fed into the weld) during the welding procedure. In one embodiment, the wire feed speed is measured in millimeters/second or inches/minutes. In one embodiment, the weld system may include a wire feed speed sensor that is configured to sense a flow of the weld electrode material.

In one embodiment, the rate of change of the weight of the spool allows the weld system to measure the rate at which weld wire 5007 is feeding into the weld. In one embodiment, the feed motor runs at a set/predetermined rate, but the wheel that pushes the wire 5007 may slip due to either minor variations in the wire 5007 or due to wear of the feed wheel itself. These slips may be temporary in nature, and their presence may be logged and used in the quality control feedback loop. If the slippage is persistent, the one or more processors 5140 may be configured to increase the speed of the feed motor to compensate. Over time, the speed overdrive ratio may need to be increased. Eventually it will not be possible to compensate, and the weld system 5004 will be taken out of service for maintenance. In one embodiment, tracking the rate of overdrive ratio increase across all weld systems allows the one or more processors to determine the best limit for the maximum allowable overdrive ratio. That setting may then be transmitted to all of the weld systems in service. In one embodiment, the one or more processors 5140 may be configured to update the value at any time as data becomes available in order to minimize process interruptions and minimize the frequency of machine down time for maintenance.

In one embodiment, the weld system may include a gas flow sensor that is configured to sense/detect the flow rate of the shield gases used in the welding procedure. In one embodiment, the shield gas may be an active gas that is configured to shield the molten weld pool. In one embodiment, the gas flow sensor is configured to provide a signal proportional to the gas flow rate in the shield gas line. In one embodiment, the one or more processors 5140 of the field system 5000 are configured to stop welding if the gas flow rate of the shield gas is not within a predetermined gas flow rate range.

In one embodiment, the pipes are preheated before the welding procedure. In one embodiment, the temperature of the pipes may be monitored by one or more temperature sensors of the weld system. In one embodiment, the one or more temperature sensors are configured to measure the temperature of the pipe at each point along the weld. In one embodiment, the one or more processors 5140 of the field system 5000 are configured to stop the welding procedure if the temperatures of the pipes are not within a predetermined temperature range.

In one embodiment, the weld system may include an impedance sensor that is configured to sense/detect an input electrical impedance of the weld system.

In one embodiment, the correct wire/weld electrode/filler material is to be used for each welding pass. For example, the only difference between two spools of wire is a 0.1 millimeter difference in the wire diameter. If the manufacturer label for the spool of wire has been smudged or has faded, the wrong spool could be loaded onto the weld system. An RFID tag on the spool has a spool identifier. In one embodiment, the RFID tag on the spool may be read by a sensor on the weld system. If the RFID tag has the wrong spool identifier, the weld system is configured to not feed the wire material and to alert the user to change to the correct wire.

In one embodiment, the spool weight may be monitored by the one or more processors 5140 of the field system 5000. If the weld wire runs out during a weld procedure, the voltage signal that the processor uses to manage the distance between the weld tip and the work piece goes to zero. The processor moves the tip closer to the work piece in response which causes the tip to touch the molten weld metal and cause a copper inclusion defect. Therefore, knowing the exact weight of the wire remaining on the spool helps the weld system prevent the start of a welding pass that requires more weld wire than what is available. Also, if the spool weight stops changing, then that may be an indication of an empty spool or a failure in a wire feeding mechanism. In either case, the one or more processors 5140 of the field system 5000 are configured to stop the welding procedure.

In one embodiment, the one or more processors 5140 of the field system 5000 are configured to track the weight of every spool in real time. Each welding pass in a weld joint requires a different amount of wire due to the change in diameter and the change in the width of the weld groove being filled.

If the one or more processors 5140 of the field system 5000 determines that a spool will end up with too little wire to complete the next weld pass, but that it would have enough wire to complete a different weld pass, the one or more processors 5140 of the field system 5000 may be configured to inform an operator to remove the spool and give it to a different operator. For example, a spool starts with 10 pounds of wire, and the weld pass being performed by the weld system requires 1.3 pounds of wire. The weld system will be able to complete its weld passes on 7 weld joints before the spool has too little wire.

When that spool is removed after the 7$^{th}$ weld pass, that spool will have 0.9 pounds of wire on it that will be wasted. If there is another weld pass that requires, for example, 1.1 pounds of wire, then the one or more processors 5140 of the field system 5000 are configured to alert the operator to remove the spool after only 6 weld passes. In this case, the spool will have 2.2 pounds of wire remaining. That spool can then be used for the weld pass that needs only 1.1 pounds of wire to complete 2 such weld passes (and waste no wire).

In one embodiment, the weld wire 5507 passes through the weld tip 5503. The tip weld tip 5503 also carries a high welding current. Both these factors cause the bore of the weld tip 5503 to wear. As this happens the contact point inside shifts which inherently affects the arc characteristics and hence the weld quality. In one embodiment, the weld parameters like voltage, current, wirefeed, power and impedance are monitored in real time. That data is sent to a tablet via the one or more processors to be analyzed for signature comparison of the above mentioned variables due the computationally intensive nature of analysis. When the analysis detects an impending problem, the internal weld system 5004 and the operator are sent a message to change the weld tip 5503 before the next weld. Additionally, this data may be used in the quality control feedback loop. In one embodiment, the results from the quality control feedback loop may be used to update the weld tip deterioration signatures on the fly.

In one embodiment, the exemplary weld parameters that are used for the uphill and downhill weld procedures are shown in FIG. 72D. For example, in one embodiment, at least one of the plurality of weld torches 5502 weld in an upwards rotational direction (i.e., uphill) while at least another of the plurality of weld torches 5502 weld in an downwards rotational direction (i.e., downhill). In one embodiment, the weld parameters shown here are exemplary and are by no means optimized or inclusive of everything that may need to be changed during these welding procedures. In one embodiment, the travel speed for the downhill weld procedure is 13.5 inches/minute and for the uphill procedure is 10.0 inches/minute. In one embodiment, the amplitude of the cross-groove oscillation is 0.09 inches for the downhill weld procedure and 0.15 inches for the uphill weld procedure. In one embodiment, the oscillation speed is 160 beats per minute for the downhill weld procedure and 130 beats per minute for the uphill weld procedure. In one embodiment, the wave control 1 (i.e., related to the wire feed speed) is 400 for the downhill weld procedure to 370 for the uphill weld procedure. In one embodiment, the weld passes were welded at 16.5V with the power supply controlling voltage.

The operation of the internal weld system 5004 is now described. In one embodiment, the internal weld system 5004 is configured to be operated through a repeating cycle of operation.

After it has been determined that a weld has been completed in the current weld joint, the one or more processors 5140 are configured to send communication signals to the wire feed electronics module 5046 to control (via control signals) the weld torch motors 5512, 5550, 5588 (via) to retract the weld torches 5502 to their original, retracted positions. The one or more processors 5140 are also configured to send communication signals to the forward-most section electronics module 5014 to control/turn off (via control signals) the front clamp control valve 5018 to retract the first engagement structure 5052 to its original, retracted position and send communication signals to the center section electronics module 5064 to control/turn off (via control signals) the rear clamp control valve 5062 to retract the second engagement structure 5054 to its original, retracted position. The internal weld system 5004 (including the weld torches 5502 and the clamps 5144, 5142) has to be moved to the next weld joint.

In one embodiment, the one or more processors 5140 are configured to send communication signals to the drive section electronics module 5118 to control (via control signals) the drive motors 5124 to accelerate the internal weld system 5004 to travel a predetermined speed and then decelerate and stop at the next weld joint. In one embodiment, the predetermined speed at which the internal weld system 5004 accelerates may be 6 feet/second.

When the second engagement structure 5054 is positioned at the next weld joint, the drive section electronics module 5118 sends communication signals to the wire feed electronics module 5046 to check alignment with the end of the pipe. In one embodiment, the wire feed electronics module 5046 is configured to operate (turn on) the one or more inspection detectors 5056 to measure where the second engagement structure 5054 are in relation to the end of the pipe. In one embodiment, the rotatable hub 5072 may not be operated when the one or more inspection detectors 5056 are measuring where the second engagement structure 5054 are in relation to the end of the pipe.

In one embodiment, the wire feed electronics module 5046 is configured send the measured distance data to the drive section electronics module 5118. In one embodiment, the drive section electronics module 5118 is configured to control (via control signals) the drive motors 5124 to move the first and second engagement structures 5052, 5054 by the measured distance data.

In one embodiment, when the second engagement structure 5054 is properly aligned and positioned in relation to the end of the pipe, the drive section electronics module 5118 is configured to send communication signals to the center section electronics module 5064 that the internal weld system 5004 is in position at the next weld joint. In one embodiment, the center section electronics module 5064 controls (opens via control signals) the rear clamp control valve 5062 to raise the second engagement structure 5054 and grip the old/existing pipe.

The next/new pipe segment **1002*a* is then brought in, and slid over the forward-most section 5006 of the internal weld system 5004 into position by the working crew. At this time, the one or more processors 5140 are configured to send communication signals to the wire feed electronics module 5046 to operate the one or more inspection detectors 5056 to check the alignment of the pipes. In one embodiment, the one or more processors 5140 may rotate the rotatable hub 5078** to take measurements at multiple locations.

If the pipe alignment data is within a predetermined tolerance, the wire feed electronics module 5046 sends communication signals to the forward-most electronics module 5014 to actuate the front clamp 5142. In one embodiment, the forward-most electronics module 5014 controls/opens (via control signals) the front clamp control valve 5018 to raise the first engagement structure 5052 and grip the new pipe segment **1002*a***.

If the pipe alignment data is not within the predetermined tolerance, the wire feed electronics module 5046 sends communication signals (a message) to the one or more processors 5140 identifying the misalignment between the pipes **1022*a*, 1022*b***. In one embodiment, this information may be relayed to a crane operator by traditional crane operator hand signals or by an electronic signal to a computer display terminal in the crane cab.

After the pipes are clamped, the one or more processors 5140 are configured to send communication signals to the wire feed electronics module 5046 to operate the one or more 1 inspection detectors 5056 to measure the gap and radial offset (Hi-Lo) at a plurality of points along the circumference of the weld joint. In one embodiment, this data is communicated out to the one or more processors 5140 and compared against the allowable tolerances.

If the joint fit up (i.e., the gap and radial offset (Hi-Lo)) is within a predetermined tolerance, either the one or more processors 5140 or the wire feed electronics module 5046 sends communication signals to the operator indicating that welding may begin or sends communication signals to the wire feed electronics module 5046 to automatically begin the welding procedure.

If the joint fit up (i.e., the gap and radial offset (Hi-Lo)) is not within the predetermined tolerance, a warning is sent to the operator, who can restart the clamping sequence or override the warning. In one embodiment, the internal weld system 5004 is configured to weld up to a 4 millimeters of the gap and radial offset (Hi-Lo).

In one embodiment, the wire feed electronics module 5046 is configured to automatically begin the welding procedure. In one embodiment, the one or more processors 5140 are configured to send communication signals through the umbilical 5034 to a weld power supply to turn on the weld power supply to the weld torch(es) 5502. In one embodiment, the wire feed electronics module 5046 is configured to control/move one or more weld torches 5502 radially, axially and/or angularly to a proper welding position. In one embodiment, the wire feed electronics module 5046 moves one or more weld torches 5502 radially, axially and/or angularly to the correct working distance from the pipe and to the center of the weld joint as measured by the one or more inspection detector(s) 5056.

In one embodiment, the wire feed electronics module 5046 is also configured to operate (turn on) the shield gas valve(s) 5042 to supply shield gas to the weld torch(es) 5502 and operate the motors of the weld feed system 5044 to begin feeding weld wire or electrode to the weld torch(es) 5502.

In one embodiment, the wire feed electronics module 5046 sends communication signals to both the forward-most section electronics module 5014 and the center section electronics module 5064 to begin rotation of the rotatable hub 5078. In one embodiment, the wire feed electronics module 5046 sends communication signals to both the forward-most section electronics module 5014 and the center section electronics module 5064 to synchronize the front rotation motor 5030 and the rear rotation motor 5074. In one embodiment, the forward-most section electronics module 5014 sends control signals to operate the front rotation motor 5030 and the center section electronics module 5064 sends control signals to operate the rear rotation motor 5074. The front rotation motor 5030 and the rear rotation motor 5074 are configured to rotate the rotatable hub 5078 while keeping the front and rear clamps 5142, 5144 stationary. In one embodiment, the rotatable hub 5078 continues to rotate for the full length of the weld.

In one embodiment, the wire feed electronics module 5046 is configured to operate the one or more inspection detector(s) 5056 to locate the center of the weld joint and move the weld torch 5502 axially to follow the weld joint.

In one embodiment, the wire feed electronics module 5046 is configured to measure the voltage of the weld power. The measured voltage data may be used by the wire feed electronics module 5046 to determine the distance of the weld torch 5502 from the pipe. In one embodiment, the wire feed electronics module 5046 is configured to adjust the weld torch 5502 radially to maintain a constant distance of the weld torch 5502 from the pipe. In one embodiment, the wire feed electronics module 5046 may oscillate the weld torch 5502 axially to improve weld quality.

In one embodiment, the wire feed electronics module 5046 is configured to change the tilt angle of the weld torch 5502 based on which portion of the weld joint is being welded. For example, the tilt angle of the weld torch 5502 in the plane of travel is adjusted to compensate for gravity.

In one embodiment, the wire feed electronics module 5046 may be configured to vary the wire feed speed or send communication signals to the weld power supply (via the umbilical 5034) to vary the welding current based on the measurement data from the one or more inspection detectors 5056.

In one embodiment, the welding procedure may be performed by one weld torch in one weld pass by rotating 360°. In one embodiment, the start and stop position of the weld may be anywhere along the weld joint.

In one embodiment, the welding procedure may be performed with N equally spaced weld torches 5502 where the rotatable hub 5078 rotates through (360/N) degrees to deposit one weld pass. In one embodiment, the welding procedure may be performed with N equally spaced weld torches 5502 where the rotatable hub 5078 rotates through (2 times (360/N)) degrees to deposit two weld passes. For example, in one embodiment, where the internal weld system 5004 has three equally spaced weld torches 5502, the rotatable hub 5078 rotates through 120° to deposit one weld pass and rotates through 240° to deposit two weld passes.

When the weld torches 5502 reach a point where the previous weld torch 5502 started its weld pass, the one or more inspection detectors 5056 detect the existing weld bead and the wire feed electronics module 5046 is configured to move the weld torches 5502 in radially to compensate.

In one embodiment, the two welding passes may be deposited as above with a pause between the weld passes for a full laser and visual post weld inspection. In one embodiment, the welding may be done 360° with N unequally spaced torches 5502 with each weld torch 5502 depositing a successive weld pass for a total of N weld passes in 360° plus the distance from the first torch to the Nth torch.

After it has been determined that the weld has been completed, the one or more processors 5140 are configured to send communication signals to the wire feed electronics module 5046 to control (via control signals) the weld torch motors 5512, 5550, 5588 (*via*) to retract the weld torches 5502 to their original, retracted positions. For example, the weld torches 5502 may be retracted back to their original, home positions for each axis (radial, axial, tilt).

In one embodiment, the rotatable hub 5078 continues to rotate while the wire feed electronics module 5046 operates the one or more inspection detectors 5056 and one 2D camera 5112 to inspect the quality of the weld. In one embodiment, if certain types of weld defects (e.g. under fill, lack of reinforcement) are discovered, the one or more processors 5140 are configured to send communication signals to the wire feed electronics module 5046 to move a weld torch 5502 to that location and apply additional weld material to repair the defect.

Once the inspection and any repairs are completed and verified by the operator, the operator may sends communication signals to the forward-most electronics module 5014 to control/turn off (via control signals) the front clamp control valve 5018 to retract the first engagement structure 5052 to its original, retracted position and send communication signals to the center section electronics module 5064 to control/turn off (via control signals) the rear clamp control valve 5062 to retract the second engagement structure 5054 to its original, retracted position.

In the offshore pipeline applications, both angular and positional pipe alignment errors may be corrected by sending the control signals from the one or more processors 5140 to the cradles 5330 or the cradles 6010A and 6010B (to control the associated rollers 5332).

In one embodiment, the purge and inspection system 7001 or the internal weld system 5004 may include one clamp that is constructed and arranged to grip the inner surface of the first pipe 1022*b*. In one embodiment, the cradles 5330 or the cradles 6010A and 6010B are configured to move the second/incoming pipe 1022*a* into position. In one embodiment, the one or more processors 7062 or 5140 are configured to interact with the inspection detector 5056 or 7042 to check the alignment between the pipes and send control signals to the cradles 5330 or the cradles 6010A and 6010B to fix any pipe alignment errors (angular or positional). In one embodiment, the control signals from the one or more processors 5140 are configured to adjust the relative positioning between the pipes (to correct their alignment errors). In one embodiment, this procedure may be used on small or thick walled pipes that have a very low (<20) diameter to wall thickness ratio because no amount of clamping power can noticeably change the shape of low D/t pipe.

In one embodiment, the purge and inspection system 7001 or the internal weld system 5004 may include two clamps. For example, one clamp is constructed and arranged to grip the inner surface of the first pipe 1022*b*. In one embodiment, the cradles 5330 or the cradles 6010A and 6010B are configured to move the second/incoming pipe 1022*a* into position. In one embodiment, the second clamp is constructed and arranged to grip the inner surface of the second/incoming pipe 1022*a*. In one embodiment, the one or more processors 7062 or 5140 are configured to interact with the inspection detector 5056 or 7042 to check the alignment between the pipes. For example, if the alignment is not good, the second clamp releases the second pipe 1022*a*. The one or more processors 7062 or 5140 are configured to send control signals to the cradles 5330 or the cradles 6010A and 6010B to fix any pipe alignment errors (angular or positional). In one embodiment, the control signals from the one or more processors 5140 are configured to adjust the relative positioning between the pipes (to correct their alignment errors), for example, by altering the positioning of the pipe 1022*a*. The procedure may continue until the acceptable pipe alignment is achieved by the inspection detector or a predefined number of attempts (e.g., 10) at which time the second pipe 1022*a* is rejected and a new second pipe is moved into place.

In one embodiment, the crane and the clamp alignment is used in the onshore pipeline alignment and welding procedure. In the onshore pipeline applications, the angular pipe alignment error may be corrected by providing the instructions to the crane operator and the positional alignment error may be corrected by providing the instructions to the workers to place a shim between the clamp and the pipe.

In one embodiment, the purge and inspection system 7001 or the internal weld system 5004 may include one clamp that is constructed and arranged to grip the inner surface of the first pipe 1022*b*. In one embodiment, the crane operator moves the second/incoming pipe 1022*a* into position and the workers place the external clamp around the joint. In one embodiment, the one or more processors 7062 or 5140 are configured to interact with the inspection detector 5056 or 7042 to check the alignment between the pipes. If the inspection detector 5056 or 7042 detects angular misalignment/pipe alignment error, instructions are sent to the crane operator to correct angular misalignment/pipe alignment error and the workers release the clamp while the pipe is being moved. If the inspection detector 5056 or 7042 detects positional misalignment/pipe alignment error, instructions are sent to the workers for the placement and thickness of the shims needed to correct positional misalignment/pipe alignment error. The workers remove the clamp, place the shims, and replace the clamp. The process repeats until the pipe alignment is accepted by the inspection detector.

In one embodiment, the purge and inspection system 7001 or the internal weld system 5004 may include two clamps. For example, one clamp is constructed and arranged to grip the inner surface of the first pipe 1022*b*. In one embodiment, the crane operator moves the second/incoming pipe 1022*a* into position. In one embodiment, the second clamp is constructed and arranged to grip the inner surface of the second/incoming pipe 1022*a*. In one embodiment, the one or more processors 7062 or 5140 are configured to interact with the inspection detector 5056 or 7042 to check the alignment between the pipes. If the inspection detector 5056 or 7042 detects an angular misalignment/pipe alignment error, the second clamp releases the second pipe and instructions are sent to the crane operator to correct the misalignment. If the inspection detector 5056 or 7042 detects a positional misalignment/pipe alignment error, the second clamp releases the second pipe and instructions are sent to the workers for the placement and thickness of the shims needed to correct positional misalignment/pipe alignment error. The crane operator moves the second pipe away from the first pipe, the workers place the shims. The crane operator moves the second pipe back into position. The second clamp grips the second pipe. The process repeats until the pipe alignment is accepted by the inspection detector.

Figure 103:
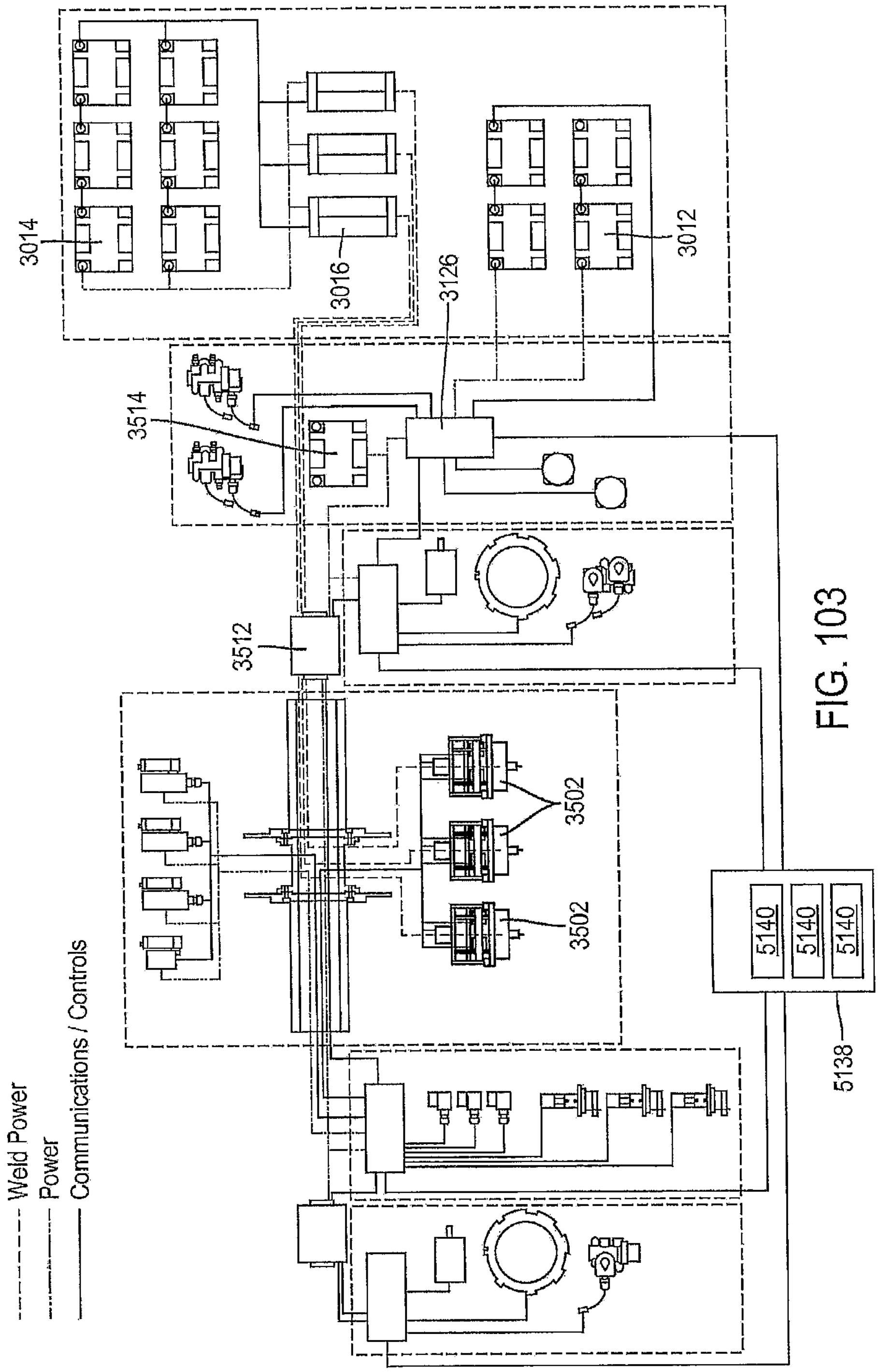
FIG. 103 shows a schematic diagram showing the flow of power including weld power, communication data, and controls data through the tie-in internal weld system in accordance with an embodiment of the present patent application.
Figure 103A:
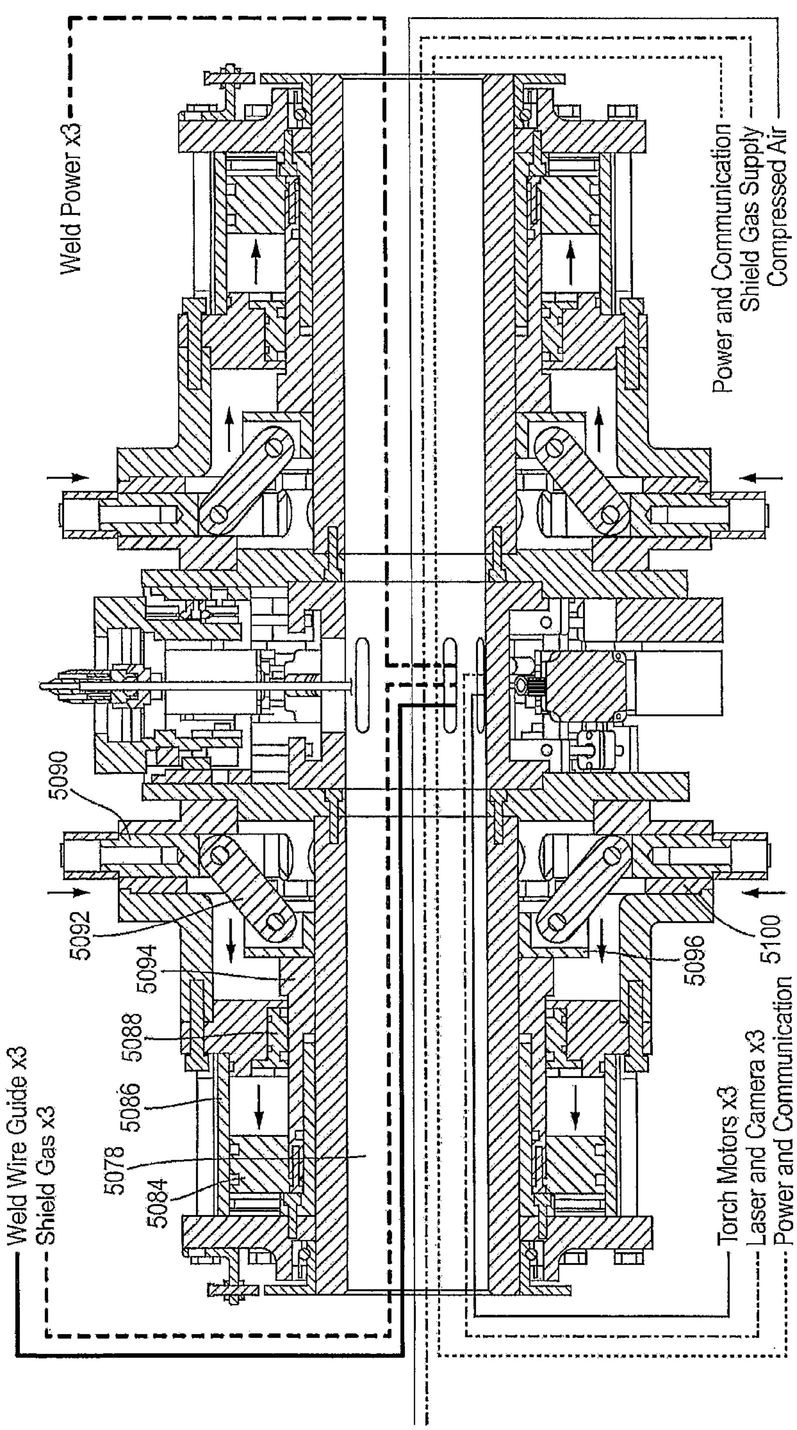
FIG. 103A shows a cross-sectional view of the center section of the tie-in internal weld system, where the clamps are in their retracted positions, and where some components of the center section are not shown for sake of clarity, in accordance with an embodiment of the present patent application.
Figure 103B:
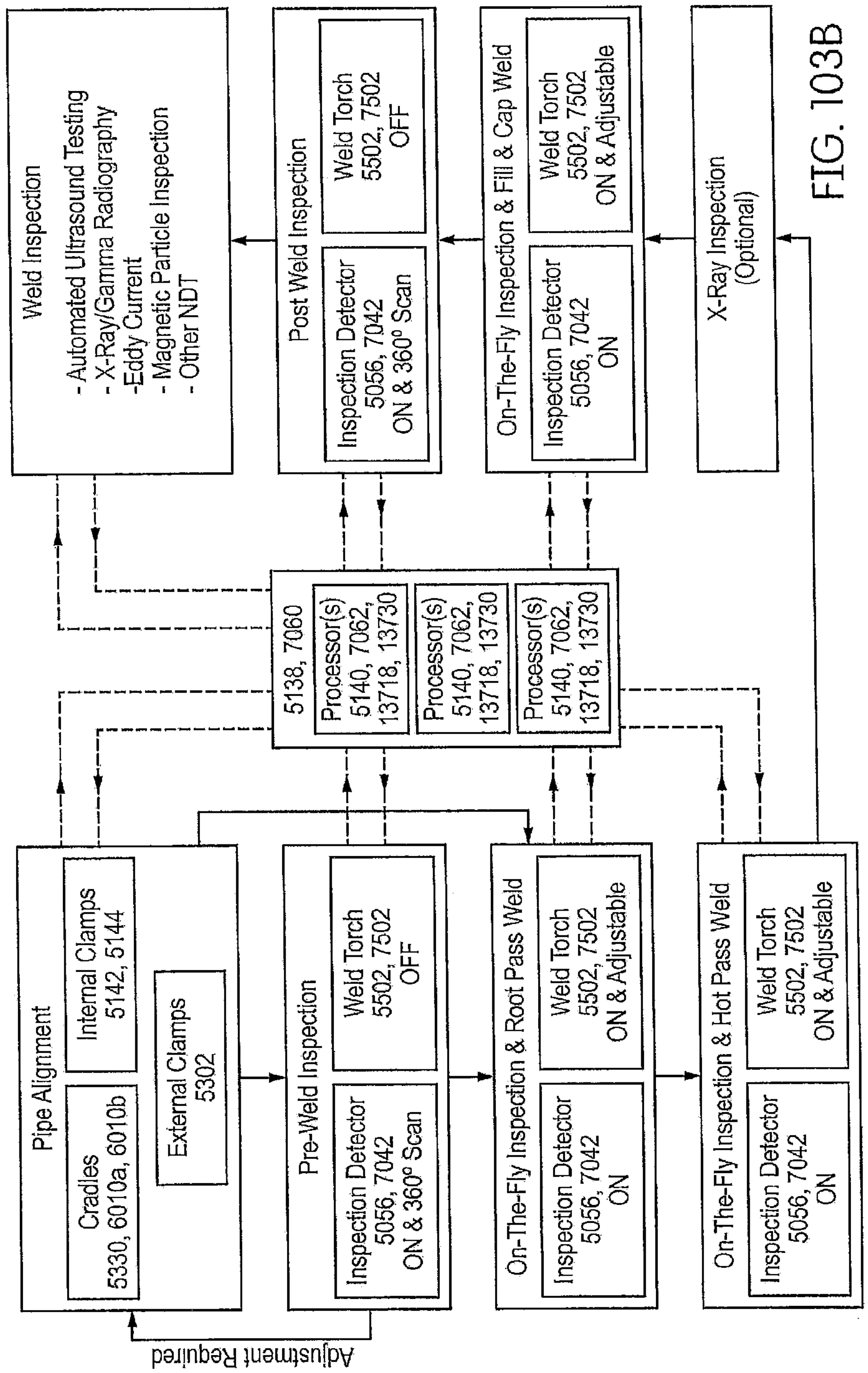
FIG. 103B shows a method for aligning two pipes, pre-inspecting an interface region between the two pipes to be welded end-to-end, welding the two pipes, post-weld inspecting the weld joint formed between the two pipes in accordance with an embodiment of the present patent application.

FIG. 103B shows the pipe alignment, welding and inspection procedures of the internal weld system 5004.

In one embodiment, the inspection detector 5056 scans 360° of the interface region 5136 between the pipes 1022*a*, 1022*b* before any welding takes place. In one embodiment, during the procedure of generating the pre-weld profile data, the inspection detector 5056 is positioned between the clamps and/or seals of the internal weld system 5004 and is turned on. In one embodiment, the weld torch(es) 5502 are turned off during the procedure of generating the pre-weld profile data. In one embodiment, the one or more processors 5140 are configured to interact with the inspection detector 5056 to scan the interface region 5136 to obtain the pre-weld profile data subsequent to the first clamp 5142 and the second clamp 5144 engaging with the first pipe 1022*a* and second pipe 1022*b*, respectively.

In one embodiment, the cradles 5330 (as shown in FIGS. 10A and 10B) and 6010A and 6010B (as shown in FIG. 73) are operated by the one or more processors 5140 (or otherwise controlled) to engage the exterior surfaces 5346 and/or 5348 (as shown in FIG. 2G) of the first pipe 1022*a* and/or second pipe 1022*b* to adjust the relative positioning of the pipes 1022*a*, 1022*b* in the event the pre-weld profile data determines adjustment is required. In one embodiment, an interior surface 5130, 5132 of the first pipe 1022*a* and/or the second pipe 1022*b* is engaged and manipulated by the first clamp 5142 and the second clamp 5144, respectively to adjust the relative positioning of the pipes 1022*a*, 1022*b* in the event the pre-weld profile data determines adjustment is required.

In one embodiment, during the procedure of generating the on-the-fly weld profile data, the inspection detector 5056 is positioned between the clamps and/or seals of the internal weld system 5004 and is turned on. In one embodiment, the one or more processors 5140 are configured to control a position and speed of the weld torch 5502 (or 7502) based on the on-the-fly weld profile data. In one embodiment, the on-the-fly scan/inspection procedure is performed during the root pass weld procedure, the hot pass weld procedure, the fill pass weld procedure, and the cap pass weld procedure. In one embodiment, an optional radiography inspection procedure (e.g., 1044 as shown in and described with respect to FIG. 1B) may be performed between the on-the-fly scan/inspection & hot pass weld procedure and the on-the-fly scan/inspection & fill and cap pass weld procedure.

In one embodiment, the inspection detector 5056 scans 360° of the interface region 5136 between the pipes 1022*a*, 1022*b* subsequent to a welding operation. In one embodiment, during the procedure of generating the post-weld profile data, the inspection detector 5056 is positioned between the clamps and/or seals of the internal weld system 5004 and is turned on. In one embodiment, the weld torch(es) 5502 are turned off during the procedure of generating the post-weld profile data.

In one embodiment, a weld inspection procedure (e.g., 1008 as shown in and described with respect to FIG. 1B) may be performed after the post-weld scan/inspection procedure.

The procedures of FIG. 103B are described with respect to the internal weld system 5004. However, as shown in FIG. 103B, it is contemplated that the same procedures apply the tie-in internal weld system 3001 and the purge and inspection system 7001, and, therefore, will not be described again with reference to the tie-in internal weld system 3001 and the purge and inspection system 7001.

Because, in one or more embodiments, the pipe has been welded from the interior, (i.e. the root pass weld has been applied from inside the pipe) the resulting root weld can be superior in that it better takes into account any mismatch and/or high-low regions within the pipe. In addition, if a hot weld pass (a second weld layer on top of the root pass layer) is also applied internally, the pipe can also be provided with positive root enforcement on top of the root weld pass. The hot weld pass, and even a further weld pass applied internally, can provide a small curved bump that extends slightly internally in the pipe to further reinforce the pipe. For example, the internal diameter of the pipe could be structured to be slightly smaller at the region of the weld than the internal diameter of the welded pipe at regions that contain just the pipe material without the weld. In one aspect of this application, the hot pass layer of the weld material has at least a portion thereof disposed closer to the longitudinal axis of the pipe than the interior surfaces of the welded pipes in regions of the welded pipes immediately adjacent to the weld material on opposite sides of the weld material.

In some embodiments, the internal weld system 5004 disclosed herein is configured to weld pipes that are at least 30' long. In other embodiments, the internal weld system 5004, 3001 disclosed herein is configured to weld pipes that are 26" in diameter or less. In yet other embodiments, the internal weld system 5004 can weld pipes that are less than 24" in diameter. In yet other embodiments, the internal weld system 5004 disclosed herein is configured to weld pipes that are both, at least 30' long and less than 24" in diameter.

FIGS. 73-85 show and disclose another embodiment of the internal weld system in accordance with another embodiment of the present patent application.

The present patent application provides a system for aligning and welding together the faces of two pipe segments. The system includes an external alignment mechanism and a welding mechanism. The external alignment mechanisms may be as sophisticated as the line up modules shown in the drawings or as simple as a tipton clamp as illustrated in U.S. Pat. No. 1,693,064. The mechanisms used may also be suitable for on or off shore pipeline construction. U.S. Pat. No. 1,693,064 is incorporated herein by reference in its entirety. Whatever mechanism is employed, the external alignment mechanism supports and adjustably positions each segment so that the segments are substantially collinear or axially aligned along their longitudinal axes.

The external alignment mechanism may support a pipe segment and may include powered features that allow the position and orientation of the pipe to be adjusted. Specifically, the external alignment mechanism may include rollers that allow the pipe to move longitudinally. The pipe may also be supported by rollers that allow the pipe to be rolled about the longitudinal axis and moved up and down. The position and orientation adjustments may be automatic as by motor power or hydraulic power controlled at an operator station or fed into a central controller that automatically controls an aligns the segments based on predetermined alignment parameters or feedback from an internal laser reading an interface or joint profile.

The welding mechanism is an internal welding machine that applies a weld (e.g., a gas metal arc weld "GMAW") from inside the pipe segments to a face or edge joint of the segment and into a v-shaped opening formed by chamfered edges of the two pipe segments (other cross-sectional shapes other than a V may be used also). The welding mechanism includes a carriage capable of engaging the inner walls of the pipe to secure or lock itself within the pipe in a fixed position and a welding portion rotatably supported from the carriage within the pipe. Specifically, the internal welder is located within the aligned pipe and then positioned longitudinally so that a weld head or torch is in longitudinal proximity to the edge joint. The welding mechanism also includes a rotary mechanism for rotating the welding portion relative to the carriage. The weld head or torch is rotatably supported on the welding portion about the pipe longitudinal axis so that the torch may closely follow the entire interior joint interface in an orbital rotation. Specifically, during welding, the torch of the articulating head follows the edge joint around the entire interior circumference of the pipe applying weld material. In addition to circular rotation relative to the carriage, various control elements may move the weld head axially along the pipe relative to the carriage, radially toward and away from the joint, and pivotally about a point or axis (e.g., an axis parallel or perpendicular to pipe longitudinal axis A-A). A controller may direct the torches pivoting. These degrees of freedom of articulation allow the weld head to be very effective and efficient in filling in interface profiles optimally and where necessary.

The welding mechanism also includes a laser tracking mechanism that works in conjunction with the torch of the welding portion to sense interface joint profile or/and weld material profile to apply weld material to the edge joint in the appropriate location and amount. The laser mechanism surveys the weld and sends a signal to the controller of the articulating weld head to control movement of the head around the entire edge joint. Specifically, the torch follows the laser as the weld head control system continuously receives weld profile information from the edge joint. The information is then used to continuously adjust the torch to achieve the desired weld structure.

In addition to the laser tracking mechanism, the system may include a 2D camera for visual inspection of the weld. The 2D camera is mounted on the welding portion and follows the torch so that an operator can inspect the weld as soon as it is created by the torch. A visual signal is delivered to an external operator display. For example, the 2D camera may be a color camera and a change in coloration may indicate a weld defect to the operator. A perceived change in profile may also indicate a defect.

Figure 75:
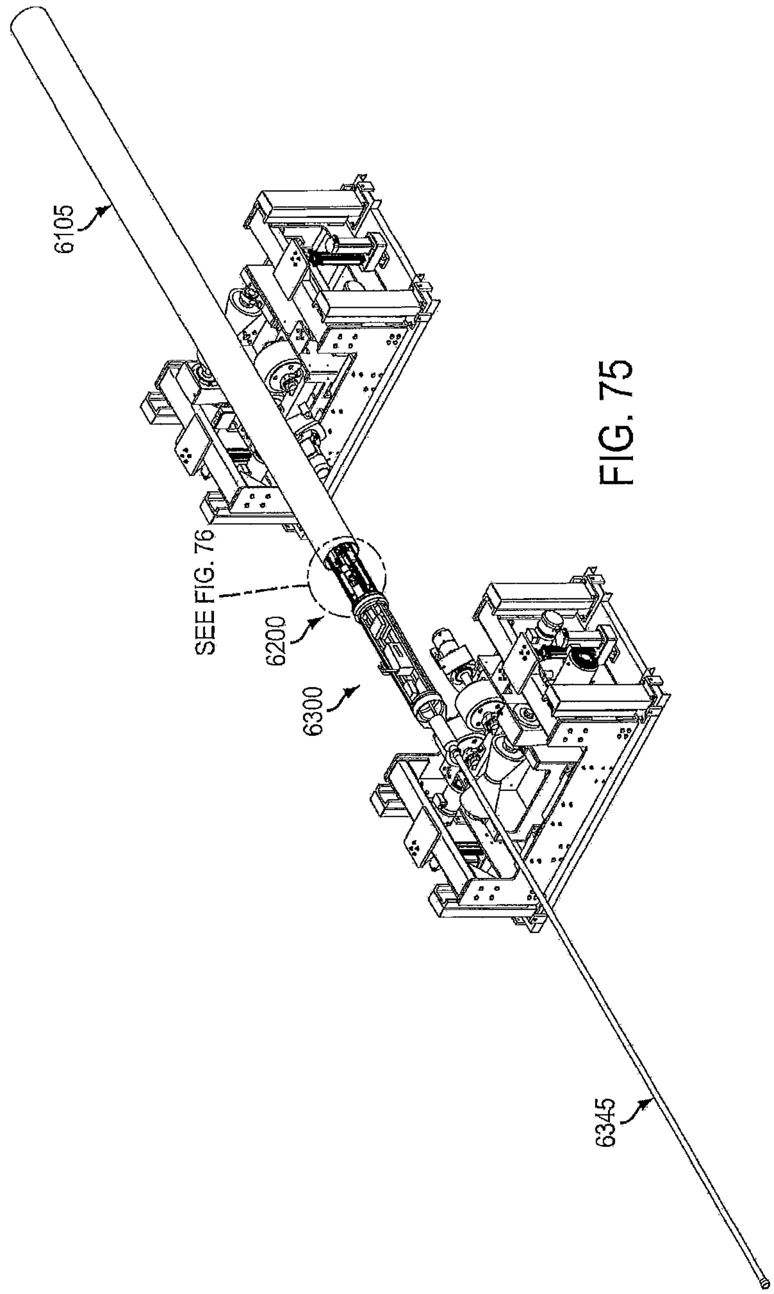
FIG. 75 shows the system in which a weld system is inserted into a pipe segment in accordance with an embodiment of the present patent application, wherein one of the pipe segments is not shown for the sake of clarity.

Referring to FIGS. 73-75, the system for welding pipeline segments together is described as follows. FIG. 73 shows an external alignment mechanism 6010A and 6010B which is capable of supporting, positioning, and repositioning multiple lengths of pipeline. Each mechanism 6010A and 6010B may include supports (e.g., rollers) upon which a length of pipeline may be supported. A longitudinal roller 6012 moveably supports pipeline segment 6105 such that segment 6105 may be repositioned along its longitudinal direction defined by arrow A. In addition, rotational rollers 6014 are rotatable about an axis parallel to axis A-A of support segment 6105 on either side of segment 6105 enabling them to rotate or adjust the angular orientation of segment 6105 about axis A-A. External alignment mechanism 6010 is able to automatically manipulate multiple segments into various positions and orientations via motors, hydraulics, etc. For example the segments may be raised, lowered, rotated, tilted, pivoted, etc.

As shown in FIG. 73, the external alignment mechanisms 6010A and 6010B support multiple segments 6105, 6110 and adjust their position and orientation until segments 6105, 6110 are both aligned such that their longitudinal axes A-A are collinear and one end of each of the segments 6105, 6110 abuts at interface edges. Specifically, FIG. 74 illustrates an enlarged view of detail 6100 of FIG. 73 in which the edges form a pipe interface 6120 (known as a "fit up" joint).

The pipeline aligning and weld system of the present patent application applies a weld to the interior of the interface 6120 from inside the fitted up segments 6105, 6110. To apply a weld to the interior of the joint 6120, an internal welding mechanism 6300 is rolled into an end of one of the segments 6105 as shown in FIG. 75. A second segment 6110 is then placed on the external alignment mechanism 6010B and manipulated until both the segments

6105, 6110 are satisfactorily aligned. An external force may then be applied to a reach rod 6345 of the internal welding mechanism 6300 or the mechanism may include automatic self propulsion means for adjusting its axial position within the aligned segments 6105, 6110.

As shown in FIGS. 76-79, the welding mechanism 6300 includes a carriage 6301 and a welding portion 6302. The carriage 6301 includes at least one alignment mechanism 6340A, 6340B which may expand radially to engage the interior surface of segments 6105 or 6110. This expansion and engagement both secures the axial/longitudinal position of the welding mechanism 6300 relative to segment 6105, 6110 and aligns or radially centers the welding mechanism 6300 within the segments 6105, 6110. The carriage 6301 also includes a body 6311 on which rotating mechanism 6335 is supported. The body 6311 is comprised of multiple elongated structural support members that extend between alignment mechanism 6340A and 6340B. As discussed below the welding portion 6302 includes a similar corresponding structure 6313.

The welding portion 6302 is rotatably connected to the carriage 6301 and extends from an end of the carriage 6301. The relative rotation between the carriage 6301 and the welding portion 6302 is facilitated by a rotary mechanism 6335. The rotary mechanism 6335 is secured to the carriage 6301 and automatically (via a motor and gears) rotates welding portion 6302 relative to the carriage 6301 about longitudinal axis A-A. The welding portion 6302 may be cantilevered from the carriage 6301 or may be supported by an additional alignment mechanism 6340C located so that torch 6305 is positioned between alignment mechanisms 6340B and 6340C. When alignment mechanism 6340C is provided, the welding portion 6302 is rotatable relative to and between both the alignment mechanisms 6340B and 6340C when the alignment mechanisms 6340B and 6340C expand to secure themselves to the interior of a segment. Furthermore, the carriage 6301 may include a reach rod 6345 which can be structured as an elongated extension from the carriage 6301 which an operator may grasp to insert/push or retract/pull the welding mechanism 6300 to axially position it within a segment 6105, 6110.

Figure 76:
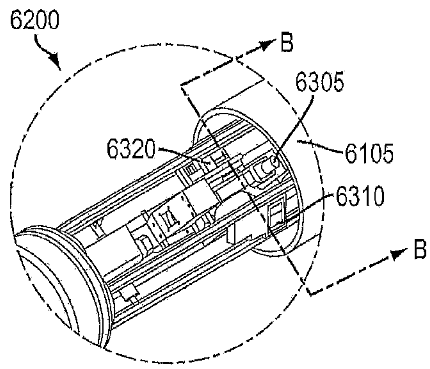
FIG. 76 shows an enlarged view of a section of FIG. 75 showing a weld portion of the weld system positioned for welding in a pipe segment in accordance with an embodiment of the present patent application, wherein one of the pipe segments is not shown for the sake of clarity.
Figure 77:
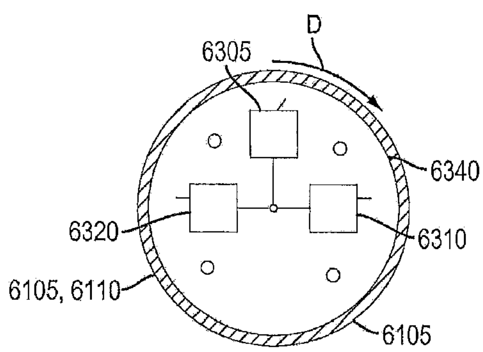
FIG. 77 shows a cross-sectional view of FIG. 76 taken along the axis B-B showing the arrangement of various weld portion elements in accordance with an embodiment of the present patent application.
Figure 78:
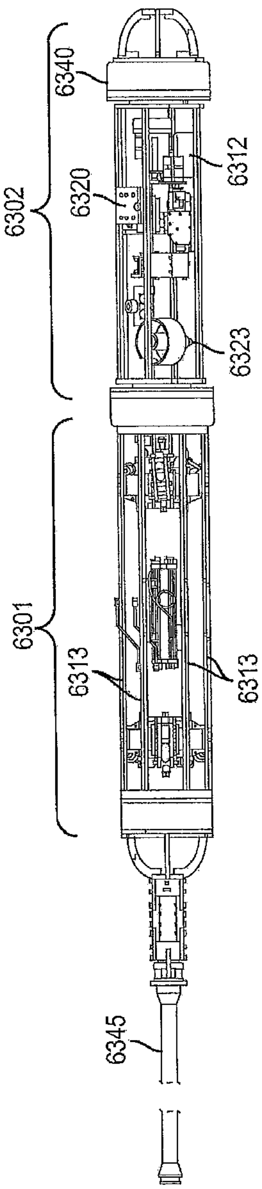
FIGS. 78 and 79 show side views of the weld system of FIG. 75, where the pipe segment is not shown for sake of clarity, in accordance with an embodiment of the present patent application.
Figure 79:
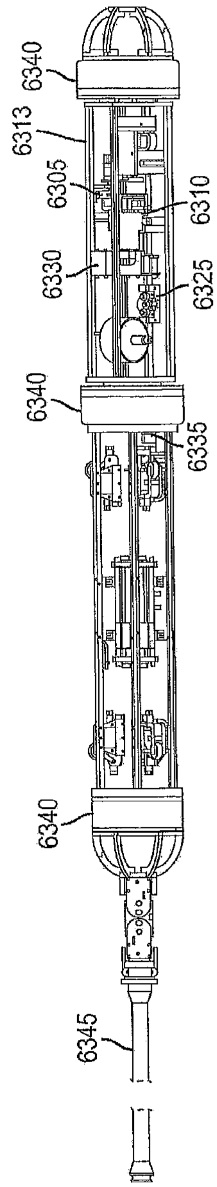

FIG. 76 shows an enlarged view of section 6200 of FIG. 75 in which only segment 6105 is present and segment 6110 is absent. As shown in FIG. 76, the welding portion 6302 includes a welding group 6303 which comprises a torch 6305, a laser sensor 6310, and a color camera 6320. The welding portion 6302 further has a body 6313 on which torch 6305, the laser sensor 6310, and the color camera 6320 are supported. The laser 6310 tracks an interior joint of segments 6105, 6110, and detects an interface profile to be used to position the torch 6305 in applying a weld to the joint interface. The body 6313 extends between the alignment mechanism 6340B and 6340C. Section 6200 shows the welding mechanism 6300 located inside the segment 6105 with the torch 6305 generally pointed in a radially outward direction and positioned to apply a weld to face joint 6120. FIG. 77 shows an embodiment of a general schematic cross-sectional view of the welding mechanism 6300 through section B-B which shows welding group 6303 looking in the direction of insertion of the welding mechanism 6300. FIG. 77 also shows a direction D of rotation of the welding group 6303 when it is rotated by the rotary mechanism 6335. Therefore, a welding action on a particular point along weld joint 6120 will first be acted on by the laser sensor 6310 followed by the torch 6305 and finally by the 2D inspection camera 6320.

Figure 82:
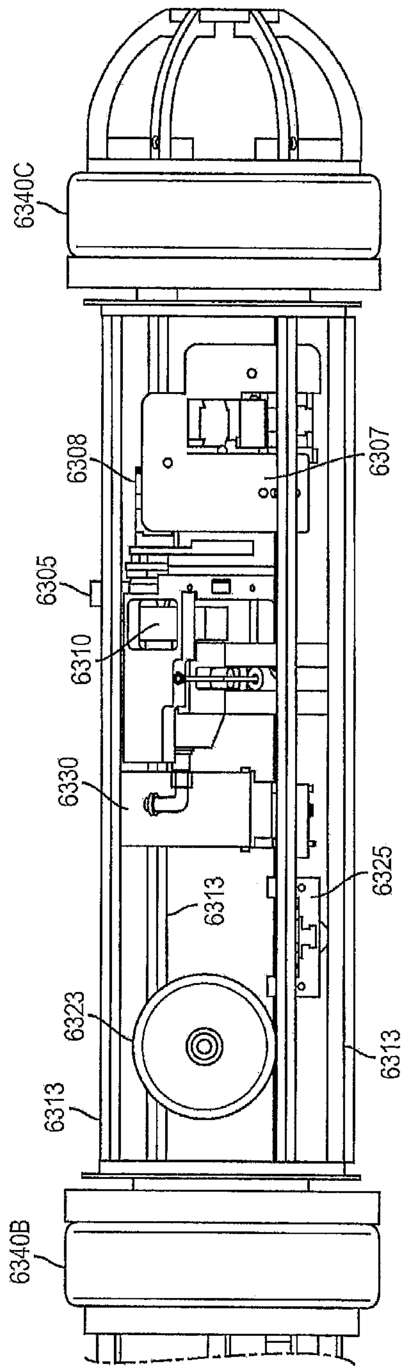
FIG. 82 shows a side view of the weld portion of the system of FIG. 73 in accordance with an embodiment of the present patent application.
Figure 83:
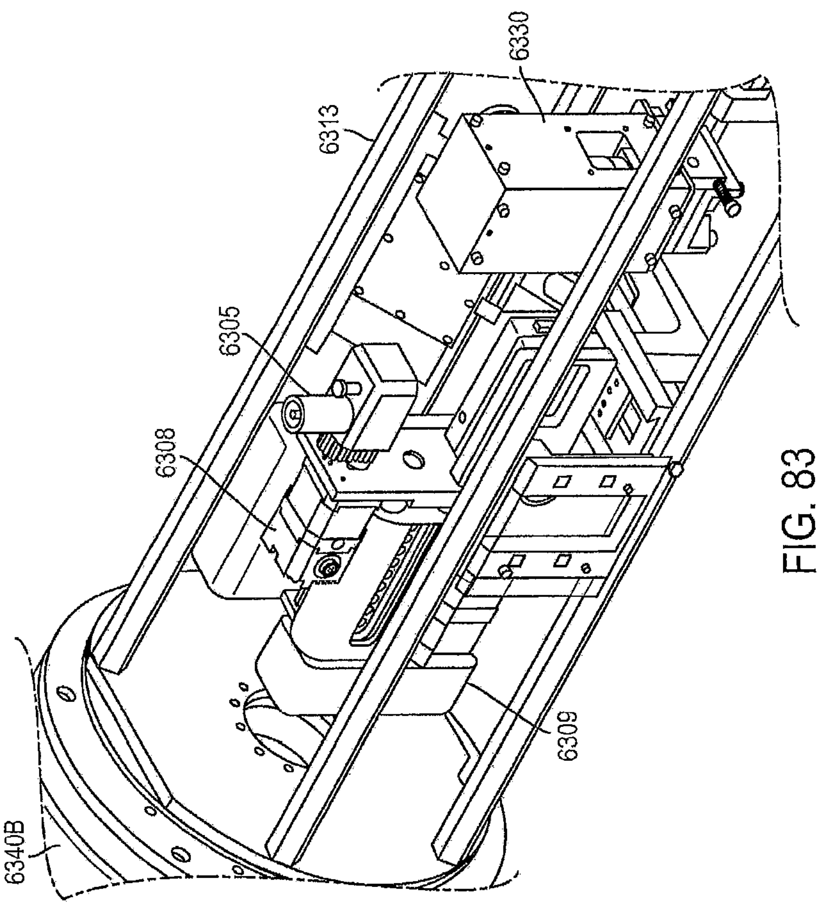
FIG. 83 shows an enlarged perspective view of a section of the weld portion of the system of FIG. 73 in accordance with an embodiment of the present patent application.
Figure 84:
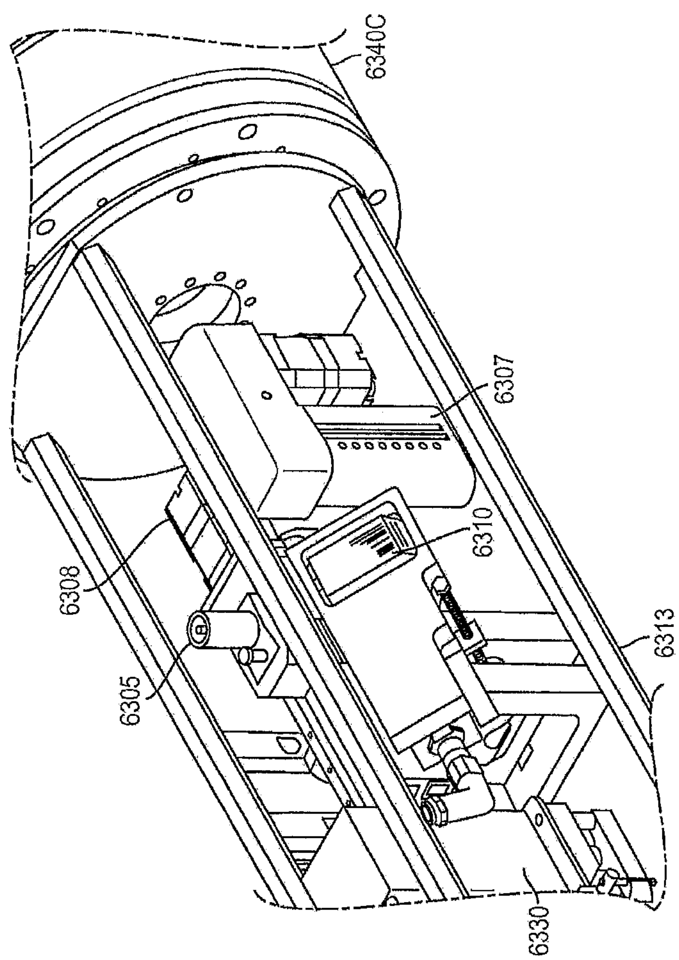
FIG. 84 shows another enlarged perspective view of a section of the weld portion of the system of FIG. 73 in accordance with an embodiment of the present patent application.
Figure 85:
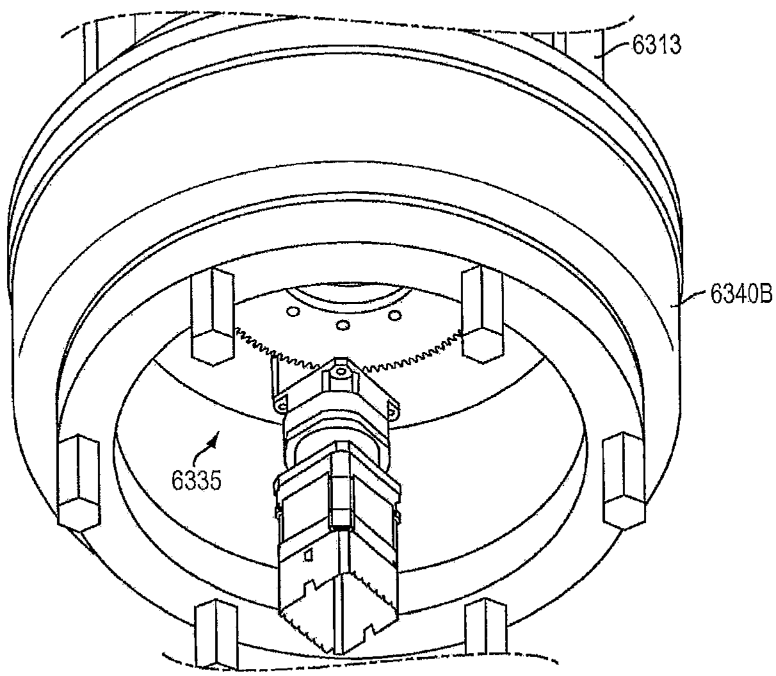
FIG. 85 shows an enlarged perspective view of a rotary mechanism of the system of FIG. 73 in accordance with an embodiment of the present patent application.

FIGS. 82-84 illustrate multiple perspectives of the welding portion 6302. FIG. 82 shows a wire delivery system 6322. The wire delivery system 6322 includes a wire spool storage 6323, an optional wire straightener 6325, and a wire feed mechanism 6330 which is automatically controlled to deliver the appropriate amount of wire to the torch 6305. As the rotary mechanism 6335 rotates the welding portion 6302, wire is fed to the torch 6305 by wire delivery mechanism 322.

As mentioned above, the torch 6305 may be positioned and oriented in multiple ways by multiple mechanisms. The torch 6305 is supported on a manipulator. The manipulator includes a radial positioner, an axial positioner and a pivoter. Specifically, a radial positioner 6307 (e.g., a rack and pinion) on which the torch 6305 is supported is capable of moving the torch radially toward and away from the interior surface of segments 6105, 6110. In other words, towards and away from the interface of the segments 6105, 6110 to be welded. In addition, an axial positioner 6309 (e.g., a rack and pinion) may move the torch 6305 axially within segments 6105, 6110. The manipulator also includes a pivoter 6308 that allows the torch to pivot (e.g., about an axis parallel to segment longitudinal axis A-A). The pivotal movement by the pivoter 6308 may be powered by a motor and gears 6306. For example, the motor may be a stepper motor.

The torch manipulator may compound the manipulative movements of the above mentioned elements by dependently supporting the elements. For example, the body 6313 may support the axial positioner which in turn supports the radial positioner which in turn supports the pivoter which in turn supports the torch. Similarly, the axial positioner may be supported by the radial positioner. Furthermore, any order of support may be employed.

The elements of the manipulator are controlled by a controller which receives as input, a series of signals including a signal from the laser 6310 and then processes the information before transmitting a signal to at least the radial positioner 6307, the axial positioner 6309, the pivoter 6308, and the wire delivery system 6322. The torch 6305 is then repositioned and reoriented continuously according to predetermined parameters of the controller based on signals from profile reading laser 6310.

Figure 80:
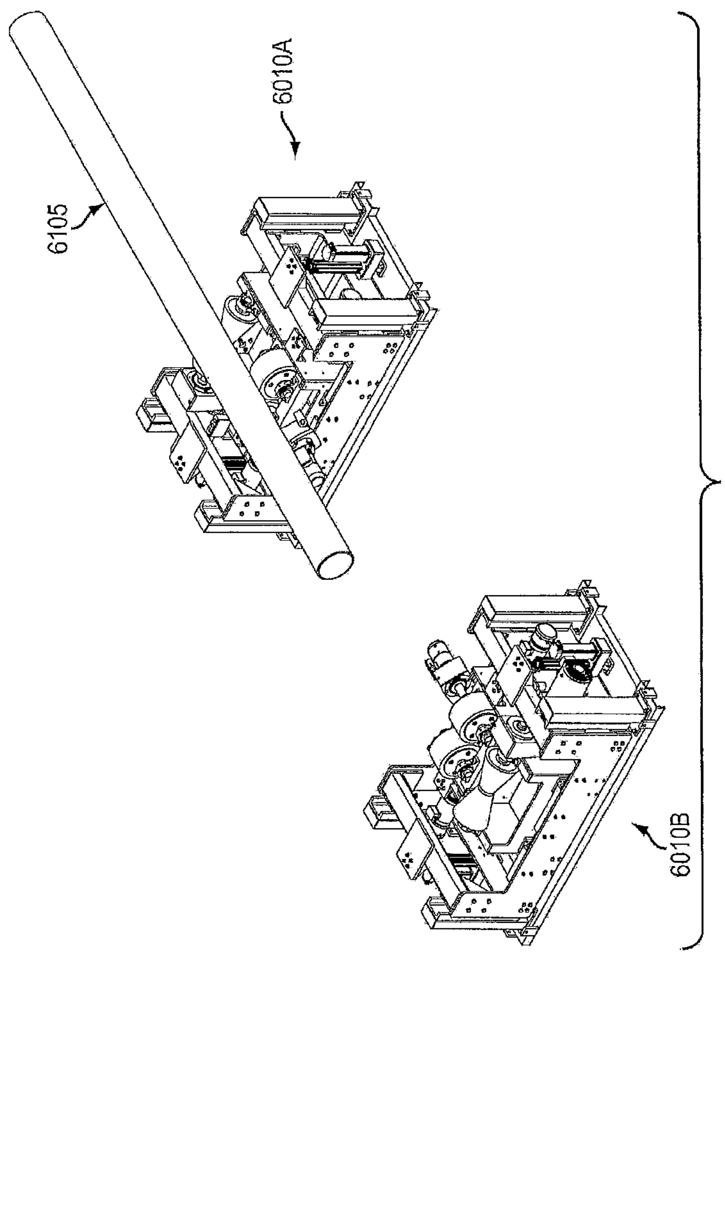
FIG. 80 shows a perspective view of the system of FIG. 73 in a configuration showing a first procedure in which a pipe segment is placed on an external alignment mechanism in accordance with an embodiment of the present patent application.
Figure 81:
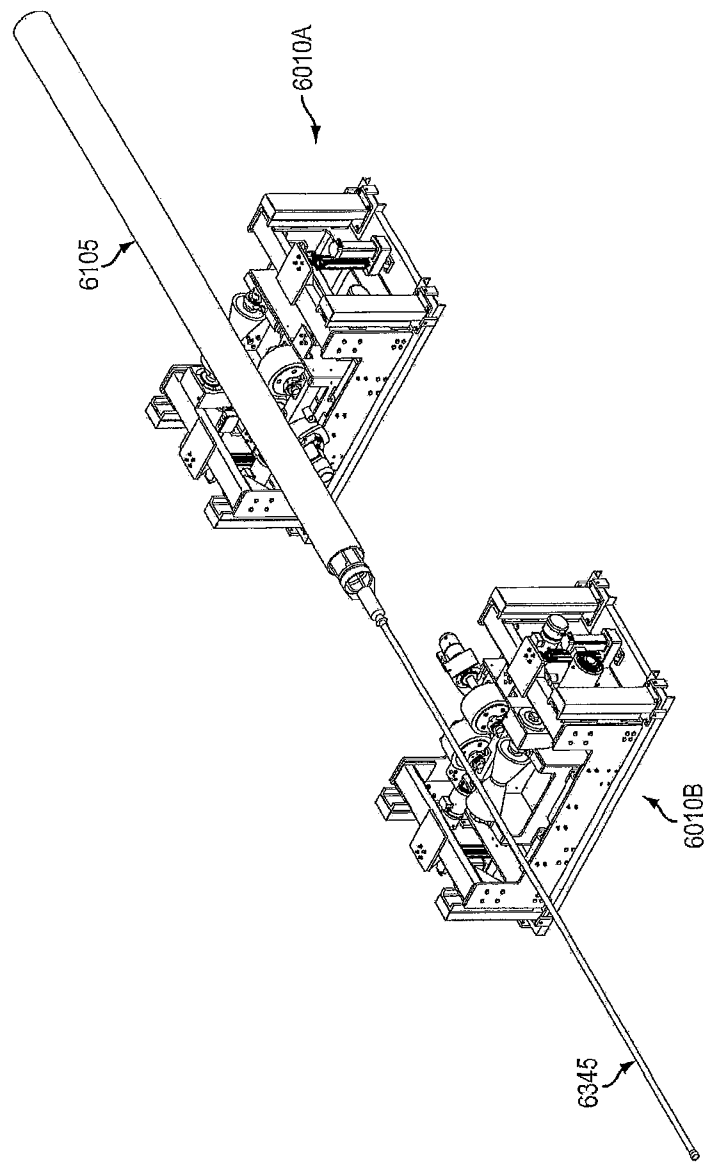
FIG. 81 shows a perspective view the system of FIG. 73 in a configuration showing a procedure subsequent to FIG. 80 in which the weld system is inserted into a pipe segment in accordance with an embodiment of the present patent application.

The operation of the present internal welding system will now be described. FIGS. 73, 80 and 81 illustrate the process of positioning and welding the segments 6105 and 6110 together. In operation, one or more of the following lettered steps may be executed so that: a) a pipe segment 6105 is placed on the alignment device/pipe stand 6010A; b) the internal welding machine 6300 is then inserted into the pipe segment 6105; c) a second pipe segment 6110 is then aligned with the pipe segment 6105 and the welding mechanism 6300 is pulled forward by the reach rod 6345 or automatically driven so that the torch 6305 generally lines up with faces joint 6120 of the pipe segments 6105, 6110; d) the alignment mechanisms 6340A, 6340B (and if necessary 6340C) are then engaged to secure the welding mechanism 6300 within the pipe segments 6105, 6110; e) in one embodiment (optional), the rotary mechanism 6335 rotates the weld head 6305 to perform an initial scan of interface joint 6120 of the pipe segments 6105, 6110 by the laser sensor device 6310 to ensure optimal fit up; f) if required, steps (c), (d) and (e) may be repeated, i.e. the pipe segments 6105, 6110 are realigned/rotated and rescanned by the laser 6310, to improve "fit up"; g) optionally, the internal alignment mechanism 6340C on the rear of the welding mechanism 6300 is engaged to hold the axial position of the welding mechanism 3600 with respect to both the pipe sections 6105, 6110; h) with the welding mechanism 6300 secure in the pipe segments 6105 and 6110, the root weld (first weld) cycle begins so that the laser 6310 scans the pipe interface 6120, the torch 6305 follows the laser 6310, and the output from the laser 6310 is used to control the position of the articulated torch 6305, where the position and orientation of the torch 6305 with respect to the interface 6120 is controlled so as to produce the best quality weld; i) in addition to a signal from the laser 6310, thru the arc current monitoring can also be used in directing the torch position; j) after the completion of a 360° weld, the weld head 6305 is rotated back to an original position; k) the profile (using the laser 6310) and the visual inspections (with the 2D color camera 6320) are performed either in the previous step (j) or on a separate inspection run; l) after inspection, aligning mechanism 6340A-C are released and welding mechanism 6300 is pulled or driven forward towards the open end of the welded pipe 6105, 6110 and with the nose of the welding mechanism 6300 exposed, like (b), the pipe segment 6110 is placed on external alignment mechanism 6010B and advanced to the next joint; m) steps (c) to (l) are then repeated for the entire production run.

In one embodiment, a signal from the laser sensor 6310 is sent to an electronic controller of the external alignment mechanism 6010 to automatically reposition one or both of the segments 6105, 6110 for a more desirable face joint 6120 arrangement. Furthermore, the foregoing steps may be executed in the stated order. However, variations in the order are also contemplated.

In another embodiment, instead of stopping after the first 360° weld, the rotation is continued to lay another weld pass, the laser 6310 could be used to inspect & track simultaneously while the trailing 2D color camera continues inspection after the second weld.

In still another embodiment, instead of welding a complete 360° weld, the weld is performed in two 180° halves with the same start position. This implementation would require either multiple laser sensors for tracking or a mechanism to physically oscillate the laser and/or the torch in order to maintain the tracking sensor's lead position in both directions of rotation (i.e., rotate the torch and laser so that they switch positions).

In one embodiment, the present patent application discloses a tie-in internal weld system 3001. In one embodiment, the tie-in internal weld system 3001 incorporates all of the features of the internal weld system 5004. In one embodiment, the additional features of the tie-in internal weld system 3001 may include a large capacity battery so that the tie-in internal weld system 3001 can travel long distances, and has on-board weld power. In one embodiment, the tie-in internal weld system 3001 is configured to operate autonomously so that there is no external cables to the tie-in internal weld system 3001.

As a result of the welding power, locomotion power, and other required power being carried on-board (the full battery system carried by the frame), the tie-in internal weld system 3001 can be used to traverse very long spans of pipe, and perform a welding operation at such locations. This is achievable as the system need not be tethered for power from an external power source.

In one embodiment, the tie-in internal weld system 3001 may also include a device for pulling the pipes together to close any gaps. In one embodiment, the device for pulling the pipes together to close any gaps may be referred to as an ungapping device. In one embodiment, the upgapping device is constructed and arranged such that one of the clamps is configured to be moveable relative to the other clamp. In one embodiment, the upgapping device is constructed and arranged to be external to the main weld section. In one embodiment, the upgapping device is constructed and arranged to be within the pipes.

In one embodiment, the tie-in internal weld system 3001 includes the forward-most section 3002, the center section 3004, and the drive section 3006 that are similar to that in the internal weld system, 5004. In one embodiment, the structure, configuration, components, and operation of the forward-most section 3002, the center section 3004 and the drive section 3006 of the tie-in internal weld system 3001 are similar to the forward-most section, the center section and the drive section of the internal weld system 5004 described in detail above, and, therefore, the structure, configuration, components, and operation of the forward-most section 3002, the center section 3004 and the drive section 3006 of the tie-in internal weld system 3001 will not be described in detail here. In one embodiment, the electronics module of the forward-most section 3002, the electronics module of the center section 3004, and the electronics module of the drive section 3006 each include one or more processors.

For example, the tie-in internal weld system 3001 includes a frame that is configured to be placed within the pipes **1022*a*, 1022*b*, a plurality of rollers 3125 that are configured to rotatably support the frame of the tie-in internal weld system 3001, a drive motor 3124 that drives the rollers 3125 to move the frame of the tie-in internal weld system 3001 within the pipes 1022*a*, 1022*b*, a brake system that secures the frame of the tie-in internal weld system 3001 from movement at a desired location within the pipes 1022*a*, 1022*b*, an inspection detector that is carried by the frame of the tie-in internal weld system 3001 and configured to detect a characteristic of an interface region between the pipes 1022*a*, 1022*b*, and a weld torch carried by the frame of the tie-in internal weld system 3001. In one embodiment, like the internal weld system 5004, the brake system of the tie-in internal weld system 3001 may include the clamps of the tie-in internal weld system 3001 that are configured to clamp to the pipes 1022*a*, 1022*b*, respectively. In one embodiment, like the internal weld system 5004, the brake system of the tie-in internal weld system 3001 may include the brake cylinder and the brake valve of the tie-in internal weld system 3001. In one embodiment, the structure, configuration, and/or operation of the rollers 3125, the drive motor 3124, the inspection detector, and the weld torch the tie-in internal weld system 3001 are similar that of the internal weld system 5004** and, therefore will not be described in detail here.

In one embodiment, the tie-in internal weld system 3001 also includes one or more processors that are operatively connected with the drive motor 3124, the inspection detector and the weld torch. The configuration and operation of the one or more processors of the tie-in internal weld system 3001 are similar to that of the internal weld system 3004 and, therefore will not be described in detail here.

In one embodiment, the tie-in internal weld system 3001 is entirely untethered. Specifically, the tie-in internal weld system 3001 need not include the reach rod or the umbilical and all the communications to and from the tie-in internal weld system 3001 are entirely wireless. In one embodiment, the tie-in internal weld system 3001 may include a transmitter that is configured to transmit all the communication signals entirely wirelessly from the tie-in internal weld system 3001 to the remote uLog processing system and a receiver that is configured to receive all the communication signals entirely wirelessly from the remote uLog processing system. In one embodiment, the one or more processors and/or all the electronic modules of the tie-in internal weld system 3001 are configured to communicate entirely wirelessly with the remote uLog processing system. In one embodiment, the inspection detector, the inspection camera, all the sensors, all the motors, all the valves and/or other components/elements of the tie-in internal weld system 3001 are configured to communicate entirely wirelessly with the remote uLog processing system.

In one embodiment, any information from the tie-in internal weld system can be communicated wirelessly with systems outside the pipe by WiFi, Bluetooth, NFC, by radio frequency, or through cell tower transmissions, just for example. In some embodiments where appropriate, the information is communicated by use of repeaters or extenders, where the transmission signal is to travel long distances or through curved areas.

In one embodiment, the one or more processors and one or more sensors of the tie-in internal weld system 3001 are configured to monitor the charge levels of the on-board weld power supply, on-board locomotion power supply, and other on-board power supplies. For example, the voltage output by these power supplies may be (continuously or at regular intervals) monitored. In one embodiment, the transmitter of the tie-in internal weld system 3001 transmits the monitored battery life/charge level information entirely wirelessly to the remote uLog processing system for further processing. For example, the monitored charge level information of the on-board power supplies may be used to determine an estimated remaining operating time of the tie-in internal weld system 3001. In one embodiment, the one or processors of the tie-in internal weld system 3001 may be configured to determine the estimated remaining operating time of the tie-in internal weld system 3001 locally on the tie-in internal weld system 3001. In one embodiment, the remote uLog processing system may be configured to determine the estimated remaining operating time of the tie-in internal weld system 3001 based on the wirelessly transmitted battery life/charge level information. In one embodiment, the remote uLog processing system may be configured to transmit the estimated remaining operating time of the tie-in internal weld system 3001 to the one or more processors of the tie-in internal weld system 3001. In one embodiment, the remote uLog processing system may also be configured to transmit (entirely wirelessly to the tie-in internal weld system 3001) further instructions about the operation of the tie-in internal weld system 3001 based on the estimated remaining operating time of the tie-in internal weld system 3001.

In one embodiment, the one or more processors and one or more sensors of the tie-in internal weld system 3001 are configured to monitor the gas levels of the on-board inert (shield/purge) gas supply, the on-board air supply, and other on-board gas supplies (e.g., volume or pressure of the compressed air in the on-board compressed air tanks, volume of pressure of the shield or purge gas in the on-board shield/purge gas tanks, etc.). For example, the gas consumption of these gas supplies may be monitored (continuously or at regular intervals). In one embodiment, the transmitter of the tie-in internal weld system 3001 transmits the monitored gas level information entirely wirelessly to the remote uLog processing system for further processing. For example, the monitored gas level information of the on-board gas supplies may be used to determine an estimated remaining operating time of the tie-in weld system 3001. In one embodiment, the one or more processors of the tie-in internal weld system 3001 may be configured to determine the estimated remaining operating time of the tie-in internal weld system 3001 locally on the tie-in internal weld system 3001. In one embodiment, the remote uLog processing system may be configured to determine the estimated remaining operating time of the tie-in internal weld system 3001 based on the wirelessly transmitted gas level information. In one embodiment, the remote uLog processing system may be configured to transmit the estimated remaining operating time of the tie-in internal weld system 3001 to the one or more processors of the tie-in internal weld system 3001. In one embodiment, the remote uLog processing system may also be configured to transmit (entirely wirelessly to the tie-in internal weld system 3001) further instructions about the operation of the tie-in internal weld system 3001 based on the estimated remaining operating time of the tie-in internal weld system 3001.

In one embodiment, the one or more processors and one or more sensors of the tie-in internal weld system 3001 are configured to monitor the weld wire material levels of the tie-in internal weld system 3001. For example, the rotations of the wire feed motor (that dispenses the weld wire) and the weight of the remaining weld wire material in the tie-in internal weld system 3001 may be monitored (continuously or at regular intervals) to determine weld wire material levels of the tie-in internal weld system 3001. In one embodiment, the transmitter of the tie-in internal weld system 3001 transmits the monitored weld wire material level information entirely wirelessly to the remote uLog processing system for further processing. For example, the monitored weld wire material level information may be used to determine an estimated remaining operating time of the tie-in internal weld system 3001 (e.g., before the weld wire material runs out or is below a minimum threshold level for operating the tie-in internal weld system 3001). In one embodiment, the one or more processors of the tie-in internal weld system 3001 may be configured to determine the estimated remaining operating time of the tie-in internal weld system 3001 locally on the tie-in internal weld system 3001. In one embodiment, the remote uLog processing system may be configured to determine the estimated remaining operating time of the tie-in internal weld system based on the wirelessly transmitted weld wire material level information. In one embodiment, the remote uLog processing system may be configured to transmit the estimated remaining operating time of the tie-in internal weld system 3001 to the one or more processors of the tie-in internal weld system 3001. In one embodiment, the remote uLog processing system may also be configured to transmit (entirely wirelessly to the tie-in internal weld system 3001) further instructions about the operation of the tie-in internal weld system 3001 based on the estimated remaining operating time of the tie-in internal weld system 3001.

In one embodiment, the remote uLog processing system receives battery charge data from numerous tie-in internal weld systems at different locations (for example, different locations across a country or across the globe) and establishes a data base thereon. That data base is used by the uLog processing system to determine, based on a large data set, expected battery life times based on different operating parameters of the internal weld system. This can be used by the uLog processing system and/or by one or more processors of the tie-in internal weld system 3001 to anticipate battery life times for various components based upon present operating conditions of those components. This information can be used by the one or more processors to reduce or regulate power consumption of one or more components by modifying one or more operating parameters. For example, weld speed, weld wire speed, voltage, and current, can all be regulated (e.g., lowered) to conserve battery life if the one or more processors determine that such operating conditions can be modified without adversely affecting the associated operation being performed.

In one embodiment, the battery life, voltage output, and any of the operating parameters are sent wirelessly to a user interface, such as a computer monitor having computer display, so that they can be monitored by a user.

In one embodiment, the tie-in internal weld system 3001 also includes the power section 3008 positioned next to the drive section 3006 (i.e., at the back of the tie-in internal weld system 3001).

Figure 101:
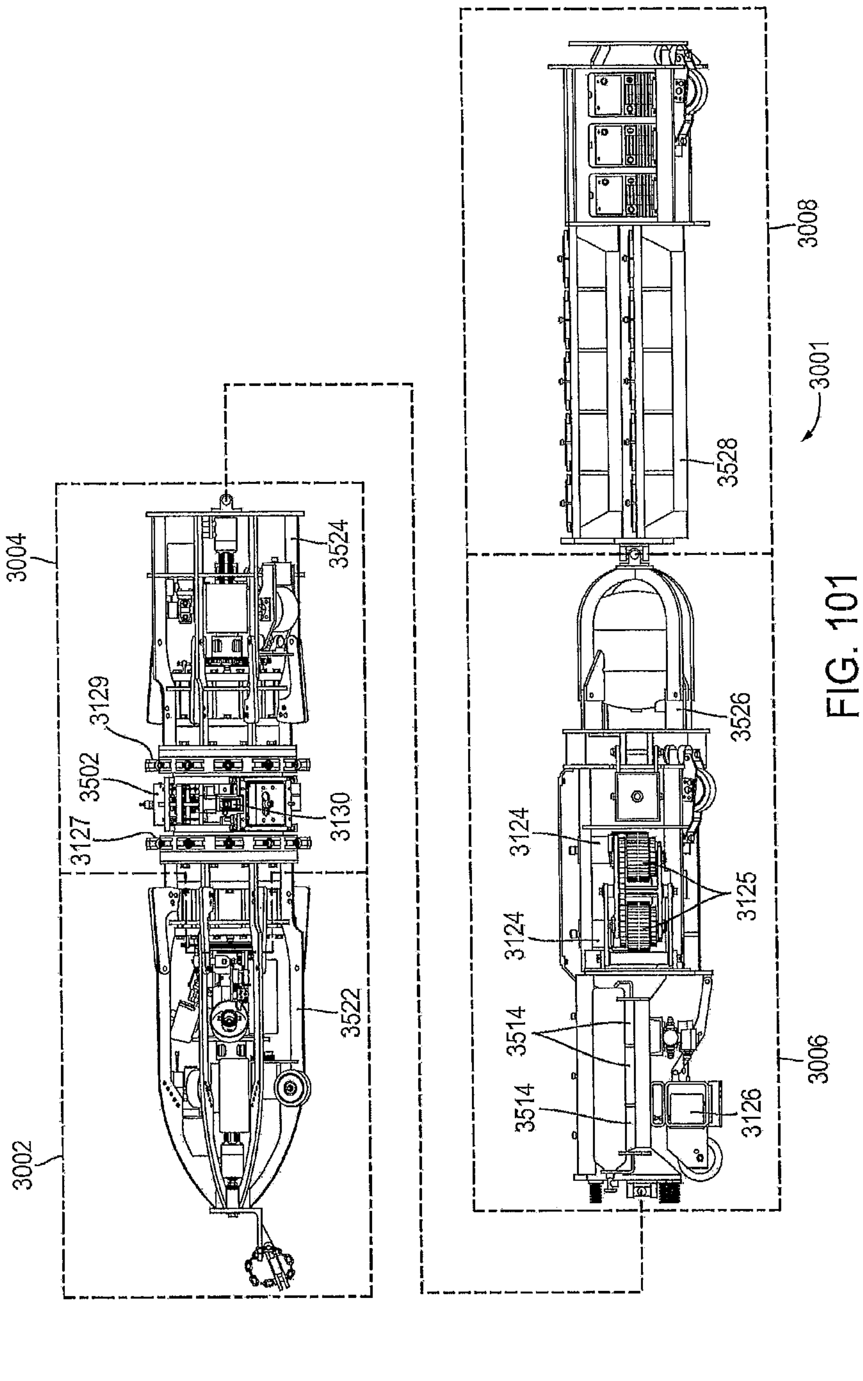
FIG. 101 shows a tie-in internal weld system in accordance with an embodiment of the present patent application.
Figure 102:
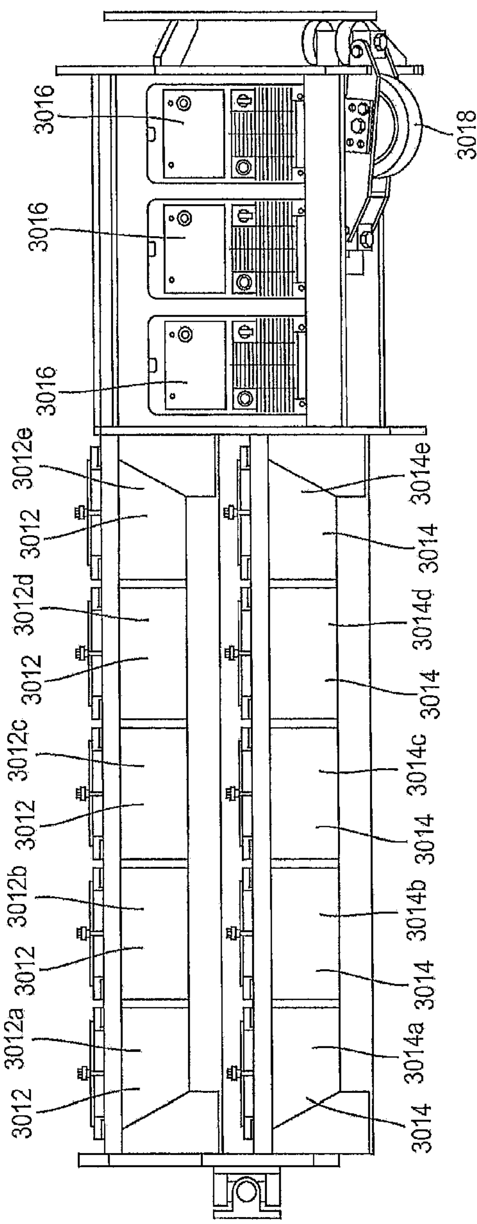
FIG. 102 shows a detailed view of a power section of the tie-in internal weld system in accordance with an embodiment of the present patent application.

In one embodiment, referring to FIG. 101, the forward-most section 3002 includes forward-most section frame 3522, the center section 3004 includes a center section frame 3524, the drive section 3006 includes a drive section frame 3526, and the power section 3008 includes a power section frame 3528. In one embodiment, the frame or frame assembly of tie-in internal weld system 3001 includes the forward-most section frame 3522, the center section frame 3524, the drive section frame 3526 and the power section frame 3528. In one embodiment, the frame or frame assembly of the tie-in internal weld system 3001 is configured to be placed within the pipes 1022*a*, 1022*b*.

In one embodiment, the power section 3008 includes an universal joint 3010, a motor power source 3012, a weld torch power source 3014, weld power supplies 3016, and adjustable wheels 3018.

In one embodiment, the drive section 3006 may be connected to the power section 3008 via the universal joint 3010. In one embodiment, the universal joint 3010 is constructed and arranged to allow the tie-in internal weld system 3001 to articulate around bends in the pipeline.

In one embodiment, the weld torch power source 3014 may include a plurality of weld torch power batteries 3014*a*-3014*e*. In one embodiment, the weld torch power source 3014 is configured to power the weld torch(es) 3502. In one embodiment, the weld torch power source 3014 is carried by the frame assembly of the tie-in internal weld system 3001. In one embodiment, the number of the weld torch power batteries may vary. In one embodiment, the weld torch power source 3014 is configured to supply electrical power to the weld torch power supplies 3016 for generating a welding arc. In one embodiment, the weld torch power source 3014 is separate from the other electrical systems so that, if the weld torch power is depleted, the rest of the tie-in internal weld system 3001 can still operational.

In one embodiment, the motor power source 3012 is configured to power the electric drive motors 3124 in the drive section 3006. In one embodiment, the motor power source 3012 may include a plurality of motor power batteries 3012*a*-3012*e*. In one embodiment, the motor power source 3012 may also be referred to as the drive power source. In one embodiment, the motor power source 3012 is carried by the frame assembly of the tie-in internal weld system 3001. In one embodiment, the number of the motor power batteries may vary. In one embodiment, the motor power source 3012 is only used for drive (i.e., to supply power to the electric drive motors 3124 in the drive section 3006) so that, in case, the other battery packs 3014*a*-3014*e* are depleted, the tie-in internal weld system 3001 will not be trapped in the pipeline.

In one embodiment, the motor power source 3012 (including the batteries 3012*a-e*) and the weld torch power source 3014 (including the batteries 3014*a-e*) are carried by the frame of the tie-in internal weld system 3001. In one embodiment, the one or more battery cells (e.g., motor power source 3012, the weld torch power source 3014, batteries 3514, etc.) of the tie-in internal weld system 3001 are configured to power the drive motor 3124, the inspection detector and the weld torch. In one embodiment, the one or more battery cells 3514, 3012 or 3014 of the tie-in internal weld system 3001 may include a plurality of independent battery cells. In one embodiment, the battery cells 3014, 3014*a-e* for the weld torch are independent of the battery cells 3012, 3012*a-e*, 3514 for the drive motor and the inspection detector. In one embodiment, the battery cells 3012, 3012*a-e* for the drive motor 3124 are independent of the battery cells 3514 for the inspection detector. That is, in one embodiment, the battery cells 3012, 3012*a-e* are configured to power the drive motors 3124, the battery cells 3514 are configured to power the inspection detector, and the battery cells 3014, 3014*a-e* are configured to power the weld torch of the tie-in internal weld system 3001.

In one embodiment, referring to FIG. 101, the drive motors 3124 are configured to drive rollers 3125 so as to move the frame or frame assembly of the tie-in weld system 3001, the first pipe engagement structure 3127, the second pipe engagement 3129 and the inspection detector 3130 of the tie-in internal weld system 3001 along the at least one of the pipes 1022*a*, 1022*b* within its interior. In one embodiment, the drive rollers 3125 are configured to engage the interior surfaces 5130, 5132 of one or more of the pipes 1022*a*, 1022*b*. In one embodiment, the tie-in internal weld system 3001 includes a plurality of drive rollers 3125 that are configured to rotatably support the frame or frame assembly of the tie-in weld system 3001.

In one embodiment, the weld power supplies 3016 are configured to take the DC power from the weld torch power source 3014 and transform the DC power to the correct current and voltage waveforms for the weld procedure being performed by the welding torches 3502.

In one embodiment, the adjustable wheels 3018 are constructed and arranged to be adjusted so that the power section 3008 of the tie-in internal weld system 3001 runs straight and level in the pipeline.

FIG. 103 shows a schematic diagram showing the flow of power including weld power, communication data, and controls data through the tie-in internal weld system 3001, where some components of the tie-in internal weld system 3001 are not shown for sake of clarity and to better illustrate the other components and/or features of the tie-in internal weld system 3001.

The flow of communication data and controls data through the tie-in internal weld system 3001 in FIG. 103 are similar to the flow of communication data and controls data through the internal weld system 5004 in FIG. 71, except for the differences noted below.

In one embodiment, the drive section electronics module 3126 is configured to be operatively connected to the drive batteries 3012 positioned/located in the power section 3008 of the tie-in internal weld system 3001.

In one embodiment, the batteries 3012 of the power section 3008 are connected to the drive motors 3124 of the tie-in internal weld system 3001 via the drive section electronics module 3126.

The flow of weld power through the tie-in internal weld system 3001 in FIGS. 103 and 103A is different from the flow of weld power through the internal weld system 5004 in FIG. 71.

For example, the weld power comes from different directions in the internal weld system 5004 and the tie-in internal weld system 3001. That is, unlike the internal weld system 5004 where the weld power comes from the front of the system via its umbilical 5034, the weld power comes from the back for the tie-in internal weld system 3001. This configuration where the weld power comes from the back of the tie-in internal weld system 3001 may be made possible by adding a second slip ring or by turning the weld portion around and pushing it backwards through the pipe (which may make it difficult to access the spools of the weld wire for maintenance).

In one embodiment, the weld power is received by the welding torches 3502 of the tie-in internal weld system 3001 from the on-board weld torch power source 3014. In one embodiment, the weld power, from the on-board weld torch power source 3014, is supplied to the weld power supplies 3016. In one embodiment, the weld power supplies 3016 are configured for generating a welding arc. That is, the weld power supplies 3016 are configured to take the DC power from the weld torch power source 3014 and transform the DC power to the correct current and voltage waveforms for the weld procedure being performed by the welding torches 3502. In one embodiment, the correct current and voltage waveforms from the weld power supplies 3016 are supplied to the weld torches 5502 via the rear slip ring 3512.

Like the internal weld system 5004, in one embodiment, the batteries 3514 of the drive section 3006 are configured to supply the power to all the electronics modules in the tie-in internal weld system 3001, including the forward-most electronics module, the wire feed electronics module, the center section electronics module and the drive section electronics module 3126, and are also configured to supply the power to all the electric drive motors in the tie-in internal weld system 3001, including the front rotation motor, the motors of the wire feed systems, the rear rotation motor, the axial weld torch motor, the radial weld torch motor, and the tilt weld torch motor. In one embodiment, the batteries 3514 are configured to power the inspection camera and/or the inspection detector of the tie-in internal weld system 3001. However, the batteries 3514 of the drive section 3006 are not configured to supply the power to the drive motors 3124 of the tie-in internal weld system 3001. In one embodiment, the batteries 3012 of the power section 3008 are configured to supply the power to the drive motors 3124 of the tie-in internal weld system 3001. In one embodiment, the batteries 3012 of the power section 3008 are connected to the drive motors 3124 of the tie-in internal weld system 3001 via the drive section electronics module 3126.

In one embodiment, the batteries used in the tie-in internal weld system 3001 may be electrically chained together to get higher current and higher energy content. For example, two 12 volts batteries may be chained together to obtain 24 volts. In one embodiment, both batteries are mounted to the same frame and wired together in series. In one embodiment, the batteries may also be connected to each other (e.g., via a universal joint or otherwise) so that the batteries may articulate with respect to one another to maneuver a pipe.

In one embodiment, the tie-in internal weld system 3001 may include four batteries of which one battery may be used for driving the tie-in internal weld system 3001 and the other three batteries may be connected in parallel and may be used for the welding procedures in the tie-in internal weld system 3001.

In one embodiment, the tie-in internal weld system 3001 may use internally positioned (positioned inside the pipes) clamps or externally positioned (positioned outside the pipes) clamps. For example, in one embodiment, the tie-in internal weld system 3001 may use internally positioned (positioned inside the pipes) clamps during its welding procedures. In one embodiment, the tie-in internal weld system 3001 may use externally positioned (positioned outside the pipes) clamps during an internal scanning procedure (where the internally positioned laser/detector and/or other device are configured to scan the weld joint from inside the pipes).

A tie-in weld is conducted to weld a long stretch of pipe to another long stretch of pipe. Generally speaking the new pipe to be welded is at least 120 feet long, and can be over two miles long. The tie in internal welding machine disclosed herein has on-board battery power and can be used to perform a tie in root weld pass, and optionally also a hot weld pass from inside the pipe.

In one embodiment, the pipes are externally aligned. Like the internal weld machine disclosed herein, the tie-in welder can be provided with only a single weld head (with a single weld torch) or a plurality of weld heads (e.g., anywhere from 2 to 8, just for example).

Figure 103C:
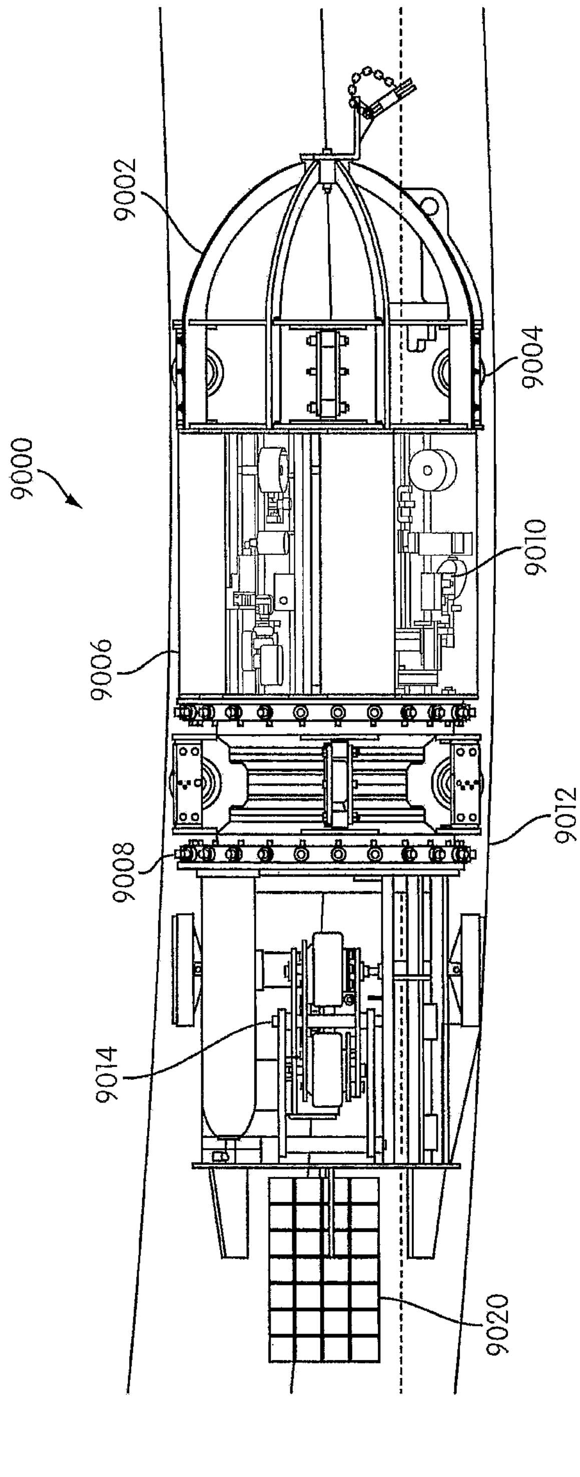
FIG. 103C shows a side view of a tie-in internal weld system in accordance with another embodiment of the present patent application.
Figure 103D:
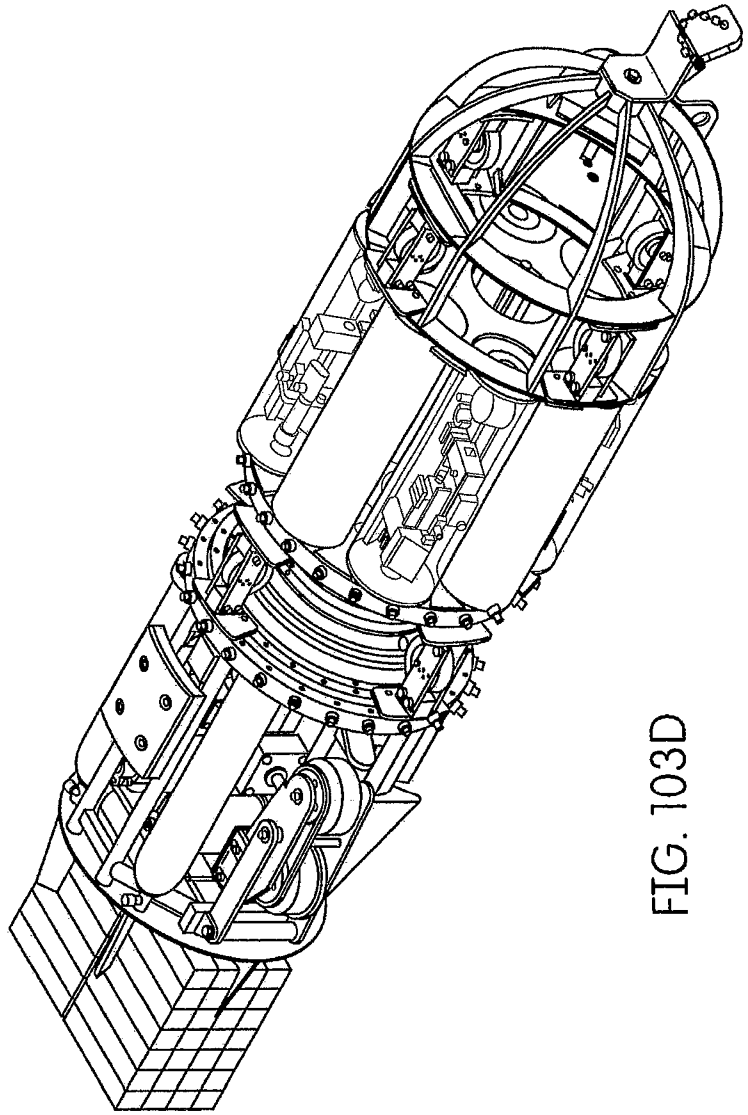
FIG. 103D shows a perspective view of the tie-in internal weld system in accordance with another embodiment of the present patent application.
Figure 103F:
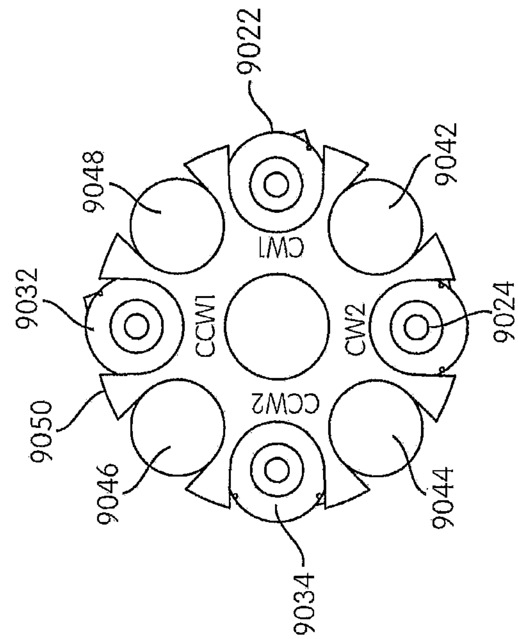
FIG. 103F shows a front view of the weld head assemblies of the tie-in internal weld system in accordance with another embodiment of the present patent application.
Figure 103E:
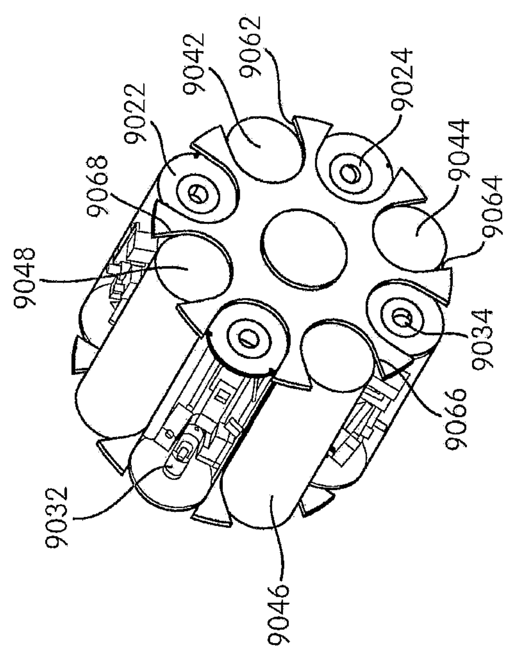
FIG. 103E shows a perspective view of weld head assemblies of the tie-in internal weld system in accordance with another embodiment of the present patent application.

As shown in FIGS. 103C and 103D, and as will be appreciated from the prior discussions herein, the tie-in weld machine 9000 has a nose cone section 9002 for electronics, support wheels 9004, an on-board welding power supply 9006, and a pair of clamps 9008 that ensure that the tie-in internal welder is concentric to the pipe. As will be described in more detail later, the tie-in welder includes clockwise and counterclockwise weld head "cartridges" 9010, with individual lasers and 2D color cameras. In FIGS. 103C and 103D, the tie-in welder machine is shown positioned within a slightly curved (e.g., 30D bent) pipe 9012 having an inner diameter of 38 inches. As also shown in FIGS. 103C and 103D, the tie-in welder has a drive system and brakes 9014 that are 90 degrees offset to reduce length, as well as an on-board power source (i.e., battery pack) 9020 for the drive motor and brakes.

As will be appreciated from FIGS. 103E-J, and the following description, the model shown has four weld heads, two that will rotate clockwise (weld heads 9022 and 9024) during a welding operation and two that will rotate counterclockwise (weld heads 9032 and 9034) during a welding operation. In an alternate embodiment, all 4 weld heads shown are rotated in a single rotational direction as described elsewhere in this application. In addition, in the embodiment shown in FIGS. 103E-J, four on-board welding power sources/supplies (e.g., batteries), labelled 9042, 9044, 9046, 9048 are provided. The more welding heads/torches that are provided, the shorter the weld cycle time can be. This is true whether the welding is done in a single rotational direction or both clockwise and counterclockwise directions. It should be appreciated, however, that rotating in a single rotational direction may be faster than rotating both clockwise and counterclockwise, the latter of which may employ a reversal of motor direction.

Each weld head 9022, 9024, 9032, and 9034 has the following equipment: a weld torch, at least one torch motor of the type previously described herein to allow for angular, axial, and side to side movement of each torch, a wire feeder, wire straightener and wire spool to feed the welding wire material to the weld torch. A laser inspection/detector device of the type previously described is also provided to guide the welding torch and inspect the weld. Further, a color CCD/CMOS camera is used to inspect the weld in the manner previously described.

Each weld head is associated and connected with one of the four power supplies 9042, 9044, 9046 and 9048. The four weld heads and four power supplies are all mounted on a rotating assembly 9050. The rotating assembly performs the same function as the rotatable hub 5078 previously described. The rotating assembly can be driven by one or more orientation motors, as previously described.

To effect a welding operation, the tie-in weld machine is fed into one open end of one of the pipes, for example the shorter pipe or the one with the lesser obstructions to be driven out. The face of the second pipe is matched and aligned (externally) with the face of the first pipe. The tie-in weld machine is driven to where the weld heads are directly at the pipe interface region. The laser detector provides feedback, and the at least one weld torch motor aligns the weld torch tips at the appropriate position at the interface. The clamps 9008 are actuated and expanded (they function as an expander) to make the tie-in weld machine concentric with the pipes, and the clamps are engaged to hold the position on the tie-in weld machine. When the tie-in weld machine is secured by the clamps, the rotational axis of the rotatable mechanism 9050 is co-axial with the longitudinal axis of the pipe 9012.

Figures 103G, 103H, 103I, 103J:
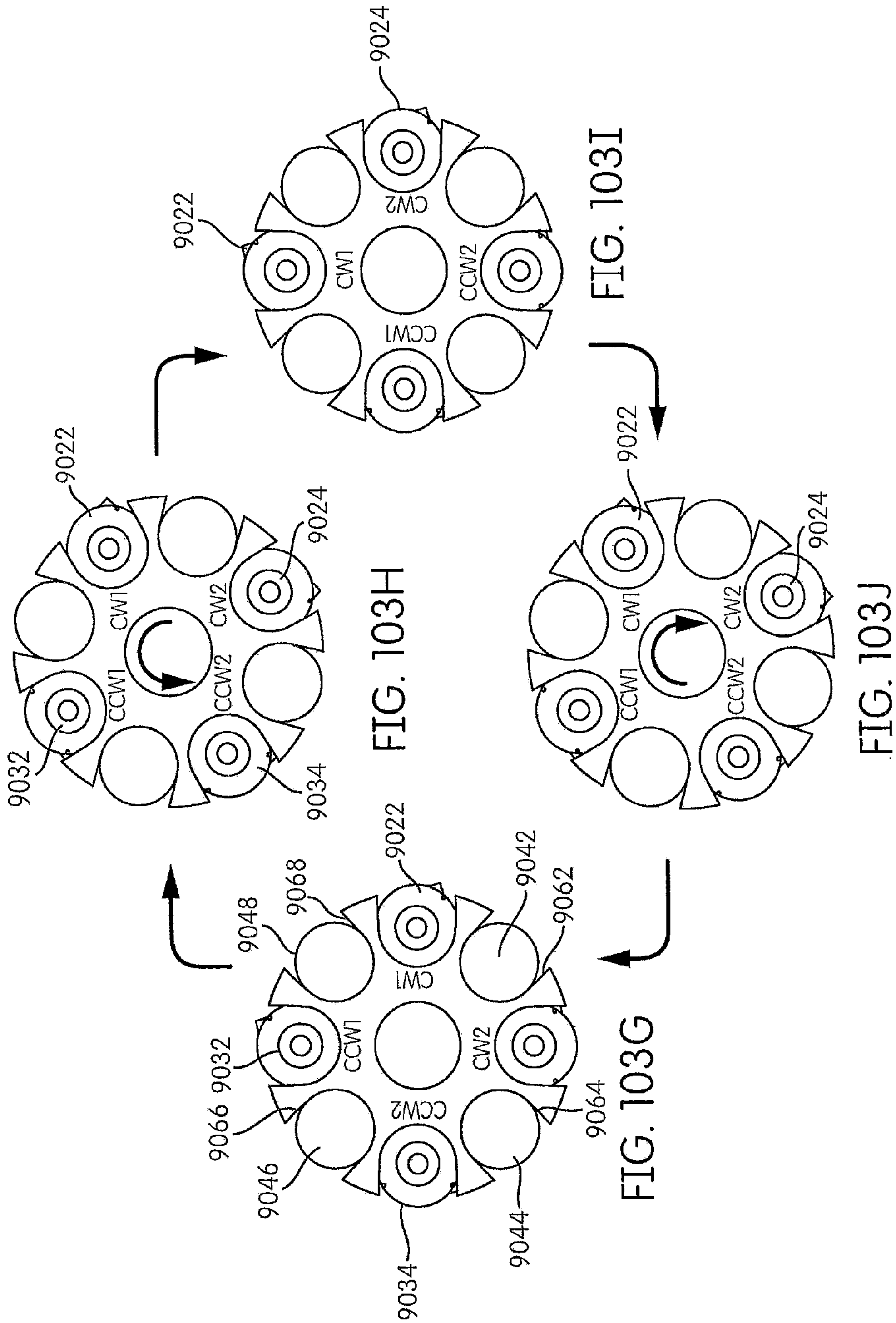
FIGS. 103G-103J show a procedure in which one or more weld head assemblies are operated in clockwise and counterclockwise directions to perform a welding operation in the tie-in internal weld system in accordance with another embodiment of the present patent application.

In one embodiment, welding is achieve by first operating weld heads 9032 and 9034 in a counterclockwise direction. As shown in FIG. 103H, the four weld heads are rotationally spaced 90 degrees apart. Weld heads 9032 starts at 12 o'clock and 9034 starts at 9 O'clock as shown in FIG. 103H, as they commence welding. The rotating assembly 9050 rotates 90 degrees until weld head 9032 ends at 9 o'clock and weld head 9034 ends at 6 o'clock (see progression through FIGS. 103H and 103I). At this point, the weld heads 9032 and 9034 discontinue welding (at FIG. 103I), and weld heads 9022 and 9024 commence welding (at FIG. 103I). The one or more orientation motors then rotate the rotatable assembly 9050 in a clockwise direction as shown in FIG. 103J until weld head 9022 ends up at 3 o'clock and weld head 9024 ends up at 6 o'clock. In this manner, a full root weld pass is completed.

After the root weld has been laid, the rest of the welding may be completed from the outside, either using automatic welding machines or manually. The expanders or clamps are then disengaged and the tie-in welder is driven out to the open end of the pipe.

In one embodiment, each of the power supplies 9042, 9044, 9046 and 9048 comprises a rechargeable battery cartridge than can be inserted in an associated opening 9062, 9064, 9066 and 9068. When inserted into the opening, the battery cartridge becomes electrically connected to its associated weld head. Each battery cartridge can be easily removed for recharging and then replaced.

As shown, the tie-in welder has a self-powered drive and brake mechanism 9014, powered by the on-board welding power source 9020. This tie-in welder can utilize all of the attributes of the internal welding machine without the on-board power capability, in various previous embodiments described herein.

In this tie-in welder embodiment described, it can be appreciated that a plurality (e.g., two) of the weld torches are dedicated to clockwise welding, while another plurality (e.g., two) are dedicated to counterclockwise welding. In addition, as described, all weld torches conduct the weld in a downwards direction. As such, the weld torches can optionally be fixed at a predetermined weld angle (this is true for any of the internal welding machines disclosed herein, whether a tie-in untethered type or a tethered type) so that the torch tip is pointing in the forward weld direction (the weld pool is being "pushed"). Alternatively, as was discussed above with respect to FIG. 56A, the weld torches can be mounted for pivotal movement about point P so that the weld torch axis A can be positioned on either side of the radial line R. This alternative enables the same weld torch to be used for both clockwise and counterclockwise welding, by pivoting the weld torch so that it can pivot in the forwards weld direction irrespective of whether the welding is conducted in clockwise or counterclockwise direction.

In one embodiment, the weld torch is configured to be positioned externally to the first pipe 1022*a* and/second pipe 1022*b* to provide an external welding operation. In one embodiment, the externally positioned weld torch is mounted to an outer surface of the pipes 1022*a*, 1022*b*.

Figure 86:
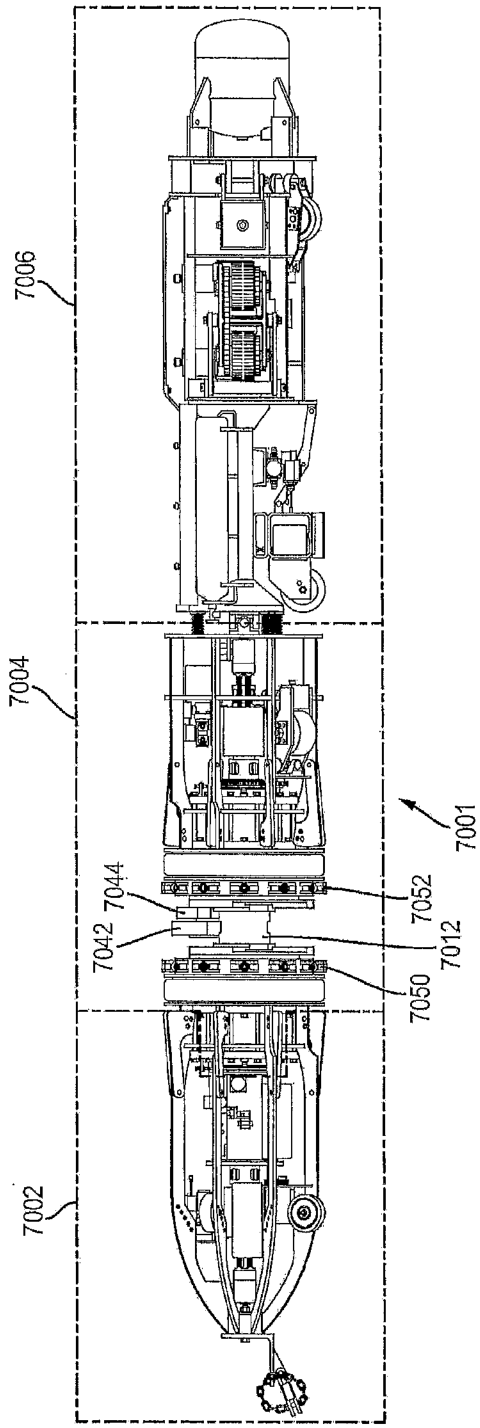
FIG. 86 shows a purge and inspection system in accordance with an embodiment of the present patent application.
Figure 89:
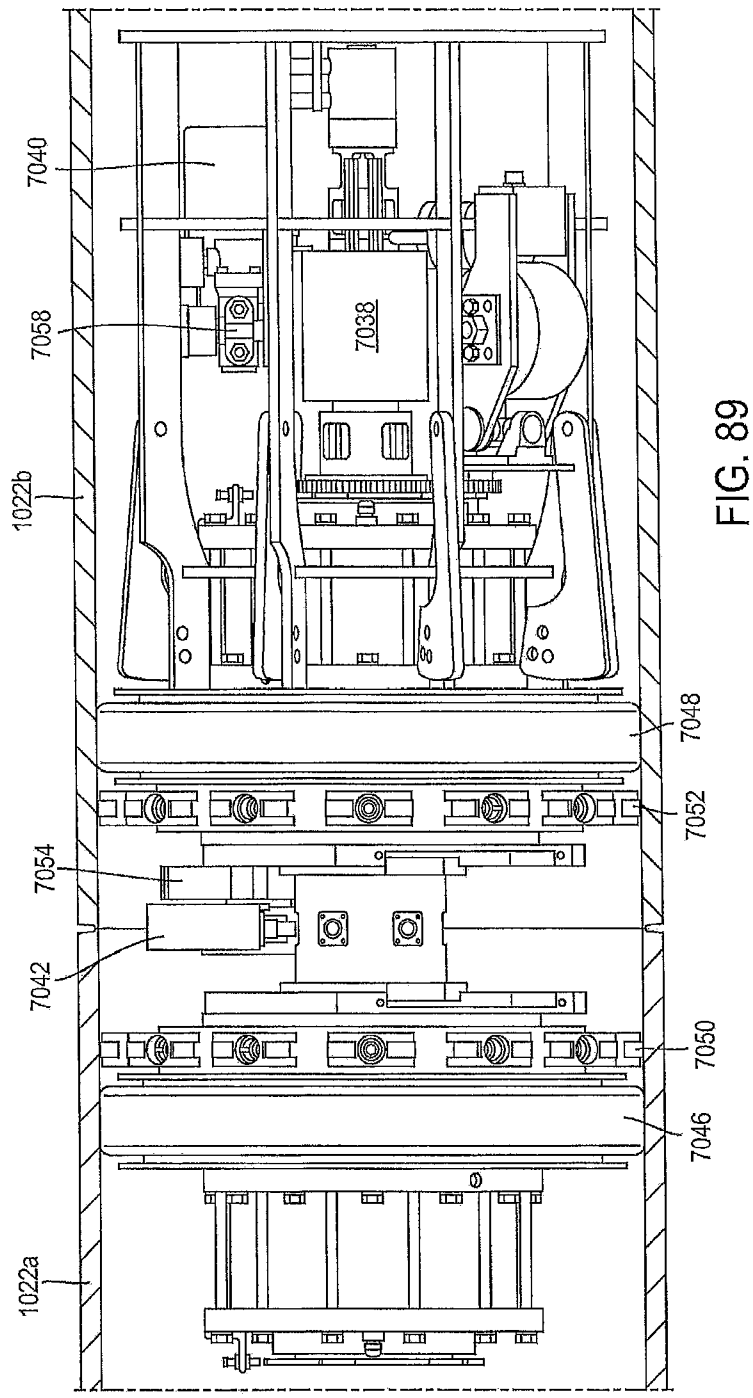
FIGS. 89 and 90 show a front view and a cross-sectional view of a center section of the purge and inspection system in accordance with an embodiment of the present patent application.

In one embodiment, referring to FIG. 86, the present patent application provides the purge and inspection system 7001. For example, in one embodiment, the first pipe segment 1022*a* and the second pipe segment 1022*b* each may be made completely or in-part from some Corrosion Resistant Alloy (CRA) materials that may require shield gas on both sides of the weld. In one embodiment, the purge and inspection system 7001 may be positioned internally within the pipes 1022*a*, 1022*b* to provide a purge gas chamber 7054 (as shown in FIG. 89) inside the pipes 1022*a*, 1022*b* and around the interface region 5136 (as shown in FIG. 97), while an external weld system 7500 (as shown in FIG. 97) performs the welding procedure (including the root pass weld procedure 1002, the hot pass weld procedure 1004 and the fill and cap weld procedure 1006) at the interface region 5136 from outside the pipes 1022*a*, 1022*b*.

In one embodiment, the purge and inspection system 7001 also provides internal clamps that are positioned internally within the pipes 1022*a*, 1022*b* to be welded. That is, in one embodiment, clamps 7050 and 7052 of the purge and inspection system 7001 are configured to clamp the inner surfaces 5130, 5132 (as shown in FIG. 33) of the pipes 1022*a*, 1022*b* to be welded.

Figure 90:
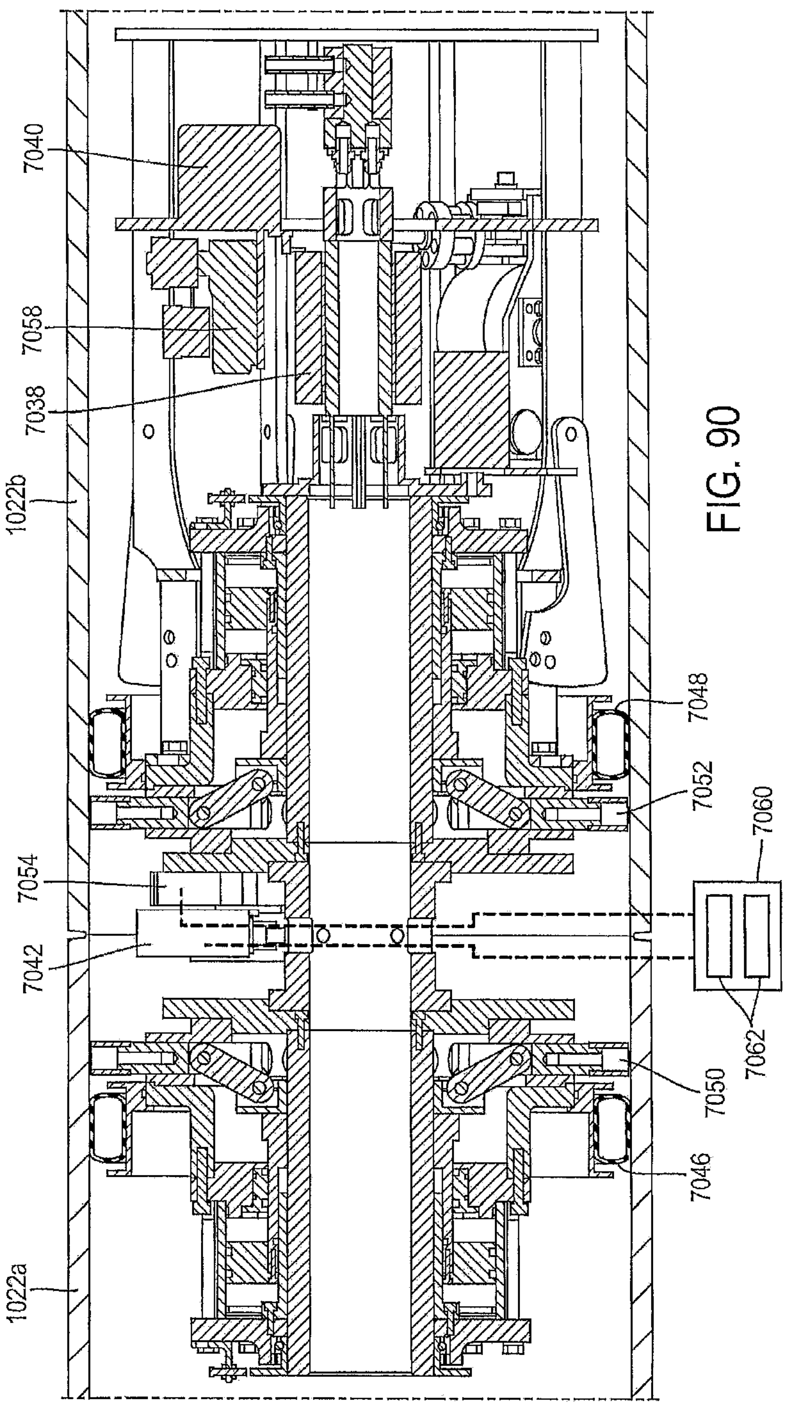

In one embodiment, the purge and inspection system 7001 also provides inspection detector 7042 and/or inspection camera 7044 that are positioned internally within the pipes 1022*a*, 1022*b*. In one embodiment, the inspection detector 7042 and/or inspection camera 7044 of the purge and inspection system 7001 are positioned in the purge gas chamber 7054 of the purge and inspection system 7001. In one embodiment, one or more processors 7062 (as shown in FIG. 90) of the purge and inspection system 7001 are configured to interact with the inspection detector 7042 and/or inspection camera 7044 to scan the interface region 5136 between the pipes 1022*a*, 1022*b* to determine the profile of the interface region 5136 between the pipes 1022*a*, 1022*b* prior to, during and subsequent to the welding procedure, to generate pre-weld profile data, on-the-fly weld profile data, and post-weld profile data based on the scanned data, and to control the external weld system 7500 or its operation based on the generated pre-weld profile data, on-the-fly weld profile data, or post-weld profile data.

In one embodiment, the purge and inspection system 7001 may be used for the first pipe segment 1022*a* and the second pipe segment 1022*b* having an external diameter of 26 to 28 inches. In one embodiment, the purge and inspection system 7001 may be used for the first pipe segment 1022*a* and the second pipe segment 1022*b* having an external diameter of less than 24 inches.

In one embodiment, the purge and inspection system 7001 includes a forward-most section 7002, a center section 7004 and a drive section 7006. In one embodiment, the structure, configuration, components, and operation of the forward-most section, the center section and the drive section of the purge and inspection system 7001 are similar to the forward-most section, the center section and the drive section of the internal weld system 5004 described in detail above, and, therefore, the structure, configuration, components, and operation of the forward-most section, the center section and the drive section of the purge and inspection system 7001 will not be described in detail here, except for the differences noted below.

Unlike the center section of the internal weld system 5004, the center section 7004 does not include the weld torch assembly mounted on its rotatable hub. In one embodiment, the center section 7004 of the purge and inspection system 7001 includes the inspection detector 7042 mounted on its rotatable hub 7012. In one embodiment, the center section 7004 of the purge and inspection system 7001 includes the inspection detector 7042 and the inspection camera 7044 mounted on its rotatable hub 7012. In one embodiment, the center section 7004 of the purge and inspection system 7001 includes the inspection camera 7044 mounted on its rotatable hub 7012.

In one embodiment, the forward-most section 7002 houses all of the purge support components. In one embodiment, the center section 7004 is the part of the purge and inspection system 7001 that aligns the pipe, seals the purge area, and inspects the weld. In one embodiment, the drive section 7006 houses the batteries, compressed air and purge gas that the rest of the purge and inspection system 7001 needs to operate.

Figure 87:
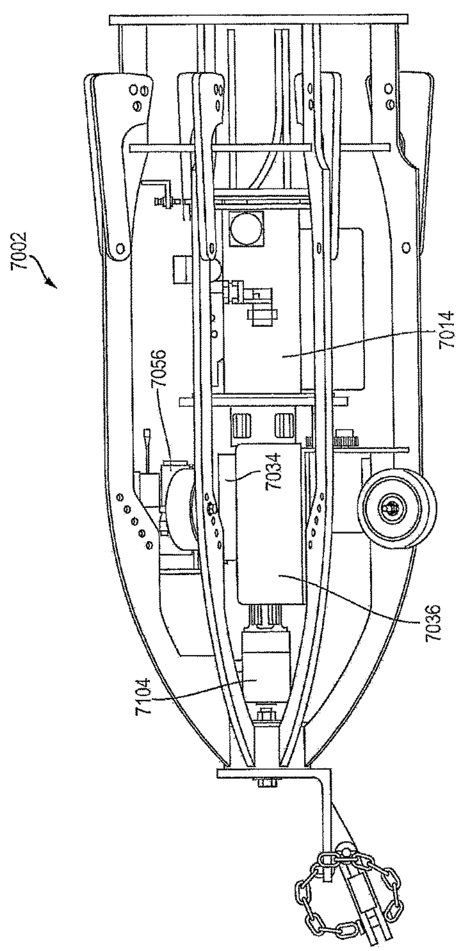
FIG. 87 shows a detailed view of a forward-most section of the purge and inspection system in accordance with an embodiment of the present patent application.
Figure 88:
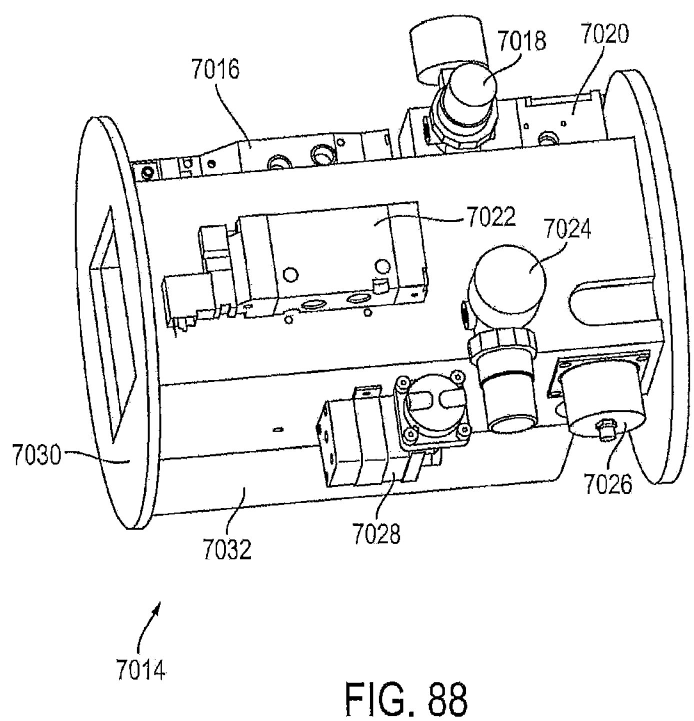
FIG. 88 shows a purge assembly of the purge and inspection system in accordance with an embodiment of the present patent application.

FIG. 87 shows a detailed view of the forward-most section 7002 of the purge and inspection system 7001 and FIG. 88 shows a detailed view of a purge assembly of the forward-most section 7002. In one embodiment, the forward-most section 7002 of the purge and inspection system 7001 includes a tow hitch, a forward-most electronics module, a front slip ring, a front clamp control valve, a front position sensor, adjustable ramps, a forward-most section frame, guide wheels, a front rotation motor, and a front rotary union 7104, and the structure and operation of each of these components are similar those in the forward-most section of the internal weld system 5004.

In one embodiment, the forward-most section 7002 of the purge and inspection system 7001 does not include a wire feed assembly. Instead, the forward-most section 7002 of the purge and inspection system 7001 includes the purge assembly 7014.

In one embodiment, the purge assembly 7014 is rotatably connected to the rotatable hub 7012 of the center section 7004 such that, when the rotatable hub 7012 is rotated by the first and second rotation motors, the purge assembly, connected to the rotatable hub 7012, also rotates with the rotatable hub 7012.

In one embodiment, the purge assembly 7014 is configured to house valves, sensors, and regulators to control the flow of purge gas into the purge gas chamber 7054. In one embodiment, the purge assembly 7014 is also configured to house the electronics for operating all of the components in the purge assembly and the rotatable hub 7012.

In one embodiment, referring to FIG. 88, the purge assembly 7014 includes a low purge valve 7016, a primary low purge regulator 7018, a secondary low purge regulator 7020, a high purge valve 7022, a high purge regulator 7024, an oxygen sensor 7026, a pump 7028, a purge assembly frame 7030, and a purge electronics module 7032.

In one embodiment, the low purge valve 7016 is configured to control the flow of purge gas into the purge gas chamber 7054. In one embodiment, low purge is generally referred to as a purge when the purge and inspection system 7001 is maintaining the inert atmosphere inside the purge gas chamber 7054. In one embodiment, output from the low purge valve 7016 goes to the primary low purge regulator 7018. In one embodiment, the low purge valve 7016 is always open (or on) except when seals 7046 and 7048 (as shown in FIG. 89) are not inflated and there is no purging in the purge and inspection system 7001.

In one embodiment, the primary low purge regulator 7018 is configured to reduce the pressure of the purge gas from the pressure of 5 psi down to the pressure of 0.5 psi. In one embodiment, the output from the primary low purge regulator 7018 goes to the secondary low purge regulator 7020. In one embodiment, the primary low purge regulator 7018 is configured to be manually set.

In one embodiment, the secondary low purge regulator 7020 is an electronic device that is configured to control the pressure (between 0.1 and 0.5 psi) of the purge gas flowing into the purge gas chamber 7054 through a closed-loop feedback. In one embodiment, the output from the secondary low purge regulator 7020 goes to the purge gas chamber 7054.

In one embodiment, the high purge valve 7022 is configured to control the flow of purge gas into the purge gas chamber 7054. In one embodiment, high purge is generally referred to as a purge when the purge and inspection system 7001 is establishing the inert atmosphere inside the purge gas chamber 7054. In one embodiment, the output from the high purge valve 7022 goes to the high purge regulator 7024. In one embodiment, the high purge valve 7022 is configured to shut off when the oxygen (as measured by the oxygen sensor 7026) in the purge gas chamber 7054 is below a predetermined oxygen content value.

In one embodiment, the high purge regulator 7024 is configured to reduce the pressure of the purge gas from the supply pressure (up to 75 psi) down to the maximum desired low purge pressure (typically 5-20 psi). In one embodiment, output from the high purge regulator 7024 goes to the purge gas chamber 7054. In one embodiment, the high purge regulator 7024 is configured to be manually set. In one embodiment, the high purge regulator 7024 is configured to be open or operational until the oxygen (as measured by the oxygen sensor 7026) in the purge gas chamber 7054 is below the predetermined oxygen content value.

In one embodiment, the oxygen sensor's 7026 input is connected to an exit port of the purge gas chamber 7054. In one embodiment, the oxygen sensor 7026 is operatively connected to the one or more processors 7062. In one embodiment, the oxygen sensor is configured to detect an amount of oxygen between the first seal and the second seal 7046 and 7048. In one embodiment, the oxygen sensor 7026 is configured to measure oxygen content of the gas in the purge chamber 7054 and to send an oxygen content data, which is indicative of the oxygen content of the gas in the purge chamber 7054, to the one or more processors 7062. In one embodiment, the oxygen sensor 7026 is configured to measure the level of oxygen present in the gas leaving the purge gas chamber 7054 and send the oxygen content data to the purge electronics module 7032.

In one embodiment, the one or more processors 7062 are configured to enable the welding operation after the amount of oxygen between the first seal and the second seal 7046 and 7048 is below a threshold level or predetermined oxygen content value. In one embodiment, the one or more processors 7062 are configured to receive the oxygen content data, compare the received oxygen content data to its predetermined oxygen content value, and generate an excess oxygen gas signal if the oxygen content data is greater than the predetermined oxygen content value. In one embodiment, based on the excess oxygen gas signal, the purge and clamp system 7100 may be configured to open the high purge regulator 7024 to allow purge gas (from the purge gas source/tank 7070) to flow into the purge chamber 7054 until the measured oxygen content falls below the predetermined oxygen content value. In one embodiment, based on the excess oxygen gas signal, the one or more processors 7062 of the purge and clamp system 7100 may send communication signals to the external weld system 7500 to stop the welding procedure.

In one embodiment, the predetermined oxygen content value is 500 parts per million (ppm). In one embodiment, the oxygen content value may be within a predetermined range of 50 to 100 ppm.

In one embodiment, during the low purge, the low pressure in the purge gas chamber 7054 does not generate sufficient flow through the oxygen sensor 7026. In one embodiment, the pump 7028 is used to draw the gas through the oxygen sensor 7026 from the purge gas chamber 7054. In one embodiment, the pump 7028 may be used continuously or intermittently. In one embodiment, the pump 7028 is used for the low purge operation.

In one embodiment, the purge electronics module 7032 is configured to pass communications upstream through the front slip ring 7034 to the forward-most section electronics module 7036. In one embodiment, the purge electronics module 7032 is configured to pass communications downstream through the rear slip ring 7038 to the center section electronics module 7040.

In one embodiment, the purge electronics module 7032 is configured to control all of the sensors and valves attached to the rotatable hub 7012 of the center section 7004. For example, in one embodiment, the purge electronics module 7032 is configured to control the oxygen sensor 7026, the pump 7028, the low purge valve 7016, the high purge valve 7022 and the secondary low purge regulator 7020. In one embodiment, the purge electronics module 7032 is configured to communicate with and control the one or more inspection detectors 7042 and the camera 7044.

Figure 91:
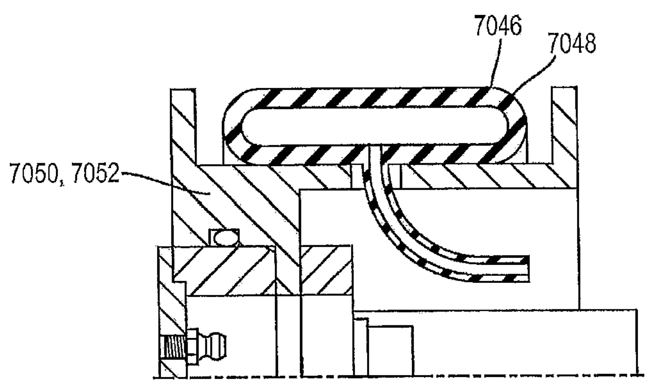
FIG. 91 shows purge seals of the purge and inspection system in accordance with an embodiment of the present patent application.

FIGS. 89 and 90 show a front view and a cross-sectional view of the center section 7004 of the purge and inspection system 7001, and the structure and operation of each of these components are similar those in the center section of the internal weld system 5004. FIG. 91 shows a detailed view of purge seal 7046 or 7048 and FIG. 92 shows a detailed view of the rotatable hub 7012.

Figure 95:
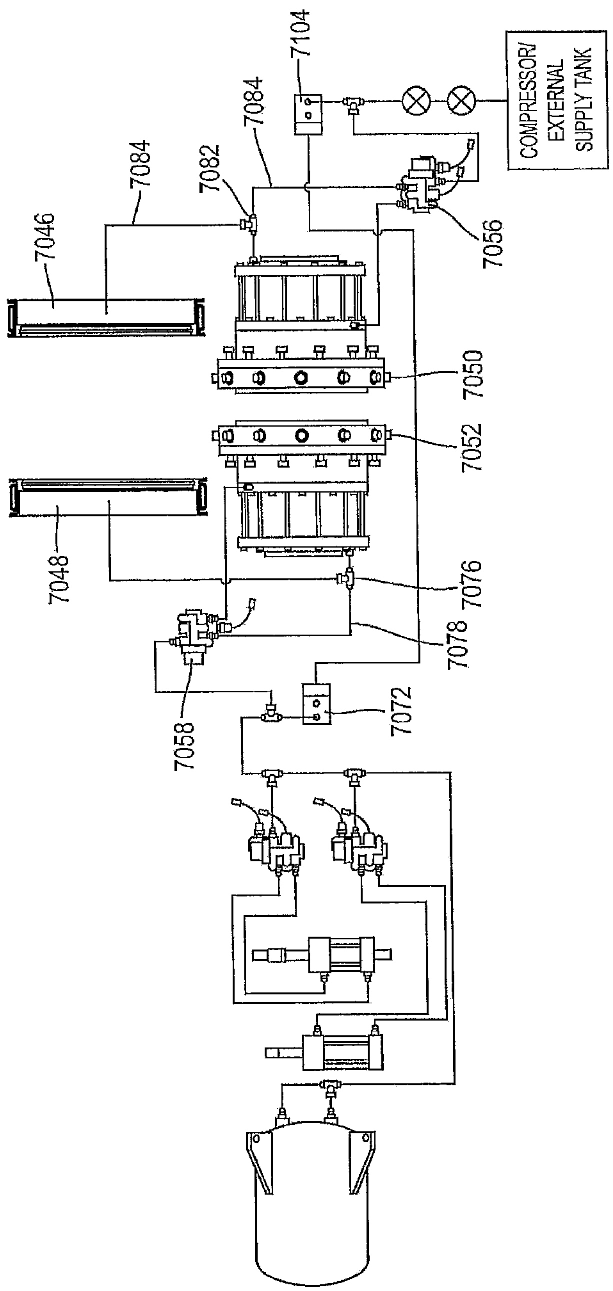
FIG. 95 shows a schematic diagram showing the flow of compressed air through the purge and inspection system in accordance with an embodiment of the present patent application.

In one embodiment, as discussed above, the frame of the forward-most section 7002 is connected to the front clamp 7050 (as shown in FIG. 95) of the center section 7004, and the purge assembly 7014 is rotatably connected to the rotatable hub 7012.

Figure 92:
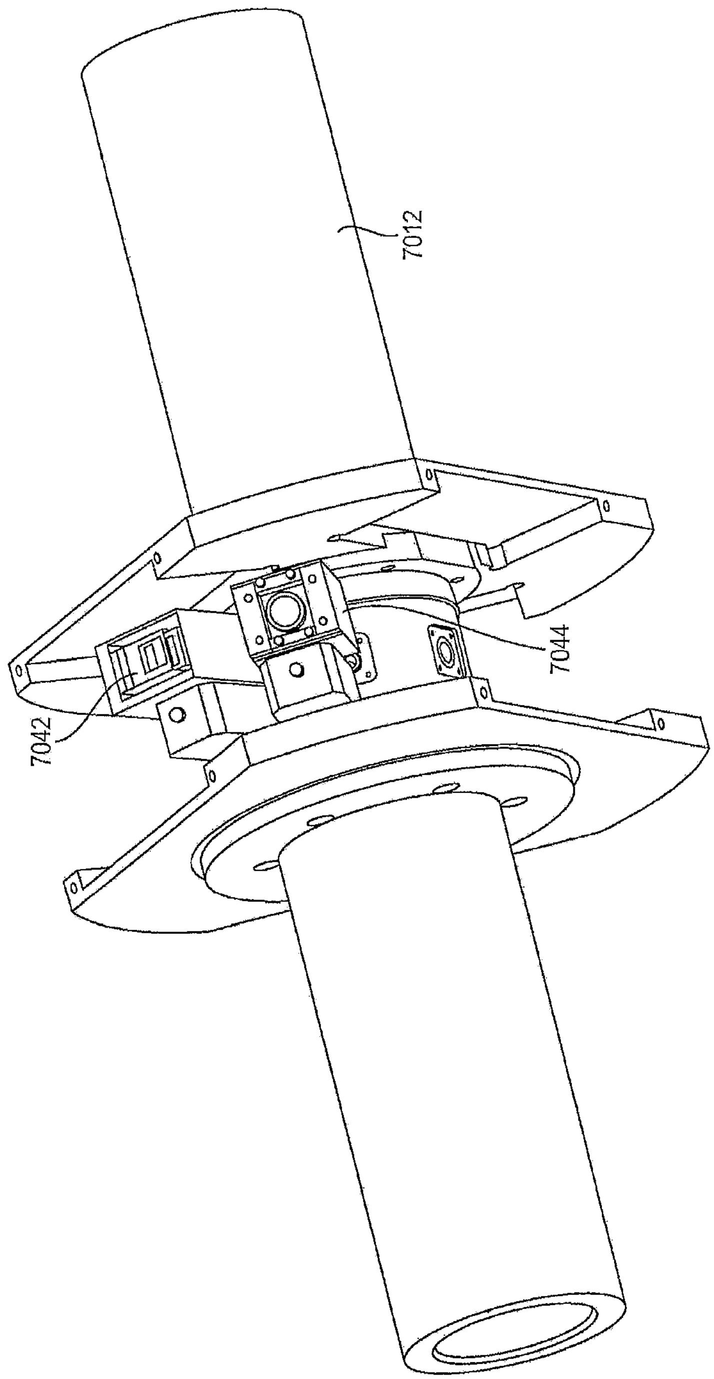
FIG. 92 shows of the rotatable hub of the purge and inspection system in accordance with an embodiment of the present patent application.

In one embodiment, the center section 7004 of the purge and inspection system 7001 includes the front clamp 7050, a first and second pipe engagement structures 7050 and 7052, the inspection detector 7042, the inspection camera 7044 (as shown in FIG. 92), a rear clamp 7052, a rear clamp control valve 7058, a center section electronics module 7040, toe wheels, a center section frame, adjustable ramps, the rear rotary union 7072, the rear rotation motor, a rear position sensor, the rotation module 7012, the purge seals 7046 and 7048 and the rear slip ring 7038.

In one embodiment, the purge seals 7046 and 7048 are configured to inflate at the same time as the clamps 7050 and 7052 are actuated. When both the purge seals 7046 and 7048 are inflated, they are constructed and arranged to engage the inner surfaces 5130, 5132 of the pipes 1022*a*, 1022*b*, respectively forming the chamber 7054 therebetween. In one embodiment, the purge seals 7046 and 7048, when inflated, engage on opposite sides of the interface region 5136. In one embodiment, the chamber 7054 is a closed volume that may be referred to as a purge gas chamber 7054. In one embodiment, the chamber 7054 is constructed and arranged to receive a purge gas (or an insert gas) therein.

In one embodiment, the front clamp control valve 7056 and the rear clamp control valve 7058 are continuous 4-way directional valves (e.g., having four hydraulic connections, corresponding to inlet port (P), actuator ports (A and B), and return port (T), and one physical signal port connection (S)). For example, in one embodiment, one of the actuator ports A or B are used for extending their corresponding clamps 7050 or 7052 and inflating their corresponding seal 7046 or 7048 and the other of the actuator ports A or B are used for retracting their corresponding clamps 7050 or 7052 and deflating their corresponding seal 7046 or 7048.

Figure 93:
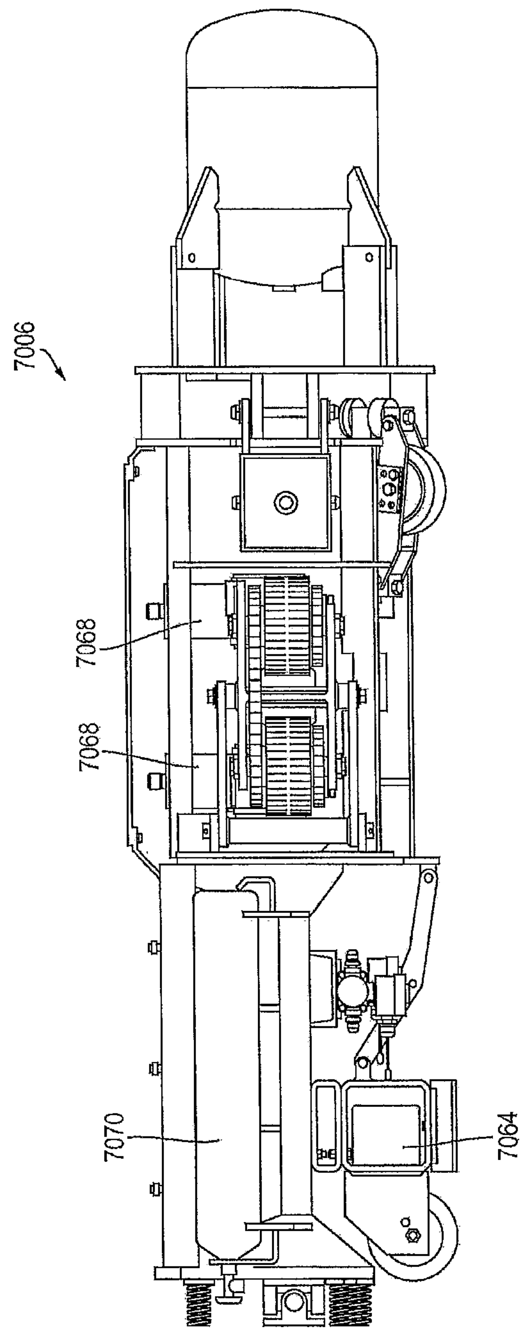
FIG. 93 shows a detailed view of a drive section of the purge and inspection system in accordance with an embodiment of the present patent application.

FIG. 93 shows a detailed side view of the drive section 7006 of the purge and inspection system 7001. In one embodiment, the drive section 7006 of the purge and inspection system 7001 includes the shield gas tanks 7070, batteries, drive section electronics module 7064, pneumatic valves, drive wheels, drive motors 7068, brakes and the compressed air tank, and the structure and operation of each of these components are similar those in the drive section of the internal weld system 5004.

FIG. 94 shows a schematic diagram showing the flow of purge gas through the purge and inspection system 7001, where some components of the purge and inspection system 7001 are not shown for sake of clarity and to better illustrate the other components and/or features of the purge and inspection system 7001.

In one embodiment, an inert/purge gas supply line is configured to communicate purge/insert inert gas source 7070 to the region 7054 between the first seal and the second seal 7046 and 7048. In one embodiment, the gas from the inert/purge gas source 7070 is directed into the region 7054 between the first seal and the second seal 7046 and 7048 to reduce oxidation during a welding operation.

Referring to FIG. 94, the purge gas tanks 7070 are shown in the drive section 7006 of the purge and inspection system 7001. In one embodiment, a high pressure regulator 7074 may be positioned in the drive section 7006 of the purge and inspection system 7001. In one embodiment, the high pressure regulator 7074 may be positioned in the center section 7004 of the purge and inspection system 7001. In one embodiment, the rear rotary union 707, the rotatable hub 7012, the purge gas chamber 7054, the front and rear clamps 7050 and 7052, and the front and rear seals 7046 and 7048 are shown in the center section 7004 of the purge and inspection system 7001. The low purge valve 7016, the primary low purge regulator 7018, the secondary low purge regulator 7020, the high purge valve 7022, the high purge regulator 7024, the oxygen sensor 7026, and the pump 7028 are shown in the forward-most section 7002 of the purge and inspection system 7001.

In one embodiment, the purge gas tanks 7070 are configured to be maintained at a pressure of 500-2400 psi. The purge gas tanks 7070 are in fluid communication through fluid communication lines with the rear rotary union 7072. In one embodiment, the purge gas tanks 7070 are in fluid communication with the rear rotary union 7072 via a valve 7071 and the high pressure regulator 7074. In one embodiment, the high pressure regulator 7074 is configured to automatically cut off the flow of the purge gas at a pressure of 75 psi. That is, the high pressure regulator 7074 is typically set to reduce the pressure in the purge gas tanks 7070 to about 75 psi in the fluid communication line downstream of the high pressure regulator 7074, and from the rear rotary union 7072 to the low purge valve 7016 and the high purge valve 7022.

In one embodiment, the rear rotary union 7072 is in fluid communication through fluid communication lines with the low purge valve 7016 and the high purge valve 7022. In one embodiment, the purge gas stored in the purge gas tanks 7070 is sent through the fluid communication lines to the rear rotary union 7072, and then through the fluid communication lines from the rear rotary union 7072 to the low purge valve 7016 and the high purge valve 7022.

In one embodiment, the high purge regulator 7024 is connected to an outlet of the high purge valve 7022. That is, the high purge regulator 7024 is positioned downstream of the high purge valve 7022. In one embodiment, the high purge regulator 7024 is set to reduce the pressure output by the high purge valve 7022 to typically between 30 and 5 psi in the fluid communication line downstream of the high purge regulator 7024, and between the high purge regulator 7024 and the purge gas chamber 7054.

In one embodiment, a fluid communication line extends from the low purge valve 7016 to the primary low purge regulator 7018. In one embodiment, the primary low purge regulator 7018 is connected to an outlet of the low purge valve 7016. That is, the primary low purge regulator 7018 is positioned downstream of the low purge valve 7016.

In one embodiment, the primary low purge regulator 7018 is typically set to reduce the pressure output by the low purge valve 7016 to about between 0.5 and 5 psi in the fluid communication line downstream of the primary low purge regulator 7018, and between the primary low purge regulator 7018 and the secondary low purge regulator 7020.

In one embodiment, a fluid communication line extends from the primary low purge regulator 7018 to the secondary low purge regulator 7020. In one embodiment, the secondary low purge regulator 7020 is positioned downstream of the primary low purge regulator 7018.

In one embodiment, the secondary low purge regulator 7020 is set to reduce the pressure output by the primary low purge regulator 7018 to typically between 0.1 and 0.5 psi in the fluid communication line downstream of the secondary low purge regulator 7020, and between the secondary low purge regulator 7020 and the purge gas chamber 7054.

In one embodiment, the welding procedure is started at a pressure of about 0.5 psi and, during the welding procedure, when the leakage of the purge gas through the weld joint slows as a result of welding (e.g., based on how much gap between the pipe ends is welded), the secondary low purge regulator 7020 may then be throttled back to 0.1 psi.

In one embodiment, the pump 7028 is in fluid communication (through fluid communication lines) with the output/exit port of the purge gas chamber 7054 on one side and is in fluid communication (through fluid communication lines) with the oxygen sensor 7026 on the other side. In one embodiment, the pump 7028 is in fluid communication with the output of the purge gas chamber 7054 such that the pump 7028 is configured to operate (either continuously or intermittently) to draw a sample of the gas from the purge gas chamber 7054.

In one embodiment, the purge gas from the purge gas tanks 7070 is only used to fill and maintain the purge gas in the purge gas chamber 7054. In one embodiment, the compressed air is used to inflate the seals 7046 and 7048 and to expand the clamps 7050 and 7052. In one embodiment, the drive section 7006 of the purge and inspection system 7001 may include both the purge gas tanks 7070 and also the compressed air gas tanks.

FIG. 95 shows a schematic diagram showing the flow of compressed air through the purge and inspection system 7001, where some components of the purge and inspection system 7001 are not shown for sake of clarity and to better illustrate the other components and/or features of the purge and inspection system 7001.

The flow of compressed air through the purge and inspection system 7001 in FIG. 95 is similar to the flow of compressed air through the internal weld system 5004 in FIG. 70, except for the differences noted below.

In one embodiment, a valve 7076 is positioned on a fluid communication line 7078. In one embodiment, the fluid communication line 7078 is between the rear clamp control valve 7058, the rear clamps 7052 and the rear seal 7046 and is configured to supply compressed air to expand the rear seal 7046 of the rear clamps 7052. In one embodiment, one output of the valve 7076 is configured to supply compressed air to expand the rear clamps 7052 and the other output of the valve 7076 is configured to supply compressed air to inflate the rear seal 7046.

In one embodiment, a valve 7082 is positioned on a fluid communication line 7084. In one embodiment, the fluid communication line 7084 is between the front clamp control valve 7056 and the front clamp 7050 and the front seal 7046 and is configured to supply compressed air to expand the front clamps 7050 and the front seal 7046. In one embodiment, one output of the valve 7082 is configured to supply compressed air to expand the front clamps 7050 and the other output of the valve 7082 is configured to supply compressed air to inflate the front seal 7046.

Figure 96:
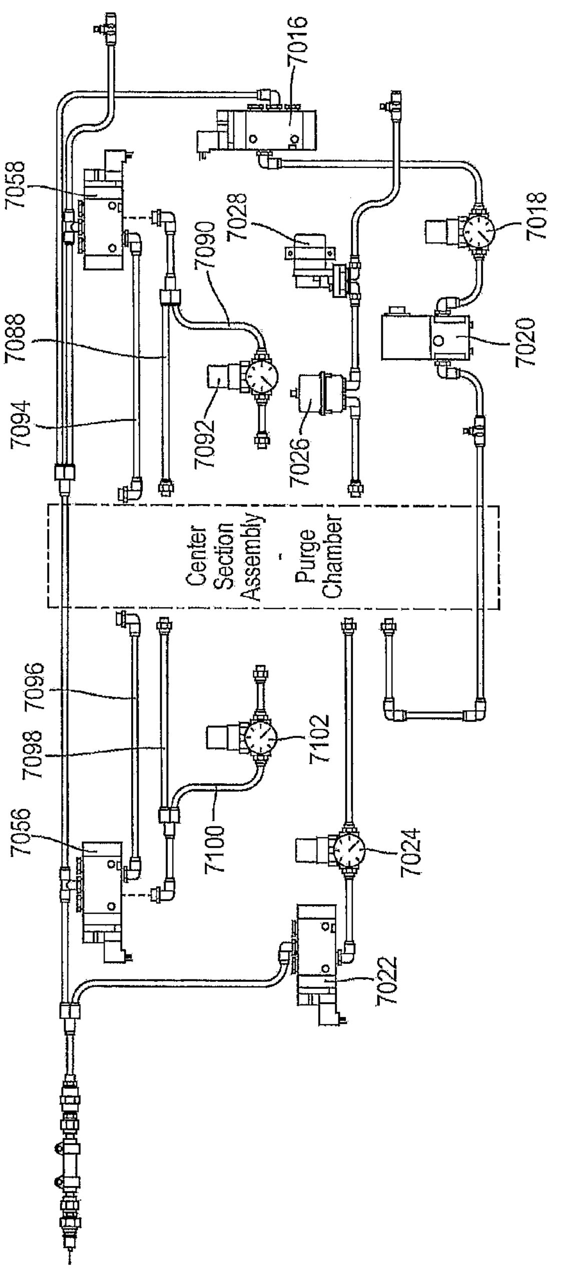
FIG. 96 shows a schematic diagram showing the flow of purge gas through the purge and inspection system in accordance with another embodiment of the present patent application.
Figure 97:
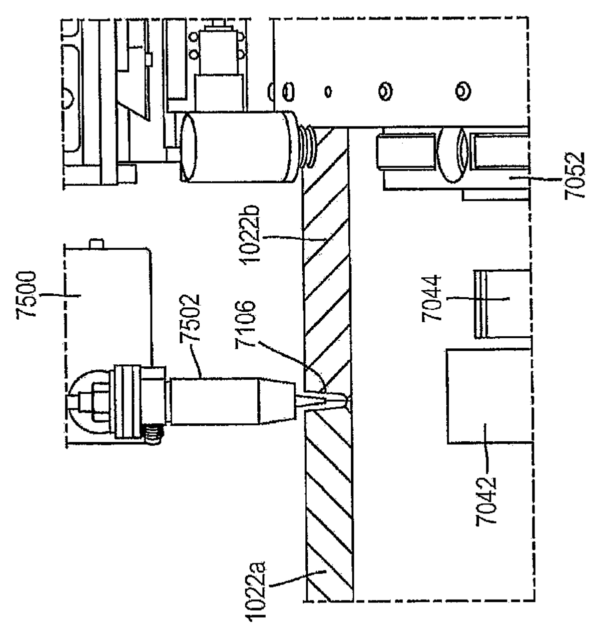
FIG. 97 shows a partial view of the purge and inspection system in accordance with an embodiment of the present patent application.

FIG. 96 shows a schematic diagram showing the flow of purge gas through the purge and inspection system 7001, where some components of the purge and inspection system 7001 are not shown for sake of clarity and to better illustrate the other components and/or features of the purge and inspection system 7001. For example, in one embodiment, in smaller purge and inspection systems 7001, the purge gas is used to not only to fill and maintain the purge gas in the purge gas chamber 7054 but also to inflate the seals 7046 and 7048 and to expand the clamps 7050 and 7052.

The flow of purge gas through the purge and inspection system 7001 in FIG. 96 is similar to the flow of purge gas through the purge and inspection system 7001 in FIG. 94, except for the differences noted below.

In one embodiment, the rear rotary union 7072 is in fluid communication through fluid communication lines with the low purge valve 7016, the high purge valve 7022 and the front rotary union 7104. In one embodiment, the purge gas stored in the purge gas tanks 7070 is sent through the fluid communication lines to the rear rotary union 7072, and then through the fluid communication lines from the rear rotary union 7072 to the low purge valve 7016 and the high purge valve 7022. In one embodiment, the purge gas is also sent through the fluid communication lines from the rear rotary union 7072 to the front rotary union 7104. The front rotary union has essentially the same components and operates in essentially the same way as the front rotary union 5032 shown in FIG. 25 and hence not illustrated in the same detail as front rotary union 5032.

In one embodiment, the purge gas is sent through the fluid communication lines from the rear rotary union 7072 to the rear clamp control valve 7058. In one embodiment, the purge gas from the rear clamp control valve 7058 is supplied via fluid communication line 7088 to expand the rear clamps 7052 and is supplied via fluid communication line 7090 to inflate the rear seal 7048. In one embodiment, a pressure regulator 7092 is positioned on the fluid communication line 7090 and is configured to automatically cut off the flow of the purge gas to the seal 7048 at a predetermined pressure. In one embodiment, the purge gas from the rear clamps 7052 is received by the rear clamp control valve 7058 via fluid communication line 7094 to retract the rear clamps 7052.

In one embodiment, the purge gas is sent through the fluid communication lines from the front rotary union 7104 to the front clamp control valve 7056. In one embodiment, the purge gas from the front clamp control valve 7056 is supplied via fluid communication line 7098 to expand the front clamps 7050 and is supplied via fluid communication line 7100 to inflate the front seal 7046. In one embodiment, a pressure regulator 7102 is positioned on the fluid communication line 7100 and is configured to automatically cut off the flow of the purge gas to the seal 7046 at a predetermined pressure. In one embodiment, the purge gas from the front clamps 7050 is received by the front clamp control valve 7056 via fluid communication line 7096 to retract the front clamps 7050.

FIG. 97 shows a partial view of the purge and inspection system 7001 in which the inspection detector 7042 and the camera 7044 are configured to perform the inspection from inside the pipes while an external weld torch 7502 of the external weld system 7500 is configured to perform the welding external to the pipes 1022*a*, 1022*b*. In one embodiment, the externally positioned weld torch 7502 may be mounted to an outer surface of one of the first pipe and the second pipe 1022*a*, 1022*b*.

Figure 98:
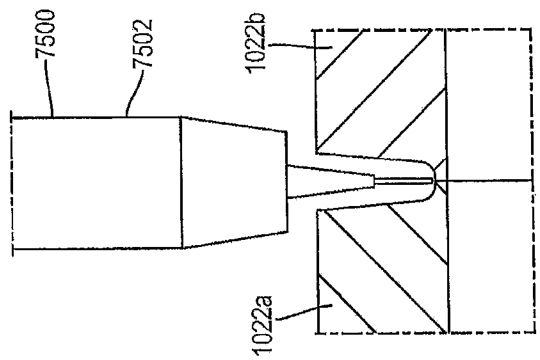
FIG. 98 shows a close-up view of an external weld torch of an external weld system used in the purge and inspection system in accordance with an embodiment of the present patent application.

For example, in FIG. 97, an ideal alignment of the weld torch 7502 to a bevel 7106 (along the longitudinal axis A-A of the pipes 1022*a*, 1022*b*) is shown. FIG. 98 shows a close-up view of the weld torch 7502 being aligned perfectly with the bevel 7106. The pipes 1022*a*, 1022*b* shown in FIGS. 97 and 98 are perfectly aligned and do not have any Hi-Lo.

Figure 100:
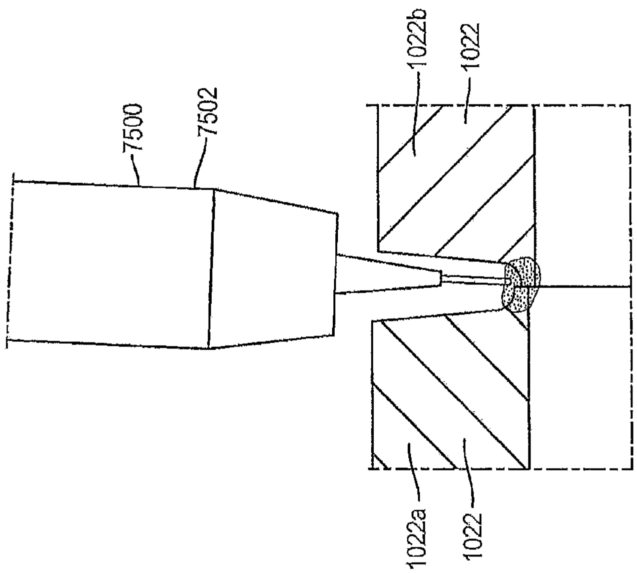
FIGS. 99 and 100 show close-up views of the external weld torch of the external weld system used in a prior art system and the purge and inspection system, respectively, where the pipes have a gap and radial offset (Hi-Lo) alignment.
Figure 99:
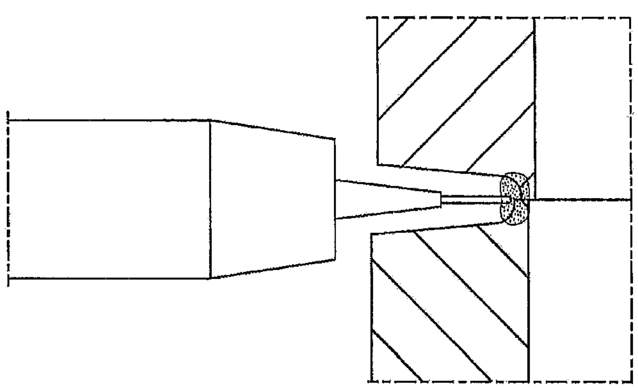

FIGS. 99 and 100 show close-up views of the external weld torch of the external weld system used in a prior art system and the purge and inspection system 7001, respectively, where the pipes have a gap and radial offset (Hi-Lo) alignment. For example, as shown in FIGS. 99 and 100, the pipes 1022*a*, 1022*b* have a 1 millimeter gap and radial offset (Hi-Lo).

As shown in FIG. 99, in the prior art system, the raised edge of the pipe shields the right side of the weld groove causing reduced weld penetration. As shown in FIG. 100, the external weld system 7500 used with the purge and inspection system 7001 is configured to receive weld profile data (e.g., prior to, during and subsequent to the welding procedure) from the purge and inspection system 7001 and is configured, based on the received weld profile data, to shift its external weld torch 7502 and/or to tilt its external weld torch 7502 to achieve a full weld penetration. Thus, the weld profile data from the purge and inspection system 7001 may be used by the external weld system 7500 to make better weld.

The operation of the purge and inspection system 7001 is now described. In one embodiment, the purge and inspection system 7001 is configured to be operated through a repeating cycle of operation.

After it has been determined that a weld has been completed in the current weld joint, one or more processors 7062 (of a computer system 7060) are configured to send communication signals to the purge electronics module 7032 to control (via control signals) the low purge valve 7016, the high purge valve 7022 and the secondary low purge regulator 7020 to deflate the purge seals 7046 and 7048. The one or more processors 7062 are also configured to send communication signals to the forward-most section electronics module 7036 to control/turn off (via control signals) the front clamp control valve 7056 to retract the first engagement structure 7050 to its original, retracted position and/or to deflate the purge seal 7046. The one or more processors 7062 are also configured to send communication signals to the center section electronics module 7040 to control/turn off (via control signals) the rear clamp control valve 7058 to retract the second engagement structure 7052 to its original, retracted position and/or to deflate the purge seals 7048. The purge and inspection system 7001 (including the purge seals 7046 and 7048 and the clamps 7050 and 7052) has to be moved to the next weld joint.

In one embodiment, the one or more processors 7062 are configured to send communication signals to the drive section electronics module 7064 to control (via control signals) the drive motors 7068 to accelerate the purge and inspection system 7001 to travel a predetermined speed and then decelerate and stop at the next weld joint. In one embodiment, the predetermined speed at which the purge and inspection system 7001 accelerates may be 6 feet/second.

When the second engagement structure 7052 is positioned at the next weld joint, the drive section electronics module 7064 sends communication signals to the purge electronics module 7032 to check alignment with the end of the pipe. In one embodiment, the purge electronics module 7032 is configured to operate (turn on) the one or more inspection detectors 7042 to measure where the second engagement structure 7052 are in relation to the end of the pipe. In one embodiment, the rotatable hub 7012 may not be operated when the one or more inspection detectors 7042 are measuring where the second engagement structure 7052 are in relation to the end of the pipe.

In one embodiment, the purge electronics module 7032 is configured send the measured distance data to the drive section electronics module 7064. In one embodiment, the drive section electronics module 7064 is configured to control (via control signals) the drive motors 7068 to move the second engagement structure 7052 by the measured distance data.

In one embodiment, when the second engagement structure 7052 is properly aligned and positioned in relation to the end of the pipe, the drive section electronics module 7064 is configured to send communication signals to the center section electronics module 7040 that the purge and inspection system 7001 is in position at the next weld joint. In one embodiment, the center section electronics module 7040 controls (opens via control signals) the rear clamp control valve 7058 to raise the second engagement structure 7052 and grip the old/existing pipe. In one embodiment, the center section electronics module 7040 controls (opens via control signals) the rear clamp control valve 7058 to inflate the rear seal 7048 at the same time.

The next/new pipe segment 1002*a* is then brought in, and slid over the forward-most section 7002 of the purge and inspection system 7001 into position by the working crew. At this time, the one or more processors 7062 are configured to send communication signals to the purge electronics module 7032 to operate the one or more inspection detectors 7042 to check the alignment of the pipes. In one embodiment, the one or more processors 7062 may rotate the rotatable hub 7012 to take measurements at multiple locations.

If the pipe alignment data is within a predetermined tolerance, the purge electronics module 7032 sends communication signals to the forward-most electronics module 7036 to actuate and operate the front clamp 7050. In one embodiment, the forward-most electronics module 7036 controls/opens (via control signals) the front clamp control valve 7056 to raise the first engagement structure 7052 and grip the new pipe segment 1002*a*. In one embodiment, the forward-most electronics module 7036 controls/opens (via control signals) the front clamp control valve 7056 to inflate the front seal 7046 at the same time.

If the pipe alignment data is not within the predetermined tolerance, the purge electronics module 7032 sends communication signals (a message) to the one or more processors 7062 identifying the misalignment between the pipes 1022*a*, 1022*b*. In one embodiment, this information may be relayed to a crane operator by traditional crane operator hand signals or by an electronic signal to a computer display terminal in the crane cab.

After the pipe is clamped, the one or more processors 7062 are configured to send communication signals to the purge electronics module 7032 to operate the one or more inspection detectors 7042 to measure the gap and radial offset (Hi-Lo) at a plurality of points along the circumference of the weld joint. In one embodiment, this data is communicated out to the one or more processors 7062 and compared against the allowable tolerances.

If the joint fit up (i.e., the gap and radial offset (Hi-Lo)) is within a predetermined tolerance, either the one or more processors 7062 or the purge electronics module 7032 sends communication signals to the operator indicating that welding may begin.

If the joint fit up (i.e., the gap and radial offset (Hi-Lo)) is not within the predetermined tolerance, a warning is sent to the operator, who can restart the clamping sequence or override the warning.

In one embodiment, the purge electronics module 7032 is configured to send control signals to the high purge valve 7022 to open and the high purge regulator 7024 to operate. In one embodiment, the purge electronics module 7032 is configured to continuously monitor the reading of the oxygen content level in the purge gas chamber 7054 from the oxygen sensor 7026. When the oxygen sensor's 7026 measurement data is below the predetermined oxygen content value (e.g., 500 parts per million (ppm)), the purge electronics module 7032 is configured to send control signals to the high purge valve 7022 to close and the low purge valve 7016 to open. In one embodiment, the oxygen sensor's 7026 measurement data is to be within a predetermined range (e.g., 50 to 100 ppm).

In one embodiment, while the high purge valve 7022 is open, the purge electronics module 7032 together with the forward-most section electronics module 7036 and the center section electronics module 7040 are configured to use the one or more inspection detectors 7042 to measure the gap and Hi-Lo of the weld joint at a plurality of points along the circumference of the weld joint. The results of the scan are communicated to the one or more processors 7062 to pre-program the external weld system 7500.

In one embodiment, after the low purge valve 7016 is closed, the secondary low purge regulator 7020 is configured to maintain a constant, set pressure in the purge gas chamber 7054. In one embodiment, the secondary low purge regulator 7020 is configured to maintain the pressure between 0.1 and 0.5 psi and is configured to stop its operation when the pressure is above 0.5 psi.

In one embodiment, the pressure starts out at a relatively high value (e.g., 5 psi) and is progressively gets to lower values as the weld proceeds. In one embodiment, the secondary low purge regulator 7020 may include a pressure sensor that is configured to communicate with the one or more processors 7062. In one embodiment, the pressure sensor is configured to measure pressure of the purge gas in the purge chamber 7054 and send a pressure data, which is indicative of the pressure of the purge gas in the purge chamber 7054, to the one or more processors 7062. In one embodiment, the one or more processors 7062 are configured to receive the pressure data, compare the received pressure data to its predetermined pressure value, and generate an overpressure signal if the pressure data is greater than the predetermined pressure value of 0.5 psi. In one embodiment, based on the overpressure signal, the purge and inspection system 7100 may be configured to open an exhaust valve structure to release the pressure in the purge chamber 7054 until the measured pressure falls below the predetermined pressure value. In one embodiment, based on the overpressure signal, the purge and inspection system 7100 may be configured to send communication signals to the external weld system to stop the welding procedure.

In one embodiment, communication signals are sent out the umbilical that correct purge gas level has been reached and the weld procedure can begin. In one embodiment, the operator issues the commands to the external weld system 7500 to begin the welding procedure. In one embodiment, the commands are automatically sent from the one or more processors 7062 to the external weld system 7500 to begin the welding procedure.

In one embodiment, the purge electronics module 7032 together with the forward-most section electronics module 7036 and the center section electronics module 7040 are configured to use the one or more inspection detectors 7042 to measure the gap and Hi-Lo of the weld joint a short distance ahead of where the external weld system 7500 is currently welding. In one embodiment, the inspection data from the inspection detector 7042 may be communicated in real-time to the one or more processors 7062 which use the inspection data to send updated welding parameters to the external weld system 7500.

In one embodiment, the external weld system 7500 is configured to communicate its position to the one or more processors 7062 which relay the information to the purge electronics module 7032 so that the purge electronics module 7032 can maintain the proper purge gas chamber pressure and control the position of the inspection detector 7042 appropriately.

In one embodiment, the weld procedure may be performed in several different ways.

In one embodiment, the weld procedure may be performed top to bottom on one side of the pipes and then top to bottom on the other side of the pipes. In one embodiment, the first weld is completed before the second weld begins. In this situation, the inspection detector 7042 scans ahead of the weld in real-time.

In one embodiment, the weld procedure may be performed top to bottom on each side of the pipe with the second weld starting before the first weld finishes. In one embodiment, the inspection detector 7042 scans a distance ahead of one weld faster than the welder is traveling then rapidly change position to the other weld to scan ahead of it. In one embodiment, the inspection detector 7042 may alternate between the two weld locations until the first weld finishes.

In one embodiment, the weld procedure may be performed all the way the pipes around in one pass with the inspection detector 7042 scanning a short distance ahead of the weld.

In one embodiment, after the weld is complete, the rotatable hub 7012 continues to rotate while the purge electronics module 7032 uses the inspection detector 7042 and the camera 7044 to inspect the weld. In one embodiment, the weld inspection data is communicated to the one or more processors 7062.

In one embodiment, if one or more weld defects are detected in the weld inspection data, the weld defects can be repaired while the clamps 7050 and 7052 are still in position and the purge gas chamber 7054 is still filled with inert gas.

In one embodiment, once the inspection and any repairs are complete and verified by the operator, the operator sends a command to the forward-most section electronics module 7036 and the center section electronics module 7040 to turn off the front and rear clamp control valves 7056 and 7058, lower/retract the clamping shoes 7050 and 7052, and deflate the seals 7046 and 7048.

In one embodiment, the one or more processors 7062 of the purge and inspection system 7100 may operatively connected to the forward-most electronics module of the purge and inspection system 7100, the purge electronics module 7032, the center section electronics module of the purge and inspection system 7100, and the drive section electronics module 7064.

In one embodiment, the field system of the present patent application may include one or more of splitters/hubs/routers that are configured to transmit data, control signals and communication signals between the one or more processors 5140 or 7062 and one or more electronics modules described in this application.

During pipeline forming procedures (e.g., for offshore or on land (on shore) applications), one section of pipe 1022*a* or 1022*b* is connected to another section of pipe 1022*b* or 1022*a* at a tie-in weld (the location at which the two pipe sections are welded together) by aligning two facing ends of the pipe sections together and forming the weld joint 1026. Such a weld joint 1026 connects the two pipe sections 1022*a*, 1022*b* at their facing ends such that the weld joint 1026 yields a fluid tight seal and thus a continuous fluid passage between the two joined pipe sections. Each pipe section 1022*a*, 1022*b* may be considerably long (e.g., hundreds or thousands of feet or even as long as 1 mile), making it difficult to provide internal cooling within the pipe sections 1022*a*, 1022*b* at or near the tie-in weld location after the weld joint 1026 has been formed. In particular, placement of a cooling structure as well as removal of such structure internally within the pipe sections 1022*a*, 1022*b* for cooling at the weld joint 1026 could be challenge.

The internal cooling system of the present application provides internal cooling within pipe sections 1022*a*, 1022*b* after the pipe sections have been secured together via the weld joint 1026. In one embodiment, the internal cooling system may be an internal heat exchanger that may be referred to as "IHEX." In one embodiment, the internal cooling system includes a cooling section to provide direct cooling to internal surface portions of pipe sections 1022*a*, 1022*b*, and a control section or controller that is configured to control components of the cooling section and further is configured to facilitate mobility of the internal cooling system within pipe sections 1022*a*, 1022*b*. In one embodiment, the cooling section utilizes a coolant to provide cooling internally within pipe sections 1022*a*, 1022*b*. In one embodiment, the internal cooling system may further include a coolant supply section that includes coolant to be supplied to the cooling section during operation of the internal cooling system. In one embodiment, the internal cooling system of the present patent application includes a mechanism configured for internally cooling the pipe sections 1022*a*, 1022*b* after being welded together as well as a mechanism for placement of the internal cooling system within and retrieval of the internal cooling system from the pipe sections 1022*a*, 1022*b* during the pipeline forming process, which results in a reduction in the time required to cool the pipe sections after heating and also a speed up in progress through the stations necessary for fabrication.

Figure 104:
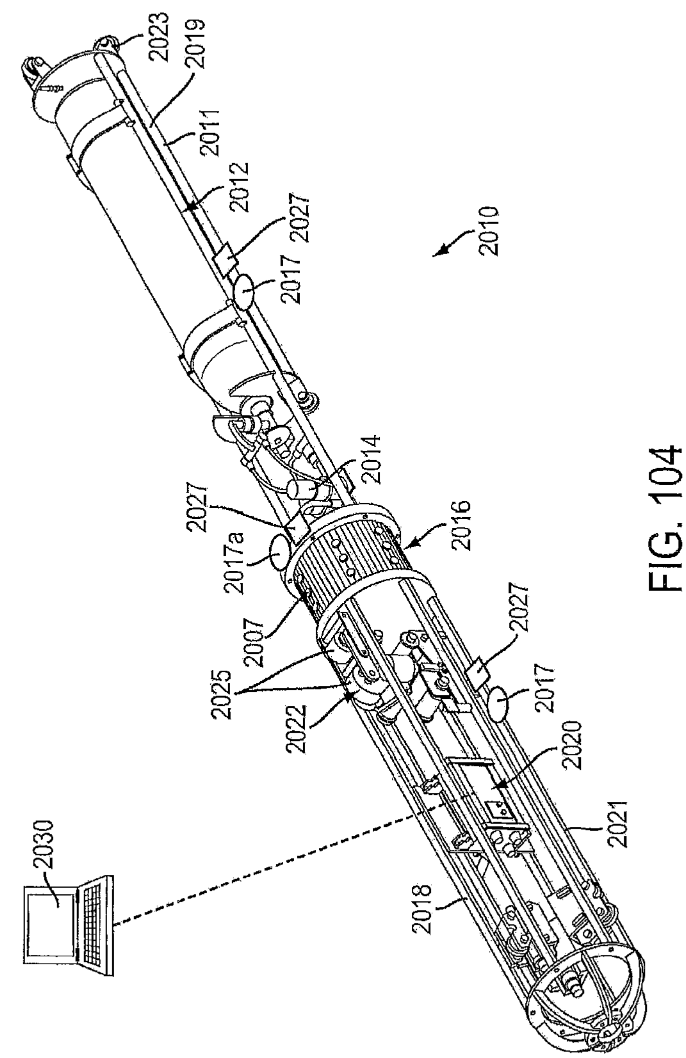
FIG. 104 shows a perspective view of an exemplary internal cooling system for use in pipeline welding in accordance with an embodiment of the present patent application.

FIG. 104 shows an exemplary internal cooling system 2010 of the present patent application. In one embodiment, the internal cooling system 2010 includes a suitably rigid frame that houses components of the internal cooling system, where the frame comprises a plurality of longitudinally or lengthwise extending rods 2019, 2021 constructed of one or more suitable materials (e.g., a metal such as steel or other suitably rigid and durable materials) and has a suitable configuration to permit insertion of the frame within pipe sections to facilitate internal cooling within the pipe sections 1022*a*, 1022*b*.

A first section 2011 of the frame includes a coolant supply source 2012 comprising one or more tanks (a single tank is shown in FIG. 104) secured within the first section 2011. The coolant supply source tanks may include any suitable cooling fluid including, but not limited to, water, a cryogenic fluid such as liquid argon or liquid nitrogen, etc. A second, cooling section 2016 is secured at an intermediate location of the frame adjacent the first section 2011 and communicates with the coolant supply source 2012 via a suitable valve structure 2014 (e.g., shown in FIG. 104 as one or more valves, regulators, piping, etc.) that facilitates supply of coolant from the coolant supply source 2012 to outlet nozzles 2007 of the cooling section 2016 at one or more suitable pressures and/or flow rates.

A third section 2018 of the frame is disposed adjacent the cooling section 2016 and comprises a plurality of rods 2021 that form a caged enclosure surrounding a controller 2020. A pneumatic and/or an electronic drive system 2022 may also be at least partially disposed within the third section 2018 and may include one or more motor-controlled rollers 2025 and/or any other suitable locomotive structure(s) configured to engage with internal surface portions of pipe sections when the internal cooling system 2010 is disposed within such pipe sections to control movement of the internal cooling system 2010 in forward and reverse directions within pipe sections during procedures as described herein. In one embodiment, the drive system 2022 may be in communication (e.g., hardwire or wireless communication) with the controller 2020 to facilitate control, via the controller 2020, of forward and reverse movements of the internal cooling system 2010 during procedures (e.g., control of a motor of the drive system 2022 by the controller 2020 controls rotation of the roller(s) and thus forward or rear movement of the internal cooling system 2010). In one embodiment, the drive system 2022 may be substantially encompassed within and/or as part of the frame of the internal cooling system 2010. In one embodiment, the drive system 2022 may include a structure that extends beyond the frame. In one embodiment, the drive system 2022 may include a suitable cable structure that extends from the internal cooling system 2010 and through one or more pipe sections to an open end of a pipe section, where the cable structure is used to facilitate forward and/or reverse movement of the internal cooling system 2010 within pipe sections (e.g., via a winch structure provided within the internal cooling system frame and/or at an anchored location exterior to the pipe sections and connected with the cable structure). In one embodiment, the rollers may also be provided at one end of the internal cooling system 2010 (e.g., rollers 2023 provided at a terminal end of the frame first section 2011 as shown in FIG. 104) to enhance mobility of the internal cooling system 2010 within pipe sections 1022*a*, 1022*b*.

In one embodiment, the controller 2020 may include at least one suitable processor that controls operations of the internal cooling system 2010 via suitable control process logic instructions stored within a memory of the controller as well as electronic signals provided remotely via another user-controlled device disposed at a suitable distance from the internal cooling system. In one embodiment, the controller 2020 may be configured to communicate with a remote control device operable by a user (e.g., a computer, hand control device, or any other suitable electronic device) via electronic signals, where the electronic signals are communicated via a wireless or hardwire link between the controller 2020 and the remote control device. In one embodiment, the remote control device is shown in FIG. 104 as a computer 2030 (e.g., laptop, notepad, personal digital assistant, smart phone, etc.) that communicates with the controller 2020 via a wireless communication link (shown as the dashed line in FIG. 104). Electronic signal communications may include two way communications between the controller 2020 and the remote control device, such that the controller 2020 is configured to provide information to the remote control device (such as measured internal temperature information and/or other types of measured conditions within the pipe sections) as well as received control information to effect remote control operations of the internal cooling system 2010.

In one embodiment, one or more electronic sensors 2017 may be provided at one or more suitable locations within the internal cooling system frame and may be in communication (via hardwire or wireless communication link) with the controller 2020 to provide information about conditions within the pipe sections during procedures. For example, in one embodiment, the one or more electronic sensors 2017 comprise one or more temperature sensors (e.g., IR temperature sensors, RTD temperature sensors, thermocouples, etc.) may be provided at one or more different locations at the first section 2011, the cooling section 2016 and/or third section 2018 of the internal cooling system 2010, where the temperature sensors are configured to measure temperature and provide such measured temperature information to the controller 2020 during procedures. In one embodiment, the one or more electronic sensors 2017 comprise pressure and/or flow rate sensors may be provided at one or more suitable locations within the tank(s) 2012 of the coolant source 2012, within the valve structure 2014 and/or proximate the outlet nozzles 2007 of the cooling section 2016, where measured pressure and/or flow rate information is provided by such sensors to the controller 2020 during procedures. It should be appreciated that the sensors 2017 can also comprise a combination of temperature and pressure sensors. In one embodiment, one or more cameras 2027, controlled by the controller 2020 (and remotely controlled by the remote control device), may also be provided at one or more suitable locations to facilitate a view within the pipe sections (e.g., to determine a suitable location for positioning the internal cooling system 2010 within the pipe sections 1022*a*, 1022*b* during procedures). Example pressure/temperature sensors and/or cameras are generically shown at locations 2017 and 2027 in FIG. 104.

In one embodiment, the internal cooling system 2010 may include a suitable power supply source to provide electrical power to the controller 2020, the drive system 2022, the electronic sensors, the valve structure 2014 (e.g., to electronically control one or more valves and thus control flow of coolant from the coolant supply source 2012 to the cooling section 2016). In one embodiment, the power supply source may be contained within the internal cooling system frame (e.g., one or more batteries disposed in a battery pack provided within the third section 2018 or at any other suitable location within the internal cooling system frame). In one embodiment, the power supply source may be located external to the pipe sections, where an electrical cable connects the power supply source with the internal cooling system 2010 to provide electrical power to the various components of the internal cooling system.

In one embodiment, the cooling section 2016 may include any suitable structure that facilitates cooling via heat exchange with the internal weld portion as well as other internal wall portions of the pipe sections. In one embodiment, the coolant from the coolant supply source 2012 is provided via the valve section 2014 to the cooling section 2016. In one embodiment, the cooling section 2016 include a plurality of nozzles 2007 disposed around an external periphery of the cooling section 2016 to facilitate a flow of coolant at a suitable flow rate (as controlled by the valve section 2014 and nozzle design of the cooling section nozzles 2007) from the cooling section 2016 toward the internal surfaces at the weld joint and other internal portions of the two joined pipe sections.

The operation of the internal cooling system 2010 in relation to pipeline welding procedures is now described with reference to FIGS. 105-107. In preparation for welding an open end of the first pipe section 1022*a* to a facing open end of the second pipe section 1022*b*, the two pipe sections 1022*a*, 1022*b* are axially aligned in position with each other. In one embodiment, the two pipe sections 1022*a*, 1022*b* may be held in such alignment with a tie-in clamp (not shown in FIGS. 105-107). A suitable tie-in clamp (e.g., clamps 5302 (positioned external to the pipe) as disclosed elsewhere in this application) may be externally secured to the facing ends of the pipe sections 1022*a*, 1022*b* to hold the sections 1022*a*, 1022*b* in place in relation to each other during the welding procedure. In one embodiment, an internal tie-in clamp (e.g., internal clamps 5142, 5144 (positioned inside the pipe) as disclosed elsewhere in this application) may be used to hold the facing ends in place during the welding procedure. Both types of tie-in clamps (external and internal) are known in the pipe welding art and are thus not described in further detail herein. After the tie-in clamp is applied to hold the ends of the pipe sections 1022*a*, 1022*b* in place in relation to each other, the weld joint 1026 is formed at the tie-in weld location (i.e., at the two facing open ends of the first and second pipe sections). The weld joint 1026 is formed in the manner as described in detail above and may include the root pass weld layer, hot pass weld layer, the fill pass weld layer(s) and the cap pass weld layer to ensure a proper weld joint is formed. In one embodiment, the formation of the weld joint 1026 may involve a preheating of the facing ends of the first and second pipe sections 1022*a*, 1022*b* to a minimum temperature of about 150° C. The remainder of the welding procedure may cause a temperature rise around the weld joint as high as about 300° C. After the weld joint 1026 is formed, the weld joint 1026 is typically AUT (ultrasonic tested) and/or X-ray inspected, as disclosed elsewhere in this application, to confirm the quality/integrity of the weld joint 1026. In one embodiment, the AUT weld inspection may not be conducted above temperatures of about 50° C. to about 75° C. ($T_{max}$), where $T_{max}$ is the highest temperature at which inspection may be effectively conducted. Furthermore, the AUT weld inspection procedure of the pipe fabrication procedure has to be halted until the pipe temperatures near the weld joint 1026 are reduced to a temperature around such inspection temperature range. The internal cooling system of the present application is configured to remove heat from the weld area in order to reduce the temperature of the pipe weld area at least down to the acceptable AUT inspection temperature ($T_{max}$).

In one embodiment, after the weld inspection procedure, the field joint coating (FJC) is also applied to external areas of the pipe sections 1022*a*, 1022*b* surrounding the weld joint 1026 to provide an insulation barrier in order to prevent or minimize corrosion at weld areas. Such insulation may usually be applied effectively only when the pipe temperature is above a minimum pipe temperature $T_{min}$. Heat is therefore added to the welded area until the pipe temperature in the weld area to be insulated rises back up to around 220 to 240° C. ($T_{min}$), where $T_{min}$ is the lowest temperature at which insulation may be effectively applied to the insulation area.

After the coating/insulation application procedure, the pipe may be spooled for in-the-field installation. However, at temperatures around $T_{min}$, the spooling procedure cannot be accomplished effectively while maintaining weld integrity. Therefore, the pipe fabrication procedure again may be stalled while the pipe temperature is gradually allowed to drop naturally (relative to ambient temperature) from $T_{min}$ to an acceptable spooling temperature ($T_{max}$), where $T_{max}$ is the highest/maximum temperature at which the pipe may be effectively spooled. In one embodiment, the internal cooling system of the present application is configured to again remove heat from the weld area in order to reduce the temperature to a maximum temperature of about 50 to about 75° C. ($T_{max}$) acceptable for effective spooling (winding the pipe onto a spool). Therefore, the internal cooling system of the present application is configured to reduce the temperature before the weld inspection procedure and/or reduces the temperature before the spooling procedure in order to minimize the time it takes to weld, inspect, insulate, and spool a length of pipe segments.

Figure 105:
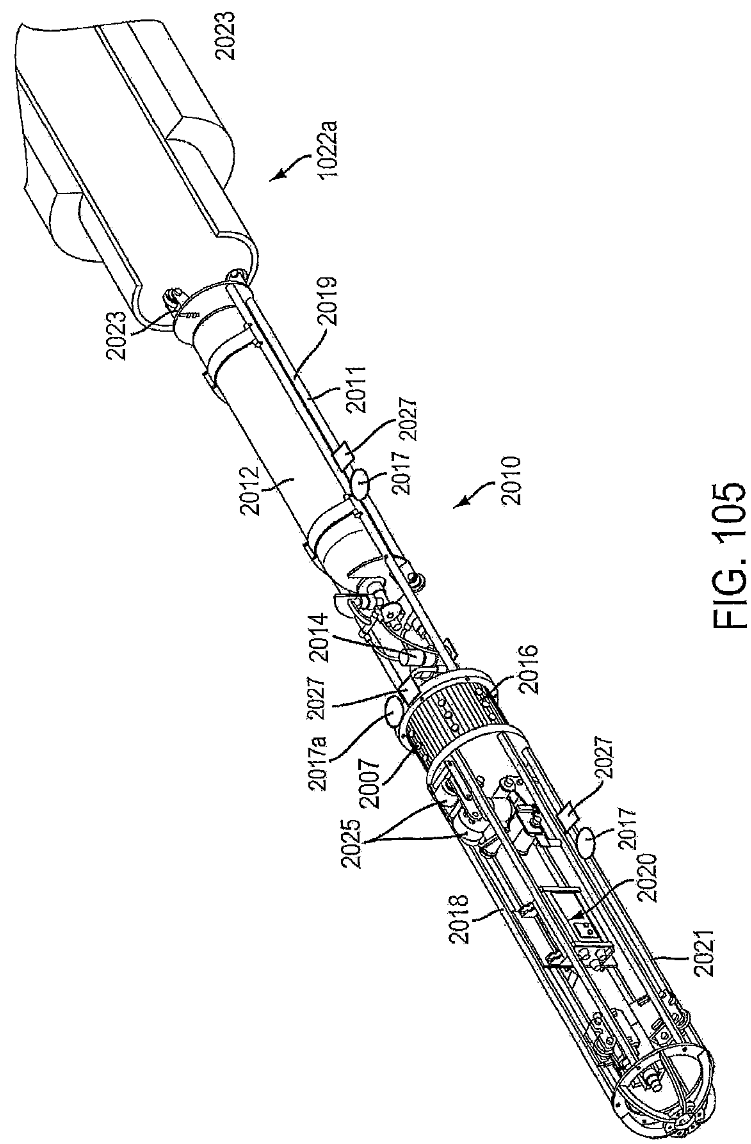
FIG. 105 shows a perspective view of the internal cooling system of FIG. 104 immediately prior to insertion within an end of a pipe section in accordance with an embodiment of the present patent application.
Figure 106:
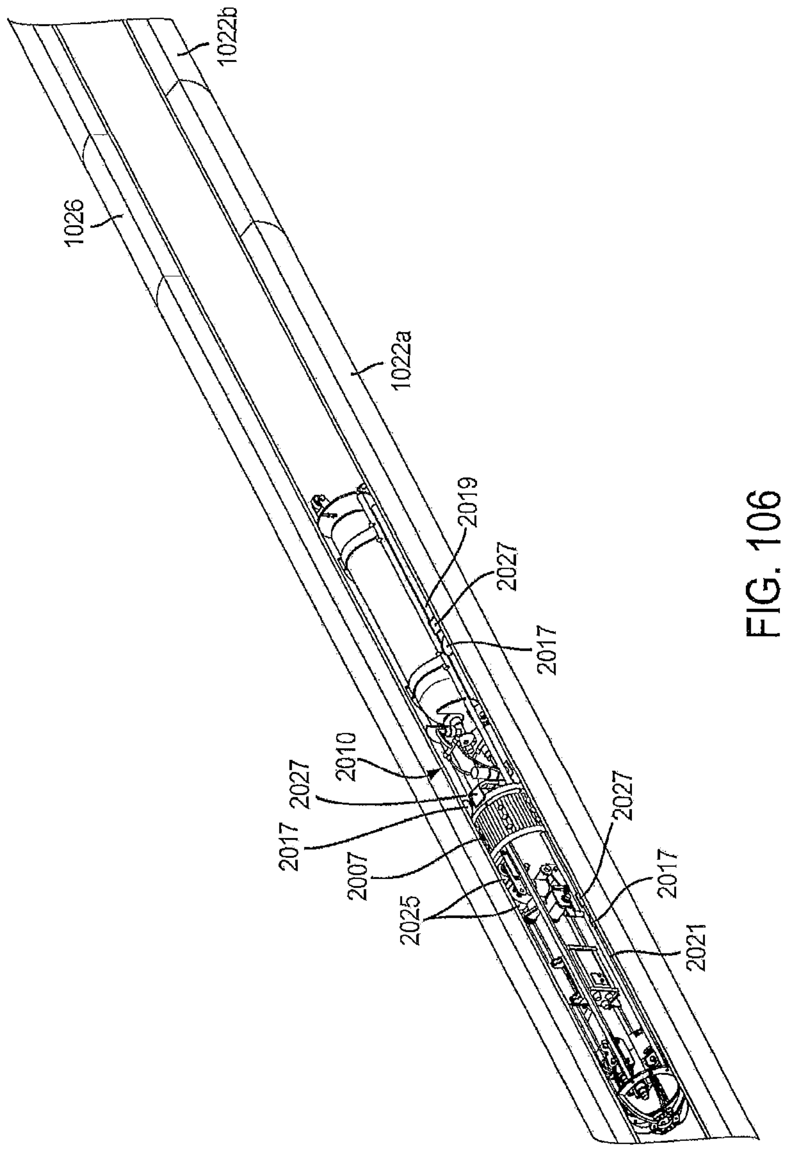
FIG. 106 shows a perspective view of the internal cooling system of FIG. 104 located within a first pipe section that is secured via a weld joint to a second pipe section in accordance with an embodiment of the present patent application.

During the operational period at which the pipe sections 1022*a*, 1022*b* are being welded together (with subsequent application of the coating/insulation), the internal cooling system 2010 is loaded within an open end of pipe section 1022*a* as shown in FIG. 105. In one embodiment, one or both pipe sections 1022*a*, 1022*b* may comprise a single unit of pipe. In another embodiment, one of pipe sections 1022*a*, 1022*b* may comprise a plurality of pipe units welded together. In one embodiment, when one of the pipe sections 1022*a* or 1022*b* comprises a plurality of pipe units already welded together, it may be desirable to load the internal cooling system 2010 at the pipe section 1022*a* or 1022*b* comprising a single unit of pipe (or the pipe section having the shorter length) so as to reduce the time necessary for the internal cooling system 2010 to travel within the pipe section to reach the tie-in weld location. Thus, in one embodiment, the pipe section 1022*a* may comprise a single pipe unit that is being connected with a longer section of pipe represented by the pipe section 1022*b* (e.g., two or more pipe units connected via weld joints).

In one embodiment, the internal cooling system 2010 is loaded into the open end of the pipe section 1022*a* (i.e., the end that opposes the open end facing the open end of pipe section 1022*b* that defines the tie-in weld location) such that the first section 2011 of the internal cooling system frame serves as the front end and thus enters first within pipe section 1022*a*. In one embodiment, the internal cooling system 2010 is moved (leading with the first section 2011) within the pipe section 1022*a* to a suitable position proximate the tie-in weld location as shown in FIG. 106. In one embodiment, the controller 2020 (which may be remotely controlled by a user) is configured to control operation of the drive system 2022 (e.g., by controlling one or more motors which move the rollers 2025 in contact with internal wall portions of pipe section 1022*a*) to facilitate advancement of the internal cooling system 2010 within the pipe section 1022*a* and toward the tie-in weld location. Upon reaching a suitable location proximate the tie-in weld location (e.g., a location of the internal cooling system as shown in FIG. 106), the controller 2020 may control the drive system 2022 so as to cease further movement of the internal cooling system 2010 until such time as cooling procedures are to be initiated. For example, a camera 2027 mounted at a suitable location on the first section 2011 and which is controlled by the controller 2020 may provide video images to the remote control device so that a user may determine how close the internal cooling system is to the weld joint 1026. In one embodiment, in combination with video images provided by the camera 2027, one or more temperature sensors 2017 suitably located on the internal cooling system 2010 frame that measures internal temperatures within pipe section 1022*a* and provide such temperature information to the controller 2020. When one or more measured temperatures reach a threshold value (e.g., about 100° C. or greater), this may provide an indication that the internal cooling system 2010 has reached a location proximate the weld joint 1026. Any other suitable mechanism may also be utilized to provide a suitable indication of the location of the internal cooling system 2010 within the pipe section 1022*a* during its movement toward the tie-in weld location.

Upon reaching the desired location that is proximate or near the tie-in weld location, a cooling procedure may be performed after the weld joint 1026 is formed and before the AUT/X-ray inspection has occurred (if required). In one embodiment, the cooling procedure may be performed after the pipe is reheated for application of an external coating, and an FJC has been applied (if required). In one embodiment, when the internal cooling system 2010 reaches a suitable location within pipe section 1022*a* that is proximate the tie-in weld location and before completion of the welding procedure, the internal cooling system 2010 is kept in its position and is ready to be used for cooling as soon as the welding or reheating procedure is completed. The cooling procedure is performed by first positioning the cooling section 2016 at a suitable location (e.g., relative to the weld joint 1026, such as shown in FIG. 107). This may be achieved by advancing the internal cooling system 2010 from its position in FIG. 106 to its position in FIG. 107 via the controller 2020 (which is user controlled via the remote control device) controlling the drive system 2022 until the internal cooling system 2010 is at the desirable position. Movement to such location (e.g., as shown in FIG. 107) may be achieved based upon video images within the pipe sections 1022*a*, 1022*b* being provided to the remote control device, temperature sensor information being provided to the remote control device and/or via any other suitable mechanism.

Figure 107:
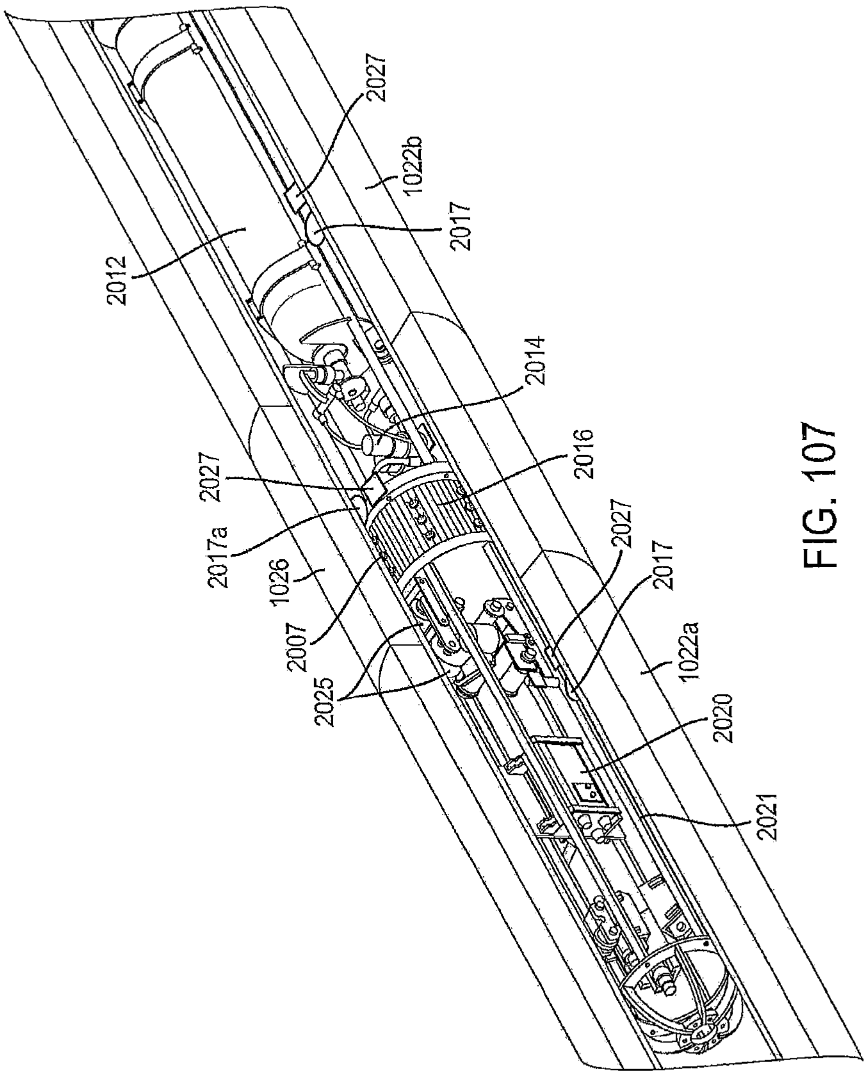
FIG. 107 shows another view of FIG. 106 in which the internal cooling system is located within the first and second pipe segments at a suitable location in relation to the weld joint to facilitate internal cooling at the weld joint in accordance with an embodiment of the present patent application.

Upon reaching a desired location within the pipe sections 1022*a*, 1022*b* (e.g., where the cooling section 2016 is disposed in close proximity to the weld joint 1026 as shown in FIG. 107), the controller 2020 (which may be user controlled via the remote control device) controls operation of the valve structure 2014 (e.g., via control of one or more electronic valves) to facilitate a flow of coolant from the coolant supply source 2012 at a suitable pressure and/or flow rate to the cooling section 2016, where the coolant flows from the nozzles 2007 disposed at the cooling section 2016 and suitably oriented to direct coolant flow away from the cooling section 2016 and toward inner wall surface portions within the pipe sections 1022*a*, 1022*b*. The temperature sensor(s) monitor the internal temperature at the internal cooling system 2010 within the pipe sections 1022*a*, 1022*b* and provide measured temperature information to the controller 2020. Upon reaching a sufficient temperature within pipe sections 1022*a*, 1022*b* (as measured by the temperature sensor(s), e.g., a temperature of $T_{max}$° C. or lower), the controller 2020 may control the valve structure 2014 to cease flow of coolant to the cooling section 2016.

In one embodiment, the internal cooling system 2010 may be moved in forward or reverse directions, via control of the drive system 2022 by the controller 2020, to provide further cooling procedures (as desired and based upon measured internal pipe temperatures) at other locations along internal wall surface portions of the pipe section 1022*a* and/or the pipe section 1022*b*. When it has been determined that sufficient cooling has been achieved, the internal cooling system 2010 may be withdrawn from the connected pipe sections 1022*a*, 1022*b*. For example, the internal cooling system 2010 may be moved in reverse, by controlling the drive system 2022 via the controller 2020, to move toward the free and open end of the pipe section 1022*a* such that the third section 2018 would emerge first from the pipe section 1022*a*. A further pipe section may then be aligned (the internal cooling system may remain inside section 1022*a* as the new section is fitted up to 1022*a*) with the free and open end of pipe section 1022*a* (now connected via the weld joint 1026 with pipe section 1022*b*) to form a tie-in weld location, and the process is then repeated in which the internal cooling system 2010 enters via the free and open end of the further pipe section and is advanced toward the tie-in weld location for performing cooling procedures at the weld joint to be formed between the pipe sections.

While the drive system 2022 shown in the embodiment of FIGS. 104-107 comprises the rollers 2025 operable by a motor system that is controlled by the controller 2020, the drive system 2022 for the internal cooling system may also implement any suitable mechanism capable of providing user-controlled movements of the internal cooling system within the pipe sections. For example, one or more cable/winch systems may be implemented, in which one or more winches may be provided as part of the internal cooling system and/or located at one or more anchor points that are external to the pipe sections. A cable extends between each winch and a connection point (either at the internal cooling system or a connection point external to the pipe sections) so as to facilitate placement of the internal cooling system within and/or withdrawal of the internal cooling system from the pipe sections during procedures.

It is noted that the procedures described above in relation to the internal cooling system may be performed for any types of tie-in weld applications between pipe sections in a pipeline system. For example, the internal cooling system may be used in creating pipelines for offshore, underwater applications as well as mainline applications. In one embodiment, the internal cooling system 2010 may be used for the spool base tie-in weld sequence (as shown in described with respect to FIG. 6) and barge weld sequence (as shown in described with respect to FIG. 7).

In a mainline application, 40 foot (12 meter) to 80 foot (24 meter) pipe sections are welded together to form long "tie-in" sections. In scenarios in which an umbilical cable may be required for controlling movement and/or other procedures of the internal cooling system, the umbilical cable may be at least 240 feet (72 meters) in length. The procedure of loading the internal cooling system within a pipe section and moving the internal cooling system into position for cooling after a welding procedure (with optional AUT/X-ray weld inspection and coating/insulation/FJC application) takes place in similar to that previously described in relation to FIGS. 104-107.

Figure 108:
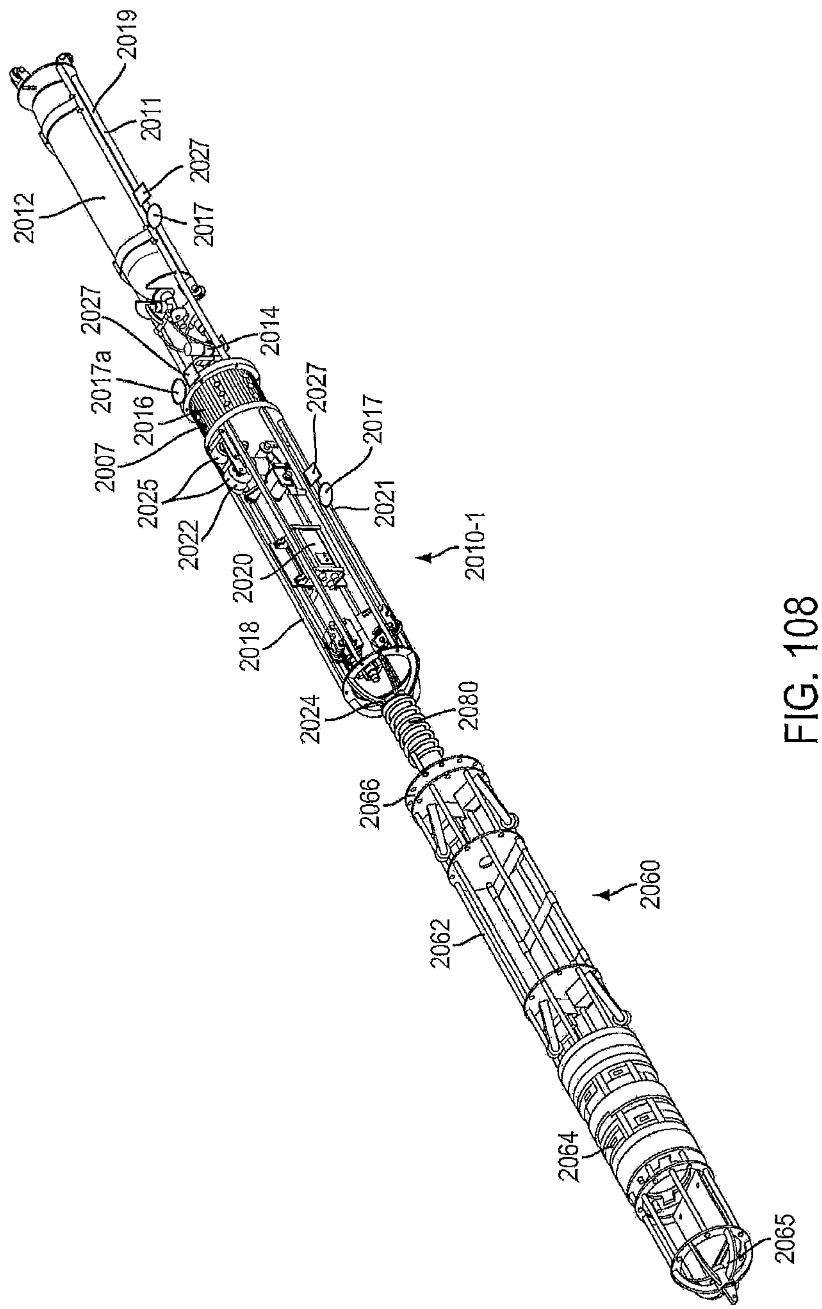
FIG. 108 shows a perspective view of the internal cooling system of FIG. 104 connected with a tie-in clamp in accordance with an embodiment of the present patent application.

FIG. 108 shows an internal cooling system 2010-1 in accordance with another embodiment of the present patent application. The internal cooling system 2010-1 is similar to the embodiments previously described, except for the differences as will be noted below. In one embodiment, the internal cooling system 2010-1 is configured to connect with an internal tie-in clamp 2060 at an end section 2024 of the third frame section 2018 of the internal cooling system 2010-1. In one embodiment, the internal tie-in clamp 2060 includes a frame 2062 with a suitable configuration that allows for insertion of the tie-in clamp 2060 within the pipe sections (e.g., pipe sections 1022*a* and 1022*b*) and includes a section 2064 that is configured to align and hold two open and facing ends of pipe sections 1022*a*, 1022*b* in place at the tie-in weld location (e.g., by expanding to form a frictional engagement with the internal wall surface portions of the pipe sections at their facing ends when the tie-in clamp 2060 is suitably positioned within the pipe sections 1022*a* and 1022*b*). In one embodiment, the section 2064 and the clamp 60 correspond to the sections in the internal weld system 5004 having the first pipe clamp 5142 and the second pipe clamp 5144. In one embodiment, a connection member 2080 (e.g., a rod or spring member) is configured to connect an end 2066 of the tie-in clamp 2060 with the end section 2024 of the frame of the internal cooling system 2010-1.

In one embodiment, the internal cooling system 2010-1 may be a trailer member for the tie-in clamp 2060. For example, the tie-in clamp 2060, with internal cooling system 2010-1 connected thereto (via the connection member 2080) may be inserted at its end 2065 (i.e., an end of the frame that opposes the frame end 2066 which connects with the internal cooling system 2010-1 via the connection member 2080) into a pipe section, where movement of the tie-in clamp 2060 within the pipe section also results in corresponding movement of the internal cooling system 2010-1 within the pipe section. In one embodiment, the internal cooling system 2010-1 may be inserted via its first frame section 2011 into the pipe section and then moved into position so as to also bring the tie-in clamp 2060 into suitable alignment with the tie-in weld location between the two aligned pipe sections. In one embodiment, the drive system 2022 of the internal cooling system 2010-1 may be used to move the tie-in clamp 2060/internal cooling system 2010-1 combined structure to a suitable location within the pipe sections or, alternatively, any other suitable drive mechanism may also be utilized to move such structure within the pipe sections (e.g., one or more cable/winch systems).

In one embodiment, the tie-in clamp 2060 holds the ends of the pipe sections 1022*a*, 1022*b* together until the weld joint 1026 is formed. In one embodiment, the section 2064 and the clamp 60 correspond to the sections in the internal weld system 5004 having the first pipe clamp 5142 and the second pipe clamp 5144. After formation of the weld joint 1026 (and formation of the coatings as needed), the tie-in clamp 2060 may be disengaged from the internal wall surface portions of the pipe sections to facilitate movement of the internal cooling system 2010-1 to a suitable location (e.g., such that cooling section 2016 is aligned with the weld joint) to initiate internal cooling within the pipe sections 1022*a*, 1022*b*.

Figure 109:
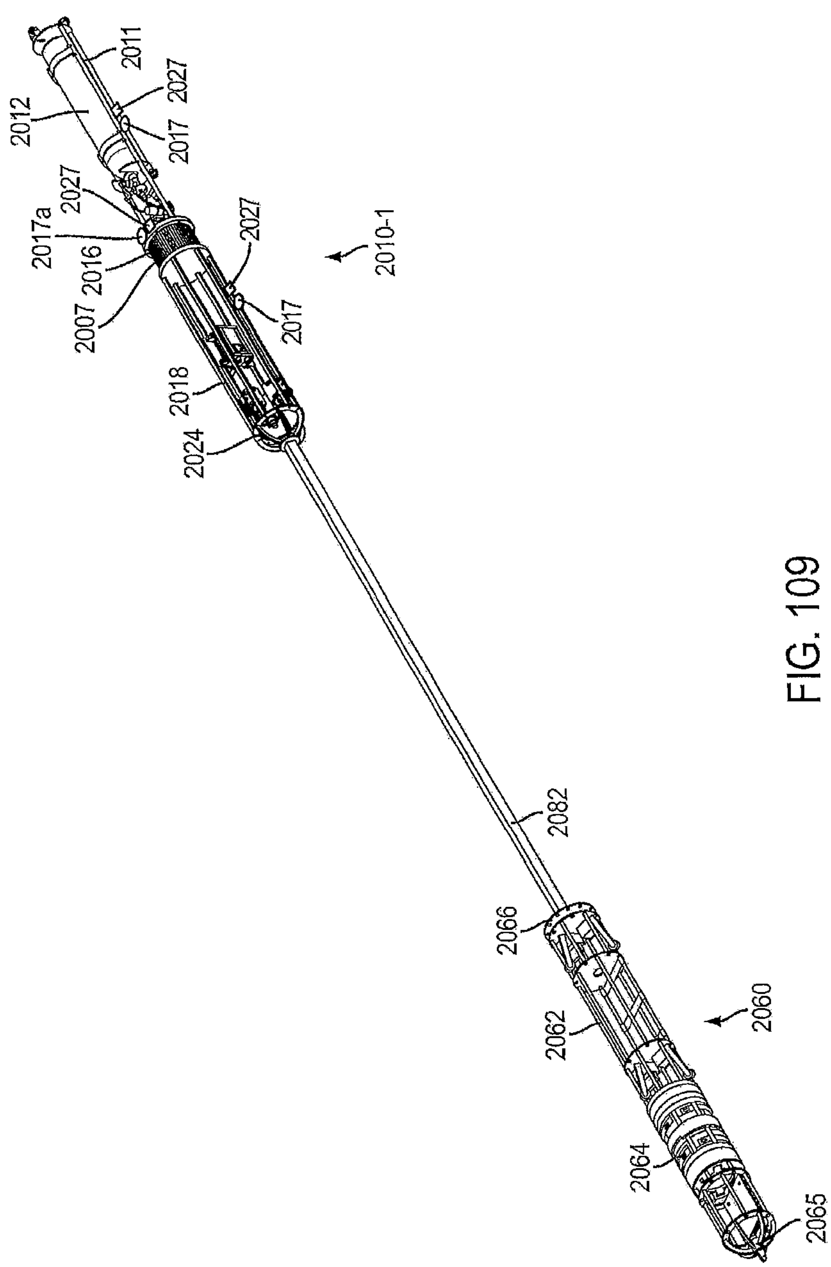
FIG. 109 shows a perspective view of the internal cooling system of FIG. 104 connected with a tie-in clamp in accordance with another embodiment of the present patent application.

FIG. 109 discloses another embodiment for connecting the internal cooling system to an internal tie-in clamp, in which a longer connection member 2082 (e.g., an elongated rod) is provided to connect the internal cooling system 2010-1 with the tie-in clamp 2060. In one embodiment, the connection member 2082 has a greater lengthwise dimension than the connection member 2080 (shown in FIG. 108), which minimizes heating of the internal cooling system 2010-1 during welding procedures (due to a greater separation distance between internal cooling system and tie-in clamp).

In one embodiment, the procedure includes loading of the tie-in clamp 2060 with internal cooling system 2010-1 into one of the pipe sections and aligned so that the tie-in clamp 2060 holds the two facing ends of the pipe sections in place at the tie-in weld location. After certain welding procedures are performed (e.g., the root and hot pass weld procedures), the tie-in clamp 2060 with the internal cooling system 2010-1 may be moved together and away from the tie-in weld location to avoid exposure to further heat from the ongoing welding process needed to complete the weld joint. In one embodiment, if the connecting member has a sufficient length (e.g., connection member 2082 of FIG. 109), the tie-in clamp 2060 with the internal cooling system 2010-1 may be moved such that the tie-in clamp is on one side while the internal cooling system is on the other side of the tie-in weld location (with only the connection member 2082 being disposed directly under or in close proximity in relation to the tie-in weld location). After completion of welding and AUT/X-ray inspection(s) (if required), and further after any coating/insulation/FJC has been applied, the tie-in clamp 2060 with the internal cooling system 2010-1 may be moved into position such that the cooling section 2016 of the internal cooling system is in close proximity with the weld joint and cooling procedures may be performed (e.g., in a manner similar to that previously described in relation to the embodiment of FIGS. 104-107).

In one embodiment, the cooling section of the internal cooling system may be implemented with any sort of cooling structure to rapidly and/or efficiently cool the pipe sections at the newly formed weld joint and therefore is not limited to the example embodiments shown in FIGS. 104-109. For example, in one embodiment, the cooling structure integrated as part of the internal cooling system may include, without limitation, cooling fans (e.g., fans 2122 shown and described below) that force air across internal surface portions of pipe sections and/or across heat exchange fins or other cooling elements of the internal cooling system cooling section, discharging of liquid and/or gaseous fluids (e.g., cryogenic fluids, liquids, air) at suitable pressures and temperatures from the nozzles 2007 or 2318 of the cooling section 2016 or 2316 toward internal surface portions of the pipe sections, utilizing cooling fluids in a closed circuit recirculating loop (e.g., pump 2212, manifold 220, and fin members 2218 as shown in FIGS. 111A and 111*b*) and across heat exchange structure of the cooling section, utilizing thermoelectric cooling (e.g., via Peltier devices in direct contact with internal wall surface portions of the pipe sections), etc.

Figure 110B:
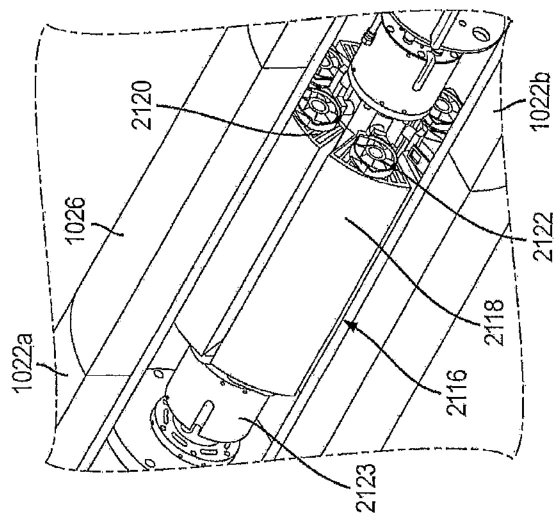
FIGS. 110A and 110B show perspective and partial perspective views, respectively, of the internal cooling system for use in pipeline welding in accordance with another embodiment of the present patent application.
Figure 110A:
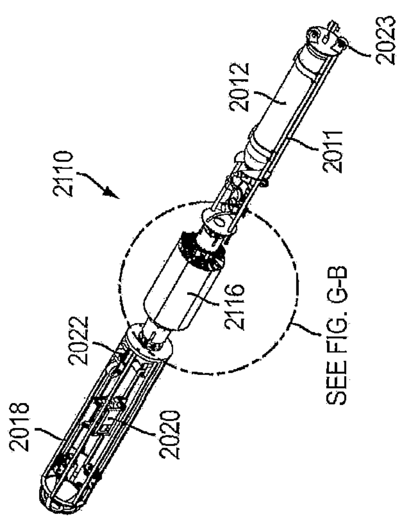

FIGS. 110A and 110B show an internal cooling system 2110 in accordance with another embodiment of the present patent application. The internal cooling system 2110 is similar to the embodiments previously described, except for the differences as will be noted below. In one embodiment, the cooling section 2116 of the internal cooling system 2110 comprises a heat sink including a plurality of fin members 2118 arranged around the periphery of and extending radially outward from a central support member 2120 of the cooling section 2116 and include curved outer surface portions that correspond with the curved internal surface portions of the pipe sections toward which the fins 2118 extend. In one embodiment, each fin member 2118 includes a plurality of thin material sections that extend from a central heat sink location of the cooling section 2116 radially outward toward a curved end wall section of the fin member 2118. In one embodiment, the fin members 2118 are constructed of a material having a suitable thermal conductivity (e.g., copper, aluminum, etc.) to facilitate a high rate of heat transfer from the internal wall surface portions of the pipes sections 1022*a*, 1022*b* to the heat sink of the cooling section 2116. In one embodiment, the fin members 2118 include open channels 2120 defined between neighboring thin material sections, where the open channels 2120 extend in a lengthwise direction through the fin members. In one embodiment, electric fans 2122 may be mounted to the central support member 2123 and located in close proximity with ends of the fin members 2118 and in alignment with the fin channels 2120. In one embodiment, the electric fans 2122 provide a flow of air through the fin channels 2120 to cool the fin members 2118 and thus force heat via convective air currents from the heat sink of the cooling section 2116. In one embodiment, the fans 2122 are in communication (e.g., via a hardwire or wireless communication link) with controller 2020 to facilitate selective operation of the fans 2122 during cooling procedures In one embodiment, each fan 2122 may be implemented with a variable speed of operation so as to selectively control the fan speed and corresponding air flow rate through fin members 2118 differently and as needed during the cooling procedure.

The procedure of the internal cooling system 2110 of FIGS. 110A and 110B is similar to that previously described for the embodiment of FIGS. 104-107 in relation to placement of the internal cooling system during the welding procedure and positioning for cooling after welding procedures have been completed. During cooling, the fans 2122 may be activated to provide a flow of cooling air at one or more desired flow rates through the channels 2120 of the fin members 2118. In one embodiment, the fin members 2118 draw heat from the interior wall surface portions of the pipe sections 1022*a*, 1022*b* (including at the weld joint 1026) toward the central support member 2123 of the cooling section 2116, and forced air currents provided by the fans 2122 remove the heat from the fin members 2118, thus achieving a cooling of the pipe sections 1022*a*, 1022*b* at the location of the cooling section 2116. As described in previous embodiments, temperature sensors of the internal cooling system may provide measured temperature information to the controller 2020, and such measured temperature information may be used to control operation of the fans 2122 (including changing fan speeds of one or more fans 2122) during the cooling procedure. When a desired temperature is reached within the pipe sections 1022*a*, 1022*b*, the fans 2122 may be turned off via the controller 2020. In one embodiment, the internal cooling system 2110 may further be moved to different positions as needed within the pipe sections 1022*a*, 1022*b* to effect cooling at different locations.

Figure 111B:
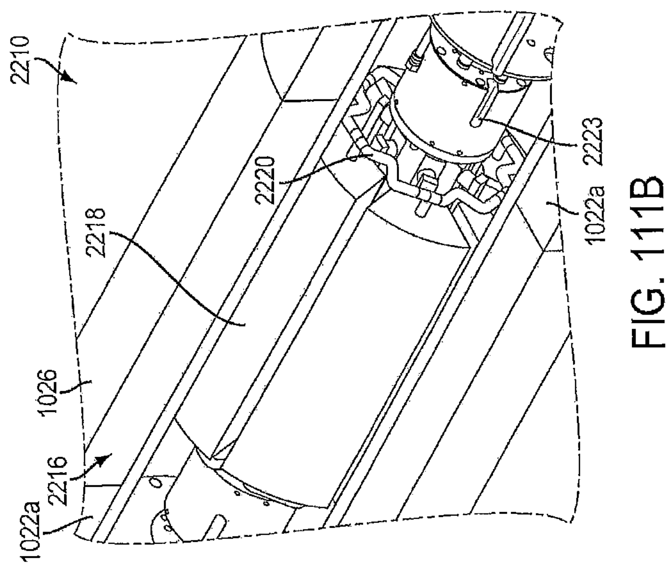
FIGS. 111A and 111B show partial perspective views of portions of the internal cooling system for use in pipeline welding in accordance with another embodiment of the present patent application, in which the portion of the internal heat exchanger is within two pipe segments secured to each other via a weld joint, and a water pump is provided at an end of a portion of a pipe section.
Figure 111A:
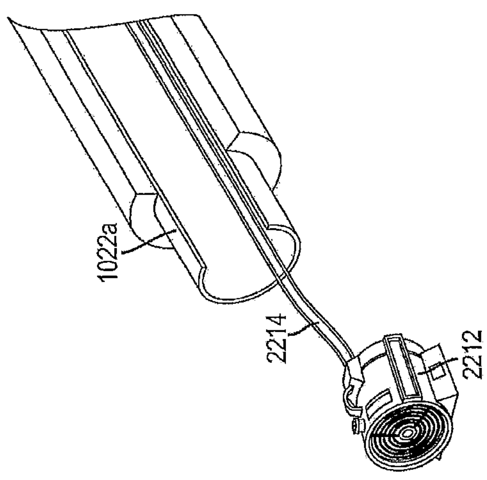

FIGS. 111A and 111B show an internal cooling system 2210 in accordance with another embodiment of the present patent application. The internal cooling system 2210 is similar to the embodiments previously described, except for the differences as will be noted below. In one embodiment, the internal cooling system 2210 includes a cooling section 2216 that includes a series of fin members 2218 arranged along a periphery of and extending radially outward from a central support member 2223 of the cooling section 2216, where the fin members 2218 have a similar exterior shape or profile as the fin members 2118 of the embodiment of FIGS. 110A and 110B. In one embodiment, the fin members 2218 may also be constructed of a material having a suitable thermal conductivity (e.g., aluminum or copper). However, each fin member 2218 may have a hollow and sealed interior to facilitate a flow of coolant fluid through the fin member 2218. In one embodiment, each fin member 2218 includes an inlet at one end and an outlet at another end, and suitable piping structure is provided to facilitate a recirculating flow circuit of a coolant from a pump 2212 to the fin member 2218, where the coolant flows through the fin member 2218 and back to the pump 2212. Any suitable type of coolant (e.g., water, a cryogenic fluid such as liquid nitrogen or liquid argon, etc.) may be utilized.

In one embodiment, the pump 2212 (shown in FIG. 111A) may be positioned externally from the pipe sections 1022*a*, 1022*b*, with supply and return flow conduits 2214 extending between the pump 2212 and a manifold structure 2220 (shown in FIG. 111B). In one embodiment, the manifold structure 2220 includes a plurality of pipe connections that connect with the inlets and outlets of the fin members 2218. Thus, the cooling section 2216 facilitates heat exchange between the circulating flow of coolant within the fin members 2218 and the interior wall surface portions of the pipe sections 1022*a*, 1022*b* (e.g., at or near the weld joint 1026) during the cooling procedures.

In one embodiment, the pump 2212 may be controlled (via a suitable hardwire or wireless communication link) via the controller of internal cooling system 2210. Alternatively, the pump 2212 may be externally controlled (since it is easily user accessible). The coolant flow by the pump 2212 may be controlled based upon measured temperature information provided by one or more temperature sensors at the internal cooling system 2210. Once a desired temperature has been achieved within the pipe sections 1022*a*, 1022*b*, the pump may be de-activated or turned off to cease the recirculating flow of coolant and to facilitate movement of the internal cooling system 2210 within the pipe sections 1022*a*, 1022*b*.

Figure 112B:
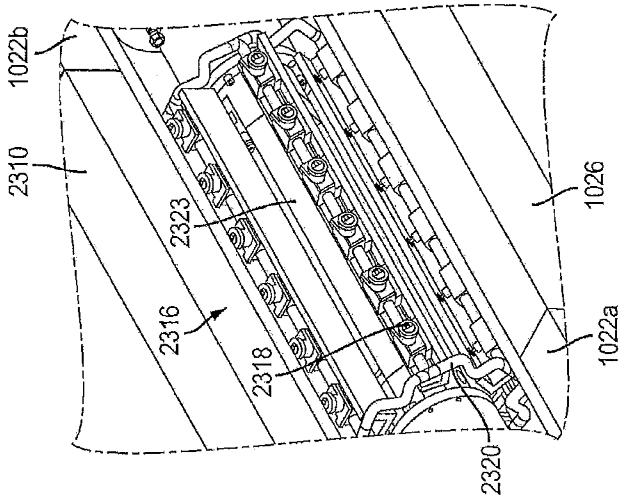
FIGS. 112A and 112B show partial perspective views of portions of the internal cooling system for use in pipeline welding in accordance with another embodiment of the present patent application, in which the portion of the internal heat exchanger is within two pipe segments secured to each other via a weld joint, and a water pump is provided at an end of a portion of a pipe section.
Figure 112A:
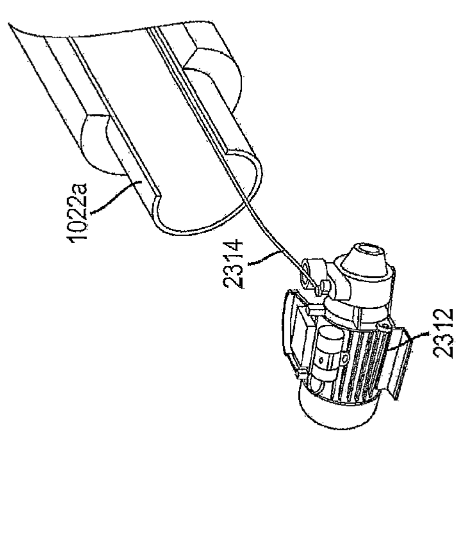

FIGS. 112A and 112B show an internal cooling system 2310 in accordance with another embodiment of the present patent application. The internal cooling system 2310 is similar to the embodiments previously described, except for the differences as will be noted below. In one embodiment, the internal cooling system 2310 includes a cooling section 2316 that has a plurality of spray nozzles 2318 positioned around a central support member 2323 of the cooling section 2316. In one embodiment, the spray nozzles 2318 are positioned in generally linear rows extending lengthwise along the central support member 2323. Suitable piping structure is provided at each end of each linear row of spray nozzles 2318, where the piping structure connects with a manifold 2320. The manifold 2320 connects via a fluid conduit 2314 to a coolant pump 2312 provided externally or outside of the pipe sections. In one embodiment, operation of the coolant pump 2312 provides a flow of coolant (e.g., water, a cryogenic fluid such as liquid nitrogen or liquid argon, etc.) from a coolant source through the manifold 2320 and out of the spray nozzles 2318 and toward the interior surface portions of the pipe sections 1022*a*, 1022*b* (including at the weld joint 1026). While the embodiment of FIGS. 112A and 112B show the pump 2312 located exterior to the pipe sections 1022*a*, 1022*b*, it is noted that the cooling section 2316 with alignment of the spray nozzles 318 may also be readily implemented for the embodiment of FIGS. 104-107 (i.e., where the manifold 2320 and the spray nozzles 2318 receive coolant from coolant source 2012). The cooling procedures of the internal cooling system 2310 may be performed in a similar manner as described for the previous embodiments, where the pump 2312 may be controlled via the controller of the internal cooling system 2310 and/or externally and where coolant flow may be implemented based upon measured temperature information provided by temperature sensors disposed on the internal cooling system 2310.

Thus, the internal cooling system of the present patent application is configured to provide improvements for pipeline welding procedures, including enhancement of cooling of connected pipe sections upon formation of weld joints by providing controlled cooling internally within the pipe sections and reducing production time (since cooling can occur faster and more efficiently, increasing the number of weld joins between pipe sections that can occur in a given time period). Further, the number of work stations associated with welding procedures and also resources associated with such welding procedures can be reduced. For example, the work space required for welding pipe sections together can be reduced, and this can become particularly beneficial in scenarios in which work space is limited (e.g., on barges or other water vessels).

Figure 113:
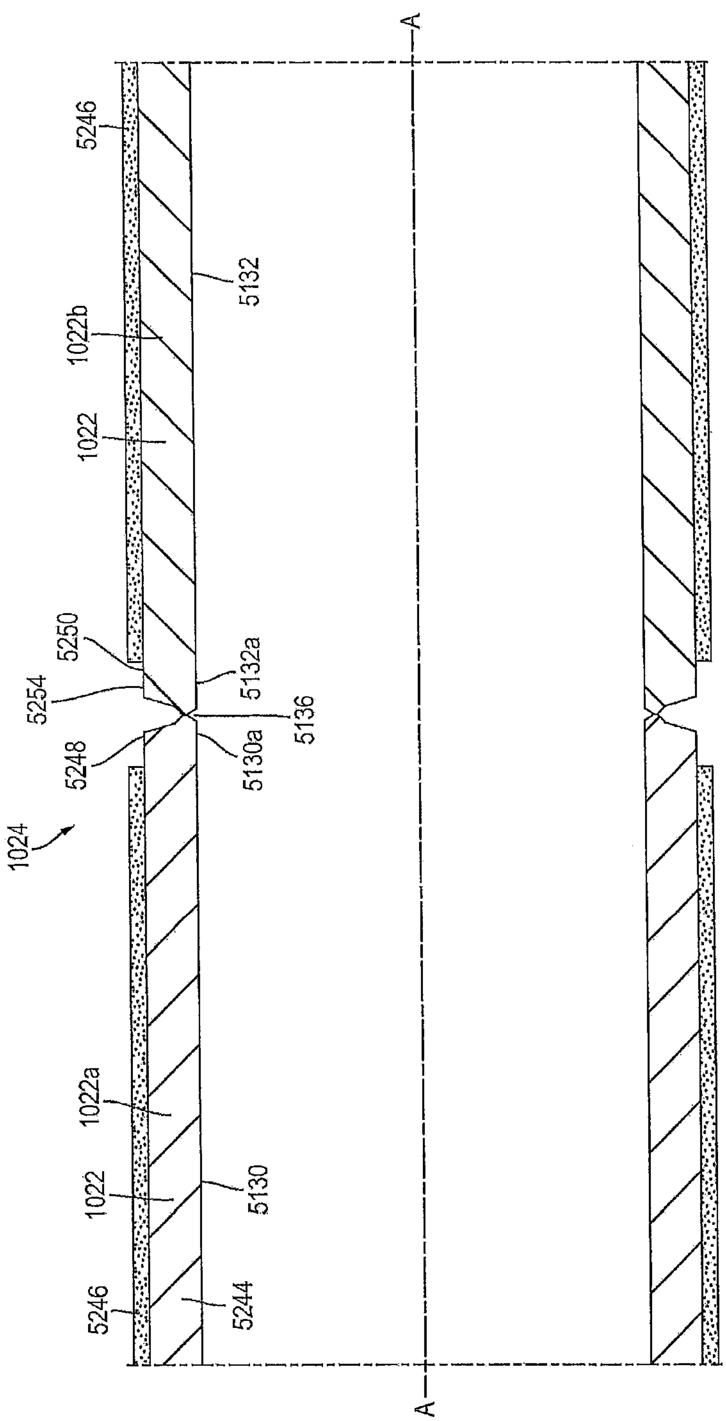
FIG. 113 shows a cross-sectional view of the pipes with their exposed metal pipe ends aligned in accordance with an embodiment of the present patent application.

In one embodiment, a method for welding a pair of insulated pipes (e.g., pipes 1022*a*, 1022*b* as shown in FIG. 113) to one another is provided. As shown in FIG. 113, each pipe 1022*a*, 1022*b* includes the metal pipe interior 5244 surrounded by the insulator material 5246. In one embodiment, the end portions 5248, 5250 of the pipes 1022*a*, 1022*b* to be welded have the metal pipe interior 5244 exposed.

In one embodiment, referring to FIGS. 113-134, the method includes aligning the exposed metal pipe ends 5248, 5250 to be welded, welding the exposed metal pipe ends 5248, 5250 to one another, heating the exposed end portions 5248, 5250 of the welded pipes 1022*a*, 1022*b*, applying an insulator 5246 to the heated exposed end portions 5248, 5250 of the welded pipes such that the insulator 5246A (as shown in FIG. 118) is adhered to the exterior surface 5254 of the metal pipe interior 5244, thus insulating the formerly exposed end portions 5248, 5250 of the pipes 1022*a*, 1022*b*, and applying cooling energy from within the pipes 1022*a*, 1022*b* to an interior surface 5130*a*, 5130*b* of the metal pipes 1022*a*, 1022*b*.

In one embodiment, the applying cooling energy from within the pipes to the interior surface of the metal pipes is performed after applying the insulator. In one embodiment, the method also includes performing a pipeline deployment procedure. In one embodiment, applying the cooling energy reduces a wait time between applying the insulator and performing the pipeline deployment procedure. In one embodiment, the pipeline deployment procedure is a spooling procedure. In one embodiment, the pipeline deployment procedure is a S-lay procedure. In one embodiment, the pipeline development procedure is a pipeline lowering procedure. In one embodiment, the pipe deployment procedure is described with respect to FIG. 1B of the present patent application.

In one embodiment, the cradles 5330 (as shown in FIGS. 10A and 10B) or cradles 6010A and 6010B (as shown in FIG. 73) are used for carrying and moving the pipes 1022*a* and 1022*b* and for providing the exposed metal pipe end

5248 of the incoming pipe 1022*a* at the exposed metal pipe end 5250 of the pipe 1022*b*. That is, the cradles 5330 or 6010A/6010B are used to align of the exposed metal pipe ends 5248, 5250 to be welded.

In one embodiment, the alignment of the exposed metal pipe ends 5248, 5250 to be welded may be automatically performed by the one or more processors 5140 controlling the cradles 5330 (or 6010A or 6010B), may be performed by hydraulically controlling cradles 5330 (or 6010A or 6010B), or may be performed by an operator using a crane and a clamp (internal or external) arrangement. In one embodiment, after the alignment of the pipes 1022*a*, 1022*b*, the pipes 1022*a*, 1022*b* may be clamped using the external clamps 5302 (as shown in FIGS. 7A and 7B) and/or internal clamps 5142 or 5144. In one embodiment, as described in this application, one or more external or internal clamps may be used during the alignment of the exposed metal pipe ends 5248, 5250 (to be welded). That is, the one or more external or internal clamps may be used independently and/or in combination with the cradles. In one embodiment, the operation of the one or more external or internal clamps and the cradles may be controlled by the one or more processors 5140.

In one embodiment, the one or more processors 5140 are configured to operate the cradles 5330 (or 6010A and 6010B) to adjust the relative positioning of the pipes 1022*a*, 1022*b* based on the pre-weld profile data. In one embodiment, the pre-weld profile data may be obtained for one or more inspection detectors that are operatively connected to the one or more processors 5140. In one embodiment, the adjustment of the relative positioning of the pipes 1022*a*, 1022*b* (based on the pre-weld profile data) may include an adjustment along the longitudinal axis of the pipes 1022*a*, 1022*b*, and/or an adjustment along the radial axis of the pipes 1022*a*, 1022*b*. In one embodiment, after the adjustment of the pipes 1022*a*, 1022*b*, the pipes 1022*a*, 1022*b* are clamped back using the external and/or internal clamps. FIG. 113 shows the pipes 1022*a*, 1022*b* with their exposed metal pipe ends 5248, 5250 correctly aligned and ready for the welding procedure.

Figure 114:
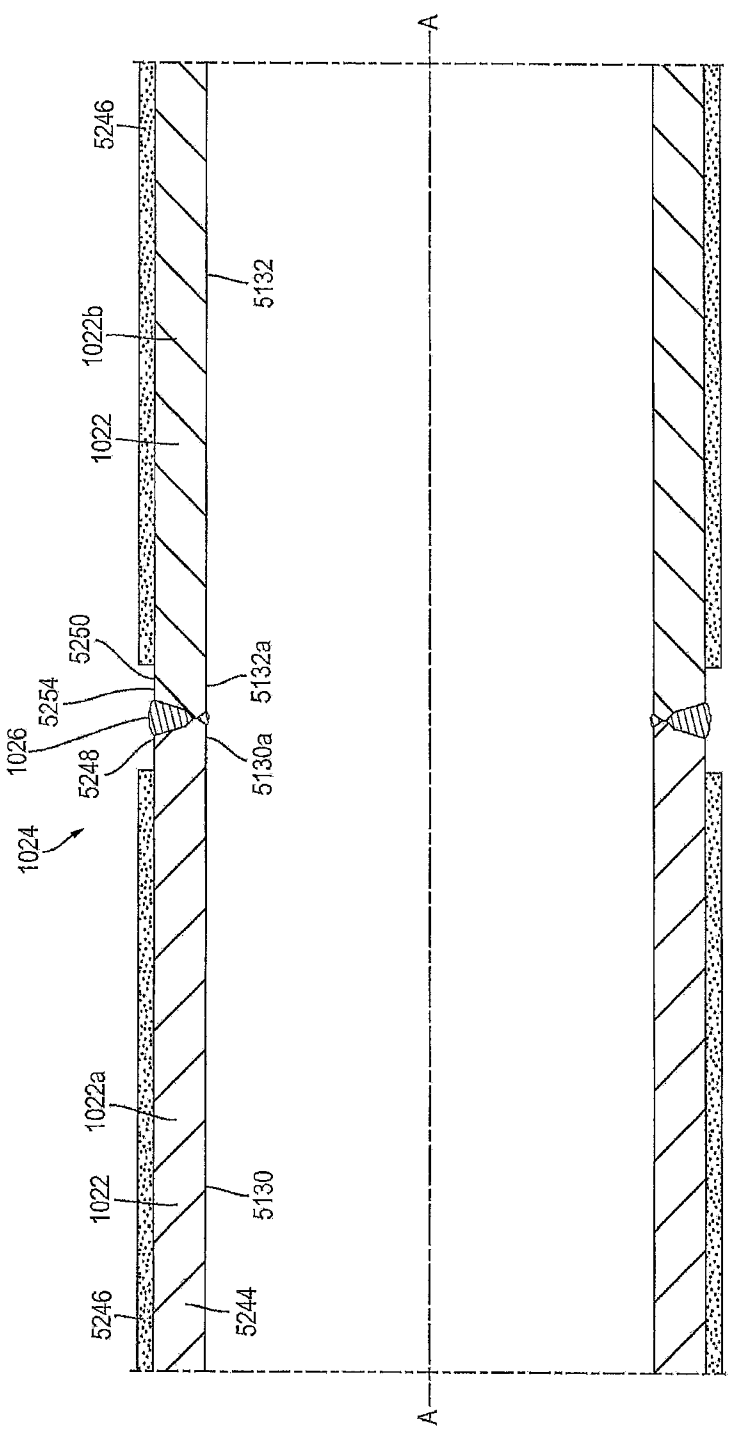
FIG. 114 shows a cross-sectional view of the pipes with the weld joint formed between their exposed metal pipe ends in accordance with an embodiment of the present patent application.

FIG. 114 shows the pipes 1022*a*, 1022*b* with the weld joint 1026 formed between their exposed metal pipe ends 5248, 5250. In one embodiment, an internally positioned (e.g., inside the pipes 1022*a*, 1022*b*) weld torch 5502 may be configured to weld the exposed metal pipe ends 5248, 5250 to one another. In one embodiment, an externally positioned (e.g., outside/external the pipes 1022*a*, 1022*b*) weld torch 7502 may be configured to weld the exposed metal pipe ends 5248, 5250 to one another. In one embodiment, a combination of the internally positioned weld torch 5502 and externally positioned weld torch 7502 may be used to weld the exposed metal pipe ends 5248, 5250 to one another. In one embodiment, the externally positioned weld torch 7502 and/or the internally positioned weld torch 5502 are operatively connected to the one or more processors 5140.

In one embodiment, referring to FIGS. 115A and 115B, a heater 5304 may be configured to heat the exposed end portions 5248, 5250 of the welded pipes 1022*a*, 1022*b*. In one embodiment, the heater 5304 may be an induction heating system used to heat the exposed end portions 5248, 5250 of the welded pipes 1022*a*, 1022*b* of the pipeline 1024 in preparation for application of the coating material(s) or the insulator. In one embodiment, the heater 5304 may include Ultra high frequency (UHF) induction coils that are configured to rapidly heat the exposed end portions 5248, 5250 of the welded pipes 1022*a*, 1022*b* of the pipeline 1024 up to the required coating temperature. In one embodiment, the heater 5304 may use two induction coils. In one embodiment, the heater 5304 may be an electrical heating system. In one embodiment, the heater 5304 may be a radiant heating system. In one embodiment, induction coils 5307 of the heater 5304 are shown in FIG. 115A.

As shown in FIGS. 115A and 115B, the heater 5304 is configured to circumferentially surround the exposed end portions 5248, 5250 of the welded pipes 1022*a*, 1022*b* of the pipeline 1024. In one embodiment, the heater 5304 may include two half round, annular heater members 5304*a* and 5304*b*. In one embodiment, the two half round, annular heater members 5304*a* and 5304*b* are pivotally connected to each other by a joint 5305 at the top and are releasably connected to each other via one or more connector members (not shown) at the bottom.

In one embodiment, the heater 5304 is also configured to regulate the temperature of the exposed end portions 5248, 5250 of the welded pipes 1022*a*, 1022*b* of the pipeline 1024 to maintain a suitable coating application temperature. In one embodiment, the heater 5304 may also include a heater feedback system configured to enable the heater 5304 achieve and maintain the required coating temperature and a temperature sensor operatively coupled to the heater feedback system. In one embodiment, the temperature sensor may be a contact or a non-contact temperature sensor. In one embodiment, the heater feedback system may include other sensors that are configured to sense other parameters of the heating procedure, for example, heating time, etc. In one embodiment, through the feedback signals from the one or more sensors, the heater feedback system is configured to regulate the current in the inductor coils to achieve the required coating temperature. In one embodiment, the heater 5304 and its feedback system may be operatively connected to the one or more processors 5140. In one embodiment, the one or more processors 5140 may be configured to control the operation of the heater 5304 and its feedback system.

In one embodiment, referring to FIGS. 116A, 116B, 117A and 117B, an insulator supply 5306 configured to apply insulator material 5312 to the heated exposed end portions 5248, 5250 of the welded pipes 1022*a*, 1022*b* such that the insulator 5246A (as shown in FIG. 118) is adhered to the exterior surface 5254 of the metal pipe interior 5244, thus insulating the formerly exposed end portions 5248, 5250 of the welded pipes 1022*a*, 1022*b*. In one embodiment, the insulator supply 5306 comprising a container 5310 configured to contain the insulator material 5312 and an output nozzle 5308 configured to spray the insulator material 5312 onto the exposed end portions 5248, 5250 of the welded pipes 1022*a*, 1022*b*. In one embodiment, the container 5310 configured to contain the insulator material 5312 may be pressurized.

In one embodiment, the insulator supply 5306 may include a feedback system configured to enable the insulator supply 5306 to achieve the desired coatings on the pipeline 1024 and one or more sensors operatively connected to the feedback system. In one embodiment, the one or more sensors may be configured to sense the following parameters of the insulator application procedure—insulator material temperature, insulator material volume, etc.

Figure 116A:
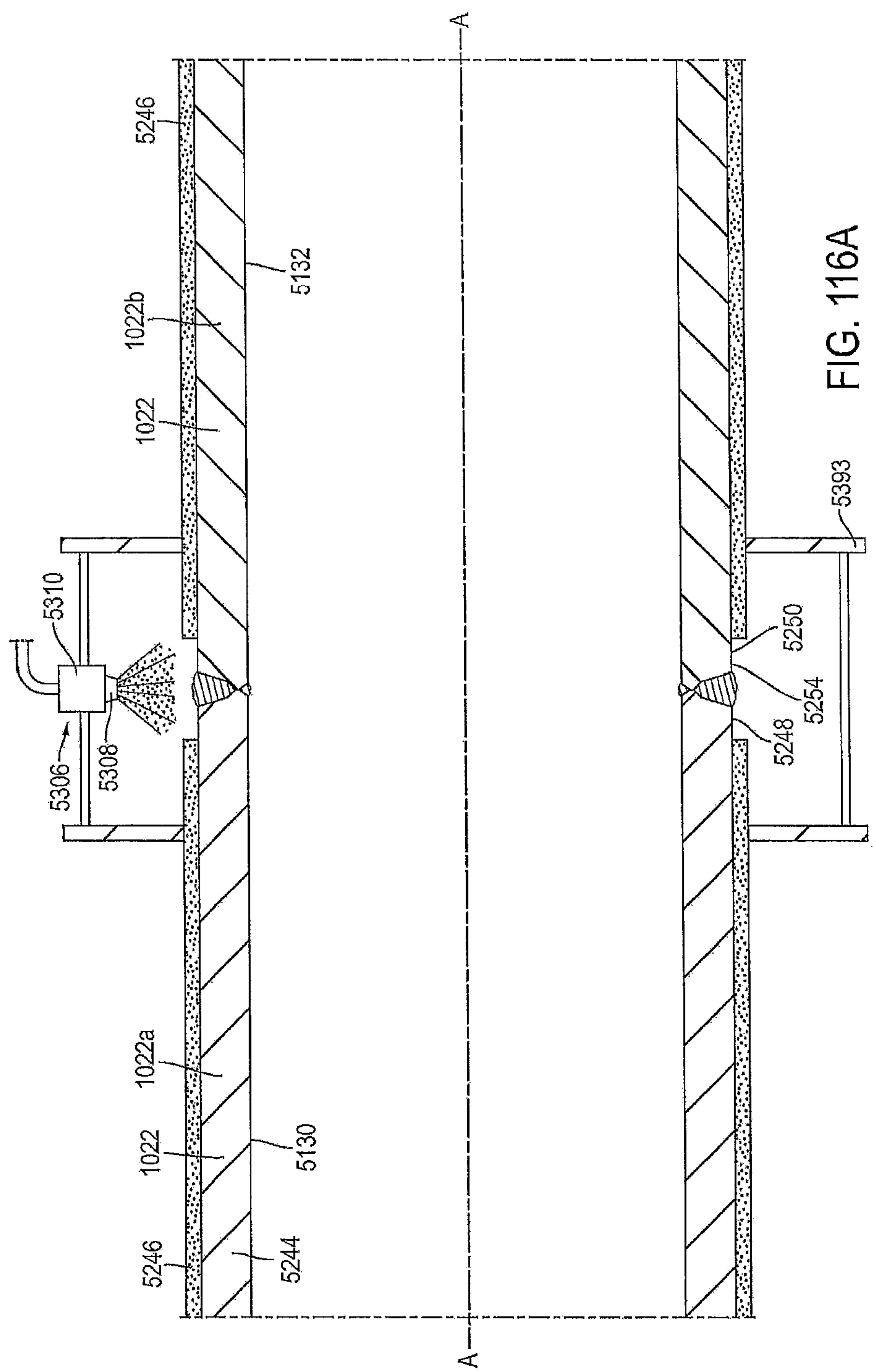
FIGS. 116A and 116B show a cross-sectional view and a perspective view of the pipes with the weld joint formed between their exposed metal pipe ends and an insulator supply positioned on the pipes to apply an insulator material to the heated the exposed end portions of the welded pipes, respectively in accordance with an embodiment of the present patent application.
Figure 116B:
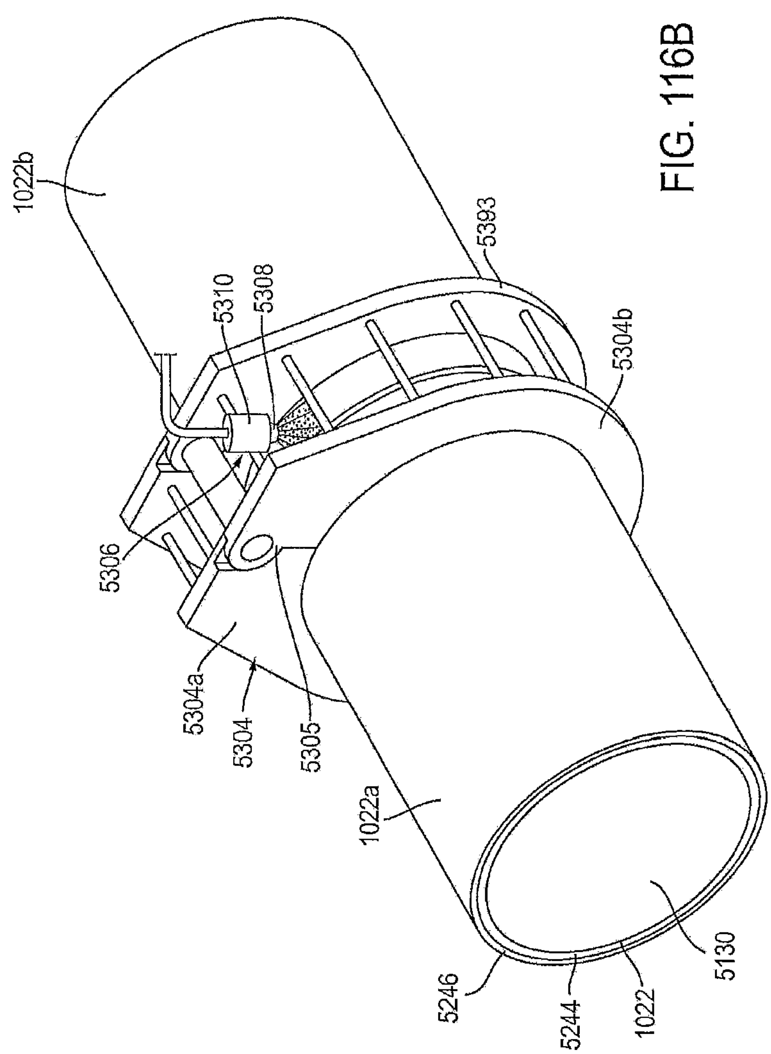

In one embodiment, referring to FIGS. 116A and 116B, the insulator supply 5306 is an automated system and includes a coating frame 5393 that is configured to be positioned on the weld joint 1026 area. In one embodiment, the coating frame 5393 of the insulator supply 5306 is configured to be pre-programmed to rotate around the weld joint 1026 area so as to achieve the desired dry film thickness of the insulator material. That is, the coating frame 5393 is constructed and arranged to move evenly around the weld joint 1026 area. In one embodiment, the spray head (including the container 5310 and the output nozzle 5308) is mounted on the coating frame 5393 in a specific position (e.g., perpendicular to the heated exposed end portions 5248, 5250 of the welded pipes 1022*a*, 1022*b*).

In one embodiment, the insulator supply 5306, shown in FIGS. 116A and 116B, is configured to apply Fusion Bonded Epoxy insulator material to the heated exposed end portions 5248, 5250 of the welded pipes 1022*a*, 1022*b* such that the Fusion Bonded Epoxy insulator 5246A (as shown in FIG. 118) is adhered to the exterior surface 5254 of the metal pipe interior 5244, thus insulating the formerly exposed end portions 5248, 5250 of the welded pipes 1022*a*, 1022*b*.

Figure 117A:
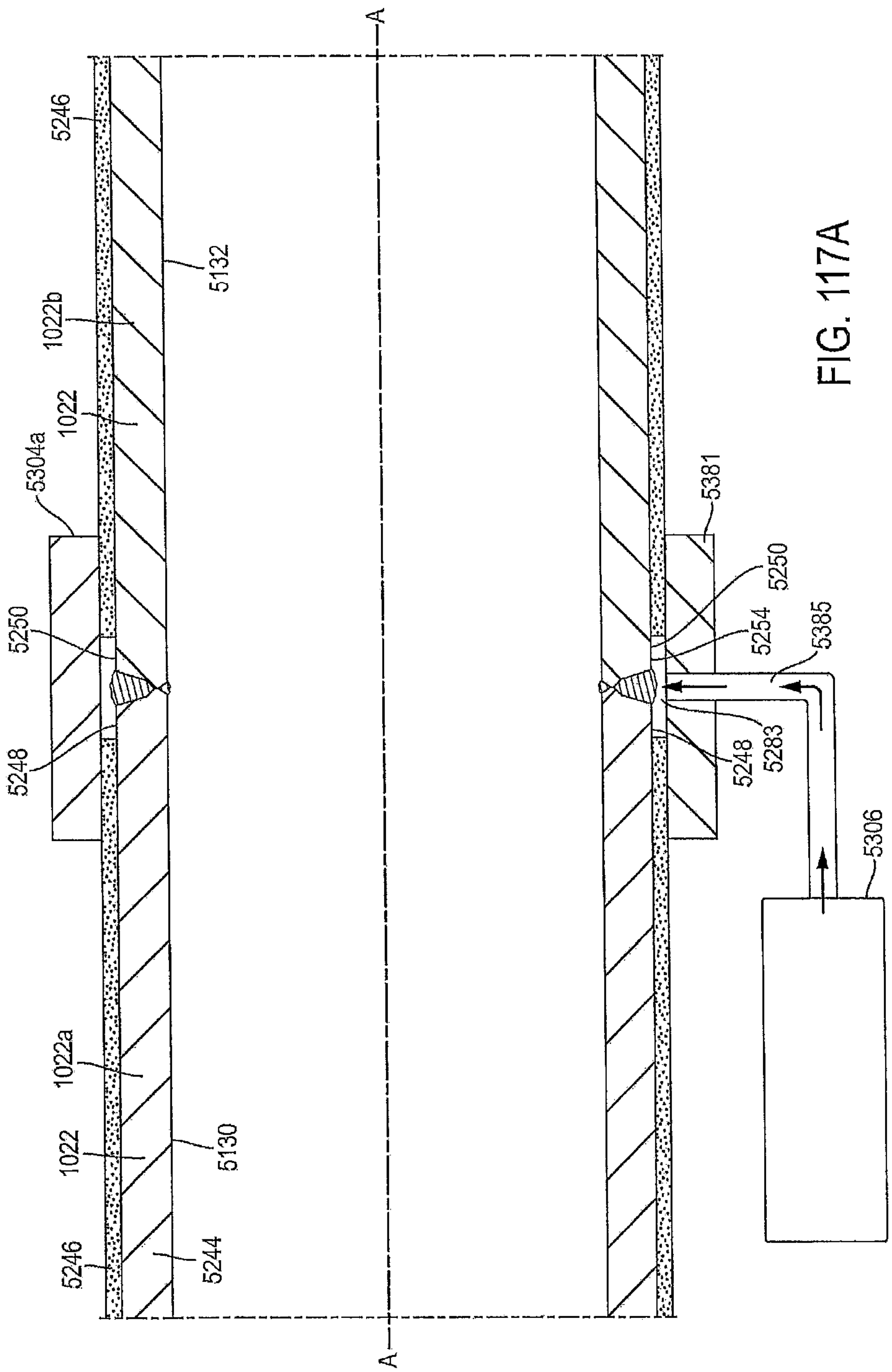
FIGS. 117A and 117B show a cross-sectional view and a perspective view of the pipes with the weld joint formed between their exposed metal pipe ends and an insulator supply positioned on the pipes to apply an insulator material to the heated exposed end portions of the welded pipes in accordance with an embodiment of the present patent application.
Figure 117B:
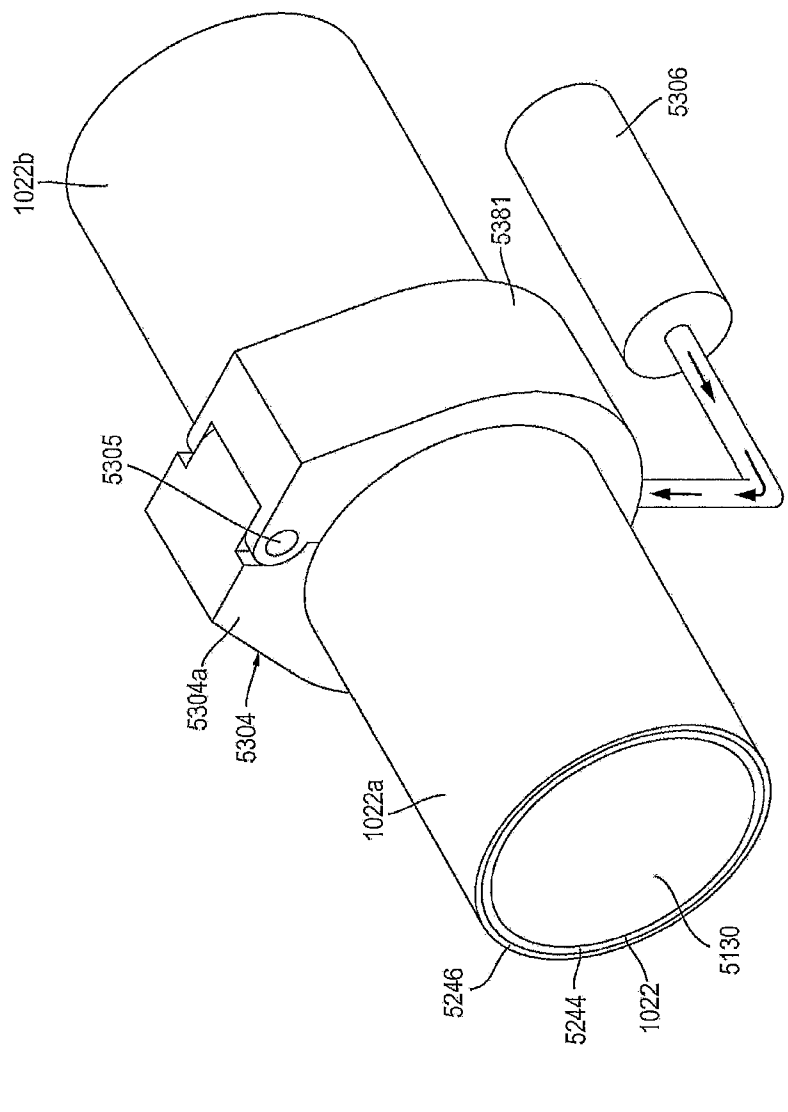

In one embodiment, the insulator supply 5306, shown in FIGS. 117A and 117B, is configured to apply Injection Molded Polypropylene insulator material to the heated exposed end portions 5248, 5250 of the welded pipes 1022*a*, 1022*b* such that the Injection Molded Polypropylene insulator 5246 is adhered to the exterior surface 5254 of the metal pipe interior 5244. In one embodiment, the insulator supply 5306 of FIGS. 117A and 117B may be used to apply Injection Molded Polyurethane insulator material to the heated exposed end portions 5248, 5250 of the welded pipes 1022*a*, 1022*b* such that the Injection Molded Polyurethane insulator 5246 is adhered to the exterior surface 5254 of the metal pipe interior 5244.

Referring to FIGS. 117A and 117B, in one embodiment, the insulator supply 5306 is an automated system and includes a mold 5381 that configured to circumferentially surround the welded joint 1026 area and to create an annular gap 5383 for the injection molded insulator material 5246 to fill. In one embodiment, a hydraulically operated valve (not shown) is configured to supply/inject the molten insulator material 5385 into the annular gap 5383. The supplied/injected molten insulator material 5385 enters the mold 5381 (and the annular gap 5383) encasing the welded joint 1026 area and forming the inner/inside profile of the mold 5381. In one embodiment, chilled water may be supplied to the mold to cool the outer profile of the insulator material such that the Injection Molded Polyurethane insulator 5246 is adhered to the exterior surface 5254 of the metal pipe interior 5244, thus insulating the formerly exposed end portions 5248, 5250 of the welded pipes 1022*a*, 1022*b*.

In one embodiment, the insulator supply 5306 shown and described above with respect to FIGS. 116A and 116B may be used for onshore pipeline applications. In one embodiment, the insulator supply 5306 shown and described above with respect to FIGS. 117A and/or 117B may be used for offshore pipeline applications.

In one embodiment, the insulator supply 5306 shown and described above with respect to FIGS. 116A, 116B, 117A and/or 117B may also be used to apply other insulator materials, described elsewhere in this application, and/or other insulated materials as would be appreciated by one skilled in the art to the heated exposed end portions 5248, 5250 of the welded pipes 1022*a*, 1022*b*.

In one embodiment, the insulator supply 5306 and its corresponding feedback system may be operatively connected to the one or more processors 5140. In one embodiment, the one or more processors 5140 may be configured to control the operation of the insulator supply 5306 and its corresponding feedback system.

In one embodiment, FIG. 118 shows the pipeline 1024 in which the insulator material is applied to the heated exposed end portions 5248, 5250 of the welded pipes 1022*a*, 1022*b* such that the insulator 5246A is adhered to the exterior surface 5254 of the metal pipe interior 5244, thus, insulating the formerly exposed end portions of the pipes 1022*a*, 1022*b*.

Figure 119:
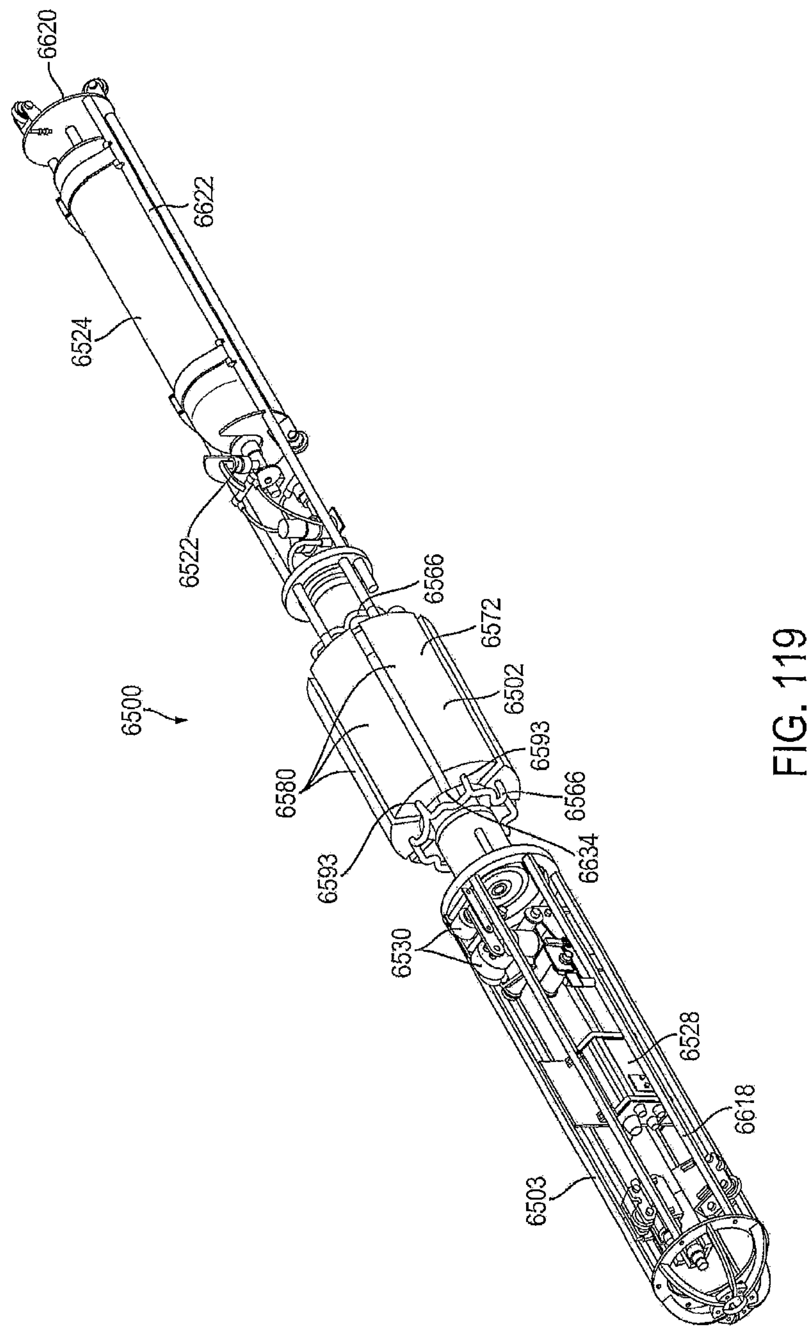
FIG. 119 shows a perspective view of a cooler system configured to apply cooling energy to an interior surface of the pipes to facilitate cooling of the pipes after the insulator material is applied in accordance with an embodiment of the present patent application.
Figure 120:
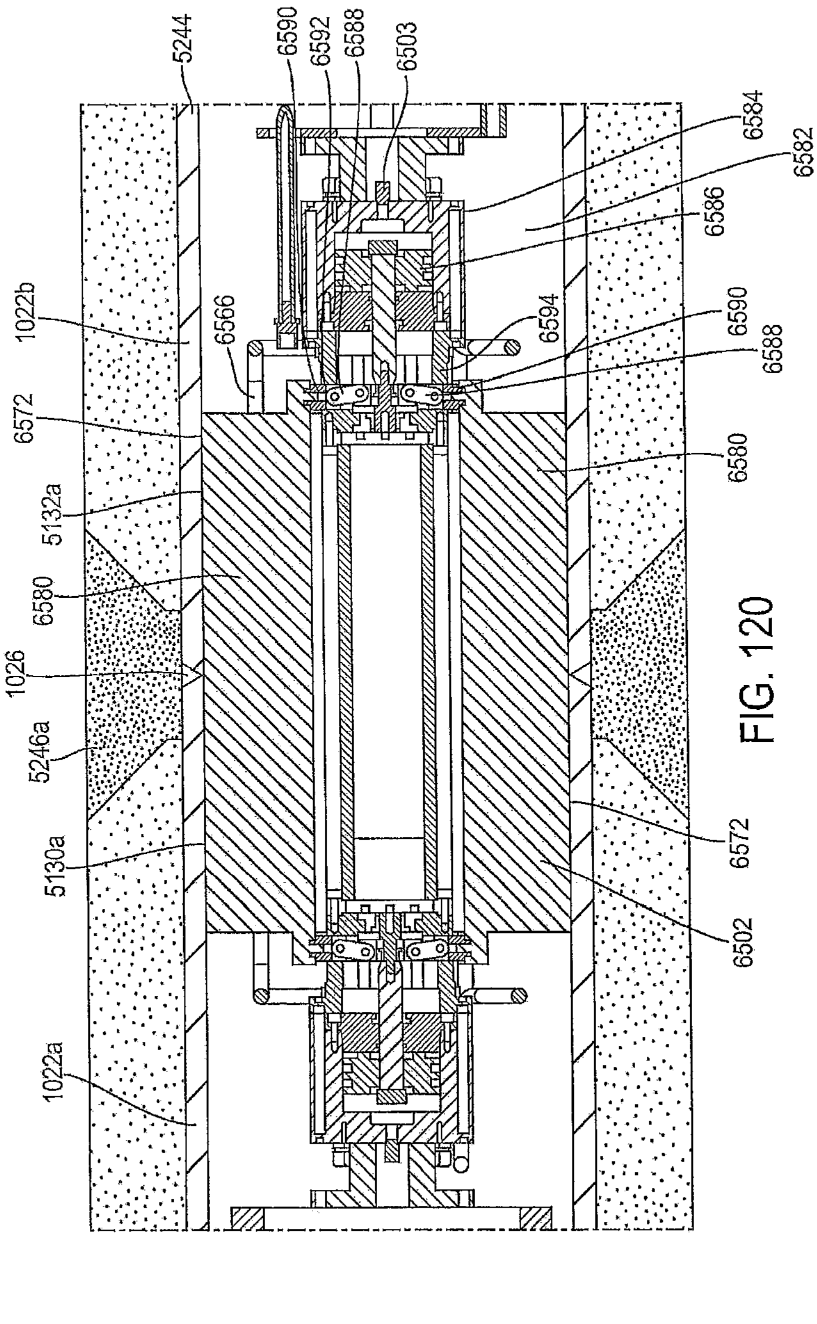
FIG. 120 shows a partial, cross-sectional view of the cooler system being positioned within the pipes in accordance with an embodiment of the present patent application.

In one embodiment, referring to FIGS. 119 and 120, a cooler system 6500 is configured to be positioned within the pipes 1022*a*, 1022*b*. In one embodiment, the cooler system 6500 includes a frame, a plurality of rollers 6530, a drive motor 6532, and a brake system. In one embodiment, a forward-most frame 6618, a center frame 6634, and a rear frame 6522 of the cooler system 6500 may be together referred to as the frame of the cooler system 6500.

For example, the frame is configured to be placed within welded pipes 1022*a*, 1022*b*, the plurality of rollers 6530 is configured to rotatably support the frame, the drive motor 6532 drives the rollers 6530 to move the frame within the pipes 1022*a*, 1022*b*, and the brake system secures the frame from movement at a desired location within the pipes 1022*a*, 1022*b*. The structure, configuration and operation of the plurality of rollers, the drive motor, and the brake system of the cooler system 6500 are similar to the plurality of rollers, the drive motor, and the brake system of the internal weld systems described in this application, and therefore they will not be described in detail here. For example, in one embodiment, the brake system of the cooler system 6500 may include one or more clamps that clamp circumferentially spaced locations on the interior surface 5130, 5132 of the welded pipes 1022*a*, 1022*b*. In another embodiment, the brake system of the cooler system 6500 may include a wheel lock that prevents rotation of the rollers 6530.

In one embodiment, the cooler system 6500 includes a cooler carried by the frame and applies cooling energy to the interior surface 5130*a*, 5132*a* of the metal pipes 1022*a*, 1022*b* to facilitate cooling of the welded metal pipes 1022*a*, 1022*b*. In one embodiment, the cooler includes a heat exchanger 6502 that carries cooling fluid therein and has a pipe contacting surface 6572 that contacts the interior surface 5130*a*, 5132*a* of the pipe 1022*a*, 1022*b* to facilitate cooling of the welded pipes 1022*a*, 1022*b*. In one embodiment, the cooler system 6500 includes a heat exchanger motor 6552 configured to move the heat exchanger 6502 radially outwardly so that the pipe contacting surface 6572 can be moved outwardly to engage the interior surface 5130*a*, 5132*a* of the welded pipes 1022*a*, 1022*b* after the frame is positioned at the desired location within the pipes 1022*a*, 1022*b*.

In one embodiment, the cooler system 6500 includes one or more processors that are operatively connected with the drive motor 6532, the brake system and the cooler 6502. In one embodiment, the one or more processors are configured to operate the cooler 6502 to reduce the temperature of the welded pipes 1022*a*, 1022*b* to a predetermined level. For example in one embodiment, the cooler system includes one or more temperature sensors 2017*a* that are operatively communicated (wired or wirelessly) with the one or more processors to determine a temperature of the pipes. In one embodiment, cooling power can be continued until a predetermined threshold temperature is detected.

In one embodiment, the one or more processors are communicatively connected to the brake system, the drive motor 6532 or the cooler 6502 via one or more wired or wireless connections. Wireless connections may comprise, for example, a Wi-Fi connection, a Bluetooth connection, an NFC connection, a cellular connection, or other wireless connection.

In one embodiment, the one or more processors, which receive pipe temperature information from the temperature sensor 2017*a*, are communicatively connected to a remote computer system and configured to transmit pipe cooling data to the remote computer system. In one embodiment, the cooling data transmitted by the one or more processors includes cooling time curve information. In one embodiment, the cooling time curve information includes change of pipe temperature over time. In one embodiment, the remote computer system contains cooling data from other weld systems, and calculates expected time until the temperature of the welded pipes is below a threshold. In one embodiment, the expected time is sent to the one or more processors.

In one embodiment, the cooler system 6500 may include a user interface, and wherein the expected time and/or pipe temperature is sent to the user interface by the one or more processors. The user interface can be a computer, for example, having a display.

In one embodiment, the expected time for the pipe (at least the portion of the pipe at issue) being cooled to a certain threshold temperature is calculated, at least in part, based on the size (for example, the circumference, thickness, thermal mass, or any combination thereof) of the welded pipe. In another embodiment, the calculation is further based upon a cooling energy output of the cooler. For example, this cooling energy output may be based on the volume of water or gas being directed at the pipe surface, the starting temperature of the pipe or gas, etc. As another example, cooling energy for a closed fluid system heat exchanger may be known in advance, or calculated based upon its operating parameters (fluid speed, fluid temperature, thermal transfer efficiency, etc.).

In another embodiment, the cooling energy output of the cooling system, and/or expected cooling time, is based upon information received from the remote cloud based computer system which contains a large central data base of information obtained from several remotely operated cooler systems. In one embodiment, the cooling energy output is predetermined. In one embodiment, the one or more processors are communicatively connected to a remote computer system and configured to transmit coolant consumption data (e.g., the amount of water used to cool the pipe of a known size needed to reach the threshold temperature.

In one embodiment, the cooler system 6500 may be entirely untethered. Specifically, the cooler system 6500 need not include the reach rod or the umbilical and all the communications to and from the cooler system 6500 are entirely wireless. In one embodiment, the cooler system 6500 may include a transmitter that is configured to transmit all the communication signals entirely wirelessly from the cooler system 6500 to the remote uLog processing system and a receiver that is configured to receive all the communication signals entirely wirelessly from the remote uLog processing system. In one embodiment, the one or more processors and/or all the electronic modules of cooler system 6500 are configured to communicate entirely wirelessly with the remote uLog processing system. In one embodiment, all the sensors, all the motors, all the valves and/or other components/elements of the cooler system 6500 are configured to communicate entirely wirelessly with the remote uLog processing system.

In one embodiment, any information from the cooler system 6500 can be communicated wirelessly with systems outside the pipe by WiFi, Bluetooth, NFC, by radio frequency, or through cell tower transmissions, just for example. In some embodiments where appropriate, the information is communicated by use of repeaters or extenders, where the transmission signal is to travel long distances or through curved areas.

In one embodiment, the one or more processors and one or more sensors of the cooler system 6500 are configured to monitor the charge levels of the on-board cooling power supply, on-board locomotion power supply, and other on-board power supplies. For example, the voltage output by these power supplies may be (continuously or at regular intervals) monitored. In one embodiment, the transmitter of the cooler system 6500 transmits the monitored battery life/charge level information entirely wirelessly to the remote uLog processing system for further processing. For example, the monitored charge level information of the on-board power supplies may be used to determine an estimated remaining operating time of the cooler system 6500. In one embodiment, the one or processors of the cooler system 6500 may be configured to determine the estimated remaining operating time of the cooler system 6500 locally on the cooler system 6500. In one embodiment, the remote uLog processing system may be configured to determine the estimated remaining operating time of the cooler system 6500 based on the wirelessly transmitted battery life/charge level information. In one embodiment, the remote uLog processing system may be configured to transmit the estimated remaining operating time of the cooler system 6500 to the one or more processors of the cooler system 6500. In one embodiment, the remote uLog processing system may also be configured to transmit (entirely wirelessly to the cooler system 6500) further instructions about the operation of the cooler system 6500 based on the estimated remaining operating time of the cooler system 6500.

In one embodiment, the one or more processors and one or more sensors of the cooler system 6500 are configured to monitor the levels of the on-board coolant supply/tank. For example, the pressure and/volume of the coolant supply tanks may be (continuously or at regular intervals) monitored. In one embodiment, the transmitter of the cooler system 6500 transmits the monitored coolant consumption data entirely wirelessly to the remote uLog processing system for further processing.

For example, the monitored coolant consumption data may be used to determine an estimated remaining operating time of the cooler system 6500 before the coolant refill/recharge. In one embodiment, the one or processors of the cooler system 6500 may be configured to determine the estimated remaining operating time of the cooler system 6500 (e.g., before the coolant recharge) locally on the cooler system 6500. In one embodiment, the remote uLog processing system may be configured to determine the estimated remaining operating time of the cooler system 6500 (e.g., before the next coolant recharge) based on the wirelessly transmitted coolant consumption data. In one embodiment, the remote uLog processing system may be configured to transmit the estimated remaining operating time of the cooler system 6500 (e.g., before the coolant recharge) to the one or more processors of the cooler system 6500. In one embodiment, the remote uLog processing system may also be configured to transmit (entirely wirelessly to the cooler system 6500) further instructions about the operation of the cooler system 6500 based on the estimated operating time of the cooler system 6500 (e.g., before the coolant recharge).

In one embodiment, the remote uLog processing system receives battery charge data from numerous cooler systems at different locations (for example, different locations across a country or across the globe) and establishes a data base thereon. That database is used by the uLog processing system to determine, based on a large data set, expected battery life times based on different operating parameters of the cooler system. This can used by the uLog and/or by one or more processors of the cooler system 6500 to anticipate battery life times for various components based upon present operating conditions of those components. This information can be used by the one or more processors to reduce or regulate power consumption of one or more components by modifying one or more operating parameters. For example, cooling rate, voltage, and/or current can all be regulated (e.g., lowered) to conserve battery life if the one or more processors determine that such operating conditions can be modified without adversely affecting the associated operation being performed.

In one embodiment, the battery life, voltage output, coolant levels and any of the operating parameters are sent wirelessly to a user interface, such as a computer monitor having computer display, so that they can be monitored by a user.

In one embodiment, like the cooler system 6500, all other cooler systems (e.g., 2010, 2110, 2210, 2310) described in the application are configured to communicate wireless with the remote uLog processing system.

In one embodiment, referring to FIG. 120, the cooler system 6500 is configured to apply cooling energy to the interior surface 5130*a*, 5132*a* of the metal pipes 1022*a*, 1022*b* to facilitate cooling of the metal pipes 1022*a*, 1022*b* after the insulator material 5312 is applied. In one embodiment, the cooler system 6500 comprises a heat exchanger or cooler 6502 configured to carry a movable fluid therethrough. That is, the cooling energy is applied by the moveable fluid disposed within the heat exchanger 6502. In one embodiment, the movable fluid may be a gas or liquid.

Figure 125:
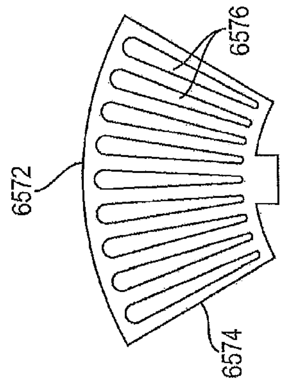
FIGS. 124 and 125 show a perspective view and a front view of a heat exchanger element or a fin member of the cooler system in accordance with another embodiment of the present patent application.
Figure 124:
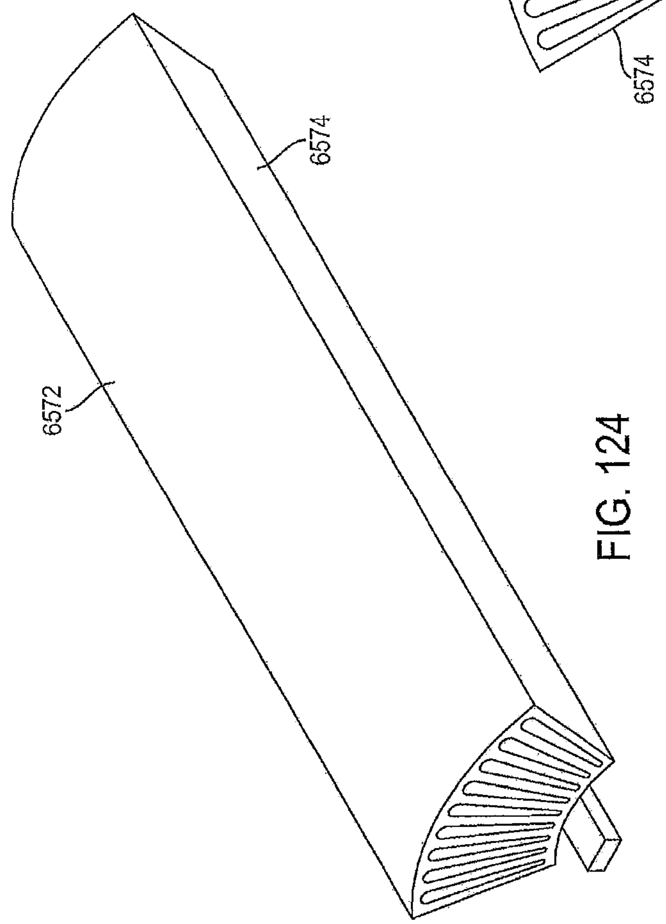

For example, in one embodiment, as shown in FIGS. 119-122, the heat exchanger 6502 may have liquid passage lines 6593 therein that carry the movable liquid therethrough and the cooling energy is applied by the moveable liquid disposed within the fluid passage lines 6593 of the heat exchanger 6502. In one embodiment, as shown in FIGS. 124-125, the heat exchanger 6502 may have air channels 6576 therein that carry the moveable air therethrough and the cooling energy is applied by the moveable air disposed within the air channels 6576 of the heat exchanger 6502.

In one embodiment, a contact surface 6572 of the heat exchanger 6502 is configured to be positioned in contact with the interior surface 5130*a*, 5132*a* of the welded pipes 1022*a*, 1022*b* to remove heat from the welded pipes 1022*a*, 1022*b*.

In one embodiment, the contact surface 6572 of the heat exchanger 6502 may be a conformable, thermally conductive surface. For example, in one embodiment, the contact surface 6572 of the heat exchanger 6502 is constructed and shaped to conform closely to the interior surfaces of the welded pipes 1022*a*, 1022*b* to remove heat from the welded pipes 1022*a*, 1022*b*. In one embodiment, the contact surface 6572 of the heat exchanger 6502 is constructed and arranged to be thermally conductive.

Figure 123:
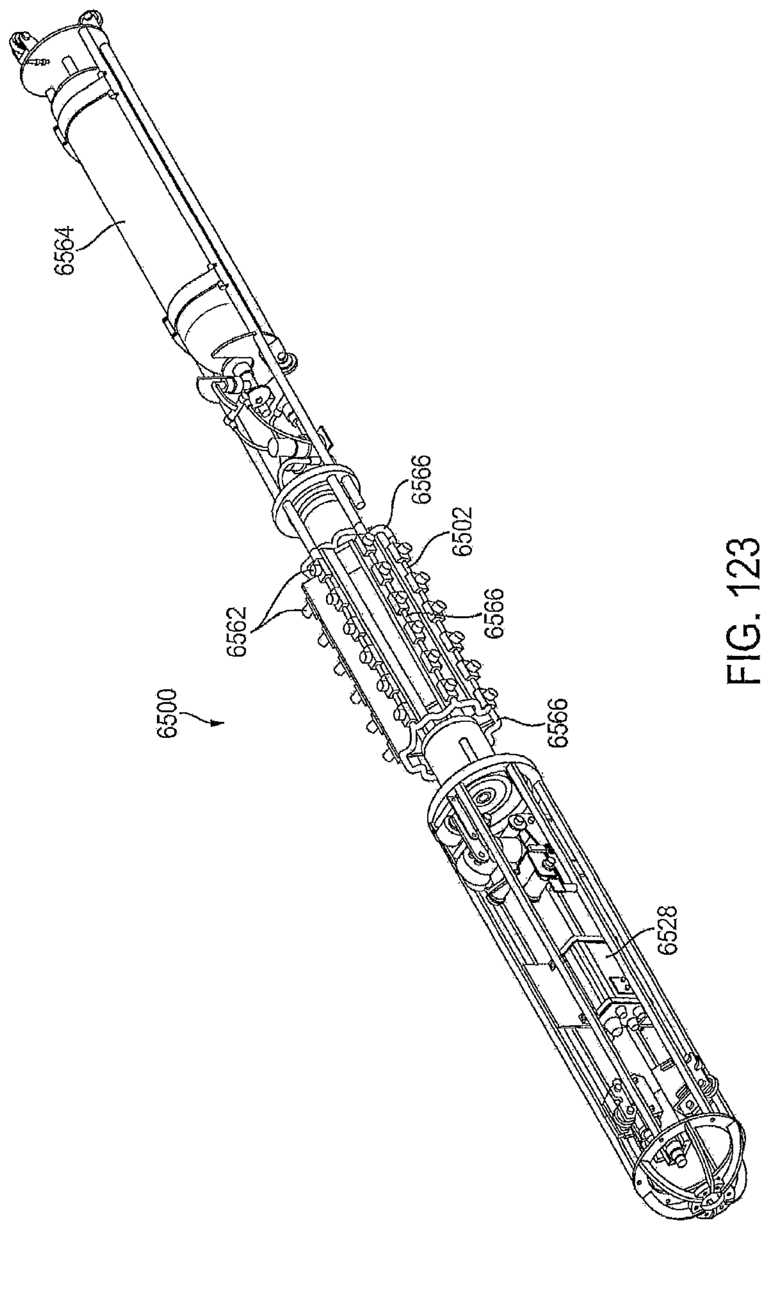
FIG. 123 shows a perspective view of the cooler system, wherein fluid nozzles configured to apply a cooling liquid onto the interior surface of the welded pipes to remove heat from the welded pipes are shown in accordance with another embodiment of the present patent application.
Figure 133:
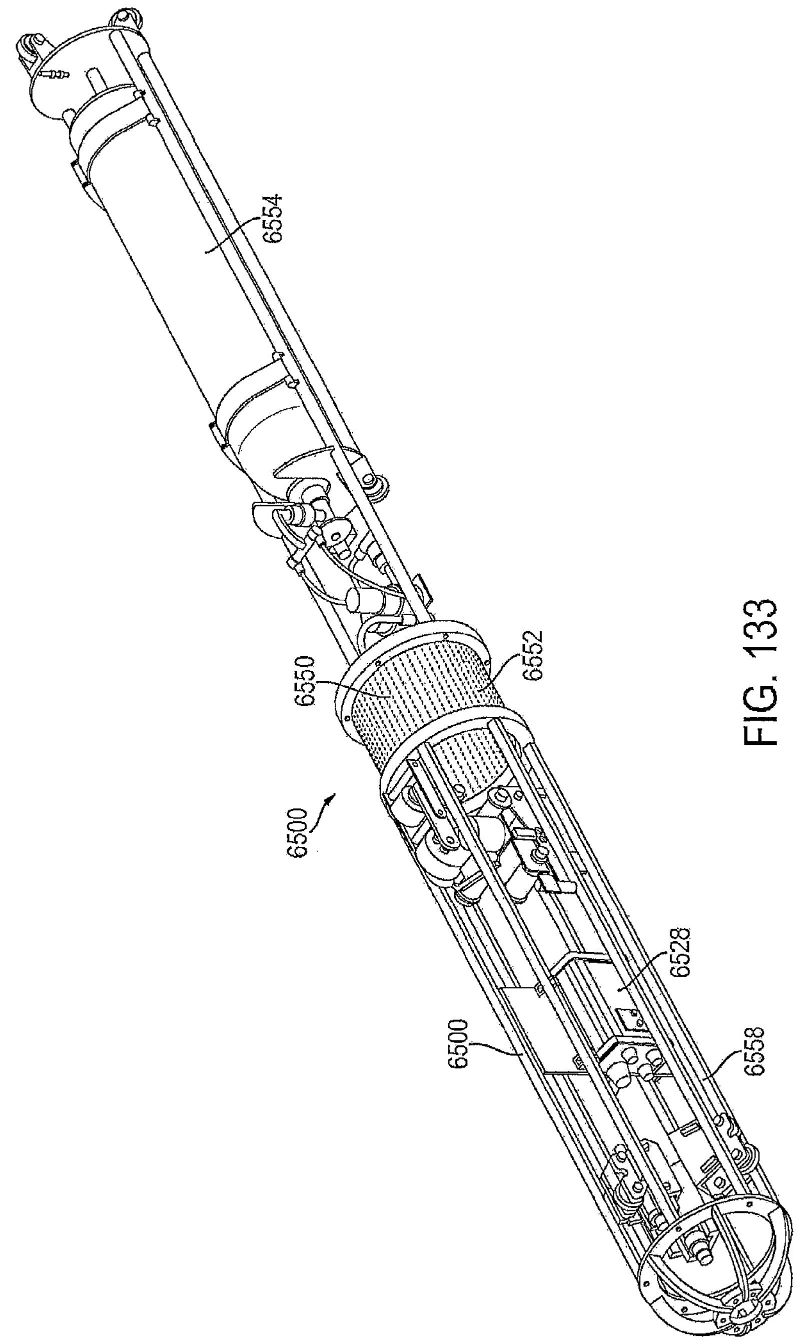
FIGS. 133 and 134 show perspective views of a cooler system in accordance with another embodiment of the present patent application.

In one embodiment, the cooling energy is applied by a fluid released within the interior of the pipes 1022*a*, 1022*b* such that the fluid directly contacts the interior surface 5130*a*, 5132*a* of the pipes 1022*a*, 1022*b*. In one embodiment, the fluid includes a liquid. In one embodiment, the fluid includes a gas. For example, in one embodiment, the fluid nozzles 6562 (as shown in FIG. 123) are configured to apply (or spray) a cooling fluid (directly) onto the interior surface 5130*a*, 5132*a* of the welded pipes 1022*a*, 1022*b* to remove heat from the welded pipes 1022*a*, 1022*b*. In one embodiment, the blower 6505 (as shown in FIG. 133) is configured to apply (or blow) a cooling gas (directly) onto the interior surface 5130*a*, 5132*a* of the welded pipes 1022*a*, 1022*b* to remove heat from the welded pipes 1022*a*, 1022*b*.

In one embodiment, the contact surface 6572 of the heat exchanger 6502 is configured to be positioned in contact with the interior surface 5130*a*, 5132*a* of the welded pipes 1022*a*, 1022*b* to remove heat from the welded pipes 1022*a*, 1022*b*. For example, as shown in FIGS. 119-121, 124, 130 and 132, the contact surface(s) 6572 of each of these different types of heat exchangers 6502 are configured to be positioned in contact with the interior surface 5130*a*, 5132*a* of the welded pipes 1022*a*, 1022*b* to remove heat from the welded pipes 1022*a*, 1022*b*.

Figure 121:
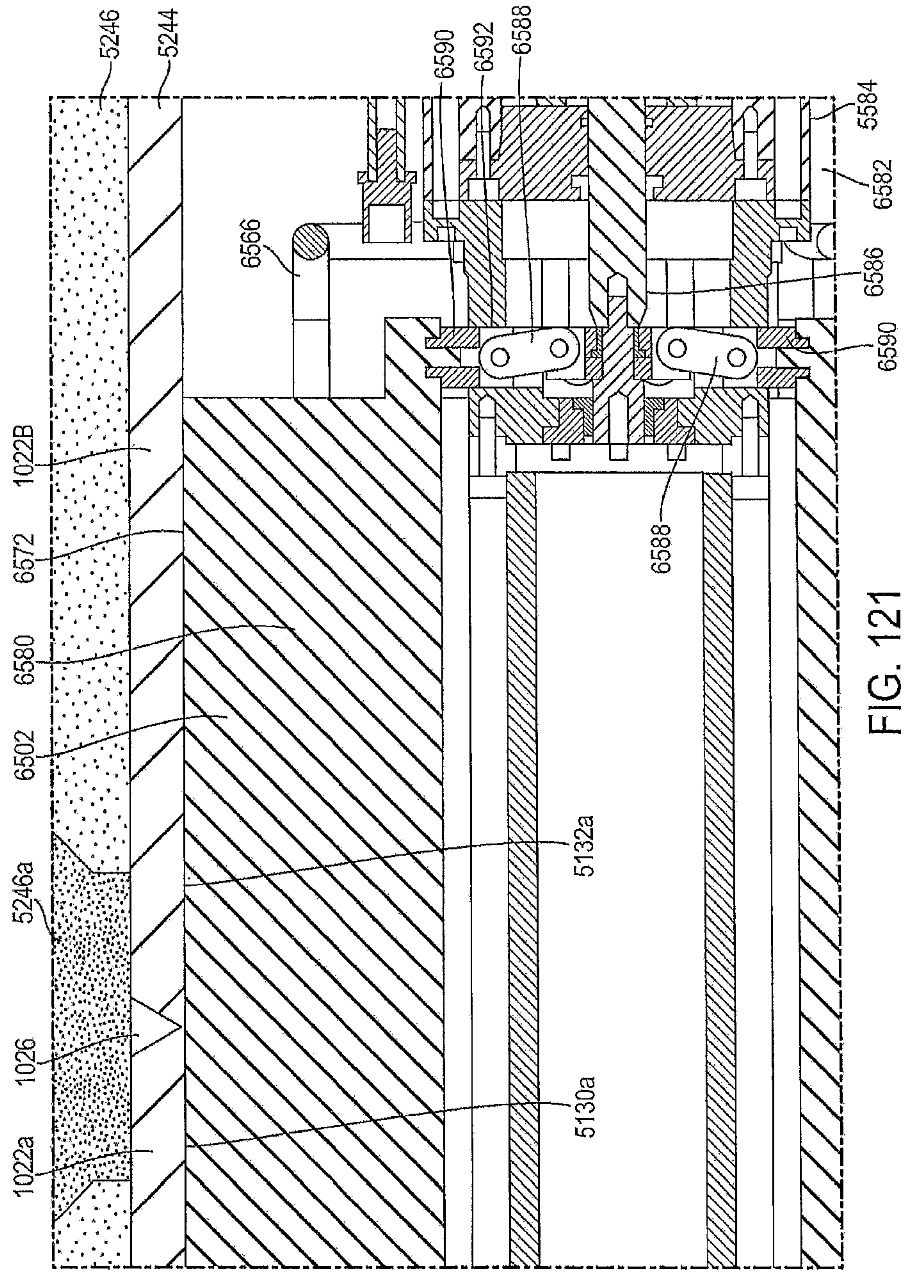
FIGS. 121 and 122 show partial, cross-sectional views of the cooler system being positioned within the pipes, where
Figure 122:
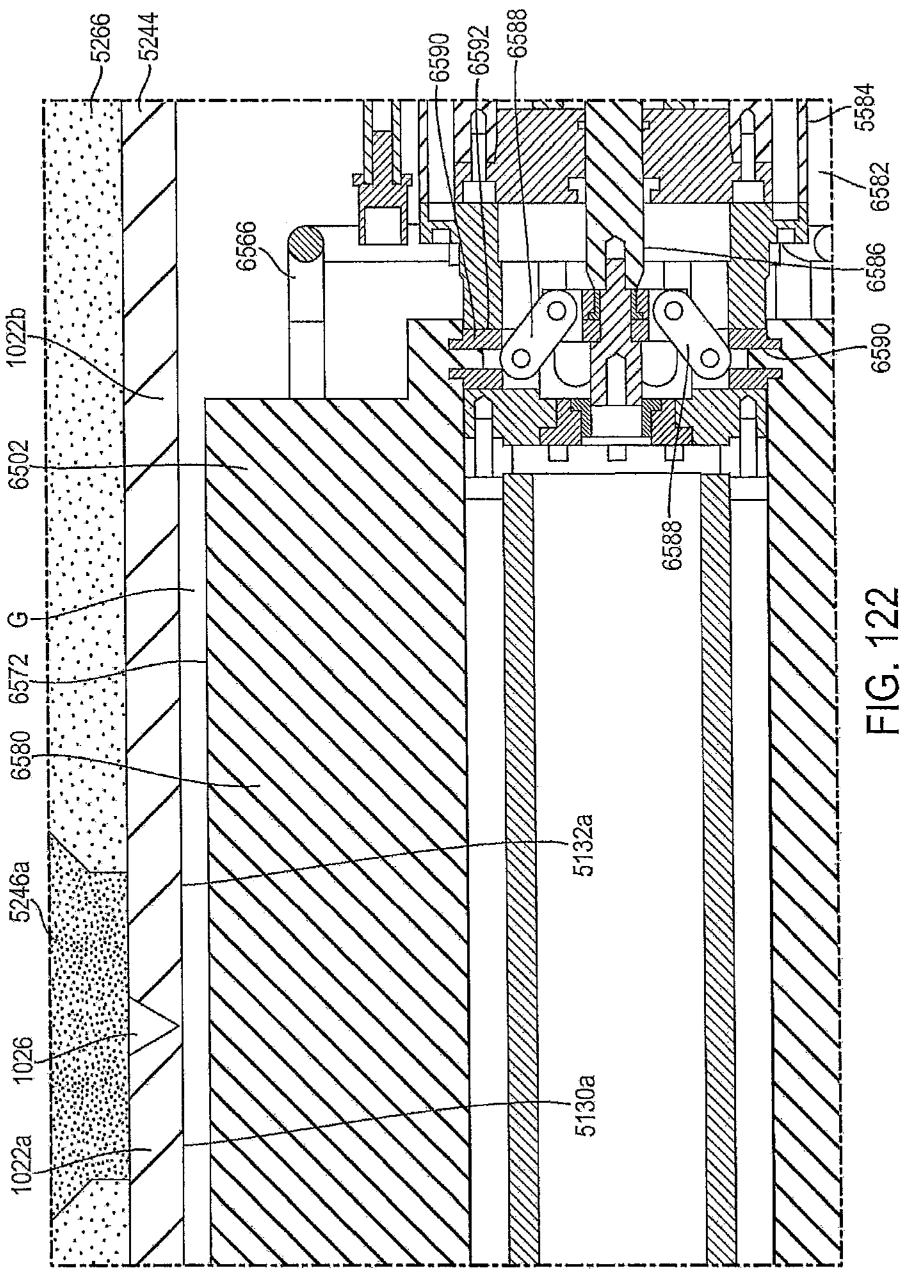

Referring to FIGS. 119-122, the heat exchanger 6502 of the cooler system 6500 may include a plurality of heat exchanger elements or fins 6580 positioned at circumferentially spaced apart locations on a center frame 6634. In one embodiment, each heat exchanger element 6580 may have one or more coolant lines 6593 passing therethrough. In one embodiment, each heat exchanger element or fin 6580 is supported on the center frame 6634 and is operatively connected to an actuator mechanism 6582. In one embodiment, the actuator mechanism 6582 is configured to move each heat exchanger element or fin 6580 between its extended position (as shown in FIGS. 120 and 121) and its retracted position (as shown in FIG. 122). In one embodiment, as shown in FIG. 122, there is a radial gap G between the contact surfaces 6572 of the heat exchanger elements 6580 and the inner surfaces 5130*a*, 5132*a* of the pipes 1022*a*, 1022*b*, when the heat exchanger elements 6580 are in their retracted positions.

In one embodiment, the actuator mechanism 6582 may include a piston 6586, a cylinder 6584, a plurality of first members 6588 and a plurality of second members 6590. In one embodiment, the number of the first and second members may depend on the number of heat exchanger element 6580 being used.

In one embodiment, there may be two actuator mechanisms, where one actuator mechanism is positioned (axially along the pipe axis) on one side of the heat exchanger element 6580 and the other actuator mechanism is positioned (axially along the pipe axis) on the other side of the heat exchanger element 6580. In one embodiment, the two actuator mechanisms may operate simultaneously to move the heat exchanger elements 6580 between their extended and retracted positions. In one embodiment, there may be only one actuator mechanism that is configured to move each heat exchanger element or fin 6580 between its extended position (as shown in FIGS. 120 and 121) and its retracted position (as shown in FIG. 122).

In one embodiment, each second member 6590 is constructed and arranged to be connected to the heat exchanger element 6580 on one end and to the first member 6588 on the other end. In one embodiment, each first member 6588 is constructed and arranged to be connected to the second member 6590 on one end and to a portion of the position 6586 (or a member moveable by the piston 6586) on the other end.

In one embodiment, the second member 6590 is constructed and arranged to positioned in a radially extending opening 6592 in a (fixed) frame member 6594 such that the radially extending opening 6592 facilitates a radial movement (e.g., up and down radial movement) of the second member 6590 therein.

In one embodiment, the piston 6586 is configured to be movable axially in the cylinder 6584. In one embodiment, the first members 6588 moved by the axially, reciprocating piston 6586, for example, driven by fluid (hydraulic or pneumatic) pressure inside the cylinder 6584.

The heat exchanger elements 6580 are moved from their retracted positions (as shown in FIG. 122) where the contact surfaces 6572 of the heat exchanger elements 6580 are not in contact with the inner surfaces 5130*a*, 5132*a* of the pipes 1022*a*, 1022*b* to their extended positions (as shown in FIGS. 120 and 121) where the contact surfaces 6572 of the heat exchanger elements 6580 are configured to be in contact with the inner surfaces 5130*a*, 5132*a* of the pipes 1022*a*, 1022*b*, by activating the cylinder 6584 so that the piston 6586 is axially moved in the cylinder 6584. The compressed air entering a port 6503 pushes the piston 6586 to move the heat exchanger elements 6580 to their extended positions.

In one embodiment, the axial movement of the piston 6586 is translated to radial movements of the second members 6590 via the first members 6588. Thus, the radial contact forces are generated by fluid pressure of the compressed air acting on the piston 6586. The piston 6586 drives the first members 6588 that convert the axial movement of the piston 6586 to radial movements of the second members 6590. As each heat exchanger element 6580 is operatively connected to the second members 6590, the radial movements of the second members 6590 cause the radial movement of the heat exchanger element 6580 between its extended and retracted positions.

In one embodiment, the size of the cylinder, the applied fluid pressure, and the sizes of various components of the actuator mechanism 6582 may be changed to control the extension and retraction of the heat exchanger elements 6580.

In one embodiment, as shown in FIG. 123, the cooler system 6500 may include a fluid nozzle 6562 configured to apply a cooling liquid onto the interior surface 5130*a*, 5130*b* of the welded pipes 1022*a*, 1022*b* to remove heat from the welded pipes 1022*a*, 1022*b*. In one embodiment the fluid nozzle 6562 is a water nozzle that blows/sprays water onto the interior surface 5130*a*, 5132*a* of the pipe 1022*a*, 1022*b* to facilitate cooling of the welded pipes 1022*a*, 1022*b*.

In one embodiment, the heat exchanger 6502 may include a plurality of fluid nozzles 6562 that are positioned circumferentially and axially (along the pipe axis) spaced apart locations. In one embodiment, each fluid nozzle 6562 is configured to receive the cooling liquid from a coolant source 6564 via a coolant supply line 6566 and via one or more valves. In one embodiment, the coolant is gas or liquid. In one embodiment, the received coolant is sprayed by the fluid nozzles 6562 onto the interior surface 5130*a*, 5132*a* of the welded pipes 1022*a*, 1022*b* to remove heat from the welded pipes 1022*a*, 1022*b*.

FIGS. 124 and 125 show a heat exchanger element or fin 6574 that is configured to be extendable, for example, using the actuator mechanism 6582 shown and described with respect to FIGS. 120-122. In one embodiment, the contact surface 6572 of the heat exchanger element or fin 6574, when the heat exchanger element or fin 6574 is in extended position, is configured to be positioned in contact with the interior surface 5130*a*, 5132*a* of the welded pipes 1022*a*, 1022*b* to remove heat from the welded pipes 1022*a*, 1022*b*. In one embodiment, the heat exchanger may include a plurality of such heat exchanger element or fin 6574 positioned at circumferentially spaced apart locations and that may be extended and retracted by an actuating mechanism (e.g., a pneumatic or other). In one embodiment, the heat exchanger element or fin 6574 may include a plurality of fluids (air) channels 6576 therein that are configured to allow the fluid to pass therethrough. In one embodiment, the channels 6576 may be radially extending and circumferentially spaced apart.

Figure 126:
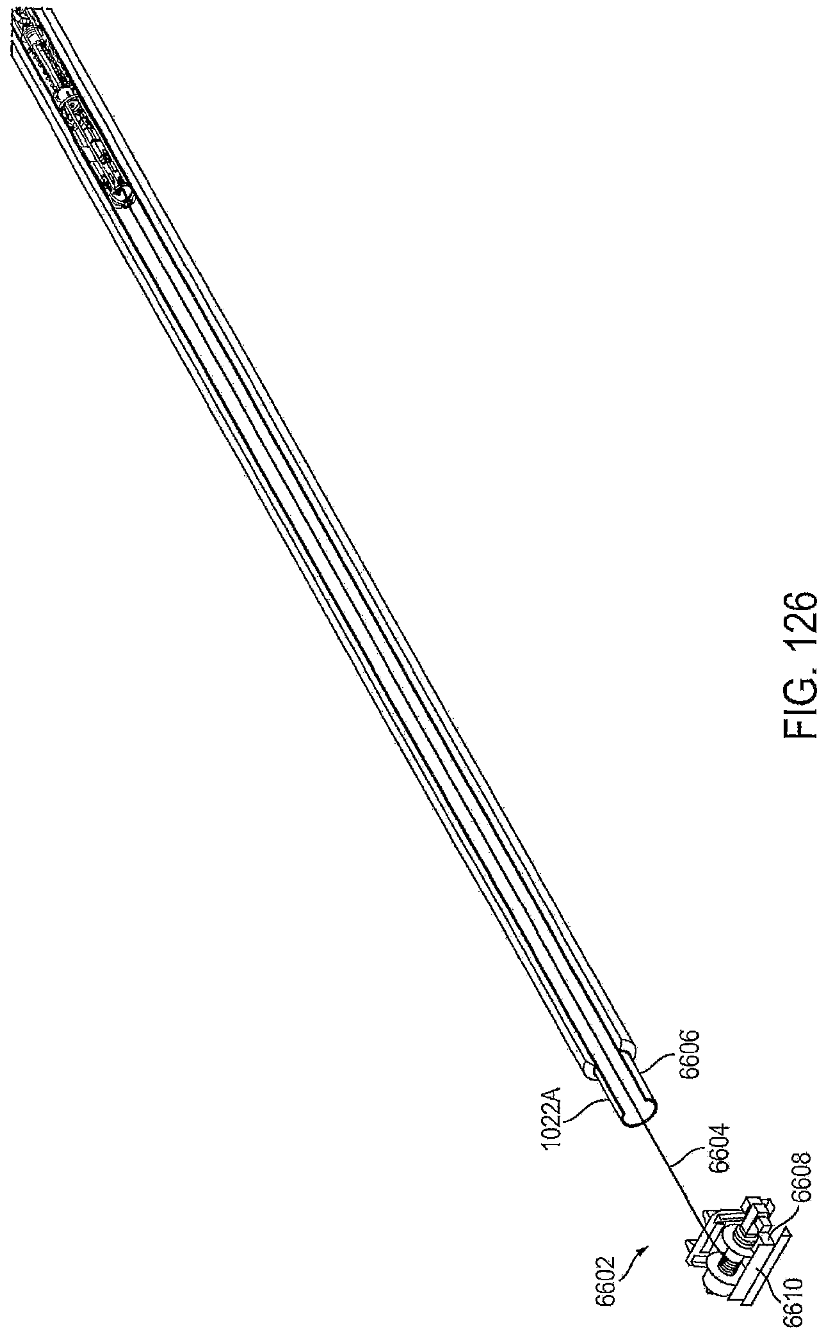
FIGS. 126-128 show perspective views of a system that is configured to facilitate the placement of the cooler system within and/or withdrawal of the cooler system from the pipes in accordance with another embodiment of the present patent application.
Figure 127:
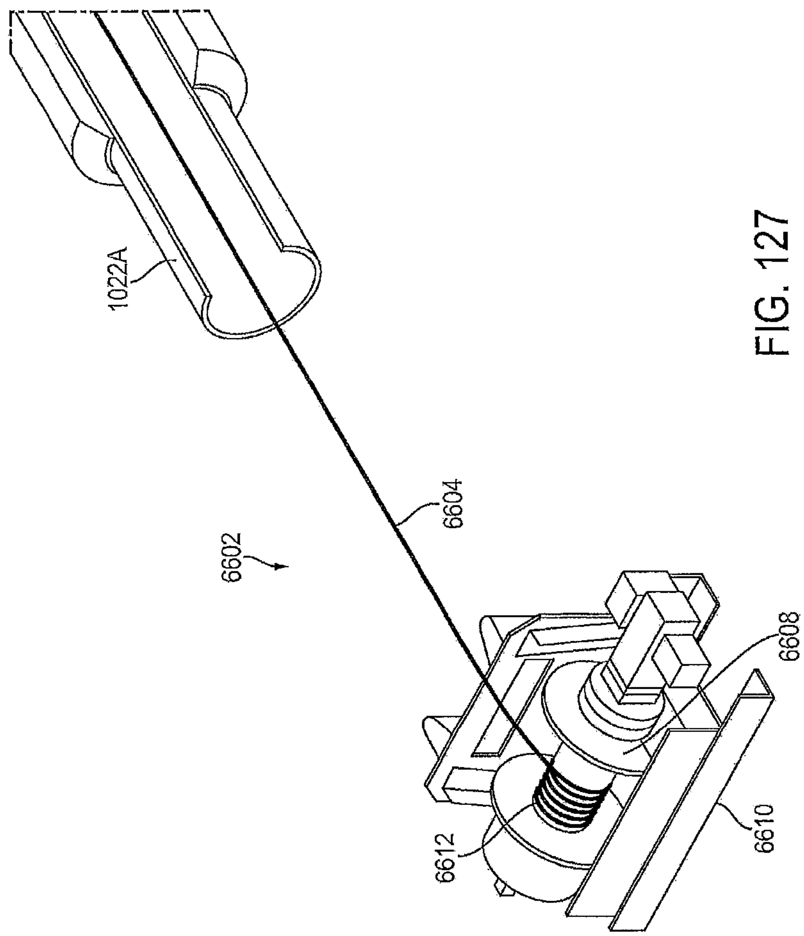
Figure 128:
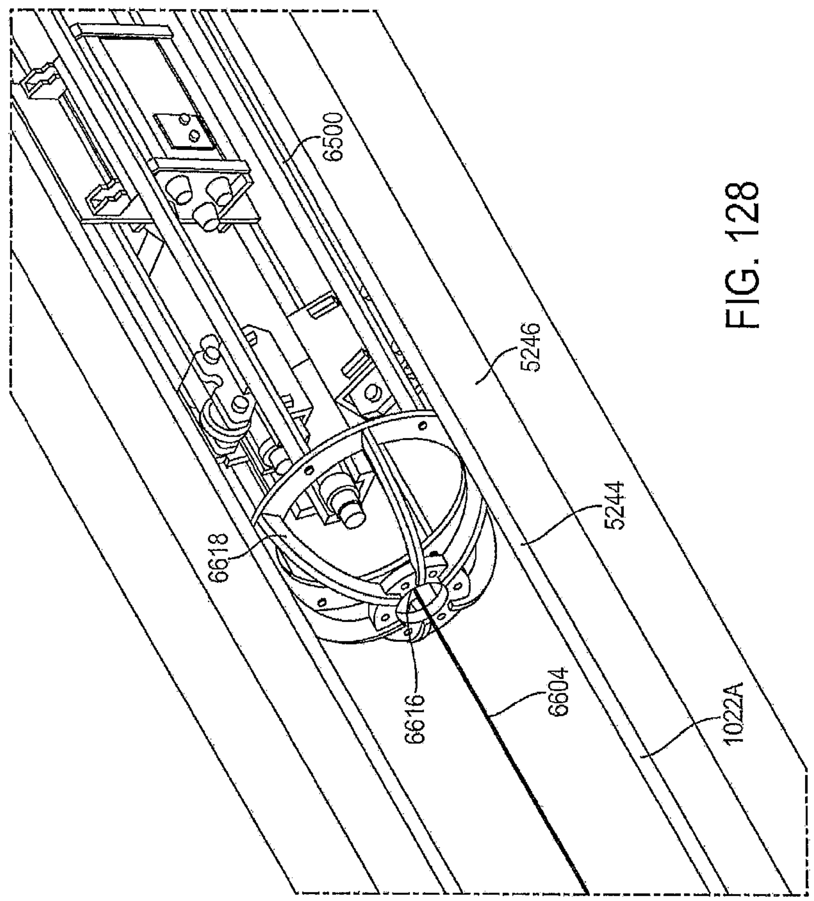

Referring to FIGS. 126-128, in one embodiment, the cooler system 6500 may include a drive system 6602. In one embodiment, the drive system 6602 may include a cable structure 6604 that extends from the internal cooler system 6500 and through one or more pipes 1022*a*, 1022*b* to an open end 6606 of a pipe 1022*a*. In one embodiment, the cable structure 6604 is used to facilitate a forward movement of the internal cooler system 6500 within the pipes 1022*a*, 1022*b*.

In one embodiment, the one or more cable/winch systems 6608 and 6604 may be implemented, in which one or more winches 6608 may be provided as part of the internal cooler system 6500 and/or located at one or more anchor points (e.g., 6610) that are external to the pipes 1022*a*, 1022*b*. In one embodiment, a winch structure may be provided within the internal cooler system 6500 frame.

For example, in one embodiment, a winch structure 6608 is provided at an anchored location 6610 exterior to the pipes 1022*a*, 1022*b* and connected to the cable structure 6604. That is, referring to FIGS. 127 and 128, one end 6612 of the cable structure 6604 is connected to the winch structure 6608 and the other end 6614 of the cable structure 6604 is connected to a member 6616 of a forward-most frame 6618 of the cooler system 6500. This configuration of the cable structure 6604 and the winch structure 6608 facilitate a forward movement of the internal cooler system 6500 within the pipes 1022*a*, 1022*b*.

In one embodiment, another cable structure may be connected to a member 6620 of a rear frame 6622 (as shown in FIG. 119) of the cooler system 6500 to facilitate reverse movement internal cooler system 6500 within the pipes 1022*a*, 1022*b*. This cable structure may be operated by another winch structure (e.g., provided at an anchored location rearwardly and exterior to the pipes 1022*a*, 1022*b*) to facilitate a reverse movement internal cooler system 6500 within pipe sections 1022*a*, 1022*b*.

Thus, the cable structure 6604 extends between the winch 6608 and a connection point (either at the internal cooler system 6500 or a connection point external to the pipes 1022*a*, 1022*b*) to facilitate placement of the internal cooler system 6500 within and/or withdrawal of the internal cooler system 6500 from the pipes 1022*a*, 1022*b* during procedures.

Figure 129:
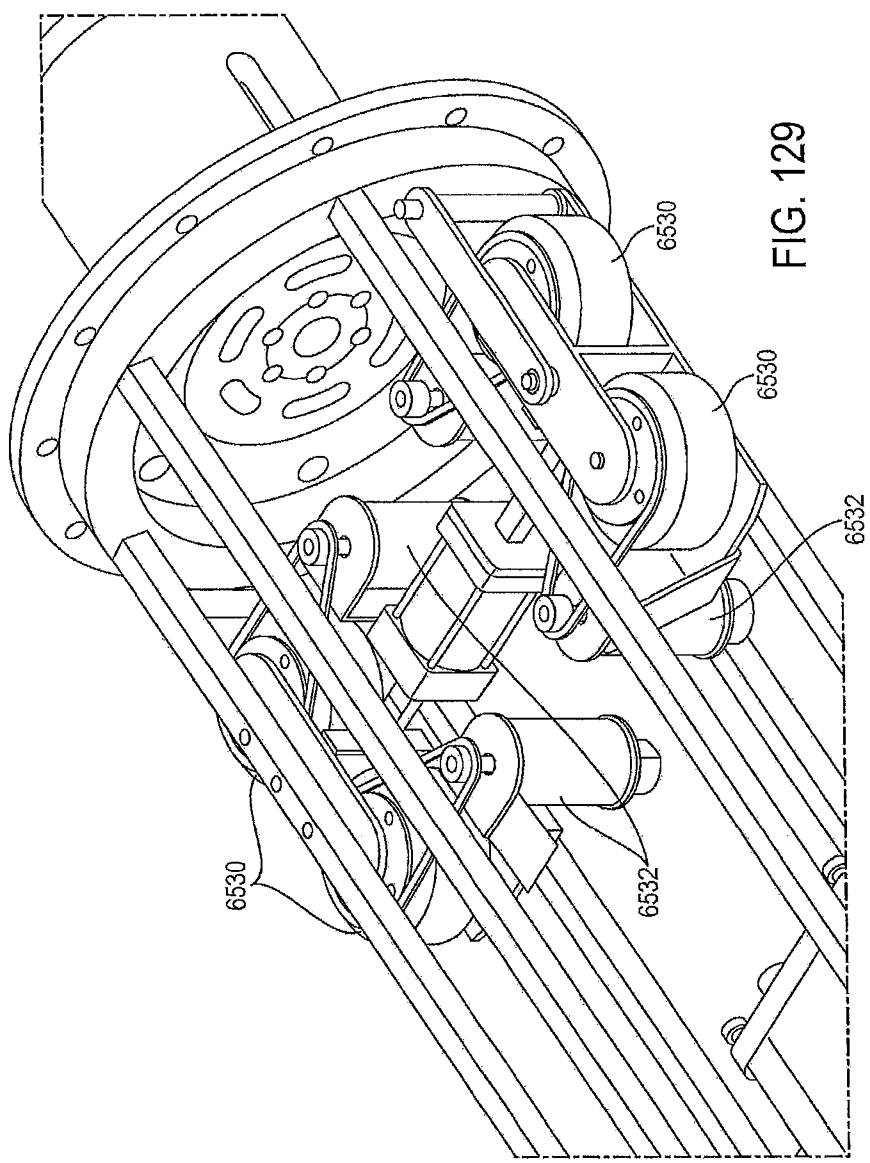
FIG. 129 shows a partial perspective view of the cooler system, where a plurality of rollers configured to engage the interior surface of one or more of the pipes and a drive motor configured to drive the rollers so as to move a frame assembly of the cooler assembly are shown in accordance with another embodiment of the present patent application.

In one embodiment, as shown in FIG. 129, the cooler system 6500 may include a plurality of rollers 6530 configured to engage the interior surface 5130, 5132 of one or more of the pipes 1022*a*, 1022*b* and a drive motor 6532 configured to drive the rollers 6530 so as to move a frame assembly 6503 (including the forward-most frame 6618, the center frame 6634, and the drive frame 6622) of the cooler system 6500.

In one embodiment, the cooler electronics module 6528 is configured to control operation of the drive system 6602 (e.g., by controlling one or more motors 6532 (which move the rollers 6530 in contact with internal wall portions of pipe)) to facilitate advancement of the internal cooling system 2010 within the pipe 1022*a* and toward the weld location. In one embodiment, the cooler electronics module 6528 of the internal cooler system 6500 are configured to communicate with the one or more processors 5140 and one or more other processors or electronic modules (e.g., operatively connected with the different weld systems, operatively connected with the cradles, the clamps or other pipe alignment systems and/or positioned at a remote location from these systems) as described in this application.

In the illustrated embodiment, each roller 6530 of the cooler system 6500 is operatively connected with its corresponding drive motor 6532. That is, four drive motors 6532 are connected to four rollers 6330 as shown. In another embodiment, two rollers 6530 may be directly connected to two drive motors 6532, and the other two rollers 6530 may be operatively connected to the two rollers 6530 that are directly connected to the drive motors 6532.

Figure 130:
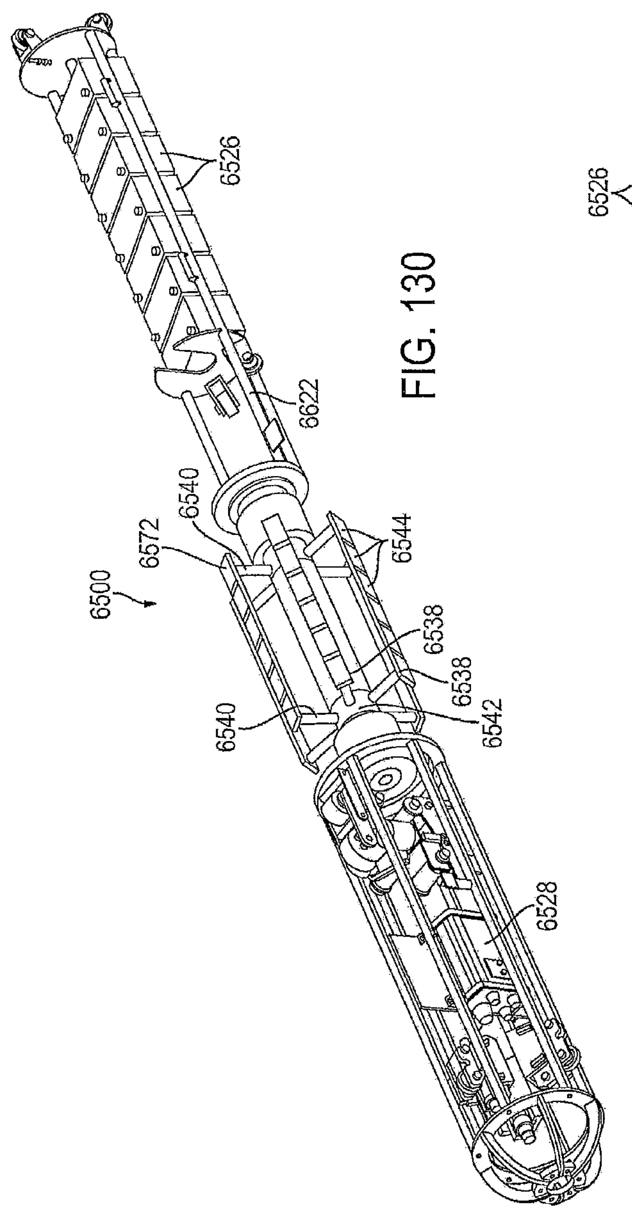
FIG. 130 shows a perspective view of a cooler system in accordance with another embodiment of the present patent application.
Figure 131:
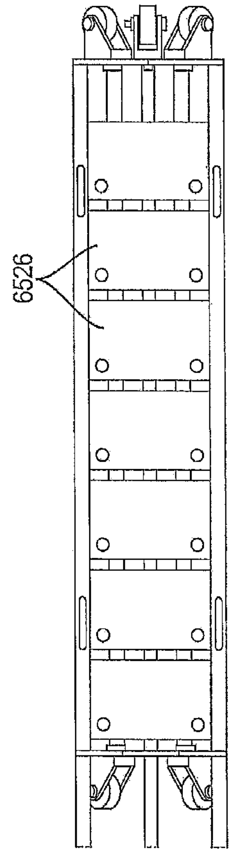
FIG. 131 shows a top view of a motor power source carried by the frame assembly of the cooler system in accordance with another embodiment of the present patent application.

In one embodiment, as shown in FIGS. 130 and 131, the cooler system 6500 may include a power supply source 6526 to provide electrical power to the cooler electronics module 6528 of the cooler system 6500, the drive system 6602, the electronic sensors, the valve structure (e.g., to electronically control one or more valves 6522 and thus control flow of the coolant from the coolant supply source 6524 to the heat exchanger 6502). In one embodiment, the power supply source 6526 is carried by the frame assembly of the cooler system 6500. In one embodiment, the power supply source 6526 includes a plurality of battery cells or battery packs that are carried by the rear frame 6622 of the cooler system 6500. In one embodiment, seven batteries are shown. In one embodiment, the number of batteries may vary. In one embodiment, the number of batteries may depend on the type of the heat exchanger being used and/or other power requirements of the cooler system 6500. In the illustrated embodiment, the power supply source 6526 is shown in a cooler system having a thermo electric heat exchanger. It is contemplated, however, that the power supply source 6526 may be used with the cooler systems having any type of heat exchanger as described in this application.

In one embodiment, the one or more battery cells carried by the frame of the cooler system 6500 are configured to power the drive motor 6532 and the brake system of the cooler system 6500. In one embodiment, the one or more battery cells carried by the frame of the cooler system 6500 are configured to power the cooler 6502 of the cooler system 6500.

Figure 132:
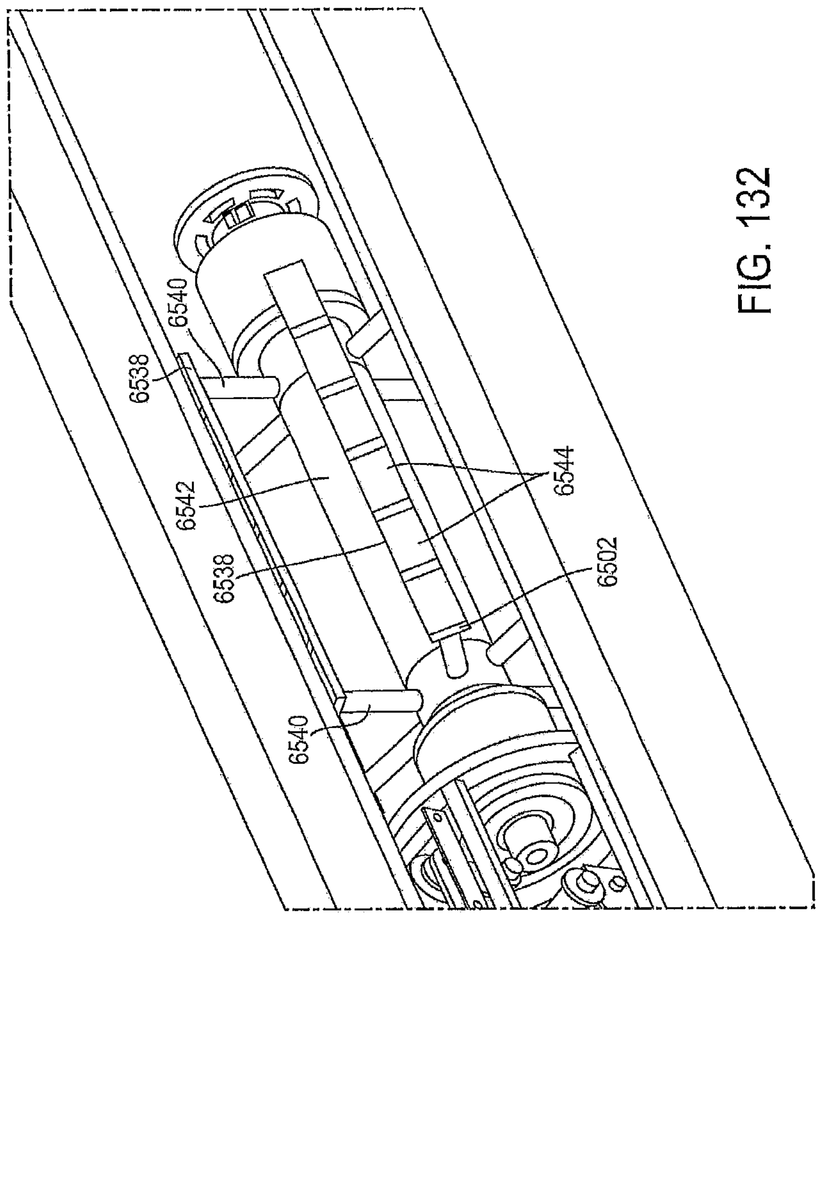
FIG. 132 shows a heat exchanger of the cooler system positioned in contact with the interior surface of the welded pipes to remove heat from the welded pipes in accordance with another embodiment of the present patent application.

In one embodiment, as shown in FIGS. 130 and 132, the heat exchanger 6502 of the cooler system 6500 may be a thermo electric heat exchanger 6502. For example, the thermo electric heat exchanger may be a Peltier device.

In one embodiment, the thermo electric heat exchanger 6502 may have a plurality of frame members 6538 positioned at circumferentially spaced apart locations on a shaft member 6542 of the cooler system 6500. In the illustrated embodiment, six frame members 6538 are shown. In one embodiment, the number of the frame members 6538 may vary. In one embodiment, each frame member 6538 may have a plurality of thermoelectric heat transfer elements 6544 positioned thereon. In illustrated embodiment, six thermoelectric heat transfer elements 6544 are positioned on each frame member 6538. In one embodiment, the number of the thermoelectric heat transfer elements 6544 positioned on each frame member 6538 may vary.

In one embodiment, the frame members 6538 may be supported on the shaft member 6542 of the cooler system 6500 via support members 6540 (e.g., two). In one embodiment, the support members 6540 may be extended and retracted by an actuating mechanism. In one embodiment, the actuating mechanism is configured to extend the support members 6540 such the frame members 6538 and the thermoelectric elements 6544 positioned thereon are positioned in contact with the interior surface 5130*a*, 5132*a* of the welded pipes to remove heat from the welded pipes 1022*a*, 1022*b*. In one embodiment, the actuating mechanism may be pneumatically controlled or may be controlled in any other way as would be appreciated by one skilled in the art.

In one embodiment, as shown in FIG. 133, the heat exchanger 6502 of the cooler system 6500 may be a blower 6505 configured to blow a cooling gas onto the interior surface 5130*a*, 5132*a* of the welded pipes 1022*a*, 1022*b* to remove heat from the welded pipes 1022*a*, 1022*b*. In one embodiment, the blower blows air onto the interior surface 5130*a*, 5132*a* of the pipe 1022*a*, 1022*b* to facilitate cooling of the welded pipes 1022*a*, 1022*b*. In one embodiment, the blower 6505 may include a frame member 6550 have a plurality of holes 6552 thereon. In one embodiment, the frame member 6550 is constructed and arranged to receive air from the outlet of a compressed air (e.g., high pressure) source 6554. In one embodiment, the frame member 6550 is constructed and arranged to receive air from the outlet of a motor driven fan. In one embodiment, the holes 6552 formed on the frame member 6550 are configured to function as outlets for delivering received air to the interior surface 5130*a*, 5132*a* of the welded pipes to remove heat from the welded pipes 1022*a*, 1022*b*.

Figure 134:
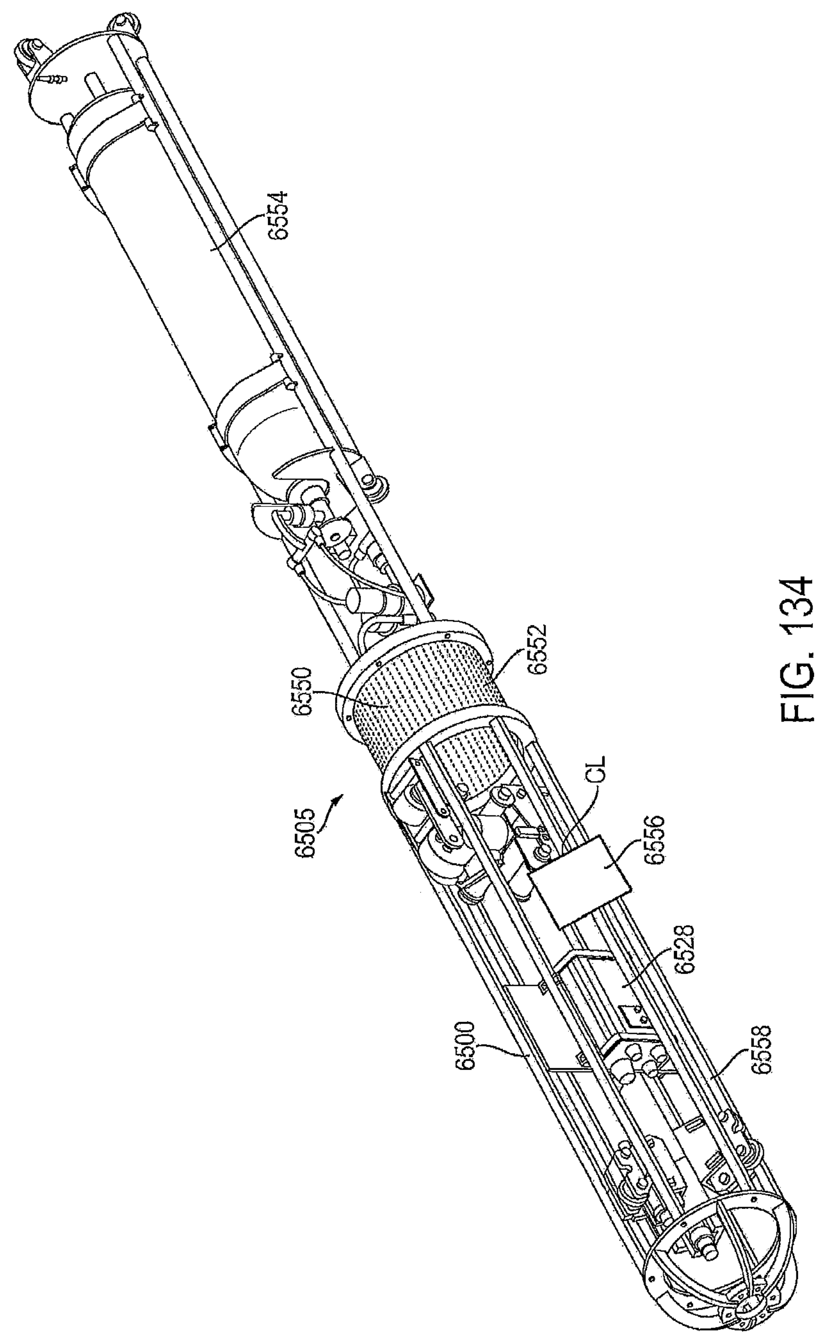

In one embodiment, as shown in FIG. 134, a camera 6556 mounted at a location CL on the first section 6558 and is controlled by the cooler electronics module 6528 may provide video images to a remote control device so that a user may determine how close the internal cooler system 6500 is to the weld joint 1026.

Figure 135:
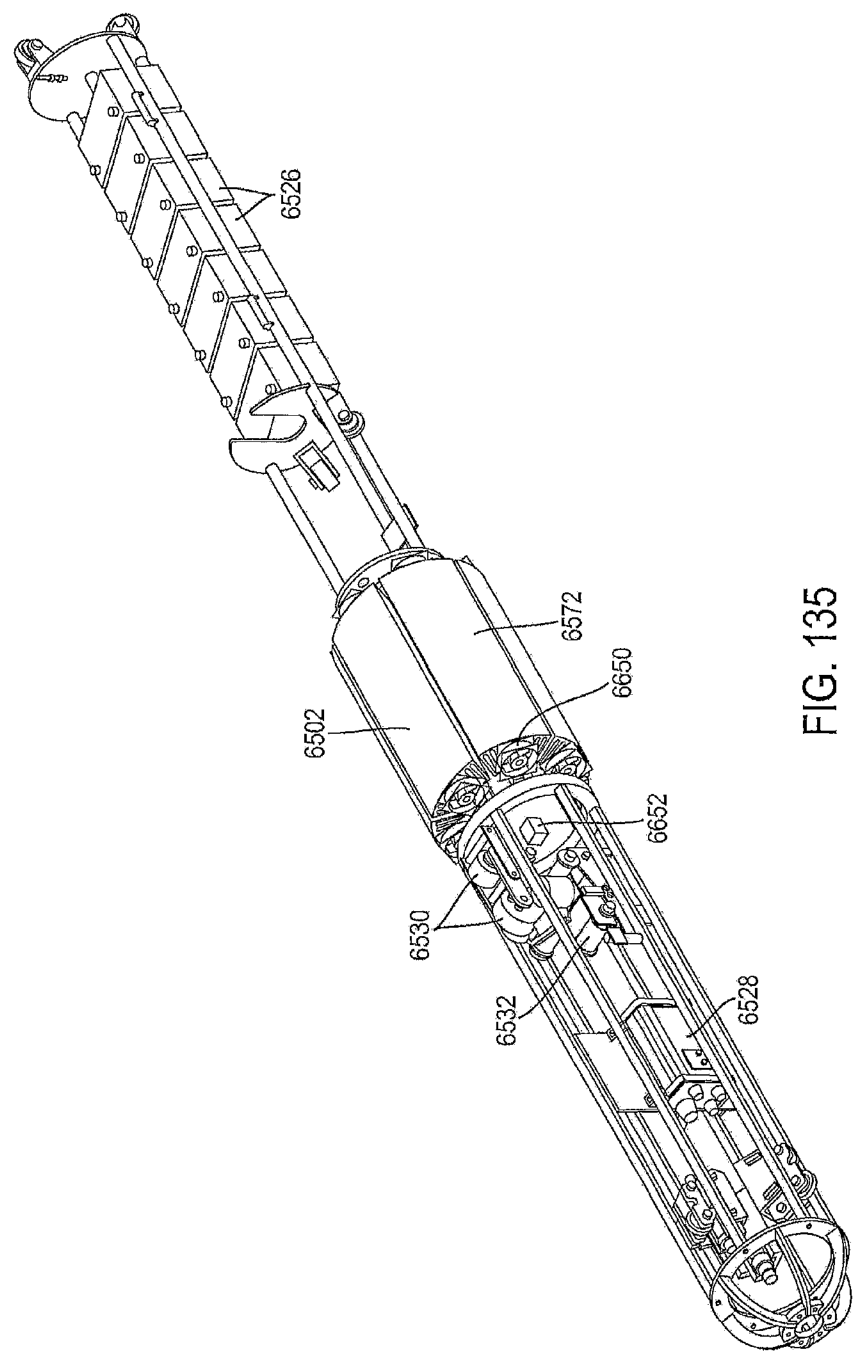
FIGS. 135 and 136 show a perspective view and a partial cross-section view of a cooler system in accordance with another embodiment of the present patent application.

In one embodiment, as shown in FIGS. 135 and 136, the cooler system 6500 includes a blower 6650 configured to blow a cooling gas onto the interior surface 5130*a*, 5132*a* of the welded pipes 1022*a*, 1022*b* to remove heat from the welded pipes 1022*a*, 1022*b*. In one embodiment, the blower 6505 includes a fan. In one embodiment, the structure, positioned and operation of the blower 6505 may be similar to the fan 2122 as described in detail elsewhere in this application.

In one embodiment, referring to FIGS. 135 and 136, the heat exchanger elements 6580 are moved from their retracted positions (as shown in FIG. 136) where the contact surfaces 6572 of the heat exchanger elements 6580 are not in contact with the inner surfaces 5130*a*, 5132*a* of the pipes 1022*a*, 1022*b* to their extended positions where the contact surfaces 6572 of the heat exchanger elements 6580 are configured to be in contact with the inner surfaces 5130*a*, 5132*a* of the pipes 1022*a*, 1022*b*, by operating an actuating mechanism 6664.

In one embodiment, the actuator mechanism 6664 may be a linear actuator. In one embodiment, the actuator mechanism 6664 may include a motor 6652, a lead screw 6654, a lead nut 6656, a plurality of first members 6664 and a plurality of second members 6666. In one embodiment, the number of the first and second members may depend on the number of heat exchanger element 6580 being used. In one embodiment, each second member 6666 is constructed and arranged to be connected to the heat exchanger element 6580 on one end and to the first member 6664 on the other end. In one embodiment, each first member 6664 is constructed and arranged to be connected to the second member 6666 on one end and to a member 6662 moveable by the motor 6652 on the other end.

In one embodiment, the motor 6652 is configured (e.g., mechanically connected) to rotate the lead screw 6654. In one embodiment, the motor 6652 is configured to rotate either clockwise or counter clockwise direction so as to cause the raising or lowering of the heat transfer elements 6580 substantially perpendicular to the pipe axis of the pipes

1022*a*, 1022*b*. In one embodiment, the motor 6652 is configured to be directly connected to rotate the lead screw 6654. In another embodiment, the motor 6652 is configured to be indirectly connected, e.g., through a series of gears or a gearbox, to rotate the lead screw 6654.

In one embodiment, the lead screw 6654 includes threads machined on its outer surface and extending along its length. In one embodiment, the lead nut 6656 is constructed and arranged to be threaded onto the lead screw 5514 and includes complimentary threads machined on its inner surface.

In one embodiment, the lead nut 6656 is configured to interlock with a portion of a member 6662 so that the rotation of the lead nut 6656 is prevented along with the lead screw 6654. That is, the lead nut 6656 is restrained from rotating along with the lead screw 6654, therefore the lead nut 6656 is configured to travel up and down the lead screw 6654. In one embodiment, the lead nut 6656 is interlocked and positioned in an opening of the member 6662. In one embodiment, the lead screw 5514 is configured to pass through an opening of the interlocked lead nut 5516.

The operation of the actuator mechanism 6664 is discussed in detail below. When the lead screw 6654 is rotated by the motor 6652, the lead nut 6656 is driven along the threads. In one embodiment, the direction of motion of the lead nut 6656 depends on the direction of rotation of the lead screw 6654 by the motor 6652. As the lead nut 6656 is interlocked in the opening of the member 6662, the member 6662 is configured to travel the lead screw 6654 along with the lead nut 6656. That is, the member 6662 translates linearly (right to left or left to right) as the motor 6652 rotates. Also, as the member 6662 is connected to the first members 6658, the movement of the member 6662 causes the movement of the first members 6658. As the second members 6660 are connected to the first members 6658, the movement of the first members 6658 causes the radial (up or down) movement of the second members 6660. That is, the linear translation of the member 6662 is converted to the radial (up or down) movement of the second members 6660 through the first members 6658.

As the heat exchanger element 6580 is connected to the second members 6660, the radial (up or down) movement of the second members 6660 causes the radial (up or down) movement in the heat exchanger element 6580. Thus, the motor 6652 is configured to move the contact surfaces 6572 of the heat exchanger elements 6580 outwardly into engagement with the interior surface 5130*a*, 5132*a* of the metal pipes 1022*a*, 1022*b*.

In one embodiment, the time that the cooler system takes to cool the pipes (e.g., after the coating procedure and before the spooling procedure) may be in the range between 90 and 150 minutes.

Because the cooler system can be used to apply the cooling energy to an interior surface of the metal pipes, from within the pipes, the time for cooling of the metal pipes can be reduced (for example, in comparison to permitting natural cooling of the metal pipes, or in comparison to applying a coolant on top of the insulator material). This, for example, can facilitate cooling of the metal pipes after the insulator material is applied to a welded pipe, which should be pre-heated prior to application of the weld material. As a result, the welded pipe can be put into service or otherwise further processed more quickly. Specifically, after the welded pipe has been heated to apply the insulator material, and insulator applied, it should not be subjected to high stresses that may take place in a deployment procedure. For example, in some embodiments, the welded pipe and its insulation (which insulation is applied only after the welded pipe temperature is heated to a temperature of at least 160° C.) is intended to be wound on a spool in a spooling operation. Such spooling operation is conducted ideally only after the welded and insulated metal pipe has been cooled to below a threshold level (e.g., below 50° C.). The use of the internal cooler can expedite achieving cooling of the metal pipe to below the threshold level. In another application of the internal cooler system, after the pipes are welded (and before application of the insulator).

The spooling operation is one of a number of deployment procedures that may be conducted ideally only after the welded pipe is below a threshold temperature (e.g., by operation of the internal cooler). Other deployment procedures may include an S-lay procedure and/or J-lay procedure on a pipe laying barge. The welded pipe should be below a threshold temperature before the pipe should be submerged into the water (e.g., sea or ocean).

In addition, in another application, it may be desirable to inspect the weld with an ultrasound detector, in an ultrasound inspection system. The ultrasound inspection station is configured to operate ideally below a threshold temperature (e.g., below 80° C.), which can more quickly be obtained (after the pipe is heated as a result of the welding operation) by use of the cooler system. Thus, in one system, the cooler can be used prior to an ultrasound inspection system operation, which would be conducted after welding and before the pipe is re-heated for application of the insulation material.

In one embodiment, referring to FIG. 136A, an ultrasound inspection station 6801 that is configured to inspect the weld between the welded metal pipes 1022*a*, 1022*b* is provided. In one embodiment, the cooler system 6500 is configured to facilitate cooling of the metal pipes 1022*a*, 1022*b* after the pipes 1022*a*, 1022*b* are welded and before inspection of the weld by the ultrasound inspection station 6801.

In one embodiment, a temperature sensor (e.g., 2017*a* as shown in FIGS. 104-109) may be used to determine the temperature of the pipe 1022*a*, 1022*b* in the vicinity of the weld 1026. For example, referring to FIG. 107, the temperature sensor 2017*a* is configured to be positioned on the internal cooler system and in the vicinity of the weld 1026. In one embodiment, the temperature sensor 2017*a* may be positioned near the heat transfer elements or fins of the internal cooler system to measure the temperature of the (inner diameter) inner surfaces 5130, 5132 of the pipe 1022*a*, 1022*b*. In another embodiment, the temperature sensor may be positioned at the ultrasound inspection station 6801. In one embodiment, the temperature sensor may be a contact or a non-contact temperature sensor.

In one embodiment, the temperature sensor 2017*a* that senses a temperature of the pipes 1022*a*, 1022*b* may be operatively communicating with the one or more processors. In one embodiment, the one or more processors send operating instructions to the cooler 6502 based on signals received from the temperature sensor 2017*a*. In one embodiment, the one or more processors operate the cooler until the sensor 2017*a* and the processor determines that the temperature of the pipes 1022*a*, 1022*b* is below a threshold temperature.

In one embodiment, one or more processors may be configured to determine that temperature of the pipe 1022*a*, 1022*b* in the vicinity of the weld 1026 is below a predetermined temperature threshold. In one embodiment, the temperature sensor may be configured to detect that temperature of the pipe 1022*a*, 1022*b* in the vicinity of the weld 1026 is below a predetermined temperature threshold.

In one embodiment, the inspection by the ultrasound inspection station 6801 commences after the temperature sensor 2017*a* detects that the temperature of the pipe 1022*a*, 1022*b* in the vicinity of the weld 1026 is below a predetermined temperature threshold.

Figure 136B:
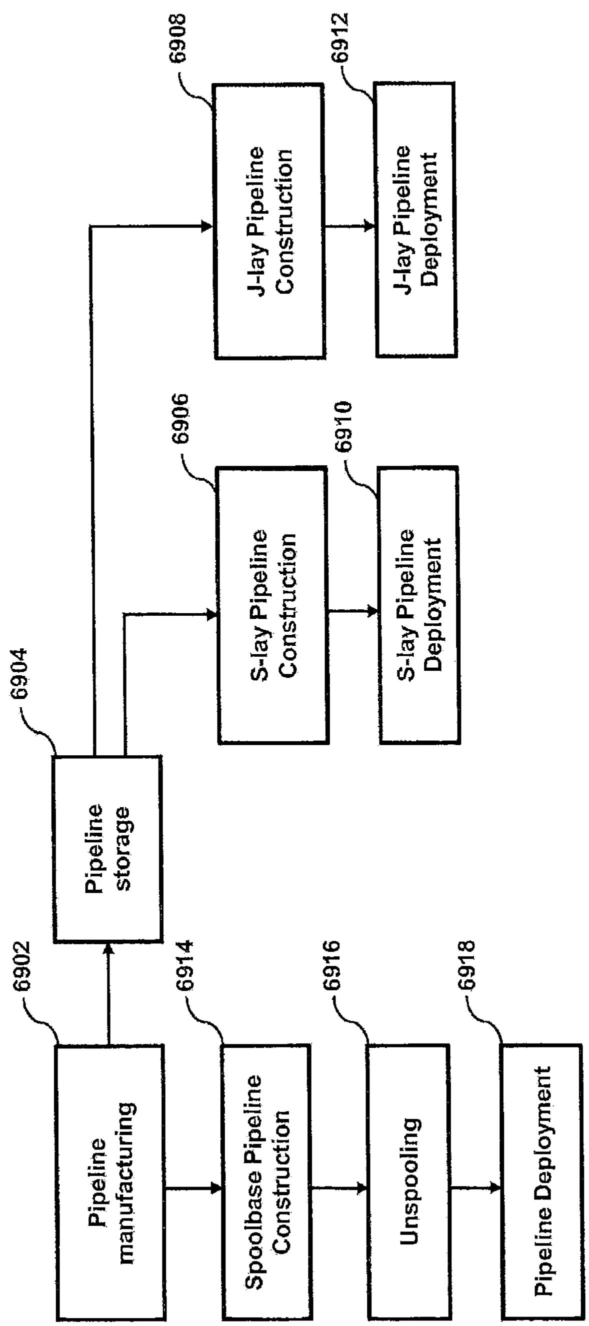
FIG. 136B shows a method showing the pipeline deployment procedures in accordance with an embodiment of the present patent application.
Figure 136C:
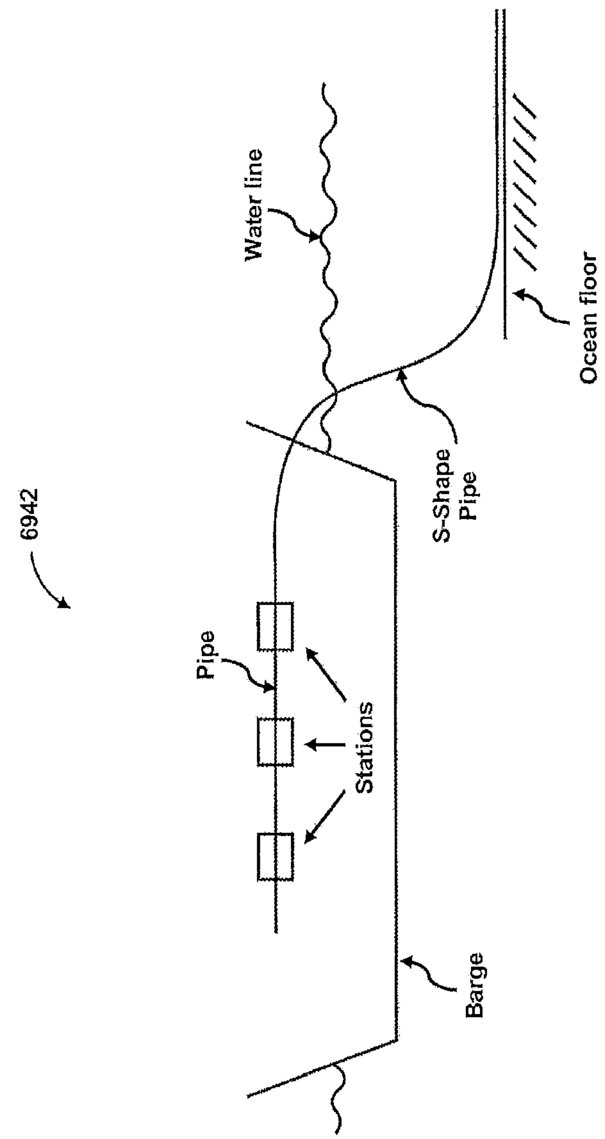
FIGS. 136C and 136D show schematic views of the S-lay procedure and of the J-lay procedure in accordance with an embodiment of the present patent application.
Figure 136D:
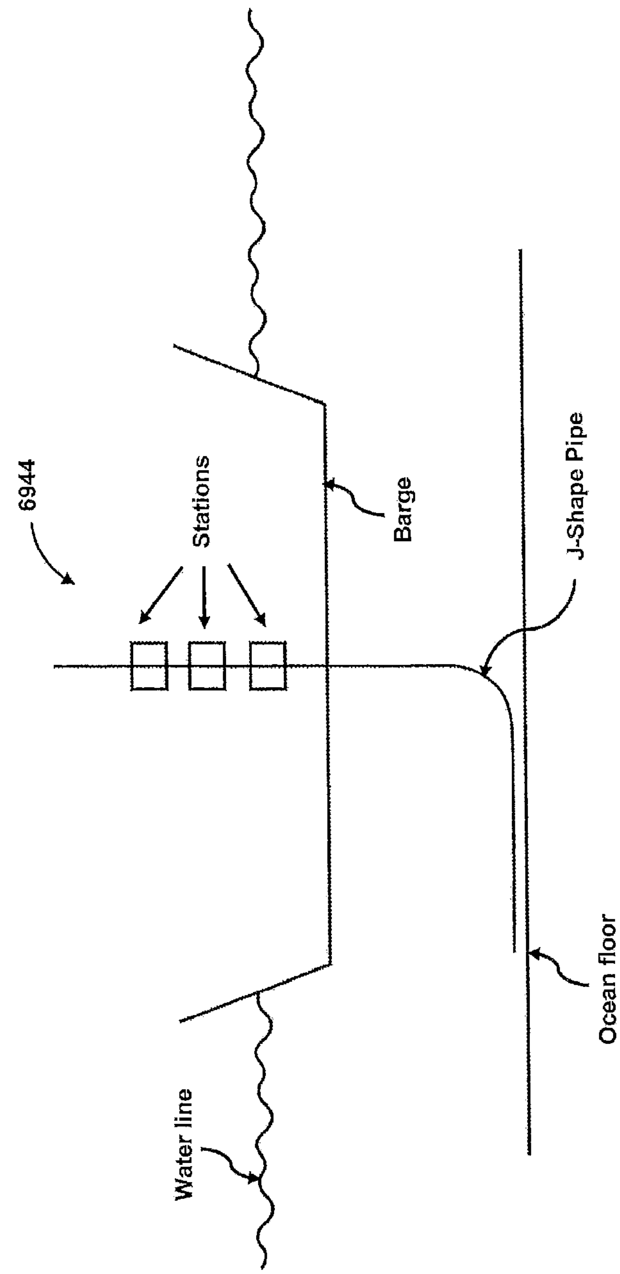
Figure 136E:
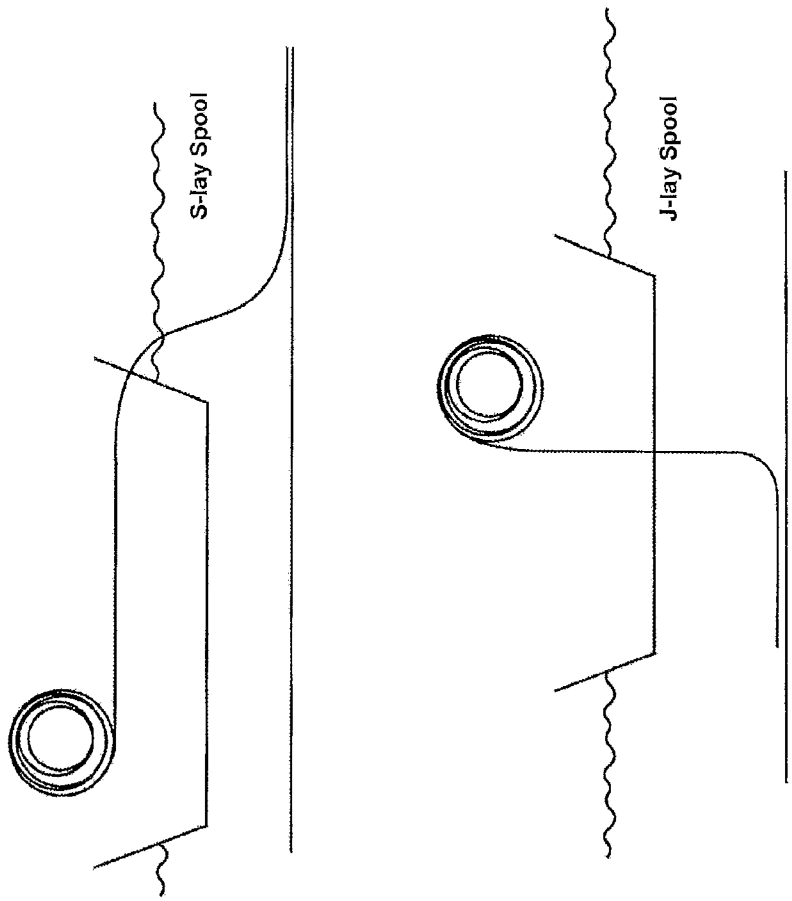
FIG. 136E shows S-lay and J-lay unspooling barges in accordance with an embodiment of the present patent application.

FIG. 136B shows a method for the pipeline deployment. FIGS. 136C and 136D show schematic views of the S-lay pipe deployment system and J-lay pipe deployment system. FIG. 136E shows S-lay and J-lay unspooling barges.

In one embodiment, pipes 1022*a*, 1022*b* (e.g., about 40 feet or 80 feet long) are manufactured during the pipe manufacturing procedure 6902. In one embodiment, the manufactured pipes are stored at pipe storage 6904 before sending the pipes for further processing, for example, to a S-lay barge 6942 (as shown in FIG. 136C), a spool base or a J-lay barge 6944 (as shown in FIG. 136D). In one embodiment, the pipe storage may include a plurality of storage racks.

In one embodiment, at the spoolbase procedure 6914, the manufactured pipe sections are received by the spoolbase, these pipe sections are joined, at the spoolbase, to form long pipe sections, and these long pipe sections are then spooled and loaded on to a vessel, ship, or barge. In one embodiment, the spoolbase may include semi-automatic or automatic welding systems, field joint coating systems, nondestructive inspection and testing systems, storage racks, roller systems, and/or other pipe handling equipment for the fabrication, spooling, and loading of rigid pipeline before installation.

In one embodiment, the pipe stalks are reeled onto big spools on barges (as shown in FIG. 136E) and unspooled when the barge arrives at the job location. In one embodiment, the spooled pipe stalks are unspooled on the vessel, ship, or barge at procedure 6916 and the pipe sections are then deployed at procedure 6918. In one embodiment, the "unspooling" vessel, ship, or barge may be a J-lay barge or a S-lay barge. FIG. 136E shows S-lay and J-lay unspooling barges.

In one embodiment, the S-lay barge 6942 receives the stored pipe sections from the pipe storage. In one embodiment, at procedure 6906, the S-lay barge 6942 uses its on-board systems to produce long pipe sections. In one embodiment, at procedure 6906, automatic weld systems, pipe facing systems, backup clamps, purge clamps and/or other support equipment are used on the S-lay barge 6942 to produce long pipe sections. In one embodiment, the S-lay pipe deployment procedure is used for offshore pipeline applications. In one embodiment, the S-lay pipe deployment procedure is used shallow and intermediate waters. In one embodiment, the S-lay pipe deployment procedure allows the pipe leave the vessel in a horizontal position. In one embodiment, the S-lay pipe deployment procedure provides high production rates. As shown in FIG. 136C, the S-lay barge 6942 is constructed and arranged to deploy the pipe sections in a S-shaped pipe configuration.

In one embodiment, the J-lay barge 6944 receives the stored pipe sections from the pipe storage. In one embodiment, at procedure 6908, the J-lay barge 6944 uses its on-board systems to produce long pipe sections. In one embodiment, at procedure 6908, automatic weld systems, pipe facing systems, J-lay clamps, and/or other support equipment are used on the J-lay barge 6944 to produce long pipe sections. In one embodiment, the J-lay pipe deployment procedure is used for offshore pipeline applications. In one embodiment, the J-lay pipe deployment procedure is used for deep-water work. In one embodiment, the J-lay pipe deployment procedure allows the pipe to leave the lay system in a position which is very close to vertical. This means that a pipeline is installed with much reduced stresses on the pipe. As shown in FIG. 136D, the J-lay barge 6944 is constructed and arranged to deploy the pipe sections in a J-shaped pipe configuration.

Control, positioning and communication with the internal welder system, the tie-in welder system, and/or the pipe cooler systems, when located within a pipe can be accomplished in a variety of ways, as described herein. In yet another embodiment, position of the system within the pipe can be detected by a low frequency electromagnetic signal transmission from a coil placed in close proximity parallel to the pipe outer surface. This signal is detected by a pair of orthogonal receiving coils mounted on the system in the pipe, in close proximity to the pipe inner surface. The phases of the received signals with respect to the transmitted signal and the ratio of the amplitudes of the two received signals is used to estimate the relative position of the transmitter and the receivers. Control of the system within the pipe (i.e., internal welder, tie-in welder, or cooler system, etc.) along with transmission of information can also accomplished via a high frequency direct sequence spread spectrum radio link between one or more processors (e.g., within a computer console) outside the pipe and one or more processors mounted on the system in the pipe. The details of this deployment can be appreciated from U.S. Pat. No. 6,092,406, incorporated herein by reference in its entirety.

In one embodiment, the internal weld system 5004, 3001 may include a weld material consumption device. In one embodiment, the external weld system 7500 may include a weld material consumption device. In one embodiment, the weld material consumption device may be a part of the wire feed assembly 5020 of the internal weld system 5004.

In one embodiment, the weld consumption device may have structure and operation similar to the device(s) as shown in and described with respect to 161A-165 of this application. For example, in one embodiment, the structure, configuration and operation of the spool 5272 (as shown in FIG. 22A) used the internal weld system 5004 may be similar to the spool 14480 as shown and described with respect to FIG. 161A. In one embodiment, the structure, configuration and operation of the motors of the wire feed assembly 5020 of the internal weld system 5004 may be similar to the motor 14490 as shown in and described with respect to FIGS. 162, 164A, and 164B. Also, in one embodiment, the wire feed assembly 5020 of the internal weld system 5004 may include a weight sensor that is configured to sense the depletion of the consumable material. The structure, configuration and operation of the weight sensor of the internal weld system 5004 may be similar to the weight sensor 14484 as shown in and described with respect to FIG. 161C. In one embodiment, the internal weld system 5004 may include other sensors (e.g., shown in 161B) to determine an amount of consumable weld material used by the internal weld system 5004 for a given period of time.

In one embodiment, the one or more processors 5140 operatively associated with the internal weld system 5004 may be configured to determine the wire feed speed from the speed of the motors of the wire feed assembly 5020 as described in elsewhere in this application. In one embodiment, the one or more processors 5140 operatively associated with the internal weld system 5004 may be configured to determine an amount of consumable weld material used by the internal weld system 5004 for a given period of time and generate weld material consumption data based thereon. In one embodiment, a transmitter of the internal weld system 5004 may transmit the weld material consumption data entirely wirelessly to the remote uLog processing system for further processing. In one embodiment, the remote uLog processing system may also be configured to transmit (entirely wirelessly to the internal weld system, the external weld system and/or the tie-in internal weld system) further instructions about the operation of the internal weld system, the external weld system and/or the tie-in internal weld system based on the processed weld material consumption data. For example, the instructions may include correcting a slippage of the motors of the wire feed assembly by increasing the speed of the motor of the wire feed assembly of the internal weld system, the external weld system and/or the tie-in internal weld system. In one embodiment, the one or more processors 5140 of the internal weld system 5004 may use the procedures shown in and described with respect to FIGS. 163 and 165 to determine weld material consumption data, the processed weld material consumption data, etc.

In one embodiment, the structure and operation of the weld consumption device is described above with respect to the internal weld system 5004. In one embodiment, the external weld system 7500 and the tie-in internal weld system 3001 may include a weld consumption device with similar structure and operation. That is, in one embodiment, the hub, electronics, software and pictures being sent by the weld material consumption devices of the internal weld system and the external weld system are generic to both the devices. However, the shape and size the weld material consumption devices of the internal weld system 5004, 3001 and the external weld system 7500 may change. In one embodiment, the weld material consumption devices of the internal weld system 5004, 3001 and the external weld system 7500 may have different shaped configurations and/or different geometries. In one embodiment, the weld material consumption device may be configured to detect unauthorized wire spool being used in the internal weld system 5004, 3001 or the external weld system 7500.

Field System Testing and Operations

Figure 137A:
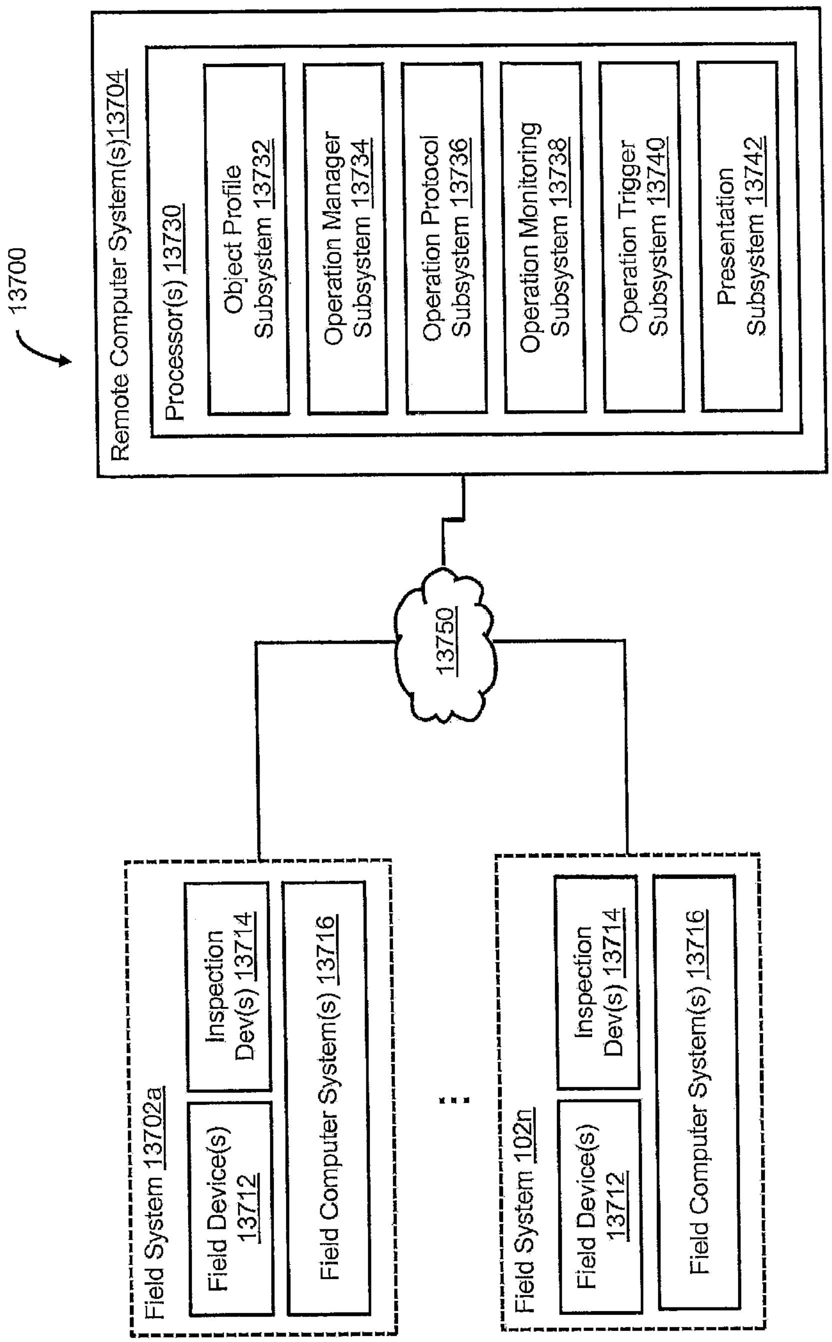
FIG. 137A shows a system for facilitating field system testing or operations thereof in accordance with another embodiment of the present patent application.

FIG. 137A shows a system 13700 for facilitating field system testing or operations thereof, in accordance with one or more embodiments. As shown in FIG. 137, the system 13700 may comprise one or more field systems 13702 (or field systems 13702*a*-13702*n*), one or more remote computer systems 13704, and one or more networks 150 via which components of the system 13700 may communicate with one another. A field system 13702 may comprise one or more field devices 13712, one or more inspection devices 13714, one or more field computer systems 13716, or other components. A remote computer system 13704 may comprise one or more processors 13730 configured to execute one or more subsystems, such as object profile subsystem 13732, operation manager subsystem 13734, operation protocol subsystem 13736, operation monitoring subsystem 13738, operation trigger subsystem 13740, presentation subsystem 13742, or other components. As described below, in one or more embodiments, operations of the respective components of remote computer system 13704 may be performed by one or more processors of remote computer system 13704. It should be noted that, while one or more operations are described herein as being performed by components of remote computer system 13704, those operations may, in some embodiments, be performed by components of field system 13702 (e.g., field computer system 13716) or other components of system 13700.

In one embodiment, the field system 13702 may be the field system 5000. In one embodiment, if the computer system 5138 is local to the field system 5000, the field computer system 13716 may be the local computer system 5138, and the field computer system processors 13718 may be the local computer system processors 5140. If the computer system 5138 is positioned remotely from the field system 5000, the remote computer system 13704 may be the remote computer system 5138, and the remote computer system processors 13730 may be the remote computer system processors 5140.

Figure 137B:
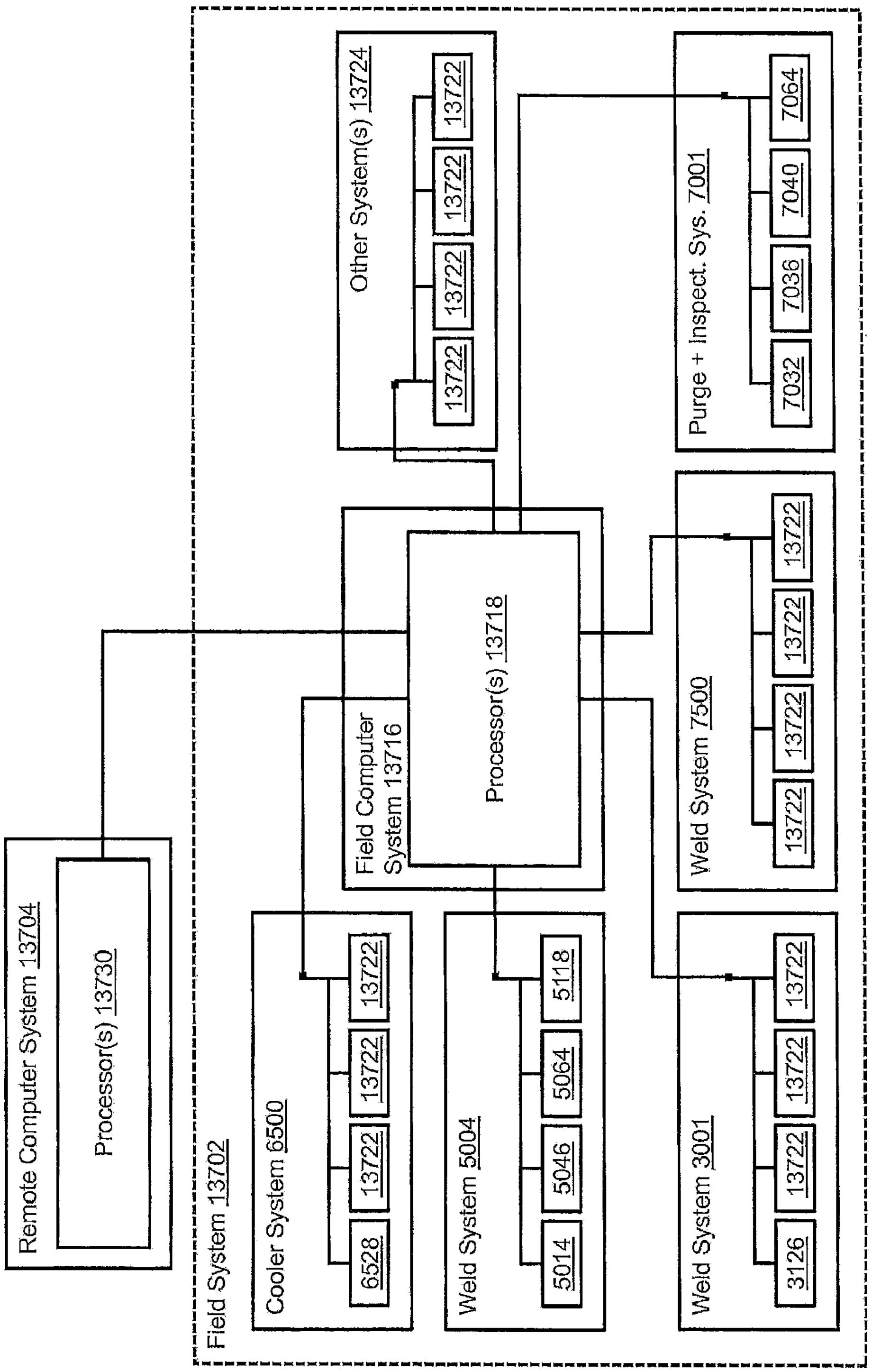
FIG. 137B shows communication links between the remote computer system, the field computer system of the field system, and other components of the field system in accordance with another embodiment of the present patent application.

FIG. 137B shows communication links between the remote computer system 13730, the field computer system 13716 of the field system 13702, and other components of the field system 13702, in accordance with one or more embodiments. In one embodiment, the remote computer system 13704 (or its processors 13730) may communicate with one or more other components of the field system 13702 via the field computer system 13716 (and one or more wired or wireless communication links between the field computer system 13716 and the remote computer system 13704). As an example, the field computer system processors 13718 may receive inspection data, input parameters, operation observation data, or other data from one or more of the other systems of the field system 13702 (or their respective processors 13720), such as weld system 3001 (e.g., tie-in internal weld system 3001), weld system 5004 (e.g., internal weld system 5004), cooler system 6500 (e.g., internal cooler system 6500), purge and inspection system 7001, weld system 7500 (e.g., external weld system 7500), or other systems 13724 of the field system 13702 (e.g., cradles or other pipe alignment systems, other inspection systems, etc.). The field computer system processors 13718 may transmit (via a transmitter) the inspection data, the input parameters, operation observation data, or other data to the remote computer system 13704, and, in response, receive a response comprising profile data (e.g., pre-weld profile data, on-the-fly-profile data, post-weld profile data, etc.), instructions for performing operations on an object, alerts (e.g., indicating a defect if a defect exists, an indication to begin or stop an operation, etc.), or other data from the remote computer system 13704. In one use case, if the response comprises profile data, the field computer system processors 13718 may use the profile data to generate alerts (e.g., indicating a defect if a defect exists, an indication to begin or stop an operation, etc.), obtain instructions for performing an operation on an object, etc. In another use case, if the response comprises instructions for performing an operation on an object, the field computer system processors 13718 may transmit the instructions to the appropriate system of the field system 13702 to cause that system to perform the operation in accordance with the transmitted instructions.

In one embodiment, it may be beneficial to utilize one or more wireless communications links to enable one or more components of the remote computer system 13704, the field computer system 13716, weld system 3001, weld system 5004, cooler system 6500, purge and inspection system 7001, or weld system 7500 to communicate with one another to reduce the number of communication cables in the various systems of the field system 13702 to reduce potential entanglement of the cables that could delay operations or damage other components of those systems. For example, by reducing the number of communication cables in weld system 3001, weld system 5004, purge and inspection system 7001, or weld system 7500 in some embodiments may reduce potential entanglement of the cables during rotation of an inspection device (e.g., inspection laser, inspection camera, or other inspection device), a weld torch, or other component of those systems.

Figure 137C:
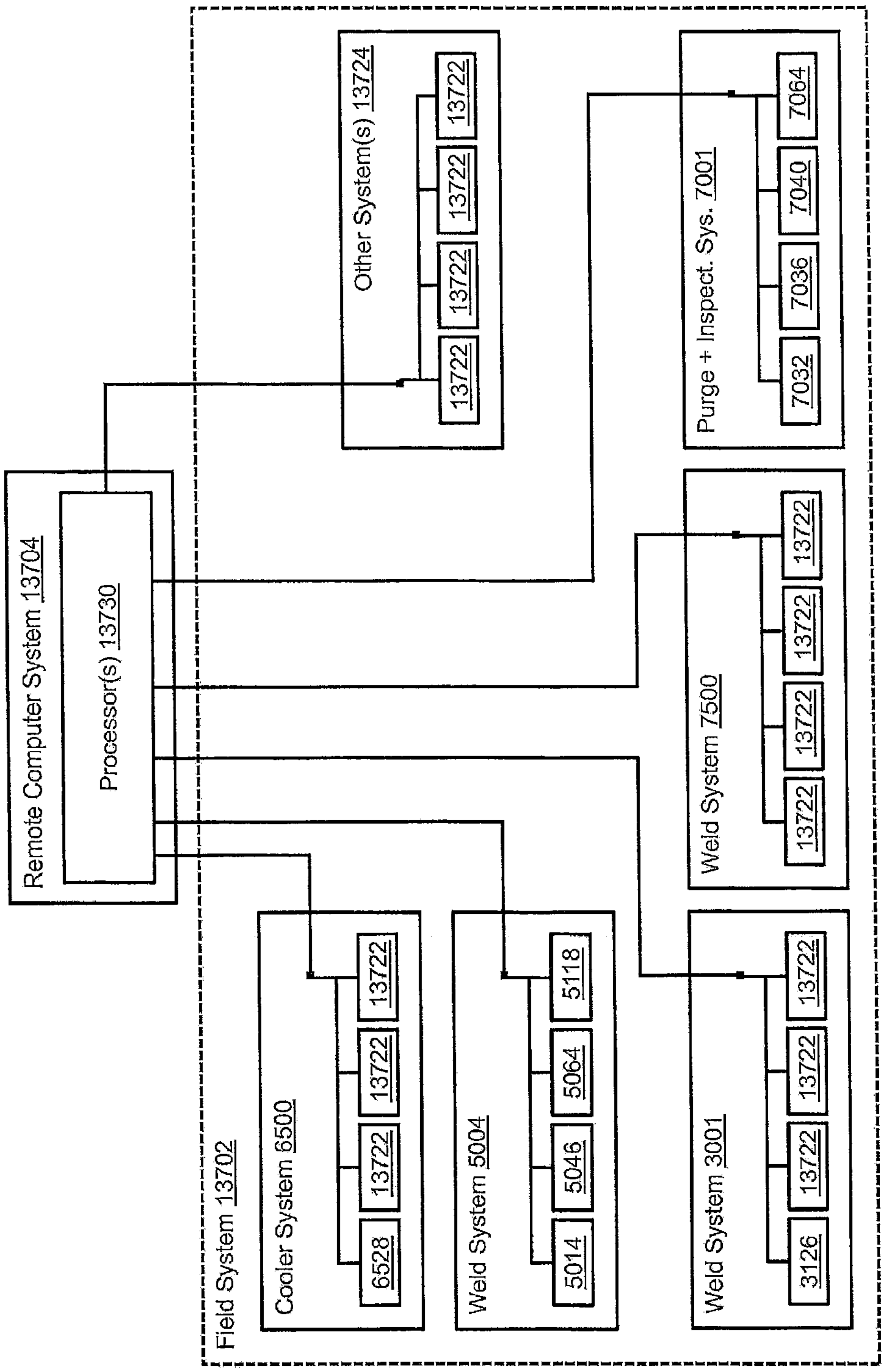

FIG. 137C shows communication links between the remote computer system 13730 and components of the field system 13702 without the field computer system 13716, in accordance with one or more embodiments. In one embodiment, the remote computer system 13704 (or its processors 13730) may communicate with one or more other components of the field system 13702 via one or more wired or wireless communication links between the various systems of field system 13702 and the remote computer system 13704 (e.g., without the need for a separate field computer system 13716). As an example, the remote computer system processors 13730 may receive inspection data, input parameters, operation observation data, or other data from one or more of the systems of the field system 13702 (or their respective electronic modules), such as weld system 3001 (e.g., tie-in internal weld system 3001), weld system 5004 (e.g., internal weld system 5004), cooler system 6500 (e.g., internal cooler system 6500), purge and inspection system 7001, weld system 7500 (e.g., external weld system 7500), or other systems 13724 of the field system 13702 (e.g., internal cooler. In response, the respective systems of the field system 13702 receive one or more responses comprising profile data (e.g., pre-weld profile data, on-the-fly-profile data, post-weld profile data, etc.), instructions for performing operations on an object, alerts (e.g., indicating a defect if a defect exists, an indication to begin or stop an operation, etc.), or other data from the remote computer system 13704. In one use case, for example, if one of the systems of the field system 13702 receives a response comprising instructions for performing an operation on an object, that system may perform the operation in accordance with the transmitted instructions.

As another example, one or more of the electronics modules 5014, 5046, 5064, 5118, or other components of weld system 5004 may comprise one or more processors configured to communicate with the field computer system 13716 (or its processors 13718), the remote computer system (or its processors 13730), or other components of the weld system 5004 via one or more wired or wireless communication links. In one scenario, for instance, one or more of the electronics modules 5014, 5046, 5064, 5118 may receive data from one or more sensors or inspection devices of the weld system 5004, process the sensor or inspection data, transmit the sensor or inspection data to the field computer system processors 13718 or to the remote computer system processors 13730, generate signals to control one or more motors or other mechanics of the weld system 5004 to perform one or more operations, etc.

As another example, one or more of the electronics modules 3126, 13722, or other components of weld system 3001 may comprise one or more processors configured to communicate with the field computer system 13716 (or its processors 13718), the remote computer system (or its processors 13730), or other components of the weld system 3001 via one or more wired or wireless communication links. In one scenario, for instance, one or more of the electronics modules 3126, 13722 may receive data from one or more sensors or inspection devices of the weld system 5004, process the sensor or inspection data, transmit the sensor or inspection data to the field computer system processors 13718 or to the remote computer system processors 13730, generate signals to control one or more motors or other mechanics of the weld system 3001 to perform one or more operations, etc.

As another example, one or more of the electronics modules 6528, 13722, or other components of cooler system 6500 may comprise one or more processors configured to communicate with the field computer system 13716 (or its processors 13718), the remote computer system (or its processors 13730), or other components of the cooler system 6500 via one or more wired or wireless communication links. In one scenario, for instance, one or more of the electronics modules 6528, 13722 may receive data from one or more sensors or inspection devices of the cooler system 6500, process the sensor or inspection data, transmit the sensor or inspection data to the field computer system processors 13718 or to the remote computer system processors 13730, generate signals to control one or more motors or other mechanics of the cooler system 6500 to perform one or more operations, etc.

As another example, one or more of the electronics modules 7032, 7036, 7040, 7064, or other components of purge and inspection system 7001 may comprise one or more processors configured to communicate with the field computer system 13716 (or its processors 13718), the remote computer system (or its processors 13730), or other components of the purge and inspection system 7001 via one or more wired or wireless communication links. In one scenario, for instance, one or more of the electronics modules 7032,7036, 7040, 7064 may receive data from one or more sensors or inspection devices of the purge and inspection system 7001, process the sensor or inspection data, transmit the sensor or inspection data to the field computer system processors 13718 or to the remote computer system processors 13730, generate signals to control one or more motors or other mechanics of the purge and inspection system to perform one or more operations, etc.

As another example, one or more of the electronics modules 3126, 13722, or other components of weld system 3001 may comprise one or more processors configured to communicate with the field computer system 13716 (or its processors 13718), the remote computer system (or its processors 13730), or other components of the weld system 3001 via one or more wired or wireless communication links. In one scenario, for instance, one or more of the electronics modules 3126, 13722 may receive data from one or more sensors or inspection devices of the weld system 5004, process the sensor or inspection data, transmit the sensor or inspection data to the field computer system processors 13718 or to the remote computer system processors 13730, generate signals to control one or more motors or other mechanics of the weld system 3001 to perform one or more operations, etc.

In one embodiment, a field system (e.g., field system 5000, field system 13702, etc.) may work with one or more remote computer systems (e.g., the computer system 5138 that is positioned remotely from field system 5000, remote computer 13704, etc.) to facilitate field testing or physical operations based thereon. The field system may comprise one or more components that may be communicatively connected to one another and/or one or more components of the remote computer systems. In one embodiment, one or more field devices (e.g., field devices 13712) of the field system may be caused to perform one or more operations based on inspections of one or more objects. As an example, an inspection device (e.g., inspection device 13714) of the field system may inspect an object. One or more processors of the field system (e.g., processors 13718 of field computer system 13716) may receive, from the inspection device, inspection data associated with the inspection of the object. Based on the inspection data, the processors may cause a field device of the field system to perform an operation that physically affects the object. The inspection device may comprise an inspection laser, an inspection camera, an x-ray radiography inspection device, a gamma ray inspection device, an ultrasonic inspection device, a magnetic particle inspection device, eddy current inspection device, a temperature monitor, or other inspection device. The inspection data may comprise laser inspection data, camera inspection data, x-ray inspection data, gamma ray inspection data, ultrasound inspection data, magnetic particle inspection data, eddy current inspection data, temperature inspection data, or other inspection data.

In one embodiment, the processors of the field system (e.g., processors 13718 of field computer system 13716) may process the inspection data to generate data related to performing the operation that physically affects the object, and cause the field device to perform the operation based on the operation-related data. In one embodiment, the processors of the field system may transmit (via a transmitter) the inspection data to a remote computer system. Responsive to transmitting the inspection data, the processors may receive, from the remote computer system, data related to performing an operation that physically affects the object. As an example, the operation-related data may be generated at the remote computer system based on the inspection data. Upon receipt of the operation-related data, the processors may cause the field device to perform the operation based on the operation-related data. The processors may cause the field device to perform the operation by transmitting the operation-related data to the field device (e.g., in a format that the field device can interpret and use to perform the operation), use the operation-related data to control the field device to perform the operation, monitoring and providing on-the-fly updates for performing the operation (e.g., by monitoring the object during the performance of the operation), or other techniques.

In one embodiment, the inspection data may be processed to automatically determine whether the object has one or more defects, whether the object is ready for the next stage of operations, or other information. As an example, if one or more defects are detected based on the inspection data, the operation-related data that is generated may relate to performing an operation to address the detected defects. As another example, if it is determined that the object is ready for the next stage of operations, the operation-related data that is generated may relate to performing an operation associated with the next stage of operations.

The field device (e.g., field device 13712) may comprise a welding device, a coating device, an alignment device, a heating device, a cooling device, a shielding device, an inspection device, or other device. The operation-related data may comprise welding-related instructions, coating-related instructions, alteration-related instructions, alignment-related instructions, or other instructions or data. Welding-related instructions may comprise instructions related to welding an interface region between a first object and a second object (e.g., an interface region between pipes or other objects), instructions related to wire feed speed, wire consumption, oscillation width, oscillation waveform, oscillation amplitude, weld time, gas flow rate, power levels of the weld arc, weld current, weld voltage, weld impedance, weld torch travel speed, position of the weld tip of the weld torch along the pipe axis, angular positioning of the weld tip of the weld torch with respect to its rotational plane, the distance of the weld tip of the weld torch to the inner surfaces of the pipes to be welded, etc., for welding, or other welding-related instructions. Coating-related instructions may comprise instructions for coating an object (e.g., coating a pipe or other object), instructions related to preheat temperature, coating thickness, or other coating-related instructions. Alteration-related instructions may comprise instructions related to enlarging at least a portion of an object, instructions related to reducing at least a portion of an object, instructions related to resizing at least a portion of an object (e.g., radially resizing, proportionally resizing, etc.), modifying a shape of at least a portion of an object, or other alteration-related instructions. Alignment-related instructions may comprise instructions related to aligning at least a portion of an object with at least a portion of another object, or other alignment-related instructions.

In one embodiment, based on inspection data associated with an inspection of an interface region between a first object and a second object, one or more processors of a field system (e.g., processors 13718 of field computer system 13716) may obtain data related to performing a welding operation on the interface region. As an example, the processors may transmit (via a transmitter) the inspection data to a remote computer system (e.g., remote computer system 13704), and, in response, the processors may obtain instructions related to welding the interface region from the remote computer system. The processors may cause a field device to weld the interface region based on the welding-related instructions.

In one use case, if it is determined based on the inspection data that a first weld pass layer has a defect (but nevertheless amendable via a second weld pass), the welding-related instructions may comprise instructions for the second weld pass such that the second weld pass is to compensate for the defect of the first weld pass layer. As an example, if the first weld pass layer is determined to be insufficiently thick, the welding-related instructions may comprise instructions for greater weld time or weld wire usage (than if the first weld pass layer was determined to be sufficiently thick) for the second weld pass. As such, the resulting second weld pass layer may be thicker (than it otherwise would have been) to compensate for the insufficiently thick first weld pass layer. As another example, if the first weld pass layer is determined to be too thick, the welding-related instructions may comprise instructions for less weld time or weld wire usage (than if the first weld pass layer was determined to be appropriately thick) for the second weld pass. In this way, the resulting second weld pass layer may be thinner (than it otherwise would have been) to compensate for the extra thickness of the first weld pass layer.

In another use case, if a defect is detected in a first weld pass layer, the welding-related instructions may not necessarily comprise instructions to repair or compensate for the detected defect. As an example, a repair may not be recommended for a defect based on a size of the defect failing to satisfy a predefined defect size threshold (e.g., a minimum repairable defect size for recommending a repair). The predefined defect size threshold may, for example, corresponding to a defect size that would have no significant negative affect on the quality of the weld. As such, in this use case, if the size of the defect in the first weld pass layer is smaller than the predefined defect size threshold, the welding-related instructions may simply comprise instructions for the next weld pass layer as if the defect was not detected.

In one embodiment, based on inspection data associated with an inspection of an object, one or more processors of a field system (e.g., processors 13718 of field computer system 13716) may obtain data related to coating the object. As an example, the processors may transmit (via a transmitter) the inspection data to a remote computer system (e.g. remote computer system 13704), and, in response, the processors may obtain instructions related to coating the object from the remote computer system. The processors may cause a field device to apply one or more layers of coating to the object based on the coating-related instructions. In one use case, if it is determined based on the inspection data that welding of the object is completed and that the completed weld is within specification, the remote computer system may transmit instructions to begin coating the object to the processors of the field system.

In one embodiment, based on inspection data associated with an inspection of an object, one or more processors of a field system (e.g., processors 13718 of field computer system 13716) may obtain data related to altering a size, a shape, or other aspect of the object. As an example, the processors may transmit (via a transmitter) the inspection data to a remote computer system (e.g., remote computer system 13704), and, in response, the processors may obtain instructions related to altering the object from the remote computer system. The processors may cause a field device to enlarge at least a portion of the object, reduce at least a portion of the object, radially resize at least a portion of the object, alter a shape of at least a portion of the object (e.g., machining a new bevel on the end of a pipe or performing shape alternations), or perform other alterations to the object based on the alteration-related instructions.

In one embodiment, based on inspection data associated with an inspection of an object, one or more processors of a field system (e.g., processors 13718 of field computer system 13716) may obtain data related to aligning the object. As an example, the processors may transmit (via a transmitter) the inspection data to a remote computer system (e.g., remote computer system 13704), and, in response, the processors may obtain instructions related to aligning the object from the remote computer system. The processors may cause a field device to align at least a portion of the object with at least a portion of another object based on the alignment-related instructions. In one use case, for instance, where the objects are pipes, and the remote computer system's analysis of the inspection data indicates that an alignment error, the alignment-related instructions received from the remote computer system may comprise instructions to alter the position of at least one of the pipes that would fix the alignment error (e.g., angular error that caused a gap between the pipes, positional error that caused Hi-Lo issues, etc.).

In one embodiment, one or more operations may be caused to be performed on one or more objects based on inspections of multiple objects. In this way, for example, inspection data from inspections of multiple objects may be utilized to perform analysis on the objects as a whole. In some scenarios, such analysis may otherwise be incomplete if isolated to inspection data from a single object. As an example, although individual pipes of a pipeline may each be within specification, the pipeline or a portion thereof (comprising multiple ones of the individual pipes) as a whole may be out of specification. As another example, although individual pipes of the pipeline may be ready for the next stage of operations, the pipeline or the pipeline portion as a whole may not be ready for the next stage of operations. By using the inspection data from inspections of each of the pipes of the pipeline or the pipeline portion, a more complete analysis on the pipe or the pipeline portion as a whole may be performed.

In one embodiment, one or more processors of a field system (e.g., processors 13718 of field computer system 13716) may receive (via a receiver) first inspection data associated with an inspection of a first object and second inspection data associated with an inspection of a second object. Based on the first inspection data and the second inspection data, the processors may cause a field device of the field system to perform an operation that physically affects one or more objects. The first inspection data and the second inspection data may each comprise at least one of laser inspection data, camera inspection data, x-ray inspection data, gamma ray inspection data, ultrasound inspection data, magnetic particle inspection data, eddy current inspection data, temperature inspection data, or other inspection data. The inspection of the first object and the inspection of the second object may be performed by the same inspection device or different inspection devices.

In one embodiment, the processors of the field system (e.g., processors 13718 of field computer system 13716) may process the first inspection data and the second inspection data to generate data related to performing an operation that physically affects an object, and cause the field device to perform the operation based on the operation-related data. In one embodiment, the processors of the field system may transmit the first inspection data and the second inspection data to a remote computer system (e.g., remote computer system 13704). Responsive to transmitting the first inspection data and the second inspection data, the processors may receive, from the remote computer system, data related to performing the operation that physically affects the object. As an example, the operation-related data may be generated at the remote computer system based on the first inspection data and the second inspection data. Upon receipt of the operation-related data, the processors of the field system may cause the field device to perform the operation based on the operation-related data.

In one embodiment, operation-related data (on which performance of an operation on an object is based) may additionally or alternatively be based on one or more input parameters of one or more operations performed on one or more objects (e.g., the object, another object, etc.). As an example, a field device of a field system may perform the operations prior to an inspection of the object. The input parameters of the prior-performed operations, inspection data associated with the inspection of the object, or other data may be transmitted to a remote computer system. Upon receipt of the transmitted data, the remote computer system may generate the operation-related data based on the input parameters, the inspection data, or other data. If, for example, a defect is detected based on the inspection data, the input parameters may be analyzed in connection with the detected detect to determine a cause of the defect (e.g., actual output does not match theoretical output of the input parameters), and the operation-related data may be generated such that the operation-related data may be used to perform an operation that is to repair or compensate for the detected defect or the cause of the defect.

In one use case, if a first weld pass layer resulting from a welding operation is determined to be insufficiently thick (based on inspection data associated with an inspection of the first weld pass layer), input parameters for the weld operation may be taken in account to determine a cause of the insufficient thickness of the first weld pass layer. For example, if insufficient weld time or weld wire is determined to be a cause of the insufficient thickness, welding-related instructions for a second weld pass may be generated to comprise input parameters calibrated to compensate for the insufficient thickness of the first weld pass layer or the determined cause thereof (e.g., greater weld time, greater wire usage, etc.).

Processing of Data from a Field System

In one embodiment, a computer system (e.g., computer system 5138, remote computer system 13704, field computer system 13716, etc.) may work with one or more field systems (e.g., field system 5000, field system 13702) to facilitate field testing or physical operations based thereon.

The computer system may comprise one or more processors or other components that may be communicatively connected to one another and/or one or more components of one or more field systems. The computer system may be a local computer system with respect to at least one of the field systems or a remote computer system with respect to at least one of the field system. In one embodiment, the processors of the computer system may receive, from a field system, inspection data associated with an inspection of an object. The processors may process the inspection data to generate data related to performing an operation that physically affects the object. The processors may transmit the operation-related data to the field system to cause the field system to perform the operation that physically affects the object. As an example, the field system may perform the operation based on the operation-related data. As described herein, the operation-related data may comprise welding-related instructions, coating-related instructions, alteration-related instructions, alignment-related instructions, or other instructions or data.

In one embodiment, the processors of the computer system may receive (via a receiver) inspection data associated with inspections of multiple objects from one or more field systems, and generate, based on the inspection data, data related to performing an operation that physically affects an object of at least one of the field systems. The processors may transmit the operation-related data to the field system to cause the field system to perform the operation that physically affects the object. The inspection data associated with inspections of each object may comprise at least one of laser inspection data, camera inspection data, x-ray inspection data, gamma ray inspection data, ultrasound inspection data, magnetic particle inspection data, eddy current inspection data, temperature inspection data, or other inspection data. The inspections of the multiple objects may be performed by the same inspection device or different inspection devices.

In one embodiment, operation-related data (on which performance of an operation on an object is based) may additionally or alternatively be based on one or more input parameters of one or more operations performed on the object. As an example, a field device (e.g., field device 13712) of a field system may perform the operations prior to an inspection of the object. The processors of the computer system may obtain the input parameters of the prior-performed operations, inspection data associated with the inspection of the object, or other data from the field system or other sources. The processors of the computer system may generate the operation-related data based on the obtained data. For example, if a defect is detected based on the inspection data, the input parameters may be analyzed in connection with the detected defect to determine a cause of the defect (e.g., actual output does not match theoretical output of the input parameters), and the operation-related data may be generated such that the operation-related data may be used to perform an operation that is to repair or compensate for the detected defect or the cause of the defect.

In one embodiment, operation-related data (on which performance of an operation on an object is based) may additionally or alternatively be based on observations of one or more operations performed on one or more other objects. In one embodiment, the processors of the computer system may monitor one or more operations on one or more objects. As an example, the processors may monitor the operations via one or more inspection devices, such as one or any combination of an inspection laser, an inspection camera, an x-ray radiography inspection device, a gamma ray inspection device, an ultrasonic inspection device, a magnetic particle inspection device, eddy current inspection device, a temperature monitor, or other inspection device. During such monitoring, the processors may obtain data related to observations of the operations, such as observations of one or more field devices during performance of the operations, observations of the objects during performance of the operations, observations of environmental conditions during performance of the operations, or other observations. The processors may compare the observations to determine circumstances that are likely causes of defects, and may generate operation-related data for subsequent operations to avoid or mitigate such defects. In one embodiment, the processors of the computer system may compare one or more sets of observations of an operation performed on one or more objects determined to have a defect (after the performance of the operation) against one or more other sets of observations of the same operation performed on one or more other objects without the defect to determine the circumstances that likely caused the defect (as described in further detail herein elsewhere). In one embodiment, the determination of such circumstances may be stored and used (e.g., in conjunction with the determination of such circumstances occurring in other field systems) to (i) generate and select one or more operation protocols for subsequent operations (as described herein) to prevent or reduce defects, (ii) enable detection of defects earlier in the process (e.g., as described herein via active monitoring as operations are performed, on-the-fly inspection during an operation, etc.), or (iii) provide other advantages to create better products for current and future customers.

As an example, analysis of inspection data for multiple welds and the operation observation data for those welds may reveal that lack of fusion defects are significantly more likely when the welding voltage drops by more than 0.5V below a welding voltage input parameter while the torch is welding between the 2 o'clock and 4 o'clock positions on a pipe. In contrast, the welding voltage can drop 1.2V below the welding voltage input at other positions on the pipe without causing a lack of fusion defect. Based on these observations, the processors of the computer system may generate and send new welding input parameters that instruct the welding devices to increase the welding voltage by 0.7V when the torch is between the 2 o'clock and 4 o'clock positions. As another example, if the analysis reveals that the welding voltage drop circumstance causes lack of fusion defects while the torch is welding downhill (but not while welding uphill), the generated new welding input parameters may instruct the welding devices to implement the welding voltage increase only when the torch is welding downhill. As yet another example, if the analysis reveals that the welding voltage drop circumstance causes lack of fusion defects for external welds (but not for internal welds), the generated new welding input parameters may instruct external welding devices to implement the welding voltage increase.

In one embodiment, the processors of the computer system may obtain inspection data associated with inspections of one or more objects, and compare the inspection data against a predefined quality profile for the objects. Based on the comparison, the processors may determine whether the object has one or more defects, whether the object is ready for the next stage of operations, or other information. As an example, if one or more defects are detected based on the inspection data, the operation-related data that is generated may relate to performing an operation to address the detected defects. As another example, if it is determined that the object is ready for the next stage of operations, the operation-related data that is generated may relate to performing an operation associated with the next stage of operations.

As an example, the predefined quality profile may comprise one or more size criteria, shape criteria, consistency criteria, alignment criteria, temperature criteria, color criteria, or other criteria. In one use case, a predefined quality profile for a pipe of a pipeline may comprise one or more acceptable ranges for the interior diameter of the pipe, the exterior diameter of the pipe, the thickness of the pipe, the size of the interface region between the pipe and another pipe to which the pipe is or is to be welded, the height of the weld in the interior of the pipe, the height of the weld on the exterior of the pipe, the temperature of the weld material or the pipe (e.g., during a welding operation), the color of the weld material or the pipe during a welding operation (e.g., which may indicate the temperature of the weld material or the pipe), or other criteria. The predefined quality profile may correspond to a particular level of quality, such as a "gold" standard of quality (e.g., a high level of quality), a minimum required level of quality, etc.

In one embodiment, the processors of the computer system may provide inspection data associated with inspections of one or more objects, one or more analytical results from an analysis of the inspection data, or other data for presentation to a user (e.g., an operator, an inspector, a manager, or other user). In one embodiment, the processors may receive a user input of the user indicating a defect related to at least one of the objects. As an example, the user may specify where and what the defect is on an object. Based on the specified defect, the processors may generate operation-related data that may be used to cause a field system to perform an operation to repair or compensate for the defect related to the object.

In one embodiment, one or more operation triggers may be provided to address circumstances that result in one or more defects (e.g., in an object, a group of objects, a project, etc.). As an example, despite using the same input parameters for a particular operation, field devices utilizing those input parameters to perform the operation may perform the operation differently from one another, which may cause an object (operated on by one field device) to have a defect while another object (operated on by another field device) may be free of defects. These differences in results may be caused by one or more of the actual inputs to the field devices being different from expected inputs, one or more of the actual outputs of the field devices being different from expected outputs, one or more imperfections in objects on which the field devices are operating, one or more actual operational conditions being different from acceptable operational conditions (e.g., environmental conditions, object misalignment or misplacement, etc.), or other circumstances.

In one embodiment, the processors of the computer system may monitor one or more operations on one or more objects. During such monitoring, the processors may obtain data related to observations of the operations, such as observations of one or more field devices during performance of the operations, observations of the objects during performance of the operations, observations of environmental conditions during performance of the operations, or other observations. The processors may compare the observations with one another to generate one or more operation triggers. Upon implementation of such triggers, one or more field systems may cause one or more operations to be performed responsive to one or more subsequent observations satisfying respective ones of the triggers. The triggers may comprise one or more triggers that cause operations for preventing or otherwise reducing defects, or other triggers.

In one embodiment, based on the data related to the observations of the operations, the processors of the computer system may compare a first set of observations of an operation performed on an object determined to have a defect (after the performance of the operation) against one or more other sets of observations of the same operation performed on one or more other objects without the defect. Upon comparison, the processors may determine one or more differences between the first set of observations and the other sets of observations. Based on the differences, the processors may generate one or more triggers associated with one or more operations (e.g., an operation for preventing the defect or other operation). As an example, if there are common differences between the first set of observations and each of the other sets of observations, it may be likely that the observed circumstances corresponding to the common differences caused the defect. As such, if those circumstances are observed during a subsequent operation, one or more operations for addressing those circumstances may be effectuated to prevent the defect from occurring (e.g., by halting the subsequent operation until the circumstances are no longer occurring, by modifying the input parameters for the subsequent operation to compensate for the circumstances, by generating an alert indicating the circumstances, etc.).

In one embodiment, based on the data related to the observations of the operations, the processors of the computer system may compare a second set of observations of the same operation performed on another object determined to have a defect (after performance of the operation) against the other sets of observations (of the same operation performed on the other objects without the defect). Upon comparison, the processors may determine one or more differences between the second set of observations and the other sets of observations. As an example, the processors may then compare (i) the common differences between the first set of observations and each of the other sets of observations with (ii) the common differences between the second set of observations and each of the other sets of observations to determine the differences shared by the first and second sets of observations (e.g., the similarities the first and second sets of observations share with one another that are common differences with other sets of observations for other objects without the defect). Based on the differences common to both the first and second sets, the processors may generate one or more triggers associated with one or more operations (e.g., an operation for preventing the defect or other operation).

In one use case, by comparing one or more sets of observations of a welding operation for a root pass (for one or more interface regions between pipes), the processors of the computer system may determine common differences that at least one set of observations of the welding operation (that produced a defect in its root pass) has with other sets of observations of the welding operation that produced a root pass without the defect. As an example, if the common differences comprise a certain deviation between one or more measured inputs and the input parameters used for the welding operation, the processors may generate one or more triggers that activate one or more operations for addressing the deviation when such deviation is detected. For example, subsequent welding operations for a root pass may be monitored and, if the deviation from the input parameters used by a welding device for the root pass welding operation occurs, the generated triggers may cause its associated operations to be performed to address the deviation (e.g., modifying the input parameters to cause the actual inputs for the welding operation to be within expected input ranges associated with the unmodified input parameters, generating an alert that is provided to an operator or other individual or system, stopping the welding operation, etc.). In other use cases, one or more similar types of triggers may be generated for addressing circumstances during a coating operation, a pre-heating operation, a cooling operation, an alignment operation, a shielding operation, an inspection operation, or other operation, respectively.

In another use case, during monitoring of a subsequent operation on an object, a circumstance corresponding to observations common to objects with defects may be detected. In response, an operation trigger for the circumstance may cause an operation associated with the operation trigger to be performed the object. As an example, the processors of the computer system may modify one or more input parameters for the subsequent operation or another operation to be performed after the subsequent operation. The processors may, for instance, modify the input parameters for the subsequent operation during the subsequent operation, modify the input parameters for the other following operation prior to the other following operation, or perform other modification operations associated with the operation trigger. The input parameters that are modified may comprises one or more welding parameters, coating parameters, alignment parameters, alteration parameters, or other parameters. As another example, the processors may stop the subsequent operation (e.g., halting the subsequent operation until further notice), generate an alert during the subsequent operation indicating the circumstances (e.g., generating and transmitting the alert to a field system performing the subsequent operation, providing the alert to a manager, field operator, or other personnel, etc.), or perform other operations associated with the operation trigger. In this way, for example, the foregoing operation triggers and/or active monitoring may enable detection of defects earlier in the process and prevent or reduce defects to provide more effective and efficient operations and provide current and future customers with better products.

Operation Protocols and Operations Based Thereon

In one embodiment, one or more operation protocols for performing one or more operations may be generated based on inspections of one or more objects. As an example, the processors of the computer system (e.g., computer system 5138, remote computer system 13704, field computer system 13716, etc.) may receive, from a field system (e.g., field system 5000, field system 13702, etc.), inspection data associated with an inspection of an object (e.g., an inspection prior to the performance of one or more operations that physically affect the object, an inspection during the performance of the operations, an inspection subsequent to the performance of the operations, etc.). The processors may generate an operation protocol (associated with at least one operation type of the operations) based on the inspection data and one or more input parameters used to perform the operations. The operation protocol may, for instance, comprise a welding protocol, a coating protocol, an alignment protocol, an alteration protocol, or other protocol. One or more parameters of the operation protocol may comprise one or more welding parameters, coating parameters, alignment parameters, alteration parameters, or other parameters.

In one embodiment, the processors of the computer system may select the operation protocol for performing a subsequent operation similar to at least one of the operations (that physically affected the object). The processors may generate, based on at least one input parameter of the operation protocol, data related to performing the subsequent operation. The processors may transmit the operation-related data to the field system to cause the field system to perform the subsequent operation. As an example, the field system may perform the subsequent operation based on the operation-related data.

In one embodiment, based on the inspection data, the processors of the computer system may detect a defect related to the object. Responsive to the defect detection, the processors may generate the operation protocol such that the operation protocol comprises a set of input parameters having at least one input parameter different from a set of input parameters used to perform the operations. As an example, a predefined operation protocol may be used to perform an operation on the object. If a defect with the object is detected based on an inspection of the object, the predefined operation protocol may be modified to avoid similar defects when the predefined operation protocol is utilized for one or more subsequent operations similar to the operation that likely caused the detected defect with the object. The modified operation protocol may be stored as a new predefined operation protocol, replace the previous version of the predefined operation protocol, etc.

In one use case, a predefined welding operation protocol may be used to perform a welding operation to weld two pipes together, where the predefined welding operation protocol may comprise inputs parameters related to wire feed speed, wire consumption, oscillation width, oscillation waveform, oscillation amplitude, weld time, gas flow rate, power levels of the weld arc, weld current, weld voltage, weld impedance, weld torch travel speed, position of the weld tip of the weld torch along the pipe axis, angular positioning of the weld tip of the weld torch with respect to its rotational plane, the distance of the weld tip of the weld torch to the inner surfaces of the pipes to be welded, or other parameters. If, for instance, it is determined that the welding operation produced a weld pass layer of insufficient thickness, the predefined welding operation protocol may be modified to allow for greater weld time, greater wire usage (e.g., increased wire feed speed), or other changes to the input parameters of the predefined welding operation protocol. As such, when the modified operation protocol is subsequently used to perform a similar operation on two similar pipes, the modification to the input parameters may prevent the thickness insufficiency issue.

In one embodiment, based on the inspection data, the processors of the computer system may determine whether a quality of one or more aspects of the object resulting from the operations (that physically affected the object) meets or exceeds a quality standard indicated by a predefined quality profile. As an example, the processors may generate the operation protocol such that the operation protocol comprises one or more input parameters (used to perform the operations) responsive to the quality of the aspects of the object meeting or exceeding the quality standard indicated by the predefined quality profile. The predefined quality profile may correspond to a particular level of quality, such as a "gold" standard of quality (e.g., a high level of quality), a minimum required level of quality, etc. If the quality of the aspects of the object meets or exceeds the quality standard indicated by the predefined quality profile, the input parameters (used to perform the operations that produce such results) may be used to generate the operation protocol (e.g., such that the operation protocol comprises some or all of the input parameters). In this way, for example, the operation protocol may be used to perform one or more subsequent operations similar to the operation that produced such results so that the subsequent operations will produce a similar quality.

As another example, if the quality of the aspects of the object fails to satisfy the quality standard (indicated by the predefined quality profile), the processors may generate the operation protocol such that the operation protocol does not comprise one or more input parameters (used to perform the operations that resulted in the inspected state of the object). In one use case, if a predefined operation protocol (comprising the input parameters used to perform the operations) was selected for performing at least one of the operations, and the quality of the aspects of the resulting object failed to satisfy a minimum required level of quality, one or more input parameters of the predefined operation protocol may be modified to avoid subsequent unsatisfactory results when the predefined operation protocol is used to perform subsequent operations.

In one embodiment, the processors of the computer system may obtain inspection data associated with inspections of one or more objects, and compare the inspection data against a predefined quality profile for the objects to determine whether the quality of one or more aspects of the objects meets or exceeds a quality standard indicated by the predefined quality profile. As an example, based on the comparison, the processors may determine whether an object has one or more defects, whether the object is ready for the next stage of operations, or other information. As another example, responsive to the quality of the aspects of an object exceeding the quality standard indicated by the predefined qualify profile, the processors may generate a new quality profile based on the inspection data, where the new quality profile indicates a new quality standard that is based on the inspection data. The new quality profile may, for example, be stored in a database for use in analyzing one or more aspects resulting from one or more subsequent operations.

In one embodiment, the processors of the computer system may provide inspection data associated with inspections of one or more objects, one or more analytical results from an analysis of the inspection data, or other data for presentation to a user (e.g., an operator, an inspector, a manager, or other user). In one embodiment, the processors may receive a user input of the user indicating a level of quality of one or more aspects of an object resulting from one or more operations (e.g., a low level of quality, a high level of quality, etc.). Responsive to the user input, the processors may generate a new quality profile associated with the indicated level of quality, where the new quality profile indicates a new quality standard that is based on the inspection data. The new quality profile may, for example, be stored in a database for use in analyzing one or more aspects resulting from one or more subsequent operations.

In one embodiment, the processors of the computer system may generate one or more operation protocols based on data related to input parameters used to perform one or more operations, data related to observation of the operations, inspection data associated with an inspection of objects on which the operations are performed (e.g., prior to, during, or subsequent to an operation), or other data. As an example, the processors may analyze the inspection data to determine whether and which of the objects have defects. The processors may then compare one or more sets of observations of an operation performed on one or more objects determined to have a defect (after the performance of the operation) against one or more other sets of observations of the same operation performed on one or more other objects without the defect to determine the circumstances that likely caused the defect (as described in further detail herein elsewhere). Based on the comparison, the processors may generate the operation protocols such that the operation protocols avoid or would otherwise address the circumstances (likely to have caused the defect) when the operation protocols are used for one or more subsequent operations (e.g., subsequent operations that are the same or similar to the operation performed and observed).

As a further example, if it is observed that input parameters used to perform the operation on one or more objects are different from input parameters used to perform the operation on one or more other objects, the processors may compare these observations with one another to determine whether the differences in input parameters likely caused the defect. For instance, the observations may be compared to determine common differences between the input parameters used to perform the operation on objects with a resulting defect and the input parameters used to perform the operations on objects without the defect. Based on the common differences, the processors may generate the operation protocols such that the operation protocols avoid including the input parameters that likely caused the defect. The generated operation protocols may be stored so that the operation protocols may be used in one or more subsequent operations (e.g., subsequent operations that are the same or similar to the operation performed and observed). For example, in one use case with respect to welding protocols, analysis of inspection data for multiple welds and the operation observation data for those welds may reveal that lack of fusion defects are significantly more likely when the welding voltage drops by more than 0.5V below a welding voltage input parameter while the torch is welding between the 2 o'clock and 4 o'clock positions on a pipe. In contrast, the welding voltage can drop 1.2V below the welding voltage input at other positions on the pipe without causing a lack of fusion defect. Based on these observations, the processors of the computer system may generate welding protocols comprising new welding input parameters that indicates a need to increase the welding voltage by 0.7V when the torch is between the 2 o'clock and 4 o'clock positions.

Additional Example Flowcharts

Figure 138:
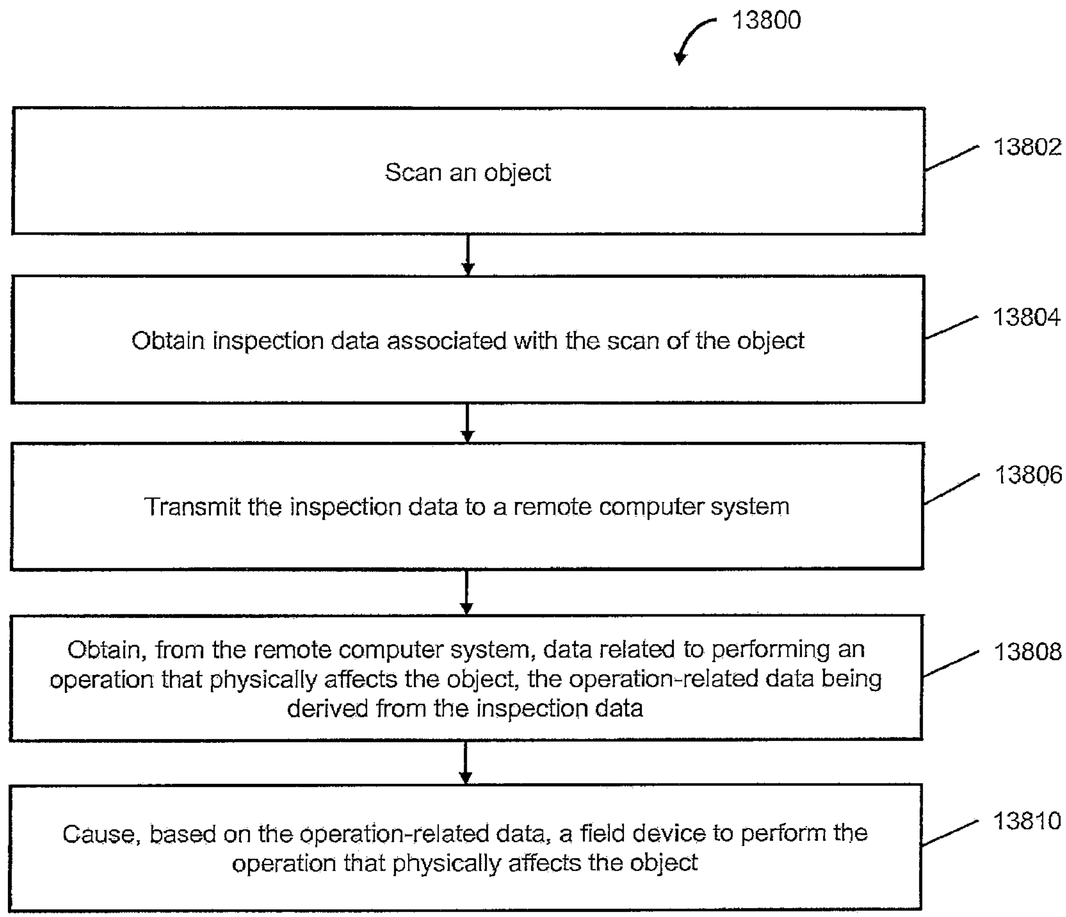

FIG. 138 shows a flowchart of a method 13800 for facilitating, by a field system (e.g., one of field systems 13702), field testing and physical operations based thereon, in accordance with one or more embodiments. The processing operations of the method presented below are intended to be illustrative and non-limiting. In some embodiments, for example, the method may be accomplished with one or more additional operations not described, and/or without one or more of the operations discussed. Additionally, the order in which the processing operations of the methods are illustrated (and described below) is not intended to be limiting. In some embodiments, the method may be implemented at least by one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

In one embodiment, an object may a scanned (13802). As an example, the object may be scanned prior to, during, or subsequent to an operation that physically affects the object being performed on the object to derive inspection data. Operation 13802 may be performed by an inspection device that is the same or similar to the inspection device 13714, in accordance with one or more embodiments. As an example, the inspection device may comprise an inspection laser, an inspection camera, an x-ray radiography inspection device, a gamma ray inspection device, an ultrasonic inspection device, a magnetic particle inspection device, eddy current inspection device, a temperature monitor, or other inspection device. The inspection data may comprise laser inspection data, camera inspection data, x-ray inspection data, gamma ray inspection data, ultrasound inspection data, magnetic particle inspection data, eddy current inspection data, temperature inspection data, or other inspection data.

In one embodiment, inspection data associated with the scan of the object may be obtained (13804). Operation 13804 may be performed by a field computer system that is the same or similar to the field computer system 13716, in accordance with one or more embodiments.

In one embodiment, the inspection data may be transmitted to a remote computer system (e.g., the remote computer system 13720) (13806). Operation 13806 may be performed by a field computer system that is the same or similar to the field computer system 13716, in accordance with one or more embodiments.

In one embodiment, data related to performing an operation that physically affects the object may be obtained from the remote computer system responsive to transmitting the inspection data (13808). As an example, the operation-related data may be derived from the inspection data. As another example, the operation-related data may be derived by the remote computer system from the inspection data, other inspection data associated with a scan of another object, input parameters used to perform operations on the respective objects prior to the scans, or other data. Operation 13808 may be performed by a field computer system that is the same or similar to the field computer system 13716, in accordance with one or more embodiments.

In one embodiment, based on the operation-related data, a field device of the field system may be caused to perform the operation that physically affects the objected (13810). Operation 13810 may be performed by a field computer system that is the same or similar to the field computer system 13716, in accordance with one or more embodiments.

In one embodiment, with respect to FIG. 138, the operation-related data may comprise welding-related instructions, such as instructions related to wire feed speed, wire consumption, oscillation width, oscillation waveform, oscillation amplitude, weld time, gas flow rate, power levels of the weld arc, weld current, weld voltage, weld impedance, weld torch travel speed, position of the weld tip of the weld torch along the pipe axis, angular positioning of the weld tip of the weld torch with respect to its rotational plane, the distance of the weld tip of the weld torch to the inner surfaces of the pipes to be welded, or other instructions. Based on the welding-related instructions, a field device of the field system may be caused to perform a welding operation on a first object and a second object (e.g., welding two pipes together, welding two other objects together, etc.).

In one embodiment, with respect to FIG. 138, the operation-related data may comprise coating-related instructions, such as instructions related to preheat temperature, coating thickness, or other instructions. Based on the coating-related instructions, a field device of the field system may be caused to apply one or more layers of coating to an object.

In one embodiment, with respect to FIG. 138, the operation-related data may comprise alignment-related instructions. Based on the alignment-related instructions, a field device of the field system may be caused to align an object (e.g., aligning two pipes for welding, aligning other objects with one another, etc.).

In one embodiment, with respect to FIG. 138, the operation-related data may comprise alteration-related instructions. Based on the alteration-related instructions, a field device of the field system may be caused to alter an object, such as enlarging at least a portion of the object, reducing at least a portion of the object, resizing at least a portion of the object, modifying a shape of at least a portion of the object, or other alterations.

Figure 139:
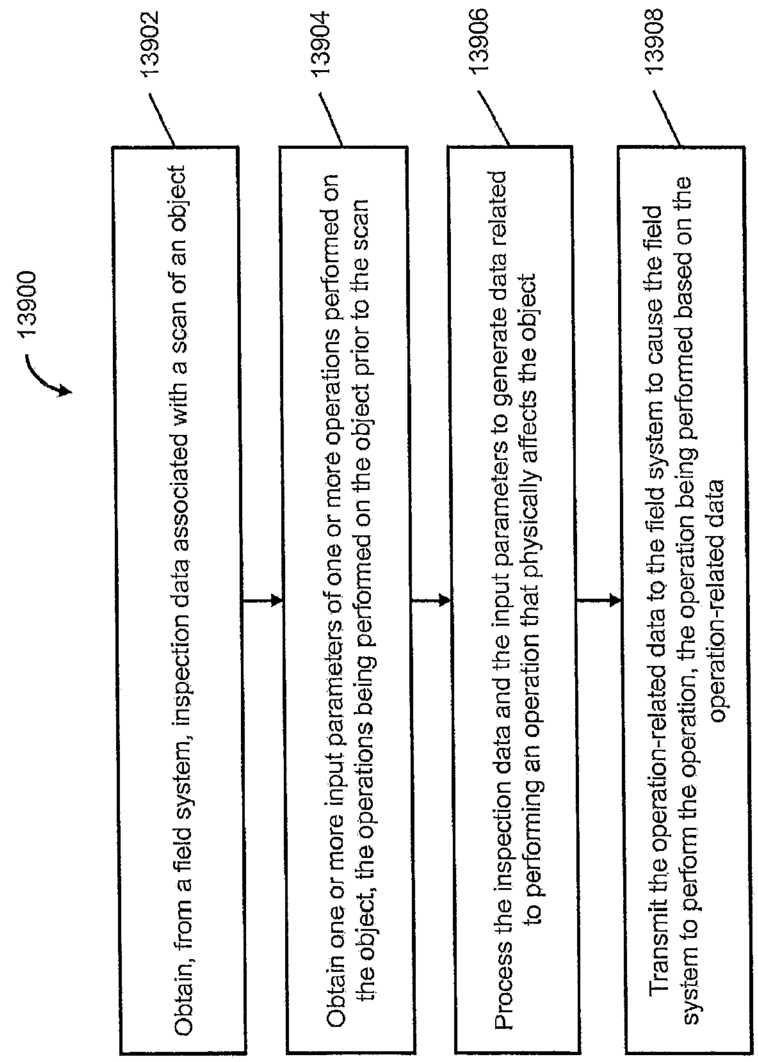

FIG. 139 shows a flowchart of a method 13900 for facilitating, by a computer system, field testing and physical operations based thereon, in accordance with one or more embodiments. The processing operations of the method presented below are intended to be illustrative and non-limiting. In some embodiments, for example, the method may be accomplished with one or more additional operations not described, and/or without one or more of the operations discussed. Additionally, the order in which the processing operations of the methods are illustrated (and described below) is not intended to be limiting. In some embodiments, the method may be implemented at least by one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

In one embodiment, inspection data associated with a scan of an object may be obtained from a field system (13902). Operation 13902 may be performed by an object profile subsystem that is the same or similar to the object profile subsystem 13732, in accordance with one or more embodiments. As an example, the inspection data may comprise laser inspection data, camera inspection data, x-ray inspection data, gamma ray inspection data, ultrasound inspection data, magnetic particle inspection data, eddy current inspection data, temperature inspection data, or other inspection data.

In one embodiment, one or more input parameters of one or more operations performed on the object may be obtained (13904). As an example, the operations performed on the object may be operations that physically affected the object and were performed on the object prior to the scan of the object (on which the inspection data is based). The input parameters may be input parameters used to perform the operations on the object (e.g., welding parameters, coating parameters, or other input parameters). Operation 13904 may be performed by an operation monitoring subsystem that is the same or similar to the operation monitoring subsystem 13738, in accordance with one or more embodiments.

In one embodiment, the inspection data and the input parameters may be processed to generate data related to perform an operation that physically affects the object (13906). As an example, the operation-related data may comprise one or more of the types of operation-related data described above with respect to FIG. 138 (e.g., welding-related instructions, coating related instructions, etc.). Operation 13906 may be performed by an operation manager subsystem that is the same or similar to the operation manager subsystem 13734, in accordance with one or more embodiments.

In one embodiment, the operation-related data may be transmitted to the field system to cause the field system to perform the operation, where the operation is performed based on the operation-related data (13908). As an example, the operations that the field system may be caused to perform may comprise one or more of the types of operations (that a field device of the field system is caused to perform) described above with respect to FIG. 138. Operation 13908 may be performed by an operation manager subsystem that is the same or similar to the operation manager subsystem 13734, in accordance with one or more embodiments.

Figure 140:
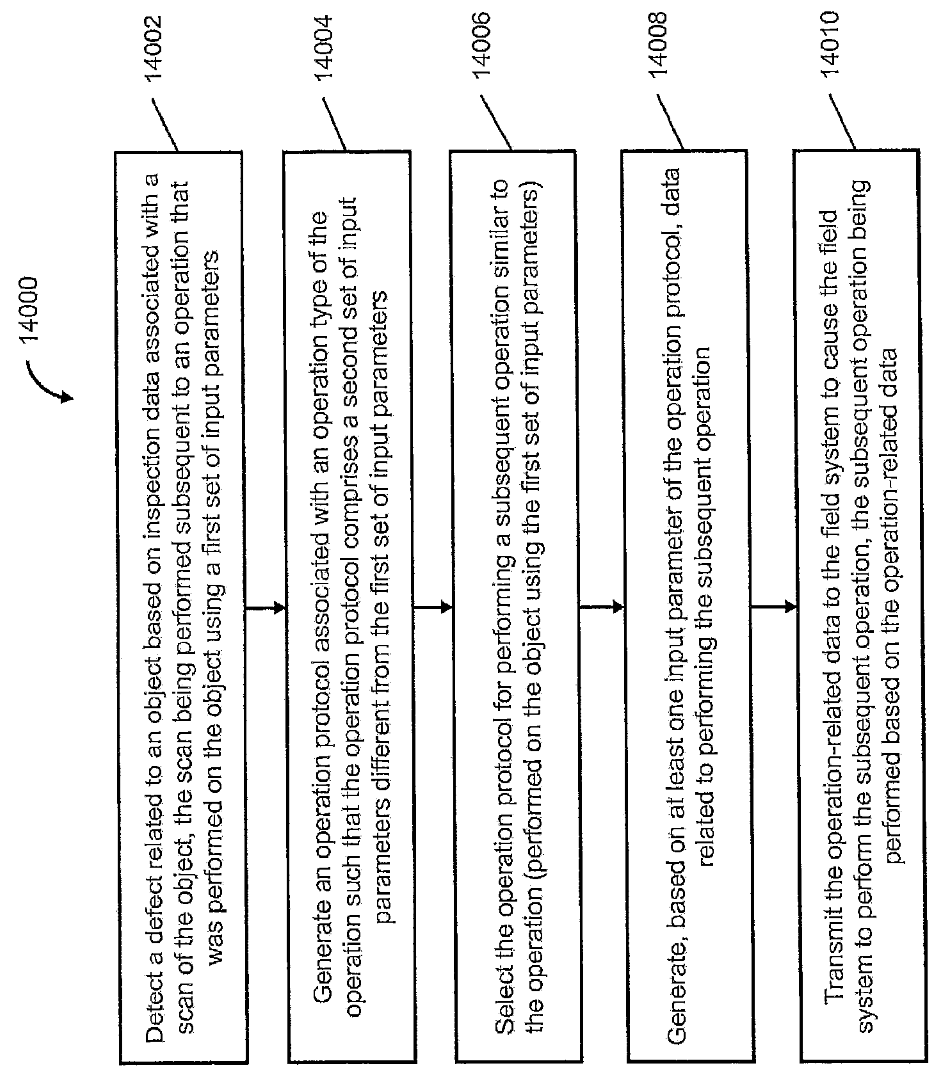

FIG. 140 shows a flowchart of a method 14000 for facilitating, by a computer system, field testing and physical operations based thereon, in accordance with one or more embodiments. The processing operations of the method presented below are intended to be illustrative and non-limiting. In some embodiments, for example, the method may be accomplished with one or more additional operations not described, and/or without one or more of the operations discussed. Additionally, the order in which the processing operations of the methods are illustrated (and described below) is not intended to be limiting. In some embodiments, the method may be implemented at least by one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

In one embodiment, a defect related to an object may be detected based on inspection data associated with a scan of the object (14002). As an example, the scan may be performed subsequent to an operation that was performed on the object using a first set of input parameters (e.g., welding parameters, coating parameters, or other input parameters). The inspection data may be received from a field system, where the inspection data may comprise laser inspection data, camera inspection data, x-ray inspection data, gamma ray inspection data, ultrasound inspection data, magnetic particle inspection data, eddy current inspection data, temperature inspection data, or other inspection data. Operation 14002 may be performed by an object profile subsystem that is the same or similar to the object profile subsystem 13732, in accordance with one or more embodiments.

In one embodiment, an operation protocol associated with an operation type of the operation (that was performed on the object using the first set of input parameters) may be generated (14004). As an example, the operation protocol may be generated such that the operation protocol comprises a second set of input parameters different from the first set of input parameters (e.g., that was used to perform the operation that likely caused the defect). In one use case, for example, the first set of input parameters and the inspection data may be analyzed to determine which of the parameters likely caused the defect, and those parameters (determined to have likely caused the defect) may be modified to generate the second set of input parameters for the operation protocol. Upon generation, the operation profile may be stored in a database (e.g., an operation protocol database or other database) for use with subsequent operations. Operation 14004 may be performed by an operation protocol subsystem that is the same or similar to the operation protocol subsystem 13736, in accordance with one or more embodiments.

In one embodiment, the operation protocol may be selected for performing a subsequent operation similar to the operation (performed on the object using the first set of input parameters) (14006). As an example, if the previous operation was a welding operation for a root pass, the subsequent operation may also be a welding operation for a root pass. As another example, if the previous operation was a welding operation for a hot pass, the subsequent operation may also be a welding operation for a hot pass. Operation 14006 may be performed by an operation protocol subsystem that is the same or similar to the operation protocol subsystem 13736, in accordance with one or more embodiments.

In one embodiment, data related to performing the subsequent operation may be generated based on at least one parameter of the operation protocol (14008). Operation 14008 may be performed by an operation manager subsystem that is the same or similar to the operation manager subsystem 13734, in accordance with one or more embodiments.

In one embodiment, the operation-related data may be transmitted to the field system to cause the field system to perform the subsequent operation, where the subsequent operation is performed based on the operation-related data (14010). Operation 14010 may be performed by an operation manager subsystem that is the same or similar to the operation manager subsystem 13734, in accordance with one or more embodiments.

Figure 141:
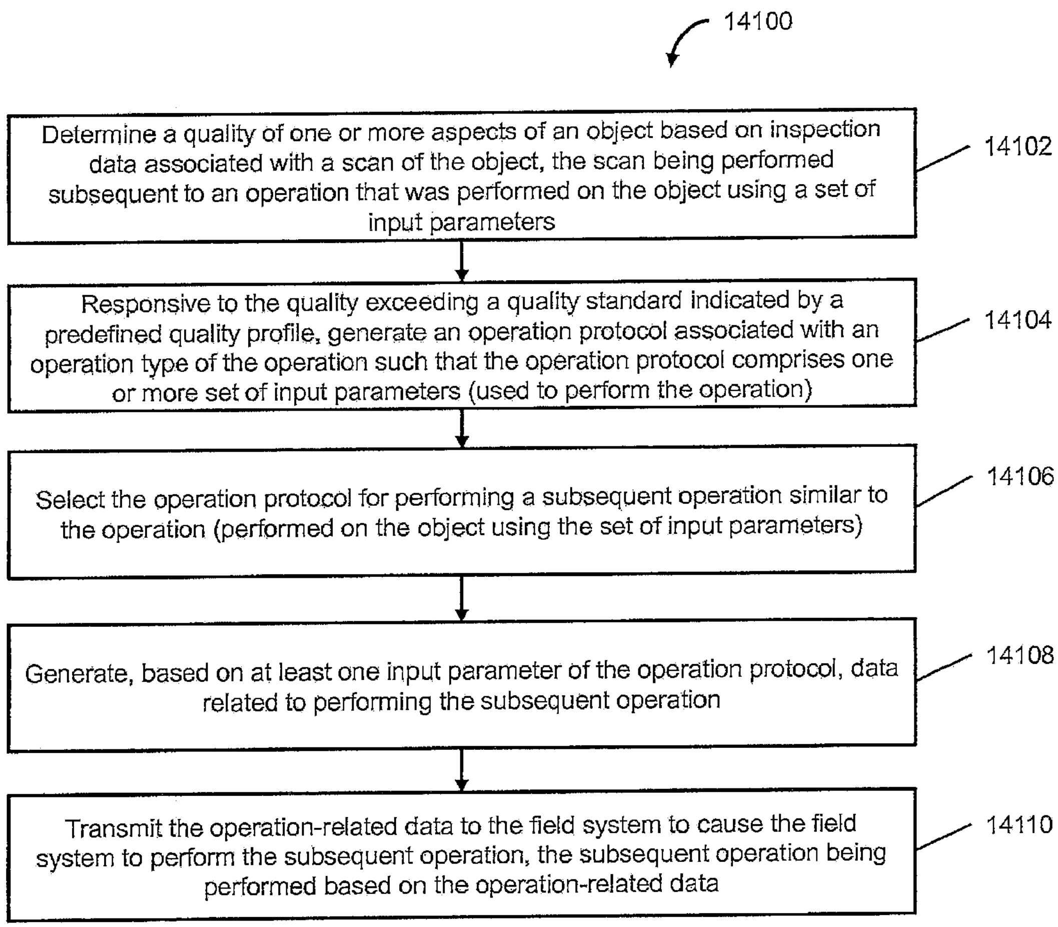

FIG. 141 shows a flowchart of a method 14100 for facilitating, by a computer system, field testing and physical operations based thereon, in accordance with one or more embodiments. The processing operations of the method presented below are intended to be illustrative and non-limiting. In some embodiments, for example, the method may be accomplished with one or more additional operations not described, and/or without one or more of the operations discussed. Additionally, the order in which the processing operations of the methods are illustrated (and described below) is not intended to be limiting. In some embodiments, the method may be implemented at least by one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

In one embodiment, a quality of one or more aspects of an object may be determined based on inspection data associated with a scan of the object (14102). As an example, the scan may be performed subsequent to an operation that was performed on the object using a set of input parameters (e.g., welding parameters, coating parameters, or other input parameters). The inspection data may be received from a field system, where the inspection data may comprise laser inspection data, camera inspection data, x-ray inspection data, gamma ray inspection data, ultrasound inspection data, magnetic particle inspection data, eddy current inspection data, temperature inspection data, or other inspection data. Operation 14102 may be performed by an object profile subsystem that is the same or similar to the object profile subsystem 13732, in accordance with one or more embodiments.

In one embodiment, responsive to the quality exceeding a quality standard (indicated by a predefined quality profile), an operation protocol associated with an operation type of the operation (that was performed on the object using the set of input parameters) may be generated (14104). As an example, the operation protocol may be generated such that the operation protocol comprises one or more parameters of the set of input parameters (used to perform the operation). As another example, the operation protocol may be generated such that the operation protocol comprises all the parameters of the set of input parameters. Upon generation, the operation profile may be stored in a database (e.g., an operation protocol database or other database) for use with subsequent operations. Operation 14104 may be performed by an operation protocol subsystem that is the same or similar to the operation protocol subsystem 13736, in accordance with one or more embodiments.

In one embodiment, the operation protocol may be selected for performing a subsequent operation similar to the operation (performed on the object using the first set of input parameters) (14106). Operation 14106 may be performed by an operation protocol subsystem that is the same or similar to the operation protocol subsystem 13736, in accordance with one or more embodiments.

In one embodiment, data related to performing the subsequent operation may be generated based on at least one parameter of the operation protocol (14108). Operation 14108 may be performed by an operation manager subsystem that is the same or similar to the operation manager subsystem 13734, in accordance with one or more embodiments.

In one embodiment, the operation-related data may be transmitted to the field system to cause the field system to perform the subsequent operation, where the subsequent operation is performed based on the operation-related data (14110). Operation 14110 may be performed by an operation manager subsystem that is the same or similar to the operation manager subsystem 13734, in accordance with one or more embodiments.

Figure 142:
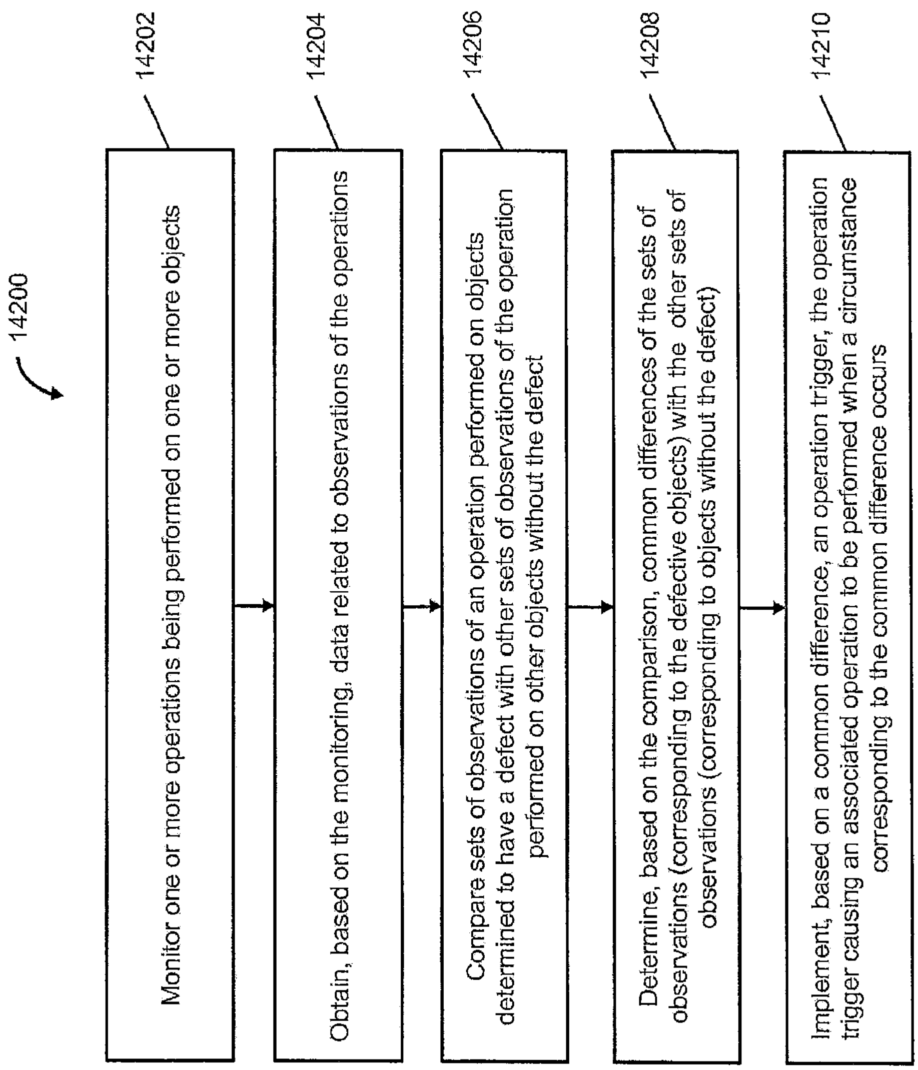

FIG. 142 shows a flowchart of a method 14200 for facilitating, by a computer system, field testing and physical operations based thereon, in accordance with one or more embodiments. The processing operations of the method presented below are intended to be illustrative and non-limiting. In some embodiments, for example, the method may be accomplished with one or more additional operations not described, and/or without one or more of the operations discussed. Additionally, the order in which the processing operations of the methods are illustrated (and described below) is not intended to be limiting. In some embodiments, the method may be implemented at least by one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

In one embodiment, one or more operations being performed on one or more objects may be monitored (14202). Operation 14202 may be performed by an operation monitoring subsystem that is the same or similar to the operation monitoring subsystem 13738, in accordance with one or more embodiments.

In one embodiment, data related to observations of the operations may be obtained based on the monitoring (14204). As an example, the observation-related data may comprise data related to observations of one or more field devices during performance of the operations, observations of the objects during performance of the operations, observations of environmental conditions during performance of the operations, or other observations. Operation 14204 may be performed by an operation monitoring subsystem that is the same or similar to the operation monitoring subsystem 13738, in accordance with one or more embodiments.

In one embodiment, one or more sets of observations of an operation (performed on one or more objects determined to have a defect) may be compared with one or more other sets of observations of the operation (performed on one or more other operations without the defect) (14206). Operation 14206 may be performed by an operation protocol subsystem that is the same or similar to the operation protocol subsystem 13736, in accordance with one or more embodiments.

In one embodiment, one or more common differences of the sets of observations (corresponding to the defective objects) with the other sets of observations (corresponding to the objects without the defect) may be determined based on the comparison (14208). Operation 14208 may be performed by an operation protocol subsystem that is the same or similar to the operation protocol subsystem 13736, in accordance with one or more embodiments.

In one embodiment, one or more operation triggers may be implemented based on the common differences (14210). As an example, upon implementation of an operation trigger based on one of the common differences, the operation trigger may cause an associated operation to be performed when a circumstance corresponding to the common different occurs in a subsequent operation. Operation 14210 may be performed by an operation protocol subsystem that is the same or similar to the operation protocol subsystem 13740, in accordance with one or more embodiments.

In one embodiment, the universal cloud logging system (herein also as "uLog", or "uLog system", or "uCloud") is a system of software, hardware, equipment and telecommunications networks which seamlessly gather welding data to provide for quality control and management, weld data logging, task and project management, safety and inspection control and management, real time weld activity monitoring and data reporting and visualization. The uLog system can use wired systems and devices and/or wireless systems and devices and/or Bluetooth systems and devices and/or cloud-based systems and devices. The uLog system can use software technology, mobile device and desktop technology, telecommunications technology and other technologies in products, apparatus, systems, processes and methods achieving high quality welding, inspection, control, management and safety results. The uLog system can be used in onshore, offshore, ship-based, platform-based, structure-based, or other construction conditions. In an embodiment, the uLog can process Bluetooth communications and data can be transmitted to the uLog for processing by Bluetooth or any other wireless means.

In an embodiment uLog has tools which seamlessly gather welding data and/or welding data logs. The uLog system can in its many and varied embodiments use welding data and other pipeline construction and related data to produce one or more of the following: analytic results, field reports, control data, quality control data, automatically generated administrative reports, daily summaries, data archives, welding records, materials use data, quality control records and project management records.

In an embodiment, the uLog can be used to maintain and/or generate procedure qualification records ("PQR") and data relating thereto. The uLog functionality can also be used to record, develop, maintain and manage welding procedure specifications ("WPS").

The uLog can provide for a user to see, record, track, measure, and analyze log data regarding one or more welds and/or welding activities and/or pipeline construction and/or coating activities and/or inspection activities and/or management activities. By use of the uLog and its analytical functionalities a user can achieve improved weld quality and quantify welding process results. In its many and varied embodiments, the uLog can have functionalities to process data in real-time or based upon historical data. This allows a user to make decisions in real time and/or based upon historical data. In an embodiment, the uLog can provide a user real time data regarding any aspect of ongoing welding, coating, inspection, pipe handling, project management, pipeline construction and/or construction activities and achieves real-time quality control of welding and/or welding activities and/or other activities regarding pipeline construction. In another embodiment, the uLog can also provide functionalities regarding construction management, project management, accounting, inventory and materials management, as well as financial controls and auditing of both financials and materials. The uLog can also provide functionalities regarding human resources management and timekeeping, as well as payroll accounting and support.

Without limitation, various embodiments of the present disclosure can be, for example, embodied as a computer system, a method, a cloud-based service, or a computer program product. Accordingly, various embodiments can take the form of an entirely hardware embodiment, an entirely software embodiment (e.g., one or more computer application, such as an "App" (or "App") to be implemented on a mobile device and/or an application to be implanted on a desktop computer), or an embodiment combining software and hardware aspects. Furthermore, embodiments can take the form of a computer program product stored on a computer-readable storage medium having computer-readable instructions (e.g., software) embodied in the storage medium. Various embodiments can take the form of web-implemented computer software. Any suitable computer-readable storage medium can be utilized including, for example, hard disks, compact disks, DVDs, optical storage devices, solid state storage devices, and/or magnetic storage devices.

Various embodiments are described below with reference to schematics, block diagrams, images and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions can be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions can also be stored in a computer-readable memory that can direct a computer or other programmable data processing apparatus to function in a manner such that the instructions stored in the computer-readable memory produce an article of manufacture that can be configured for implementing the function specified in the flowchart block or blocks. The computer program instructions can also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions. Implementation can also be by special purpose software and equipment running special purpose software and/or applications. The entire system can be accessible from various computer platforms, including mobile devices.

Figure 143:
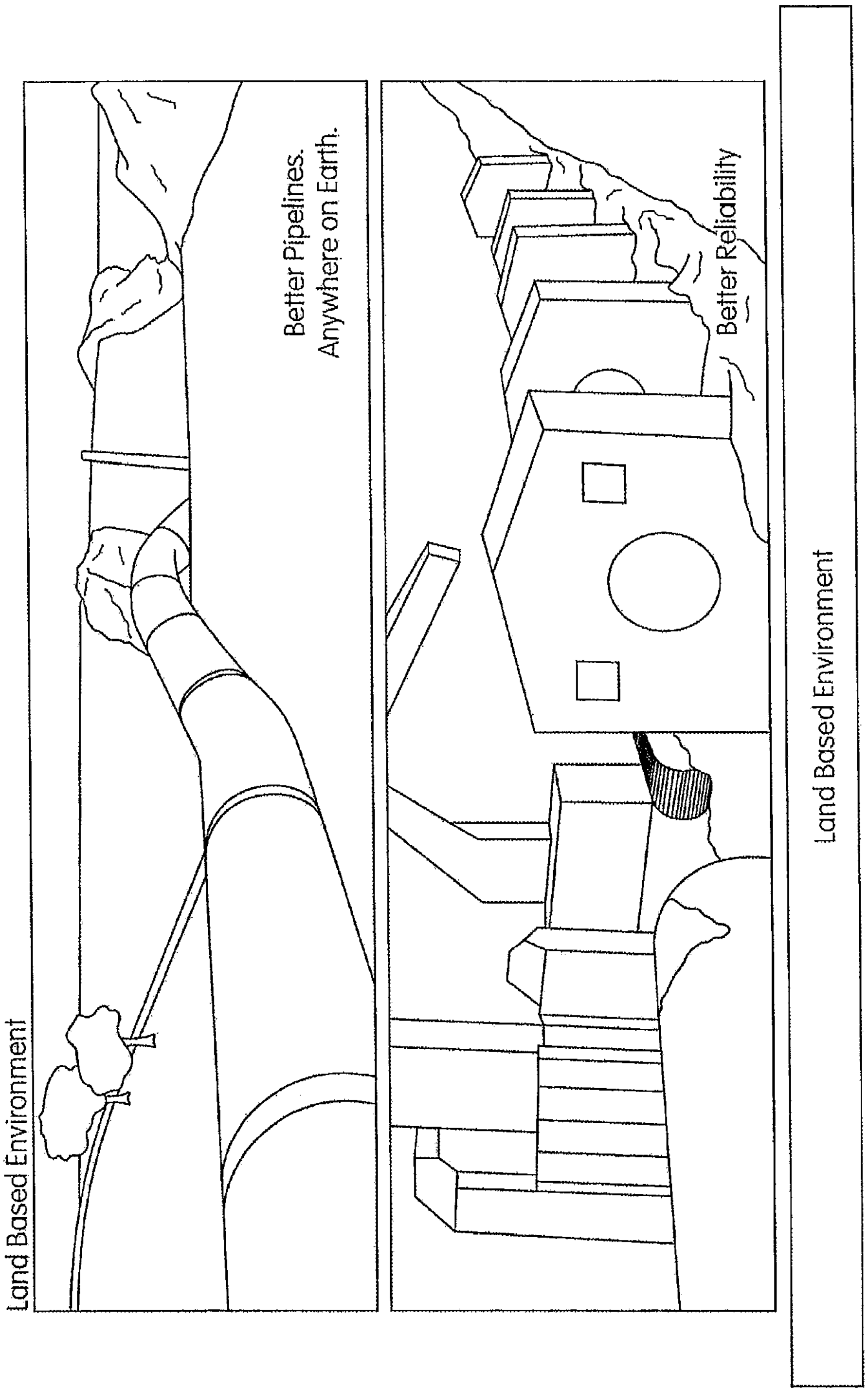

FIG. 143 contains images of land based pipelines. The uLog can be used in the manufacturing of any pipeline in any construction environment. Construction environments can be on land, off shore, both on land and off shore, under water, sub-sea, on a facility, on a ship, on a barge, on a platform, on a structure, in space, or in any other construction environment. For example, the uLog can be used in the control of welding of pipelines.

Figure 144:
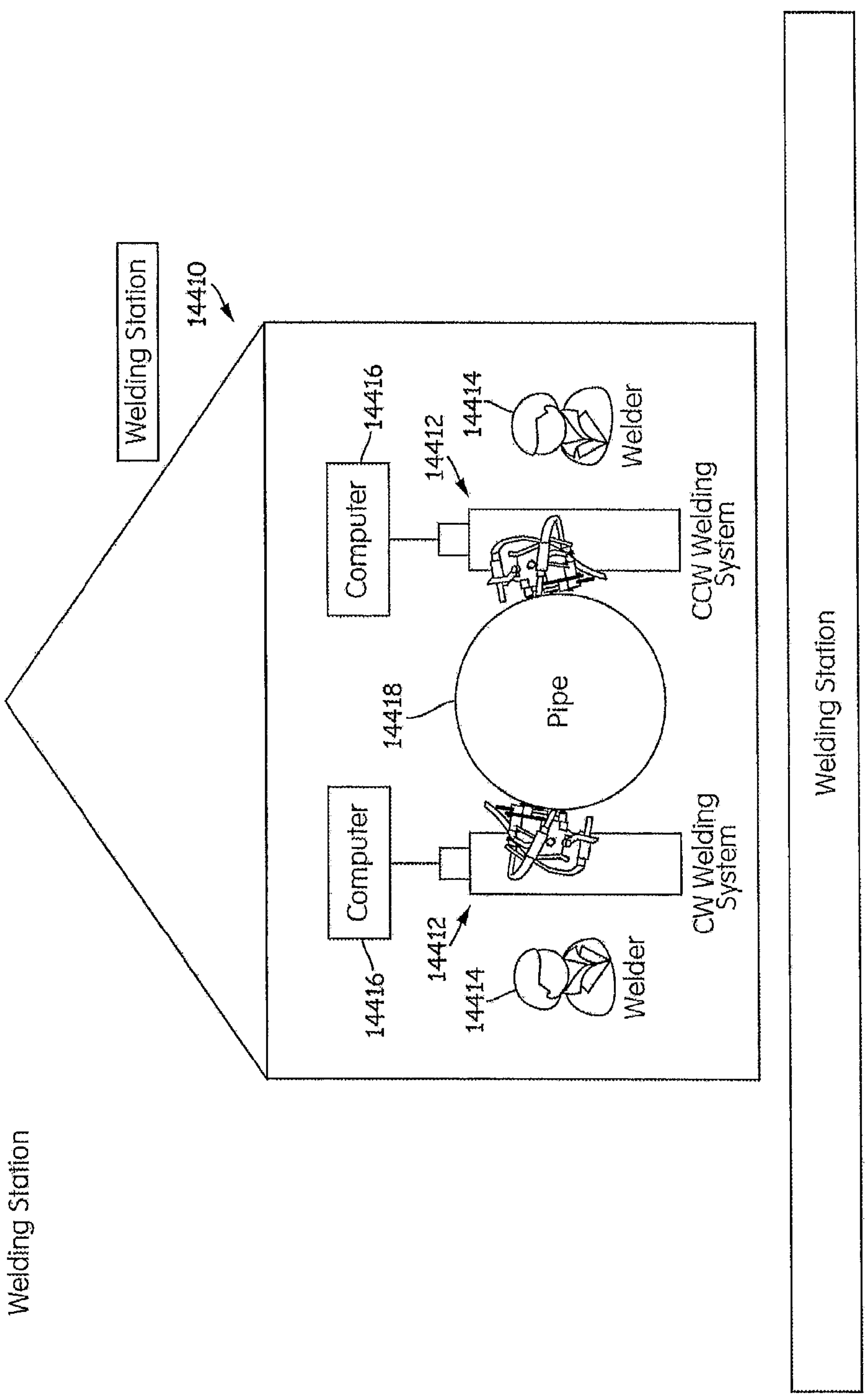

FIG. 144 shows a welding station 14410, according to an embodiment of the present disclosure. The uLog can be used in conjunction with the weld station 14410. The uLog can process data from the weld station 14410. The weld station may include a welding machine or weld system 14412, a welder 14414 or an automated or robot weld system. In an embodiment, the welding machine or weld system 14412 is an orbital welding machine. An example of a welding machine or weld system 14412 is described in U.S. Pat. No. 3,974,356 to Nelson et al., issued on Aug. 10, 1976, the entire content of which is incorporated herein by reference. The welding station 14410 may be controlled by a computer system 14416 to control the welding process and also acquire data about the welding process. The uLog implemented on the computer system 14416 can control the welding station 14410 including the welding machine 14412 and can also process data from a workpiece 14418 such as a pipe and/or regarding work or welding applied upon the workpiece (e.g., the pipe) 14418.

Figure 145:
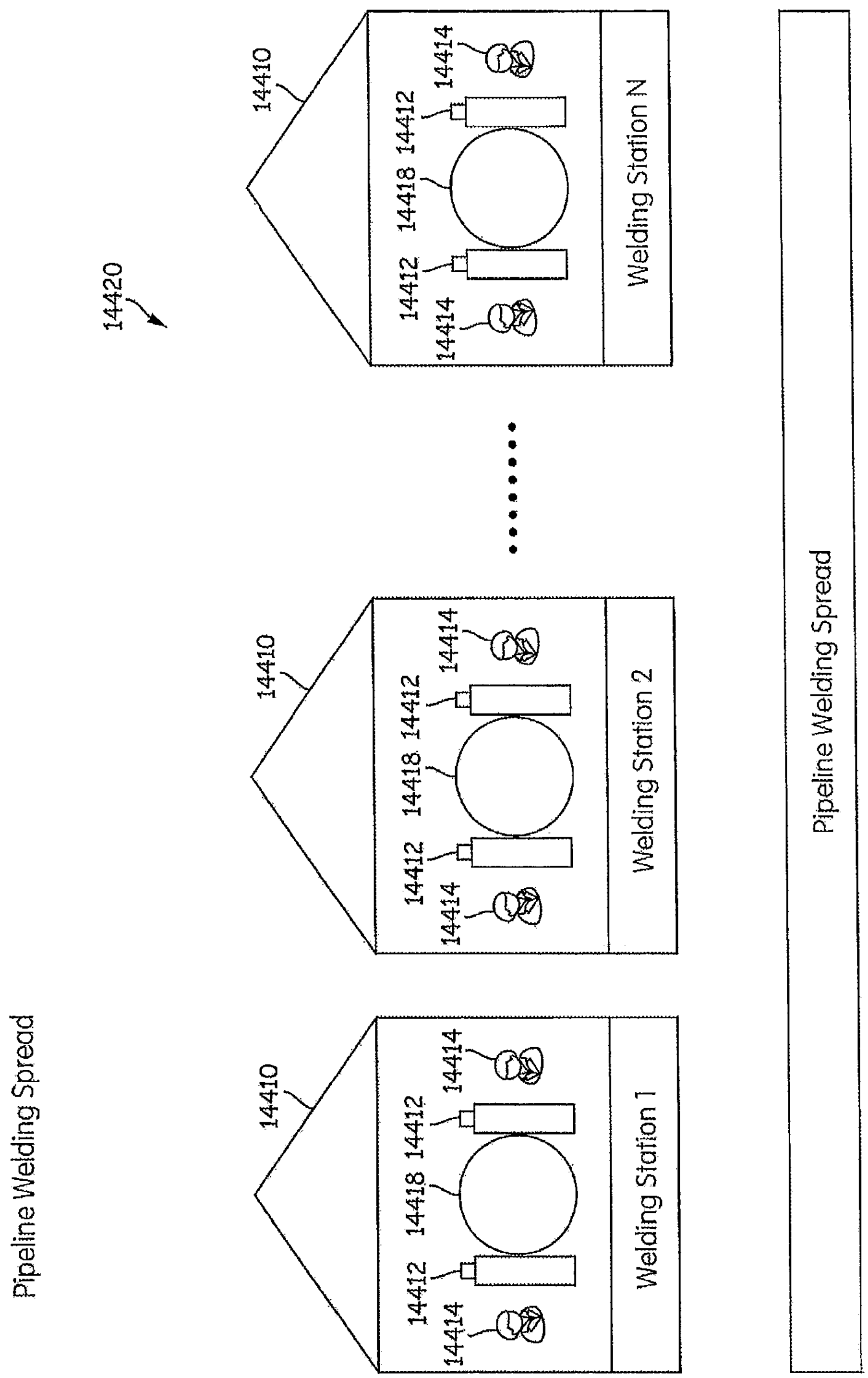

FIG. 145 shows a plurality of pipeline welding stations 14410 (a pipeline welding spread 14420), according to an embodiment of the present disclosure. The uLog can be used on the pipeline welding spread 14420. The uLog can process data from one or more welding stations 14410 in the pipeline welding spread 14420. In an embodiment, the uLog can process data from a number or many welding stations 14410. There is no limitation to the locations of the weld stations 14410. Pipelines 14418 can be very long and the one or more stations can be at any location without limitation. Further, the uLog supports processing data from multiple projects and/or activities and/or tasks and/or people at the same time. The uLog user expertise can be used across projects and well as within projects. The uLog allows a user to work with data from one or a number of projects simultaneously or in series, in real-time or on an historical basis.

Figure 146:
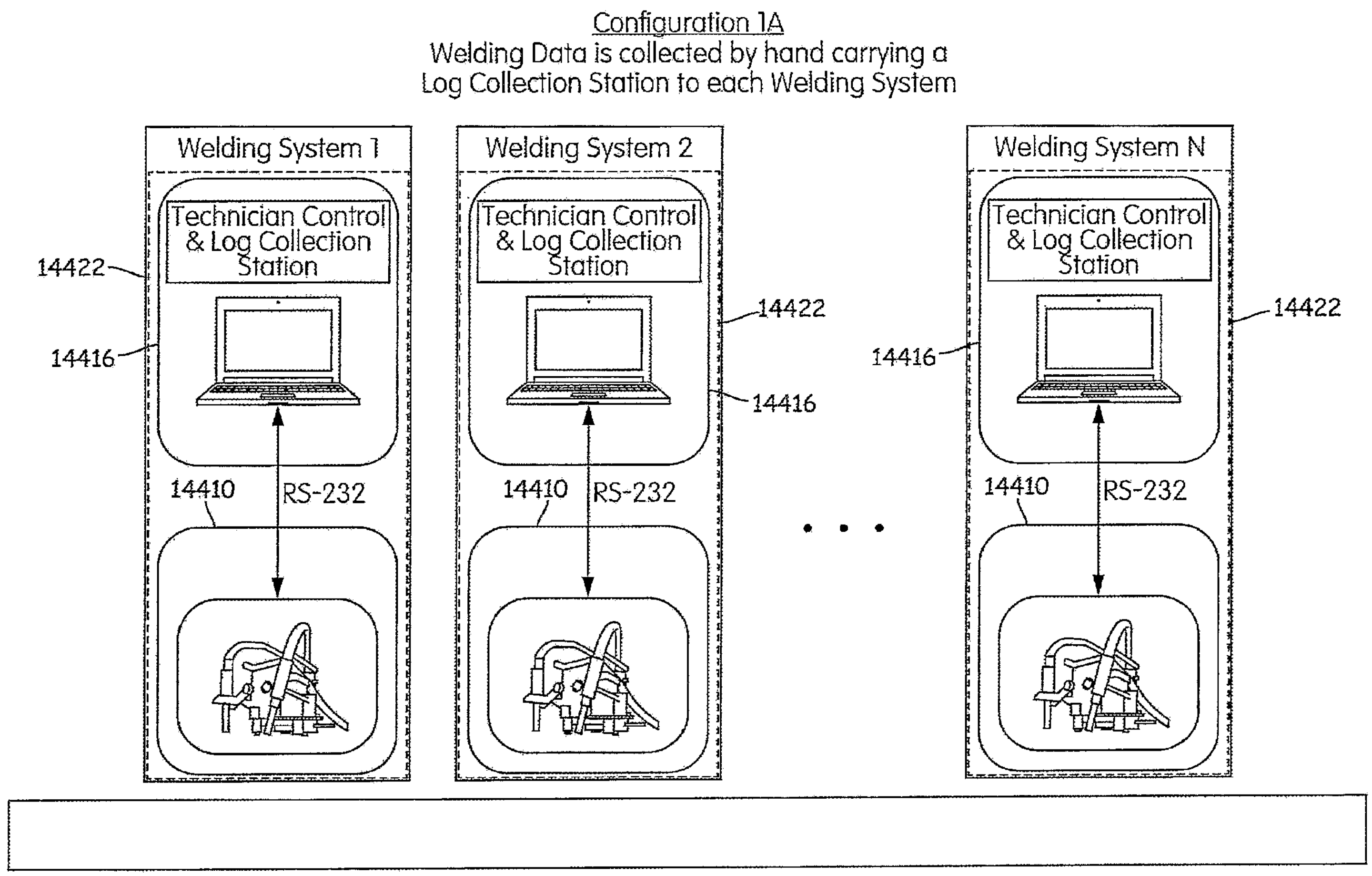

FIG. 146 is a schematic diagram of a system with a plurality of welding stations 14410 in communication with a plurality of control and log collection stations (computer systems) 14416, according to an embodiment of the present disclosure. In an embodiment, welding data can be collected at a log collection station 14416 associated with a welding station 14410. The control and log collection stations 14416 can process data for one or more welds and/or weld stations 14410. The data collection and/or processing can originate from pipeline construction, the weld station equipment, operator, welder or other data entry means. In non-limiting example, equipment processors, embedded processors, computers, sensors, process control devices, wired or wireless analog and digital devices and hand-held data processors can be used to gather, communicate and/or process weld station and/or weld system data. In an embodiment, one or more technicians can control the weld station(s) 14410 and control and log collection station(s) 14416. There is no limit to the number of log collections stations 14416 which can be used with uLog. The log collection station 14416 together with the weld station 14410 for a weld system 14422.

Figure 147:
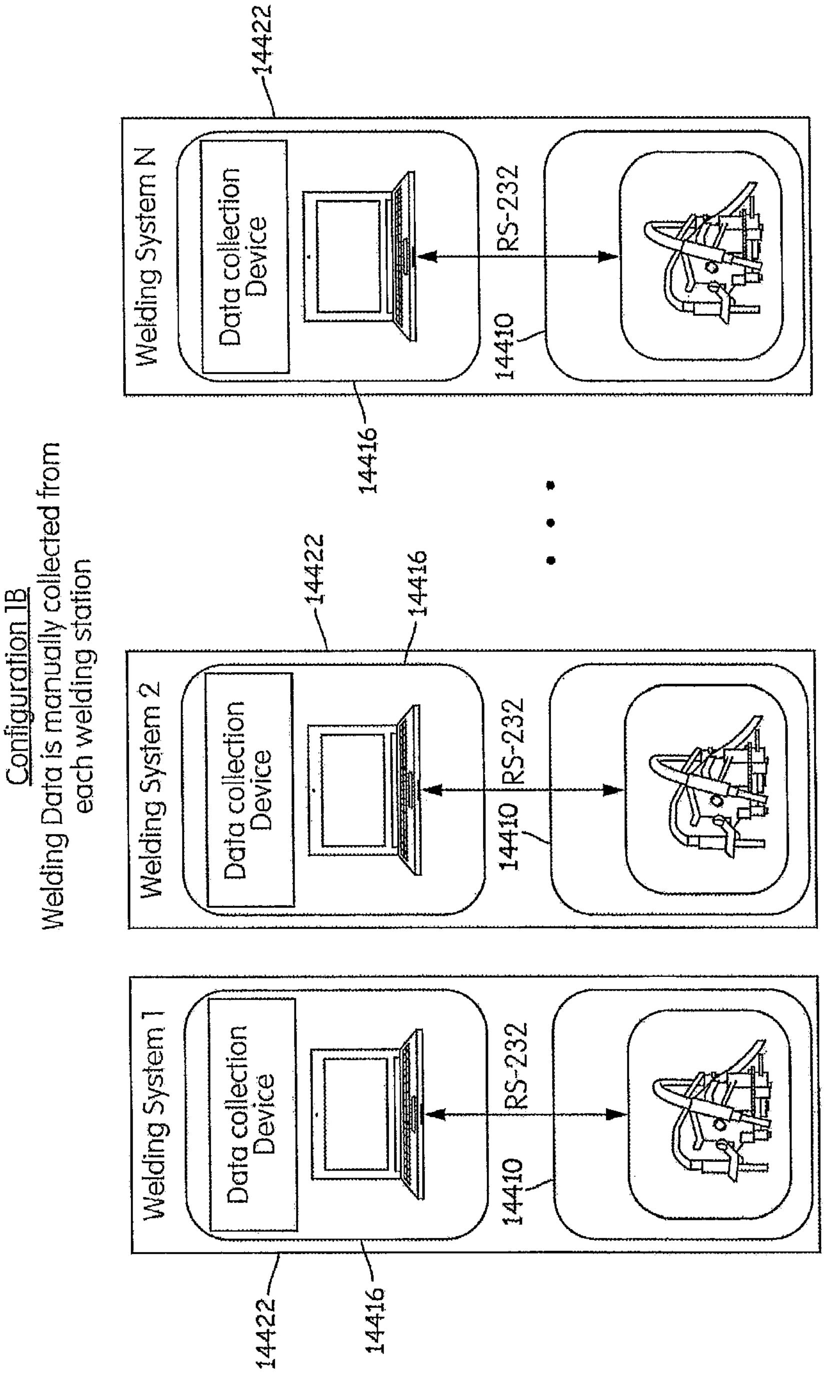

FIG. 147 is a schematic diagram of a system with a plurality of welding stations 14410 in communication with a plurality of control and log collection stations 14416, according to another embodiment of the present disclosure. In an embodiment, welding data can be collected from each welding station 14410 or weld system 14422. In another embodiment, welding data can be collected from a number of stations or weld systems 14410. There is no limit to the number of welding stations 14410 and/or weld systems 14422.

Figure 148:
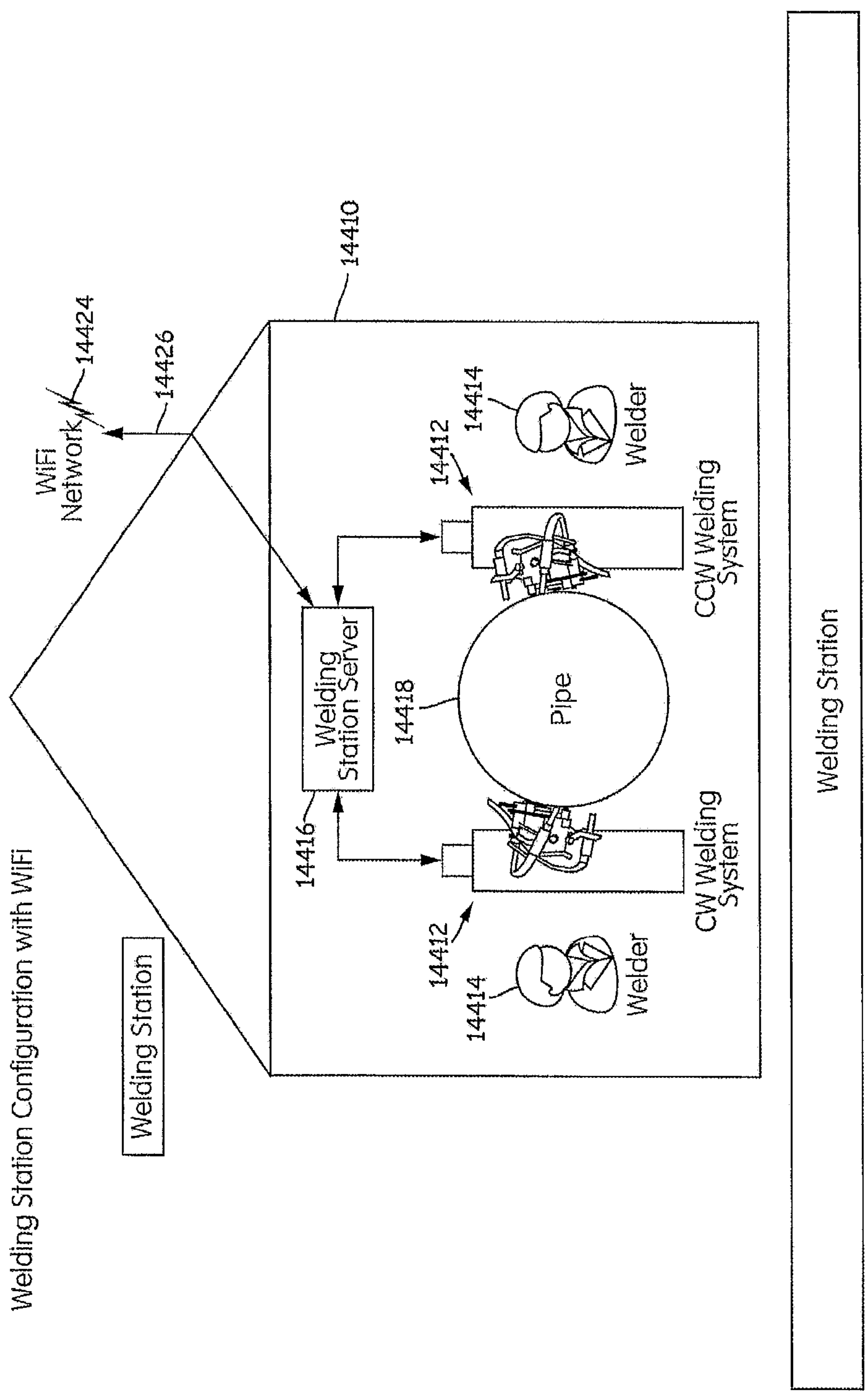

FIG. 148 is a schematic diagram of welding station 14410 in communication with a wireless network 14424 via a wireless connection (e.g., WiFi connection) 14426, according to an embodiment of the present disclosure. For example, the welding station 14410 can be provided with a wireless communications capability, such as Bluetooth, WiFi, cellular communication, satellite phone, or other wireless means. For non-limiting example, a welding station 14410 can have one or more of a welding process computer, server or processing unit 14416 which can gather and process weld system data. As shown in FIG. 148, the welding station 14410 includes two welding machines or weld systems 14412. In an embodiment, the weld systems 14412 include an orbital weld system. One of the welding machines 14412 is a clockwise (CW) welding machine or system and the other welding machine 14412 is a counter-clockwise (CCW) welding machine or system.

Figure 149:
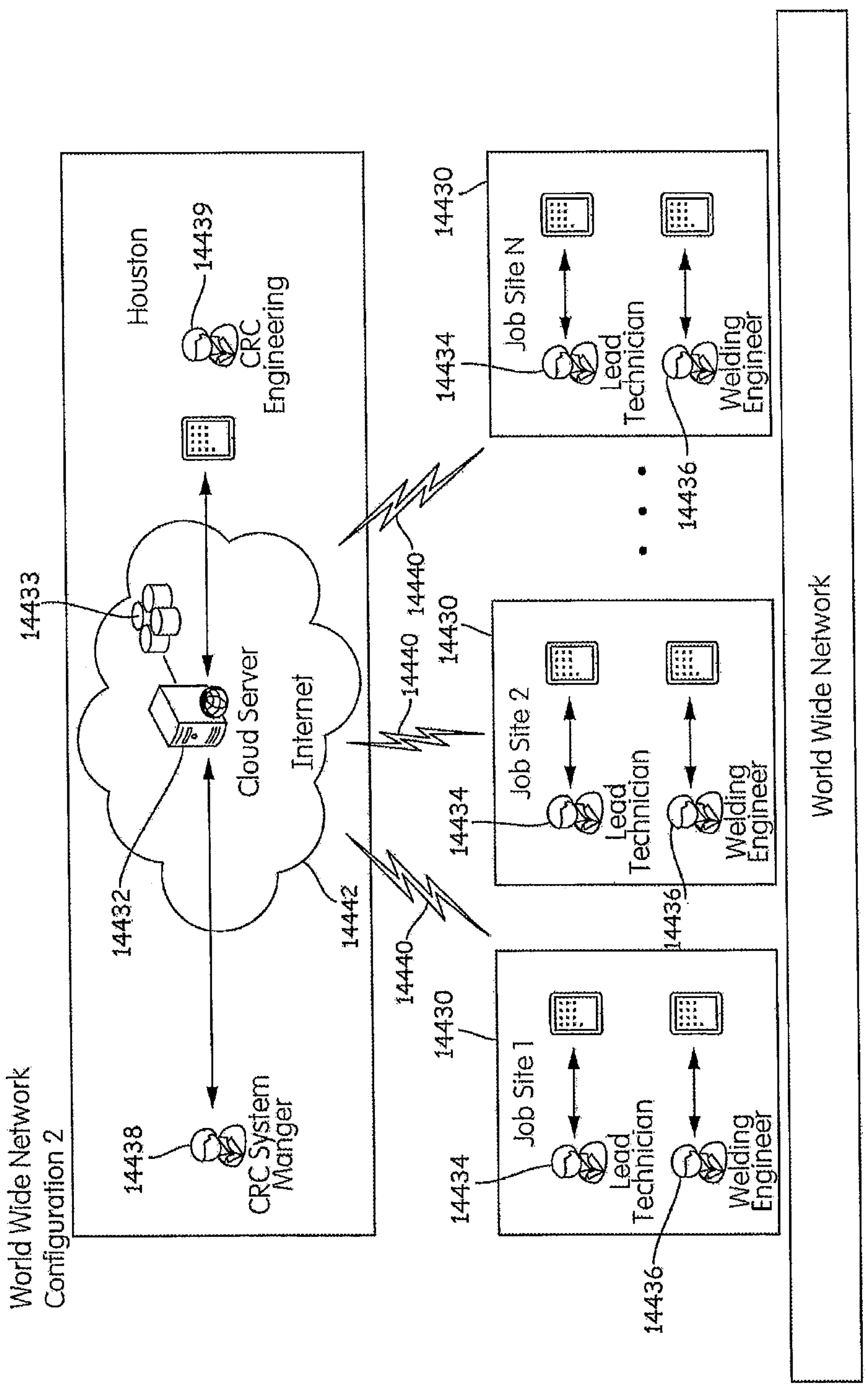

FIG. 149 is a schematic diagram of a plurality of job sites 14430 in communication with a cloud server 14432 via a worldwide network (internet), according to an embodiment of the present disclosure. The uLog can be configured on a local, regional, project or worldwide basis. The implementation of the uLog is without geographic limitation. One or many jobsites 14430 can be networked with the uLog. In an embodiment, users, personnel, managers, engineers, departments, companies, specialists, workers, customers and a multitude of other parties can be networked to uLog. Each job site 14430 includes a welding station 14410 operated by welder 14414 (as shown in FIG. 144), a lead technician 14434, and a welding engineer 14436, etc. Each job site 14430 is configured to communicate with the cloud server 14432 via a dedicated communication line or communication channel 14440 or via the internet 14442. The cloud server 14432 can be accessed by a system manager 14438 and Engineering 14439. A storage device 14433 in communication with the cloud server can be provided for storing welding data.

Figure 150:
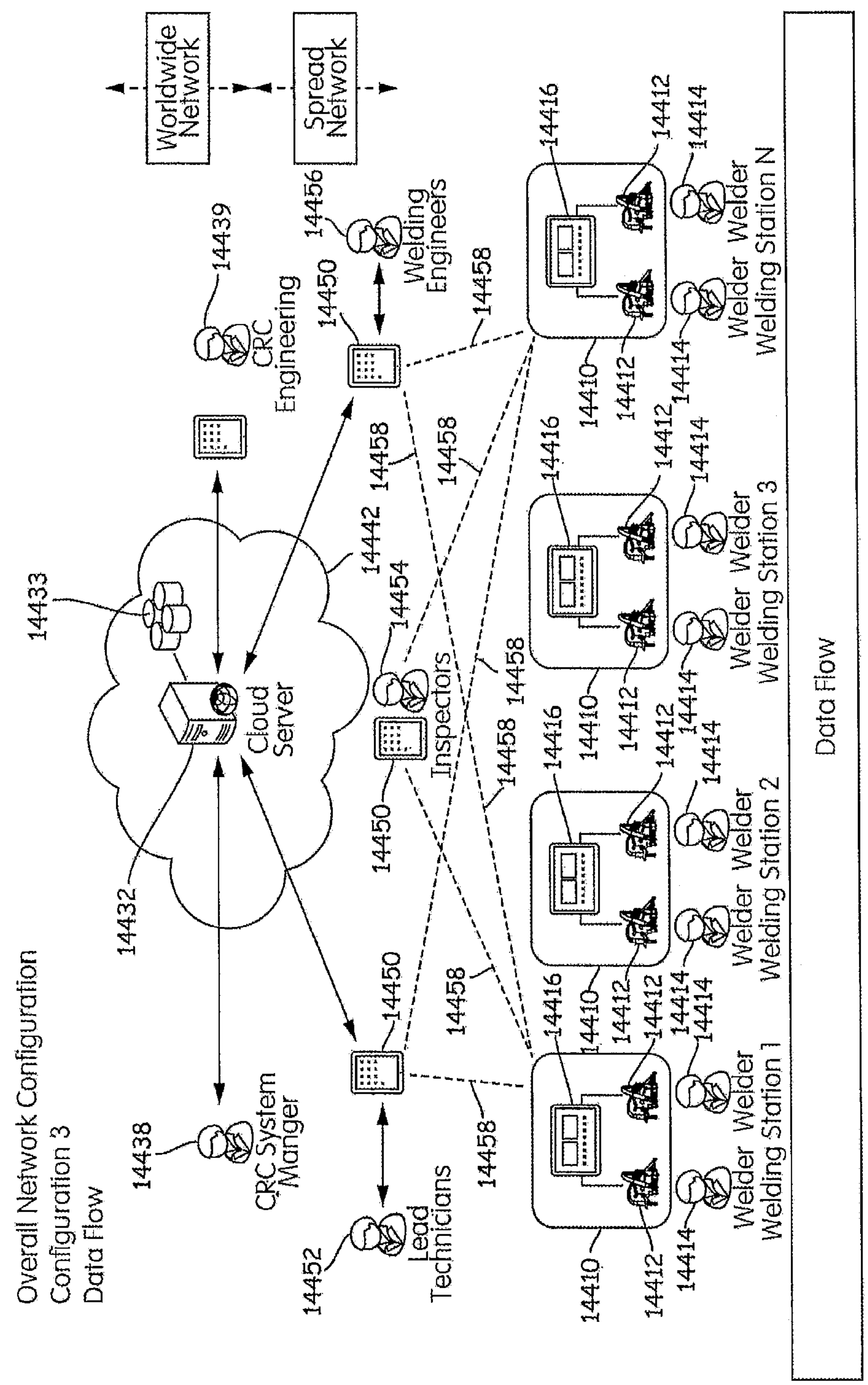

FIG. 150 is a schematic diagram of a plurality of welding stations 14410 in communication with intermediate computing devices 14450 operated by technical managers (lead technicians 14452, inspectors 14454, engineers 14456, etc.) through communication channels or lines 14458, according to an embodiment of the present disclosure. For example, each welding station 14410 can communicate with one or more of the intermediate computing devices 14450. Similarly, each intermediate computing device 14450 is configured to communicate with one or more of the welding stations 14410. The intermediate computing devices 14450 are in turn configured to communicate with cloud server 14432 through the internet 14442. Portions of the uLog program are configured to run on the cloud server 14432, other portions of the uLog are configured to run on the intermediate computing devices 14450 and yet other portions are configured to be implemented on the welding station computer/server 14416. Each portion or component of the uLog operates in synergy with other portions or components to provide a seamless management of the overall system. In an embodiment the uLog can optionally have differentiated worldwide network capabilities and spread network capabilities. In another embodiment, all capabilities are fully integrated; and in yet another embodiment can be without differentiation.

Figure 151:
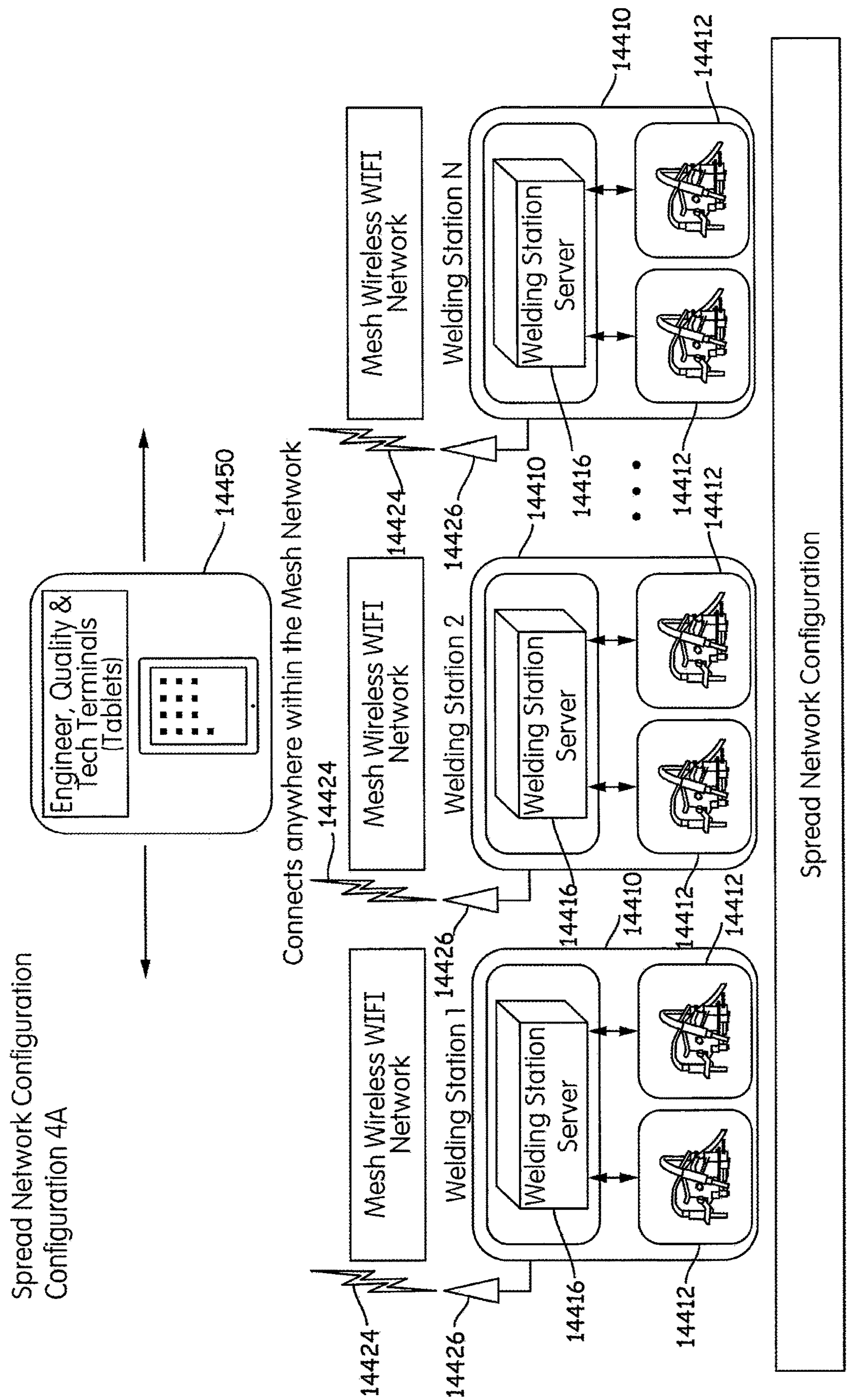

FIG. 151 is a schematic diagram of a plurality of welding stations 14412 in communication with an intermediate computer system 14450 (operated by Engineer, Quality and Tech terminals) through a wireless (e.g., WiFi) communication channel 14426 to wireless communication network 14424, according to an embodiment of the present disclosure. The intermediate computer system can be any type of a computing device including a tablet, a phone, smartphone, PDA and/or other wireless device(s) for data entry, processing, communications, input, output and other functions. The intermediate computer runs the uLog program and can be operated by engineering, quality control, users, supervising technicians and others. In an embodiment, the uLog running at the intermediate computer 14450 provides data, processes data and communicates data or information with the welding station computer 14416 located at each of the welding stations 14410.

FIG. 152 is a schematic diagram of a plurality of welding stations 14410 in communication with intermediate computer system 14450 through a wireless (e.g., WiFi) communication channel 14426 into wireless communication network 14424, according to an embodiment of the present disclosure. FIG. 152 shows a spread network configuration. Intermediate computer system 14450 has wireless capability such as WiFi or Cellular (3G, 4G, etc.) allowing it to communicate wirelessly with any of the welding stations 14410. The intermediate computer 14450 can be any type of mobile wireless device, such as a smartphone, table or PDA that can connect anywhere in the wireless network 14424. In an embodiment, the uLog program or system can use a mesh network processing data through a mesh wireless (e.g., WiFi) network 14424. For example, a welding station server 14416 of a welding station 14410 can communicate with a uLog device 14450 via a mesh wireless network 14424 and can connect anywhere within the mesh network 14424. In an embodiment, mesh networking can be used in a spread network configuration.

FIG. 153 is a schematic diagram of a plurality of welding stations 14410 in communication with a plurality of intermediate computer systems 14450 (operated by Engineer 14456, inspectors 14454, lead technician 14452, etc.) which in turn are in communication with cloud server 14432, according to an embodiment of the present disclosure. FIG. 153 shows a data flow diagram for an overall network configuration. In an embodiment, the overall network configuration can be a worldwide network configuration. The overall network configuration can be used by managers, engineers, inspectors, technicians, lead technicians, welding engineers, welders and weld stations, as well as others. In an embodiment, the uLog overall network configuration can optionally have data flow differentiated by worldwide network capabilities and spread network capabilities. In another embodiment, all capabilities are fully integrated without differentiation. Similar to the configuration shown in FIG. 150, for example, each welding station 14410 can communicate with one or more of the intermediate computing devices 14450. Each intermediate computing device 14450 is configured to communicate with one or more of the welding stations 14410. The intermediate computing devices 14450 are in turn configured to communicate with cloud server 14432 through the internet 14442. Portions of the uLog program are configured to run on the cloud server 14432, other portions of the uLog are configured to run on the intermediate computing devices 14450 and yet other portions are configured to be implemented on the welding station computer/server 14416. Each portion or component of the uLog program or system operates in synergy with other portions or components to provide a seamless management of the overall system. In an embodiment the uLog can optionally have differentiated worldwide network capabilities and spread network capabilities. In another embodiment, all capabilities are fully integrated; and in yet another embodiment can be without differentiation.

FIG. 154 shows an example graphical user interface ("GUI") for a "Main Screen" 14460 of an application for cloud based universal data logging (uLog) implemented by a computer system at the welding station 14410, at the intermediate computer system 14450 or at the cloud server 14432, according to an embodiment of the present disclosure. In an embodiment, the uLog provides numerous features for data retrieval, data analysis, data analytics, data mining, data logging and reporting. The GUI 14460 includes a plurality of icons 14461 through 14468. Each icon when activated (for example by a mouse click or by finger touch) opens an application. For example, icon 14461 is associated with application Admin configured to be operated by the administrator for setting up administrative features of the uLog. The icon 14462 is associated with Weld parameters configured for inputting weld parameters. The icon 14463 is associated with the function "Log." The icon 14464 is associated with "Report". The icon 14465 is associated with "Job Set up." The icon 14466 is associated with "Analytics." The icon 14468 is associated with uploading and saving data on the Cloud (i.e., saving data on the cloud server 14432 or storage device 14433. Therefore, as it can be appreciated, the uLog universal logging functionalities can include, but are not limited to processing data and information regarding: administration, weld parameters, logs, records, reports, job setup, inspection, quality control, coating, pipe handling, user and/or administrative diagnostics, analytics and data for processing locally and/or by cloud-based means.

The scope of this disclosure encompasses the methods and means to achieve the disclosed pipeline welding and construction support, as well as encompassing any article, product, means, and methods for producing and using any software, application, computer executable code, programming, logical sequences, or other form of electronic or automated means to achieve and/or use the methods herein. Such products, articles and means include for example, but are not limited to, a software application product provided on a fixed media, such as a disk, or in a physical memory, or in a memory stick, or as a software application product, or as an application provided by digital download, or provided by other means. This application expressly encompasses installed, uninstalled, compiled and not compiled versions of any software product or equivalent product capable of being used, implemented, installed or otherwise made active to use, achieve and/or practice the methods disclosed herein. In addition to its normal and customary meanings, the recitation "computer readable program code means" is intended to be broadly construed to encompass any kind and type of computer readable program code, executable code, software as a service, web service, cloud service, or cloud-based process, embedded application, software application product provided on a fixed media, such as a disk, or in a physical memory, or in flash memory, or in a memory stick, or as a software application product, or as an application provided by digital download, or encoded on programmable hardware, or provided by other means which can be employed to make, use, sell, practice, achieve, engage in, produce, function or operate the methods disclosed herein. The application is to be broadly construed in this regard and not limited to any means of delivery or to any product form for providing or using, achieving and/or practicing the computer readable program code products, means and/or methods disclosed herein. In embodiments, all of the methods herein can be produced and provided to a user as a software product(s), software application(s), computer readable program code means(s) or any other article(s) or device(s) which can be used to achieve any, some or all of the results, calculations and/or numerical methods disclosed herein.

In an embodiment, a user can setup a job locally or in the cloud. In a cloud-based example, a user can use and/or inherit job related information from the cloud to be retrieved by or pushed to the user's device and or machine (e.g., computer 14416 associated with welding machine 14412). Setup of a job on or by means of the Cloud, can activate device 14416 to inherit the job related information from the cloud to be pushed to the device and/or machine 14416. In another embodiment, uLog provides single point data integrity maintenance. Machine to cloud (M2C) and cloud to machine (C2M) data storage and retrieval are also functions provided by uCloud.

In an embodiment, a centralized location can be used where the details of the job client can be entered, processed and maintained, or retrieved automatically by uLog. The uLog can also use a distributed approach to data management and processing. The uLog can create and attach job specific parameter files to be deployed on a job managed by the right authorities with assigned user privilege levels. This job related information can be inherited by the assigned user and pushed to computers 14416 associated with welding machines 14412 (cloud to machine; "C2M"). Changes made to the job related information are collected from computers 14416 associated with welding machines 14412 and synced (synchronized) back to the (machine to cloud; "M2C") cloud (i.e., cloud server 14432). The cloud server 14432 provides a single point where some or all data are processed by uLog.

The uLog can process, record analyze and use data from one, more or all of the following types of equipment: welding machines, pipe bending equipment, pipe handling equipment, end prep equipment, clamps, padding and/or crushing equipment, double jointing equipment and/or systems, weighting equipment and/or systems, conveying equipment and/or systems, laybarge equipment and construction/management systems. The uLog can also be an enterprise resource planning (ERP) system or work with an ERP system.

The uLog can use and/or process data from any one or more of the following types of welding equipment. Such welding equipment can be for example, but is not limited to: manual welding equipment, automatic welding equipment, external welding machine, internal welding machine, a single torch welder, a dual torch welder, a multitorch welder, high productivity weld systems, an inspection system, an internal inspection system, an external inspection system.

The uLog can use and/or process data from any one or more of the following types of pipe bending equipment: bending machines, wedge mandrels, hydraulic wedge mandrels, plug mandrels, hydraulic plug mandrels, pneumatic mandrels, pneumatic wedge mandrels. The uLog can use and/or process data from any one or more of the following types of pipe handing equipment: DECKHAND® equipment (CRC-Evans, Houston, Tex.), vehicles, construction vehicles and equipment adapted to produce a data for use or processing. The uLog can use and/or process data from any one or more of the following types of equipment: bending sets and dies, angle measurement equipment and devices, compressors, cradles, booms and/or supports, demagnetizing equipment, tires, wheels, and track wheels.

The uLog can use and/or process data from any one or more of the following types of equipment: an end prep station for increasing land on pipe bevel, line-up station for pipe alignment and an external weld, capping fill station for applying external weld cap, internal weld station for applying internal weld, power trailer or containers with diesel generator and welding rectifiers, pipe skids and supports for transferring the pipe from station to station, internal pneumatic line-up clamps and pipe facing machines, sub-arc welding machines and processing equipment.

The uLog can also use and/or process data from any one or more of the following types of equipment: Laybarge Equipment, pipe handling, double jointing, joint coating equipment, coating equipment, onshore equipment, offshore equipment, deepwater equipment, shallow-water equipment, roller units, conveyers, pipe transfer equipment, support frames, support units, roller modules, longitudinal conveyer roller modules, pipe elevators, pipe supports, roller type pipe supports (PSA and PSF), pipe transfer carriages, PTC-V pipe transfer carriages, stern pipe supports, adjustable height pipe supports, SPSA roller-type stern pipe support, TPSA track-type pipe support, transverse conveyers, walking beam type conveyers and TV-C-W transverse conveyers.

The uLog can use and/or process data from any one or more of the following types of processes and methods: welding, pipe welding, pipeline welding, coating, joint coating, field joint coating, inspection, quality assurance, non-destructive testing, heat treatment, management, offshore management, onshore management, managed services, welding support, spoolbase management and micro-alloying.

In an embodiment, uLog can be used for deployment of daily job statistics from cloud and from mobile device. Creation of PQR and/or WPS and/or daily reports can be produced from a mobile platform and/or on cloud, or by other means. Analytics of collected data on cloud and mobile device provide feedback to the control system to improve quality and defect prediction. In an embodiment uLog provides integrated pipe joint tagging, synced with data logs. The uLog can also use single point Capture of data logs, provide machine setup information and process software revisions.

The uLog can also execute automatic error reporting of machine status, automatically stamp a job location on job records, as well as perform synchronized capture of job related parameter change notes from all users for a given project. Additionally, Consolidated Project related report to customers from single point can also be generated by uLog.

FIG. 155 shows an example GUI for a "Live Log" screen of the application for cloud based universal data logging (uLog) showing voltages versus time at one welding station, according to an embodiment of the present disclosure. In an embodiment, the uLog executes a centralized data capture of data from all pipe welding handling, coating related machines, as well as each of the types of data relevant to such machine and activities. Current live activity summary for weld, coating and inspection can be generated. Various parameters are reported on a table including: an event number, a time stamp, a zone identification, a tilt in degrees of the welding device or weld system, a travel speed of the welding device, a lead volts or voltage applied to the weld wire, a lead amps (A) or current applied to the weld wire, a lead wire speed or the speed of the weld wire, etc. For example, various parameters including lead weld wire speed (i.e., speed of the weld wire) and the speed of the welding device (travel speed), as well as other parameters can be reported in a form of table and/or graphs. In addition, a voltage applied to the weld wire can also be displayed in a table and/or as a graph versus time.

Optionally, electronic signatures to PQR/WPS documents can be supported by uLog. Optionally, the uLog can process system parameter version control and rollback. In an embodiment, the uLog also has functionalities for deployment of daily job statistics from cloud and/or mobile devices. For non-limiting example, the uLog can execute data management and can provide the user reports regarding the number of welds done for a given time period (e.g., per hour, in one day, in one week, etc.) and can report the amount of a consumable (e.g., welding material) used for a given period (e.g., per hour, in one day . . . ) or other measure. Job and error reports can also be produced by uLog.

In an embodiment, uLog can send an email and/or SMS (text message) or other notification to appropriate authorities. The uLog can also be used to for financial functions, accounting auditing, time keeping and other management tasks. For example, the uLog can invoice a customer in a timely manner. In an embodiment, the invoice can be generated based on the number of welds, or based on the use and/or waste of consumable. The uLog provides a quantification system and supports the efficient invoicing and accounting of pipeline welding projects.

The uLog can also be used for automatic resupply of materials and/or equipment and/or other resources or inventory on a project. The many and varied functions of the uLog disclosed herein can reduce disruption on the job, downtime, wastage and other negative occurrences during construction.

FIG. 156 shows an example GUI for a "Get Log" screen of the application for cloud based universal data logging (uLog) showing weld data parameters including type of weld event, time, zone, weld travel speed (travel speed of the weld system), lead wire travel speed (weld wire speed), according to an embodiment of the present disclosure. FIG. 156 shows various parameters that are reported on a table including: a weld identification or type number, an event number, a time stamp, a zone identification, a tilt in degrees of the welding device or weld system, a travel speed of the welding device, a lead volts or voltage applied to the weld wire, a lead amps (A) or current applied to the weld wire, and a lead wire speed (the speed of the weld wire). In an embodiment, uLog can automatically stamp job location on job records. In other examples, the data logs can be time stamped and can reflect the time zones, as shown in the table depicted in FIG. 156. Time stamps can be synchronized from the GPS and/or based upon data present and/or pushed to the uLog such that the logs reflect the time zone they were captured in.

FIG. 157 shows an example GUI for a summary report screen of the application for cloud based universal data logging (uLog) displaying various welding parameters including weld time, weld station identification number, weld arc voltage, etc., according to an embodiment of the present disclosure. In an embodiment, uLog can create and/or generate PQR and/or WPS and/or summary reports and/or daily reports all done from mobile platform and on cloud. PQR, WPS, summary and daily reports can be manually produced or automatically generated. The uLog can generate one, more or all of these types of reports on a schedule, ad hoc or simultaneously. The uLog provides the benefit of processing common and consistent data. The same collected data can be used to generate reports at the same or different locations and/or output devices.

Rules of reporting can be established on uLog and can be configurable. In an embodiment, critical data for a given project can be synchronized on cloud. The uLog provides for the creation of a project qualification binder that is to be sent to user and/or client of a user and/or other recipient at the end of a qualification process with electronic signatures for approval. The uLog reduces time and expense in creation of these reports and approved documents.

FIG. 158 shows an example GUI for a "Save Data on Log" screen of the application for cloud based universal data logging (uLog) displaying various, according to an embodiment of the present disclosure. The uLog provides data storage services of an unlimited nature. The pipeline construction industry is worldwide and its projects can be geographically dispersed. Additionally, pipeline construction can occur under harsh environments and climates. The uLog allows data to be stored and protected from anywhere a user and/or equipment can be present. The data can also be synchronized or otherwise processed. For example data can be saved to the cloud from a job, log, welding station, weld parameter, reports and job locations. In an embodiment location data can be saved in addition to technical and/or management data.

FIG. 159 shows an example GUI for an "Analytics" screen of the application for cloud based universal data logging (uLog) showing two icons for selecting a type of analysis performed (e.g., trends, moving average), according to an embodiment of the present disclosure. In an embodiment, uLog analytics can process and provide data trends, moving averages and/or any type of data processing which a user requires. In an embodiment, uLog can have pipeline data cloud logging, reporting and analytics systems. For example, analytics can be conducted on collected data to provide feedback to the control system to improve quality and defect prediction of welds and/or construction equipment, activities and operations. In an embodiment, data can be collected by means of the cloud and/or one or more mobile devices. In an embodiment, the uLog supports a synchronized capture of job related parameter change notes from all users for a given project. In another embodiment, uLog can monitor, analyze and report current live activity and provide live summary data and summary report(s) for welding, coating and inspection activities. The uLog system can execute system parameter version control and rollback. The uLog system also achieves single point capture of data logs, machine setup information and software revisions. In yet another embodiment, integrated pipe joint tagging can be achieved and synced with data logs.

FIG. 160 shows an example GUI for a "Welding Parameter" screen of the application for cloud based universal data logging (uLog) showing two various mechanisms for selecting a type of function to be performed (e.g., get welding parameters (WP), set welding parameters (WP), view welding parameters WP . . . ), according to an embodiment of the present disclosure. In an embodiment, uLog cloud based logging can execute any of the following activities and/or processes: get weld parameters, set weld parameters, view and process weld parameter notes, view and process weld parameter passes, as well as rolling back weld parameters. In an embodiment the uLog can contain any, more or all of the following: Pipeline Miles reward(s) functionalities, Pipe Miles functionalities, uLog functionalities, M2C functionalities and C2M functionalities.

A welder or weld technician may waste weld wire if the welder replaces the spool too soon before most of the wire is consumed. In addition, the welding process can be interrupted if the spool runs out of wire during the weld process causing downtime and defect repair. One method to address these problems in the present embodiment is to rely on wire feed motor speed to determine lead wire speed and thus determine the length of weld wire that is consumed during a certain period of time. However, this method may carry errors due to slippage of the wire on the wire feed motor wheel or incorrect starting weight. As a result, a determination of the length of wire based on the speed of the motor may not be accurate. In addition, an incorrect starting weight may lead the user to believe that enough wire is available in the spool to perform a weld (if the initial or start weight is over estimated for example) whereas in reality the amount of wire remaining in the spool is not sufficient to complete a weld. In order to cure this deficiency, a device is used to measure the weight of the spool of wire in real time while the motor pulls the wire weld. By measuring the weight of the spool, the user or welder can determine if enough wire is remaining in the spool to complete a weld before the weld is started. As a result, the weight of the wire can be determined at all times which substantially eliminate the uncertainty due to slippage or unknown starting weight of the spool. Furthermore, the weight can be compared to the lead wire feed speed to determine whether the wire is feeding at the intended speed.

FIG. 161A depicts schematically an example of a spool 14480 that is configured to carry a weld wire, according to an embodiment of the present disclosure. FIG. 161B depicts schematically a lateral view of hub-transducer 14482 that is configured to measure a weight of the spool 14480, according to an embodiment of the present disclosure. FIG. 161C depicts another lateral view of the hub-transducer showing the positioning of transducer elements or strain sensors/gauges 14484 for measuring weight strain when the spool 14480 is mounted on the hub 14482, according to an embodiment of the present disclosure. As shown in FIG. 161B, when the spool is mounted on the hub 14482, the weight of the spool will exert a force on the axle 14482A of the hub 14482 which will in turn exert a strain on the lateral hub 14482B. Strain sensors 14484 are provided on the lateral hub 14482B to sense the strain applied by the weight of the spool. Examples of strain sensors that can be used to measure strain are piezo-electric elements. The strain sensors 14484 convert a strain force into a measured voltage. Hence, by measuring the voltage, one can determine the weight of the spool 14482. In an embodiment, a temperature sensor (not shown) can be provided in the hub and positioned to capture the temperature of the hub in order to apply corrections to the strain sensor measurement for a wide range of temperatures.

FIG. 162 depicts schematically an arrangement where a weld wire 14486 in spool 14480 mounted to hub 14482 is pulled by a motor assembly 14490 for feeding the wire 14482 to the weld device (not shown), according to an embodiment of the present disclosure. The weld wire 14486 is pulled by the motor assembly 14490. In an embodiment, the rotation speed of the motor assembly (used to determine lead wire speed) can be measured by sensor 14492. In an embodiment, the motor assembly uses a motor with an adequate rotational speed (rotation per minute or RPM measured by sensor 14492) to achieve a desired feed speed of the wire to the weld device. In another embodiment, the rotation of the motor assembly can be changed according to a desired wire feed (lead wire speed) speed measured by sensor 14492. The motor assembly 14490 is configured to supply or feed weld wire 14486 to the welding device 14500 to weld a workpiece 144101 (e.g., a pipe, etc.). A speed of the welding device 14500 is measured by speed sensor 14502. The speed sensor 14502 is also configured to measure various parameters of the weld or weld data.

FIGS. 164A and 164B depict enlarged lateral cross-sections of the motor assembly 14490, according to an embodiment of the present disclosure. As shown, the motor assembly includes a motor 14491 and feed wheel 14493. The motor 14491 engages the feed wheel 14493 to rotate the feed wheel 14493. The motor assembly 14490 further includes a pinch roller 14495 that comes in contact with feed wheel 14493. A tension spring 14497 is provided to bias the pinch roller 14495 towards the feed wheel 14493. The weld wire 14486 is inserted between the feed wheel 14493 and the pinch roller 14495. Hence, the pinch roller 14495 pushes on wire 14486 to bring the wire 14486 in contact with the feed wheel 14493. As a result a rotation of the feed wheel 14493 and the pinch roller 14495 as illustrated by the arrows in FIG. 164B would be translated, in theory, into a linear movement of the wire 14486, as shown by the arrow. In an embodiment, teeth are provided on the feed wheel 14493 so as to grasp the wire 14486 through friction and force the wire 14486 to move. However, situations may occur where the wire 14486 is not fully gripped by the feed wheel 14493. In this case, the wire 14486 may slip because although the feed wheel 14493 rotates, this rotation of feed wheel 14493 does not translate into precise linear movement of the wire 14486. For example, this may occur when, the teeth on the feed wheel 14493 are worn (thus not providing sufficient friction to grasp the wire 14486), or when the pinch roller 14495 is worn (thus not exerting enough pressure or force on the wire 14486 to the push the wire 14486 against the feed wheel 14493), or when the tension spring 14497 loses its preload (thus leading to the pinch roller 14495 not exerting enough pressure or force on the wire 14486), or when the nut 14499 holding the feed wheel 14493 becomes loose (thus leading to feed wheel not grasping the wire 14486), or any combination thereof. As shown in FIG. 164A, the motor assembly 14490 includes rotation speed sensor 14492 that is configured and arranged to measure the rotation speed of the motor 14491. An output 14498 is provided for inputting and outputting data into and from the motor assembly 14490, the data including the speed of the motor 14491. The data from output 14498 is sent to computer 14416 associated with welding station 14410.

FIG. 165 is a diagram of a configuration of the weld system depicting the interconnections of various components of the system, according to an embodiment of the present disclosure. As shown in FIG. 165, a rotation speed of the motor assembly 14490 is measured by rotation speed sensor (RPM sensor) 14492. In addition, the weight of the weld wire spool 14480 is measured by the weight sensor(s) 14484 in the hub-transducer 14482. The speed of the welding device 14500 is measured by the speed sensor 14502. All parameters or data measured by the rotation speed sensor 14492, the weight sensor 14483 and the speed sensor 14502 are input into computer 14416 at wed station 14410. In an embodiment, the computer 14416 can be managed by intermediated computer 14450. Intermediate computer 14450 can be a wireless device such as a tablet, a mobile device, a smart phone, a laptop, etc. Therefore, the intermediate computer 14450 can have access to the data at the computer 14416 including the data from RPM sensor 14492, weight sensor 14484 and speed sensor 14502. The intermediate computer 14450 is further in communication (e.g., wirelessly) with the cloud server 14432 where the data from the computer 14416 can be stored and/or further processed. In an embodiment of the present disclosure, the intermediate computer is not used. In which case the computer 14416 is connected directly (e.g., wirelessly) to the cloud server 14432.

As stated in the above paragraphs, due to potential slippage, the measurement of the speed of the motor assembly (e.g., speed of the feed wheel 14493) alone, in some embodiments, may not be sufficient to provide an accurate amount of weld wire that is used or consumed by the weld machine or system. Indeed, even if a rotation of the feed wheel 14493 is measured accurately, the rotation of the wheel would be translated in theory into a movement and therefore into a certain length. However, due to slippage, the wire does not move and hence the length determined based on the rotation of or rotation speed of the wheel does not correspond to a real wire length. As a result, a weight of the spool of weld wire may also be measured. In an embodiment, the weight of a new and unused wire spool is about 15 kgs (15000 grams). In an embodiment, the weight of the wire spool is measured with a precision of about 100 grams over 15000 grams, that is with a precision of approximately 0.7%. Therefore, the weight provides a relatively good measurement method to determine the amount of weld wire remaining in the spool. In an embodiment, the weight of the spool is captured or measured periodically and is logged with a time stamp and communicated to the uLog every time the spool rotation stops. An indicator such as a buzzer or light flashing or the like can indicate to the welder that it is time to reload another spool. In addition, the weld machine may not commence a weld operation in this situation, in one embodiment. The indicator can indicate a weight threshold at which a complete weld cannot be completed.

In an embodiment, RF modules are further provided to read a spool serial number, manufactured weight of the spool, spool type, project name, and any detail that is fed on the RF tag mounted on the spool. This data can be transferred on the cloud via the uLog with any additional detail needed. If an old spool is reused, the system will compare the serial number against a database of already used spools and extract the last available weight from the cloud, compare the same against the new weight reading, prior to the start of work. A buzzer or indicator light is available on the system to indicate to the operator, that the details on the RF Tag have been read and communicated via CAN. The use of RF system will eliminate any manual book keeping work needed to keep track of the number of spools used, their serial numbers and further identify the work stations they are used at. In case weld wires with wrong compositions/diameters are shipped out, the system can identify this from the RF tag properties, alarming the operator of this deviation. This can go fairly unnoticed if the system was entirely manual.

In an embodiment, a difference DW between a weight W1 measured at time T1 and a weight W2 measured at a later time T2 can be calculated. The difference in weight DW (where DW=W1−W2) corresponds to the weight of wire that is consumed during a welding process. This weight difference DW can be compared to a theoretical weight TW. The theoretical weight TW can be obtained using the rotation speed R of the motor or a linear speed of the wire S (the linear speed S depends from the rotation speed R). The theoretical weight TW can be calculated using the following equation (1).

$$TW=(T2-T1)\times S\times(\text{Diameter of wire})2\times(\text{Density of wire material})\times\pi/4 \quad (1)$$

If, hypothetically, there is no slippage, then the theoretical weight TW should be equal to the measured weight DW. If, on the other hand slippage occurred during a process between time T1 and time T2, then the theoretical weight TW would be greater than the measured weight DW, In this case, a ratio R between theoretical weight TW and measured weight DW is greater than 1 (R=TW/DW>1) and/or the difference Δ between the theoretical weight TW and the measured weight DW is greater than zero (Δ=TW−DW>0). As a result, if after a certain period of time or number of measurements, it is noted that the difference between the measured weight and the theoretical/calculated weight persists, the speed of the motor assembly 14490 can be adjusted or compensated in order to have a calculated/theoretical weight substantially equal the measured weight. Hence, the measured weight is compared to the theoretical weight (determined from the wire feed speed) to determine if the wire is fed at the intended feed speed. In one embodiment, this determination can be accomplished locally at the welder side or by using the uLog system at the cloud server 14432.

FIG. 163 is a flowchart depicting a process of comparing the measured weight and the theoretical weight determined based on the wire feed speed, according to an embodiment of the present disclosure. As it can be appreciated from the above paragraphs, the process start by measuring a first weight W1 of the wire spool at a first time (T1), at S10. The process further includes measuring a second weight W2 of the spool at a second time $T_2$, after a certain time has elapsed from time T1, at S12 (T2>T1). The process also includes calculating a difference between the first measured weight W1 and the second measured weight at time T2, at S14. The process includes calculating a theoretical weight based on wire feed speed, at S16. At S18, the theoretical weight based on the wire feed speed is compared to the calculated weight difference, and if the theoretical weight is greater or smaller than the calculated weight difference, at S18, a speed of the motor assembly pulling the wire is adjusted, at S20. The process is repeated after another increment in time, after the speed of the motor assembly is adjusted. If the theoretical weight is the same as the calculated weight difference, then the process is also repeated after another increment in time without adjusting the speed of the motor assembly. This process is repeated at a plurality of time increments in order to monitor and/or correct any potential slippage of the motor assembly 14490.

This process can be implemented locally by the uLog system at the computer 14416 associated with the weld station 14410 or implemented by the uLog system at the cloud server 14432, or implemented by the uLog system at the intermediate computer 14450 described in the above paragraphs.

In an embodiment, it may be desirable to monitor usage of wire at different welding stations 14410 to evaluate the overall efficiency of the weld system. For example, this will allow a predictive indication of the amount of spool needed on large projects based on previous learning. For example, usage of spools can be uploaded to the uLog system stored and processed by the cloud server 14432. For example, each of the welding stations 14410 can upload usage data of spools to the uLog system to the cloud server using the previously described network configurations, and based on a historical usage of a quantity of wire spools and using a machine learning algorithm (MLA), the uLog system can predict an average future usage of wire spools (or quantity of weld wire). For example, based on usage patterns over certain weld parameters, the uLog system can determine a threshold at which a complete weld cannot be completed. As a result, the uLog system can alert the welder using an indicator (e.g., a buzzer, flashing light, etc.) that the wire in the spool is depleted and that a complete weld cannot be finished based on a theoretical threshold determined using the machine learning algorithm. For example, the cloud server 14432 running the uLog can be configured to provide a feedback to one or more of the plurality of the weld station computer 14416 to alert a welder that a complete weld cannot be finished based on a theoretical threshold determined using the machine learning algorithm.

In a further embodiment, when there is a discrepancy between the theoretical weight determined based on the feed speed of the wire (measured by sensor 14492) and the measured weight (W2−W1), where W2 and W1 are measured by weight sensors 14484, instead of adjusting the speed of the motor assembly 14490, a speed of the welding device 14500 (or travel speed) can be adjusted to match a speed V obtained from the measured weight W2−W1.

As it can be appreciated from the above paragraphs, there is provided a weld system comprising a plurality of welding stations 14410. Each weld station 14410 includes a weld station computer 14416 and weld system 14412 in communication with the weld station computer 14416. Each weld station 14410 includes one or more sensors 14492, 14502, the one or more sensors 14492, 14502 being configured to measure weld data including lead wire speed data (measured by speed sensor 14492), as depicted, for example in FIG. 162. The system further includes a plurality of wireless devices 14450 in communication with the one or more of the weld station computers to receive the weld data including the measured lead wire speed data. The system also includes a cloud server 14432 in communication with the wireless devices 14450, the cloud server 14432 being configured to process the weld data including the lead wire speed data, and configured to determine an amount of consumable welding material used by the plurality of welding stations 14410 for a given period of time. The cloud server 14432 is configured to communicate the amount of consumable weld used to one or more of the wireless devices.

In an embodiment, the weld data further includes travel speed data of the weld system. In an embodiment, the wireless devices 14450 are configured to further receive the travel speed data of the weld system. In an embodiment, the cloud server 14432 is further configured to process the travel speed data.

As it can be appreciated from the above paragraphs, there is also provided a weld system having a welding station, the welding station including a weld station computer and a weld system in communication with the weld station computer. The weld system includes a supply of weld material 14480, a welding device 14500, and a weld supply motor assembly 14490 that moves the weld material 14486 in the weld supply material 14480 to the welder device. The weld system further includes a weighting device 14482 operatively connected with the weld station computer 14416 and configured to measure a weight of the supply of weld material 14480 and to communicate the weight of the supply of weld material 14480 to the weld station computer 14416 in the form of weight data, and a sensor 14492 operatively connected with the weld supply motor assembly 14490 and the weld station computer 14416 so as to communicate the speed of the weld supply motor assembly 14490 to the weld station computer 14416 in the form of speed data. The weld station computer 14416 is operatively connected to the weld supply motor assembly 14490 and is configured to control the speed of the motor assembly 14490 based on the weight data.

As it can be further appreciated from the above paragraphs, there is provided a weld system including a plurality of welding stations 14410, each welding station 14410 including a weld station computer 14416 and weld system 14500 in communication with the weld station computer 14416, each welding station 14410 including one or more sensors 14492, the one or more sensors 14492 configured to measure weld data including lead wire speed data. The weld system also includes a plurality of wireless devices 14450 in communication with the one or more of the welding station computers 14416 to receive the weld data including the measured lead wire speed data. Each weld station computer 14416 is configured to process the weld data, including the lead wire speed data, for the weld system 14500 in communication therewith. The weld station computer 14416 is further configured to determine an amount of consumable welding material used by the weld system 14500 for a given period of time and generating consumption data based thereon.

In an embodiment, each welding station 14410 further includes a motor 14490 for moving the lead wire at the lead wire speed, wherein the lead wire speed data is determined based upon a speed of the motor 14490, each welding station 14410 further comprising a weight sensor 14484 that senses a weight depletion of the consumable material. The weight sensor 14484 provides output signals to the weld station computer 14416. The weld station computer 14416 utilizes the output signals to determine the consumption data. In an embodiment, the weld station computer 14416 utilizes the consumption data to control the speed of the motor 14490. In an embodiment, the system further includes a cloud server 14432 for receiving the consumption data, together with the lead wire speed data, to correlate the consumption data with the lead wire speed data.

FIG. 166 shows a system overview which can be used with a broad variety of testing and inspection equipment, means, processes and methods. In the generic example of FIG. 166, pipeline 16610 can be built at the behest of an owning company 16670 by connecting a plurality of pipe segments together by means of girth welds. This construction can be done by owning company 16670, a third-party, or other party. During the construction process, nondestructive testing and inspection can be conducted to ensure that the pipeline will not fail in its specified service within quality control parameters. To support this goal, for example, one or more welds, such as girth welds can be inspected and tested by one or more testing means, processes or methods, such as ultrasonic testing or radiography testing.

For example a field worker 16650 can place a testing device, such as an imaging device 16620 on the pipeline in proximity to each of the girth welds. The testing device, which can be an imaging device, can collect data regarding the internal structure of the girth weld for analysis. This data can be any type of data desired for analysis by an inspector or other person or needed for any computer processing. For example, if an ultrasonic testing method or radiographic testing method or both is used, one or more signals can be transmitted to a pipeline and/or a weld, such as a girth weld, and the data and information in response to such signals can be collected, processed, and analyzed by one or more computers and/or one or more people.

In an embodiment, the responses to the signals can be received, processed, digitized, compressed, transmitted, and communicated (16625) to a device or receiver separate (or which can be separate from the testing device which generated the signal(s) and/or received the response(s); and which can be located remotely or at a remote facility 16630. Herein, the device, facility or computer which receives data from the testing unit and which is separate or can be separated from the testing unit will be referred to as the "remote entity." The remote entity is broadly encompassing of any device, facility or person, or other which can receive, use, perceive, process or transform any data from the testing unit. The breadth of scope of this term can range from a memory device, such as a memory stick, to a distributed control system, a cloud based processor, a cell phone, a smart phone, a computer, a digital processor, a receiver, a capability, an enterprise wide control system, or a remote facility or remote central processing facility, or other device, person or location. In an embodiment, the remote entity can be a remote facility which can be a computing, processing, and monitoring center. The remote entity, such as a remote facility, can be networked, wirelessly networked, based in the cloud, based in a hybrid cloud, or located at a physical facility or associated with a person, company, capability, use, entity or other. In an embodiment, the remote entity can be owned and/or controlled by any desired person, client, company, organization, inspector, third-party, operator, worker, or other.

In an embodiment, the remote entity, such as the remote facility, can use a computer to process testing and/or inspection data, such as compressed data, to determine the size, shape, location, and orientation of any defects present in the weld and/or pipe. Test data and/or inspection data, or analytical results, can be communicated (16635) to an inspection specialist 16640 who can examine the data or verify analytical results, or otherwise use all or part of the data provided to the inspection specialist 16640. Herein, "test data" and "nondestructive test data" are used synonymously. As an example, results, or results verified by the inspection specialist, can be communicated (16645) to the field worker 16650. This supports the repair of defects, or the management of defect repair processes for welds and pipelines. Optionally, the verified results can be communicated to the Quality Assurance Inspector 16660 and the Owning Company 16670.

Technologies, processes, means and methods used herein can extend to and be used for pipe testing and inspection. The equipment, processes and devices disclosed here have a scope of use extending far beyond welds.

FIG. 167 shows an embodiment of the system which can be used with any of a broad variety of testing methodologies and with many types of equipment. As shown in FIG. 167, in an embodiment one or more girth welds can be inspected. The girth welds 167110 that hold pipelines 167100 together can be inspected before the pipeline can be put in service. One field personnel 167500 or a plurality of field personnel 167500 can travel along a pipeline having one, or more, of a girth weld 167110. They can stop at each girth weld and use imaging equipment 167200 to take images of the internal structure respectively of the one, or more, of the girth weld 167110. The number of the girth welds 167500 to be inspected can range from 1 to a very large number, such as 5 million.

Inspection data and images can be generated, processed, recorded, detected, digitized, compressed and transmitted on-site or to a remotely located facility, such as a remotely located central facility 167300. At the remotely located central facility 167300, a computer 167310 can processes the inspection data and images (which can be digital images, or other data image, or data set) to determine the size, shape, orientation and location of any defects present in a tested weld. The computer can also identify which defects are significant enough and/or large enough to have a significant effect on the integrity of the pipeline by executing computer executable code using computer executable logic. If a defect is identify by the computer processing, one or more defects can be communicated to an inspection specialist 167400 who can verify the presence and significance of computer identified defects.

Alternatively, the inspector can view the inspection data directly and draw a conclusion from the inspector's training and experience. Optionally, the inspector's conclusions can be verified by computer processing.

The verified results, whether computer-generated or human-generated, can then be transmitted to the field workers 167500 by computer means, or telephonically, so that the welds can be repaired. The inspection results can also be sent to a Quality Assurance Inspector 167600, the company that owns the pipeline 167700, or other interested or intended party.

In an embodiment, pipeline 167100 can be built at the behest of owning company 167700 by connecting a plurality of pipe segments 167120A, 167120B together by means of girth welds 167110. In order to ensure that the pipeline will not fail in service, it is desired by the builder, or others, that the girth welds be inspected by non-destructive means. These means can include magnetic particle inspection, dye penetrant inspection, ultrasonic testing and X-ray radiography. Ultrasonic testing and x-ray radiography are both data intensive imaging methods.

The analytical work to evaluate test and/or inspection data requires one or more highly-trained technicians 167400, 167520 and specialized imaging equipment 167200. The imaging equipment which can be used can have an emitter 167210, a receiver 167220, and an analog-to-digital (A/D) converter 167230. One or more field workers 167520 can transport the imaging equipment 167200 to a weld along the pipeline by means a support truck 167530, or other vehicle.

The imaging equipment can be of any useful type, such as ultrasonic or radiographic.

At a segment connection, the field workers can place the imaging equipment on or near the pipeline in proximity to the girth weld 167110. A field worker can activate the imaging equipment. The emitter portion can send a signal (167215) into the pipe segments and/or girth weld. The signal can be ultrasonic sound wave pulses in the case of ultrasonic testing, or can be x-ray radiation in the case of x-ray radiography.

In the case of ultrasonic testing, the ultrasonic pulses can reflect off of boundaries where the density of the girth weld 167110 changes. Boundaries between metal and air give the strongest reflections. The reflected pulses can be detected by the receiver. The receiver can measure the intensity of the reflected pulse (167222) and can produce an electronic signal proportional to the intensity of the reflected pulse. In an embodiment, the emitter and receiver can have multiple elements. Optionally, the emitter elements can be selectively activated to target the ultrasonic pulse at a specific location.

In the case of x-ray radiography, the intensity of the x-ray is attenuated by the material in the pipe segments and girth weld. The receiver can measure the intensity of the radiation that passes through the material (167224).

In an embodiment, the imaging equipment can be mounted to a motor driven carriage which can move along the girth weld at a constant rate. The A/D converter can digitize the signal (167226) from the receiver and can compress the digitized data. The compressed imaging data and carriage location (167235) can be communicated to a computer 167310 at a remote entity, such as a remote facility 167300. The communication can be via a cable, transport of physical media, wireless, network, cloud, radio transmission or other.

In the non-limiting example of FIG. 167, at the remote facility 167300, the computer 167310 can analyze the data (167235). The analysis can be executed in one or more steps. For example, the computation engine 167320 can identify signals (167222, 167224) that can indicate the presence of anomalies in the girth weld 167110. The anomalous signals (167325) can be communicated to the AI engine 167330. The AI engine can be a computer which runs computer executable code, relational logic and/or artificial intelligent programming. The AI engine can determine the size, shape, orientation, and location of the defects (167335) that caused the anomalous signals (167325). The AI engine can execute computer executable program code using rule based logic to determine which defects are significant to the integrity of the pipeline and must be repaired, which are not. The computer 167310 can send the data (167335) describing the zero or more defects to the inspection technician 167400, quality assurance inspector 167600, owning company 167700, and field personnel 167500, or others.

In an embodiment, the inspection technician can choose to review (167215) the data (167335) before it is communicated to the quality assurance inspector, owning company, field personnel, or others. The inspection technician can also change the identification of a defect from significant to non-significant or non-significant to significant, or otherwise modify or annotate any results produced by computer or otherwise. The defect data (167335) which is associated with a significant defect can be can be communicated to the field personnel 167500. The data can be transmitted to the one or more field workers 167520. The one or more field workers can mark the locations and size of the significant defects on the weld(s) and/or pipeline (167525) for repair by the repair welder 167510, or others. Alternatively, the data can be transmitted directly to the repair welder 167510, or others.

FIG. 168 shows an ultrasonic testing embodiment. As shown in FIG. 168, in an embodiment one or more girth welds can be inspected by ultrasonic testing. The girth welds 168110 that hold pipelines 168100 together can be inspected before the pipeline can be put in service. One field personnel 168500 or a plurality of field personnel 168500 can travel along a pipeline having one, or more, of a girth weld 168110. They can stop at each girth weld and use ultrasonic testing equipment 168200 to take images of the internal structure of the weld. Those images can be digitized, compressed and transmitted to a remote facility, such as a remotely located central facility 168300. At the remotely located central facility, a computer 168310 can process the inspection data, such as ultrasonic data, image data or images to determine the size, shape, orientation, and location of any defects present in a tested weld. The number of the girth welds 168110 inspected can range from 168 to a very large number, such as 5 million.

The computer can also identify which defects are significant enough and/or large enough to have a significant effect on the integrity of the pipeline by executing computer executable code using computer executable logic. If a defect is identify by the computer processing, one or more defects can be communicated to an inspection specialist 168400, who can be an ultrasonic testing specialist, who can verify the presence and significance of a computer identified defect.

Alternatively, the inspector can view the inspection data directly and draw a conclusion from the inspector's training and experience. Optionally, the inspector's conclusions can be verified by computer processing.

The verified results, whether computer generated or human generated, can then be transmitted to the field personnel 168500 by computer means, or telephonically, so that the welds can be repaired. The inspection results can also be sent to a Quality Assurance Inspector 168600, the company that owns the pipeline 168700, or other interested or intended party.

In the embodiment of FIG. 168, a pipeline 168100 is built at the behest of Owning Company 168700 by connecting a plurality of Pipe Segments 168120A, 168120B together by means of Girth Welds 168110. In order to ensure that the pipeline will not fail in service, it is desired that the girth welds be inspected by non-destructive means. These means can include magnetic particle inspection, dye penetrant inspection, ultrasonic testing and X-ray radiography. Ultrasonic testing is a data intensive imaging method. It requires a one or more highly-trained technicians 168400, 168520 and specialized imaging equipment 168200.

The imaging equipment can have an emitter 168210, a receiver 168220, and an A/D converter 168230. One or more field workers 168520 can transport the imaging equipment 168200 along the pipeline by means of support truck 168530, or other vehicle. The field workers can place the imaging equipment on the pipeline in proximity to the girth weld 168110, at the girth weld, which is to be tested. A field worker can activate the imaging equipment. The emitter portion can send ultrasonic pulses (168215) into the pipe segments and girth weld. The pulses can be sent at a rate from 1 Hz to 20,000 Hz. The frequency of the ultrasonic sound wave can vary from 0.5 MHz to 23 MHz. The ultrasonic pulses can reflect off of boundaries where the density changes in the girth weld 168110 or in the pipe. Boundaries between metal and air give the strongest reflections. The reflected pulses can be detected by the receiver. The receiver measures the intensity of the reflected pulse (168222) and produces an electronic signal proportional to the intensity. The emitter and receiver can have multiple elements. The emitter elements can be selectively activated to target the ultrasonic pulse at a specific location.

The imaging equipment is mounted to a motor driven carriage which can move along the girth weld at a constant rate. The A/D converter can digitize the signal (168226) from the receiver and can compress the digitized data. The compressed imaging data and carriage location (168235) can be communicated to a remote entity, such as a computer 168310 which can optionally be at a remote facility 168300. The communication can be via a cable, transport of physical media, wireless, network, cloud, radio transmission or other.

In the embodiment of FIG. 168, at the remote facility 168300, the computer 168310 can analyze the data (168235). The analysis can be done in steps. A computation engine 168320 can identify signals (168222) that can indicate the presence of anomalies in the girth weld 168110. The anomalous signals (168325) are communicated to the AI engine 168330. The AI engine can determine the size, shape, orientation and location of the defects (168335) that caused the anomalous signals (168325). The AI engine can determine which defects are significant to the integrity of the pipeline and must be repaired. The computer 168310 sends the data (168335) describing the zero or more defects to the inspection technician 168400, quality assurance inspector 168600, owning company 168700, field personnel 168500, or others.

Optionally, the inspection technician can receive the data directly and conduct an analysis apart from the AI. Optionally, in such scenario, the inspection technician can use the AI to check or confirm the inspection technician's results.

Optionally, the inspection technician can choose to review (168405) the data (168335) before it is communicated to the quality assurance inspector, owning company, and/or field personnel, or others. The inspection technician can also change the identification of a defect from significant to non-significant or non-significant to significant.

The defect data (168335) which is associated with a significant defect can be communicated to the field personnel 168500. The data can be transmitted to the one or more field workers 168520. The one or more field workers can mark the locations and size of the significant defects on the pipeline (168525) for later repair by the repair welder 168510. Alternatively, the data can be transmitted directly to the repair welder 168510.

FIG. 169 shows a radiographic testing embodiment. As shown in FIG. 169, in an embodiment one or more girth welds can be inspected by radiographic testing. The girth welds 169110 that hold pipelines 169100 together can be inspected before the pipeline can be put in service. One field personnel 169500 or a plurality of field personnel 169500 can travel along a pipeline having one, or more, of a girth weld 169110. They can stop at each girth weld 169110 and use x-ray equipment 169200 to gather data and/or take images of the internal structure of each girth weld 169110.

The inspection data and/or images can be digitized, compressed and transmitted to a remote facility, such as a remotely located central facility 169300. At the remotely located central facility, a computer 169310 can process the inspection data, such as ultrasonic data, image data or images to determine the size, shape, orientation and location of any defects present in a tested weld. The number of the girth welds 169110 inspected can range from 1 to a very large number, such as 5 million.

The computer can also identify which defects are significant enough and/or large enough to have a significant effect on the integrity of the pipeline by executing computer executable code using computer executable logic. If a defect is identify by the computer processing, one or more defects can be communicated to an inspection specialist 169400, who can be a radiography testing specialist, who can verify the presence and significance of a computer identified defect.

Alternatively, the inspector can view the inspection data directly and draw a conclusion from the inspector's experience. Optionally, the inspector's conclusions can be verified by computer processing.

The verified results, whether computer generated or human generated, can then be transmitted to the field workers 169500 by computer means, or telephonically, so that the welds can be repaired. The inspection results can also be sent to a Quality Assurance Inspector 169600, the company that owns the pipeline 169700, or other interested or intended party.

In an embodiment, as shown in FIG. 169, a pipeline 169100 can be built at the behest of owning company 169700 by connecting a plurality of pipe segments 169120A, 169120B together by means of girth welds 169110. In order to ensure that the pipeline will not fail in service, it is desired that the girth welds be inspected by non-destructive means. These means can include magnetic particle inspection, dye penetrant inspection, ultrasonic testing and x-ray radiography. Ultrasonic testing and x-ray radiography are both data intensive imaging methods. They require one or more highly-trained technicians 169400, 169520 and specialized imaging equipment 169200. The imaging equipment can consist of an emitter 169210, a receiver 169220, and an A/D converter 169230. One or more field workers 169520 can transport the imaging equipment 169200 along the pipeline by means of support truck 169530. At each segment connection, the field workers can place the imaging equipment on or near the pipeline in proximity to the girth weld 169110. A field worker can activate the imaging equipment. The emitter portion can send an x-ray radiation (169215) into the pipe segments and girth weld. The intensity of the x-ray can be attenuated by the material in the pipe segments and girth weld. The receiver can measure the intensity of the radiation that passes through the material (169224).

The imaging equipment can be mounted to a motor driven carriage which can move along the girth weld at a constant rate. The A/D converter can digitize the signal 169226 from the receiver and can compresses the digitized data. The compressed imaging data and carriage location (169235) can be communicated to a computer 169310 at a remote facility 169300. The communication can be via cable, transport of physical media, or radio transmission.

In the example as shown in FIG. 169, at the remote facility 169300, the computer 169310 can analyze the data (169235). The analysis can be executed in steps. The computation engine 169320 can identify signals (169224) that can indicate the presence of anomalies in the girth weld 169110. The anomalous signals (169325) can be communicated to the AI engine 169330. The AI engine can determine the size, shape, orientation, and location of the defects (169335) that caused the anomalous signals (169325). The AI engine can determine which defects are significant to the integrity of the pipeline and must be repaired. Optionally, these steps can be conducted by the inspection technician based upon the test and/or inspection data with or without the support of the AI.

In the embodiment of FIG. 169, the computer 169310 can send the data (169335) describing the zero or more defects to the inspection technician 169400, quality assurance inspector 169600, owning company 169700, and field personnel 169500, or others. The inspection technician can choose to review (169405) the data (169335) before it is communicated to the quality assurance inspector, owning company, and/or field personnel. The inspection technician can also change the identification of a defect from significant to non-significant, or non-significant to significant.

The defect data (169335) which is associated with a significant defect can be communicated to the field personnel 169500.

The data can be transmitted to the one or more field workers 169520. The one or more field workers can mark the locations and size of the significant defects on the pipeline (169525) for later repair by the repair welder 169510. Alternatively, the data can be transmitted directly to the repair welder 169510.

In one embodiment, a computer system may comprise a first device having a processor which processes a pipeline construction data, where the first device communicates the pipeline construction data to a cloud-based memory, and the pipeline construction data is processed by a cloud-based processor.

In one embodiment, the pipeline construction data comprises welding data, pipe handling data, a coating data, inspection data, or other data.

In one embodiment, the first device comprises an equipment of a welding station, an equipment of a pipeline welding spread operation, an automatic welding tool, a vision welding system, an inspection system, or other device.

In one embodiment, first data may be communicated from a first device to a second device, where the first data comprises data regarding a pipeline construction. The first data may be processed by cloud-based network means.

In one embodiment, the first data (communicated from the first device to the second device) may comprise weld data, pipe handling data, coating data, inspection data, management data, or other data.

In one embodiment, a computer program product for welding support may comprise computer readable program code means which provides to a computer memory a welding data; computer readable program code means which provides to the memory a data from a data set comprising a pipeline data; and computer readable program code means which processes the welding data and the pipeline data to provide a record output.

In one embodiment, the computer program product for welding support may comprise a program executable code of a rule-based logic to process the welding data by a welding support program code, a program executable code of a rule-based logic to process the welding data by an inspection program code, a program executable code of a rule-based logic used to process the welding data by a management program code or a quality control program code, or other program executable code.

In one embodiment, a welding system may comprise a plurality of welding stations, each welding station including a weld station computer and weld system in communication with the weld station computer, where each welding station comprises one or more sensors, and the one or more sensors configured to measure weld data comprises lead wire speed data. The welding system may comprise a plurality of wireless devices in communication with the one or more of the welding station computers to receive the weld data including the measured lead wire speed data; and a cloud server in communication with the wireless devices. The cloud server is configured to process the weld data comprising the lead wire speed data, and configured to determine an amount of consumable welding material used by the plurality of welding stations for a given period of time. The cloud server is configured to communicate the amount of consumable welding material used to one or more of the wireless devices.

In one embodiment, the welding system may comprise an orbital welder. As an example, the orbital welder may comprise a clockwise (CW) and counterclockwise (CCW) welding system.

In one embodiment, the measured weld data may further comprise travel speed data of the weld system. In one embodiment, the plurality of wireless devices are configured to further receive the travel speed data of the weld system. In one embodiment, the cloud server is further configured to process the travel speed data.

In one embodiment, if a current in the weld system is high, the weld station computer instructs the weld system to slow down a speed of the weld system or controls a position of a torch in the weld system.

In one embodiment, a welding system may comprise a welding station. The welding station may comprise a weld station computer and a weld system in communication with the weld station computer. The weld system may comprise a supply of weld material, a welding device, and a weld supply motor assembly that moves the weld material to the welder device. In one embodiment, the welding system may further comprise a weighting device operatively connected with the weld station computer and configured to measure a weight of the supply of weld material and to communicate the weight of the supply of weld material to the weld station computer in the form of weight data; and a sensor operatively connected with the weld supply motor assembly and the weld station computer so as to communicate the speed of the weld supply motor assembly to the weld station computer in the form of speed data. The weld station computer is operatively connected to the weld supply motor assembly and is configured to control the speed of the motor assembly based on the weight data.

In one embodiment, the welding device may comprise an orbital welding machine. In one embodiment, the supply of weld material includes a spool configured to carry a weld wire. In one embodiment, the weighting device includes a hub-transducer, where the hub-transducer is configured to carry the spool. In one embodiment, the weighting device includes strain sensors mounted on a hub of the hub-transducer. In one embodiment, the strain sensor are configured and arranged to sense a strain applied by the weight of the spool. In one embodiment, the motor assembly comprises a motor and a feed wheel operatively connected to the motor. In one embodiment, the motor assembly comprises a pinch roller configured to push on a weld wire to bring the weld wire in contact with the feed wheel so that a rotation of the feed wheel results in a movement of the wire. In one embodiment, the feed wheel is configured to rotationally engage the wire to move the wire.

In one embodiment, the weld station computer is configured to measure a weight difference between a weight of the supply of weld material measured at a first time and a weight of the supply of weld material measured at a second time subsequent to the first time, the weight difference corresponding to a measured weight of weld material consumed between the first time and the second time. In one embodiment, the weld station computer is configured to calculate a theoretical weight of consumed weld material based on a rotation speed of the weld supply motor assembly. In one embodiment, the weld station computer is configured to calculate a difference or a ratio or both between the measured weight of weld material and a theoretical weight of consumed weld material. In one embodiment, the weld station computer is configured to compare the measured weight of weld material and the theoretical weight of consumed weld material, and if there is a discrepancy, where the weld station computer indicates that slippage occurred and controls the speed of the motor assembly to adjust a rotation speed of the motor assembly. In one embodiment, the weld station computer is configured to repeat a comparison between the measured weight of weld material and the theoretical weight of consumed weld material at a plurality of increments in time.

In one embodiment, the welding system may comprise a cloud server in communication with the weld station computer, where the cloud server is configured to process the speed of the weld supply motor assembly and the weight of the supply of weld material received from the weld station computer to store a historical data about a usage of weld material.

In one embodiment, the cloud server is further configured to process the speed of the weld supply motor assembly and the weight of the supply of weld material received from a plurality of weld station computers associated with a plurality of weld stations to store a historical data about a usage of weld material at each of the plurality of weld stations. In one embodiment, the cloud server is configured to predict an average future usage of weld material based on the historical data and using a machine learning algorithm. In one embodiment, the cloud server is configured to determine a threshold of weld material needed to complete a complete weld based on usage patterns and the historical data. In one embodiment, the cloud server is configured to provide a feedback to one or more of the plurality of the weld station computer to alert a welder that a complete weld cannot be finished based on a theoretical threshold determined using the machine learning algorithm.

In one embodiment, the weld station computer is configured to control a speed of the welding device to adjust the speed of the welding device to match a speed obtained from the measured weight of the supply of weld material.

In one embodiment, a first weight of a supply of weld material at a first time may be measured using a weight measuring device. A second weight of the supply of weld material may be measured using the weight measuring device at a second time subsequent to the first time. A difference in measured weight between the first weight and the second weight may be calculate using a computer, where the difference in measured weight corresponding to measured used weld material. A theoretical weight of used weld material is calculated using the computer based on a speed of a motor assembly feeding the weld material to a welding device. The theoretical weight of used weld material may be compared by the computer to the measured weight of used weld material. The speed of the motor assembly may be adjusted by the computer so as to correct a slippage of the motor assembly.

In one embodiment, the measuring of the first weight, the measuring of the second weight, the calculating of the weight difference corresponding to the measured used weld material, the calculating of the theoretical weight of used weld material, the comparing of the theoretical weight of used weld material to the measured weight of used weld material, at a plurality of time increments, and the adjusting the speed of the motor assembly when the slippage of motor assembly occurs may be repeated.

In one embodiment, a welding system may comprise a plurality of welding stations, where each welding station includes a weld station computer and weld system in communication with the weld station computer, each welding station includes one or more sensors, and the one or more sensors are configured to measure weld data including lead wire speed data. The welding system may also comprise a plurality of wireless devices in communication with the one or more of the welding station computers to receive the weld data including the measured lead wire speed data. Each weld station computer is configured to process the weld data, including the lead wire speed data, for the weld system in communication therewith, and the weld station computer is configured to determine an amount of consumable welding material used by the weld system for a given period of time and generating consumption data based thereon.

In one embodiment, each welding station of the welding system may comprise a motor for moving the lead wire at the lead wire speed, where the lead wire speed data is determined based upon a speed of the motor, each welding station further comprises a weight sensor that senses a weight depletion of the consumable material, the weight sensor provides output signals to the weld station computer, and the weld station computer utilizes the output signals to determine the consumption data. In one embodiment, the weld station computer utilizes the consumption data to control the speed of the motor.

In one embodiment, the welding system may comprise a cloud server for receiving the consumption data, together with the lead wire speed data, to correlate the consumption data with the lead wire speed data.

In one embodiment, a system for pipeline testing may comprise a testing device adapted to generate nondestructive test data regarding at least a portion of a weld. The testing device may communicate the nondestructive test data to a second device which is adapted to receive the nondestructive test data. The testing device may be adapted to operate remotely from a means of analyzing the nondestructive test data.

In one embodiment, the testing device is adapted to transmit nondestructive test data for wireless communication. In one embodiment, the testing device is adapted to transmit nondestructive test data to a recording media which is not permanently attached to the testing device. In one embodiment, the testing device is adapted to transmit nondestructive test data to an external digital recording device.

In one embodiment, a system for nondestructive pipeline testing may comprise an imaging equipment adapted to generate nondestructive test data regarding a portion of a welded pipe; and a remote processing device adapted to receive and process inspection data regarding the portion of the welded pipe.

In one embodiment, the remote processing device is adapted to analyze pipe data. In one embodiment, the remote processing device is adapted to analyze weld data. In one embodiment, the remote processing device is adapted to execute computer executable code to identify significant weld defects from the nondestructive test data.

In one embodiment, the remote processing device is adapted to execute computer executable code of an algorithm to identify significant weld defects from the nondestructive test data. In one embodiment, the remote processing device is adapted to execute computer executable code of an artificial intelligence to identify significant weld defects from the nondestructive test data. In one embodiment, the remote processing device is adapted to execute computer executable code of a rule based logic to identify significant weld defects from the nondestructive test data.

In one embodiment, the nondestructive test data may comprise one or more of the following data: location, size, orientation, shape and significance of any defects that caused anomalies in the nondestructive test data. In one embodiment, the nondestructive test data may be analyzed without human computations, or analytical intervention. In one embodiment, the nondestructive test data may be analyzed in part by computer analysis and in part by human work.

In one embodiment, a method of nondestructive pipeline testing may comprise providing an imaging equipment; generating a nondestructive test data; providing a means to provide the nondestructive test data for analysis; and the nondestructive test data provided for analysis at a location remote from the tested portion of a pipe and the equipment proximate to the tested portion of a pipe.

In one embodiment, the method may further comprise providing the nondestructive test data for analysis at a location remote from the tested portion of a pipe and a support vehicle. In one embodiment, the method may further comprise providing for analysis at a location remote from the tested portion and any computer proximate to the tested portion of a pipe or the test location.

In one embodiment, the method may further comprise processing digital NDT data at a location substantially removed from where the data is collected. In one embodiment, the method may further comprise communicating NDT data to a location substantially removed from where the data is collected by means of wireless data transmission. In one embodiment, the method may further comprise communicating NDT data to a location substantially removed from where the data is collected by means of transport of physical media. In one embodiment, the method may further comprise communicating NDT data to a location substantially removed from where the data is collected by means of data transmission cable. In one embodiment, the method may further comprise communicating NDT data to a location substantially removed from where the data is collected by means of a combination of methods.

In one embodiment, the method may further comprise communicating the results of the analysis at the substantially removed location to the location where the data is collected. In one embodiment, the method may further comprise communicating the results of the analysis at the substantially removed location to specialists at another substantially removed location.

In one embodiment, the method may further comprise analyzing digital automated ultrasonic test data. In one embodiment, the method may further comprise communicating automated ultrasonic test data to a location substantially removed from where the data is collected by means of wireless data transmission; and processing the digital automated ultrasonic test data at a location substantially removed from where the data is collected. In one embodiment, the method may further comprise communicating automated ultrasonic test data to a location substantially removed from where the data is collected by means of transport of physical media.

In one embodiment, the method may further comprise communicating automated ultrasonic test data to a location substantially removed from where the data is collected by means of data transmission cable. In one embodiment, the method may further comprise communicating automated ultrasonic test data to a location substantially removed from where the data is collected by means of a combination of methods. In one embodiment, the method may further comprise using a computer algorithm to identify significant weld defects from the automated ultrasonic test data.

In one embodiment, the method may further comprise processing digital radiography data at a location substantially removed from where the data is collected. In one embodiment, the method may further comprise communicating digital radiography data to a location substantially removed from where the data is collected by means of wireless data transmission. In one embodiment, the method may further comprise communicating digital radiography data to a location substantially removed from where the data is collected by means of transport of physical media. In one embodiment, the method may further comprise communicating digital radiography data to a location substantially removed from where the data is collected by means of data transmission cable.

In one embodiment, the method may further comprise communicating digital radiography data to a location substantially removed from where the data is collected by means of a combination of methods. In one embodiment, the method may further comprise using a computer algorithm to identify significant weld defects from the digital radiography data.

In one embodiment, a system for pipeline construction may comprise a system for real-time logging of weld data, where the weld data is provided for analysis by computerized means and/or by subject experts. In one embodiment, the weld data comprises a weld data, a pipe handling data, a coating data, an inspection data, a management data, or other data. In one embodiment, the system may further comprise a system for aggregating all available weld data into a single data set having all data pertaining to each weld related or adapted for analysis by computerized means and/or subject experts.

In one embodiment, the system may further comprise a machine readable code executing rule-based program logic to identify correlations between different data about a weld and to identify defects in that weld. In one embodiment, the system may further comprise a machine readable code executing rule-based program logic to identify correlations between the same data about different welds and the presence or absence of defects in those welds.

In one embodiment, a system for aligning and welding together two segments of a pipe may comprise a welding mechanism for applying a weld to a face joint of the two segments. The welding mechanism may include an articulating torch, a laser sensor for reading a profile of the face joint, and an electronic controller for receiving information signals from the laser sensor to control the position and/or orientation of the torch. The system may further comprise an alignment mechanism for manipulating the orientation of the longitudinal axis of at least one of the segments relative to the other. The welding mechanism may further include a carriage for securing a position of the welding mechanism in the pipe and a welding portion capable of rotating relative to the supporting portion within the pipe. The torch and the laser sensor may be rotatably supported by the welding portion such that, during welding, the torch follows the laser sensor along the face joint.

In one embodiment, the weld mechanism may further includes a camera for optically sensing a joint face. In one embodiment, the articulating movement of a torch head on the torch may include one of radial translation movement toward and away from the face joint, translation movement in a direction of the longitudinal axis of the segments, pivotal movement relative to the weld mechanism about an axis that is parallel to the pipe segment longitudinal axis, and pivotal movement relative to the weld head about an axis that is perpendicular to the pipe segment longitudinal axis.

In one embodiment, the alignment mechanism manipulates the orientation of the at least one segment by contact with an exterior of the at least one segment. In one embodiment, the electronic controller receives a signal from the laser sensor to direct the alignment mechanism to adjust the relative positions of the pipe segments based on predetermined alignment parameters.

In one embodiment, the weld mechanism rotates within and relative to an interior of a face joint of two segments so that the torch follows the laser sensor, and the laser sensor provides continuous face joint profile data to the electronic controller which in turn continuously directs the positioning of the torch.

In one embodiment, the camera follows the torch along a weld joint path, and the camera sends a signal to an operation station display to allow an operator to inspect an image of a portion of the weld.

In one embodiment, a method of aligning and welding together two segments of a pipe may comprise placing a first pipe segment on an alignment device; inserting an internal welding machine having a laser and a weld torch into the first pipe segment; generally aligning a second pipe segment with the first pipe segment and internal welding machine; griping an external portion of the first and second pipe segments to adjusting an axial position of the internal welding machine so as to generally line up with a face joint of the first and second pipe segments; adjusting a relative alignment of the first and second pipe segments via the alignment device based on a signal from the internal welder; beginning a root weld cycle in which the laser scans the face joint, the torch follows the laser, and the output from the laser is used to control the position of articulated torch, where the position and orientation of the torch with respect to the face joint is controlled to produce a quality weld; determining a face joint profile from the laser; releasing the alignment device and removing internal welding machine from an open pipe segment end; and repositioning a next sequential pipe segment on the external alignment mechanism in preparation for welding of a next joint.

In one embodiment, the method may further comprise providing a rotary mechanism on which the laser and torch rotate to perform an initial scan of the face joint by laser sensor; and; generating a signal from the rotating laser to direct alignment of the first and pipe second by the alignment device before welding begins.

In one embodiment, an internal heat exchanger (IHEX) for pipeline welding may comprise a drive system configured to move the IHEX into a position within at least one pipe section near a weld joint location with another pipe section; a cooling section including cooling structure configured to selectively cool one or more interior surface portions of the at least one pipe section; and a controller in communication with the cooling structure and configured to activate the cooling section when the IHEX is at the position within the at least one pipe section.

In one embodiment, the IHEX may further comprise a connection member configured to secure the IHEX to an internal tie-in clamp. In one embodiment, the drive system may comprise at least one roller activated by a motor controlled by the controller and configured to move the IHEX within the at least one pipe section in forward and reverse directions. In one embodiment, the drive system may comprise a cable and winch system, where the winch is configured for anchoring at a location external to the at least one pipe section and the cable extends between the winch and a support structure of the IHEX that includes the controller and the cooling section.

In one embodiment, the controller is further in communication with a remote control device so as to facilitate selective activation of the cooling section via the remote control device. In one embodiment, the cooling section comprises at least one nozzle configured to spray a coolant toward an interior wall surface portion of the at least one pipe section; and a coolant supply source configured to deliver coolant to the at least one nozzle.

In one embodiment, the IHEX may further comprise a frame including a first section that includes the coolant supply source, an intermediate section that includes the cooling section, and a third section that includes the controller. In one embodiment, the coolant supply source may comprise a coolant pump located remotely from the cooling section such that the coolant pump is located exterior to the at least one pipe section when the cooling section is disposed within the at least one pipe section, and the coolant pump is connected to the at least one nozzle via at least one fluid conduit. In one embodiment, the at least one nozzle comprises a plurality of nozzles arranged in a plurality of rows, and the rows are arranged around a periphery of a central support member of the cooling section.

In one embodiment, the cooling section comprises a plurality of fin members extending radially outward from and spaced around a periphery of a central support member of the cooling section. In one embodiment, at least one fin member includes at least one channel extending through the fin member, and the cooling section further comprises at least one fan that is controllable by the controller and is in proximity and aligned with the at least one fin member so as to direct a flow of air through the at least one channel of the at least one fin member.

In one embodiment, at least one fin member comprises a hollow enclosure including an inlet and an outlet, and the cooling section further comprises a circulating coolant flow circuit to selectively flow coolant through the hollow enclosure of the at least one fin member.

In one embodiment, the IHEX may comprise one or more temperature sensors disposed at one or more locations along the IHEX and in communication with the controller. The one or more temperature sensors measures a temperature at one or more locations within the at least one pipe section and provide measured temperature information to the controller, and the controller is configured to selectively control activation and operation of the cooling section based upon the measured temperature information.

The technology disclosed herein solve the significant technical problem of how to test, inspect and ensure the quality of the thousands and millions of welds in pipeline systems by using equipment and methods which are reliable and technically sound. In an embodiment, a system for pipeline testing can have a testing device adapted to generate nondestructive test data ("NDT") regarding at least a portion of a weld, or an entire weld. The testing device can communicate the nondestructive test data to a second device which is adapted to receive the nondestructive test data. The testing device can be adapted to operate remotely from a means of analyzing the nondestructive test data. The system for pipeline testing can have a testing device adapted to transmit nondestructive test data for wireless communication. The system for pipeline testing can have a testing device adapted to transmit nondestructive test data to a recording media which is not permanently attached to the testing device. The system for pipeline testing can have a testing device adapted to transmit nondestructive test data to an external digital recording device. A system for nondestructive pipeline testing can have: an imaging equipment adapted to generate nondestructive test data regarding a portion of a welded pipe; a remote processing device adapted to receive and process inspection data regarding the portion of the welded pipe. The system for nondestructive pipeline testing can have a remote processing device adapted to analyze pipe data. The system for nondestructive pipeline testing can have a remote processing device adapted to analyze weld data. The system for nondestructive pipeline testing can have a remote processing device adapted to execute computer executable code to identify significant weld defects from the nondestructive test data. The system for nondestructive pipeline testing can have a remote processing device adapted to execute computer executable code of an algorithm to identify significant weld defects from the nondestructive test data. The system for nondestructive pipeline testing can have a remote processing device adapted to execute computer executable code of an artificial intelligence to identify significant weld defects from the nondestructive test data. The system for nondestructive pipeline testing can have a remote processing device adapted to execute computer executable code of a rule based logic to identify one or more significant weld defects from the nondestructive test data. The weld defects identified can be of different types such as occlusions, lack of material, material properties, brittleness, density, thickness, air bubbles, gas bubbles, and others. The system for nondestructive pipeline testing can have a nondestructive test data such as one or more of the following data: location, size, orientation, shape and significance of any defects that caused anomalies in the scan. The system for nondestructive pipeline testing which can have a nondestructive test data which can be analyzed by the system automatically and without human computations, or human analytical intervention. In an embodiment, a method of nondestructive pipeline testing can have the steps of: providing an imaging equipment; generating a nondestructive test data; providing a means to provide the nondestructive test data for analysis; and providing the nondestructive test data for analysis at a location remote from the tested portion of a pipe and the equipment proximate to the tested portion of a pipe. The method of nondestructive pipeline testing can have the step of providing the nondestructive test data for analysis at a location remote from the tested portion of a pipe and a support vehicle. The method of nondestructive pipeline testing can have the step of providing the nondestructive test data for analysis at a location remote from the tested portion and any computer proximate to the tested portion of a pipe or the test location. The method of nondestructive pipeline testing can have the step of processing digital NDT data at a location substantially removed from where the data is collected. The method of nondestructive pipeline testing can have the step of communicating NDT data to a location substantially removed from where the data is collected by means of wireless data transmission. The method of nondestructive pipeline testing can have the step of communicating NDT data to a location substantially removed from where the data is collected by means of transport of physical media. The method of nondestructive pipeline testing can have the step of communicating NDT data to a location substantially removed from where the data is collected by means of data transmission cable. The method of nondestructive pipeline testing can have the step of communicating NDT data to a location substantially removed from where the data is collected by means of a combination of methods. The method of nondestructive pipeline testing can have the step of: communicating the results of the analysis at the substantially removed location to the location where the data is collected. The method of nondestructive pipeline testing can have the step of communicating the results of the analysis at the substantially removed location to specialists at another substantially removed location. The method of nondestructive pipeline testing can have the step of analyzing digital automated ultrasonic test data (also as, digital "AUT" data). The method of nondestructive pipeline testing can have the step of processing digital automated ultrasonic test data at a location substantially removed from where the data is collected. The method of nondestructive pipeline testing can have the step of processing digital automated ultrasonic test data at a location substantially removed from where the data is collected by means of wireless data transmission. The method of nondestructive pipeline testing can have the step of communicating automated ultrasonic test data to a location substantially removed from where the data is collected by means of wireless data transmission. The method of nondestructive pipeline testing can have the step of communicating automated ultrasonic test data to a location substantially removed from where the data is collected by means of transport of physical media. The method of nondestructive pipeline testing can have the step of communicating automated ultrasonic test data to a location substantially removed from where the data is collected by means of data transmission cable. The method of nondestructive pipeline testing can have the step of communicating automated ultrasonic test data to a location substantially removed from where the data is collected by means of a combination of methods. The method of nondestructive pipeline testing can have the step of using a computer algorithm to identify significant weld defects from the automated ultrasonic test data. The method of nondestructive pipeline testing can have the step of processing digital radiography data at a location substantially removed from where the data is collected. The method of nondestructive pipeline testing can have the step of communicating digital radiography data to a location substantially removed from where the data is collected by means of wireless data transmission. The method of nondestructive pipeline testing can have the step of communicating digital radiography data to a location substantially removed from where the data is collected by means of transport of physical media. The method of nondestructive pipeline testing can have the step of communicating digital radiography data to a location substantially removed from where the data is collected by means of data transmission cable. The method of nondestructive pipeline testing can have the step of communicating digital radiography data to a location substantially removed from where the data is collected by means of a combination of methods. The method of nondestructive pipeline testing can have the step of using a computer algorithm to identify significant weld defects from the digital radiography data. In an embodiment, the universal cloud logging system ("uLog") disclosed herein can have a computer system which has a first device having a processor which processes a pipeline construction data, the first device can communicate the pipeline construction data to a cloud-based memory. The pipeline construction data can be processed by a cloud-based processor. The uLog can process any one or more pipeline construction data for example, but not limited to: a welding data, a pipe handling data, a coating data and an inspection data. The uLog can process data from any one or more of the following devices and/or equipment: a welding station, a pipeline welding spread operation, a welding tool, an automatic welding tool, a manual welding tool, a vision welding system, a single torch automatic welder or welding machine, a dual torch automatic welder or welding machine, an external welder or welding machine, an internal welder or welding machine, an inspection system, a smartphone, a cell phone, a personal data assistant (PDA), a laptop, a tablet, a computer, a digital device, a wireless device and an equipment used by a welder, technician, worker, inspector, coating applier and/or manager. The uLog can use a method of data management executed on a computer, comprising the steps of: communicating a first data from a first device to a second device, the first data which is a data regarding a pipeline construction; and processing the first data by a cloud-based network means. The data which can be communicated by the first device and/or processed by the second device and/or processed by the network of the uLog can be any one or more of the following: a weld data, a pipe handling data, a coating data, a weld data, an inspection data, a heat treatment data and a management data or other pipeline-related construction and/or management data. In an embodiment, the method of data management by means of the uLog can include the additional method step of processing the first data and/or data by a network means which can be a wired network means or wireless network means. In another embodiment, the method of data management by means of the uLog can include the additional method step of processing the first data and/or data by network means which is a wireless network means, telecommunications means or WiFi means. In yet another embodiment, the method of data management by means of the uLog can include the additional method step of processing the first data by the network means which is a cloud-based network means. In an embodiment, the uLog can be a computer program product for welding support which has: a computer readable program code means which provides to a computer memory a welding data; a computer readable program code means which provides to the memory a data from a data set comprising a pipeline data; and a computer readable program code means which processes the welding data and the pipeline data to provide a record output and/or an output resulting from the execution of program logic and/or analytics. In an embodiment, the computer program product for welding support can further have a program executable code of a rule-based logic which processes the welding data by a welding support program code. In another embodiment, the computer program product for welding support can further have a program executable code of a rule-based logic which processes the welding data by an inspection program code. In yet another embodiment, the computer program product for welding support can further have a program executable code of a rule-based logic which processes the welding data by a management program code or a quality control program code. A system for pipeline construction can have a system for real-time logging of weld data. The weld data is provided for analysis by computerized means and/or by subject experts. The system for pipeline construction can use weld data which has one or more of a weld data, a pipe handling data, a coating data, an inspection data, and a management data. The system for pipeline construction can further have a system for aggregating all available weld data into a single data set having all data pertaining to each weld related or adapted for analysis by computerized means and/or subject experts. The system for pipeline construction can further have a machine readable code executing rule-based program logic to identify correlations between different data about a weld and to identify defects in that weld. The system for pipeline construction can further have a machine readable code executing rule-based program logic to identify correlations between the same data about different welds.

In an embodiment, the universal cloud logging system ("uLog") disclosed herein can have a computer system which has a first device having a processor which processes a pipeline construction data, the first device can communicate the pipeline construction data to a cloud-based memory. The pipeline construction data can be processed by a cloud-based processor. The uLog can process any one or more pipeline construction data for example, but not limited to: a welding data, a pipe handling data, a coating data and an inspection data. The uLog can process data from any one or more of the following devices and/or equipment: a welding station, a pipeline welding spread operation, a welding tool, an automatic welding tool, a manual welding tool, a vision welding system, a single torch automatic welder or welding machine, a dual torch automatic welder or welding machine, an external welder or welding machine, an internal welder or welding machine, an inspection system, a smartphone, a cell phone, a personal data assistant (PDA), a laptop, a tablet, a computer, a digital device, a wireless device and an equipment used by a welder, technician, worker, inspector, coating applier and/or manager.

The uLog can use a method of data management executed on a computer, comprising the steps of: communicating a first data from a first device to a second device, the first data which is a data regarding a pipeline construction; and processing the first data by a cloud-based network means. The data which can be communicated by the first device and/or processed by the second device and/or processed by the network of the uLog can be any one or more of the following: a weld data, a pipe handling data, a coating data, a weld data, an inspection data, a heat treatment data and a management data or other pipeline-related construction and/or management data. In an embodiment, the method of data management by means of the uLog can include the additional method step of processing the first data and/or data by a network means which can be a wired network means or wireless network means. In another embodiment, the method of data management by means of the uLog can include the additional method step of processing the first data and/or data by network means which is a wireless network means, telecommunications means or WiFi means. In yet another embodiment, the method of data management by means of the uLog can include the additional method step of processing the first data by the network means which is a cloud-based network means. In an embodiment, the uLog can be a computer program product for welding support which has: a computer readable program code means which provides to a computer memory a welding data; a computer readable program code means which provides to the memory a data from a data set comprising a pipeline data; and a computer readable program code means which processes the welding data and the pipeline data to provide a record output and/or an output resulting from the execution of program logic and/or analytics.

In an embodiment, the computer program product for welding support can further have a program executable code of a rule-based logic which processes the welding data by a welding support program code. In another embodiment, the computer program product for welding support can further have a program executable code of a rule-based logic which processes the welding data by an inspection program code. In yet another embodiment, the computer program product for welding support can further have a program executable code of a rule-based logic which processes the welding data by a management program code or a quality control program code. The present patent application in its several aspects and embodiments solves the problems discussed above and significantly advances the technology of welding, pipe handling, coating, pipeline construction, construction, management and inspection technologies.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A method for welding a pair of insulated pipes to one another, each pipe comprising a metal pipe interior surrounded by an insulator material, wherein end portions of the pipes to be welded have the metal pipe interior exposed, the method comprising:

aligning the exposed metal pipe ends to be welded;

welding the exposed metal pipe ends to one another to form a weld joint;

heating the exposed end portions of the welded pipes;

applying an insulator to the heated exposed end portions of the welded pipes such that the insulator is adhered to an exterior surface of the metal pipe interior, thus insulating the formerly exposed end portions of the pipes; and applying cooling energy from within the pipes to an interior surface of the welded pipes, wherein the applying cooling energy includes blowing a cooling gas within at least one of the welded pipes and in a direction towards the weld joint to facilitate cooling of the welded pipes after the insulator is applied thereon.

2. The method according to claim 1, wherein the cooling energy is applied by a movable fluid disposed within a heat exchanger, wherein a contact surface of the heat exchanger is configured to be positioned in contact with the interior surface of the welded pipes to remove heat from the welded pipes.

3. The method according to claim 1, further comprising performing a pipeline deployment procedure, wherein applying the cooling energy reduces a wait time between applying the insulator and performing the pipeline deployment procedure.

4. The method according to claim 3, wherein the pipeline deployment procedure is a spooling procedure.

5. The method according to claim 3, wherein the pipeline deployment procedure is a S-lay procedure.

6. The method according to claim 3, wherein the pipeline development procedure is a pipeline lowering procedure.

7. A system for welding a pair of insulated pipes to one another, each pipe comprising a metal pipe interior surrounded by an insulator material, wherein end portions of the pipes to be welded have the metal pipe interior exposed, the system comprising:

a weld torch configured to weld the exposed metal pipe ends to one another to form a weld joint therebetween;

a heater configured to heat the exposed end portions of the welded pipes;

an insulator supply configured to apply insulator material to the heated exposed end portions of the welded pipes such that the insulator is adhered to an exterior surface of the metal pipe interior, thus insulating the formerly exposed end portions of the pipes; and a cooler system configured to be positioned within the welded pipes, wherein the cooler system includes a blower configured to blow a cooling gas onto an interior surface of the welded pipes and in a direction towards the weld joint to facilitate cooling of the welded pipes after the insulator material is applied thereon.

8. The system according to claim 7, wherein the insulator supply comprising a container configured to contain the insulator material and an output nozzle configured to provide the insulator material onto the exposed end portions of the welded pipes.

9. The system according to claim 7, wherein the cooler system comprises a heat exchanger configured to carry a movable fluid therethrough, wherein a contact surface of the heat exchanger is configured to be positioned in contact with the interior surface of the welded pipes to remove heat from the welded pipes.

10. The system according to claim 9, wherein the cooler system comprises a motor, the motor configured to move the contact surface outwardly into engagement with the interior surface of the metal pipes.

11. The system of according to claim 7, wherein the cooler system comprises a fluid nozzle configured to apply a cooling liquid onto the interior surface of the welded pipes to remove heat from the welded pipes.

12. The system of according to claim 7, further comprising an ultrasound inspection station configured to inspect the weld between the welded metal pipes, and wherein the cooler system is configured to facilitate cooling of the metal pipes after the pipes are welded and before inspection of the weld by the ultrasonic inspection station.

13. The system according to claim 12, further comprising a temperature sensor, and wherein the inspection by the ultrasound inspection station commences after the temperature sensor detects that the temperature of the pipe in the vicinity of the weld is below a predetermined threshold.

14. The system according to claim 7, wherein the cooler system includes:

a frame configured to reside within at least one pipe of the welded pipes;

wherein the blower is carried by the frame, a plurality of rollers configured to rotatably support the frame;

a drive motor that drives the plurality of rollers to move the frame within the at least one pipe;

a brake system that secures the frame from movement at a desired location within the at least one pipe;

one or more battery cells carried by the frame, the one or more battery cells configured to power the drive motor and the brake system; and one or more processors operatively connected with the drive motor, the brake system and the blower, the one or more processors operating the blower to reduce the temperature of the welded pipes after the insulator material is applied thereon.

15. The system according to claim 7, wherein the cooling gas includes air, and wherein the blower includes at least one fan configured to force air across the interior surfaces of the welded pipes.

* * * * *